(12) United States Patent
Connor

(10) Patent No.: US 10,859,834 B2
(45) Date of Patent: Dec. 8, 2020

(54) SPACE-EFFICIENT OPTICAL STRUCTURES FOR WIDE FIELD-OF-VIEW AUGMENTED REALITY (AR) EYEWEAR

(71) Applicant: Robert A. Connor, St. Paul, MN (US)

(72) Inventor: Robert A. Connor, St. Paul, MN (US)

(73) Assignee: Holovisions, St. Paul, MN (US)

( * ) Notice: Subject to any disclaimer, the term of this patent is extended or adjusted under 35 U.S.C. 154(b) by 259 days.

(21) Appl. No.: 16/175,924

(22) Filed: Oct. 31, 2018

(65) Prior Publication Data

US 2019/0064526 A1    Feb. 28, 2019

Related U.S. Application Data

(63) Continuation-in-part of application No. 15/942,498, filed on Mar. 31, 2018, now Pat. No. 10,338,400.

(60) Provisional application No. 62/751,076, filed on Oct. 26, 2018, provisional application No. 62/749,775, filed on Oct. 24, 2018, provisional application No. 62/746,487, filed on Oct. 16, 2018, provisional application No. 62/720,171, filed on Aug. 21, 2018, provisional application No. 62/716,507, filed on Aug. 9, 2018, provisional application No. 62/714,684, filed on Aug. 4, 2018, provisional application No. 62/703,025, filed on Jul. 25, 2018, provisional application No. 62/699,800, filed on Jul. 18, 2018, provisional application No. 62/695,124, filed on Jul. 8, 2018, provisional application No. 62/646,856, filed on Mar. 22, 2018, provisional application No. 62/638,087, filed on Mar. 3, 2018, provisional application No. 62/624,699, filed on Jan. 31, 2018, provisional application No. 62/646,856, filed on Mar. 22, 2018, provisional application No. 62/638,087, filed on Mar. 3, 2018, provisional application No. 62/624,699, filed on Jan. 31, 2018, provisional application No. 62/572,328, filed on Oct. 13, 2017, provisional application No. 62/563,798, filed on Sep.

(Continued)

(51) Int. Cl.
*G02B 27/01* (2006.01)
*G06T 19/00* (2011.01)
*F21V 8/00* (2006.01)

(52) U.S. Cl.
CPC ....... *G02B 27/0172* (2013.01); *G02B 6/0036* (2013.01); *G02B 6/0065* (2013.01); *G02B 6/0073* (2013.01); *G02B 6/0076* (2013.01); *G06T 19/006* (2013.01); *G02B 6/0086* (2013.01)

(58) Field of Classification Search
CPC ............. G02B 27/0172; G02B 6/0036; G02B 6/0065; G02B 6/0073; G02B 6/0076; G02B 6/0086; G06T 19/006
See application file for complete search history.

(56) References Cited

U.S. PATENT DOCUMENTS

| | | |
|---|---|---|
| 4,026,641 A | 5/1977 | Bosserman et al. |
| 5,696,521 A | 12/1997 | Robinson et al. |

(Continued)

*Primary Examiner* — Collin X Beatty

(57) ABSTRACT

This invention comprises novel optical structures for Augmented Reality (AR) eyewear which can potentially improve virtual image quality, reduce eyewear size, selectively mask environmental light, and enable multiple focal planes. An optical structure for AR eyewear can comprise an annular array of light-energy emitters around a lens in front of a person's eye, wherein the lens has a plurality of nested annular light guides. This optical structure can also include an array of selectively-movable light reflectors.

1 Claim, 59 Drawing Sheets

Related U.S. Application Data 27, 2017, provisional application No. 62/561,834, filed on Sep. 22, 2017, provisional application No. 62/528,331, filed on Jul. 3, 2017.

(56) References Cited

U.S. PATENT DOCUMENTS

| | | |
|---|---|---|
| 5,699,194 A | 12/1997 | Takahashi |
| 5,715,337 A | 2/1998 | Spitzer et al. |
| 5,724,463 A | 3/1998 | Deacon et al. |
| 5,854,697 A | 12/1998 | Caulfield et al. |
| 5,883,606 A | 3/1999 | Smoot |
| 5,886,822 A | 3/1999 | Spitzer |
| 5,943,171 A | 8/1999 | Budd et al. |
| 5,949,583 A | 9/1999 | Rallison et al. |
| 6,023,372 A | 2/2000 | Spitzer et al. |
| 6,091,546 A | 7/2000 | Spitzer |
| 6,201,629 B1 | 3/2001 | McClelland et al. |
| 6,204,974 B1 | 3/2001 | Spitzer |
| 6,222,677 B1 | 4/2001 | Budd et al. |
| 6,349,001 B1 | 2/2002 | Spitzer |
| 6,353,503 B1 | 3/2002 | Spitzer et al. |
| 6,356,392 B1 | 3/2002 | Spitzer |
| 6,384,982 B1 | 5/2002 | Spitzer |
| 6,396,639 B1 | 5/2002 | Togino et al. |
| 6,483,483 B2 | 11/2002 | Kosugi et al. |
| 6,522,794 B1 | 2/2003 | Bischel et al. |
| 6,538,799 B2 | 3/2003 | McClelland et al. |
| 6,559,813 B1 | 5/2003 | DeLuca et al. |
| 6,690,516 B2 | 2/2004 | Aritake et al. |
| 6,710,902 B2 | 3/2004 | Takeyama |
| 6,724,354 B1 | 4/2004 | Spitzer et al. |
| 6,829,095 B2 | 12/2004 | Amitai |
| 6,879,443 B2 | 4/2005 | Spitzer et al. |
| 6,999,238 B2 | 2/2006 | Glebov et al. |
| 7,009,757 B2 | 3/2006 | Nishioka et al. |
| 7,158,096 B1 | 1/2007 | Spitzer |
| 7,242,527 B2 | 7/2007 | Spitzer et al. |
| 7,245,440 B2 | 7/2007 | Peseux |
| 7,359,564 B2 | 4/2008 | Keam et al. |
| 7,391,573 B2 | 6/2008 | Amitai |
| 7,457,040 B2 | 11/2008 | Amitai |
| 7,542,209 B2 | 6/2009 | McGuire |
| 7,576,916 B2 | 8/2009 | Amitai |
| 7,577,326 B2 | 8/2009 | Amitai |
| 7,643,214 B2 | 1/2010 | Amitai |
| 7,672,055 B2 | 3/2010 | Amitai |
| 7,724,441 B2 | 5/2010 | Amitai |
| 7,724,442 B2 | 5/2010 | Amitai |
| 7,843,403 B2 | 11/2010 | Spitzer |
| 7,864,440 B2 | 1/2011 | Berge |
| 8,004,765 B2 | 8/2011 | Amitai |
| 8,189,263 B1 | 5/2012 | Wang et al. |
| 8,467,133 B2 | 6/2013 | Miller |
| 8,472,120 B2 | 6/2013 | Border et al. |
| 8,477,425 B2 | 7/2013 | Border et al. |
| 8,482,859 B2 | 7/2013 | Border et al. |
| 8,488,246 B2 | 7/2013 | Border et al. |
| 8,665,178 B1 | 3/2014 | Wang |
| 8,743,464 B1 | 6/2014 | Amirparviz |
| 8,760,762 B1 | 6/2014 | Kelly et al. |
| 8,848,289 B2 | 9/2014 | Amirparviz et al. |
| 8,873,148 B1 | 10/2014 | Gupta et al. |
| 8,917,453 B2 | 12/2014 | Bohn |
| 8,928,558 B2 | 1/2015 | Lewis et al. |
| 8,941,559 B2 | 1/2015 | Bar-Zeev et al. |
| 8,950,867 B2 | 2/2015 | MacNamara |
| 8,989,535 B2 | 3/2015 | Robbins |
| 9,057,826 B2 | 6/2015 | Gupta et al. |
| 9,091,850 B2 | 7/2015 | Miao et al. |
| 9,097,890 B2 | 8/2015 | Miller et al. |
| 9,097,891 B2 | 8/2015 | Border et al. |
| 9,110,504 B2 | 8/2015 | Lewis et al. |
| 9,116,337 B1 | 8/2015 | Miao |
| 9,122,053 B2 | 9/2015 | Geisner et al. |
| 9,128,281 B2 | 9/2015 | Osterhout et al. |
| 9,129,295 B2 | 9/2015 | Border et al. |
| 9,134,534 B2 | 9/2015 | Border et al. |
| 9,134,535 B2 | 9/2015 | Dobschal et al. |
| 9,182,596 B2 | 11/2015 | Border et al. |
| 9,223,134 B2 | 12/2015 | Miller et al. |
| 9,223,138 B2 | 12/2015 | Bohn |
| 9,229,227 B2 | 1/2016 | Border et al. |
| 9,244,277 B2 | 1/2016 | Cheng et al. |
| 9,274,338 B2 | 3/2016 | Robbins et al. |
| 9,285,591 B1 | 3/2016 | Gupta et al. |
| 9,286,730 B2 | 3/2016 | Bar-Zeev et al. |
| 9,292,973 B2 | 3/2016 | Bar-Zeev et al. |
| 9,304,003 B1 | 4/2016 | Ashman et al. |
| 9,304,319 B2 | 4/2016 | Bar-Zeev et al. |
| 9,310,559 B2 | 4/2016 | MacNamara |
| 9,323,325 B2 | 4/2016 | Perez et al. |
| 9,348,143 B2 | 5/2016 | Gao et al. |
| 9,368,546 B2 | 6/2016 | Fleck et al. |
| 9,372,347 B1 | 6/2016 | Levola et al. |
| 9,389,423 B2 | 7/2016 | Bhardwaj et al. |
| 9,417,452 B2 | 8/2016 | Schowengerdt et al. |
| 9,436,980 B2 | 9/2016 | Powell |
| 9,470,906 B2 | 10/2016 | Kaji et al. |
| 9,495,801 B2 | 11/2016 | Ebstyne et al. |
| 9,507,174 B2 | 11/2016 | Qin |
| 9,513,480 B2 | 12/2016 | Saarikko et al. |
| 9,515,238 B2 | 12/2016 | Maaskant et al. |
| 9,519,084 B1 | 12/2016 | Thomas |
| 9,535,253 B2 | 1/2017 | Levola et al. |
| 9,541,383 B2 | 1/2017 | Abovitz et al. |
| 9,547,174 B2 | 1/2017 | Gao et al. |
| 9,568,603 B2 | 2/2017 | Yahav et al. |
| 9,581,820 B2 | 2/2017 | Robbins |
| 9,588,341 B2 | 3/2017 | Bar-Zeev et al. |
| 9,612,403 B2 | 4/2017 | Abovitz et al. |
| 9,626,936 B2 | 4/2017 | Bell |
| 9,632,315 B2 | 4/2017 | Smith et al. |
| 9,651,368 B2 | 5/2017 | Abovitz et al. |
| 9,671,566 B2 | 6/2017 | Abovitz et al. |
| 9,671,615 B1 | 6/2017 | Vallius et al. |
| 9,684,174 B2 | 6/2017 | Fleck et al. |
| 9,690,099 B2 | 6/2017 | Bar-Zeev et al. |
| 9,720,228 B2 | 8/2017 | Harrison et al. |
| 9,726,891 B2 | 8/2017 | Webster et al. |
| 9,726,893 B2 | 8/2017 | Gao et al. |
| 9,727,132 B2 | 8/2017 | Liu et al. |
| 9,740,006 B2 | 8/2017 | Gao |
| 9,753,286 B2 | 9/2017 | Gao et al. |
| 9,766,464 B2 | 9/2017 | Poon et al. |
| 9,778,414 B2 | 10/2017 | Richards |
| 9,791,696 B2 | 10/2017 | Woltman et al. |
| 9,791,700 B2 | 10/2017 | Schowengerdt |
| 9,791,703 B1 | 10/2017 | Vallius et al. |
| 9,804,397 B2 | 10/2017 | Schowengerdt et al. |
| 9,823,474 B2 | 11/2017 | Evans et al. |
| 9,841,537 B2 | 12/2017 | Luebke et al. |
| 9,841,598 B2 | 12/2017 | Ouderkirk et al. |
| 9,841,601 B2 | 12/2017 | Schowengerdt |
| 9,846,306 B2 | 12/2017 | Schowengerdt |
| 9,846,967 B2 | 12/2017 | Schowengerdt |
| 9,851,478 B2 | 12/2017 | Price et al. |
| 9,857,170 B2 | 1/2018 | Abovitz et al. |
| 9,857,591 B2 | 1/2018 | Welch et al. |
| 9,885,870 B2 | 2/2018 | Stenberg et al. |
| 9,891,436 B2 | 2/2018 | Wall et al. |
| 9,897,811 B2 | 2/2018 | Martinez et al. |
| 9,904,058 B2 | 2/2018 | Yeoh et al. |
| 9,915,824 B2 | 3/2018 | Schowengerdt et al. |
| 9,915,825 B2 | 3/2018 | Robbins et al. |
| 9,915,826 B2 | 3/2018 | Tekolste et al. |
| 2001/0010598 A1 | 8/2001 | Aritake et al. |
| 2002/0167536 A1* | 11/2002 | Valdes ............ G01S 13/74 345/633 |
| 2003/0090439 A1 | 5/2003 | Spitzer et al. |
| 2004/0174610 A1 | 9/2004 | Aizenberg et al. |
| 2005/0174651 A1 | 8/2005 | Spitzer et al. |
| 2005/0248852 A1 | 11/2005 | Yamasaki |
| 2007/0103388 A1 | 5/2007 | Spitzer |
| 2008/0117341 A1 | 5/2008 | McGrew |

(56) References Cited

U.S. PATENT DOCUMENTS

| | | |
|---|---|---|
| 2008/0247722 A1 | 10/2008 | Van Gorkom et al. |
| 2008/0285140 A1 | 11/2008 | Amitai |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0161383 A1 | 6/2009 | Meir et al. |
| 2009/0213321 A1 | 8/2009 | Galstian et al. |
| 2010/0046070 A1 | 2/2010 | Mukawa |
| 2010/0149073 A1 | 6/2010 | Chaum et al. |
| 2010/0295987 A1 | 11/2010 | Berge |
| 2011/0221656 A1 | 9/2011 | Haddick et al. |
| 2011/0221657 A1 | 9/2011 | Haddick et al. |
| 2011/0221659 A1 | 9/2011 | King et al. |
| 2011/0221793 A1 | 9/2011 | King et al. |
| 2011/0227813 A1 | 9/2011 | Haddick et al. |
| 2012/0113092 A1 | 5/2012 | Bar-Zeev et al. |
| 2012/0162549 A1 | 6/2012 | Gao et al. |
| 2012/0200499 A1 | 8/2012 | Osterhout et al. |
| 2012/0200601 A1 | 8/2012 | Osterhout et al. |
| 2012/0212398 A1 | 8/2012 | Border et al. |
| 2012/0212399 A1 | 8/2012 | Border et al. |
| 2012/0212400 A1 | 8/2012 | Border et al. |
| 2012/0218172 A1 | 8/2012 | Border et al. |
| 2012/0218301 A1 | 8/2012 | Miller |
| 2012/0235883 A1 | 9/2012 | Border et al. |
| 2012/0235884 A1 | 9/2012 | Miller et al. |
| 2012/0235885 A1 | 9/2012 | Miller et al. |
| 2012/0235887 A1 | 9/2012 | Border et al. |
| 2012/0235900 A1 | 9/2012 | Border et al. |
| 2012/0236030 A1 | 9/2012 | Border et al. |
| 2012/0236031 A1 | 9/2012 | Haddick et al. |
| 2012/0242678 A1 | 9/2012 | Border et al. |
| 2012/0242697 A1 | 9/2012 | Border et al. |
| 2012/0242698 A1 | 9/2012 | Haddick et al. |
| 2012/0249797 A1 | 10/2012 | Haddick et al. |
| 2012/0326948 A1 | 12/2012 | Crocco et al. |
| 2013/0314793 A1 | 11/2013 | Robbins et al. |
| 2014/0003762 A1 | 1/2014 | MacNamara |
| 2014/0071539 A1 | 3/2014 | Gao |
| 2014/0098245 A1 | 4/2014 | Powell |
| 2014/0176528 A1 | 6/2014 | Robbins |
| 2014/0267420 A1 | 9/2014 | Schowengerdt et al. |
| 2015/0015814 A1 | 1/2015 | Qin |
| 2015/0016777 A1 | 1/2015 | Abovitz et al. |
| 2015/0103152 A1 | 4/2015 | Qin |
| 2015/0103306 A1 | 4/2015 | Kaji et al. |
| 2015/0124317 A1 | 5/2015 | MacNamara |
| 2015/0125109 A1 | 5/2015 | Robbins et al. |
| 2015/0177519 A1 | 6/2015 | Cakmakci et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0234184 A1 | 8/2015 | Schowengerdt et al. |
| 2015/0234190 A1 | 8/2015 | Schowengerdt |
| 2015/0234191 A1 | 8/2015 | Schowengerdt |
| 2015/0234205 A1 | 8/2015 | Schowengerdt |
| 2015/0234254 A1 | 8/2015 | Schowengerdt |
| 2015/0234476 A1 | 8/2015 | Schowengerdt et al. |
| 2015/0234477 A1 | 8/2015 | Abovitz et al. |
| 2015/0235088 A1 | 8/2015 | Abovitz et al. |
| 2015/0235370 A1 | 8/2015 | Abovitz et al. |
| 2015/0235417 A1 | 8/2015 | Schowengerdt et al. |
| 2015/0235418 A1 | 8/2015 | Schowengerdt |
| 2015/0235419 A1 | 8/2015 | Schowengerdt |
| 2015/0235420 A1 | 8/2015 | Schowengerdt |
| 2015/0235421 A1 | 8/2015 | Schowengerdt |
| 2015/0235430 A1 | 8/2015 | Schowengerdt et al. |
| 2015/0235431 A1 | 8/2015 | Schowengerdt |
| 2015/0235436 A1 | 8/2015 | Schowengerdt |
| 2015/0235437 A1 | 8/2015 | Schowengerdt |
| 2015/0235438 A1 | 8/2015 | Schowengerdt |
| 2015/0235439 A1 | 8/2015 | Schowengerdt |
| 2015/0235440 A1 | 8/2015 | Schowengerdt |
| 2015/0235441 A1 | 8/2015 | Abovitz et al. |
| 2015/0235442 A1 | 8/2015 | Schowengerdt |
| 2015/0235443 A1 | 8/2015 | Schowengerdt |
| 2015/0235444 A1 | 8/2015 | Schowengerdt |
| 2015/0235445 A1 | 8/2015 | Schowengerdt |
| 2015/0235446 A1 | 8/2015 | Schowengerdt |
| 2015/0235447 A1 | 8/2015 | Abovitz et al. |
| 2015/0235448 A1 | 8/2015 | Schowengerdt |
| 2015/0235449 A1 | 8/2015 | Schowengerdt et al. |
| 2015/0235450 A1 | 8/2015 | Schowengerdt et al. |
| 2015/0235451 A1 | 8/2015 | Schowengerdt et al. |
| 2015/0235452 A1 | 8/2015 | Schowengerdt et al. |
| 2015/0235453 A1 | 8/2015 | Schowengerdt et al. |
| 2015/0235454 A1 | 8/2015 | Schowengerdt |
| 2015/0235455 A1 | 8/2015 | Schowengerdt |
| 2015/0235456 A1 | 8/2015 | Schowengerdt |
| 2015/0235457 A1 | 8/2015 | Schowengerdt |
| 2015/0235458 A1 | 8/2015 | Schowengerdt et al. |
| 2015/0235459 A1 | 8/2015 | Schowengerdt |
| 2015/0235460 A1 | 8/2015 | Schowengerdt et al. |
| 2015/0235461 A1 | 8/2015 | Schowengerdt |
| 2015/0235462 A1 | 8/2015 | Schowengerdt |
| 2015/0235463 A1 | 8/2015 | Schowengerdt |
| 2015/0235464 A1 | 8/2015 | Schowengerdt |
| 2015/0235465 A1 | 8/2015 | Schowengerdt |
| 2015/0235466 A1 | 8/2015 | Schowengerdt |
| 2015/0235467 A1 | 8/2015 | Schowengerdt et al. |
| 2015/0235468 A1 | 8/2015 | Schowengerdt |
| 2015/0235469 A1 | 8/2015 | Schowengerdt |
| 2015/0235470 A1 | 8/2015 | Schowengerdt |
| 2015/0235471 A1 | 8/2015 | Schowengerdt |
| 2015/0235472 A1 | 8/2015 | Schowengerdt |
| 2015/0235473 A1 | 8/2015 | Schowengerdt |
| 2015/0235583 A1 | 8/2015 | Schowengerdt et al. |
| 2015/0241696 A1 | 8/2015 | Schowengerdt et al. |
| 2015/0241697 A1 | 8/2015 | Schowengerdt |
| 2015/0241698 A1 | 8/2015 | Schowengerdt |
| 2015/0241699 A1 | 8/2015 | Schowengerdt |
| 2015/0241700 A1 | 8/2015 | Schowengerdt |
| 2015/0241701 A1 | 8/2015 | Schowengerdt |
| 2015/0241702 A1 | 8/2015 | Schowengerdt |
| 2015/0241703 A1 | 8/2015 | Schowengerdt |
| 2015/0241704 A1 | 8/2015 | Schowengerdt et al. |
| 2015/0241705 A1 | 8/2015 | Abovitz et al. |
| 2015/0241706 A1 | 8/2015 | Schowengerdt |
| 2015/0241707 A1 | 8/2015 | Schowengerdt |
| 2015/0241959 A1 | 8/2015 | Abovitz et al. |
| 2015/0242575 A1 | 8/2015 | Abovitz et al. |
| 2015/0242943 A1 | 8/2015 | Abovitz et al. |
| 2015/0243088 A1 | 8/2015 | Schowengerdt et al. |
| 2015/0243089 A1 | 8/2015 | Schowengerdt |
| 2015/0243090 A1 | 8/2015 | Schowengerdt |
| 2015/0243091 A1 | 8/2015 | Schowengerdt |
| 2015/0243092 A1 | 8/2015 | Schowengerdt |
| 2015/0243093 A1 | 8/2015 | Schowengerdt |
| 2015/0243094 A1 | 8/2015 | Schowengerdt et al. |
| 2015/0243095 A1 | 8/2015 | Schowengerdt |
| 2015/0243096 A1 | 8/2015 | Schowengerdt |
| 2015/0243097 A1 | 8/2015 | Abovitz et al. |
| 2015/0243098 A1 | 8/2015 | Schowengerdt |
| 2015/0243099 A1 | 8/2015 | Schowengerdt |
| 2015/0243100 A1 | 8/2015 | Abovitz et al. |
| 2015/0243101 A1 | 8/2015 | Schowengerdt et al. |
| 2015/0243102 A1 | 8/2015 | Schowengerdt |
| 2015/0243103 A1 | 8/2015 | Schowengerdt |
| 2015/0243104 A1 | 8/2015 | Schowengerdt |
| 2015/0243105 A1 | 8/2015 | Abovitz et al. |
| 2015/0243106 A1 | 8/2015 | Abovitz et al. |
| 2015/0243107 A1 | 8/2015 | Schowengerdt |
| 2015/0247723 A1 | 9/2015 | Abovitz et al. |
| 2015/0247975 A1 | 9/2015 | Abovitz et al. |
| 2015/0247976 A1 | 9/2015 | Abovitz et al. |
| 2015/0248006 A1 | 9/2015 | Schowengerdt |
| 2015/0248010 A1 | 9/2015 | Schowengerdt |
| 2015/0248011 A1 | 9/2015 | Schowengerdt |
| 2015/0248012 A1 | 9/2015 | Schowengerdt |
| 2015/0248046 A1 | 9/2015 | Schowengerdt |
| 2015/0248158 A1 | 9/2015 | Schowengerdt |
| 2015/0248169 A1 | 9/2015 | Abovitz et al. |
| 2015/0248170 A1 | 9/2015 | Abovitz et al. |

(56) References Cited

U.S. PATENT DOCUMENTS

| | | |
|---|---|---|
| 2015/0248786 A1 | 9/2015 | Schowengerdt |
| 2015/0248787 A1 | 9/2015 | Abovitz et al. |
| 2015/0248788 A1 | 9/2015 | Abovitz et al. |
| 2015/0248789 A1 | 9/2015 | Abovitz et al. |
| 2015/0248790 A1 | 9/2015 | Schowengerdt |
| 2015/0248791 A1 | 9/2015 | Abovitz et al. |
| 2015/0248792 A1 | 9/2015 | Abovitz et al. |
| 2015/0248793 A1 | 9/2015 | Abovitz et al. |
| 2015/0260992 A1 | 9/2015 | Luttmann et al. |
| 2015/0268415 A1 | 9/2015 | Schowengerdt et al. |
| 2015/0277123 A1 | 10/2015 | Chaum et al. |
| 2015/0301599 A1 | 10/2015 | Miller |
| 2015/0302658 A1 | 10/2015 | O'Connor et al. |
| 2015/0309263 A2 | 10/2015 | Abovitz et al. |
| 2015/0309264 A1 | 10/2015 | Abovitz et al. |
| 2015/0309315 A1 | 10/2015 | Schowengerdt |
| 2015/0309316 A1 | 10/2015 | Osterhout et al. |
| 2015/0316982 A1 | 11/2015 | Miller |
| 2015/0319342 A1 | 11/2015 | Schowengerdt |
| 2015/0346490 A1 | 12/2015 | Tekolste et al. |
| 2015/0346495 A1 | 12/2015 | Welch et al. |
| 2016/0011419 A1 | 1/2016 | Gao |
| 2016/0109652 A1 | 4/2016 | Schowengerdt |
| 2016/0109705 A1 | 4/2016 | Schowengerdt |
| 2016/0109706 A1 | 4/2016 | Schowengerdt et al. |
| 2016/0109707 A1 | 4/2016 | Schowengerdt et al. |
| 2016/0109708 A1 | 4/2016 | Schowengerdt |
| 2016/0110912 A1 | 4/2016 | Schowengerdt |
| 2016/0110920 A1 | 4/2016 | Schowengerdt |
| 2016/0116739 A1 | 4/2016 | TeKolste et al. |
| 2016/0154245 A1 | 6/2016 | Gao et al. |
| 2016/0187654 A1 | 6/2016 | Border et al. |
| 2016/0219269 A1 | 7/2016 | Tekolste |
| 2016/0266387 A1 | 9/2016 | Tekolste et al. |
| 2016/0274362 A1 | 9/2016 | Tinch |
| 2016/0282625 A1 | 9/2016 | Fleck et al. |
| 2016/0286204 A1 | 9/2016 | Grata et al. |
| 2016/0291326 A1 | 10/2016 | Evans et al. |
| 2016/0292921 A1 | 10/2016 | Evans et al. |
| 2016/0295202 A1 | 10/2016 | Evans et al. |
| 2016/0320559 A1 | 11/2016 | Richards |
| 2016/0327789 A1 | 11/2016 | Klug et al. |
| 2016/0341575 A1 | 11/2016 | Kaehler |
| 2016/0341873 A1 | 11/2016 | Kaehler |
| 2016/0341967 A1 | 11/2016 | Kaji et al. |
| 2016/0370510 A1 | 12/2016 | Thomas |
| 2017/0010466 A1 | 1/2017 | Klug et al. |
| 2017/0010488 A1 | 1/2017 | Klug et al. |
| 2017/0023794 A1 | 1/2017 | MacNamara |
| 2017/0031163 A1 | 2/2017 | Gao et al. |
| 2017/0038579 A1 | 2/2017 | Yeoh et al. |
| 2017/0038589 A1 | 2/2017 | Jepsen |
| 2017/0038590 A1 | 2/2017 | Jepsen |
| 2017/0038591 A1 | 2/2017 | Jepsen |
| 2017/0038836 A1 | 2/2017 | Jepsen et al. |
| 2017/0039904 A1 | 2/2017 | Jepsen |
| 2017/0039905 A1 | 2/2017 | Jepsen et al. |
| 2017/0039907 A1 | 2/2017 | Jepsen |
| 2017/0053450 A1 | 2/2017 | Rodriguez et al. |
| 2017/0075110 A1 | 3/2017 | Thomas |
| 2017/0090194 A1 | 3/2017 | Hayes |
| 2017/0094265 A1 | 3/2017 | Mullins et al. |
| 2017/0097506 A1 | 4/2017 | Schowengerdt et al. |
| 2017/0097507 A1 | 4/2017 | Yeoh et al. |
| 2017/0102546 A1 | 4/2017 | Tempel et al. |
| 2017/0108697 A1 | 4/2017 | El-Ghoroury et al. |
| 2017/0115432 A1 | 4/2017 | Schmidtlin |
| 2017/0115491 A1 | 4/2017 | Shi et al. |
| 2017/0115689 A1 | 4/2017 | Liu |
| 2017/0116897 A1 | 4/2017 | Ahn et al. |
| 2017/0131460 A1 | 5/2017 | Lin et al. |
| 2017/0139209 A9 | 5/2017 | Evans et al. |
| 2017/0139211 A1 | 5/2017 | Trail |
| 2017/0139213 A1 | 5/2017 | Schmidtlin |
| 2017/0148215 A1 | 5/2017 | Aksoy et al. |
| 2017/0168302 A1 | 6/2017 | McDowall et al. |
| 2017/0168566 A1 | 6/2017 | Osterhout et al. |
| 2017/0171533 A1 | 6/2017 | Benitez et al. |
| 2017/0176753 A1 | 6/2017 | Shi et al. |
| 2017/0176755 A1 | 6/2017 | Cai et al. |
| 2017/0176818 A1 | 6/2017 | Shi et al. |
| 2017/0184776 A1 | 6/2017 | El-Ghoroury et al. |
| 2017/0184848 A1 | 6/2017 | Vallius |
| 2017/0185037 A1 | 6/2017 | Lee et al. |
| 2017/0192198 A1 | 7/2017 | Bristol et al. |
| 2017/0192240 A1 | 7/2017 | Drinkwater et al. |
| 2017/0199384 A1 | 7/2017 | Yeoh et al. |
| 2017/0199496 A1 | 7/2017 | Grata et al. |
| 2017/0205877 A1 | 7/2017 | Qin |
| 2017/0208297 A1 | 7/2017 | Yeoh et al. |
| 2017/0212351 A1 | 7/2017 | Schowengerdt et al. |
| 2017/0248750 A1 | 7/2017 | Curtis et al. |
| 2017/0223344 A1 | 8/2017 | Kaehler |
| 2017/0227771 A1 | 8/2017 | Sverdrup |
| 2017/0235126 A1 | 8/2017 | DiDomenico |
| 2017/0235143 A1 | 8/2017 | Chi et al. |
| 2017/0236463 A1 | 8/2017 | Chi et al. |
| 2017/0237974 A1 | 8/2017 | Samec et al. |
| 2017/0242255 A1 | 8/2017 | Border et al. |
| 2017/0248790 A1 | 8/2017 | Cheng |
| 2017/0251201 A1 | 8/2017 | Sissom et al. |
| 2017/0255015 A1 | 9/2017 | Geng et al. |
| 2017/0255016 A1 | 9/2017 | Tinch et al. |
| 2017/0264879 A1 | 9/2017 | Zhou |
| 2017/0269367 A1 | 9/2017 | Qin |
| 2017/0269368 A1 | 9/2017 | Yun et al. |
| 2017/0269369 A1 | 9/2017 | Qin |
| 2017/0270707 A1 | 9/2017 | Kass |
| 2017/0276948 A1 | 9/2017 | Welch et al. |
| 2017/0285347 A1 | 10/2017 | Cai et al. |
| 2017/0293141 A1 | 10/2017 | Schowengerdt et al. |
| 2017/0293145 A1 | 10/2017 | Miller et al. |
| 2017/0299864 A1 | 10/2017 | Vallius et al. |
| 2017/0307891 A1 | 10/2017 | Bucknor et al. |
| 2017/0316736 A1 | 11/2017 | Hughes et al. |
| 2017/0322419 A1 | 11/2017 | TeKolste et al. |
| 2017/0323615 A1 | 11/2017 | Hazra et al. |
| 2017/0329075 A1 | 11/2017 | Yeoh et al. |
| 2017/0329140 A1 | 11/2017 | Yeoh et al. |
| 2017/0336639 A1 | 11/2017 | Gao et al. |
| 2017/0343732 A1 | 11/2017 | Richards |
| 2017/0343820 A1 | 11/2017 | Osterhout |
| 2017/0344114 A1 | 11/2017 | Osterhout et al. |
| 2017/0358136 A1 | 12/2017 | Gollier et al. |
| 2017/0371159 A1 | 12/2017 | Yoon |
| 2017/0371184 A1 | 12/2017 | Shtukater |
| 2018/0039083 A1 | 2/2018 | Miller et al. |
| 2018/0039084 A1 | 2/2018 | Schowengerdt |
| 2018/0039106 A1 | 2/2018 | Alonso |
| 2018/0045965 A1 | 2/2018 | Schowengerdt |
| 2018/0045973 A1 | 2/2018 | Evans et al. |
| 2018/0045974 A1 | 2/2018 | Eash et al. |
| 2018/0045984 A1 | 2/2018 | Evans et al. |
| 2018/0045985 A1 | 2/2018 | Eash et al. |
| 2018/0048814 A1 | 2/2018 | Evans et al. |
| 2018/0048881 A1 | 2/2018 | Eash et al. |
| 2018/0048882 A1 | 2/2018 | Eash et al. |
| 2018/0052276 A1 | 2/2018 | Klienman et al. |
| 2018/0052277 A1 | 2/2018 | Schowengerdt et al. |
| 2018/0053284 A1 | 2/2018 | Rodriguez et al. |
| 2018/0061121 A1 | 3/2018 | Yeoh et al. |
| 2018/0061139 A1 | 3/2018 | Rodriguez et al. |
| 2018/0067318 A1 | 3/2018 | St. Hilaire |
| 2018/0067319 A1 | 3/2018 | Border et al. |
| 2018/0074318 A1 | 3/2018 | Wheelwright et al. |
| 2018/0074319 A1 | 3/2018 | Wheelwright et al. |
| 2018/0074320 A1 | 3/2018 | Wheelwright et al. |
| 2018/0074323 A1 | 3/2018 | Wheelwright et al. |
| 2018/0074324 A1 | 3/2018 | Wheelwright et al. |
| 2018/0074325 A1 | 3/2018 | Wheelwright et al. |

(56) References Cited

U.S. PATENT DOCUMENTS

2018/0074340 A1 3/2018 Robbins et al.
2018/0080803 A1 3/2018 Kaehler
2018/0082644 A1 3/2018 Bohn

* cited by examiner

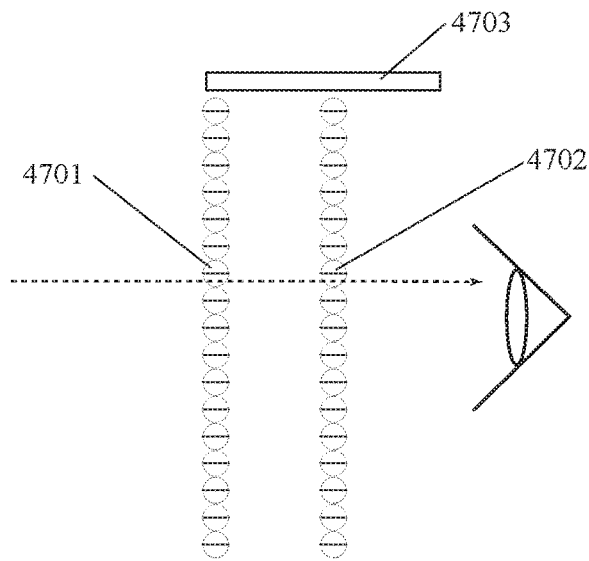
Fig. 47
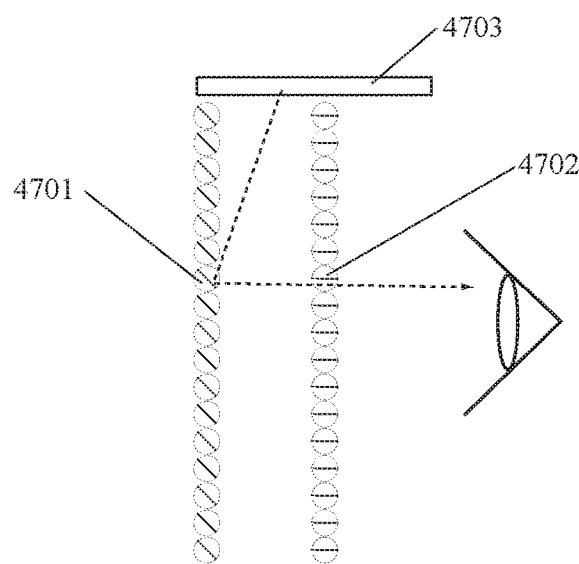 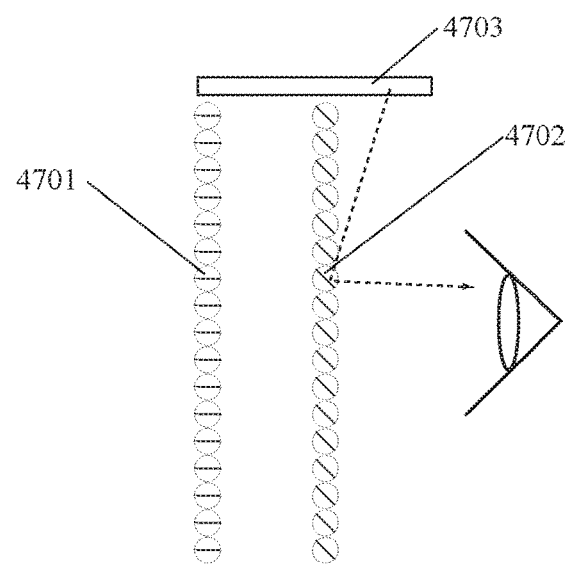
Fig. 48          Fig. 49

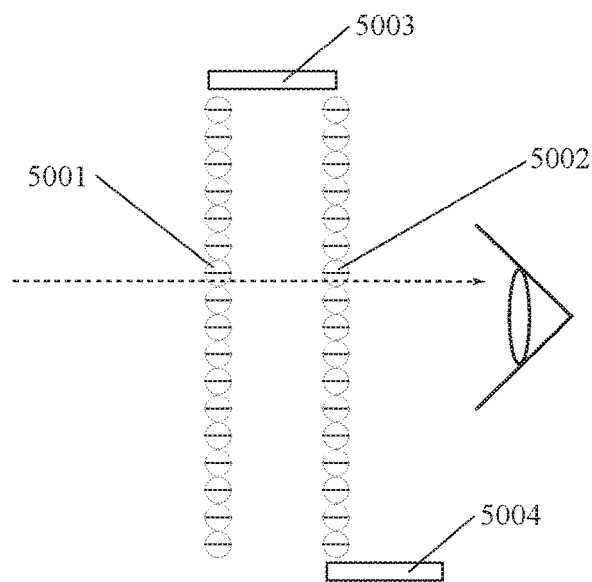
Fig. 50
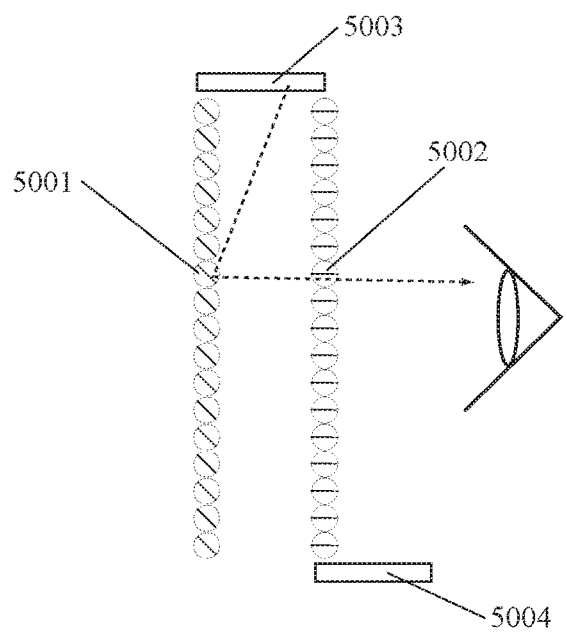 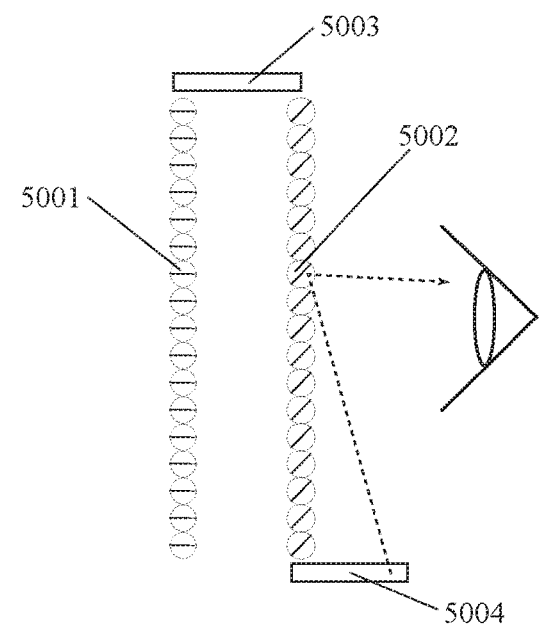
Fig. 51  Fig. 52

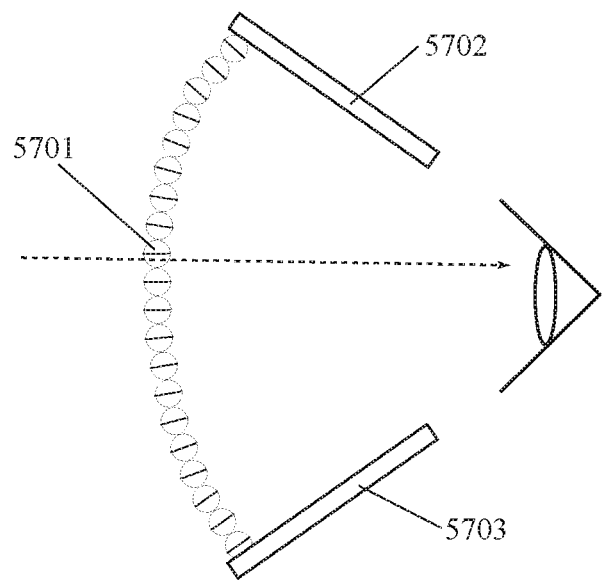
Fig. 57
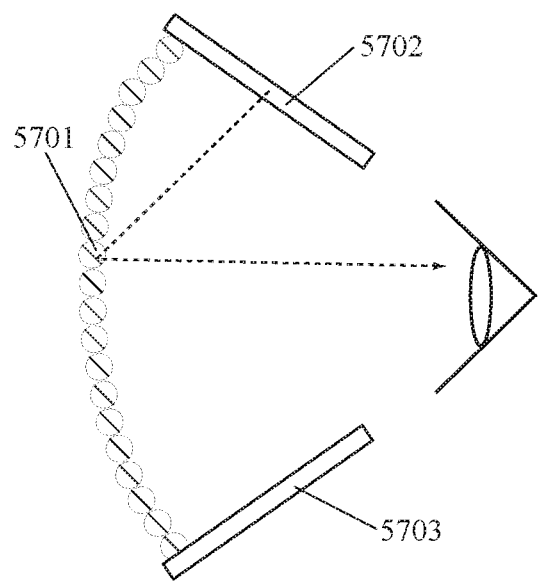 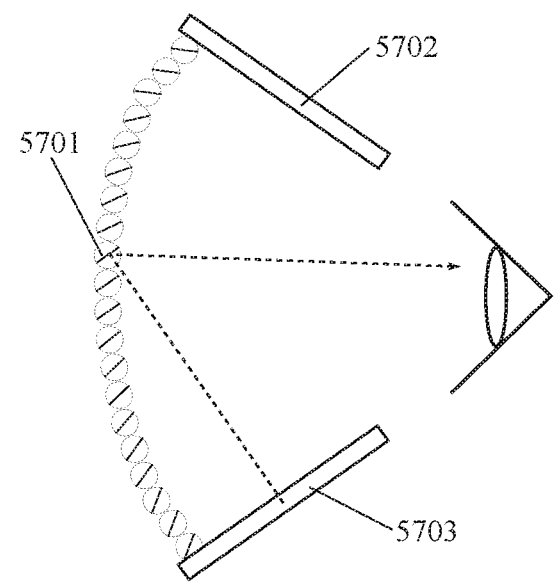
Fig. 58                Fig. 59

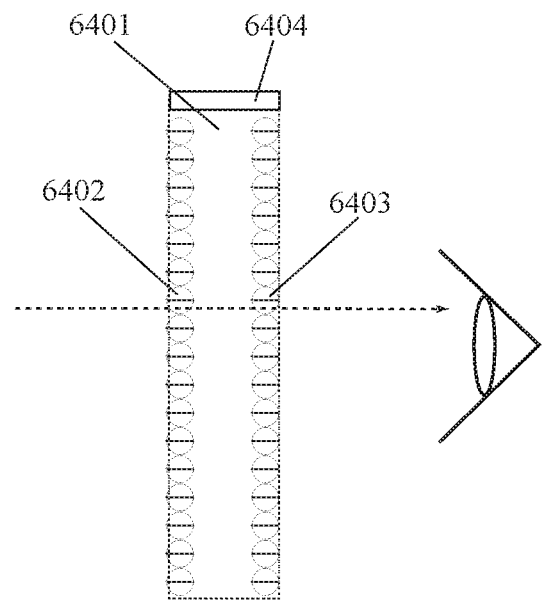
Fig. 64
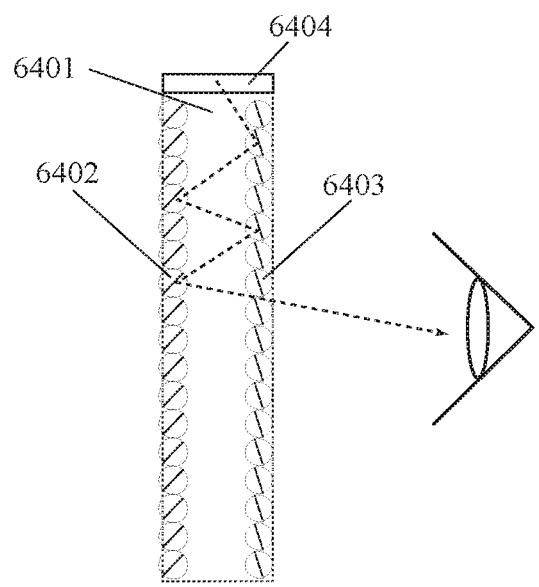 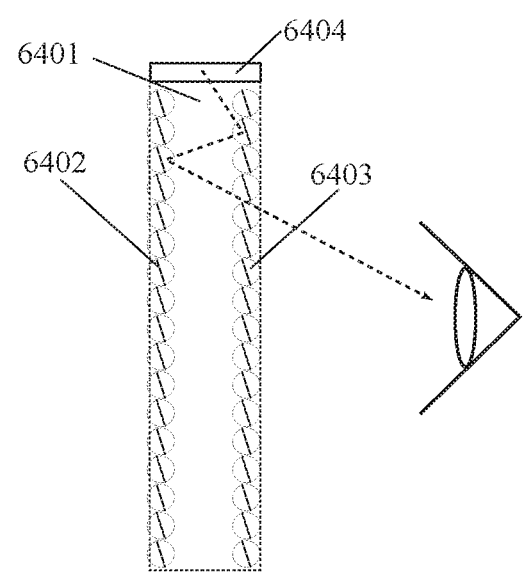
Fig. 65 Fig. 66

SPACE-EFFICIENT OPTICAL STRUCTURES FOR WIDE FIELD-OF-VIEW AUGMENTED REALITY (AR) EYEWEAR

CROSS-REFERENCE TO RELATED APPLICATIONS

This patent application:

claims the priority benefit of U.S. provisional patent application 62/751,076 by Robert A. Connor entitled "Smart Eyewear with Environment-Only Mode, Virtual Reality (VR) Mode, and Augmented Reality (AR) Mode" filed on Oct. 26, 2018;

claims the priority benefit of U.S. provisional patent application 62/749,775 by Robert A. Connor entitled "Optical Structures and Methods for Environmental Light Masking and Multiple Focal Planes in Augmented Reality (AR) Eyewear" filed on Oct. 24, 2018;

claims the priority benefit of U.S. provisional patent application 62/746,487 by Robert A. Connor entitled "Augmented Reality (AR) Eyewear with a Plurality of Nested Annular Light Guides" filed on Oct. 16, 2018;

claims the priority benefit of U.S. provisional patent application 62/720,171 by Robert A. Connor entitled "Bi-Ocular Optical Structures for Augmented Reality (AR) Eyewear" filed on Aug. 21, 2018;

claims the priority benefit of U.S. provisional patent application 62/716,507 by Robert A. Connor entitled "Augmented Reality (AR) Eyewear with Hybrid Internal/External-Reflection Optical Structures" filed on Aug. 9, 2018;

claims the priority benefit of U.S. provisional patent application 62/714,684 by Robert A. Connor entitled "Partially-Reflective, Multi-Focal, and Annular Optical Structures for Augmented Reality (AR) Eyewear" filed on Aug. 4, 2018;

claims the priority benefit of U.S. provisional patent application 62/703,025 by Robert A. Connor entitled "Arrays of Rotating Partially-Reflective Surfaces for Augmented Reality (AR) Eyewear" filed on Jul. 25, 2018;

claims the priority benefit of U.S. provisional patent application 62/699,800 by Robert A. Connor entitled "Optical Structures for Augmented Reality (AR) Eyewear with Two or More Virtual Image Displays per Eye" filed on Jul. 18, 2018;

claims the priority benefit of U.S. provisional patent application 62/695,124 by Robert A. Connor entitled "Movable and Annular Optical Structures for Augmented Reality (AR) Eyewear" filed on Jul. 8, 2018;

claims the priority benefit of U.S. provisional patent application 62/646,856 by Robert A. Connor entitled "Augmented Reality Eyewear with a Ventral-to-Dorsal Array of Light Emitters along an Eyewear Side Piece" filed on Mar. 22, 2018;

claims the priority benefit of U.S. provisional patent application 62/638,087 by Robert A. Connor entitled "Augmented Reality Eyewear with Volumetric Annular Photon Emission (VAPE) or Wear Technology" filed on Mar. 3, 2018;

claims the priority benefit of U.S. provisional patent application 62/624,699 by Robert A. Connor entitled "Augmented Reality Optics with Volumetric Annular Photon Emission (VAPE) or Wear Technology including a Fresnel Lens" filed on Jan. 31, 2018;

and is a Continuation-In-Part of U.S. patent application Ser. No. 15/942,498 by Robert A. Connor entitled "Augmented Reality Eyewear with VAPE or Wear Technology" filed on Mar. 31, 2018 which, in turn: claimed the priority benefit of U.S. provisional patent application 62/646,856 by Robert A. Connor entitled "Augmented Reality Eyewear with a Ventral-to-Dorsal Array of Light Emitters along an Eyewear Side Piece" filed on Mar. 22, 2018; claimed the priority benefit of U.S. provisional patent application 62/638,087 by Robert A. Connor entitled "Augmented Reality Eyewear with Volumetric Annular Photon Emission (VAPE) or Wear Technology" filed on Mar. 3, 2018; claimed the priority benefit of U.S. provisional patent application 62/624,699 by Robert A. Connor entitled "Augmented Reality Optics with Volumetric Annular Photon Emission (VAPE) or Wear Technology including a Fresnel Lens" filed on Jan. 31, 2018; claimed the priority benefit of U.S. provisional patent application 62/572,328 by Robert A. Connor entitled "Augmented Reality Eyewear with a Plurality of Reflective Moving Louvers" filed on Oct. 13, 2017; claimed the priority benefit of U.S. provisional patent application 62/563,798 by Robert A. Connor entitled "Augmented Reality Eyewear with VAPE or Wear Technology" filed on Sep. 27, 2017; claimed the priority benefit of U.S. provisional patent application 62/561,834 by Robert A. Connor entitled "Augmented Reality Eyewear with Electromagnetic Perturbation of a Flexible Optical Layer for Localized Occlusion of Environmental Light Rays" filed on Sep. 22, 2017; and claimed the priority benefit of U.S. provisional patent application 62/528,331 by Robert A. Connor entitled "Brainwave-Controlled Augmented Reality Eyewear" filed on Jul. 3, 2017.

The entire contents of these related applications are incorporated herein by reference.

FEDERALLY SPONSORED RESEARCH

Not Applicable

SEQUENCE LISTING OR PROGRAM

Not Applicable

BACKGROUND

Field of Invention

This invention relates to optical structures for augmented reality eyewear.

INTRODUCTION

Augmented Reality (AR) can allow a person to simultaneously see their environment and virtual objects displayed in their field of vision. Augmented reality can include simulated interactions between real objects in the environment and virtual objects. It can also include interactions between a person and virtual objects. Augmented reality has numerous potential applications in the fields of commerce and shopping, defense, diet and nutritional improvement, education, engineering, entertainment, exploration, gaming, interior design, maintenance, manufacturing, medicine, movies, navigation and transportation, public safety, socializing, and sports.

There has been considerable progress toward the creation of Augmented Reality (AR) eyewear which allows a person to see their environment and virtual objects displayed in their field of vision. However, challenges remain. There is currently a challenging tradeoff between the quality of virtual images displayed and the size of the eyewear. Some current AR eyewear devices display virtual images with relatively-good image quality and a relatively-large field of view, but are relatively large and bulky. Other current AR eyewear devices are relatively compact, but display virtual images with relatively-poor image quality and a relatively-small field of view.

REVIEW OF THE PRIOR ART

It can be challenging trying to classify prior art in this field into discrete categories. There is overlap and some prior art could be classified in multiple categories. However, classification of the prior art into discrete categories, even if imperfect, can be an invaluable part of reviewing the prior art. Towards this end, 25 categories of prior art related to augmented reality eyewear are identified and briefly discussed herein. For each category, specific examples of prior art (including patent or patent application number, inventor, publication date, and title) are provided. It is hoped that the reader will find this categorization and review of the prior art to be useful.

The 25 categories of art which are used for this review are as follows: 1) curved mirror, 2) mirror array, 3) beamsplitter, 4) selective environmental light blocking, 5) microprojector array, 6) pixel size variation, 7) multiple display areas, 8) scanning (moving) optical beam, 9) wedge-shaped optics, 10) microlens array, 11) Fresnel lens, 12) freeform optics, 13) waveguides with different beam angles, 14) waveguides with different wavelengths, 15) (total) internal reflection waveguide, 16) liquid crystal, 17) optical fiber, 18) variable-focus lens, 19) multiple focal planes, 20) polarized light, 21) collimated light, 22) holographic projection, 23) adjustable interpupillary distance, 24) eye/head movement tracking, and 25) other relevant technology.

1. Curved Mirror:

Light beams from one or more light emitters can be redirected by a curved mirror in order to create virtual objects in a person's field of vision. Augmented reality eyewear in the prior art which uses curved mirrors includes: U.S. Pat. No. 6,690,516 (Aritake et al., Feb. 10, 2004) and 20010010598 (Aritake et al., Aug. 2, 2001) "Head Mount Type Display Device"; 20180067319 (Border et al., Mar. 8, 2018) "Optical Configurations for Head-Worn See-Through Displays"; 20170242255 (Border et al., Aug. 24, 2017) "See-Through Computer Display Systems"; U.S. Pat. No. 9,134,534 (Border et al., Sep. 15, 2015) and 20120236030 (Border et al., Sep. 20, 2012) "See-Through Near-Eye Display Glasses Including a Modular Image Source"; 20120235887 (Border et al., Sep. 20, 2012) "See-Through Near-Eye Display Glasses Including a Partially Reflective, Partially Transmitting Optical Element and an Optically Flat Film"; and U.S. Pat. No. 4,026,641 (Bosserman et al., May 31, 1977) "Toric Reflector Display."

2. Mirror Array:

Light beams from one or more light emitters can be redirected by a mirror array (e.g. a moving micromirror array) in order to create virtual objects in a person's field of vision. Augmented reality eyewear in the prior art which uses mirror arrays includes: 20150248006 (Schowengerdt, Sep. 3, 2015) "Circular Diffractive Optical Elements for Augmented or Virtual Reality"; 20150235439 (Schowengerdt, Aug. 20, 2015) "Combining Display Elements Having Different Frame Rates and Bit Depths for Augmented or Virtual Reality"; 20150248046 (Schowengerdt, Sep. 3, 2015) "Controlling Diffractive Optical Elements for Augmented or Virtual Reality"; 20150235470 (Schowengerdt, Aug. 20, 2015) "Coupling a Plurality of Multicore Assemblies Polished at an Angle for Augmented or Virtual Reality"; 20150235472 (Schowengerdt, Aug. 20, 2015) "Delivering Light Beams at a Plurality of Angles for Augmented or Virtual Reality"; U.S. Pat. No. 9,841,601 (Schowengerdt, Dec. 12, 2017) and 20160110912 (Schowengerdt, Apr. 21, 2016) "Delivering Viewing Zones Associated with Portions of an Image for Augmented or Virtual Reality"; 20150243104 (Schowengerdt, Aug. 27, 2015) "Delivering Virtual Image Slices At Different Depth Planes for Augmented or Virtual Reality"; 20150235460 (Schowengerdt et al., Aug. 20, 2015) "Diffractive Optical Elements Used for Augmented or Virtual Reality"; 20180082644 (Bohn, Mar. 22, 2018) "Display Engines for Use with Optical Waveguides"; and 20150235473 (Schowengerdt, Aug. 20, 2015) "Displaying Augmented Reality or Virtual Reality Through a Substrate Coupled to the User's Eye."

Augmented reality eyewear with a mirror array also includes: 20150235457 (Schowengerdt, Aug. 20, 2015) "Driving Light Patterns to Exit Pupils for Augmented or Virtual Reality"; U.S. Pat. No. 8,189,263 (Wang et al., May 29, 2012) "Image Waveguide with Mirror Arrays"; 20150248010 (Schowengerdt, Sep. 3, 2015) "Inducing Phase Delays in a Multicore Assembly for Augmented or Virtual Reality"; 20150241696 (Schowengerdt et al., Aug. 27, 2015) "Inducing Phase Delays to Vary an Aggregate Wavefront for Augmented or Virtual Reality"; U.S. Pat. No. 6,538,799 (McClelland et al., Mar. 25, 2003) "Magnetically Actuated Torsional Micro-Mechanical Mirror System"; U.S. Pat. No. 9,310,559 (MacNamara, Apr. 12, 2016) and 20140003762 (MacNamara, Jan. 2, 2014) "Multiple Depth Plane Three-Dimensional Display Using a Wave Guide Reflector Array Projector"; 20150243094 (Schowengerdt et al., Aug. 27, 2015) "Producing an Aggregate Wavefront for Augmented or Virtual Reality"; U.S. Pat. No. 8,917,453 (Bohn, Dec. 23, 2014) "Reflective Array Waveguide"; 20150234254 (Schowengerdt, Aug. 20, 2015) "Separately Addressable Diffractive Optical Elements for Augmented or Virtual Reality"; U.S. Pat. No. 6,201,629 (McClelland et al., Mar. 13, 2001) "Torsional Micro-Mechanical Mirror System"; 20150235459 (Schowengerdt, Aug. 20, 2015) "Using an Eye Box for Augmented or Virtual Reality"; 20150248790 (Schowengerdt, Sep. 3, 2015) "Using Circularly-Symmetric Diffractive Optical Elements for Augmented or Virtual Reality"; 20150235421 (Schowengerdt, Aug. 20, 2015) "Using MEMS Louvers to Change an Angle of Light for Augmented or Virtual Reality"; and U.S. Pat. No. 8,743,464 (Amirparviz, Jun. 3, 2014) "Waveguide with Embedded Mirrors."

3. Beamsplitter:

A beamsplitter (or other semi-reflective surface) can be used to make light rays from an environmental object and light rays comprising a virtual object appear to come from the same location in a person's field of vision. Augmented reality eyewear in the prior art with a beamsplitter (or other semi-reflective surface) includes: 20120200499 (Osterhout et al., Aug. 9, 2012) "AR Glasses with Event, Sensor, and User Action Based Control of Applications Resident on External Devices with Feedback"; 20150309316 (Osterhout et al., Oct. 29, 2015), 20170168566 (Osterhout et al., Jun. 15, 2017) and 20170344114 (Osterhout et al., Nov. 30, 2017) "AR Glasses with Predictive Control of External Device Based on Event Input"; 20120200601 (Osterhout et al., Aug. 9, 2012) "AR Glasses with State Triggered Eye Control Interaction with Advertising Facility"; 20170285347 (Cai et al., Oct. 5, 2017) "Augmented/Virtual Reality Near-Eye Displays with Edge Imaging Lens Comprising a Plurality of Display Devices"; U.S. Pat. No. 9,285,591 (Gupta et al., Mar. 15, 2016) "Compact Architecture for Near-To-Eye Display System"; U.S. Pat. No. 7,542,209 (McGuire, Jun. 2, 2009) "Compact Head Mounted Display Devices with Tilted/Decentered Lens Element"; U.S. Pat. No. 9,091,850 (Miao et al., Jul. 28, 2015) "Compact See-Through Display System"; U.S. Pat. No. 6,483,483 (Kosugi et al., Nov. 19, 2002) "Eyeglasses Type Image Display Apparatus"; and U.S. Pat. No. 9,128,281 (Osterhout et al., Sep. 8, 2015) "Eyepiece with Uniformly Illuminated Reflective Display."

Augmented reality eyewear with a beamsplitter (or other semi-reflective surface) also includes: U.S. Pat. No. 5,886,822 (Spitzer, Mar. 23, 1999) "Image Combining System for Eyeglasses and Face Masks"; U.S. Pat. No. 9,726,891 (Webster et al., Aug. 8, 2017) "Left and Right Eye Optical Paths with Shared Optical Element for Head-Mounted Display Device"; 20020167536 (Valdes et al., Nov. 14, 2002) "Method, System and Device for Augmented Reality"; 20150235454 (Schowengerdt, Aug. 20, 2015) "Providing Augmented or Virtual Reality Using Transmissive Beamsplitters"; 20150177519 (Cakmakci et al., Jun. 25, 2015) "See-Through Eyepiece for Head Wearable Display"; U.S. Pat. No. 8,477,425 (Border et al., Jul. 2, 2013) and 20120212398 (Border et al., 823/2012) "See-Through Near-Eye Display Glasses Including a Partially Reflective, Partially Transmitting Optical Element"; U.S. Pat. No. 8,482,859 (Border et al., Jul. 9, 2013) and 20120212399 (Border et al., Aug. 23, 2012) "See-Through Near-Eye Display Glasses Wherein Image Light Is Transmitted to and Reflected from an Optically Flat Film"; and U.S. Pat. No. 9,057,826 (Gupta et al., Jun. 16, 2015) "See-Through Near-To-Eye Display with Eye Prescription."

4. Selective Environmental Light Blocking:

One of the challenges in augmented reality is that projected virtual objects generally appear dim and transparent relative to environmental objects. This can be addressed by blocking or otherwise modifying light from the environment in a person's field of vision in the area where a virtual object is projected. Methods to address this include selectively-blocking environmental light in the area of a projected virtual object or surrounding a virtual object with a virtual "halo." Augmented reality eyewear with selective blocking or other modification of environmental light (in the area of a projected virtual object) includes: 20110221793 (King et al., Sep. 15, 2011) "Adjustable Display Characteristics in an Augmented Reality Eyepiece"; U.S. Pat. No. 9,547,174 (Gao et al., Jan. 17, 2017), U.S. Pat. No. 9,726,893 (Gao et al., Aug. 8, 2017) and 20170031163 (Gao et al., Feb. 2, 2017) "Apparatus for Optical See-Through Head Mounted Display with Mutual Occlusion and Opaqueness Control Capability"; 20150241700 (Schowengerdt, Aug. 27, 2015) "Attenuating Outside Light for Augmented or Virtual Reality"; 20110227813 (Haddick et al., Sep. 22, 2011) "Augmented Reality Eyepiece with Secondary Attached Optic for Surroundings Environment Vision Correction"; 20150302658 (O'Connor et al., Oct. 22, 2015) "Compensating for Ambient Light in Augmented or Virtual Reality Systems"; U.S. Pat. No. 9,626,936 (Bell, Apr. 18, 2017) "Dimming Module for Augmented and Virtual Reality"; 20170270707 (Kass, Sep. 21, 2017) "Direct Light Compensation Technique for Augmented Reality System"; 20170039907 (Jepsen, Feb. 9, 2017) "Display with a Tunable Mask for Augmented Reality"; U.S. Pat. No. 9,904,058 (Yeoh et al., Feb. 27, 2018) and 20170329140 (Yeoh et al., Nov. 16, 2017) "Distributed Light Manipulation Over Imaging Waveguide"; 20120326948 (Crocco et al., Dec. 27, 2012) "Environmental-Light Filter for See-Through Head-Mounted Display Device"; U.S. Pat. No. 5,943,171 (Budd et al., Aug. 24, 1999) "Head Mounted Displays Utilizing Reflection Light Valves"; and U.S. Pat. No. 9,389,423 (Bhardwaj et al., Jul. 12, 2016) "Head Wearable Display with Adjustable Transparency."

Augmented reality eyewear with selective modification of environmental light also includes: 20170168302 (McDowall et al., Jun. 15, 2017) "Head-Mounted Augmented Reality Display"; 20150241702 (Schowengerdt, Aug. 27, 2015) "Lens Array Operatively Coupled to a Spatial Light Modulator for Augmented or Virtual Reality"; U.S. Pat. No. 7,359,564 (Keam et al., Apr. 15, 2008) "Method and System for Cancellation of Ambient Light Using Light Frequency"; 20170323615 (Hazra et al., Nov. 9, 2017) "Methods and Apparatus for Active Transparency Modulation"; 20160109652 (Schowengerdt, Apr. 21, 2016) "Modifying Light of a Multicore Assembly to Produce a Plurality of Viewing Zones"; 20150248786 (Schowengerdt, Sep. 3, 2015) "Modulating Light Intensity to Enable Viewing of Dark Virtual Objects"; U.S. Pat. No.8,941,559 (Bar-Zeev et al., Jan. 27, 2015) and U.S. Pat. No. 9,286,730 (Bar-Zeev et al., Mar. 15, 2016) "Opacity Filter for Display Device"; U.S. Pat. No. 9,851,478 (Price et al., Dec. 26, 2017) "Optical Cross Talk Mitigation for Optical Device Having Disrupting Features Formed on a Shield"; U.S. Pat. No. 9,223,138 (Bohn, Dec. 29, 2015) "Pixel Opacity for Augmented Reality"; U.S. Pat. No. 9,122,053 (Geisner et al., Sep. 1, 2015) "Realistic Occlusion for a Head Mounted Augmented Reality Display"; 20150243099 (Schowengerdt, Aug. 27, 2015) "Rendering a Halo Around Virtual Objects for Displaying Augmented or Virtual Reality"; 20150243103 (Schowengerdt, Aug. 27, 2015) "Rendering Dark Virtual Objects as Blue to Facilitate Viewing Augmented or Virtual Reality"; 20150243102 (Schowengerdt, Aug. 27, 2015) "Rendering Visual Emphasis Proximate to Virtual Objects for Augmented or Virtual Reality"; and 20170343820 (Osterhout, Nov. 30, 2017) "See-Through Computer Display Systems."

Augmented reality eyewear with selective modification of environmental light also includes: U.S. Pat. No. 9,097,891 (Border et al., Aug. 4, 2015) and 20120242678 (Border et al., Sep. 27, 2012) "See-Through Near-Eye Display Glasses Including an Auto-Brightness Control for the Display Brightness Based on the Brightness in the Environment"; U.S. Pat. No. 9,129,295 (Border et al., Sep. 8, 2015) and 20120235900 (Border et al., Sep. 20, 2012) "See-Through Near-Eye Display Glasses with a Fast Response Photochromic Film System for Quick Transition from Dark to Clear"; 20150243097 (Schowengerdt, Aug. 27, 2015) "Selective Attenuation of Outside Light in an Augmented or Virtual Reality Device"; U.S. Pat. No. 6,559,813 (DeLuca et al., May 6, 2003) "Selective Real Image Obstruction in a Virtual Reality Display Apparatus and Method"; 20150241699 (Schowengerdt, Aug. 27, 2015) "Selectively Attenuating Light From the Outside World for Augmented or Virtual Reality"; 20170090194 (Hayes, Mar. 30, 2017) "System and Method for Subtractive Augmented Reality and Display Contrast Enhancement"; U.S. Pat. No. 8,950,867 (MacNamara, Feb. 10, 2015), 20150124317 (MacNamara, May 7, 2015) and 20170023794 (MacNamara, Jan. 26, 2017) "Three Dimensional Virtual and Augmented Reality Display System"; 20150319342 (Schowengerdt, Nov. 5, 2015) "Using a Halo to Facilitate Viewing Dark Virtual Objects in Augmented or Virtual Reality"; 20160109706 (Schowengerdt et al., Apr. 21, 2016) "Using a Plurality of Stacked Waveguides for Augmented or Virtual Reality Display"; 20150243098 (Schowengerdt, Aug. 27, 2015) "Using an Array of Spatial Light Modulators for Selective Attenuation"; 20150241703 (Schowengerdt, Aug. 27, 2015) "Using Spatial Light Modulators to Selectively Attenuate Light From an Outside Environment for Augmented or Virtual Reality"; and 20150205126 (Schowengerdt, Jul. 23, 2015) "Virtual and Augmented Reality Systems and Methods."

5. Microprojector Array:

A microprojector array can be used to selectively direct beams of light comprising a virtual object in a person's field of vision. Augmented reality eyewear in the prior art with microprojector arrays includes: 20150235468 (Schowengerdt, Aug. 20, 2015) "Coupling Optical Elements to an Array of Microprojectors for Augmented or Virtual Reality"; 20150235444 (Schowengerdt, Aug. 20, 2015) "Methods and System for Using Microprojectors for Augmented or Virtual Reality"; 20160109708 (Schowengerdt, Apr. 21, 2016) "Projecting Images to a Waveguide Through Microprojectors for Augmented or Virtual Reality"; 20150235440 (Schowengerdt, Aug. 20, 2015) "Providing Augmented Reality Using Microprojectors"; and 20150243090 (Schowengerdt, Aug. 27, 2015) "Using Polished Microprojectors for Augmented or Virtual Reality."

6. Pixel Size Variation:

Augmented reality eyewear with variation in pixel size includes: 20150235463 (Schowengerdt, Aug. 20, 2015) "Modulating a Size of Pixels Displayed to a User for Augmented or Virtual Reality"; 20150243092 (Schowengerdt, Aug. 27, 2015) "Pixel Size Modulation for Augmented or Virtual Reality"; and 20150243089 (Schowengerdt, Aug. 27, 2015) "Varying Pixel Size Based on Line Pitch for Augmented or Virtual Reality."

7. Multiple Display Areas:

Having multiple display areas allows flexibility in the creation of virtual objects in a person's field of vision. Augmented reality eyewear in the prior art with multiple display areas includes: 20170116897 (Ahn et al., Apr. 27, 2017) "Image Display Device and Method Using Unidirectional Beam"; 20150277123 Chaum et al., Oct. 1, 2015) "Nearto Eye Display and Appliance"; 20100149073 (Chaum et al., Jun. 17, 2010) "Nearto Eye Display System and Appliance"; 20160292921 (Evans et al., Oct. 6, 2016) "System, Apparatus, and Method for Displaying an Image Using Light of Varying Intensities"; and 20170176755 (Cai et al., Jun. 22, 2017) "Systems and Methods for Augmented Near-Eye Wearable Displays."

8. Scanning (Moving) Optical Beam:

Scanning (e.g. moving) projected beams of light over a lens, beamsplitter, or other optical member in a person's field of vision can enable flexibility in the creation of virtual objects. Augmented reality eyewear in the prior art with a scanning (e.g. moving) optical element includes: 20150248789 (Abovitz et al., Sep. 3, 2015) "Augmented Reality System Totems and Methods of Using Same"; 20170038579 (Yeoh et al., Feb. 9, 2017) "Collimating Fiber Scanner Design with Inward Pointing Angles in Virtual/Augmented Reality System"; U.S. Pat. No. 5,715,337 (Spitzer et al., Feb. 3, 1998) "Compact Display System"; 20150234477 (Abovitz et al., Aug. 20, 2015) "Method and System for Determining User Input Based on Gesture"; 20150243100 (Abovitz et al., Aug. 27, 2015) "Method and System for Determining User Input Based on Totem"; 20150243106 (Abovitz et al., Aug. 27, 2015) "Method and System for Enhancing Job Performance Using an Augmented Reality System"; 20150242575 (Abovitz et al., Aug. 27, 2015) "Method and System for Facilitating Rehabilitation Using an Augmented Reality System"; 20150248793 (Abovitz et al., Sep. 3, 2015) "Method and System for Facilitating Surgery Using an Augmented Reality System"; 20150242943 (Abovitz et al., Aug. 27, 2015) "Method and System for Generating a Retail Experience Using an Augmented Reality System"; and 20150248169 (Abovitz et al., Sep. 3, 2015) "Method and System for Generating a Virtual User Interface Related to a Physical Entity."

Augmented reality eyewear with a scanning optical element also includes: 20150248170 (Abovitz et al., Sep. 3, 2015) "Method and System for Generating a Virtual User Interface Related to a Totem"; 20150235447 (Abovitz et al., Aug. 20, 2015) "Method and System for Generating Map Data From an Image"; 20150248791 (Abovitz et al., Sep. 3, 2015) "Method and System for Generating Virtual Rooms"; 20150235370 (Abovitz et al., Aug. 20, 2015) "Method and System for Identifying a User Location"; 20150235088 (Abovitz et al., Aug. 20, 2015) "Method and System for Inserting Recognized Object Data Into a Virtual World"; 20150243105 (Abovitz et al., Aug. 27, 2015) "Method and System for Interacting with User Interfaces"; 20150248792 (Abovitz et al., Sep. 3, 2015) "Method and System for Modifying Display of a Sporting Event Using an Augmented Reality System"; 20150247723 (Abovitz et al., Sep. 3, 2015) "Method and System for Obtaining Texture Data of a Space"; 20150235441 (Abovitz et al., Aug. 20, 2015) "Method and System for Rendering Virtual Content"; 20150248788 (Abovitz et al., Sep. 3, 2015) "Method and System for Retrieving Data in Response to User Activity"; 20150248787 (Abovitz et al., Sep. 3, 2015) "Method and System for Retrieving Data in Response to User Input"; 20150241959 (Abovitz et al., Aug. 27, 2015) "Method and System for Updating a Virtual World"; and 20170097506 (Schowengerdt et al., Apr. 6, 2017) "Microlens Collimator for Scanning Optical Fiber in Virtual/Augmented Reality System."

Augmented reality eyewear with a scanning optical element also includes: 20150222884 (Cheng, Aug. 6, 2015) "Multi-Focal Display System and Method"; U.S. Pat. No. 9,541,383 (Abovitz et al., Jan. 10, 2017) and 20150247975 (Abovitz et al., Sep. 3, 2015) "Optical System Having a Return Planar Waveguide"; U.S. Pat. No. 9,651,368 (Abovitz et al., May 16, 2017) and 20150247976 (Abovitz et al., Sep. 3, 2015) "Planar Waveguide Apparatus Configured to Return Light Therethrough"; U.S. Pat. No. 9,857,170 (Abovitz et al., Jan. 2, 2018) and 20150241705 (Abovitz et al., Aug. 27, 2015) "Planar Waveguide Apparatus Having a Plurality of Diffractive Optical Elements"; U.S. Pat. No. 9,612,403 (Abovitz et al., Apr. 4, 2017), U.S. Pat. No. 9,671,566 (Abovitz et al., Jun. 6, 2017), 20150016777 (Abovitz et al., Jan. 15, 2015), 20150309263 (Abovitz et al., Oct. 29, 2015) and 20150309264 (Abovitz et al., Oct. 29, 2015) "Planar Waveguide Apparatus with Diffraction Element(s) and System Employing Same"; 20170208297 (Yeoh et al., Jul. 20, 2017) "Polarizing Maintaining Optical Fiber in Virtual/Augmented Reality System"; 20170236463 (Chi et al., Aug. 17, 2017) "Scanned Micro LED Array for Waveguide Display"; 20150268415 (Schowengerdt et al., Sep. 24, 2015) "Ultra-High Resolution Scanning Fiber Display"; 20150243096 (Schowengerdt, Aug. 27, 2015) "Using a Fiber Scanning Display to Present a Lightfield to a User"; 20170097507 (Yeoh et al., Apr. 6, 2017) "Virtual/Augmented Reality System Having Reverse Angle Diffraction Grating"; and 20170235143 (Chi et al., Aug. 17, 2017) "Waveguide Display with Two-Dimensional Scanner."

9. Wedge-Shaped Optics:

A wedge-shaped optical member (e.g. prism or lens) can direct beams of light from a first location which is peripheral to (e.g. to the side of) a person's eye to a second location which is in front of the person's eye. Augmented reality eyewear in the prior art with a wedge-shaped optical member includes: U.S. Pat. No. 8,665,178 (Wang, Mar. 4, 2014)

"Partially-Reflective Waveguide Stack and Heads-Up Display Using Same"; U.S. Pat. No. 9,436,980 (Powell, Sep. 6, 2016) and 20140098245 (Powell, Apr. 10, 2014) "Reducing Ghosting and Other Image Artifacts in a Wedge-Based Imaging System"; U.S. Pat. No. 8,467,133 (Miller, Jun. 18, 2013) and 20120218301 (Miller, Aug. 30, 2012) "See-Through Display with an Optical Assembly Including a Wedge-Shaped Illumination System"; U.S. Pat. No. 9,229,227 (Border et al., Jan. 5, 2016), 20120235883 (Border et al., Sep. 20, 2012) and 20160187654 (Border et al., Jun. 30, 2016) "See-Through Near-Eye Display Glasses with a Light Transmissive Wedge Shaped Illumination System"; 20150235442 (Schowengerdt, Aug. 20, 2015) "Using Wedge-Shaped Waveguides for Augmented or Virtual Reality"; and U.S. Pat. No. 9,244,277 (Cheng et al., Jan. 26, 2016) "Wide Angle and High Resolution Tiled Head-Mounted Display Device."

10. Microlens Array

A microlens array can selectively direct beams of light from (an array of) light emitters in order to create virtual objects in a person's field of vision. Augmented reality eyewear in the prior art with a microlens array includes: U.S. Pat. No. 9,720,228 (Harrison et al., Aug. 1, 2017) "Collimating Display with Pixel Lenses"; 20170139213 (Schmidtlin, May 18, 2017) "Combination Prism Array for Focusing Light"; 20170139211 (Trail, May 18, 2017) "Directed Display Architecture"; 20170038591 (Jepsen, Feb. 9, 2017) "Display with a Tunable Pinhole Array for Augmented Reality"; 20170038590 (Jepsen, Feb. 9, 2017) "Enhanced Pixel Resolution Through Non-Uniform Ocular Projection"; U.S. Pat. No. 5,883,606 (Smoot, Mar. 16, 1999) "Flat Virtual Displays for Virtual Reality"; U.S. Pat. No. 9,368,546 (Fleck et al., Jun. 14, 2016), U.S. Pat. No. 9,684,174 (Fleck et al., Jun. 20, 2017) and 20160282625 (Fleck et al., Sep. 29, 2016) "Imaging Structure with Embedded Light Sources"; 20170171533 (Benitez et al., Jun. 15, 2017) "Immersive Compact Display Glasses"; 20170371159 (Yoon, Dec. 28, 2017) "Lens Assembly with Multiple Lenses for Relaying Images"; 20170115432 (Schmidtlin, Apr. 27, 2017) "Microlens Array System with Multiple Discrete Magnification"; 20170269367 (Qin, Sep. 21, 2017) "Microlens Array-Based Near-Eye Display (NED)"; 20170205877 (Qin, Jul. 20, 2017) "Near-Eye Microlens Array Display Having Diopter Detection Device"; U.S. Pat. No. 9,841,537 (Luebke et al., Dec. 12, 2017) "Near-Eye Microlens Array Displays"; 20170039905 (Jepsen et al., Feb. 9, 2017) "Optical System for Retinal Projection from Near-Ocular Display"; 20150241701 (Schowengerdt, Aug. 27, 2015) "Pinhole Array Operatively Coupled to a Spatial Light Modulator for Augmented or Virtual Reality"; 20170039904 (Jepsen, Feb. 9, 2017) "Tile Array for Near-Ocular Display"; 20170269369 (Qin, Sep. 21, 2017) "Transmissive Augmented Reality Near-Eye Display"; and U.S. Pat. No. 6,999,238 (Glebov et al., Feb. 14, 2006) "Tunable Micro-Lens Array."

11. Fresnel Lens

A Fresnel lens can be used to redirect light beams from a lateral location to a central location for projection into a person's eye for the creation of virtual objects in the person's field of vision. Augmented reality eyewear in the prior art with a Fresnel lens includes: U.S. Pat. No. 9,134,535 (Dobschal et al., Sep. 15, 2015) "Display Device Having a Holding Device That Can Be Placed on the Head of a User"; 20180074320 (Wheelwright et al., Mar. 15, 2018) "Dynamic Draft for Fresnel Lenses"; 20170199496 (Grata et al., Jul. 13, 2017) "Dynamic Fresnel Projector"; 20180074323 (Wheelwright et al., Mar. 15, 2018) "Fresnel Lens with Dynamic Draft for Reduced Optical Artifacts"; 20180074324 (Wheelwright et al., Mar. 15, 2018) "Fresnel Lens with Dynamic Draft for Variable Gaze"; 20180074325 (Wheelwright et al., Mar. 15, 2018) "Fresnel Lens with Dynamic Pitch"; U.S. Pat. No. 9,632,315 (Smith et al., Apr. 25, 2017) "Head-Mounted Display Apparatus Employing One or More Fresnel Lenses"; U.S. Pat. No. 5,949,583 (Rallison et al., Sep. 7, 1999) "Head-Mounted Display with Image Generator, Fold Mirror and Mirror for Transmission to the Eye Position of the User"; 20180074319 (Wheelwright et al., Mar. 15, 2018) "Hybrid Fresnel Lens with Increased Field of View"; 20180074318 (Wheelwright et al., Mar. 15, 2018) "Hybrid Fresnel Lens with Reduced Artifacts"; and U.S. Pat. No. 9,519,084 (Thomas, Dec. 13, 2016), 20160370510 (Thomas, Dec. 22, 2016) and 20170075110 (Thomas, Mar. 16, 2017) "Securing a Fresnel Lens to a Refractive Optical Element."

12. Freeform Optics

Augmented reality eyewear in the prior art with freeform optical structures for creating virtual objects in a person's field of vision includes: 20110221659 (King et al., Sep. 15, 2011) "Augmented Reality Eyepiece with Freeform Optic, Image Source, and Optical Display"; 20150235418 (Schowengerdt, Aug. 20, 2015) "Determining User Accommodation to Display an Image at a Desired Focal Distance Using Freeform Optics"; 20150243107 (Schowengerdt, Aug. 27, 2015) "Displaying Augmented or Virtual Reality Through Freeform Optics"; U.S. Pat. No. 9,348,143 (Gao et al., May 24, 2016), U.S. Pat. No. 9,740,006 (Gao, Aug. 22, 2017), U.S. Pat. No. 9,753,286 (Gao et al., Sep. 5, 2017), 20120162549 (Gao et al., Jun. 28, 2012), 20140071539 (Gao, Mar. 13, 2014), 20160154245 (Gao et al., Jun. 2, 2016) and 20170336639 (Gao et al., Nov. 23, 2017) "Ergonomic Head Mounted Display Device and Optical System"; 20160011419 (Gao, Jan. 14, 2016) "Methods and Systems for Displaying Stereoscopy with a Freeform Optical System with Addressable Focus for Virtual and Augmented Reality"; 20150241707 (Schowengerdt, Aug. 27, 2015) "Modifying Light Using Freeform Optics for Augmented or Virtual Reality"; 20150248012 (Schowengerdt, Sep. 3, 2015) "Stacked Configuration of Freeform Optics for Augmented or Virtual Reality"; U.S. Pat. No. 9,804,397 (Schowengerdt et al., Oct. 31, 2017) "Using a Freeform Reflective and Lens Optical Component for Augmented or Virtual Reality Display"; 20150234191 (Schowengerdt, Aug. 20, 2015) "Using Freeform Optical Elements to Display Augmented or Virtual Reality"; and 20150309315 (Schowengerdt, Oct. 29, 2015) "Using Freeform Optics for Augmented or Virtual Reality."

13. Waveguides with Different Beam Angles

Augmented reality eyewear can employ multiple waveguides which direct beams of light at different angles in order to create virtual objects in a person's field of vision. Such augmented reality eyewear in the prior art includes: 20150235462 (Schowengerdt, Aug. 20, 2015) "Generating a Lightfield Using a Plurality of Spatial Light Modulators"; 20170316736 (Hughes et al., Nov. 2, 2017) "Sub-Pixel for a Display with Controllable Viewing Angle"; 20150235438 (Schowengerdt, Aug. 20, 2015) "Using a Display Assembly for Augmented or Virtual Reality"; 20150241704 (Schowengerdt et al., Aug. 27, 2015) "Using a Plurality of Waveguides Coupled with Edge Reflectors for Augmented or Virtual Reality"; 20150235461 (Schowengerdt, Aug. 20, 2015) "Using an Array of Spatial Light Modulators to Generate a Lightfield"; 20150235448 (Schowengerdt, Aug. 20, 2015) "Using Multiple Exit Pupils to Transmit Light Into a User's Pupil for Augmented or Virtual Reality"; U.S. Pat. No. 9,791,700 (Schowengerdt, Oct. 17, 2017) "Virtual and Augmented Reality Systems and Methods"; and 20150235458 (Schowengerdt et al., Aug. 20, 2015) "Waveguide Assembly Having Reflective Layers for Augmented or Virtual Reality."

14. Waveguides with Different Wavelengths

Augmented reality eyewear can employ multiple waveguides which direct beams of light with different wavelengths in order to create virtual objects in a person's field of vision. Such augmented reality eyewear in the prior art includes: 20160116739 (TeKolste et al., Apr. 28, 2016) and 20170322419 (TeKolste et al., Nov. 9, 2017) "Architectures and Methods for Outputting Different Wavelength Light Out of Waveguides"; 20170010466 (Klug et al., Jan. 12, 2017) "Display System with Optical Elements for In-Coupling Multiplexed Light Streams"; U.S. Pat. No. 9,671,615 (Vallius et al., Jun. 6, 2017) "Extended Field of View in Near-Eye Display Using Wide-Spectrum Imager"; 20160274362 (Tinch, Sep. 22, 2016) "Light Combiner for Augmented Reality Display Systems"; 20180052277 (Schowengerdt et al., Feb. 22, 2018) "Multi-Layer Diffractive Eyepiece"; 20170255016 (Tinch et al., Sep. 27, 2017) "Reflective Switching Device for Inputting Different Wavelengths of Light into Waveguides"; 20170212351 (Schowengerdt et al., Jul. 27, 2017) "Virtual and Augmented Reality Systems and Methods Having Unequal Numbers of Component Color Images Distributed Across Depth Planes"; and 20170329075 (Yeoh et al., Nov. 16, 2017) "Wavelength Multiplexing in Waveguides."

15. (Total) Internal Reflection Waveguide

Waveguides with (total) internal reflection are increasingly used in augmented reality eyewear. A common application of (total) internal reflection waveguides is to guide beams of light from a location which is peripheral relative to a person's eye to a location which is in front of the eye, from which it is redirected into the eye. Augmented reality eyewear in the prior art with (total) internal reflection waveguides includes: 20140176528 (Robbins, Jun. 26, 2014) "Auto-Stereoscopic Augmented Reality Display"; U.S. Pat. No. 6,204,974 (Spitzer, Mar. 20, 2001), U.S. Pat. No. 6,356,392 (Spitzer, Mar. 12, 2002) and U.S. Pat. No. 6,384,982 (Spitzer, May 7, 2002) "Compact Image Display System for Eyeglasses or Other Head-Borne Frames"; U.S. Pat. No. 7,158,096 (Spitzer, Jan. 2, 2007), 7843403 (Spitzer, Nov. 30, 2010) and 20070103388 (Spitzer, May 10, 2007) "Compact, Head-Mountable Display Device with Suspended Eyepiece Assembly"; U.S. Pat. No. 9,897,811 (Martinez et al., Feb. 20, 2018) "Curved Eyepiece with Color Correction for Head Wearable Display"; U.S. Pat. No. 9,372,347 (Levola et al., Jun. 21, 2016) "Display System"; 20170248750 (Curtis et al., Jul. 31, 2017) "Display System Having a Plurality of Light Pipes for a Plurality of Light Emitters"; 20160341575 (Kaehler, Nov. 24, 2016) and 20180080803 (Kaehler, Mar. 22, 2018) "Dual Composite Light Field Device"; 20170108697 (El-Ghoroury et al., Apr. 20, 2017) "Dual-Mode Augmented/Virtual Reality (AR/VR) Near-Eye Wearable Displays"; U.S. Pat. No. 6,353,503 (Spitzer et al., Mar. 5, 2002) "Eyeglass Display Lens System Employing Off-Axis Optical Design"; U.S. Pat. No. 8,873,148 (Gupta et al., Oct. 28, 2014) "Eyepiece Having Total Internal Reflection Based Light Folding"; 20150260992 (Luttmann et al., Sep. 17, 2015) "Eyepiece with Switchable Reflector for Head Wearable Display"; 20150125109 (Robbins et al., May 7, 2015) "Grating Configurations for a Tiled Waveguide Display"; and U.S. Pat. No. 9,097,890 (Miller et al., Aug. 4, 2015) and 20120235885 (Miller et al., Sep. 20, 2012) "Grating in a Light Transmissive Illumination System for See-Through Near-Eye Display Glasses."

Augmented reality eyewear with (total) internal reflection waveguides also includes: 20100046070 (Mukawa, Feb. 25, 2010) "Head-Mounted Display"; U.S. Pat. No. 6,724,354 (Spitzer et al., Apr. 20, 2004) "Illumination Systems for Eyeglass and Facemask Display Systems"; 20160341873 (Kaehler, Nov. 24, 2016) "Illuminator"; U.S. Pat. No. 5,699,194 (Takahashi, Dec. 16, 1997) "Image Display Apparatus Comprising an Internally Reflecting Ocular Optical System"; U.S. Pat. No. 9,274,338 (Robbins et al., Mar. 1, 2016) "Increasing Field of View of Reflective Waveguide"; U.S. Pat. No. 7,457,040 (Amitai, Nov. 25, 2008), U.S. Pat. No. 7,576,916 (Amitai, Aug. 18, 2009), U.S. Pat. No. 7,724,441 (Amitai, May 25, 2010), U.S. Pat. No. 8,004,765 (Amitai, Aug. 23, 2011), 20090052046 (Amitai, Feb. 26, 2009) and 20090097127 (Amitai, Apr. 16, 2009) "Light Guide Optical Device"; 20170251201 (Sissom et al., Aug. 31, 2017) "Light Output System with Reflector and Lens for Highly Spatially Uniform Light Output"; U.S. Pat. No. 6,023,372 (Spitzer et al., Feb. 8, 2000) "Light Weight, Compact Remountable Electronic Display Device for Eyeglasses or Other Head-Borne Eyewear Frames"; 20030090439 (Spitzer et al., May 15, 2003) "Light Weight, Compact, Remountable Face-Supported Electronic Display"; U.S. Pat. No. 7,577,326 (Amitai, Aug. 18, 2009) "Optical Device for Light Coupling"; U.S. Pat. No. 9,223,134 (Miller et al., Dec. 29, 2015) and 20120235884 (Miller et al., Sep. 20, 2012) "Optical Imperfections in a Light Transmissive Illumination System for See-Through Near-Eye Display Glasses"; U.S. Pat. No. 7,242,527 (Spitzer et al., Jul. 10, 2007) "Optical System Using Total Internal Reflection Images"; 20160327789 (Klug et al., Nov. 10, 2016) "Separated Pupil Optical Systems for Virtual and Augmented Reality and Methods for Displaying Images Using Same"; and 20090052047 (Amitai, Feb. 26, 2009) "Substrate-Guided Imaging Lens."

Augmented reality eyewear with (total) internal reflection waveguides also includes: U.S. Pat. No. 6,829,095 (Amitai, Dec. 7, 2004) "Substrate-Guided Optical Beam Expander"; 20090122414 (Amitai, May 14, 2009) "Substrate-Guided Optical Device Utilizing Thin Transparent Layer"; U.S. Pat. No. 7,643,214 (Amitai, Jan. 5, 2010) "Substrate-Guided Optical Device with Wide Aperture"; U.S. Pat. No. 7,391,573 (Amitai, Jun. 24, 2008), U.S. Pat. No. 7,672,055 (Amitai, Mar. 2, 2010) and 20080285140 (Amitai, Nov. 20, 2008) "Substrate-Guided Optical Devices"; 20170293141 (Schowengerdt et al., Oct. 12, 2017) "Systems and Methods for Augmented Reality"; 20080117341 (McGrew, May 22, 2008) "Traveling Lens for Video Display"; U.S. Pat. No. 6,396,639 (Togino et al., May 28, 2002) "Viewing Optical System and Image Display Apparatus Using the Same"; 20170248790 (Cheng, Aug. 31, 2017) "Virtual and Augmented Reality Systems and Methods"; 20180067318 (St. Hilaire, Mar. 8, 2018) "Virtual Reality, Augmented Reality, and Mixed Reality Systems Including Thick Media and Related Methods"; U.S. Pat. No. 9,513,480 (Saarikko et al., Dec. 6, 2016) "Waveguide"; 20080247722 (Van Gorkom et al., Oct. 9, 2008) "Waveguide and Lighting Device"; 20090161383 (Meir et al., Jun. 25, 2009) "Waveguide Sheet Containing In-Coupling, Propagation, and Out-Coupling Regions"; U.S. Pat. No. 9,891,436 (Wall et al., Feb. 13, 2018) "Waveguide-Based Displays with Anti-Reflective and Highly-Reflective Coating"; U.S. Pat. No. 9,915,825 (Robbins et al., Mar. 13, 2018) "Waveguides with Embedded Components to Improve Intensity Distributions"; and U.S. Pat. No. 9,791,703 (Vallius et al., Oct. 17, 2017) and 20170299864 (Vallius et al., Oct. 19, 2017) "Waveguides with Extended Field of View."

16. Liquid Crystal

Liquid crystal technology, including Liquid Crystal Displays (LCDs), is used in augmented reality eyewear to modify beams of light in order to create virtual objects in a person's field of vision. Augmented reality eyewear in the prior art which uses such liquid crystal technology includes: U.S. Pat. No. 6,222,677 (Budd et al., Apr. 24, 2001) "Compact Optical System for Use in Virtual Display Applications"; U.S. Pat. No. 9,885,870 (Stenberg et al., Feb. 6, 2018) "Diffractive Optical Elements with Analog Modulations and Switching"; 20180039106 (Alonso, Feb. 8, 2018) "Electronic Liquid Crystal Lenses"; 20170176818 (Shi et al., Jun. 22, 2017) "Enhanced Spatial Resolution Using a Segmented Electrode Array"; 20050248852 (Yamasaki, Nov. 10, 2005) "Head-Mounted Display Apparatus"; 20170115491 (Shi et al., Apr. 27, 2017) "Liquid Crystal Half-Wave Plate Lens"; 20120242698 (Haddick et al., Sep. 27, 2012) "See-Through Near-Eye Display Glasses with a Multi-Segment Processor-Controlled Optical Layer"; U.S. Pat. No. 5,696,521 (Robinson et al., Dec. 9, 1997) "Video Headset"; 20170010488 (Klug et al., Jan. 12, 2017) "Virtual and Augmented Reality Systems and Methods"; U.S. Pat. No. 9,791,696 (Woltman et al., Oct. 17, 2017) "Waveguide Gratings to Improve Intensity Distributions"; and 20170176753 (Shi et al., Jun. 22, 2017) "Wide Angle Beam Steering in Sunglasses for Virtual Reality and Augmented Reality."

17. Optical Fiber

Optical fibers can be used in augmented reality eyewear as optical pathways to direct beams of light to selected locations in order to create virtual objects in a person's field of vision. Augmented reality eyewear which uses optical fibers includes: 20150235464 (Schowengerdt, Aug. 20, 2015) "Coupling a Lens to an Optical Fiber for Augmented or Virtual Reality Displays"; 20150243091 (Schowengerdt, Aug. 27, 2015) "Coupling Phase Modulators to Optical Fibers for Augmented or Virtual Reality"; U.S. Pat. No. 9,778,414 (Richards, Oct. 3, 2017), 20160320559 (Richards, Nov. 3, 2016) and 20170343732 (Richards, Nov. 30, 2017) "Curved Electronic Display Element"; 20150235471 (Schowengerdt, Aug. 20, 2015) "Delivering Light Beams Through Optical Fiber Cores At a Plurality of Angles for Augmented or Virtual Reality"; 20150241698 (Schowengerdt, Aug. 27, 2015) "Methods and Systems to Use Multicore Fibers for Augmented or Virtual Reality"; 20150241697 (Schowengerdt, Aug. 27, 2015) "Physical Actuators Coupled to Optical Fiber Cores for Augmented or Virtual Reality"; 20150235465 (Schowengerdt, Aug. 20, 2015) "Polishing an Array of Optical Fibers at an Angle to Deliver Augmented or Virtual Reality Images"; U.S. Pat. No. 9,846,306 (Schowengerdt, Dec. 19, 2017) "Using a Plurality of Optical Fibers for Augmented or Virtual Reality Display"; and 20150235466 (Schowengerdt, Aug. 20, 2015) "Using Optical Fibers to Deliver Multiple Depth Planes for Augmented or Virtual Reality."

18. Variable-Focus Lens

The configurations of variable-focus lenses can be changed in order to change their focal distances. This can be useful for changing the focal distance of a virtual object in augmented reality eyewear to reduce vergence-accommodation conflict. Augmented reality eyewear in the prior art with variable-focus lenses includes: 20150235583 (Schowengerdt et al., Aug. 20, 2015) "Adjusting Pixels to Compensate for Spacing in Augmented or Virtual Reality Systems"; 20170293145 (Miller et al., Oct. 12, 2017) "Augmented Reality Systems and Methods with Variable Focus Lens Elements"; U.S. Pat. No. 9,304,319 (Bar-Zeev et al., Apr. 5, 2016) "Automatic Focus Improvement for Augmented Reality Displays"; U.S. Pat. No. 9,292,973 (Bar-Zeev et al., Mar. 22, 2016), U.S. Pat. No. 9,588,341 (Bar-Zeev et al., Mar. 7, 2017) and 20120113092 (Bar-Zeev et al., May 10, 2012) "Automatic Variable Virtual Focus for Augmented Reality Displays"; 20180048882 (Eash et al., Feb. 15, 2018) "Binocular Display with Digital Light Path Length Modulation"; U.S. Pat. No. 9,915,824 (Schowengerdt et al., Mar. 13, 2018); 20160109707 (Schowengerdt et al., Apr. 21, 2016) "Combining at Least One Variable Focus Element with a Plurality of Stacked Waveguides for Augmented or Virtual Reality Display"; 20110221656 (Haddick et al., Sep. 15, 2011) "Displayed Content Vision Correction with Electrically Adjustable Lens"; and 20170358136 (Gollier et al., Dec. 14, 2017) "Focus Adjusting Virtual Reality Headset."

Augmented reality eyewear with variable-focus lenses also includes: 20100295987 (Berge, Nov. 25, 2010) "Image Stabilization Circuitry for Liquid Lens"; 20040174610 (Aizenberg et al., Sep. 9, 2004) "Lenses with Tunable Liquid Optical Elements"; 20150235420 (Schowengerdt, Aug. 20, 2015) "Method for Displaying Multiple Depth Planes Through Variable Focus Elements"; U.S. Pat. No. 9,857,591 (Welch et al., Jan. 2, 2018) and 20150346495 (Welch et al., Dec. 3, 2015) "Methods and System for Creating Focal Planes in Virtual and Augmented Reality"; 20150235419 (Schowengerdt, Aug. 20, 2015) "Methods and Systems for Displaying Multiple Depth Planes Through a Variable Focus Element"; 20160110920 (Schowengerdt, Apr. 21, 2016) "Modifying a Focus of Virtual Images Through a Variable Focus Element"; 20150235445 (Schowengerdt, Aug. 20, 2015) "Modulating a Depth of Focus of a Plurality of Pixels Displayed to a User"; 20150222883 (Welch, Aug. 6, 2015) "Multi-Focal Display System and Method"; and 20180048881 (Eash et al., Feb. 15, 2018) "Near-Eye Display System Including a Modulation Stack."

Augmented reality eyewear with variable-focus lenses also includes: U.S. Pat. No. 7,864,440 (Berge, Jan. 4, 2011) "Optical Lens with Variable Focal length"; 20110221657 (Haddick et al., Sep. 15, 2011) "Optical Stabilization of Displayed Content with a Variable Lens"; U.S. Pat. No. 7,009,757 (Nishioka et al., Mar. 7, 2006) "Optimal Elements (Such as Vari-Focal Lens Component, Vari-Focal Diffractive Optical Element and Variable Declination Prism) and Electronic Image Pickup Unit Using Optical Elements"; U.S. Pat. No. 9,507,174 (Qin, Nov. 29, 2016) and 20150015814 (Qin, Jan. 15, 2015) "Spatial Focal Field Type Glasses Display"; 20160295202 (Evans et al., Oct. 6, 2016) "System, Apparatus, and Method for Displaying an Image Using Focal Modulation"; 20090213321 (Galstian et al., Aug. 27, 2009) "Tunable Liquid Lens with Reduced Aberration"; 20150243088 (Schowengerdt et al., Aug. 27, 2015) "Using a Variable Focus Element Coupled to a Waveguide to Create Multiple Depth Planes"; U.S. Pat. No. 7,245,440 (Peseux, Jul. 17, 2007) "Variable Focal Lens"; U.S. Pat. No. 9,846,967 (Schowengerdt, Dec. 19, 2017) and 20150235431 (Schowengerdt, Aug. 20, 2015) "Varying a Focus Through a Variable Focus Element Based on User Accommodation"; and 20130314793 (Robbins et al., Nov. 28, 2013) "Waveguide Optics Focus Elements."

19. Multiple Focal Planes

One of the challenges in augmented reality eyewear is vergence-accommodation conflict. One way to address this conflict is to create multiple depth planes (e.g. multiple focal planes) for the perception of virtual objects in a person's field of vision. There is some overlap between this category and the variable-focus lenses in the prior category. Augmented reality eyewear in the prior art with multiple depth planes (e.g. multiple focal planes) includes: 20150248011 (Schowengerdt, Sep. 3, 2015) "Delivering Virtual Images of Different Portions of the User's Pupil for Augmented or Virtual Reality"; 20150243093 (Schowengerdt, Aug. 27, 2015) "Determining User Accommodation to Display an Image at a Desired Focal Plane Using Diffractive Optical Elements"; 20150235437 (Schowengerdt, Aug. 20, 2015) "Determining User Accommodation to Display an Image at a Focal Plane Corresponding to a User's Current State of Focus"; 20160219269 (Tekolste, Jul. 28, 2016) "Methods and System for Creating Focal Planes Using an Alvarez Lens"; 20150243101 (Schowengerdt et al., Aug. 27, 2015) "Modifying a Curvature of Light Rays to Produce Multiple Depth Planes"; 20170237974 (Samec et al., Aug. 17, 2017) "Multi-Depth Plane Display System with Reduced Switching Between Depth Planes"; 20160109705 (Schowengerdt, Apr. 21, 2016) "Providing Variable Depth Planes Through Arrays of Reflectors"; 20150234190 (Schowengerdt, Aug. 20, 2015) "Using Blurring to Create Multiple Depth Planes for Augmented or Virtual Reality"; 20170053450 (Rodriguez et al., Feb. 23, 2017), 20170276948 (Welch et al., Sep. 28, 2017), 20180039084 (Schowengerdt, Feb. 8, 2018) and 20180061139 (Rodriguez et al., Mar. 1, 2018) "Virtual and Augmented Reality Systems and Methods"; and 20150235467 (Schowengerdt et al., Aug. 20, 2015) "Waveguide Assembly to Display Images at Multiple Focal Planes."

20. Polarized Light

Polarized light can be used to selectively block and/or redirect beams of light in order to create virtual objects in a person's field of vision. Augmented reality eyewear in the prior art which uses light polarization includes: 20170184848 (Vallius, Jun. 29, 2017) "Augmented Reality Display System with Variable Focus"; 20180045984 (Evans et al., Feb. 15, 2018) "Digital Light Path Length Modulation"; 20180045985 (Eash et al., Feb. 15, 2018) "Digital Light Path Length Modulation Systems"; U.S. Pat. No. 9,535,253 (Levola et al., Jan. 3, 2017) "Display System"; 20170255015 (Geng et al., Sep. 7, 2017) "Field Curvature Corrected Display"; 20120249797 (Haddick et al., Oct. 4, 2012) "Head-Worn Adaptive Display"; 20180048814 (Evans et al., Feb. 15, 2018) "Image Capture with Digital Light Path Length Modulation"; U.S. Pat. No. 8,760,762 (Kelly et al., Jun. 24, 2014) "Image Waveguide Utilizing Two Mirrored or Polarized Surfaces"; U.S. Pat. No. 9,841,598 (Ouderkirk et al., Dec. 12, 2017) "Lens with Embedded Multilayer Optical Film for Near-Eye Display Systems"; 20180045973 (Evans et al., Feb. 15, 2018) "Method and Apparatus for an Optical Path Length Extender"; 20150235456 (Schowengerdt, Aug. 20, 2015) "Modulating a Polarization of Light for Augmented or Virtual Reality"; U.S. Pat. No. 8,989,535 (Robbins, Mar. 24, 2015) and U.S. Pat. No. 9,581,820 (Robbins, Feb. 28, 2017) "Multiple Waveguide Imaging Structure"; U.S. Pat. No. 8,848,289 (Amirparviz et al., Sep. 30, 2014) "Near-To-Eye Display with Diffractive Lens"; and 20170269368 (Yun et al., Sep. 21, 2017) "Optical Stack and Optical System."

Augmented reality eyewear with polarized light also includes: 20180045974 (Eash et al., Feb. 15, 2018) "Orthogonal Optical Path Length Extender"; U.S. Pat. No. 9,766,464 (Poon et al., Sep. 19, 2017) "Reducing Ghost Images"; U.S. Pat. No. 8,488,246 (Border et al., Jul. 16, 2013) and 20120212400 (Border et al., Aug. 23, 2012) "See-Through Near-Eye Display Glasses Including a Curved Polarizing Film in the Image Source, a Partially Reflective, Partially Transmitting Optical Element and an Optically Flat Film"; U.S. Pat. No. 8,472,120 (Border et al., Jun. 25, 2013) and 20120218172 (Border et al., Aug. 30, 2012) "See-Through Near-Eye Display Glasses with a Small Scale Image Source"; U.S. Pat. No. 9,182,596 (Border et al., Nov. 10, 2015) and 20120242697 (Border et al., Sep. 27, 2012) "See-Through Near-Eye Display Glasses with the Optical Assembly Including Absorptive Polarizers or Anti-Reflective Coatings to Reduce Stray Light"; 20120236031 (Haddick et al., Sep. 20, 2012) "System and Method for Delivering Content to a Group of See-Through Near Eye Display Eyepieces"; 20150235455 (Schowengerdt, Aug. 20, 2015) "Using Polarization Modulators for Augmented or Virtual Reality"; 20180074340 (Robbins et al., Mar. 15, 2018) "Waveguides with Improved Intensity Distributions."

21. Collimated Light

Light collimation can be used to selectively block and/or direct beams of light in order to create virtual objects in a person's field of vision. Augmented reality eyewear in the prior art which uses collimated light includes: 20170199384 (Yeoh et al., Jul. 13, 2017) "Beam Angle Sensor in Virtual/Augmented Reality System"; 20150346490 (Tekolste et al., Dec. 3, 2015) "Methods and Systems for Generating Virtual Content Display with a Virtual or Augmented Reality Apparatus"; U.S. Pat. No. 9,515,238 (Maaskant et al., Dec. 6, 2016) "Micro-LED Array with Filters"; 20170184776 (El-Ghoroury et al., Jun. 29, 2017) "Non-Telecentric Emissive Micro-Pixel Array Light Modulators and Methods of Fabrication Thereof"; and U.S. Pat. No. 7,724,442 (Amitai, May 25, 2010) "Substrate-Guided Optical Devices."

22. Holographic Projection

Augmented reality eyewear which uses holographic projection technology to project virtual objects in a person's field of vision includes: 20170227771 (Sverdrup, Aug. 10, 2017) "Augmented Reality Head Worn Device"; 20170094265 (Mullins et al., Mar. 30, 2017) "Bidirectional Holographic Lens"; 20170185037 (Lee et al., Jun. 29, 2017) "Holographic Display Architecture"; 20170038589 (Jepsen, Feb. 9, 2017) "Near-Ocular Display Based on Hologram Projection"; U.S. Pat. No. 6,710,902 (Takeyama, Mar. 23, 2004) "Observation Optical System"; and U.S. Pat. No. 5,854,697 (Caulfield et al., Dec. 29, 1998) "Waveguide Hologram Illuminators."

23. Adjustable Interpupillary Distance

Augmented reality with mechanisms to adjust the inter-pupillary distance of optics (e.g. the distance between lenses or other optical structures for right and left side eyes) includes: 20170235126 (DiDomenico, Aug. 17, 2017) "Wide Angle, Broad-Band, Polarization Independent Beam Steering and Concentration of Wave Energy Utilizing Electronically Controlled Soft Matter"; U.S. Pat. No. 6,879,443 (Spitzer et al., Apr. 12, 2005) and 20050174651 (Spitzer et al., Aug. 11, 2005) "Binocular Viewing System"; 20170192198 (Bristol et al., Jul. 6, 2017) "Flexible Membranes Connected to Movable Lenses of Head-Mounted Display Systems and Related Technology"; 20170192240 (Drinkwater et al., Jul. 6, 2017) "Head Mounted Displays with Shaped Lenses"; 20170102546 (Tempel et al., Apr. 13, 2017) "Lens Movement Assemblies for Use with Head Mounted Displays"; and U.S. Pat. No. 9,470,906 (Kaji et al., Oct. 18, 2016), 20150103306 (Kaji et al., Apr. 16, 2015) and 20160341967 (Kaji et al., Nov. 24, 2016) "Virtual or Augmented Reality Headsets Having Adjustable Interpupillary Distance."

24. Eye/Head Movement Tracking

Augmented reality eyewear can track the movement of a person's eyes and/or head and can adjust the projection of virtual objects appropriately in response to this detected movement. Augmented reality eyewear with eye and/or head tracking includes: U.S. Pat. No. 9,304,003 (Ashman et al., Apr. 5, 2016) "Augmented Reality Navigation"; 20150235452 (Schowengerdt et al., Aug. 20, 2015) "Blanking Techniques in Augmented or Virtual Reality Systems"; 20180061121 (Yeoh et al., Mar. 1, 2018) "Continuous Time Warp and Binocular Time Warp for Virtual and Augmented Reality Display Systems and Methods"; 20150235436 (Schowengerdt, Aug. 20, 2015) "Delivering Light Rays Associated with Virtual Images Based on User Accommodation"; 20150234476 (Schowengerdt et al., Aug. 20, 2015) "Determining User Accommodation to Display an Image Through a Waveguide Assembly"; 20150235469 (Schowengerdt, Aug. 20, 2015) "Determining User Accommodation to Project Image Data at a Desired Focal Distance"; U.S. Pat. No. 9,417,452 (Schowengerdt et al., Aug. 16, 2016) and 20140267420 (Schowengerdt et al., Sep. 18, 2014) "Display System and Method"; 20170038836 (Jepsen et al., Feb. 9, 2017) "Display with an Embedded Eye Tracker"; 20150235446 (Schowengerdt, Aug. 20, 2015) "Driving Sub-Images Based on a User's Accommodation"; 20170307891 (Bucknor et al., Oct. 26, 2017) "Electromagnetic Tracking with Augmented Reality Systems"; and U.S. Pat. No. 9,323,325 (Perez et al., Apr. 26, 2016) "Enhancing an Object of Interest in a See-Through, Mixed Reality Display Device."

Augmented reality eyewear with eye and/or head tracking also includes: 20170148215 (Aksoy et al., May 25, 2017) "Eye Tracking for Mitigating Vergence and Accommodation Conflicts"; 20150301599 (Miller, Oct. 22, 2015) "Eye Tracking Systems and Method for Augmented or Virtual Reality"; U.S. Pat. No. 6,091,546 (Spitzer, Jul. 18, 2000) and 6349001 (Spitzer, Feb. 19, 2002) "Eyeglass Interface System"; U.S. Pat. No. 9,568,603 (Yahav et al., Feb. 14, 2017) "Eyewear-Mountable Eye Tracking Device"; 20180039083 (Miller et al., Feb. 8, 2018) "Fixed-Distance Virtual and Augmented Reality Systems and Methods"; 20150235449 (Schowengerdt et al., Aug. 20, 2015) "Frame-By-Frame Rendering for Augmented or Virtual Reality Systems"; U.S. Pat. No. 8,928,558 (Lewis et al., Jan. 6, 2015) and U.S. Pat. No. 9,110,504 (Lewis et al., Aug. 18, 2015) "Gaze Detection in a See-Through, Near-Eye, Mixed Reality Display"; U.S. Pat. No. 9,116,337 (Miao, Aug. 25, 2015) "Increasing Effective Eyebox Size of an HMD"; 20170264879 (Zhou, Sep. 14, 2017) "Method and Apparatus to Realize Virtual Reality"; U.S. Pat. No. 9,727,132 (Liu et al., Aug. 8, 2017) "Multi-Visor: Managing Applications in Augmented Reality Environments"; U.S. Pat. No. 9,690,099 (Bar-Zeev et al., Jun. 27, 2017) "Optimized Focal Area for Augmented Reality Displays"; and 20150235417 (Schowengerdt et al., Aug. 20, 2015) "Over-Rendering Techniques in Augmented or Virtual Reality Systems."

Augmented reality eyewear with eye and/or head tracking also includes: U.S. Pat. No. 9,495,801 (Ebstyne et al., Nov. 15, 2016) "Pose Tracking an Augmented Reality Device"; 20150235430 (Schowengerdt et al., Aug. 20, 2015) "Predicting Head Movement for Rendering Virtual Objects in Augmented or Virtual Reality Systems"; 20150235451 (Schowengerdt et al., Aug. 20, 2015) "Presenting Virtual Objects Based on Head Movements in Augmented or Virtual Reality Systems"; 20150235453 (Schowengerdt et al., Aug. 20, 2015) "Rendering Based on Predicted Head Movement in Augmented or Virtual Reality Systems"; 20150235443 (Schowengerdt, Aug. 20, 2015) "Selectively Blurring a Portion of an Image Based on a User's Accommodation"; 20170371184 (Shtukater, Dec. 28, 2017) "Smart Contact Lens with Orientation Sensor"; 20170139209 (Evans et al., May 18, 2017) "System, Method, and Apparatus for Displaying an Image Using a Curved Mirror and Partially transparent Plate"; 20150234184 (Schowengerdt et al., Aug. 20, 2015) "Using Historical Attributes of a User for Virtual or Augmented Reality Rendering"; 20150235450 (Schowengerdt et al., Aug. 20, 2015) "Utilizing Head Movement of User for Frame Rendering in Augmented or Virtual Reality Systems"; 20150316982 (Miller, Nov. 5, 2015) "Utilizing Pseudo-Random Patterns for Eye Tracking in Augmented or Virtual Reality Systems"; and 20180045965 (Schowengerdt, Feb. 15, 2018) "Virtual and Augmented Reality Systems and Methods."

25. Other Relevant Technology

Augmented reality eyewear in the prior art which is relevant to this invention but whose distinctive technologies do not fall into one of the above classifications includes the following: 20150234205 (Schowengerdt, Aug. 20, 2015) "Contact Lens Device for Displaying Augmented or Virtual Reality"; 20150248158 (Schowengerdt, Sep. 3, 2015) "Curved Waveguides for Augmented or Virtual Reality"; 20180052276 (Klienman et al., Feb. 22, 2018) "Diffractive Eyepiece"; 20170223344 (Kaehler, Aug. 3, 2017) "Display for Three-Dimensional Image"; U.S. Pat. No. 6,522,794 (Bischel et al., Feb. 18, 2003) "Display Panel with Electrically-Controlled Waveguide-Routing"; 20150103152 (Qin, Apr. 16, 2015) "Head-Mounted Stereoscopic Display"; 20150241706 (Schowengerdt, Aug. 27, 2015) "Injecting Images Having an Inverse Fourier Transform to Produce a Desired Wavefront"; 20160286204 (Grata et al., Sep. 29, 2016) "Light Projector Using an Acousto-Optical Control Device"; 20170131460 (Lin et al., May 11, 2017) "Metasurfaces for Redirecting Light and Methods for Fabricating"; 20150243095 (Schowengerdt, Aug. 27, 2015) "Modulating Light Associated with Image Data Through Phase Modulators for Augmented or Virtual Reality"; U.S. Pat. No. 5,724,463 (Deacon et al., Mar. 3, 1998) "Projection Display with Electrically Controlled Waveguide-Routing"; U.S. Pat. No. 9,823,474 (Evans et al., Nov. 21, 2017) and 20160291326 (Evans et al., Oct. 6, 2016) "System, Apparatus, and Method for Displaying an Image with a Wider Field of View"; U.S. Pat. No. 9,915,826 (Tekolste et al., Mar. 13, 2018) and 20160266387 (Tekolste et al., Sep. 15, 2016) "Virtual and Augmented Reality Systems and Methods Having Improved Diffractive Grating Structures"; 20170115689 (Liu, Apr. 27, 2017) "Virtual Reality Glasses"; and 20180053284 (Rodriguez et al., Feb. 22, 2018) "Virtual, Augmented, and Mixed Reality Systems and Methods."

SUMMARY OF THE INVENTION

In the field of Augmented Reality (AR) eyewear, there is currently a challenging tradeoff between the quality of virtual images displayed and the size of the eyewear. Some current AR eyewear devices display virtual images with relatively-good image quality and a relatively-large field of view, but are relatively large and bulky. Other current AR eyewear devices are relatively compact, but display virtual images with relatively-poor image quality and a relatively-small field of view. Long-windedly disclosed herein are some novel optical structures for Augmented Reality (AR) eyewear with the potential to improve the quality of virtual images displayed and/or reduce eyewear size. Some of the novel optical structures disclosed herein also offer ways to selectively mask environmental light to display more-opaque virtual images. Some of the novel optical structures disclosed herein also offer multiple focal planes for potentially reducing vergence-accommodation conflict.

An optical structure for Augmented Reality (AR) eyewear disclosed herein can comprise an annular array of light-energy emitters around a lens in front of a person's eye, wherein the lens has a plurality of nested annular light guides. The light guides redirect light from the light-energy emitters toward a person's eye. The annular structure of the light-emitter and light guide arrays can create a more space-efficient optical structure than having light-emitters just on one side (or above) a lens. This can provide higher quality virtual images and more-compact eyewear. In an example, an optical structure for Augmented Reality (AR) eyewear can include an array of selectively-movable light reflectors, wherein each light reflector has a first configuration which is substantially-parallel to environmental light rays and a second configuration which intersects environmental light rays and reflects light beams from a virtual image display toward a person's eye. This can enable a person to have a relatively-clear view of their environment with the selective superimposition of relatively-opaque virtual objects.

INTRODUCTION TO THE FIGURES

FIGS. 47 through 49 show sequential views of an image display above two parallel lenses, each with a selectively-movable parallel array of rotating reflective louvers.

FIGS. 50 through 52 show sequential views of two image displays above and below two parallel lenses, each with selectively-movable parallel array of rotating reflective louvers.

FIGS. 57 through 59 show sequential views of two image displays above and below a concave lens with two selectively-moveable sets of rotating reflective louvers.

FIGS. 64 through 66 show sequential views of an image display between two parallel arrays of rotating reflective louvers.

FIGS. 133 through 136 show four sequential views of a scanning light emitter and an array of selectively-movable light reflectors, wherein a light reflector has a first configuration which is parallel to environmental light rays and a second configuration which reflects environmental light rays away from a person's eye and reflects light rays from the scanning light emitter toward the person's eye.

Figure 137:
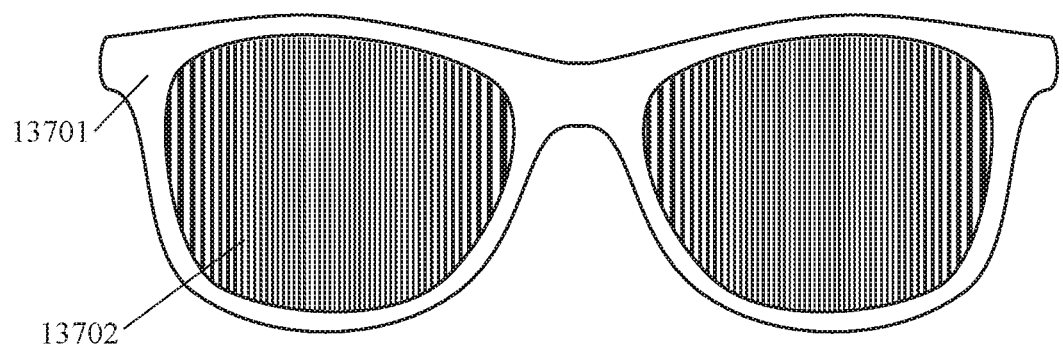

FIG. 137 shows an array of vertical parallel light reflectors in an eyewear frame.

Figure 138:
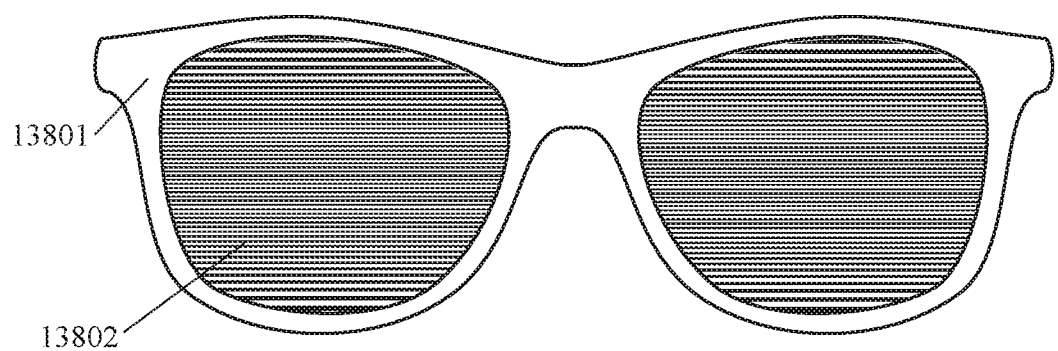

FIG. 138 shows an array of horizontal parallel light reflectors in an eyewear frame.

Figure 139:
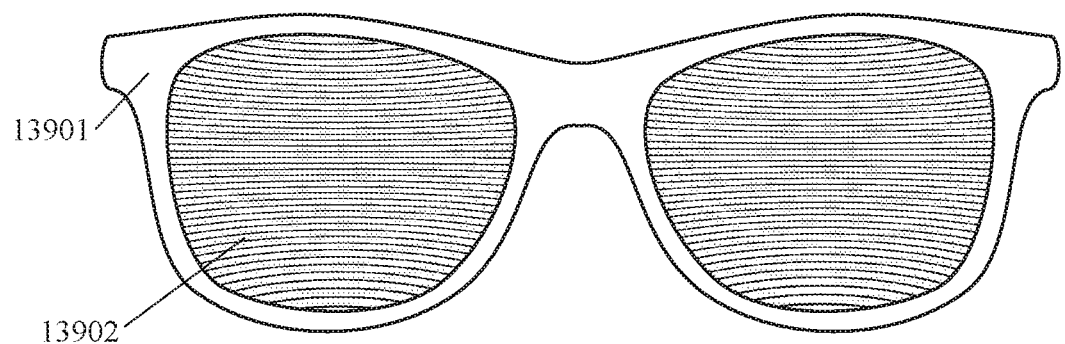

FIG. 139 shows a grid with arcuate rows and columns of movable light reflectors in an eyewear frame.

DETAILED DESCRIPTION OF THE FIGURES

Figure 1:
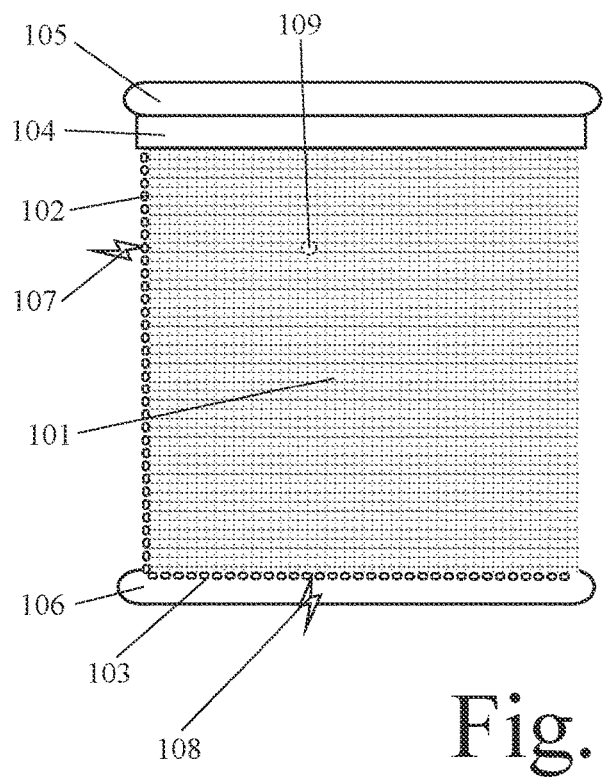
FIGS. 1 and 2 show sequential views of a quadrilateral grid of selectively-movable reflective elements.
Figure 1:
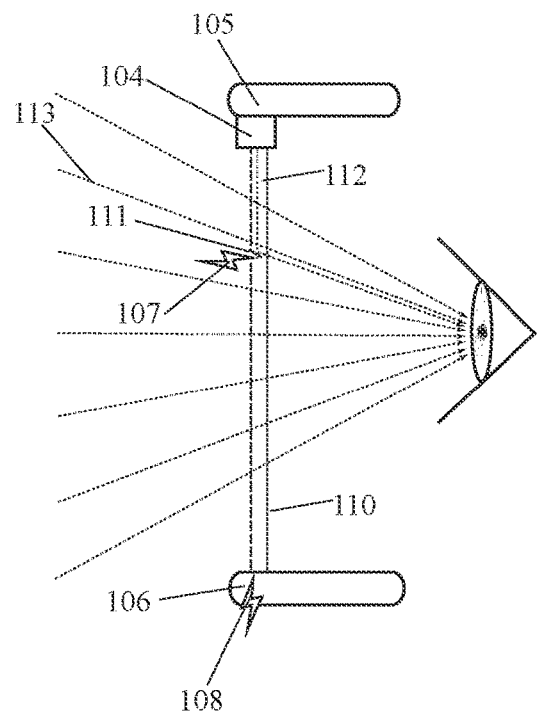
Figure 2:
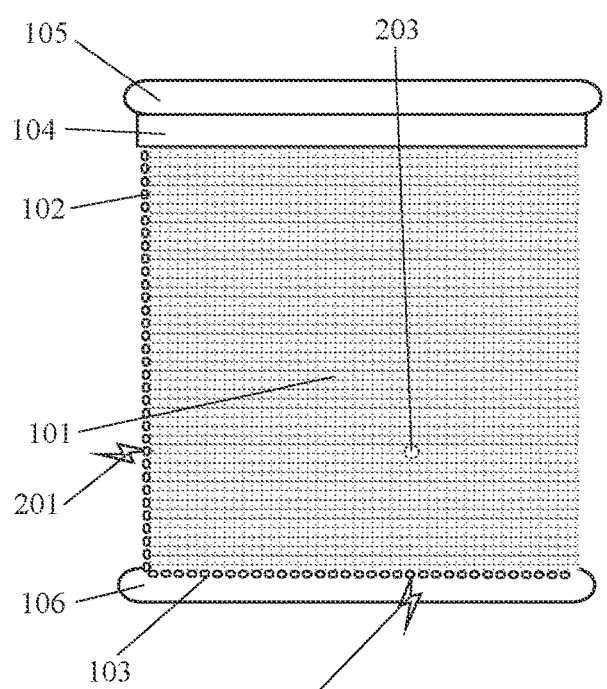
Figure 2:
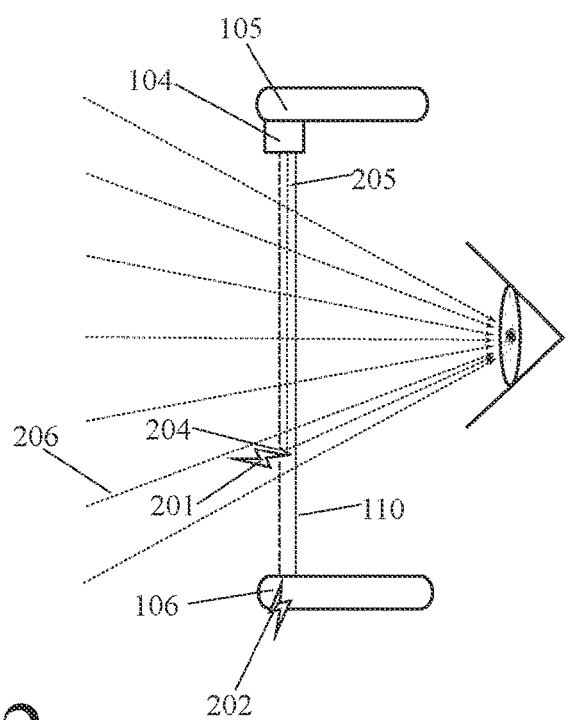

FIGS. 1 and 2 show two views, at two different times, of an example a single-eye optical structure (e.g. smart lens)

for augmented reality eyewear comprising a grid of selectively-movable individual optical elements. These figures show an optical structure (e.g. smart lens) in front of one eye. In an example, eyewear can include two such optical structures, one for each eye. These figures show upper and lower portions of a frame around the perimeter of the optical structure (such as a frame holding a smart lens). In an example, this frame can also span the lateral sides of the perimeter of the optical structure. The left sides of these two figures show frontal views of the optical structure. The right sides of these two figures show lateral cross-sectional side views of this optical structure.

FIG. 1 shows this optical structure at a first point in time wherein a first selected optical element in the grid is configured (oriented) so as to reflect a first set of light rays of a virtual image toward a person's eye. FIG. 2 shows this same optical structure at a second point in time wherein a second selected optical element in the grid is configured (oriented) to reflect a second set of light rays of the virtual image toward the person's eye. In an example, a series of multiple sets of light rays which are sequentially-reflected by a series of movable optical elements can be multiplexed (e.g. synchronized and combined) to project an image of a virtual object in the person's field of view.

FIGS. 1 and 2 show two sequential views of a single-eye component of augmented reality eyewear with a quadrilateral grid of selectively-movable optical elements, wherein a first set of one or more optical elements in the grid reflects a first set of rays of light of a virtual image toward a person's eye at a first point in time (as shown in FIG. 1) and wherein a second set of one or more optical elements in the grid reflects a second set of rays of light of the virtual image toward the person's eye at a second point in time (as shown in FIG. 2).

FIGS. 1 and 2 can also be described as showing two sequential views of a single-eye component of augmented reality eyewear with a grid of selectively-movable optical elements, wherein at least one optical element in the grid is selectively-moved from a first configuration in which the optical element does not reflect rays of light of a virtual image toward a person's eye to a second configuration in which the optical element does reflect rays of light of the virtual image toward the person's eye. The ability to reversibly change optical members from their first configurations to their second configurations, and back again, can be advantageous because it can allow light rays from a light-emitting virtual object display (located along an edge of the grid) to reach any optical member in the grid at a given time without these light rays being blocked by intermediate optical members.

FIGS. 1 and 2 can be also described as showing a single-eye component of augmented reality eyewear comprising: a quadrilateral grid of individually-movable optical elements which is configured to be worn in front of a person's eye; and a light-emitting virtual object display which emits rays of light which form a virtual image in the person's field of view; wherein a selected optical element in the grid has a first configuration in which the optical element does not block light from the light-emitting virtual object display from reaching other optical elements which are farther from the light-emitting virtual object display and does not reflect those rays of light toward the person's eye; wherein the optical element in the grid has a second configuration in which the optical element blocks light from the light-emitting virtual object display from reaching other optical elements which are farther from the light-emitting virtual object display and reflects those rays of light toward the person's eye; and wherein the selected optical element in the grid is changed from its first configuration to its second configuration by selective transmission of electromagnetic energy through a selected row and a selected column of electromagnetic energy pathways which are in electromagnetic communication with the grid of optical elements.

In an example, optical elements in a grid of optical elements can be partially-reflective. In an example, optical elements in a grid can be partially-reflective mirrors. In an alternative example, optical elements can have fully-reflective surfaces. In an example, optical elements can be fully-reflective mirrors. In an example, optical elements can be micro-lenses or micro-prisms. In an example, optical elements can be flat. In an example, optical elements can be arcuate. In an example, optical elements can be convex or concave. In an example, optical elements can have a conic section shape. In an example, a grid of optical elements can be flat. In an example, a grid can be arcuate. In an example, a grid can be convex. In an example, a grid can be concave. In an example, a grid can have a conic section shape.

In an example, a grid of optical elements can comprise a quadrilateral grid with perpendicular rows and columns of optical elements. In an example, a grid can have over 10 rows and over 10 columns of optical elements. In an example, a grid can have over 100 optical elements. In, an example, a grid of optical elements can be a circular or elliptical radial or polar coordinate grid with rays (or spokes) and rings of optical elements. In an example, a grid can have over 10 rays (or spokes) and over 10 rings of optical elements. In an example, optical elements can be closer together in outer rings of a radial array of optical elements (with spokes and rings). In an example, optical elements can be larger in outer rings of a radial array of optical elements (with spokes and rings). In an example, a radial array can have an overall circular, elliptical, or oval shape.

In an example, all optical elements in a grid can have the same size. In an example, optical elements toward the center of the grid can be smaller than optical elements toward the periphery of the grid. In an example, all optical elements in a grid can have the same shape. In an example, optical elements in a grid can have different shapes. In an example, optical elements can be quadrilateral. In an example, optical elements can be circular. In an example, optical elements can be hexagonal. In an example, a grid of optical elements can comprise a hexagonal grid. In an example, optical elements in a grid can be substantially adjacent to each other, without non-reflective gaps between them. In an example, optical elements in a grid can be non-adjacent to each other. In an example, there can be non-reflective gaps between optical elements in a grid. In an example, optical elements toward the center of the grid can be closer together than optical elements toward the periphery of the grid.

In an example, optical elements in a grid of optical elements can be moved by being tilted and/or rotated around their edges. In an example, optical elements in a grid of optical elements can be moved by being tilted and/or rotated around an axis. In an example, an optical element can tilt or rotate around a small-scale hinge, joint, or axle. In an example, an optical element can be suspended in a fluid. In an example, an optical element can be suspended in a magnetic field. In an example, optical elements can be connected to each other by a flexible and/or elastic membrane.

In an example, optical elements in their first configurations can be substantially coplanar. In an example, optical elements in their first configurations can be oriented so as to be substantially perpendicular to a person's line of sight. In an example, optical elements in their first configurations can be oriented so as to be substantially perpendicular to vectors which radiate outwards from the center of a person's eye. In an example, optical elements in their second configurations can be substantially parallel to each other. In an example, optical elements in their second configurations can be oriented so as to intersect a person's line of sight at an acute angle. In an example, this acute angle can be 45 degrees. In an example, this acute angle can be between 30 and 60 degrees.

In an example, an optical member can be electromagnetic. In an example, an optical member can be moved by a temporary and localized electromagnetic field. In an example, selected optical elements in the grid can be moved from their first configuration to their second configuration by selective application of electromagnetic energy to a selected location in the grid. In an example, optical elements in their first configuration can be oriented to be substantially parallel to a person's line of sight and in their second configuration can be oriented to intersect the person's line of sight at an acute angle.

In an example, augmented reality eyewear can further comprise rows and columns of electromagnetic energy pathways which are in electromagnetic communication with optical elements in a grid, wherein application of electromagnetic energy to a selected row pathway and/or to a selected column pathway causes an optical element at the convergence and/or intersection of this row and column to move from its first configuration to its second configuration, or vice versa. In an example, this movement can be caused by temporary electromagnetism which is created at the convergence and/or intersection of the row pathway and the column pathway. In an example, an electromagnetic energy pathway can be transparent. In an example, an electromagnetic energy pathway can be a conductive transparent channel. In an example, an electromagnetic pathway can be a wire. In an example, an electromagnetic energy pathway can be a (microfluidic) lumen filled with an electromagnetically-conductive liquid.

In an example, augmented reality eyewear can further comprise a first series of electromagnetic energy emitters and/or receivers in electromagnetic communication with electromagnetic energy pathway rows and a second series of electromagnetic energy receivers and/or emitters in electromagnetic communication with electromagnetic energy pathway columns. In an example, rows and columns of electromagnetic energy pathways can be substantially parallel to row and columns of optical elements in a grid. In an example, rows of electromagnetic energy pathways can be in a first layer, columns of electromagnetic energy pathways can be in a third layer, and optical elements can be in a second layer between the first and third layers.

In an example, augmented reality eyewear can further comprise a light-emitting virtual object display. In an example, a light-emitting virtual object display can be a substantially-flat two-dimensional (row and column) display. In an example, a light-emitting virtual object display can be a substantially-straight one-dimensional (row or column only) display. In an example, a substantially-straight light-emitting virtual object display can be located along a side of the grid of optical elements along the ends of electromagnetic pathway rows. In an example, a substantially-straight light-emitting virtual object display can be located along a side of the grid of optical elements along the ends of electromagnetic pathway columns. In an example, a light-emitting virtual object display can be a virtual image projector.

In an example, a light-emitting virtual object display can comprise one or more components selected from the group consisting of: active matrix organic light-emitting diode array, projector, or display; collimated light projector or display; digital micro-mirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; microdisplay and/or microprojector; micro-display array or matrix; optoelectronic display; organic light emitting diode (OLED) array or matrix; passive matrix light-emitting diode array or matrix; photoelectric display; and transmission holographic optical element array or matrix.

In an example, selectively and rapidly moving a selected sequence of optical elements from their first configurations to their second configurations (and back to their first configurations) can cause a sequential pattern of reflection of light rays from a light-emitting virtual object display which together form a virtual image in a person's field of view. In an example, selectively changing the orientations of optical elements in disk pattern can create a circular or sphere shaped virtual image in a person's field of view. In an example, individual optical elements in a grid can be selectively moved from their first to second configurations one at a time. In an example, sets or groups of optical elements in a grid can be selectively moved from their first to second configurations at the same time. In an example, if a light-emitting virtual object display surface is located along the columnar-edge of the grid, then an entire row of optical elements can be moved simultaneously without obscuring the projection of any part of the virtual image. In an example, if a light-emitting virtual object display surface is located along the row-edge of the grid, then an entire column of optical elements can be moved simultaneously without obscuring the projection of any part of the virtual image.

With respect to specific components, the example of a one-eye component of augmented reality eyewear shown in FIGS. 1 and 2 comprises: a quadrilateral grid 101 of rows and columns of optical elements, wherein each optical element is a partially-reflective mirror; an eyewear frame including upper portion 105 and lower portion 106 which is configured hold the quadrilateral grid in front of a person's eye; a light-emitting virtual object display 104 which emits rays of light which are configured to collectively form a virtual object in the person's field of view; a first set 102 of electromagnetic energy emitters (or receivers) which are in electromagnetic communication with rows of electromagnetic energy pathways; and a second set 103 of electromagnetic energy receivers (or emitters) which are in electromagnetic communication with columns of electromagnetic energy pathways; wherein transmission of electromagnetic energy between a selected electromagnetic energy emitter (or receiver) in the first set electromagnetic energy emitters (or receivers) and the second set of electromagnetic energy emitters (or receivers) causes a selected optical element to change from its first configuration to its second configuration, or vice versa; wherein the selected optical element reflects a first level of light rays from the light-emitting virtual object display toward the person's eye in a first configuration; wherein the selected optical element reflects a second level of light rays from the light-emitting virtual object display toward the person's eye in a second configuration; and wherein the second level is (at least 50%) greater than the first level.

In FIG. 1, application of electromagnetic energy, 107 and 108, along a selected row and a selected column, respectively, causes optical element 111 to change configuration at location 109 where this row and column intersect (and/or converge). As shown on the right side of FIG. 1, application of electromagnetic energy 107 and 108 along a selected row and a selected column causes optical element 111 to tilt or rotate towards the person's eye, thereby reflecting ray of light 112 from the light-emitting virtual object display 104 toward the person's eye. Rays of light from the person's environment such as 113 travel substantially undistorted through the grid in all locations except 109. In an example, (part of) the image of a virtual object is superimposed over the person's view of the environment at location 109. In FIG. 1, the grid of optical elements is protected within a transparent housing 110.

In FIG. 2, application of electromagnetic energy, 201 and 202, along a different selected row and a different selected column, causes a different optical element 204 to change configuration at location 203 where this different row and column intersect. As shown on the right side of FIG. 2, application of electromagnetic energy 201 and 202 along a selected row and a selected column causes optical element 204 to tilt or rotate towards the person's eye, thereby reflecting ray of light 205 from the light-emitting virtual object display 104 toward the person's eye. Rays of light such as 206 from the person's environment travel substantially undistorted through the grid except at location 203. In an example, (part of) the image of a virtual object is superimposed over the person's view of the environment at location 203. Advantageously, the ability to selectively control individual locations in the grid can enable multiplexing of virtual image rows and/or columns projected toward the person's eye with a relatively thin and flat display. In an example, a light-emitting virtual object display can display rows of a virtual image in a sequence which is timed with a sequence of moved rows of optical elements.

The example shown in FIGS. 1 and 2 can also comprise one or more components selected from the group consisting of: battery, energy transducer, or other power source; data processor; data transmitter and/or receiver; electromagnetic actuator, actuator array, vibrator, or vibrator array; photo-acoustic array; MEMS array; micro-hydraulic or micro-pneumatic array; sound-emitting speaker or speaker array; and lens or lens array. Example variations discussed in other portions of this disclosure or priority-linked disclosures can also be applied to this example where relevant, but are not repeated here in order to reduce narrative redundancy.

Figure 3:
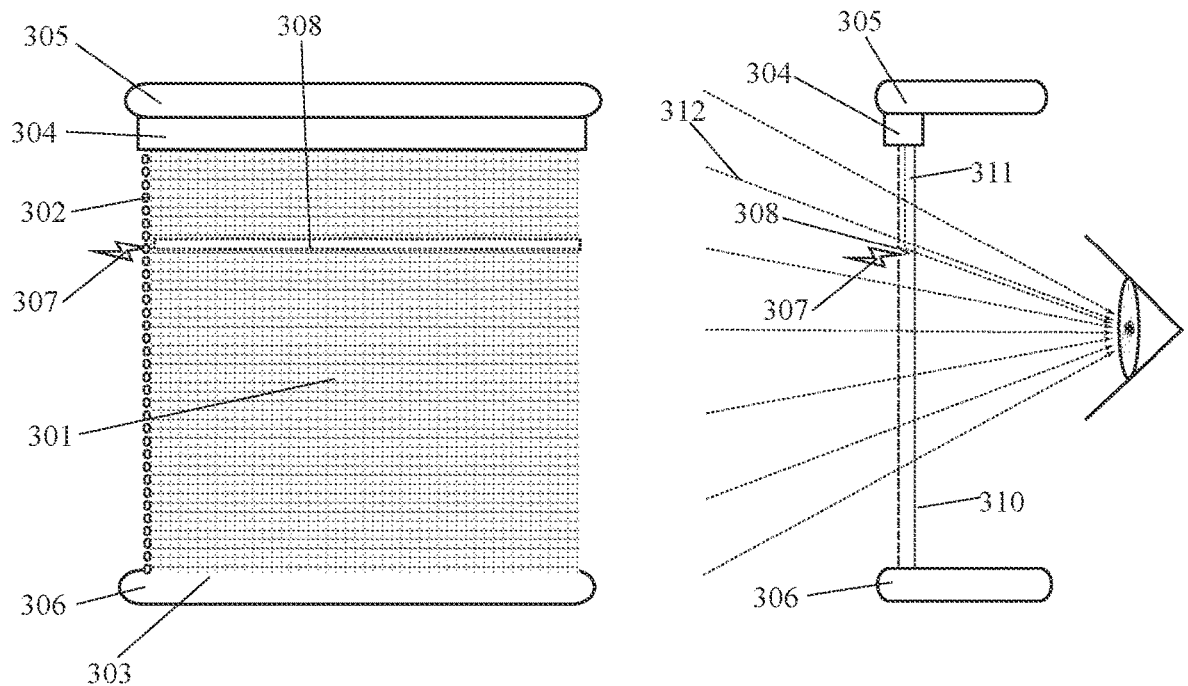
FIGS. 3 and 4 show sequential views of a parallel array of selectively-movable reflective strips.
Figure 4:
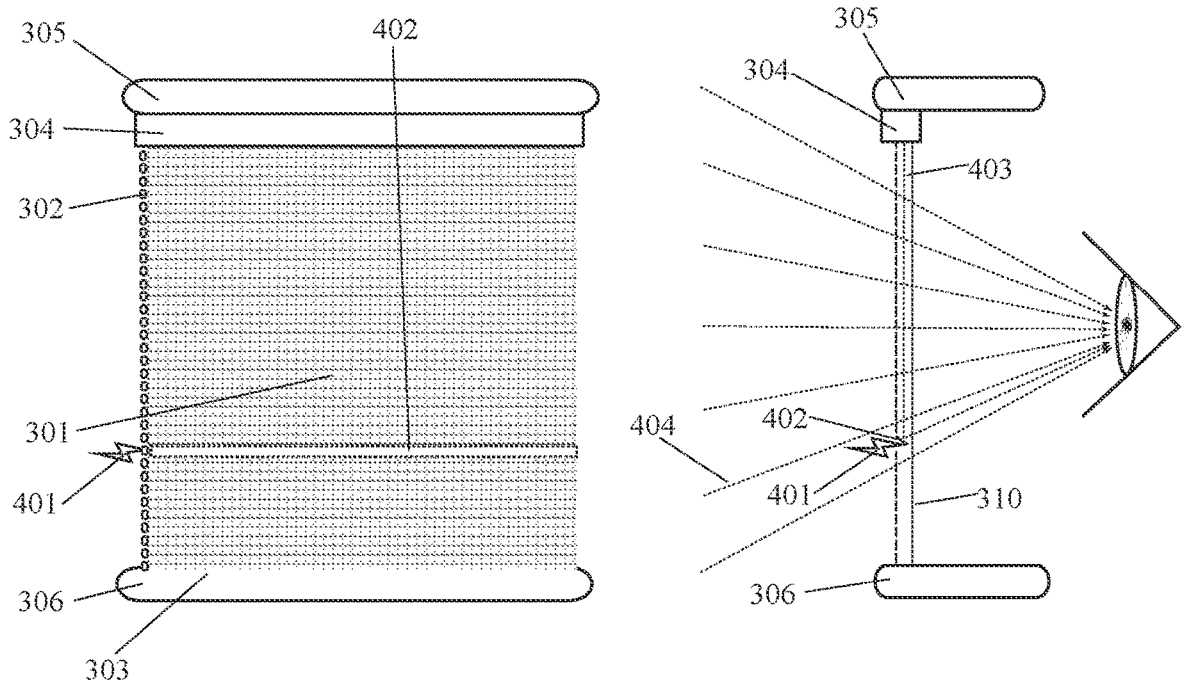

FIGS. 3 and 4 show two views, at two different times, of an example a single-eye optical structure (e.g. smart lens) for augmented reality eyewear comprising an array of selectively-movable reflective strips. It is similar to an array of reflective Venetian blinds in which the positions of individual slats of the blinds can be selectively and independently moved. These figures show an optical structure (e.g. smart lens) in front of one eye. In an example, eyewear can include two such optical structures, one for each eye. These figures show upper and lower portions of a frame around the perimeter of the optical structure (such as a frame holding a smart lens). In an example, this frame can also span the lateral sides of the perimeter of the optical structure. The left sides of these two figures show frontal views of the optical structure. The right sides of these two figures show lateral cross-sectional side views of this optical structure.

FIG. 3 shows an optical structure at a first point in time wherein a first selected reflective strip in an array is configured (oriented) so as to reflect a first set of light rays of a virtual image toward a person's eye. FIG. 4 shows this same optical structure at a second point in time wherein a second selected reflective strip in the array is configured (oriented) to reflect a second set of light rays of the virtual image toward the person's eye. In an example, an array of multiple sets of light rays which are sequentially-reflected by an array of reflective strips can be multiplexed (e.g. synchronized and combined) to project an image of a virtual object in a person's field of view.

FIGS. 3 and 4 can also be described as showing two sequential views of a single-eye component of augmented reality eyewear with a quadrilateral array of selectively-movable reflective strips, wherein a first set of one or more reflective strips reflects a first set of rays of light of a virtual image toward a person's eye at a first point in time (as shown in FIG. 3) and wherein a second set of one or more reflective strips reflects a second set of rays of light of the virtual image toward the person's eye at a second point in time (as shown in FIG. 4). This is similar to an array of reflective Venetian blinds in which the positions of individual slats in the blinds can be selectively and independently moved.

FIGS. 3 and 4 can also be described as showing two sequential views of a single-eye component of augmented reality eyewear with an array of selectively-movable reflective strips, wherein at least one reflective strip in the array is selectively-moved from a first configuration in which the reflective strip does not reflect rays of light of a virtual image toward a person's eye to a second configuration in which the reflective strip does reflect rays of light of the virtual image toward the person's eye. The ability to change reflective strips from their first configurations to their second configurations (and back again) can be advantageous because it can allow light rays from a light-emitting virtual object display (such as one located along an edge of the array) to reach any reflective strip in the array without these light rays being blocked by reflective strips which are closer to the light-emitting virtual object display.

FIGS. 3 and 4 can be also described as showing a single-eye component of augmented reality eyewear comprising: a quadrilateral array of individually-movable reflective strips which is configured to be worn in front of a person's eye; and a light-emitting virtual object display which emits rays of light which collectively create a virtual image in the person's field of view; wherein a reflective strip in the array has a first configuration in which the reflective strip does not block light from the light-emitting virtual object display from reaching other reflective strips which are farther from the light-emitting virtual object display and does not reflect those rays of light toward the person's eye; and wherein the reflective strip in the array has a second configuration in which the reflective strip does block light from the light-emitting virtual object display from reaching other reflective strips which are farther from the light-emitting virtual object display and does reflect those rays of light toward the person's eye. In an example, a selected reflective strip in the array can be changed from its first configuration to its second configuration by transmission of electromagnetic energy through a selected electromagnetic energy pathway which is in electromagnetic communication with the reflective strip.

In an example, reflective strips in an array of reflective strips can be partially-reflective. In an example, reflective strips in an array can be partially-reflective mirrors. In an alternative example, reflective strips can have fully-reflective surfaces. In an example, reflective strips can be fully-reflective mirrors. In an example, reflective strips can be micro-lenses or micro-prisms. In an example, reflective strips can be flat. In an example, reflective strips can be arcuate. In an example, reflective strips can be convex or concave. In an example, reflective strips can have a shape which is a section of the perimeter of a cylinder. In an example, an array of reflective strips can be flat. In an example, an array can be arcuate. In an example, an array can be convex. In an example, an array can be concave. In an example, an array of reflective strips can have over 10 strips. In an example, an array can have over 100 strips. In an example, strips can have a horizontal longitudinal axis (e.g. form rows). In an example, strips can have a vertical longitudinal axis (e.g. form columns).

In an example, all reflective strips in an array of reflective strips can have the same size. In an example, reflective strips toward the center of the array can be smaller than reflective strips toward the periphery of the array. In an example, all reflective strips in an array can have the same shape. In an example, reflective strips in an array can have different shapes. In an example, reflective strips in an array can be substantially adjacent to each other, without non-reflective gaps between them. In an example, reflective strips in an array can be non-adjacent to each other. In an example, there can be non-reflective gaps between reflective strips in an array. In an example, reflective strips toward the center of the array can be closer together than reflective strips toward the periphery of the array.

In an example, a reflective strip in an array of reflective strips can be moved by being tilted and/or rotated around an edge. In an example, a reflective strip can tilt or rotate around a small-scale hinge, joint, or axle. In an example, a reflective strip can be suspended in a fluid. In an example, a reflective strip can be suspended in a magnetic field. In an example, reflective strips can be connected to each other by a flexible and/or elastic membrane.

In an example, reflective strips in their first configurations can be substantially coplanar. In an example, reflective strips in their first configurations can be oriented so as to be substantially perpendicular to a person's line of sight. In an example, reflective strips in their first configurations can be oriented so as to be substantially perpendicular to vectors which radiate outwards from the center of a person's eye. In an example, reflective strips in their second configurations can be substantially parallel to each other. In an example, reflective strips in their second configurations can be oriented so as to intersect a person's line of sight at an acute angle. In an example, this acute angle can be 45 degrees. In an example, this acute angle can be between 30 and 60 degrees.

In an example, a reflective strip can be electromagnetic. In an example, a reflective strip can be moved by a temporary localized electromagnetic field. In an example, selected reflective strips in the array can be moved from their first configuration to their second configuration by selective and temporary application of electromagnetic energy to a selected location in the array. In an example, reflective strips in their first configuration can be oriented to be substantially parallel to a person's line of sight and in their second configuration can be oriented to intersect the person's line of sight at an acute angle.

In an example, augmented reality eyewear can further comprise electromagnetic energy pathways which are in electromagnetic communication with reflective strips in an array, wherein application of electromagnetic energy to a selected pathway causes a proximal reflective strip to move from its first configuration to its second configuration, or vice versa. In an example, this movement can be caused by temporary electromagnetism which is created by the electromagnetic energy pathway. In an example, an electromagnetic energy pathway can be transparent. In an example, an electromagnetic energy pathway can be a conductive transparent channel. In an example, an electromagnetic pathway can be a wire. In an example, an electromagnetic energy pathway can be a microfluidic lumen filled with an electromagnetically-conductive liquid.

In an example, augmented reality eyewear can further comprise a series electromagnetic energy emitters and/or receivers in electromagnetic communication with the electromagnetic energy pathways. In an example, some electromagnetic energy pathways can be in a first layer, other electromagnetic energy pathways can be in a third layer, and reflective strips can be in a second layer between the first and third layers.

In an example, augmented reality eyewear can further comprise a light-emitting virtual object display. In an example, a light-emitting virtual object display can be a substantially-flat two-dimensional (row and column) display. In an example, a light-emitting virtual object display can be a substantially-straight one-dimensional (row or column only) display. In an example, a substantially-straight light-emitting virtual object display can be located along a side of the array of reflective strips.

In an example, a light-emitting virtual object display can comprise one or more components selected from the group consisting of: active matrix organic light-emitting diode array, projector, or display; collimated light projector or display; digital micro-mirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; microdisplay and/or microprojector; micro-display array or matrix; optoelectronic display; organic light emitting diode (OLED) array or matrix; passive matrix light-emitting diode array or matrix; photoelectric display; and transmission holographic optical element array or matrix.

In an example, selectively and rapidly moving a selected sequence of reflective strips from their first configurations to their second configurations (and back to their first configurations) can cause a sequential pattern of reflection of light rays which together form a virtual image in a person's field of view. In an example, individual reflective strips in an array can be selectively moved from their first to second configurations one at a time.

With respect to specific components, the example of a one-eye component of augmented reality eyewear shown in FIGS. 3 and 4 comprises: a quadrilateral array 301 of reflective strips, wherein each reflective strip has a partially-reflective surface; an eyewear frame including upper portion 305 and lower portion 306 which is configured hold the quadrilateral array in front of a person's eye; a light-emitting virtual object display 304 which emits rays of light which are configured to collectively form a virtual object in the person's field of view; electromagnetic energy emitters 302 which are in electromagnetic communication with electromagnetic energy pathways, wherein transmission of electromagnetic energy through a selected electromagnetic energy pathway causes a selected reflective strip to change from its first configuration to its second configuration, or vice versa; wherein the selected reflective strip reflects a first level of light rays from the light-emitting virtual object display toward the person's eye in its first configuration; wherein the selected reflective strip reflects a second level of light rays from the light-emitting virtual object display toward the person's eye in its second configuration; and wherein the second level is (at least 50%) greater than the first level.

In FIG. 3, transmission of electromagnetic energy 307 through an electromagnetic energy pathway causes reflective strip 308 to change from its first configuration to its second configuration. As shown on the right side of FIG. 3, transmission of electromagnetic energy 307 causes reflective strip 308 to tilt or rotate towards the person's eye, thereby reflecting ray of light 311 from the light-emitting virtual object display 304 toward the person's eye. Rays of light from the person's environment, such as 312, travel substantially undistorted through the array. In an example, (part of) the image of a virtual object is superimposed over the person's view of the environment at reflective strip 308. In FIG. 3, the array of reflective strips is protected within a transparent housing 310.

In FIG. 4, transmission of electromagnetic energy 401 through a different electromagnetic energy pathway causes a different reflective strip 402 to change from its first configuration to its second configuration. As shown on the right side of FIG. 4, transmission of electromagnetic energy 401 causes reflective strip 402 to tilt or rotate towards the person's eye, thereby reflecting ray of light 403 from light-emitting virtual object display 304 toward the person's eye. Rays of light, such as 404, from the person's environment travel substantially undistorted through the array. In an example, (part of) the image of a virtual object is superimposed over the person's view of the environment at reflective strip 402.

Advantageously, the ability to selectively control individual strips in an array can enable multiplexing. For example, a light-emitting virtual object display can display strips (e.g. rows or columns) of a virtual image in a sequence which is timed with a sequence of moved reflective strips (e.g. row or columns). The example shown in FIGS. 3 and 4 can also comprise one or more components selected from the group consisting of: battery, energy transducer, or other power source; data processor; data transmitter and/or receiver; electromagnetic actuator, actuator array, vibrator, or vibrator array; photo-acoustic array; MEMS array; micro-hydraulic or micro-pneumatic array; sound-emitting speaker or speaker array; and lens or lens array. Example variations discussed in other portions of this disclosure or priority-linked disclosures can also be applied to this example where relevant, but are not repeated here in order to reduce narrative redundancy.

Figure 5:
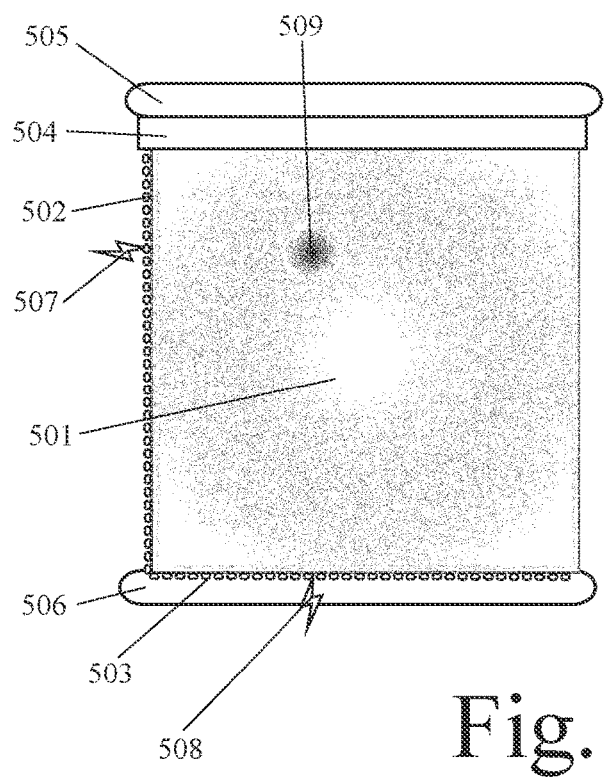
FIGS. 5 and 6 show sequential views of a selectively-perturbable reflective membrane.
Figure 5:
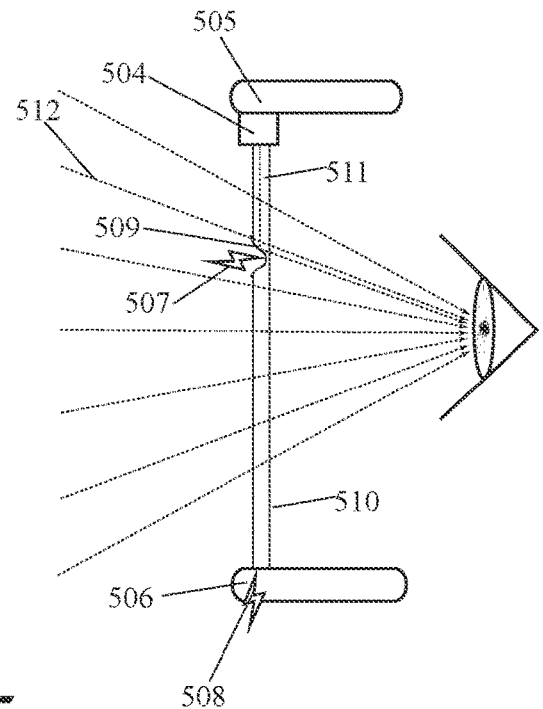
Figure 6:
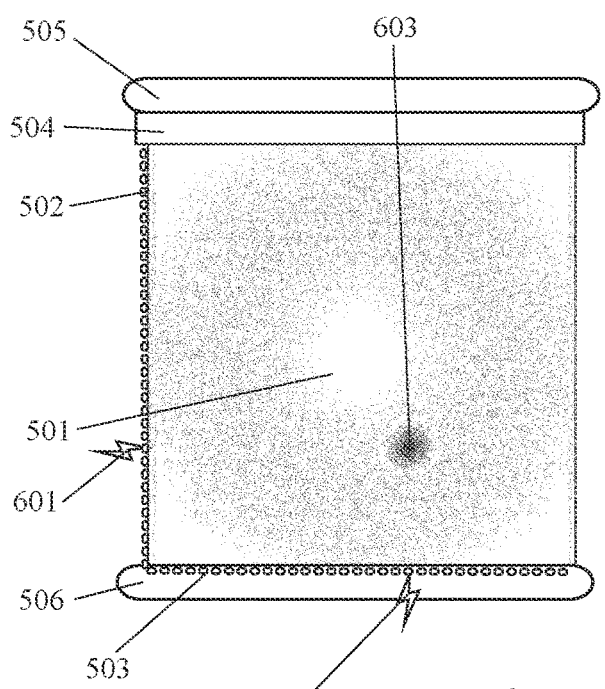
Figure 6:
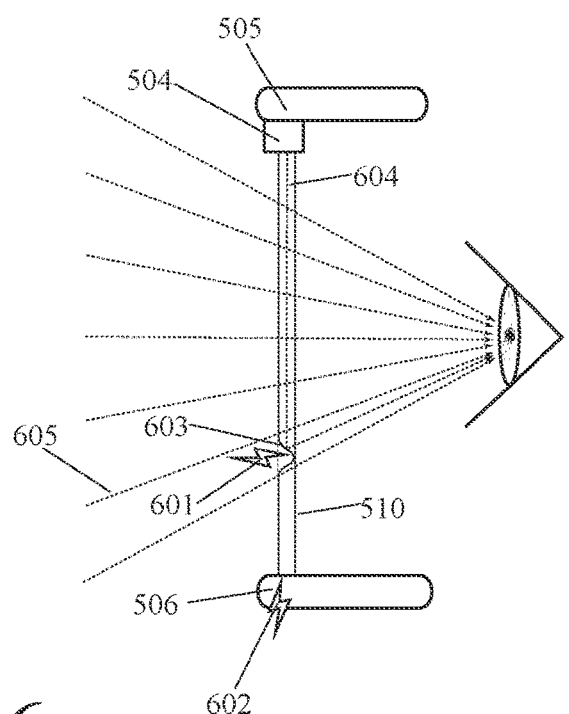

FIGS. 5 and 6 show two views, at two different times, of an example a single-eye optical structure (e.g. smart lens) for augmented reality eyewear comprising a selectively-perturbable reflective membrane (or film). In an example, selective and localized application of electromagnetic, sonic, or pneumatic energy to a particular area of a selectively-perturbable reflective membrane causes a temporary localized concavity or convexity in the membrane which causes temporary localized reflection of rays of light from a display toward a person's eye at that area. Sequential perturbation of different areas of the membrane (with multiplexed content displayed) can create an image of a virtual object superimposed over the environment in a person's field of view.

These figures show an optical structure (e.g. smart lens) in front of one eye. In an example, eyewear can include two such optical structures, one for each eye. These figures show upper and lower portions of a frame around the perimeter of the optical structure (such as a frame holding a smart lens). In an example, this frame can also span the lateral sides of the perimeter of the optical structure. The left sides of these two figures show frontal views of the optical structure. The right sides of these two figures show lateral cross-sectional side views of this optical structure.

FIG. 5 shows an optical structure at a first point in time wherein a first area of a selectively-perturbable reflective membrane (or film) is perturbed so as to reflect a first set of light rays of a virtual image toward a person's eye. FIG. 6 shows this same optical structure at a second point in time wherein a second area of the selectively-perturbable reflective membrane is perturbed so as to reflect a second set of light rays of the virtual image toward the person's eye. FIGS. 5 and 6 can also be described as showing two sequential views of a single-eye component of augmented reality eyewear with a flexible and/or elastic reflective membrane, wherein a first area of the membrane reflects a first set of rays of light of a virtual image toward a person's eye at a first point in time (as shown in FIG. 5) and wherein a second area of the membrane reflects a second set of rays of light of the virtual image toward the person's eye at a second point in time (as shown in FIG. 6).

In an example, areas of the reflective membrane which are not perturbed are substantially flat and allow rays of light from the environment to pass without substantial distortion. In an example, areas of the reflective membrane which are not perturbed are substantially perpendicular to a person's line of sight. In an example, areas of the reflective membrane which are perturbed are arcuate and superimpose (or combine) rays of light from a light-emitting virtual object display over (with) rays of light from the environment. In an example, when an area of the reflective membrane is not perturbed it is in its first configuration and when the area is perturbed it is in its second configuration. In an example, an area of the reflective membrane can be changed from its first (unperturbed) configuration to its second (perturbed) configuration by being exposed to a localized (temporary) electromagnetic field.

In an example, an area of a reflective membrane can be changed from its first (unperturbed) configuration to its second (perturbed) configuration by localized (temporary) sound waves. In an example, an area of the reflective membrane can be changed from its first (unperturbed) configuration to its second (perturbed) configuration by localized (temporary) pulses of air. In an example, selective application of electromagnetic energy to an area of the reflective membrane causes the membrane to temporarily bend, bulge, and/or wave. In an example, selective application of sonic energy to an area of the reflective membrane causes the membrane to temporarily bend, bulge, and/or wave. In an example, selective application of a flow of air to an area of the reflective membrane causes the membrane to temporarily bend, bulge, and/or wave. In an example, an area of a reflective membrane can have an undulating shape when it is perturbed (in its second configuration). In an example, an area of a reflective membrane can have a sinusoidal shape when it is perturbed (in its second configuration). In an example, an area of a reflective membrane can have a conic section shape when it is perturbed (in its second configuration).

In an example, selective and localized bending, bulging, and/or wave of an area of a reflective membrane causes this area to reflect rays of light from a light-emitting virtual object display in this area toward a person's eye. In an example, selective and localized application of electromagnetic, sonic, or pneumatic energy to a particular area of a selectively-perturbable reflective membrane causes a temporary localized concavity or convexity in the membrane which causes temporary localized reflection of rays of light from a display toward a person's eye. Sequential perturbation of different areas of the membrane (with multiplexed content displayed) can create an image of a virtual object superimposed over the environment in a person's field of view. In an example, a reflective membrane can be electromagnetic. In an example, selected areas of a reflective membrane can be perturbed by exposure to a localized electromagnetic field. In an example, selected areas in a reflective membrane can be moved from their first configuration to their second configuration by selective application of electromagnetic energy.

FIGS. 5 and 6 can also be described as showing two sequential views of a single-eye component of augmented reality eyewear with a selectively-perturbable reflective membrane (or film), wherein at least one area of the reflective membrane is selectively-moved from a first configuration in which the area does not reflect rays of light of a virtual image toward a person's eye to a second configuration in which the area does reflect rays of light of the virtual image toward the person's eye. The ability to selectively change areas from their first configurations to their second configurations, and vice versa, can be advantageous because it can allow light rays from a light-emitting virtual object display (such as one located along an edge of the membrane) to reach any area of the reflective membrane without these light rays being blocked by areas which are closer to the light-emitting virtual object display.

FIGS. 5 and 6 can be also described as showing a single-eye component of augmented reality eyewear comprising: a quadrilateral array of individually-movable membrane areas which is configured to be worn in front of a person's eye; and a light-emitting virtual object display which emits rays of light which collectively create a virtual image in the person's field of view; wherein an area of the reflective membrane (or film) can have a first configuration in which the area does not block light from the light-emitting virtual object display from reaching other areas which are farther from the light-emitting virtual object display and does not reflect those rays of light toward the person's eye; and wherein the area of the reflective membrane can have a second configuration in which the area does block light from the light-emitting virtual object display from reaching other areas which are farther from the light-emitting virtual object display and does reflect those rays of light toward the person's eye. In an example, a selected area of the reflective membrane can be changed from its first configuration to its second configuration by exposure to localized electromagnetic, sonic, or pneumatic energy.

In an example, a reflective membrane can be partially-reflective. In an example, a reflective membrane can be a partially-reflective flexible mirror. In an example, a reflective membrane can be flat (when all membrane areas are in their first configurations). In an example, a membrane can be arcuate when all membrane areas are in their first configurations. In an example, a membrane can be convex when all membrane areas are in their first configurations. In an example, a membrane can be concave when all membrane areas are in their first configurations.

In an example, a selectively-perturbable reflective membrane can be in a gas or fluid. In an example, an area can be suspended in a magnetic field. In an example, a selectively-perturbable reflective membrane can be elastic, flexible, and/or stretchable. In an example, a selectively-perturbable reflective membrane can be held in tension. In an example, a selectively-perturbable reflective membrane can have a width between 1 mm and 5 mm. In an example, a selectively-perturbable reflective membrane can have a width between 0.02 mm and 2 mm. In an example, a selectively-perturbable reflective membrane can have a width between 0.001 mm and 0.05 mm. In an example, a selectively-perturbable reflective membrane can have a width between 1 and 30 microns.

In an example, areas of a reflective membrane can be substantially coplanar in their first configurations. In an example, areas of the membrane in their first configurations can be oriented so as to be substantially perpendicular to a person's line of sight. In an example, areas of the membrane in their first configurations can be oriented so as to be substantially perpendicular to vectors which radiate outwards from the center of a person's eye. In an example, areas of a reflective membrane in their second configurations can be substantially parallel to each other. In an example, portions of areas of the membrane in their second configurations can be oriented so as to intersect a person's line of sight at an acute angle. In an example, this acute angle can be 45 degrees. In an example, this acute angle can be between 30 and 60 degrees.

In an example, augmented reality eyewear can further comprise (rows and columns of) electromagnetic energy pathways which are in electromagnetic communication with a reflective membrane, wherein application of electromagnetic energy to selected (rows and columns) of electromagnetic energy pathways causes a selected area of a reflective membrane to move from its first configuration to its second configuration, or vice versa. In an example, this movement can be caused by temporary electromagnetism created by the electromagnetic energy pathways. In an example, electromagnetic energy pathways can be transparent. In an example, an electromagnetic energy pathway can be a conductive transparent channel. In an example, an electromagnetic pathway can be a wire. In an example, an electromagnetic energy pathway can be a (microfluidic) lumen which is filled with an electromagnetically-conductive liquid.

In an example, augmented reality eyewear can further comprise a series electromagnetic energy emitters and/or receivers which are in electromagnetic communication with electromagnetic energy pathways. In an example, some electromagnetic energy pathways can be in a first layer, other electromagnetic energy pathways can be in a third layer, and a reflective membrane be in (or comprise) a second layer between the first and third layers.

In an example, augmented reality eyewear can comprise a light-emitting virtual object display. In an example, a light-emitting virtual object display can be a substantially-flat two-dimensional (row and column) display. In an example, a light-emitting virtual object display can be a substantially-straight one-dimensional (row or column only) display. In an example, a substantially-straight light-emitting virtual object display can be located along a side of the reflective membrane.

In an example, a light-emitting virtual object display can comprise one or more components selected from the group consisting of: active matrix organic light-emitting diode array, projector, or display; collimated light projector or display; digital micro-mirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; microdisplay and/or microprojector; micro-display array or matrix; optoelectronic display; organic light emitting diode (OLED) array or matrix; passive matrix light-emitting diode array or matrix; photoelectric display; and transmission holographic optical element array or matrix.

In an example, selectively and rapidly moving a selected sequence of membrane areas from their first configurations to their second configurations (and back to their first configurations) can cause a sequential pattern of reflection of light rays which together form a virtual image in a person's field of view. In an example, individual areas of a reflective membrane can be selectively moved from their first configurations to second configurations one at a time. In an alternative example, perturbation of membrane area can be dynamic—causing a wave which travels through the reflective membrane in a radial manner like ripples from a stone dropped in a pond. In this alternative dynamic wave example, multiplexing (coordinating) image content with reflection location can be much more complicated than with a static perturbation area, but may be feasible.

With respect to specific components, the example of a one-eye component of augmented reality eyewear which is shown in FIGS. 5 and 6 comprises: a selectively-perturbable reflective membrane (or film) 501; an eyewear frame including upper portion 505 and lower portion 506 which is configured hold the reflective membrane in front of a person's eye; a light-emitting virtual object display 504 which emits rays of light which are configured to collectively form a virtual object in the person's field of view; electromagnetic energy emitters 502 and 503 which are in electromagnetic communication with the reflective membrane, wherein transmission of electromagnetic energy 507 and 508 through selected electromagnetic energy pathways causes a selected membrane area 509 of the reflective membrane to change from a first configuration to a second configuration, or vice versa; wherein the selected membrane area reflects a first level of light rays from the light-emitting virtual object display toward the person's eye in the first configuration; wherein the selected membrane area reflects a second level of light rays from the light-emitting virtual object display toward the person's eye in the second configuration; and wherein the second level is (at least 50%) greater than the first level.

In FIG. 5, transmission of electromagnetic energy 507 and 508 through electromagnetic energy pathways causes membrane area 509 to change from its first configuration to its second configuration. As shown on the right side of FIG. 5, transmission of electromagnetic energy 507 and 508 causes membrane area 509 to bulge towards the person's eye, thereby reflecting ray of light 511 from the light-emitting virtual object display 504 toward the person's eye. Rays of light from the person's environment, such as 512, travel substantially undistorted through the array. In an example, (part of) the image of a virtual object is superimposed over the person's view of the environment at membrane area 509. In FIG. 5, the reflective membrane is protected within a transparent housing 510.

In FIG. 6, application of electromagnetic energy 601 and 602 in different locations causes a different membrane (or film) area 603 to change from its first configuration to its second configuration. As shown on the right side of FIG. 6, transmission of electromagnetic energy 601 and 602 causes membrane area 603 to bulge towards the person's eye, thereby reflecting ray of light 604 from the light-emitting virtual object display 504 toward the person's eye. Rays of light, such as 605, from the person's environment travel substantially undistorted through the array. In an example, (part of) the image of a virtual object is superimposed over the person's view of the environment at membrane area 603.

Advantageously, the ability to selectively control different areas in a reflective membrane can enable multiplexing. For example, a light-emitting virtual object display can display portions of a virtual image in a sequence which is timed with a sequence of moved membrane areas. The example shown in FIGS. 5 and 6 can also comprise one or more components selected from the group consisting of: battery, energy transducer, or other power source; data processor; data transmitter and/or receiver; electromagnetic actuator, actuator array, vibrator, or vibrator array; photo-acoustic array; MEMS array; micro-hydraulic or micro-pneumatic array; sound-emitting speaker or speaker array; and lens or lens array. Example variations discussed in other portions of this disclosure or priority-linked disclosures can also be applied to this example where relevant, but are not repeated here in order to reduce narrative redundancy.

Figure 7:
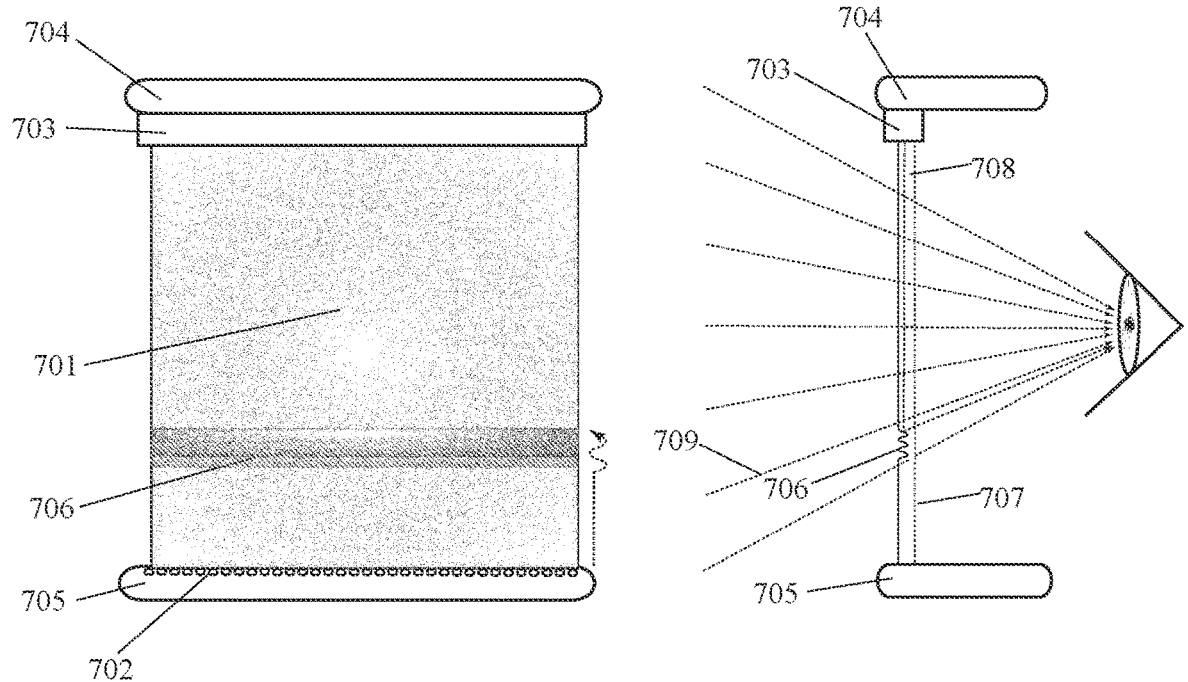
FIGS. 7 and 8 show sequential views of a selectively-undulating reflective membrane.
Figure 8:
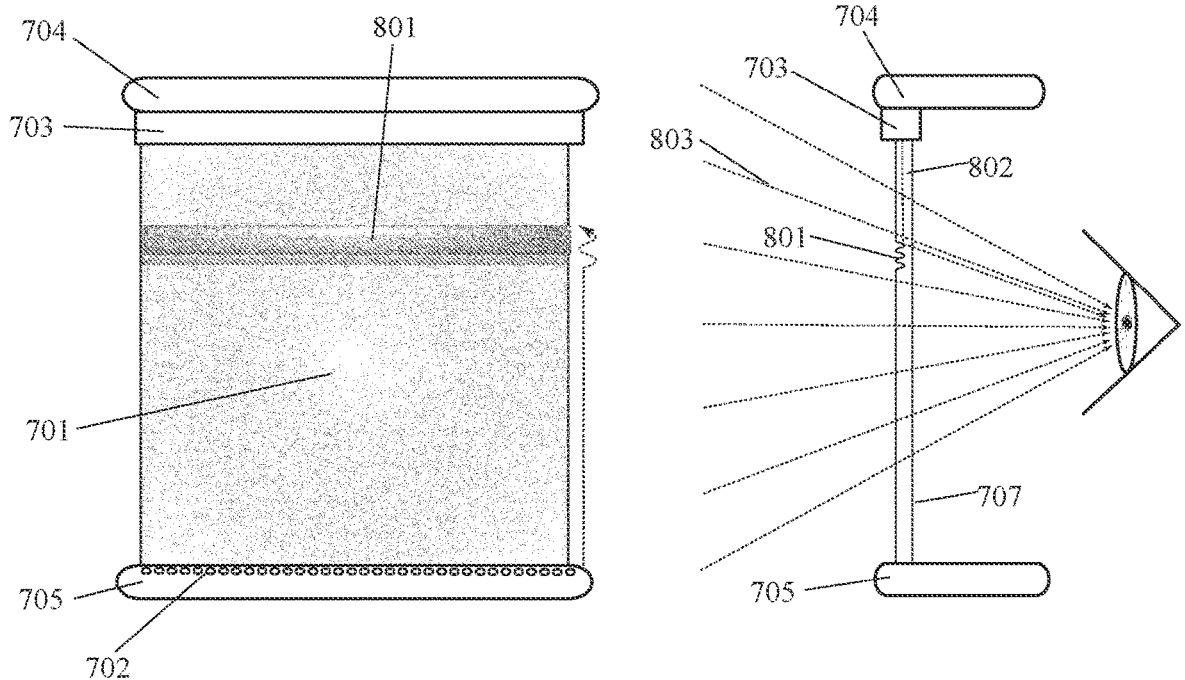

FIGS. 7 and 8 show two views, at two different times, of a single-eye optical structure (e.g. smart lens) for augmented reality eyewear with a flexible undulating reflective membrane. These figures show one such optical structure (e.g. one smart lens) in front of one eye. In an example, augmented eyewear can include a pair of such optical structures, one for each eye. FIGS. 7 and 8 both show upper and lower portions of a frame (e.g. eyewear frame) around the perimeter of the optical structure. In an example, an eyewear frame can also have lateral side portions which also hold the lateral sides of the perimeter of the optical structure. The left sides of FIGS. 7 and 8 show frontal views of the optical structure. The right sides of FIGS. 7 and 8 show lateral cross-sectional side views of this optical structure.

In an example, an undulation or wave can propagate through a flexible reflective membrane with a generally-linear wave front, like an ocean wave approaching the shore. In an example, an undulation or wave traveling through a flexible reflective membrane can comprise a moving (ridge-shaped) wave front which reflects rays of light from a light-emitting display toward a person's eye at different locations at different times. In an example, image content from a light-emitting display can be coordinated (e.g. multiplexed) with these changing reflection locations in order to create a composite image of a virtual object in the person's field of view. In an example, a series of lines (e.g. rows or columns) of a virtual image can be reflected at different times from different locations in order to create a composite reflected image of a virtual object in the person's field of view. This virtual object can be superimposed on (or combined with) the person's view of their environment.

In an example, a propagated undulation or wave in a flexible reflective membrane can be initiated along the edge of the membrane by one or more electromagnetic actuators or vibrators. In an example, an undulation or wave can be initiated by a linear array of electromagnetic actuators or vibrators. In an example, an undulation or wave can be initiated along the edge of the membrane by a row or column of electromagnetic actuators or vibrators. In an example, an undulation or wave can be initiated by an array of MEMS actuators or vibrators. In an example, an undulation or wave in a reflective membrane can be initiated at the side of a flexible reflective membrane which is farthest from a light-emitting display. In an example, as the undulation or wave propagates through the flexible reflective member toward a light-emitting display, rays of light from the light-emitting display are reflected toward a person's eye from the wave front of the undulation or wave.

FIG. 7 shows an optical structure at a first point in time wherein an undulation or wave propagating through a flexible reflective membrane 701 has reached a first location 706 and reflects a first set of light rays 708 of a virtual image toward a person's eye. FIG. 8 shows this same optical structure at a second point in time wherein the undulation or wave propagating through the flexible reflective membrane has traveled to a second location 801 and reflects a second set of light rays 802 of the virtual image toward the person's eye. These are just two locations along the path of the undulation or wave. In an example, an undulation or wave starts along the side of the reflective membrane which is farthest from the light-emitting member and propagates until it ends at the side of the reflective membrane which is closest to the light-emitting member. In an example, when one wave ends at the closest side, another wave is initiated at the farthest side.

FIGS. 7 and 8 can also be described as showing two sequential views of a single-eye component of augmented reality eyewear comprising a flexible undulating reflective membrane, wherein a first (ridge-shaped) area of the membrane reflects a first set of rays of light of a virtual image toward a person's eye at a first point in time (as shown in FIG. 7) and wherein a second (ridge-shaped) area of the membrane reflects a second set of rays of light of the virtual image toward the person's eye at a second point in time (as shown in FIG. 8).

In an example, areas of a reflective membrane which are not undulated by a traveling wave at a given time are substantially flat and allow rays of light from the environment to pass through them without substantial distortion. In an example, areas of the reflective membrane which are not undulated by the traveling wave at a given time are substantially perpendicular to a person's line of sight. In an example, areas of the reflective membrane which are undulated by the traveling wave at a given time are arcuate and superimpose (or combine) rays of light from a light-emitting virtual object display over (with) rays of light from the environment. In an example, an area of the reflective membrane is not undulated (is flat) when it is in its first configuration and is undulated (is arcuate) when it is in its second configuration.

In an example, an undulation or wave which is propagated through a flexible reflective membrane can be created by exposing the reflective membrane to electromagnetic energy. In an example, an undulation or wave can be created by exposing the membrane to transmission of electromagnetic energy. In an example, an undulation or wave which is propagated through a flexible reflective membrane can be created by one or more electromagnetic actuators (or vibrators) which create oscillations (or vibrations) in the reflective membrane. In an example, one or more electromagnetic actuators (or vibrators) create oscillations (or vibrations) along an edge of the reflective membrane. In an example, one or more electromagnetic actuators (or vibrators) create oscillations (or vibrations) along the edge of the reflective membrane which is farthest from a light-emitting virtual object display. In an example, an undulation or wave can be created by a MEMS array. In an example, an undulation or wave can be created by one or more sonic energy emitters (e.g. speakers). In an example, an undulation or wave can be created by a micro-hydraulic or micro-pneumatic array.

FIGS. 7 and 8 can also be described as showing two sequential views of a single-eye component of augmented reality eyewear with an undulating reflective membrane, wherein at least one area of the reflective membrane is selectively-moved from a first configuration in which the area does not reflect rays of light of a virtual image toward a person's eye to a second configuration in which the area does reflect rays of light of the virtual image toward the person's eye. The ability to selectively change membrane areas from their first configurations to their second configurations, and vice versa, can be advantageous because it can allow light rays from a light-emitting virtual object display (such as one located along an edge of the membrane) to reach any area of the reflective membrane at given time without those light rays being blocked by areas which are closer to the light-emitting virtual object display.

FIGS. 7 and 8 can be also described as showing a single-eye component of augmented reality eyewear comprising: a quadrilateral array of individually-movable membrane areas which is configured to be worn in front of a person's eye; and a light-emitting virtual object display which emits rays of light which collectively create a virtual image in the person's field of view; wherein an area of the reflective membrane can have a first configuration in which the area does not block light from the light-emitting virtual object display from reaching other areas which are farther from the light-emitting virtual object display and does not reflect those rays of light toward the person's eye; and wherein the area of the reflective membrane can have a second configuration in which the area does block light from the light-emitting virtual object display from reaching other areas which are farther from the light-emitting virtual object display and does reflect those rays of light toward the person's eye. In an example, a selected area of the reflective membrane can be changed from its first configuration to its second configuration by exposure to localized electromagnetic energy, sonic energy, or pneumatic energy.

In an example, a flexible reflective membrane can be partially-reflective. In an example, a reflective membrane can be a flexible partially-reflective mirror. In an example, a reflective membrane can be flat when it is not undulating. In an example, an undulating reflective membrane can be held in a gas or fluid. In an example, an area can be suspended in a magnetic field. In an example, an undulating reflective membrane can be elastic, flexible, and/or stretchable. In an example, an undulating reflective membrane can be held in tension. In an example, an undulating reflective membrane can have a width between 1 mm and 5 mm. In an example, an undulating reflective membrane can have a width between 0.02 mm and 2 mm. In an example, an undulating reflective membrane can have a width between 0.001 mm and 0.05 mm. In an example, an undulating reflective membrane can have a width between 1 and 20 microns.

In an example, the frequency of an undulating wave propagated through a flexible reflective membrane can be set or adjusted in order to multiplex imaging of a virtual object in a person's field of view. In an example, the amplitude of an undulating wave propagated through a flexible reflective membrane can be set or adjusted in order to multiplex imaging of a virtual object in a person's field of view. In an example, the frequency, amplitude, and/or timing of an undulating wave which is propagated through a flexible reflective membrane can be set or adjusted in order to create a virtual object in a particular location in a person's field of view. In an example, the frequency, amplitude, and/or timing of an undulating wave which is propagated through a flexible reflective membrane can be set or adjusted based on the measured distance from a reflective membrane to a person's eye.

In an example, a light-emitting virtual object display can comprise one or more components selected from the group consisting of: active matrix organic light-emitting diode array, projector, or display; collimated light projector or display; digital micro-mirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; microdisplay and/or microprojector; micro-display array or matrix; optoelectronic display; organic light emitting diode (OLED) array or matrix; passive matrix light-emitting diode array or matrix; photoelectric display; and transmission holographic optical element array or matrix.

With respect to specific components, the one-eye component of augmented reality eyewear which is shown in FIGS. 7 and 8 comprises: a flexible reflective membrane (or film) 701; an eyewear frame including upper portion 704 and lower portion 705 which is configured hold the flexible reflective membrane in front of a person's eye; a light-emitting virtual object display 703 which emits rays of light which are configured to collectively form a virtual object in the person's field of view; one or more actuators and/or vibrators 702 which initiate an undulation or wave which travels through the flexible reflective membrane; wherein a selected membrane area reflects a first level of light rays from the light-emitting virtual object display toward the person's eye in a first configuration; wherein the selected membrane area reflects a second level of light rays from the light-emitting virtual object display toward the person's eye in a second configuration; wherein the second level is (at least 50%) greater than the first level; and wherein the selected membrane area is changed from the first configuration to the second configuration by the undulation or wave traveling through the flexible reflective membrane.

In FIG. 7, movement of actuators and/or vibrators 702 has initiated an undulation or wave in reflective membrane 701 which has traveled to membrane area 706. As shown on the right side of FIG. 7, the wave front of this undulation or wave has caused membrane area 706 to bulge, curve, and/or oscillate towards the person's eye, thereby reflecting ray of light 708 from light-emitting virtual object display 703 toward the person's eye. Rays of light from the person's environment, such as 709, travel substantially undistorted through the array. In an example, (part of) the image of a virtual object is superimposed over the person's view of the environment at membrane area 706. In FIG. 7, the reflective membrane is protected within a transparent housing 707.

In FIG. 8, the undulation or wave which was introduced in FIG. 7 has now traveled to membrane area 801. As shown on the right side of FIG. 8, membrane area 801 now bulges, curves, and/or oscillates towards the person's eye, thereby reflecting ray of light 802 from the light-emitting virtual object display 703 toward the person's eye. Rays of light, such as 803, from the person's environment travel substantially undistorted through the array. In an example, (part of) the image of a virtual object is superimposed over the person's view of the environment at membrane area 801.

Advantageously, the ability to selectively control different areas in a reflective membrane can enable multiplexing. For example, a light-emitting virtual object display can display portions of a virtual image in a sequence which is timed with the changing positions of the wave front of an undulation or wave traveling through the reflective membrane. The example shown in FIGS. 7 and 8 can also comprise one or more components selected from the group consisting of: battery, energy transducer, or other power source; data processor; data transmitter and/or receiver; electromagnetic actuator, actuator array, vibrator, or vibrator array; photoacoustic array; MEMS array; micro-hydraulic or micro-pneumatic array; sound-emitting speaker or speaker array; and lens or lens array. Example variations discussed in other portions of this disclosure or priority-linked disclosures can also be applied to this example where relevant, but are not repeated here in order to reduce narrative redundancy.

Figure 9:
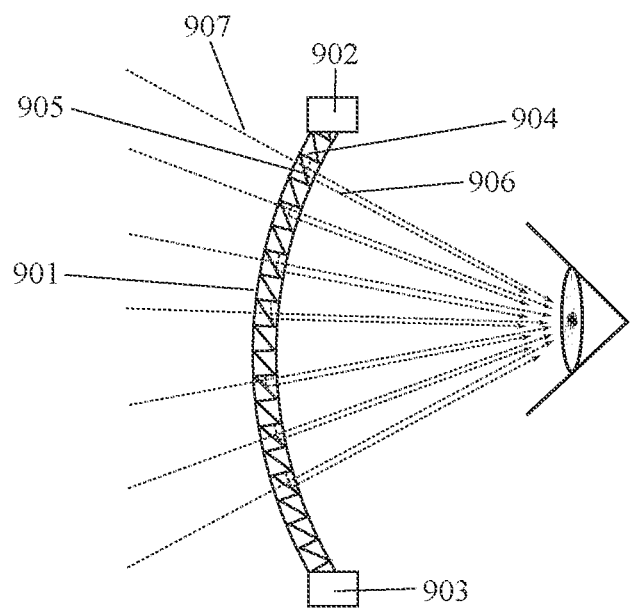
FIG. 9 shows a concave lens with a sawtooth series of light-emitting segments and reflective segments.

FIG. 9 shows a lateral cross-sectional view of an arcuate lens 901 (for one eye) as part of augmented reality eyewear. This arcuate lens has a sawtooth (e.g. zigzag) shaped internal component comprising an alternating sequence of thin light-emitting segments (including 904) and partially-reflective segments (including 905). In an example, the thin light-emitting segments can be configured to be substantially parallel to vectors which extend radially outward from a central location in the person's eye. With these orientations, the thin light-emitting segments do not substantively interfere with the transmission of environmental light rays (including 907) through the lens.

The partially-reflective segments are configured to form acute forward-facing angles as they intersect the above-defined vectors. In an example, these acute angles can be 45-degree angles. In an example, these angles can be between 30 and 60 degrees. Rays of light (including 906) emitted from the light-emitting segments are partially reflected by the partially-reflective segments toward the person's eye. Rays of light from multiple light-emitting segments combine to form a virtual object in the person's field of view. FIG. 9 also shows upper and lower portions (902 and 903) of an eyewear frame holding the arcuate lens in front of the person's eye. In an example, a partially-reflective segment can comprise a partially-reflective mirror. In an example, a partially-reflective segment can comprise a partially-reflective coating within the arcuate lens.

In an example, thin light-emitting segments can have longitudinal axes which are substantially parallel to vectors extending outward from the focal point of a concave arcuate lens. In an example, thin light-emitting segments can have longitudinal axes which are substantially perpendicular to the proximal (eye-facing) surface of an arcuate lens. In an example, thin light-emitting segments can have longitudinal axes which are substantially perpendicular to the distal (farthest from eye) surface of an arcuate lens. In an example, an array of light-emitting segments can collectively display a virtual object in a person's field of view. In an example, a partially-reflecting segment can combine rays of light from a proximal thin light-emitting segment with rays of light from the environment, thereby making a portion of a virtual object appear to be part of the environment in the person's field of view.

In an example, a thin light-emitting segment can have a width between 0.02 mm and 2 mm. In an example, a thin light-emitting segment can have a width between 0.001 mm and 0.05 mm. In an example, a thin light-emitting segment can have a width between 1 and 20 microns. In an example, there can be multiple light-emitting segments across the width of an arcuate lens. In an example, there can be a single light-emitting segment which spans the entire width of an arcuate lens. In an example, there can be multiple light-emitting segments spanning the height of an arcuate lens. In an example, there can be a single light-emitting segment which spans the entire height of an arcuate lens. In an example, a thin light-emitting segment can comprise a single light emitter. In an example, a thin light-emitting segment can comprise a horizontal row of light emitters which spans the entire width of the arcuate lens. In an example, a thin light-emitting segment can comprise a vertical column of light emitters which spans the entire height of the arcuate lens.

In an example, a light-emitting segment can comprise one or more components selected from the group consisting of: active matrix organic light-emitting diode array, projector, or display; collimated light projector or display; digital micro-mirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; micro-display and/or microprojector; micro-display array or matrix; optoelectronic display; organic light emitting diode (OLED) array or matrix; passive matrix light-emitting diode array or matrix; photoelectric display; and transmission holographic optical element array or matrix.

In an example, a partially-reflective segment can have a width between 0.02 mm and 2 mm. In an example, a partially-reflective segment can have a width between 0.001 mm and 0.05 mm. In an example, a partially-reflective segment can have a width between 1 and 20 microns. In an example, there can be multiple partially-reflective segments across the width of an arcuate lens. In an example, there can be a single partially-reflective segment which spans the entire width of an arcuate lens. In an example, there can be multiple partially-reflective segments spanning the height of an arcuate lens. In an example, there can be a single partially-reflective segment which spans the entire height of an arcuate lens.

In an example, an arcuate central longitudinal axis of a virtual line which is drawn to connect the centroids of the light-emitting segments can be substantially parallel to the distal surface of the arcuate lens. In an example, this arcuate central longitudinal axis can be substantially parallel to the proximal surface of the arcuate lens. In an example, an arcuate central longitudinal axis of a virtual line which is drawn to connect the centroids of the partially-reflective segments can be substantially parallel to the distal surface of the arcuate lens. In an example, this arcuate central longitudinal axis can be substantially parallel to the proximal surface of the arcuate lens.

The arcuate lens (e.g. "smart lens") shown in this example can enable projection of virtual objects in a person's field of view with a relatively compact and unobtrusive eyewear design. Ideally, individual light-emitting segments in an array of light-emitting segments can be individually controlled and can display different content in order to collectively create the image of a virtual object. However, this design does present some challenges. For example, if the light-emitting segments are not sufficiently thin, then they may interfere with the person's view of the environment. Also, if the light-emitting segments are to be powered through wires or other electromagnetic pathways, then these wires or pathways must be sufficiently small or transparent so as not to interfere with the person's view of the environment. Also, the resolution of the virtual image is limited by the number and/or density of pairs of light-emitting and partially-reflecting segments in the sawtooth component of the arcuate lens. Having said this, with advances in microscale and transparent electronic components, these challenges may be addressed and this design may be able to provide augmented reality functionality in ordinary-looking eyewear.

In an example, a smart lens can further comprise a distal corrective portion which corrects for distortions of environmental light rays which would otherwise occur due to the alternating sequence of thin light-emitting segments and partially-reflective segments. This example can also comprise one or more components selected from the group consisting of: battery, energy transducer, or other power source; data processor; and data transmitter and/or receiver. Example variations discussed in other portions of this disclosure or priority-linked disclosures can also be applied to this example where relevant, but are not repeated here in order to reduce narrative redundancy.

Figure 10:
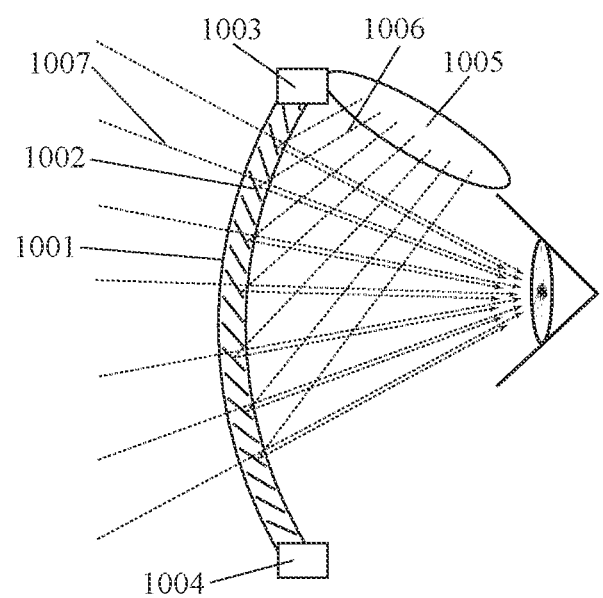
FIG. 10 shows a concave lens with a series of diagonal reflective surfaces.

FIG. 10 shows a cross-sectional side view of an example of an arcuate lens 1001 which is part of augmented reality eyewear. This arcuate lens comprises a discontinuous series of diagonal partially-reflective surfaces including 1002. This example also includes a light-emitting virtual object display 1005 which is between the arcuate lens and the person's head. Rays of light (including 1006) from the light-emitting virtual object display 1005 are reflected by the discontinuous series of diagonal partially-reflective surfaces toward the person's eye. These rays of light collectively display a virtual object in the person's field of view. Rays of light from the environment (including 1007) pass through the lens.

In this example, partially-reflective surfaces in the discontinuous series of diagonal partially-reflective surfaces are configured to form acute forward-facing angles as they intersect vectors which extend radially outward from a central location in the person's eye. In an example, these acute angles can be 45-degree angles. In an example, these angles can be between 30 and 60 degrees. In this example, there are gaps between the partially-reflective surfaces. In an example, a gap between partially-reflective surfaces can be sufficiently large to allow passage of at least one vector which extends radially outward from a central location in the person's eye (without passing through a partially-reflective surface).

In an example, a partially-reflective surface can be a partially-reflective mirror. In an example, a partially-reflective surface can be an area with a partially-reflective coating. In an example, a partially-reflective surface can have a width between 0.02 mm and 2 mm. In an example, a partially-reflective surface can have a width between 0.001 mm and 0.05 mm. In an example, a partially-reflective surface can have a width between 1 and 20 microns.

In an example, there can be multiple partially-reflective surfaces across the right-to-left width of an arcuate lens. In an example, there can be a single partially-reflective surface which spans the entire width of an arcuate lens. In an example, there can be multiple partially-reflective surfaces spanning the height of an arcuate lens. In an example, there can be a single partially-reflective surface which spans the entire height of an arcuate lens. In an example, an arcuate central longitudinal axis of a virtual line which is drawn to connect the centroids of the discontinuous series of diagonal partially-reflective surfaces can be substantially parallel to the distal surface of the arcuate lens. In an example, this arcuate central longitudinal axis can be substantially parallel to the proximal surface of the arcuate lens.

In an example, as viewed from a lateral cross-sectional perspective, the configuration of a discontinuous series of diagonal partially-reflective surfaces can be described as the result of the following steps: (a) start with an arcuate line which is substantially parallel to the proximal or distal surface of an arcuate lens; (b) slice this arcuate line into a series of substantially equal-length segments; and (c) rotate each of the segments around their centroid by an angle in the range of 30 to 60 degrees.

In an example, the configuration of a discontinuous series of diagonal partially-reflective surfaces can also be described as an arcuate series of reflective Venetian blinds wherein there is vertical (top-to-bottom) variation in the distance of individual blinds from a vertical plane. In an example, blinds in the center of the arcuate series can be farther from a person's head than blinds at the top and bottom of the arcuate series, or vice versa.

In an example, the configuration of a discontinuous series of diagonal partially-reflective surfaces can also be described as an arcuate series of reflective Venetian blinds wherein there is vertical (top-to-bottom) variation in the angle of individual blends with respect to a horizontal plane. In an example, blinds at the top of the arcuate series can intersect a horizontal plane at a larger angle than blinds at the bottom of the arcuate series, or vice versa. In an example, a central longitudinal axis of an individual blind can be horizontal.

In an example, a light-emitting virtual object display can comprise one or more components selected from the group consisting of: active matrix organic light-emitting diode array, projector, or display; collimated light projector or display; digital micro-mirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; microdisplay and/or microprojector; micro-display array or matrix; optoelectronic display; organic light emitting diode (OLED) array or matrix; passive matrix light-emitting diode array or matrix; photoelectric display; and transmission holographic optical element array or matrix.

FIG. 10 also shows upper and lower portions (1003 and 1004) of an eyewear frame which is configured to hold an arcuate lens in front of a person's eye. In an example, a smart lens can further comprise a distal corrective portion which corrects for distortions of environmental light rays which would otherwise occur due to the discontinuous series of diagonal partially-reflective surfaces. This example can also comprise one or more components selected from the group consisting of: battery, energy transducer, or other power source; data processor; and data transmitter and/or receiver. Example variations discussed in other portions of this disclosure or priority-linked disclosures can also be applied to this example where relevant, but are not repeated here in order to reduce narrative redundancy.

Figure 11:
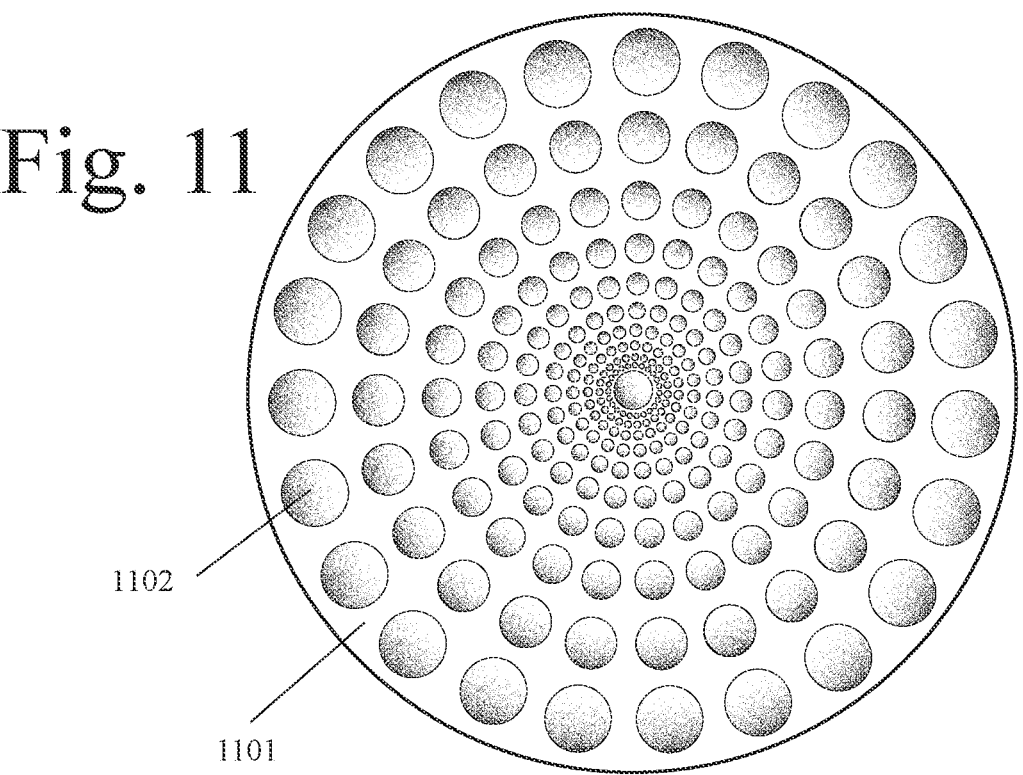
FIGS. 11 and 12 show sequential views of a spoke-and-ring array of reflective elements with different orientations.
Figure 12:
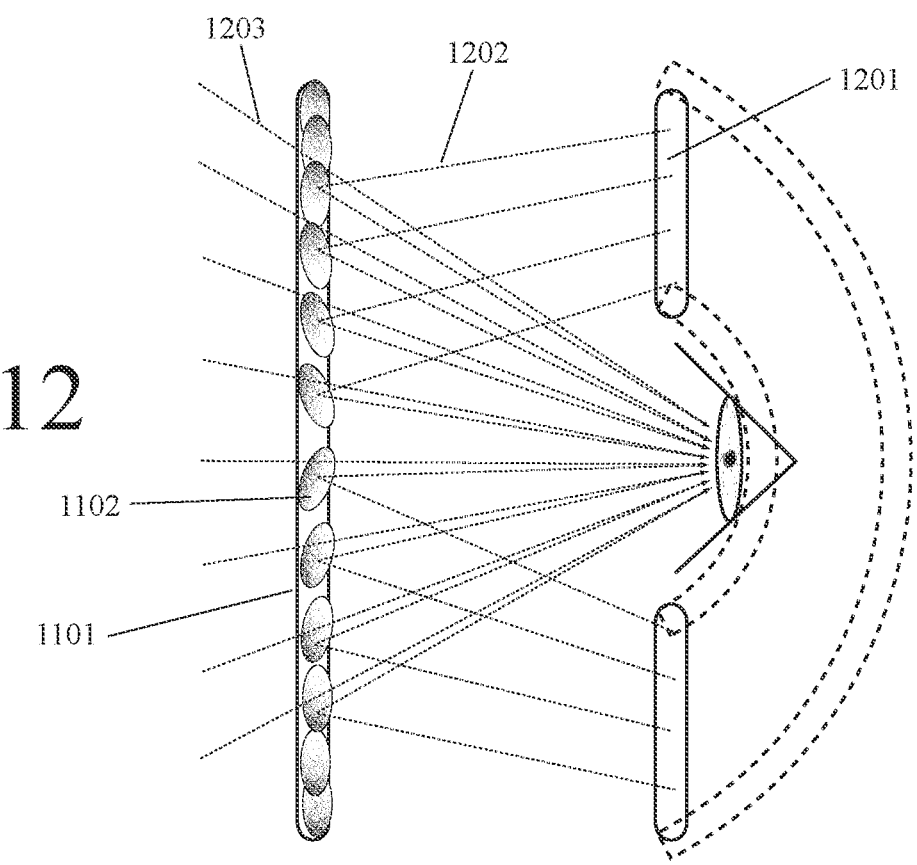

FIGS. 11 and 12 show an optical structure for one eye of augmented reality eyewear comprising: a smart lens 1101 with a radial array (e.g. spoke and ring array) of partially-reflective areas (such as 1102) with different proximal surface reflective orientations; and an annular light-emitting virtual object display 1201 which encircles a person's eye and projects rays of light (including 1202) toward the smart lens. Rays of light (including 1202) from the light-emitting virtual object display collectively display a virtual object in the person's field of view. Rays of light from the environment (including 1203) pass through the smart lens to the person's eye. FIG. 11 shows this optical structure from a frontal perspective. FIG. 12 shows this optical structure from a lateral cross-sectional perspective. In an example, this eyewear can also comprise a frame to hold the smart lens and the annular light-emitting virtual object display near the person's eye, but such a frame is not shown in these figures.

In an example, there can be a central hole (or transparent disk) in the annular (e.g. toroidal, ring-shaped) light-emitting virtual object display. In an example, this central hole or opening can be positioned in front of the person's eye so that the person can see through it. Since there are no light-emitting components in this central hole, if the proximal surfaces of the partially-reflective areas in the smart lens all had the same orientation, then there would be a central hole in the display of virtual images in the person's field of view. To avoid this, partially-reflective areas can have different orientations to reflect rays of light from the light-emitting display toward the person's eye at different angles. In this manner, rays of light from portions of the light-emitting display which surround the central hole can fill the hole which would otherwise appear in virtual images. In an example, the proximal (eye-facing) surface of some or all of the partially-reflective areas can be tilted away from the center (e.g. toward the perimeter) of the smart lens. In an example, partially-reflective areas toward the center of the smart lens can be more tilted than partially-reflective areas toward the periphery of the smart lens.

In an example, central rings in a radial array (e.g. spoke and ring array) of partially-reflective areas can be defined as rings which are less than "X" distance from the center of the radius, wherein "X" distance is defined as 20% of the length of the lens diameter. In an example, peripheral rings in a radial array of partially-reflective areas can be defined as rings which are more than "Y" distance from the center of the radius, wherein "Y" distance is defined as 40% of the length of the lens diameter. In an example, the surfaces of partially-reflective areas in a central ring can have a first orientation and the surfaces of partially-reflective areas in a peripheral ring can have a second orientation, wherein the first and second orientations differ by at least 10 degrees relative to a common plane. In an example, the first and second orientations can differ by more than 10 degrees and less than 40 degrees. In an example, the first and second orientations can differ by more than 30 degrees and less than 60 degrees.

In an example, partially-reflective areas in a radial array can be radially symmetric with respect to location, size, and/or orientation. In an example, a radial array of partially-reflective areas can comprise at least 5 rings and at least 5 spokes. In an example, a radial array of partially-reflective areas can comprise at least 10 rings and at least 10 spokes. In an example, a radial array of partially-reflective areas can comprise at least 50 rings and at least 50 spokes.

In an example, a partially-reflective area can be a partially-reflective mirror. In an example, a partially-reflective area can have a shape which is selected from the group consisting of: circular; square; rhomboid, rectangular, or trapezoidal; and hexagonal. In an example, there can be non-reflective gaps between partially-reflective areas. In an example, there can be a percentage of the proximal cross-sectional area of a smart lens which is covered by partially-reflective areas (i.e. as a percentage of the total cross-sectional area of the smart lens which includes both partially-reflective areas and the gaps between these areas). In an example, this percentage can be between 25% and 75%. In an example, this percentage can be between 60% and 90%.

In an example, partially-reflective areas can be closer together in outer rings of a radial array of partially-reflective areas. In an example, partially-reflective areas can be larger in outer rings of a radial array of partially-reflective areas. In an example, a radial array can have an overall circular (or elliptical or oval) shape. In an example, a smart lens which holds a radial array of partially-reflective areas can be substantially flat. In an example, a smart lens which holds a radial array of partially-reflective areas can be convex. In an example, a smart lens which holds a radial array of partially-reflective areas can be concave. In an example, a smart lens which holds a radial array of partially-reflective areas can be planoconvex or planoconcave.

In an example, all partially-reflective areas in a radial array can be the same size. In an example, partially-reflective areas toward the center of the radial array can be smaller than partially-reflective areas toward the periphery of the radial array. In an example, all partially-reflective areas in a radial array can have the same shape. In an example, partially-reflective areas in a radial array can have different shapes. In an example, partially-reflective areas can be quadrilateral. In an example, partially-reflective areas can be circular. In an example, partially-reflective areas can be hexagonal. In an example, there can be non-reflective gaps between partially-reflective areas in an array. In an example, partially-reflective areas toward the center of the radial array can be closer together than partially-reflective areas toward the periphery of the radial array.

In an example, an annular light-emitting virtual object display can comprise one or more components selected from the group consisting of: active matrix organic light-emitting diode array, projector, or display; collimated light projector or display; digital micro-mirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; microdisplay and/or microprojector; micro-display array or matrix; optoelectronic display; organic light emitting diode (OLED) array or matrix; passive matrix light-emitting diode array or matrix; photoelectric display; and transmission holographic optical element array or matrix.

In an example, a smart lens can further comprise a distal corrective portion which corrects for distortions of environmental light rays which would otherwise occur due to the radial array of partially-reflective areas. This example can also comprise one or more components selected from the group consisting of: eyewear frame, battery, energy transducer, or other power source; data processor; and data transmitter and/or receiver. Example variations discussed in other portions of this disclosure or priority-linked disclosures can also be applied to this example where relevant, but are not repeated here in order to reduce narrative redundancy.

Figure 13:
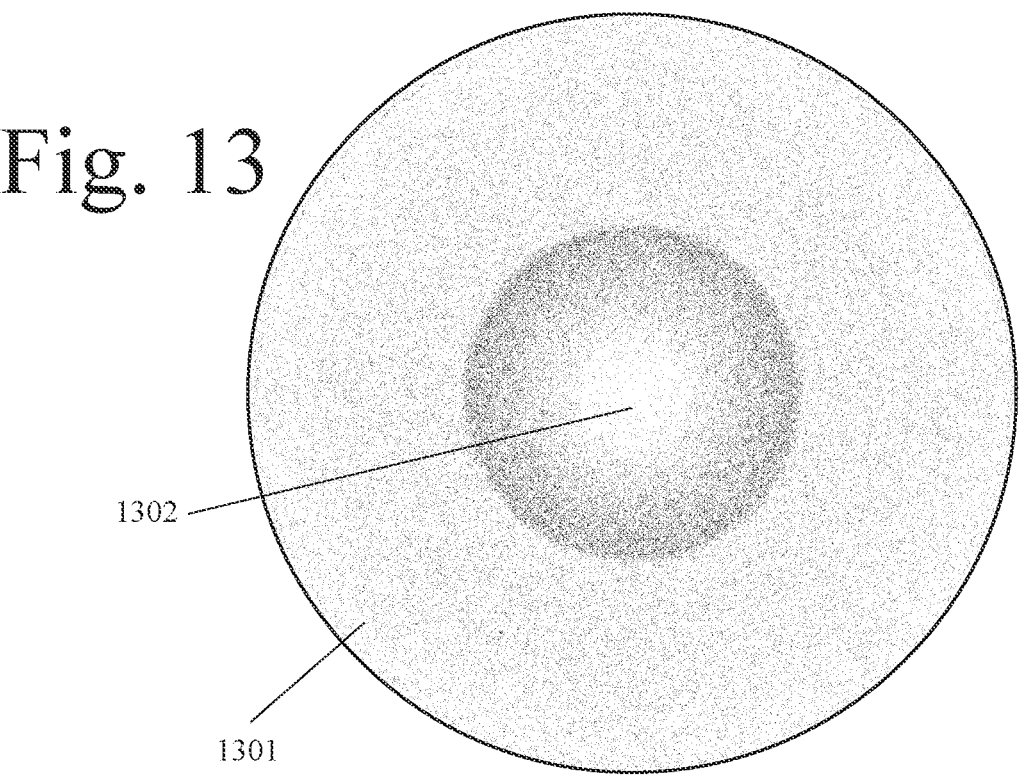
FIGS. 13 and 14 show different views of a reflective lens with a central convex portion.
Figure 14:
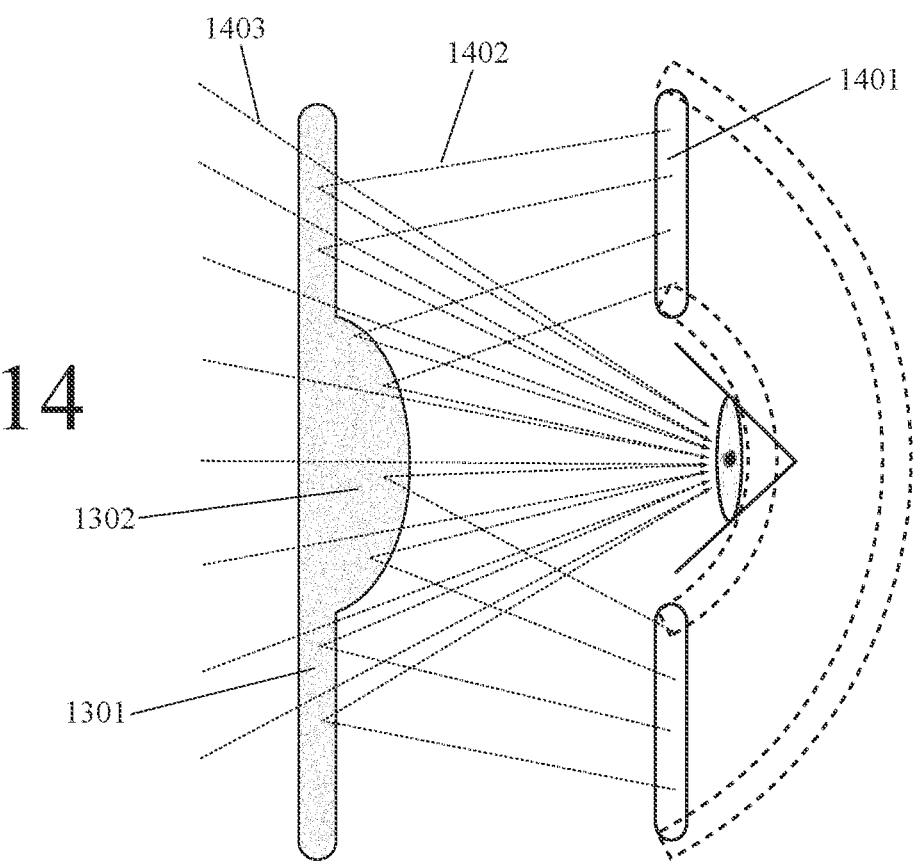

FIGS. 13 and 14 show an optical structure for one eye of augmented reality eyewear comprising: a partially-reflective lens 1301 with a central convex portion 1302; and an annular light-emitting virtual object display 1401 which encircles a person's eye and projects rays of light (including 1402) toward the partially-reflective lens. Rays of light (including 1402) from the light-emitting virtual object display collectively display a virtual object in the person's field of view. Rays of light from the environment (including 1403) pass through the partially-reflective lens to the person's eye. FIG. 13 shows this optical structure from a frontal perspective. FIG. 14 shows this optical structure from a lateral cross-sectional perspective. In an example, this eyewear can also comprise a frame to hold the partially-reflective lens and the annular light-emitting virtual object display near the person's eye, but such a frame is not shown in these figures.

In this example, there is a central hole (or transparent disk) in the annular (e.g. toroidal, ring-shaped) light-emitting virtual object display. This central hole is positioned in front of the person's eye so that the person can see through it. Since there are no light-emitting components in this hole, if the proximal surface of the partially-reflective lens were entirely flat, then there would be a hole in the display of virtual images in the person's field of view. To avoid this, the partially-reflective lens has a central convex portion which is juxtaposed to (e.g. be opposite from) the hole of the annular light-emitting virtual object display. Rays of light from portions of the light-emitting display which surround the hole of the display are reflected by the convex portion inward toward the center of the person's field of view in order to fill the central hole in the display of virtual images.

In an example, the central convex portion of the lens can have a vertical cross-sectional shape which is selected from the group consisting of: circular; elliptical; and oval. In an example, the central convex portion of the lens can have a shape which is selected from the group consisting of: half-dome; spherical section; and conic section. In an example, the central convex portion of the lens can have a diameter which is between 5% and 20% of the diameter of the lens. In an example, the central convex portion of the lens can have a diameter which is between 10% and 50% of the diameter of the lens. In an example, the distal surface of the lens can be flat and the proximal surface of the lens can be generally flat except for the central convex portion. In an example, the lens can be planoconvex. In an example, the lens can have a distal correction portion which corrects for distortion of environmental light rays which would otherwise be caused by the central convex portion of the proximal surface of the lens.

In an example, an annular light-emitting virtual object display can comprise one or more components selected from the group consisting of: active matrix organic light-emitting diode array, projector, or display; collimated light projector or display; digital micro-mirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; microdisplay and/or microprojector; micro-display array or matrix; optoelectronic display; organic light emitting diode (OLED) array or matrix; passive matrix light-emitting diode array or matrix; photoelectric display; and transmission holographic optical element array or matrix.

This example can also comprise one or more components selected from the group consisting of: eyewear frame, battery, energy transducer, or other power source; data processor; and data transmitter and/or receiver. Example variations discussed in other portions of this disclosure or priority-linked disclosures can also be applied to this example where relevant, but are not repeated here in order to reduce narrative redundancy.

Figure 15:
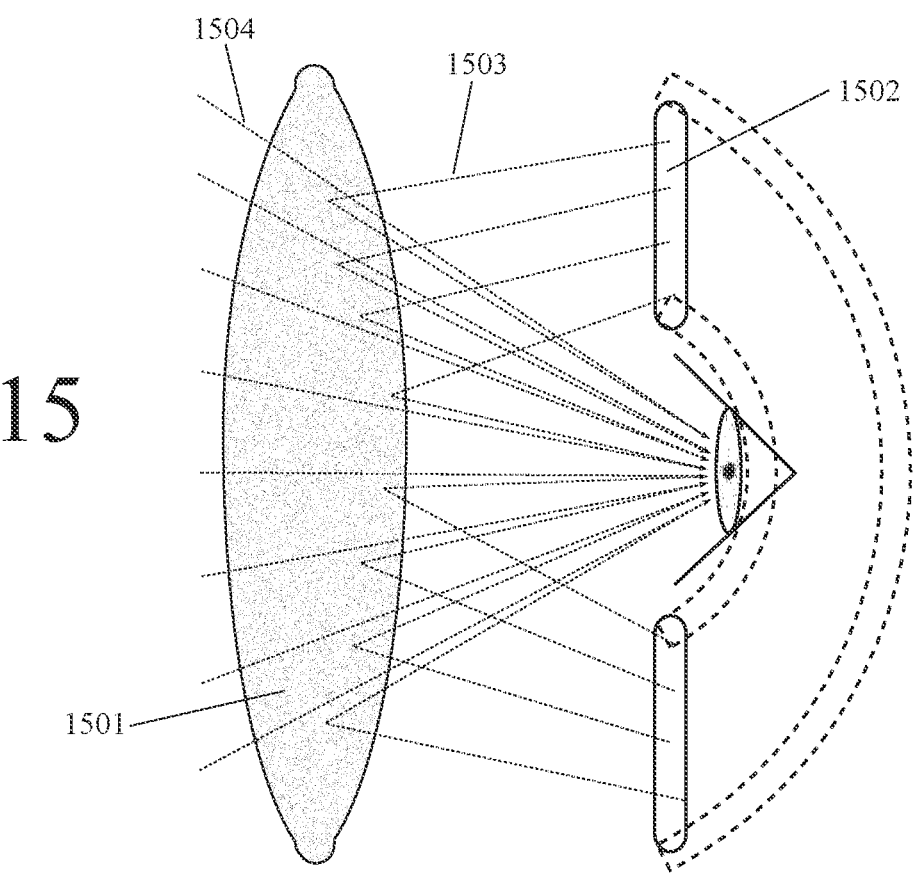
FIG. 15 shows an annular image display, with the addition of a distal convex reflective lens with a smooth surface.

FIG. 15 shows an optical structure for one eye of augmented reality eyewear comprising: an annular light-emitting virtual object display 1502 which encircles a person's eye; and a convex partially-reflective lens 1501 which is configured to reflect rays of light (including 1503) from the annular light-emitting virtual object display toward the person's eye and also transmit rays of light (including 1504) from the environment toward the person's eye. Rays of light (including 1503) from the light-emitting virtual object display collectively display a virtual object in the person's field of view. FIG. 15 shows this optical structure from a lateral cross-sectional perspective. In an example, this eyewear can also comprise a frame to hold the annular light-emitting virtual object display and lens near the person's eye, but such a frame is not shown in this figure.

In this example, there is a central hole (or transparent disk) in the annular (e.g. toroidal, ring-shaped) light-emitting virtual object display. This central hole is positioned in front of the person's eye so that the person can see through it. Since there are no light-emitting components in this hole, if the proximal surface of the partially-reflective lens were entirely flat, then there would be a hole in the display of virtual images in the person's field of view. To avoid this, the convexity of the partially-reflective lens is configured to reflect rays of light from the annular light-emitting display so as to fill the central hole in the display of virtual images. In an example, the distal portion of the lens can correct for distortion of environmental light rays which would otherwise be caused by the convexity of the proximal portion of the lens.

In an example, an annular light-emitting virtual object display can comprise one or more components selected from the group consisting of: active matrix organic light-emitting diode array, projector, or display; collimated light projector or display; digital micro-mirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; microdisplay and/or microprojector; micro-display array or matrix; optoelectronic display; organic light emitting diode (OLED) array or matrix; passive matrix light-emitting diode array or matrix; photoelectric display; and transmission holographic optical element array or matrix.

This example can also comprise one or more components selected from the group consisting of: eyewear frame, battery, energy transducer, or other power source; data processor; and data transmitter and/or receiver. Example variations discussed in other portions of this disclosure or priority-linked disclosures can also be applied to this example where relevant, but are not repeated here in order to reduce narrative redundancy.

Figure 16:
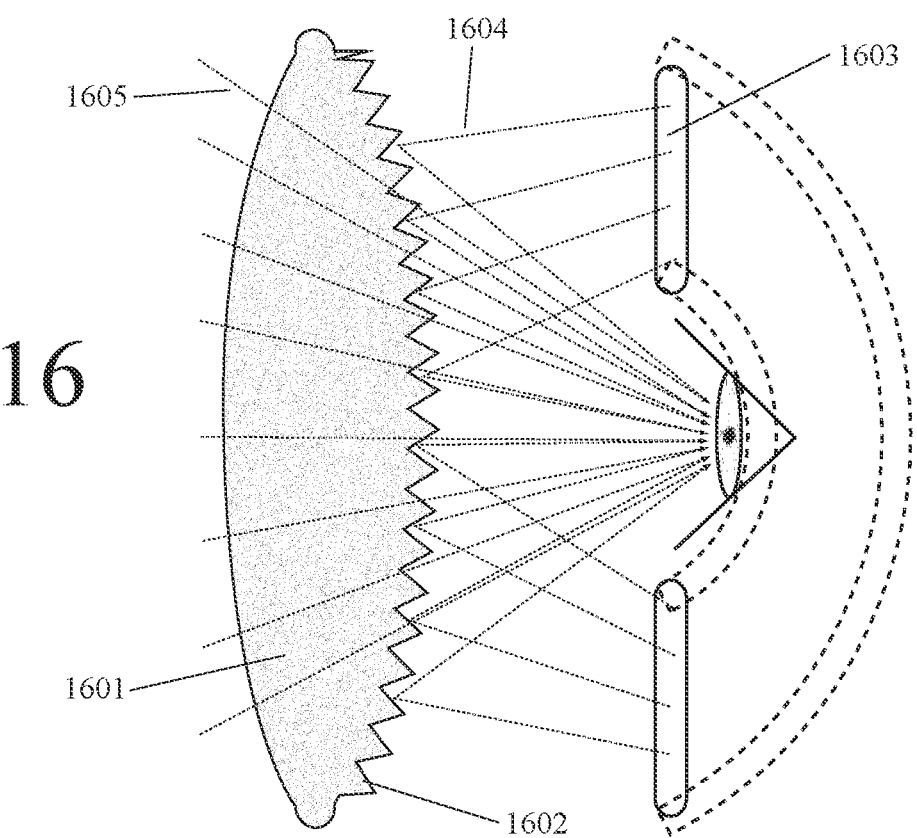
FIG. 16 shows an annular image display, with the addition of a distal convex reflective lens with a sawtooth surface.

FIG. 16 shows an optical structure for one eye of augmented reality eyewear comprising: an annular light-emitting virtual object display 1603 which encircles a person's eye; and a convex partially-reflective lens 1601 with a sawtooth (zigzag) proximal surface 1602 which is configured to reflect rays of light (including 1604) from the annular light-emitting virtual object display toward the person's eye and also transmit rays of light (including 1605) from the environment toward the person's eye. Rays of light (including 1604) from the light-emitting virtual object display collectively display a virtual object in the person's field of view. FIG. 16 shows this optical structure from a lateral cross-sectional perspective. In an example, this eyewear can also comprise a frame to hold the annular light-emitting virtual object display and lens near the person's eye, but such a frame is not shown in this figure.

In this example, there is a central hole (or transparent disk) in the annular (e.g. toroidal, ring-shaped) light-emitting virtual object display. This central hole is positioned in front of the person's eye so that the person can see through it. In an example, teeth in the sawtooth (zigzag) proximal surface of the lens are configured to reflect rays of light from portions of the annular light-emitting virtual object display toward the center of the person's field of view so as to fill a hole which would otherwise occur in the display of virtual images in the center of the person's field of view. In an example, the sawtooth (zigzag) surface can have a central arcuate longitudinal axis which is convex. In an example, the distal portion of the lens can be configured to correct for distortion of environmental light rays which would otherwise be caused by the sawtooth (zigzag) proximal surface. In an example, the proximal surface of the lens can be configured similarly to the proximal surface of a Fresnel lens.

In an example, an annular light-emitting virtual object display can comprise one or more components selected from the group consisting of: active matrix organic light-emitting diode array, projector, or display; collimated light projector or display; digital micro-mirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; microdisplay and/or microprojector; micro-display array or matrix; optoelectronic display; organic light emitting diode (OLED) array or matrix; passive matrix light-emitting diode array or matrix; photoelectric display; and transmission holographic optical element array or matrix.

This example can also comprise one or more components selected from the group consisting of: eyewear frame, battery, energy transducer, or other power source; data processor; and data transmitter and/or receiver. Example variations discussed in other portions of this disclosure or priority-linked disclosures can also be applied to this example where relevant, but are not repeated here in order to reduce narrative redundancy.

Figure 17:
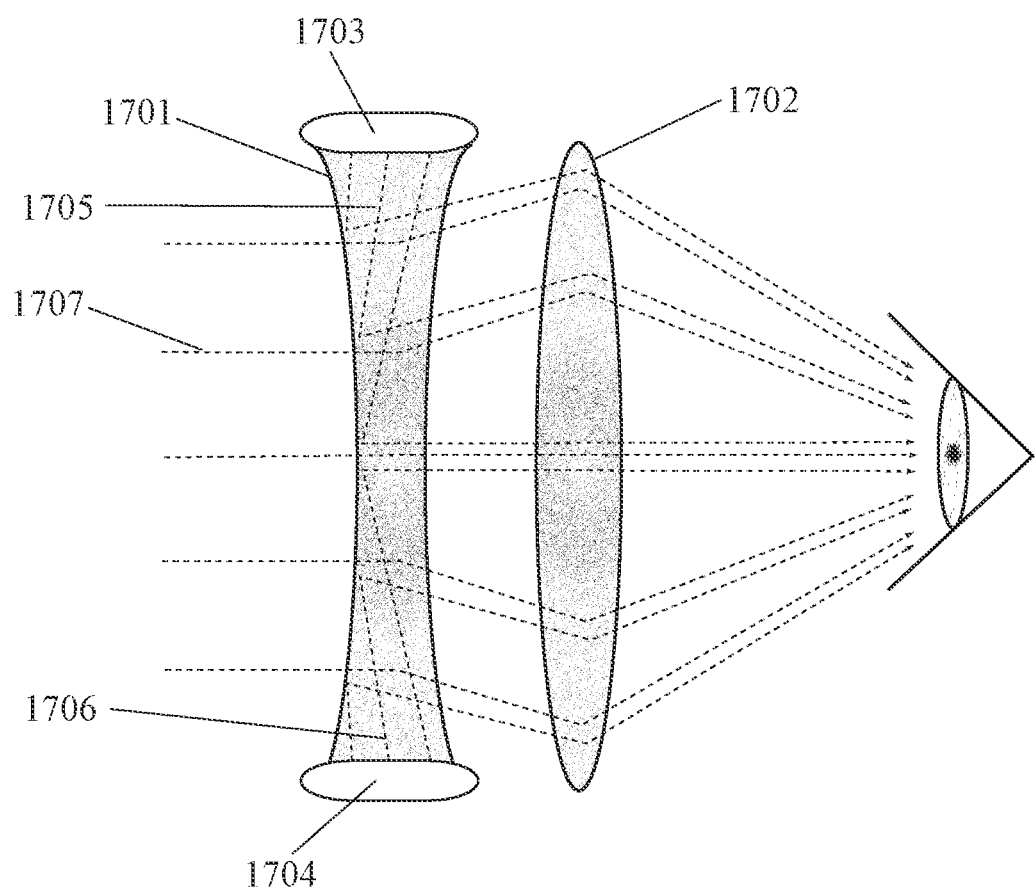
FIG. 17 shows two image displays, above and below a concave lens, with the addition of a proximal convex lens.

FIG. 17 shows an optical structure for one eye of augmented reality eyewear comprising: two light-emitting virtual object displays (1703 and 1704); a concave lens 1701; and a convex lens 1702; wherein the concave lens and the convex lens are axially aligned; wherein the two light-emitting displays emit rays of light (including 1705 and 1706) into the concave lens; and wherein the rays of light from the two light-emitting displays are redirected toward the person's eye and collectively create a virtual image in a person's field of view. Environmental light rays (including 1707) also pass through the convex lens. In an example, this eyewear can also comprise a frame to hold this optical structure near the person's eye, but such a frame is not shown in this figure.

In this example, the central axes of the concave lens and the convex lens are linearly aligned. In an example, the concave lens can be configured to be a first distance from a person's eye, the convex lens can be configured to be a second distance from the person's eye, and second distance can be less than the first distance. In an alternative example, the second distance can be greater than the first distance. In an example, rays of light from light-emitting virtual object displays can be internally reflected by the distal surface of the concave lens.

In an example, a first light-emitting virtual object display can project rays of light which form a first portion of a virtual object in a person's field of view and a second light-emitting virtual object display can project rays of light which form a second portion of the virtual object in the person's field of view. In an example, a first light-emitting virtual object display can project rays of light which are redirected by a first portion of a convex lens towards a person's eye and a second light-emitting virtual object display can project rays of light which are redirected by a second portion of the convex lens towards the person's eye. In an example, an upper portion (e.g. upper half) of a convex lens can redirect rays of light from an upper light-emitting virtual object display toward a person's eye and a lower portion (e.g. lower half) of a convex lens can redirect rays of light from a lower light-emitting virtual object display toward the person's eye. In an example, an right portion (e.g. right half) of a convex lens can redirect rays of light from a right-side light-emitting virtual object display toward a person's eye and a left portion (e.g. left half) of a convex lens can redirect rays of light from a left-side light-emitting virtual object display toward the person's eye.

In an example, light rays from light-emitting virtual object projectors can be first directed into a concave lens before entering a convex lens. In an example, light rays from light-emitting virtual object projectors can be redirected by the distal surface of the concave lens into the convex lens, from which they travel to a person's eye. In an alternative example, light rays from light-emitting virtual object projectors can be first directed into a convex lens before entering a concave lens. In an example, light rays from light-emitting virtual object projectors can be redirected by the distal surface of the convex lens into the concave lens, from which they travel to a person's eye. In an example, the convex lens can be partially-reflective. In an example, the concave lens can be partially-reflective. In an example, the convex lens can have a partially-reflective distal surface. In an example, the concave lens can have a partially-reflective distal surface.

In an example, a light-emitting virtual object display can comprise one or more components selected from the group consisting of: active matrix organic light-emitting diode array, projector, or display; collimated light projector or display; digital micro-mirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; microdisplay and/or microprojector; micro-display array or matrix; optoelectronic display; organic light emitting diode (OLED) array or matrix; passive matrix light-emitting diode array or matrix; photoelectric display; and transmission holographic optical element array or matrix.

This optical structure can also comprise one or more components selected from the group consisting of: eyewear frame, battery, energy transducer, or other power source; data processor; and data transmitter and/or receiver. Example variations discussed in other portions of this disclosure or priority-linked disclosures can also be applied to this example where relevant, but are not repeated here in order to reduce narrative redundancy.

Figure 18:
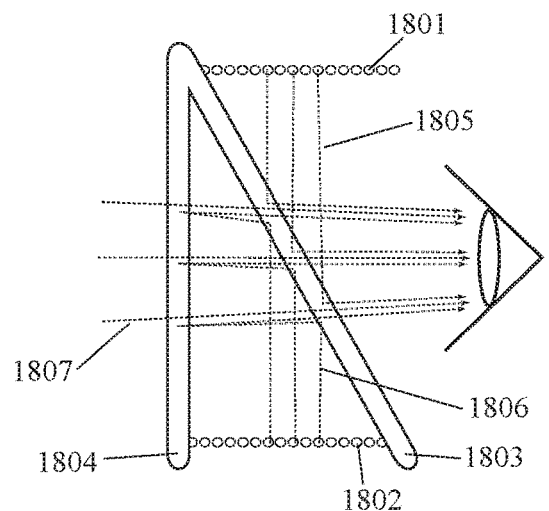
FIG. 18 shows two image displays above and below a diagonal reflective structure.

FIG. 18 shows a lateral cross-sectional view of a single-eye optical structure (such as a smart lens) for augmented reality (AR) eyewear. Although this figure just shows a single optical structure near one eye, it is to be understood that augmented reality (AR) eyewear can include two such optical structures, one for each eye. Also, this figure does not show an eyewear frame, but it is to be understood that this optical structure can be held in proximity to a person's eye by any of a number of different types of eyewear frames. In an example, this example can further comprise one or more components selected from the group consisting of: eyewear frame; a power source (such as a battery); a data processor; a wireless data transmitter and/or data receiver; a camera and/or eye tracker; an environmental light monitor; an electromagnetic energy sensor; and a user interface.

The optical structure for a single eye that is part of augmented reality (AR) eyewear which is shown in FIG. 18 comprises: a first virtual image display 1801 that emits light rays (including light ray 1805) which are configured to display virtual objects in a person's field of view, wherein the image-projecting surface of the first virtual image display is best fit by a first plane; a second virtual image display 1802 that emits light rays (including light ray 1806) which are configured to display virtual objects in the person's field of view, wherein the image-projecting surface of the second virtual image display is best fit by a second plane; a first partially-reflective surface 1803 which is configured to reflect light rays from the first virtual image display toward the person's eye, wherein the first partially-reflective surface is substantially best fit by a third plane, wherein virtual extensions of the first and third planes intersect at an angle within a range of 30 to 70 degrees; and a second partially-reflective surface 1804 which is configured to reflect light rays from the second virtual image display toward the person's eye, wherein the second partially-reflective surface is best fit by a fourth plane, wherein virtual extensions of the second and fourth planes intersect at an angle within a range of 75 to 105 degrees, wherein light rays from the second virtual image display travel through the first partially-reflective surface before they reach the person's eye, and wherein light rays from the person's environment (including light ray 1807) travel sequentially through the second partially-reflective surface and the first partially-reflective surface before they reach the person's eye.

FIG. 18 can also be described as an optical structure for a single eye that is part of augmented reality (AR) eyewear comprising: a first virtual image display that emits light rays which are configured to display virtual objects in a person's field of view, wherein an image-projecting surface of the first virtual image display is flat and is located in a first plane; a second virtual image display that emits light rays which are configured to display virtual objects in the person's field of view, wherein an image-projecting surface of the second virtual image display is flat and is located in a second plane, wherein the second plane is parallel to the first plane; a first partially-reflective surface which is configured to reflect light rays from the first virtual image display toward one of the person's eyes, wherein the first partially-reflective surface is flat and is located in a third plane; and a second partially-reflective surface which is configured to reflect light rays from the second virtual image display toward the same eye, wherein the second partially-reflective surface is flat and is located in a fourth plane, wherein virtual extensions of the third and fourth planes intersect each other at an angle within a range of 30 to 70 degrees, wherein light rays from the second virtual image display travel through the first partially-reflective surface before they reach the person's eye, and wherein light rays from the person's environment travel sequentially through the second partially-reflective surface and the first partially-reflective surface before they reach the person's eye.

The example shown in FIG. 18 can also be described as a single-eye optical structure for augmented reality (AR) eyewear comprising: an upper virtual image display above the horizontal plane which includes an upper perimeter of an eye; a lower virtual image display below the horizontal plane which includes a lower perimeter of the eye; a proximal partially-reflective surface whose centroid is a first distance in front of the eye, wherein the proximal partially-reflective surface reflects light rays from the upper virtual image display toward the eye; a distal partially-reflective surface whose centroid is a second distance in front of the eye, wherein the distal partially-reflective surface reflects light rays from the lower virtual image display toward the eye, wherein the second distance is greater than the first distance, wherein the best-fitting virtual plane for the proximal partially-reflective surface and the best-fitting virtual plane for the distal partially-reflective surface intersect at an angle within a range of 30 and 60 degrees, wherein light rays from the lower virtual image display pass through the proximal partially-reflective surface before these light rays reach the eye, and wherein light rays from the environment pass sequentially through both the distal and proximal partially-reflective services before these light rays reach the eye. In this disclosure, proximal is defined as being closer to a person's eye and distal is defined as being farther from a person's eye.

The example shown in FIG. 18 can also be described as a single-eye optical structure for augmented reality (AR) eyewear comprising: a first virtual image display, wherein at least 75% of the image-projecting surface of this display is above a person's field of view; a second virtual image display, wherein at least 75% of the image-projecting surface of this display is below the person's field of view; a proximal partially-reflective surface whose centroid is a first distance in front of the eye, wherein the proximal partially-reflective surface reflects light rays from the first virtual image display toward the eye; a distal partially-reflective surface whose centroid is configured to be a second distance in front of the eye, wherein the distal partially-reflective surface reflects light rays from the lower virtual image display toward the eye, wherein the second distance is greater than the first distance, wherein virtual extensions of the proximal partially-reflective surface and distal partially-reflective surface intersect at an angle within a range of 30 and 60 degrees, and wherein light rays from the second virtual image display pass through the proximal partially-reflective surface before these light rays reach the eye.

In a variation on this example, a single-eye optical structure for augmented reality (AR) eyewear can comprise: a lower virtual image display that is below the horizontal plane which includes a lower perimeter of an eye; an upper virtual image display that is above the horizontal plane which includes an upper perimeter of the eye; a proximal partially-reflective surface whose centroid is a first distance in front of the eye, wherein the proximal partially-reflective surface reflects light rays from the lower virtual image display toward the eye; a distal partially-reflective surface whose centroid is a second distance in front of the eye, wherein the distal partially-reflective surface reflects light rays from the upper virtual image display toward the eye, wherein the second distance is greater than the first distance, wherein the best-fitting virtual plane for the proximal partially-reflective surface and the best-fitting virtual plane for the distal partially-reflective surface intersect at an angle within a range of 30 and 60 degrees, wherein light rays from the upper virtual image display pass through the proximal partially-reflective surface before these light rays reach the eye, and wherein light rays from the environment pass through both the distal and proximal partially-reflective services before these light rays reach the eye.

In a variation on this example, a single-eye optical structure for augmented reality (AR) eyewear can comprise: a right-side virtual image display that is to the right of the vertical plane which includes a right-side perimeter of an eye; a left-side virtual image display that is to the left of the vertical plane which includes a left-side perimeter of the eye; a proximal partially-reflective surface whose centroid is a first distance in front of the eye, wherein the proximal partially-reflective surface reflects light rays from the right-side virtual image display toward the eye; a distal partially-reflective surface whose centroid is a second distance in front of the eye, wherein the distal partially-reflective surface reflects light rays from the left-side virtual image display toward the eye, wherein the second distance is greater than the first distance, wherein the best-fitting virtual plane for the proximal partially-reflective surface and the best-fitting virtual plane for the distal partially-reflective surface intersect at an angle within a range of 30 and 60 degrees, wherein light rays from the left-side virtual image display pass through the proximal partially-reflective surface before these light rays reach the eye, and wherein light rays from the environment pass through both the distal and proximal partially-reflective services before these light rays reach the eye.

In a variation on this example, a single-eye optical structure for augmented reality (AR) eyewear can comprise: a left-side virtual image display that is to the left of the vertical plane which includes a left-side perimeter of an eye; a right-side virtual image display that is to the right of the vertical plane which includes a right-side perimeter of the eye; a proximal partially-reflective surface whose centroid is a first distance in front of the eye, wherein the proximal partially-reflective surface reflects light rays from the left-side virtual image display toward the eye; a distal partially-reflective surface whose centroid is a second distance in front of the eye, wherein the distal partially-reflective surface reflects light rays from the right-side virtual image display toward the eye, wherein the second distance is greater than the first distance, wherein the best-fitting virtual plane for the proximal partially-reflective surface and the best-fitting virtual plane for the distal partially-reflective surface intersect at an angle within a range of 30 and 60 degrees, wherein light rays from the right-side virtual image display pass through the proximal partially-reflective surface before these light rays reach the eye, and wherein light rays from the environment pass through both the distal and proximal partially-reflective services before these light rays reach the eye.

In an example, virtual image displays can be located in substantially horizontal planes. In an example, a person's eye near this optical structure can be between the horizontal planes which best fit the first and second virtual image displays. In an example, upper and lower virtual image displays can be configured to be located on opposite sides (e.g. top side vs. bottom side) of the eye. In an example, a first virtual image display can be located in a first plane which is above (the horizontal plane of) the person's eye and the second virtual image display can be located in second plane which is below (the horizontal plane of) the person's eye. In an example, virtual image displays can be located in substantially vertical planes. In an example, a person's eye near this optical structure can be between the vertical planes which best fit the first and second virtual image displays. In an example, right and left virtual image displays can be configured to be located on opposite sides (e.g. right side vs. left side) of the eye. In an example, a first virtual image display can be located in a first plane which is to the right of (the vertical plane of) the person's eye and the second virtual image display can be located in second plane which is to the left of (the vertical plane of) the person's eye.

In an example, a central line-of-sight vector can be defined as the vector in a horizontal plane which extends straight outward in a forward direction from the center of the pupil of a person's eye. In an example, first and second virtual image displays can be parallel to this central line-of-sight vector. In an example, first and second virtual image displays can be symmetrically configured with respect to this central forward line-of-sight vector. In an example, the configuration of an upper virtual image display can be the reflection of a lower virtual image display reflected across the central line-of-sight vector (and vice versa). In an example, the configuration of a right-side virtual image display can be the reflection of a left-side virtual image display reflected across the central line-of-sight vector (and vice versa).

In this example, a virtual image display (or at least the image projecting surface of the virtual image display) is substantially flat. In an example, a virtual image display can be arcuate. In an example, a virtual image display can be convex or concave. In an example, a virtual image display (or at least the image projecting surface of the virtual image display) can have a shape like a section of a sphere and/or a conic section. In the case of an arcuate virtual image display, the "best-fitting" plane for it can be defined as the virtual plane which minimizes the sum of squared deviations of distances between it and the virtual plane. In an example, multi-dimensional least squares estimation can be used to find the best-fitting plane. In an example a virtual image display can be configured to extend outward from a person's eye by a distance within a range of ½" to 3". In an example a virtual image display can be configured to extend outward from a person's eye by a distance within a range of ¼" to 1".

In an example, a virtual image display can be a matrix, grid, and/or array of light-emitting members. In an example, this can be an orthogonal matrix, grid, and/or array with rows and columns of light-emitting members. In an example, this can be a radial matrix, grid, and/or array with spokes and rings of light-emitting members. In an example, all light-emitting members in a matrix, grid, and/or array of light-emitting members can have the same light-emitting characteristics. In an example, light-emitting members in a matrix, grid, and/or array can differ in one or more characteristics selected from the group consisting of: power, brightness, and/or intensity; color, wavelength, frequency, and/or spectrum; polarization, phase, and/or coherence; size; and distance between light-emitting members.

In an example, there can be variation between rows or between columns of light-emitting members with respect to: power, brightness, and/or intensity; color, wavelength, frequency, and/or spectrum; polarization, phase, and/or coherence; size; and density and/or distance between light-emitting members. In an example, there can be variation between spokes or rings of light-emitting members with respect to: power, brightness, and/or intensity; color, wavelength, frequency, and/or spectrum; polarization, phase, and/or coherence; size; and density and/or distance between light-emitting members. In an example, light-emitting members in the central portion of a matrix, grid, and/or array have a first average level or type of power, brightness, intensity, color, wavelength, frequency, spectrum, polarization, phase, coherence, size, density, and/or inter-member distance and light-emitting members around the periphery of the matrix, grid, and/or array have a second average level or type of power, brightness, intensity, color, wavelength, frequency, spectrum, polarization, phase, coherence, size, density, and/or inter-member distance.

In an example, a virtual image display can comprise one or more components selected from the group consisting of: active matrix organic light-emitting diode array, projector, or display; collimated light projector or display; digital micromirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; micro-display and/or microprojector; micro-display array or matrix; optoelectronic display; organic light emitting diode (OLED) array or matrix; passive matrix light-emitting diode array or matrix; photoelectric display; and transmission holographic optical element array or matrix.

In an example, light rays from a first virtual image display and light rays from a second virtual image display can have different power levels, brightness levels, intensities, colors, wavelengths, frequencies, spectra, polarization levels, phases, coherence levels, sizes, densities, and/or distances between light-emitting members. In an example, light rays from a first virtual image display and light rays from a second virtual image display can have different wavelengths, frequencies, colors, and/or spectrums. In an example, light rays from a first virtual image display and light rays from a second virtual image display can have different polarities. In an example, light rays from a first virtual image display and light rays from a second virtual image display can have different phases and/or levels of coherence. In an example, light rays from a first virtual image displays can differ from light rays from a second virtual image display in one or more characteristics selected from the group consisting of: amplitude, intensity, brightness, and/or power; wavelength, frequency, color, and/or spectrum; polarity; phase; and degree of coherence.

In an example, a first virtual image display can project a first portion of a virtual object (or a first portion of a plurality of virtual objects) in a person's field of view and a second virtual image display can project a second portion of a virtual object (or a second portion of a plurality of virtual objects) in a person's field of view. In an example, a first virtual image display can a first virtual object with a first apparent distance from a person's eye and a second virtual image display can project a second virtual object with a second apparent distance from the person's eye, wherein the second distance can be greater than the first distance. In an example, a first virtual image display can project a first part of a virtual object with a first apparent distance from a person's eye and a second virtual image display can project a second part of a virtual object with a second apparent distance from the person's eye, wherein the second distance can be greater than the first distance. In an example, optical structures shown herein can provide multiple projection planes which can create three-dimensionality in virtual images and help to reduce the conflict between vergence and accommodation in near-eye virtual image projections.

In an example, a partially-reflective surface can be a partially-reflective mirror and/or a one-way mirror. In an example, a partially-reflective surface can be a lens, prism, crystal, or other transparent member. In an example, a partially-reflective surface can be a coating on an exterior surface of a lens, prism, crystal, or other transparent member. In an example, a partially-reflective surface can be a reflective layer inside a lens, prism, crystal, or other transparent member. In an example, a partially-reflective surface can be a coating inside a multi-layer lens, prism, crystal, or other transparent member. In an example, a reflective coating can be on the proximal side of a partially-reflective surface. In an example, a reflective coating can be on the distal side of a partially-reflective surface. In an example, a partially-reflective surface can be a micro-mirror array. In an example, a partially-reflective surface can be a micro-lens array.

In an example, the centroid of a partially-reflective surface can be directly in front of a person's eye. In an example, the centroids of first and second partially-reflective surfaces can both be directly in front of the person's eye. In an example, the first and second partially-reflective surfaces can be axially aligned. In an example both partially-reflective surfaces together can be configured to extend outward from a person's eye by a distance within a range of ½" to 3". In an example both partially-reflective surfaces together can be configured to extend outward from a person's eye by a distance within a range of ¼" to 1".

In an example, the centroid of a first partially-reflective surface can be closer to a person's eye than the centroid of a second partially-reflective surface. In an example, virtual extensions of the best-fitting plane for the first partially-reflective surface and the best-fitting plan for the second partially-reflective surface can intersect at a 45-degree angle. In an example, virtual extensions of the best-fitting plane for the first partially-reflective surface and the best-fitting plan for the second partially-reflective surface can intersect at an angle within a range of 30 to 70 degrees. In an example, this angle can open downward. In an example, this angle can open upward. In an example, this angle can open to the right. In an example, this angle can open to the left.

In an example, a first partially-reflective surface can reflect a first amount (or percent) of light and a second partially-reflective surface can reflect a second amount (or percent) of light. In an example, the second amount (or percent) can be at least 10% greater than the first amount (or percent), or vice versa. In an example, the second amount (or percent) can be between 10% and 50% greater than the first degree (or percentage). In an example, a first partially-reflective surface can reflect a first amount (or percent) of light from a first virtual image display and a second amount (or percent) of light from a second virtual image display, wherein the second amount (or percent) is between 10% and 50% greater than the first degree (or percentage), or vice versa. In an example, a first partially-reflective surface can differ from a second partially-reflective surface in polarization, tint, material, and/or angle.

In an example, light rays from a second virtual image display can be reflected by both a first and second partially-reflective surfaces before they reach a person's eye. In an example, light rays from a second virtual image display can be (1) initially reflected away from the person's eye by a first partially-reflective surface and then (2) reflected back toward the person's eye by a second partially-reflective surface. In an example, light rays from a second virtual image display can be (1) initially reflected away from the person's eye by the distal side of the first partially-reflective surface and then (2) reflected back toward the person's eye by the proximal side of the second partially-reflective surface.

In this example, the partially-reflective surfaces are substantially flat. In another example, one or more partially-reflective surfaces can be arcuate. In an example, a partially-reflective surface can be convex or concave. In an example, a partially-reflective surface can have a spherical-section and/or conic-section shape. In an example, a partially-reflective surface can have a zigzag or serrated shape. In an example, a partially-reflective surface can have a Fresnel lens shape. In the case of an arcuate partially-reflective surface, the best-fitting plane for a partially-reflective surface can be defined as the virtual plane which minimizes the sum of squared deviations of distances between the virtual plane and the partially-reflective surface. In an example, multi-dimensional least squares estimation can be used to find the best-fitting plane.

In an example a partially-reflective surface can be made from one or more materials selected from the group consisting of: acrylic, aluminum, carbon (e.g. carbon nanotubes), copper alloy, crystal, ethylene tetrafluoroethylene, graphene, indium tin oxide, Mylar™, neoprene, parylene, photorefractive, polyacrylate, polycarbonate, polyimide, polypropylene oxide, polytetrafluoroethylene, polyvinyl alcohol, polyvinylidene difluoride, polyvinylpyrrolidone, abovitzium, silicon (e.g. silicon oxy nitride), silver alloy, and tantalum oxide. Example variations discussed in other portions of this disclosure or in priority-linked disclosures can also be applied to this example where relevant, but are not repeated here in order to reduce narrative redundancy.

Figure 19:
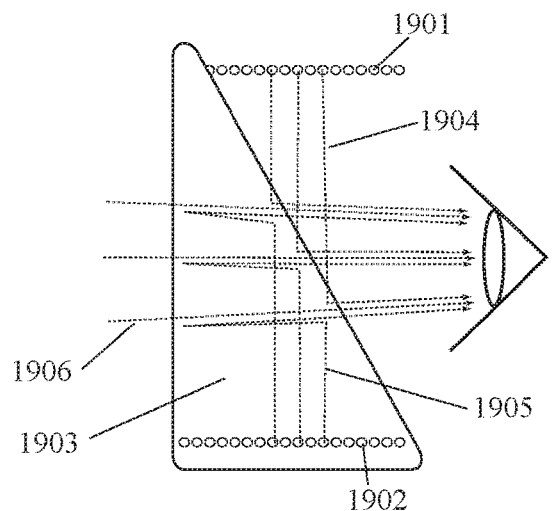
FIG. 19 shows two image displays above and below a diagonal surface of a prism.

FIG. 19 shows another example of a lateral cross-sectional view of a single-eye optical structure (such as smart lens) for augmented reality (AR) eyewear. This example is similar to the one in FIG. 18 except that first and second partially-reflective surfaces are two different surfaces of the same component. In an example, this component can be a lens or prism. In an example, this component can have a partially-reflective coating.

The optical structure for a single eye that is part of the augmented reality (AR) eyewear shown in FIG. 19 comprises: a first virtual image display 1901 that emits light rays (including light ray 1904) which are configured to display virtual objects in a person's field of view, wherein an image-projecting surface of the first virtual image display is best fitted by a first plane; a second virtual image display 1902 that emits light rays (including light ray 1905) which are configured to display virtual objects in the person's field of view, wherein an image-projecting surface of the second virtual image display is best fitted by a second plane; a cross-sectionally-triangular optical component, wherein the substantially-triangular optical component further comprises a first (proximal) partially-reflective surface which reflects light rays from the first virtual image display toward one of the person's eyes, wherein the first partially-reflective surface is best fitted by a third plane, wherein virtual extensions of the first and third planes intersect at an angle within a range of 30 to 70 degrees, wherein the substantially-triangular optical component further comprises a second (distal) partially-reflective surface which reflects light rays from the second virtual image display toward the same eye, wherein the second partially-reflective surface is best fitted by a fourth plane, wherein virtual extensions of the second and fourth planes intersect at an angle within a range of 75 to 105 degrees, wherein light rays from the second virtual image display travel through the first partially-reflective surface before they reach the person's eye, and wherein light rays from the person's environment (including light ray 1906) travel sequentially through the second partially-reflective surface and the first partially-reflective surface before they reach the person's eye.

FIG. 19 can also be described as an optical structure for a single eye that is part of augmented reality (AR) eyewear comprising: a first virtual image display that emits light rays which are configured to display virtual objects in a person's field of view, wherein an image-projecting surface of the first virtual image display is substantially flat and is located in a first plane; a second virtual image display that emits light rays which are configured to display virtual objects in the person's field of view, wherein an image-projecting surface of the second virtual image display is substantially flat and is located in a second plane, wherein the second plane is parallel to the first plane; a lens or prism with a triangular cross-sectional perimeter; wherein the lens or prism has a first partially-reflective surface which is configured to reflect light rays from the first virtual image display toward an eye, wherein the first partially-reflective surface is substantially flat and is located in a third plane; wherein the lens or prism has a first second partially-reflective surface which is configured to reflect light rays from the second virtual image display toward the eye, wherein the second partially-reflective surface is substantially flat and is located in a fourth plane, wherein virtual extensions of the third and fourth planes intersect at an angle within a range of 30 to 70 degrees, wherein light rays from the second virtual image display travel through the first partially-reflective surface before they reach the person's eye, and wherein light rays from the person's environment travel sequentially through the second partially-reflective surface and the first partially-reflective surface before they reach the eye.

In an example, a partially-reflective surface can be (a coating) on an exterior surface of the lens or prism. In an example, a partially-reflective surface can be (a coating) on an interior surface of a lens or prism. In an example, a partially-reflective surface can be (a coating) on an interior surface of a multi-layer lens or prism. In an example, a reflective coating can be on the proximal (e.g. eye-facing) side of a partially-reflective surface. In an example, a reflective coating can be on the distal (e.g. away from eye facing) side of a partially-reflective surface. Example variations discussed in other portions of this disclosure or in priority-linked disclosures can also be applied to this example where relevant, but are not repeated here in order to reduce narrative redundancy.

Figure 20:
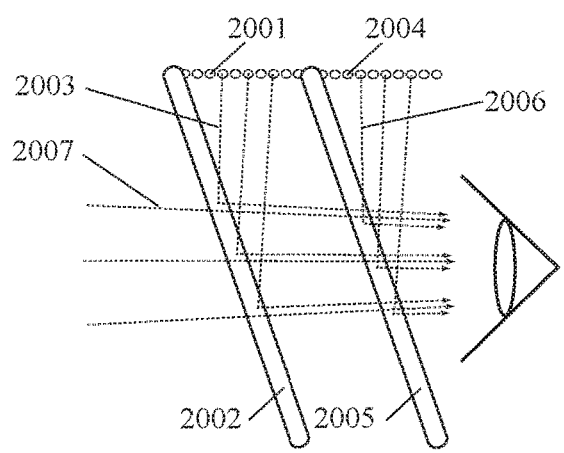
FIG. 20 shows two coplanar image displays above two parallel diagonal reflective structures.

FIG. 20 shows another example of a lateral cross-sectional view of a single-eye optical structure (such as a smart lens) for augmented reality (AR) eyewear. This example has a series of collinear virtual image displays, each of which is accompanied by a corresponding diagonally-oriented partially-reflective surface which reflects light rays from the display toward the person's eye. Although not shown, this example can further comprise one or more components selected from the group consisting of: eyewear frame; a power source (such as a battery); a data processor; a wireless data transmitter and/or data receiver; a camera and/or eye tracker; an environmental light monitor; an electromagnetic energy sensor; and a user interface.

The optical structure for a single eye that is part of the augmented reality (AR) eyewear shown in FIG. 20 comprises: a first virtual image display 2004 that emits light rays (including light ray 2006) which are configured to display virtual objects in a person's field of view, wherein an image-projecting surface of the first virtual image display is best fit by a first plane; a first partially-reflective surface 2005 which is configured to reflect light rays from the first virtual image display toward an eye, wherein the first partially-reflective surface is best fit by a second plane, wherein virtual extensions of the first and second planes intersect at an angle within a range of 20 to 70 degrees; a second virtual image display 2001 that emits light rays (including light ray 2003) which are configured to display virtual objects in the person's field of view, wherein an image-projecting surface of the second virtual image display is also best fit by the first plane; a second partially-reflective surface 2002 which is configured to reflect light rays from the second virtual image display toward the eye, wherein the second partially-reflective surface is best fit by a third plane, wherein virtual extensions of the first and third planes intersect at an angle within a range of 20 to 70 degrees, wherein light rays from the second virtual image display travel through the first partially-reflective surface before they reach the person's eye, and wherein light rays from the person's environment (including light ray 2007) travel sequentially through the second partially-reflective surface and the first partially-reflective surface before they reach the eye.

FIG. 20 can also be described as an optical structure for a single eye that is part of augmented reality (AR) eyewear comprising: a first virtual image display which emits light rays which display virtual objects in a person's field of view; a second virtual image display which emits light rays which display virtual objects in the person's field of view, wherein the first virtual image display and the second virtual image display are co-planar; a first partially-reflective surface which reflects light rays from the first virtual image display toward one of the person's eyes; a second partially-reflective surface which reflects light rays from the second virtual image display toward the eye, wherein the first partially-reflective surface and the second partially-reflective surface are parallel to each other, wherein light rays from the second virtual image display travel through the first partially-reflective surface before they reach the person's eye, and wherein light rays from the person's environment travel sequentially through the second partially-reflective surface and the first partially-reflective surface before they reach the person's eye.

In an example, an optical structure for a single eye that is part of augmented reality (AR) eyewear can comprise: a first virtual image display and a second virtual image display which are both along the same side of a person's eye (e.g. top side, bottom side, right side, or left side) that emit light rays which are configured to display virtual objects in a person's field of view; a first partially-reflective surface which is configured to reflect light rays from the first virtual image display toward the eye; and a second partially-reflective surface which is configured to reflect light rays from the second virtual image display toward the eye, wherein light rays from the second virtual image display travel through the first partially-reflective surface before they reach the person's eye, and wherein light rays from the person's environment travel sequentially through the second partially-reflective surface and the first partially-reflective surface before they reach the person's eye. In an example, the first virtual image display and the second virtual image display can be co-planar. In an example, the first partially-reflective surface and the second partially-reflective surface can be parallel to each other.

The example shown in FIG. 20 can also be described as a single-eye optical structure for augmented reality (AR) eyewear comprising: a proximal virtual image display and a proximal partially-reflective surface, wherein light rays from the proximal virtual image display are reflected by the proximal side of the proximal partially-reflective surface toward an eye, wherein the centroid of the proximal virtual image display is a first distance from the person's eye, wherein the centroid of the proximal partially-reflective surface is a second distance from the eye, and wherein the virtual plane which best fits the proximal virtual image display intersects the virtual plane which best fits the proximal partially-reflective surface at an angle within a range of 30 to 70 degrees; and a distal virtual image display and a distal partially-reflective surface, wherein light rays from the distal virtual image display are reflected by the proximal side of the distal partially-reflective surface toward a person's eye, wherein the centroid of the distal virtual image display is a third distance from the eye, wherein the third distance is greater than the first distance, wherein the centroid of the distal partially-reflective surface is a fourth distance from the eye, wherein the fourth distance is greater than the second distance, wherein the virtual plane which best fits the distal virtual image display intersects the virtual plane which best fits the distal partially-reflective surface at an angle within a range of 30 to 70 degrees, wherein light rays from the distal virtual image display pass through the proximal partially-reflective surface before these light rays reach the eye, and wherein light rays from the environment pass through both the distal partially-reflective surface and the proximal partially-reflective surface between these light rays reach the eye.

In an example, a single-eye optical structure for augmented reality (AR) eyewear can comprise: a proximal-to-distal array of coplanar virtual image displays (which are configured to be above or below the space in front of an eye); a proximal-to-distal array of parallel partially-reflective surfaces which are configured to be within ¼" to 6" in front of the eye, wherein the proximal-to-distal array of parallel partially-reflective surfaces reflect light rays from the proximal-to-distal array of coplanar virtual image displays toward the eye, and wherein the best-fitting virtual planes of the proximal-to-distal array of parallel partially-reflective surfaces intersect the best-fitting virtual plane of the proximal-to-distal array of coplanar virtual image displays at an angle within a range of 30 to 70 degrees.

In an example, light rays from the most distal virtual image displays in a proximal-to-distal array of coplanar virtual image displays travel through the most proximal partially-reflective surfaces in a proximal-to-distal array of parallel partially-reflective surfaces before they reach an eye. In an example, there can be two virtual image displays in a proximal-to-distal array of coplanar virtual image displays and two partially-reflective surfaces in a proximal-to-distal array of parallel partially-reflective surfaces. In an example, there can be three or more virtual image displays in a proximal-to-distal array of coplanar virtual image displays and three or more partially-reflective surfaces in a proximal-to-distal array of parallel partially-reflective surfaces. In an example, partially-reflective surfaces in the proximal-to-distal array of parallel partially-reflective surfaces can be axially aligned.

In an example, first and second virtual image displays can both be located in a plane above the horizontal plane which crosses the top of an eye. In an example, the first and second virtual image displays can both be located in a plane below the horizontal plane which crosses the bottom of an eye. In an example, the first and second virtual image displays can both be located in a plane to the right of the plane which crosses the right side of an eye. In an example, the first and second virtual image displays can both be located in a plane to the left of the plane which crosses the left side of an eye.

In an example, extensions of a plane which best fits a plurality of virtual image displays and a plane which best fits a partially reflective surface can intersect at an angle within a range of 30 and 60 degrees. In an example, a plane which best fits virtual image displays and a plane which best fits a partially reflective surface can intersect at a 45-degree angle. In an example, the centroids of first and second partially-reflective surfaces can be directly in front of a person's eye. In an example, the centroids of first and second partially-reflective surfaces can be aligned with (e.g. parallel to) a central line-of-sight vector. In an example, the first and second partially-reflective surfaces together extend outward from a person's eye by a distance in the range of ½" to 4". In an example, the first and second partially-reflective surfaces together extend outward from a person's eye by a distance in the range of ¼" to 1". Example variations discussed in other portions of this disclosure or in priority-linked disclosures can also be applied to this example where relevant, but are not repeated here in order to reduce narrative redundancy.

Figure 21:
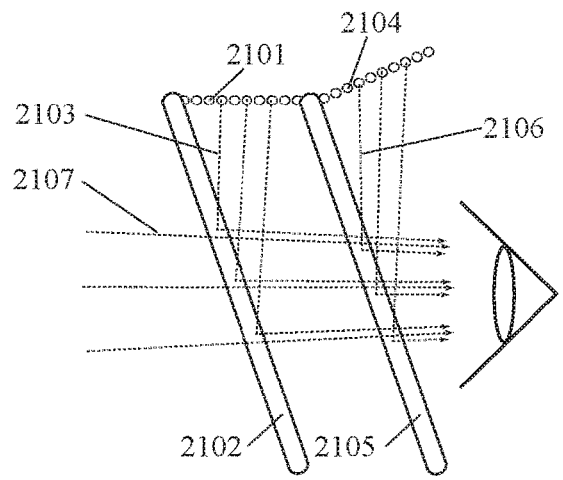
FIG. 21 shows two non-coplanar image displays above two parallel diagonal reflective structures.

FIG. 21 shows another example of a lateral cross-sectional view of a single-eye optical structure (such as a smart lens) for augmented reality (AR) eyewear. This example is like the one in FIG. 20 except that the angle within a range of the first virtual image display and the first partially-reflective surface is different than the angle within a range of the second virtual image display and the second partially-reflective surface. Although not shown, this example can further comprise one or more components selected from the group consisting of: eyewear frame; a power source (such as a battery); a data processor; a wireless data transmitter and/or data receiver; a camera and/or eye tracker; an environmental light monitor; an electromagnetic energy sensor; and a user interface.

The optical structure for a single eye that is part of the augmented reality (AR) eyewear shown in FIG. 21 comprises: a first virtual image display 2104 that emits light rays (including light ray 2106) which are configured to display virtual objects in a person's field of view, wherein an image-projecting surface of the first virtual image display is best fitted by a first plane and is located at a first location with respect to a person's eye, wherein this first location is selected from the group consisting of above the eye, below the eye, to the right of the eye, and to the left of the eye; a second virtual image display 2101 that emits light rays (including light ray 2103) which are configured to display virtual objects in a person's field of view, wherein an image-projecting surface of the second virtual image display is best fitted by a second plane and is also located at the first location with respect to the eye, and wherein virtual extensions of second and first planes intersect at an angle within a range of 10 to 45 degrees; a first partially-reflective surface 2105 which is configured to reflect light rays from the first virtual image display toward the eye, wherein the first partially-reflective surface is best fitted by a third plane, and wherein virtual extensions of the first plane and the third plane intersect at an angle within a range of 20 to 70 degrees; a second partially-reflective surface 2102 which is configured to reflect light rays from the second virtual image display toward the eye, wherein the second partially-reflective surface is best fitted by a fourth plane, and wherein virtual extensions of the second and fourth planes intersect at an angle within a range of 20 to 70 degrees, wherein light rays from the second virtual image display travel through the first partially-reflective surface before they reach the person's eye, and wherein light rays from the person's environment (including light ray 2107) travel sequentially through the second partially-reflective surface and the first partially-reflective surface before they reach the person's eye.

FIG. 21 can also be described as an optical structure for a single eye that is part of augmented reality (AR) eyewear comprising: a first virtual image display and a second virtual image display that emit light rays which are configured to display virtual objects in the person's field of view, wherein the first and second virtual image displays are both on the same side of a person's eye (e.g. top side, bottom side, right side, or left side), but are not co-planar; a first partially-reflective surface which is configured to reflect light rays from the first virtual image display toward the eye; a second partially-reflective surface which is configured to reflect light rays from the second virtual image display toward the eye, wherein light rays from the second virtual image display travel through the first partially-reflective surface before they reach the eye, and wherein light rays from the person's environment travel (sequentially) through the second partially-reflective surface and the first partially-reflective surface before they reach the eye.

The example shown in FIG. 21 can also be described as a single-eye optical structure for augmented reality (AR) eyewear comprising: a proximal virtual image display and a proximal partially-reflective surface, wherein light rays from the proximal virtual image display are reflected by the proximal side of the proximal partially-reflective surface toward a person's eye, wherein the centroid of the proximal virtual image display is a first distance from the person's eye, wherein the centroid of the proximal partially-reflective surface is a second distance from the person's eye, and wherein the virtual plane which best fits the proximal virtual image display intersects the virtual plane which best fits the proximal partially-reflective surface at a first angle within a range of 30 to 70 degrees; and a distal virtual image display and a distal partially-reflective surface, wherein light rays from the distal virtual image display are reflected by the proximal side of the distal partially-reflective surface toward a person's eye, wherein the centroid of the distal virtual image display is a third distance from the person's eye, wherein the third distance is greater than the first distance, wherein the centroid of the distal partially-reflective surface is a fourth distance from a person's eye, wherein the fourth distance is greater than the second distance, wherein the virtual plane which best fits the distal virtual image display intersects the virtual plane which best fits the distal partially-reflective surface at a second angle within a range of 30 to 70 degrees, wherein the second angle differs from the first angle by at least 10 degrees, wherein light rays from the distal virtual image display pass through the proximal partially-reflective surface before these light rays reach the person's eye, and wherein light rays from the environment pass through both the distal partially-reflective surface and the proximal partially-reflective surface between these light rays reach the person's eye.

In an example, light rays from the most distal virtual image displays in a proximal-to-distal array of virtual image displays travel through the most proximal partially-reflective surfaces in a proximal-to-distal array of partially-reflective surfaces before they reach a person's eye. In an example, there can be two virtual image displays in a proximal-to-distal array of virtual image displays and two partially-reflective surfaces in a proximal-to-distal array of partially-reflective surfaces. In an example, there can be three or more virtual image displays in a proximal-to-distal array of virtual image displays and three or more partially-reflective surfaces in a proximal-to-distal array of partially-reflective surfaces. In an example, partially-reflective surfaces in a proximal-to-distal array of parallel partially-reflective surfaces can be axially aligned.

In this example, proximal and distal virtual image displays are not co-planar. In an example, proximal and distal virtual image displays can both be located above the horizontal plane including the top of person's eye. In an example, proximal and distal virtual image displays can both be located below the horizontal plane including the bottom of the person's eye. In an example, proximal and distal virtual image displays can both be located to the right of the plane including the right side of the person's eye. In an example, proximal and distal virtual image displays can both be located to the left of the plane including the left side of the person's eye.

In an example, the centroids of the proximal and distal partially-reflective surfaces can be directly in front of a person's eye. In an example, proximal and distal partially-reflective surfaces can together extend outward from a person's eye by a distance in the range of ½" to 3". In an example, proximal and distal partially-reflective surfaces can together extend outward from a person's eye by a distance in the range of ¼" to 1". Example variations discussed in other portions of this disclosure or in priority-linked disclosures can also be applied to this example where relevant, but are not repeated here in order to reduce narrative redundancy.

Figure 22:
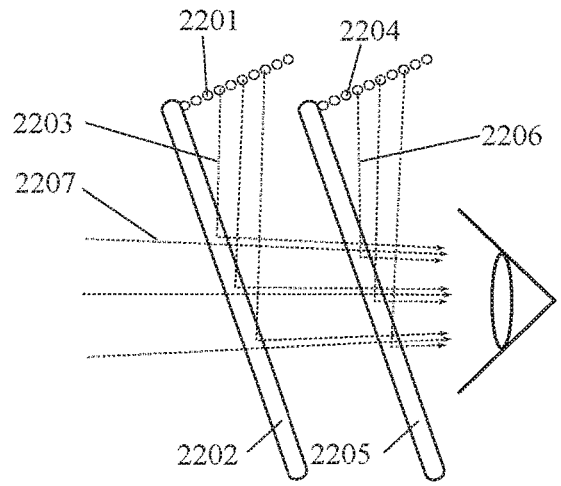
FIG. 22 shows two parallel image displays above two parallel diagonal reflective structures.

FIG. 22 shows another example of a lateral cross-sectional view of a single-eye optical structure (such as a smart lens) for augmented reality (AR) eyewear. This example is like the ones shown in FIGS. 20 and 21, except that the virtual image displays are parallel, but not coplanar. The optical structure that is part of augmented reality (AR) eyewear shown in FIG. 22 comprises: a proximal virtual image display 2204 that emits light rays (including light ray 2206) which are configured to display virtual objects in a person's field of view, wherein the proximal virtual image display is located on a first side of the person's eye, wherein this first side is selected from the group consisting of the side above the eye, the side below the eye, the side to the right of the eye, and the side to the left of the eye; wherein the centroid of the proximal virtual image display is configured to be a first distance from the eye; a distal virtual image display 2201 that emits light rays (including light ray 2203) which are configured to display virtual objects in the person's field of view, wherein the distal virtual image display is also located on the first side; wherein the centroid of the distal virtual image display is configured to be a second distance from the eye, wherein the second distance is greater than the first distance, and wherein the distal virtual image display and the proximal virtual image display are parallel to each other, but not coplanar; a proximal partially-reflective surface 2205 which is configured to reflect light rays from the proximal virtual image display toward the eye, wherein virtual extensions the best-fitting plane of the proximal partially-reflective surface and the best-fitting plane of the proximal virtual image display intersect at an angle within a range of 30 to 70 degrees; a distal partially-reflective surface 2202 which is configured to reflect light rays from the distal virtual image display toward the eye, wherein virtual extensions of the best-fitting plane of the distal partially-reflective surface and the best-fitting plane of the distal virtual image display intersect at an angle within a range of 30 to 70 degrees, wherein light rays from the distal virtual image display travel through the proximal partially-reflective surface before they reach the person's eye, and wherein light rays from the person's environment (including light ray 2207) travel sequentially through the distal partially-reflective surface and the proximal partially-reflective surface before they reach the person's eye.

FIG. 22 can also be described as an optical structure for augmented reality (AR) eyewear comprising: a proximal virtual image display and a distal virtual image display which are both on the same side of a person's eye (e.g. top side, bottom side, right side, or left side) which emit light rays which are configured to display virtual objects in a person's field of view, wherein the proximal virtual image display and the distal virtual image display are non-coplanar; and a proximal partially-reflective surface which is configured to reflect light rays from the proximal virtual image display toward the eye; a distal partially-reflective surface which is configured to reflect light rays from the distal virtual image display toward the eye, wherein the proximal partially-reflective surface and the distal partially-reflective surface are parallel.

The example shown in FIG. 22 can also be described as an optical structure for augmented reality (AR) eyewear comprising: a proximal virtual image display and a proximal partially-reflective surface, wherein light rays from the proximal virtual image display are reflected by the proximal side of the proximal partially-reflective surface toward an eye, wherein the centroid of the proximal virtual image display is a first distance from the eye, wherein the centroid of the proximal partially-reflective surface is a second distance from the eye, and wherein the best-fitting plane of the proximal virtual image display intersects the best-fitting plane of the proximal partially-reflective surface at a first angle within a range of 30 to 70 degrees; and a distal virtual image display and a distal partially-reflective surface, wherein light rays from the distal virtual image display are reflected by the proximal side of the distal partially-reflective surface toward the eye, wherein the centroid of the distal virtual image display is a third distance from the eye, wherein the third distance is greater than the first distance, wherein the centroid of the distal partially-reflective surface is a fourth distance from the eye, wherein the fourth distance is greater than the second distance, wherein the best-fitting plane of the distal virtual image display intersects the best-fitting plane of the distal partially-reflective surface at a second angle within a range of 30 to 70 degrees, wherein light rays from the distal virtual image display pass through the proximal partially-reflective surface before these light rays reach the person's eye, and wherein light rays from the environment pass through both the distal partially-reflective surface and the proximal partially-reflective surface between these light rays reach the person's eye.

In an example, light rays from the most distal virtual image display in a proximal-to-distal array of virtual image displays has to travel through the most proximal partially-reflective surface in a proximal-to-distal array of partially-reflective surfaces before these light rays reach a person's eye. In an example, there can be two virtual image displays in a proximal-to-distal array of virtual image displays and two partially-reflective surfaces in a proximal-to-distal array of partially-reflective surfaces. In an example, there can be three or more virtual image displays in a proximal-to-distal array of virtual image displays and three or more partially-reflective surfaces in a proximal-to-distal array of partially-reflective surfaces. In an example, partially-reflective surfaces in a proximal-to-distal array of parallel partially-reflective surfaces can be axially aligned.

In this example, proximal and distal virtual image displays are not co-planar, but they are parallel. In this example, the proximal and distal virtual image displays are both located above a horizontal plane which includes the top of an eye. In an example, proximal and distal virtual image displays can both be located below the horizontal plane which includes the bottom of an eye. In an example, the proximal and distal virtual image displays can both be located to the right of the plane which includes the right side of an eye. In an example, the proximal and distal virtual image displays can both be located to the left of the plane includes the left side of an eye.

In an example, a proximal set can include a proximal virtual image display and a proximal partially-reflective surface, a distal set can include a distal virtual image display and a distal partially-reflective surface, and a proximal set can be nested within a distal set. In an example, a proximal set (including a proximal virtual image display and a proximal partially-reflective surface) can have a first chevron shape, a distal set (including a distal virtual image display and a distal partially-reflective surface) can have a second chevron shape, wherein the first chevron is nested within the second chevron. In an example, a distal-to-proximal array of paired sets of virtual image displays and partially-reflective surfaces can comprise a distal-to-proximal array of nested chevron shapes.

In an example, centroids of proximal and distal partially-reflective surfaces can be directly in front of a person's eye. In an example, proximal and distal partially-reflective surfaces can together extend outward from a person's eye by a distance in the range of ½" to 3". In an example, proximal and distal partially-reflective surfaces can together extend outward from a person's eye by a distance in the range of ¼" to 1". Example variations discussed in other portions of this disclosure or in priority-linked disclosures can also be applied to this example where relevant, but are not repeated here in order to reduce narrative redundancy to reduce narrative redundancy here.

Figure 23:
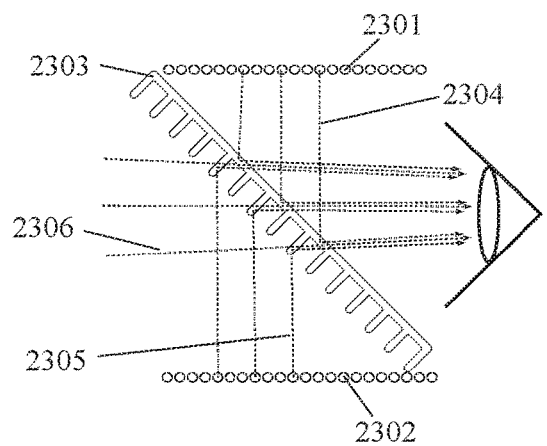
FIG. 23 shows two image displays above and below a diagonal comb-shaped reflective structure.

FIG. 23 shows another example of a lateral cross-sectional view of a single-eye optical structure (such as a smart lens) for augmented reality (AR) eyewear. This optical structure includes a diagonal comb-shaped partially-reflective structure in front of a person's eye, wherein this comb-shaped partially-reflective structure is located between two virtual image displays and reflects light rays from those two virtual image displays toward the eye.

FIG. 23 shows an optical structure for a single eye that is part of the augmented reality (AR) eyewear comprising: a first virtual image display 2301 that emits light rays (including light ray 2304) which display virtual objects in a person's field of view; a second virtual image display 2302 that emits light rays (including light ray 2305) which display virtual objects in the person's field of view; and a diagonally-oriented comb-shaped partially-reflective structure 2303 which is configured to be between ¼" and 6" in front of an eye, wherein the majority of the comb-shaped partially-reflective structure is located between the first virtual image display and the second virtual image display, wherein the comb-shaped partially-reflective structure reflects light rays from the first virtual image display and the second virtual image display toward the eye, and wherein light rays from the environment (including light ray 2306) travel through the comb-shaped partially-reflective structure to reach the eye.

In an example, first and second virtual image displays (or at least the image-projecting surfaces of these displays) can both be planar (e.g. flat). In an example, first and second virtual image displays (or at least the image-projecting surfaces of these displays) can be parallel to each other. In an example, first and second virtual image displays can be located above and below, respectively, a person's field of view. In an example, first and second virtual image displays can be located above and below, respectively, an eye. In an example, first and second virtual image displays can be located to the right and left, respectively, of a person's field of view. In an example, first and second virtual image displays can be located to the right and left, respectively, of an eye. In an alternative example, one or both virtual image displays can be arcuate.

In an example, the best-fitting plane for the comb-shaped partially-reflective structure and the best-fitting plane for the first virtual image display can intersect at an angle within a range of 30 to 70 degrees, wherein this angle opens in a proximal direction (toward the person's eye). In an example, this angle can be 45 degrees. In an example, the best-fitting plane for the comb-shaped partially-reflective structure and the best-fitting plane for the second virtual image display can intersect at an angle within a range of 30 to 70 degrees, wherein this angle opens in a distal direction (away from the person's eye). In an example, this angle can be 45 degrees. In an example, a central line-of-sight vector can be defined as the vector in a horizontal plane which extends straight outward in a forward direction from the center of the pupil of a person's eye. In an example, the central line-of-sight vector and the best-fitting plane for the comb-shaped partially-reflective structure can intersect at an angle within a range of 30 to 70 degrees. In an example, this angle can be 45 degrees.

In an example, a comb-shaped partially-reflective structure can further comprise: a first (proximal) side that is substantially parallel to the longitudinal axis of the comb-shaped partially-reflective structure, wherein this first (proximal) side reflects light rays from the first virtual image display toward an eye; and a second (distal) side with a longitudinal series of teeth which each project out in a substantially-perpendicular manner from the longitudinal axis of the comb-shaped partially-reflective structure, wherein the second (distal) side reflects light rays from the second virtual image display toward the eye. In an example, the proximal surface of the first side can reflect light rays from the first virtual image display toward an eye. In an example, the lower and/or proximal surfaces of teeth on the second side can reflect light rays from the second virtual image display toward an eye.

In an example, a first (proximal) side of a comb-shaped partially-reflective structure can be planar (e.g. flat). In an example, there can be at least 10 teeth projecting outward from the second (distal) side of a comb-shaped partially-reflective structure. In an example, there can be between 10 and 1000 teeth projecting outward from the second (distal) side. In an example, these teeth can project outward from the longitudinal axis of the comb-shaped partially-reflective structure by an angle within a range of 75 and 105 degrees. In an example, the longitudinal axis of a comb-shaped partially-reflective structure can intersect a central line-of-sight vector at an angle within a range of 30 and 60 degrees. In an example, the longitudinal axis of a comb-shaped partially-reflective structure can intersect a central line-of-sight vector at a 45-degree angle. In an example, (virtual projections of) the teeth of a comb-shaped partially-reflective structure can intersect a central line-of-sight vector at an angle within a range of 30 and 60 degrees. In an example, (virtual projections of) these teeth can intersect a central line-of-sight vector at a 45-degree angle. In an example, light rays from the second virtual image display are first reflected toward the eye by the teeth of the comb-shaped partially-reflective structure and then pass through the first (distal) side of the comb-shaped partially-reflective structure before they reach the eye.

The optical structure shown in FIG. 23 can also be described as an optical structure that is part of augmented reality (AR) eyewear comprising: an upper virtual image display (configured to be above a person's eye) that emits light rays which display virtual objects in a person's field of view; a lower virtual image display (configured to be below a person's eye) that emits light rays which display virtual objects in the person's field of view; a comb-shaped partially-reflective structure which is oriented in a diagonal manner between the first and second virtual image displays, wherein the proximal side of the comb-shaped partially-reflective structure reflects light rays from the upper virtual image display toward the eye, and wherein teeth projecting outward (in a distal and downward manner) from the comb-shaped partially-reflective structure reflect light rays from the lower virtual image display toward the eye.

In an variation on this, an optical structure for augmented reality (AR) eyewear can comprise: a lower virtual image display (configured to be below a person's eye) that emits light rays which display virtual objects in a person's field of view; an upper virtual image display (configured to be above a person's eye) that emits light rays which display virtual objects in the person's field of view; a comb-shaped partially-reflective structure which is diagonally configured between the lower virtual image display and the upper virtual image display, wherein the proximal side of the comb-shaped partially-reflective structure reflects light rays from the lower virtual image display toward the eye, and wherein teeth projecting outward (in a distal and upward manner) from the comb-shaped partially-reflective structure reflect light rays from the upper virtual image display toward the eye.

In an variation on this, an optical structure for augmented reality (AR) eyewear can comprise: a right-side virtual image display (configured to be to the right of a person's eye) which emits light rays which display virtual objects in a person's field of view; an left-side virtual image display (configured to be to the left of a person's eye) which emits light rays which display virtual objects in the person's field of view; a comb-shaped partially-reflective structure which is diagonally configured between the right-side virtual image display and the left-side virtual image display, wherein the proximal side of the comb-shaped partially-reflective structure reflects light rays from the right-side virtual image display toward the person's eye, and wherein teeth projecting outward (in a distal and side-facing manner) from the comb-shaped partially-reflective structure reflect light rays from the left-side virtual image display toward the person's eye.

The optical structure shown in FIG. 23 can also be described as an optical structure for augmented reality (AR) eyewear comprising: a first virtual image display which emits light rays which display virtual objects in a person's field of view; a second virtual image display which emits light rays which display virtual objects in the person's field of view; and a diagonally-oriented longitudinal contiguous series of partially-reflective chevrons between the first virtual image display and the second virtual image display.

In an example, the angle between the two branches of a chevron can be within a range of 30-60 degrees. In an example, the angle between the two branches of a chevron can be a 45-degree angle. In an example, first branches of chevrons in a longitudinal series of chevrons can be collinear (linearly aligned). In an example, first branches of chevrons in a longitudinal series of chevrons can be parallel to the longitudinal axis of the longitudinal series of partially-reflective chevron shapes. In this example, chevrons are contiguous to each other. In an example, there can be gaps between chevrons.

In this example, the angles between chevron branches are equal. In an example, there can be different angles between branches in different chevrons. In an example, the average angle between branches of chevrons which are closer to the center of the person's field of view can be different than the average angle between branches of chevrons which are peripheral to the person's field of view. In an example, the average angle between branches of chevrons which are higher in the person's field of view can be different than the average angle between branches of chevrons which are lower in the person's field of view. Example variations discussed in other portions of this disclosure or in priority-linked disclosures can also be applied to this example where relevant, but are not repeated here in order to reduce narrative redundancy.

Figure 24:
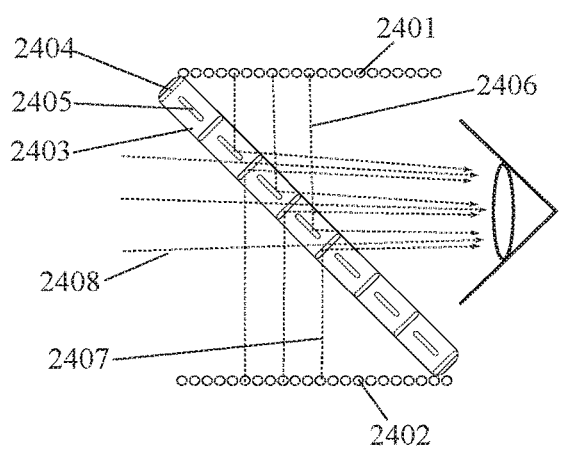
FIG. 24 shows two image displays above and below a diagonal structure with a series of perpendicularly-alternating reflective segments.

FIG. 24 shows another example of a lateral cross-sectional view of a single-eye optical structure (such as a smart lens) for augmented reality (AR) eyewear. This optical structure comprises two virtual image displays on opposite sides (e.g. top side vs. bottom side, or right side vs. left side) of a person's eye with a diagonally-oriented partially-reflective structure between them, wherein the partially-reflective structure reflects light rays from the two virtual image displays towards the person's eye, and wherein the partially-reflective structure further comprises a longitudinal series of partially-reflective segments with perpendicularly-alternating orientations.

With respect to specific components, FIG. 24 shows an optical structure for augmented reality (AR) eyewear comprising: a first virtual image display 2401 that emits light rays (including light ray 2406) which display virtual objects in a person's field of view; a second virtual image display 2402 that emits light rays (including light ray 2407) which display virtual objects in the person's field of view; and a diagonally-oriented longitudinal partially-reflective structure 2403 between the first and second virtual image displays, wherein the longitudinal partially-reflective structure reflects light rays from the first and second virtual image displays toward the person's eye, wherein light rays from the environment (including 2408) pass through the longitudinal partially-reflective structure to reach the person's eye, and wherein the longitudinal partially-reflective structure further comprises a longitudinal series of partially-reflective segments (including 2404 and 2405) with perpendicularly-alternating orientations.

In an example, a first set comprising every other partially-reflective segment in a longitudinal series of partially-reflective segments can each have a first orientation and reflect light rays from a first virtual image display toward an eye. In an example, a second set comprising the remaining partially-reflective segments (i.e. those not in the first set) can each have a second orientation and reflect light rays from a second virtual image display toward an eye. In an example, the first and second orientations can be perpendicular to each other. In an example, the first and second orientations can differ by an angle within a range of 70 to 110 degrees. In an example, a first set and a second set of partially-reflective segments in a longitudinal series of partially-reflective segments can differ in the amount and/or polarity of light rays which they transmit or reflect.

In this example, each segment in a longitudinal series of partially-reflective segments can be perpendicular to the closest other segment in the series. In this example, segments in a first set of segments in the longitudinal array are parallel to the longitudinal axis of the longitudinal partially-reflective structure and segments in a second set of segments in the longitudinal array are perpendicular to the longitudinal axis of the longitudinal partially-reflective structure.

In this example, partially-reflective segments have different orientations, but are all the same size. In an example, there can be variation in the sizes of segments along the longitudinal axis of the longitudinal partially-reflective structure. In this example, there are gaps between partially-reflective segments in the longitudinal series of partially-reflective segments. In an example, these gaps can be sufficiently large that a given light ray from the environment only travels through one partially-reflective segment in the longitudinal array of light-reflecting segments to reach a person's eye. In an alternative example, partially-reflective segments can be contiguous (e.g. without any gaps between them). Example variations discussed in other portions of this disclosure or in priority-linked disclosures can also be applied to this example where relevant, but are not repeated here in order to reduce narrative redundancy.

Figure 25:
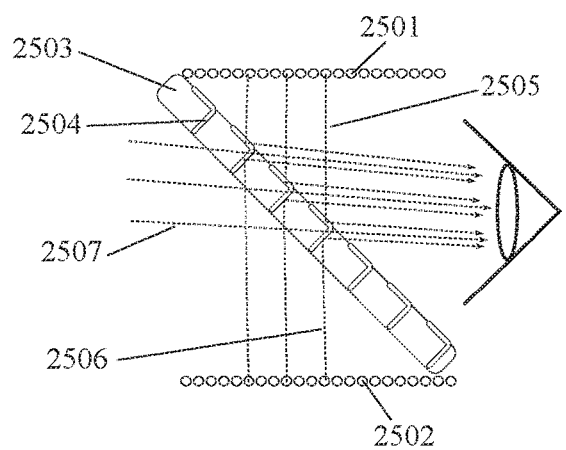
FIG. 25 shows two image displays above and below a diagonal structure with a series of reflective chevrons.

FIG. 25 shows another example of a lateral cross-sectional view of a single-eye optical structure (such as a smart lens) for augmented reality (AR) eyewear. This optical structure has first and second virtual image displays that emit light rays which display virtual objects in a person's field of view and a diagonally-oriented longitudinal discontinuous series of partially-reflective chevrons between the first and second virtual image displays.

With respect to specific components, FIG. 25 shows an optical structure for augmented reality (AR) eyewear comprising: a first virtual image display 2501 that emits light rays (including light ray 2505) which display virtual objects in a person's field of view; a second virtual image display 2502 that emits light rays (including light ray 2506) which display virtual objects in the person's field of view; and a diagonally-oriented longitudinal structure 2503 with a discontinuous series of partially-reflective chevrons (including chevron 2504) which is between the first virtual image display and the second virtual image display, wherein light rays from the environment (including light ray 2507) travel through the diagonally-oriented longitudinal structure to reach the eye.

In this example, first branches of chevrons in the longitudinal discontinuous series of chevrons are collinear. In this example, first branches of chevrons in the longitudinal discontinuous series of chevrons are parallel to the longitudinal axis of the longitudinal discontinuous series of partially-reflective chevrons. In this example, there are gaps between chevrons. In this example, the angles between chevron branches are equal. In an example, there can be different angles between branches in different chevrons. In an example, the average angle between branches of chevrons which are closer to the center of the person's field of view can be greater than the average angle between branches of chevrons which are peripheral to the person's field of view, or vice versa. In an example, the average angle between branches of chevrons which are higher can be greater than the average angle between branches of chevrons which are lower, or vice versa. In an example, second branches of chevrons in the longitudinal series of chevrons can each be substantially parallel to a virtual radial vector (e.g. a virtual spoke vector) which extends out from the center of the person's eye pupil and passes through that particular chevron.

In an example, a longitudinal discontinuous series of partially-reflective chevrons can include at least 10 partially-reflective chevrons. In an example, it can include between 10 and 1000 partially-reflective chevrons. In an example, the longitudinal axis of the longitudinal discontinuous series of partially-reflective chevrons can intersect the best-fitting plane of the first virtual image display at an angle within a range of 30 and 60 degrees. In an example, the longitudinal axis of the longitudinal discontinuous series of partially-reflective chevrons can intersect the best-fitting plane of the second virtual image display at an angle within a range of 30 and 60 degrees.

The optical structure shown in FIG. 25 can also be described as an optical structure for augmented reality (AR) eyewear comprising: an upper virtual image display (configured to be above a person's eye) that emits light rays which display virtual objects in a person's field of view; a lower virtual image display (configured to be below a person's eye) that emits light rays which display virtual objects in the person's field of view; and a diagonal longitudinal discontinuous series of partially-reflective chevrons between the first and second virtual image displays which reflects light rays from these displays towards the person's eye.

The example in FIG. 25 can also be described as an optical structure for augmented reality (AR) eyewear comprising: a longitudinal series of pairs of partially-reflective surfaces, wherein each pair further comprises a first partially-reflective surface with a first orientation and a second partially reflective surface with a second orientation, wherein the first and second orientations are substantially perpendicular to each other, wherein first partially-reflective surfaces in the longitudinal series of pairs of partially-reflective surfaces reflect light from a first virtual image display toward an eye, and wherein second partially-reflective surfaces in the longitudinal series of pairs of partially-reflective surfaces reflect light from a second virtual image display toward the eye. In an example, a longitudinal series of pairs of partially-reflective structures can comprise at least 10 pairs. In an example, a longitudinal series of pairs of partially-reflective structures can comprise between 10 and 1,000 pairs.

In an example, a longitudinal series of pairs of partially-reflective surfaces can be in front of the eye. In an example, a longitudinal series of pairs of partially-reflective surfaces can be between first and second virtual image displays. In an example, virtual extensions of the longitudinal axis of a longitudinal series of pairs of partially-reflective surfaces and the best-fitting plane of a first virtual image display can intersect at an angle within a range of 30 and 60 degrees. In an example, virtual extensions of the longitudinal axis of a longitudinal series of pairs of partially-reflective surfaces and the best-fitting plane of the first virtual image display can intersect at a 45-degree angle.

In an example, first partially-reflective surfaces can be parallel to the longitudinal axis of the longitudinal series of pairs of partially-reflective surfaces and second partially-reflective surfaces can be perpendicular to the longitudinal axis of the longitudinal series. In an example, first partially-reflective surfaces can be parallel to the longitudinal axis of the longitudinal series of pairs of partially-reflective surfaces and second partially-reflective surfaces can be intersect the longitudinal axis of the longitudinal series at an angle within a range of 70 to 110 degrees.

In an example, partially-reflective surfaces in a longitudinal series of pairs of partially-reflective surfaces can all be contiguous. In an example, first and second partially-reflective surfaces within pairs of partially-reflective surfaces can be contiguous, but there can be gaps between pairs. In an example, there can be gaps between all partially-reflective surfaces in a longitudinal series of pairs of partially-reflective surfaces. In an example, gaps between partially-reflective segments can be shorter than the segments. In an example, gaps between partially-reflective segments can be equal in size to the segments. Example variations discussed in other portions of this disclosure or in priority-linked disclosures can also be applied to this example where relevant, but are not repeated here in order to reduce narrative redundancy.

Figure 26:
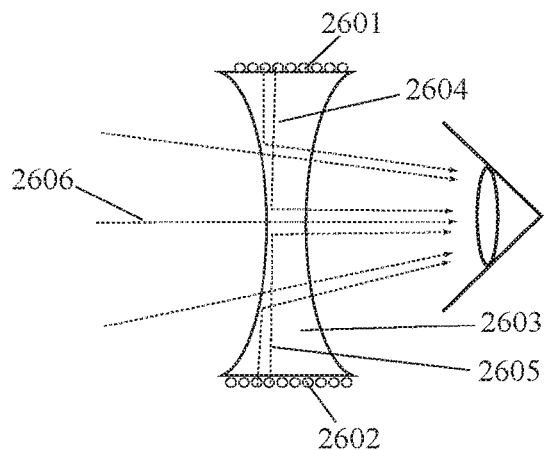
FIG. 26 shows two image displays above and below a concave lens.

FIG. 26 shows another example of a lateral cross-sectional view of a single-eye optical structure (such as a smart lens) for augmented reality (AR) eyewear. This optical structure has a concave lens between first and second virtual image displays, wherein light rays from the first and second virtual image displays are reflected by the distal surface of the concave lens toward a person's eye. In this example, the first and second virtual image displays are located above and below, respectively, the concave lens. In this example, light rays from the first and second virtual image displays travel through the interior of the concave lens before being reflected by the distal surface of the concave lens toward the person's eye.

Specifically, FIG. 26 shows an optical structure for augmented reality (AR) eyewear comprising: a concave lens (2603) which is configured to be in front of a person's eye, wherein the concave lens has a partially-reflective distal surface, first and second virtual image displays (2601 and 2602), wherein light rays (including 2604 and 2605) from the first and second virtual image displays travel through the interior of the concave lens before they are reflected by the partially-reflective distal surface of the concave lens toward the person's eye. Light rays from the environment (including 2606) also travel through the concave lens to reach the person's eye.

In an example, first and second virtual image displays can be located above and below, respectively, the concave lens. In an example, first and second virtual image displays can be located to the right and left, respectively, of the concave lens. In an example, light rays exiting the first and second virtual image displays can enter wide perimeter portions of the concave lens. In an example, light rays exiting the first and second virtual image displays can be in direct optical communication with the interior of the concave lens. In this example, the concave lens is cross-sectionally symmetric. In an example, a lens can be planoconcave, having a concave distal surface and a planar (e.g. flat) proximal surface. Example variations discussed in other portions of this disclosure or in priority-linked disclosures can also be applied to this example where relevant, but are not repeated here in order to reduce narrative redundancy.

Figure 27:
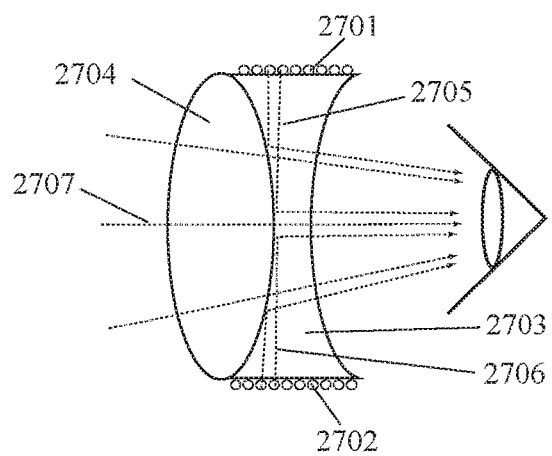
FIG. 27 shows two image displays above and below a concave lens, with the addition of a distal convex lens.

FIG. 27 shows another example of a lateral cross-sectional view of an optical structure (such as a smart lens) for augmented reality (AR) eyewear. This example is similar to the one in FIG. 26 except that it also includes a convex lens to provide optical correction for light rays from the environment which pass through the concave lens. The optical structure in FIG. 27 includes axially-aligned convex and concave lenses and first and second virtual image displays. In this example, the convex lens is distal relative to the concave lens. Light rays from first and second virtual image displays are reflected by the distal surface of the concave lens and/or the proximal surface of the convex lens toward a person's eye. The convex lens provides optical correction for light rays from the environment which also pass through the concave lens. In this example, the first and second virtual image displays are located above and below, respectively, the concave lens. In this example, light rays from the first and second virtual image displays travel through the interior of the concave lens before being reflected toward the person's eye.

Specifically, FIG. 27 shows an optical structure for augmented reality (AR) eyewear comprising: a convex lens (2704) which is configured to be in front of a person's eye; a concave lens (2703) which is also configured to be in front of the person's eye; first and second virtual image displays (2701 and 2702), wherein light rays (including 2705 and 2706) from the first and second virtual image displays travel through the interior of the concave lens before they are reflected by the distal surface of the concave lens and/or the proximal surface of the convex lens toward the person's eye. Light rays from the environment (including 2707) travel through both the convex lens and the concave lens to reach the person's eye. The convex lens helps to optically correct for distortion of environmental light rays which would otherwise be caused by their passing through the concave lens. In an example, there can be a reflective coating on the proximal surface of the convex lens or the distal surface of the concave lens. Example variations discussed in other portions of this disclosure or in priority-linked disclosures can also be applied to this example where relevant, but are not repeated here in order to reduce narrative redundancy.

Figure 28:
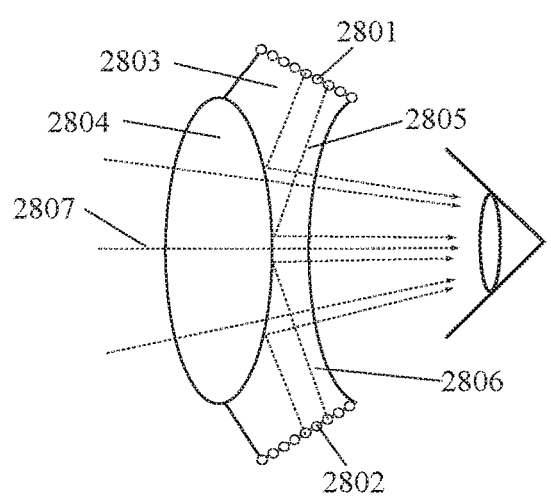
FIG. 28 shows two image displays above and below a free-form optical structure, with the addition of a distal convex lens.

FIG. 28 shows another example of a lateral cross-sectional view of a single-eye optical structure (such as a smart lens) for augmented reality (AR) eyewear. The optical structure in FIG. 28 includes a convex lens (2804) and a free-form optical structure (2803) located between first and second virtual image displays (2801 and 2802), wherein light rays (including 2805 and 2806) from the first and second virtual image displays are reflected by the proximal surface of the convex lens or the distal surface of the free-form optical structure toward a person's eye. Light rays from the environment (including 2807) travel through the convex lens and the free-form optical structure to the person's eye. In this example, the convex lens intrudes into the curve of the distal side of the free-form optical structure.

In this example, the distal and proximal sides of the free-form optical structure are arcuate, forming nested curves. In this example, the curve of the proximal side of the free-form optical structure is nested within the curve of the distal side of the free-form optical structure. In an example, the curves of the distal and proximal sides of the free-form optical structure can be concentric. In an example, the curves of the distal and proximal sides of the free-form optical structure can have conic section shapes. In an example, the concavities (or convexities) of the distal and proximal sides of the free-form optical structure can both face in the same direction. In an example, the curve of the distal side of the free-form optical structure can be interrupted by intrusion of the convex lens into the free-form optical structure.

In this example, first and second virtual image displays are located substantially above and below, respectively, a free-form optical structure. In this example, light rays from the first and second virtual image displays travel through the interior of the free-form optical structure before being reflected by the proximal surface of the convex lens or the distal surface of the free-form optical structure toward a person's eye. Example variations discussed in other portions of this disclosure or in priority-linked disclosures can also be applied to this example where relevant, but are not repeated here in order to reduce narrative redundancy.

Figure 29:
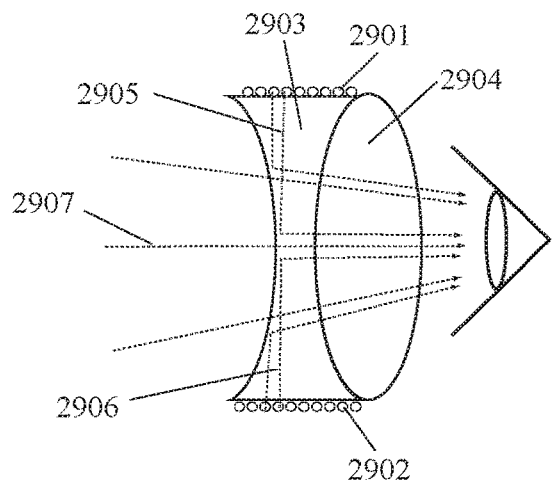
FIG. 29 shows two image displays above and below a concave lens, with the addition of a proximal convex lens.

FIG. 29 shows another example of an optical structure (such as a smart lens) for augmented reality (AR) eyewear. This example is similar to the one in FIG. 27 except that the proximal-to-distal order of the convex and concave lenses is reversed. In FIG. 29, the convex lens is proximal relative to the concave lens. The optical structure in FIG. 29 includes: a concave lens (2903) which is configured to be in front of a person's eye; a convex lens (2904) which is also configured to be in front of the person's eye, wherein the convex lens is proximal relative to the concave lens; and first and second virtual image displays (2901 and 2902) which emit light rays (including 2905 and 2906) which are reflected by the distal surface of the concave lens toward the person's eye. Light rays from the environment (including 2907) travel through both the concave lens and the convex lens to reach the person's eye.

In this example, first and second virtual image displays are located above and below, respectively, the concave lens. In this example, light rays from the first and second virtual image displays travel through the interior of the concave lens before being reflected by the distal surface of the concave lens toward the person's eye. In this example, the concave lens and the convex lens are axially aligned. In an example, there can be a reflective coating on the distal surface of the concave lens. Example variations discussed in other portions of this disclosure or in priority-linked disclosures can also be applied to this example where relevant, but are not repeated here in order to reduce narrative redundancy.

Figure 30:
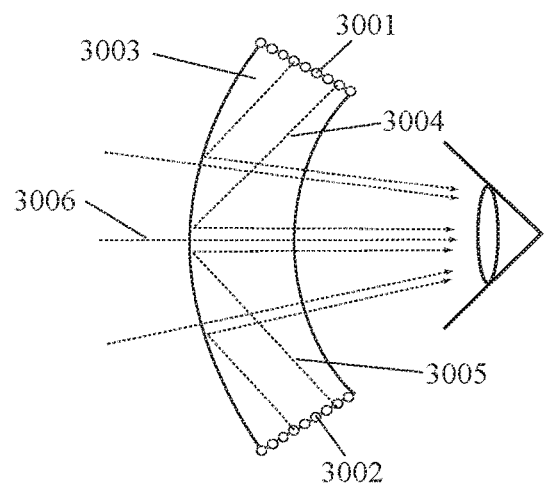
FIG. 30 shows two image displays above and below a lens with arcuate substantially-parallel proximal and distal sides.

FIG. 30 shows another example of an optical structure for augmented reality (AR) eyewear. The optical structure in FIG. 30 includes a free-form optical structure (3003) located between first and second virtual image displays (3001 and 3002), wherein light rays (including 3004 and 3005) from the first and second virtual image displays are reflected by the distal surface of the free-form optical structure toward a person's eye. Light rays from the environment (including 3006) travel through the free-form optical structure to the person's eye.

In this example, the distal and proximal sides of the free-form optical structure are arcuate, forming nested curves. In this example, the curve of the proximal side of the free-form optical structure is nested within the curve of the distal side of the free-form optical structure. In an example, the curves of the distal and proximal sides of the free-form optical structure can be concentric. In an example, the curves of the distal and proximal sides of the free-form optical structure can have conic section or spherical section shapes. In an example, the concavities (or convexities) of the distal and proximal sides of the free-form optical structure can both face in the same direction.

In an example, arcuate distal and proximal sides of a free-form optical structure can be substantially equidistant from each other. In an example, arcuate distal and proximal sides of a free-form optical structure can be closer together in upper portions of the free-form optical structure and farther apart in lower portions of the free-form optical structure, or vice versa. In an example, an upper portion of an arcuate free-form optical structure can have a first width, a lower portion of the arcuate free-form structure can have a second width, and the second width can be (at least 10%) greater than the first width, or vice versa. In this example, arcuate distal and proximal sides of a free-form optical structure can be closer together in central portions of the free-form optical structure and farther apart in peripheral portions of the free-form optical structure, or vice versa. In an example, an central portion of an arcuate free-form optical structure can have a first width, peripheral portions of the arcuate free-form structure can have a second width, and the second width can be (at least 10%) greater than the first width, or vice versa In an example, first and second virtual image displays can be located (primarily) above and below, respectively, a free-form optical structure. In this example, light rays from the first and second virtual image displays travel through the interior of the free-form optical structure before being reflected by the distal surface of the free-form optical structure toward a person's eye. Example variations discussed in other portions of this disclosure or in priority-linked disclosures can also be applied to this example where relevant, but are not repeated here in order to reduce narrative redundancy.

Figure 31:
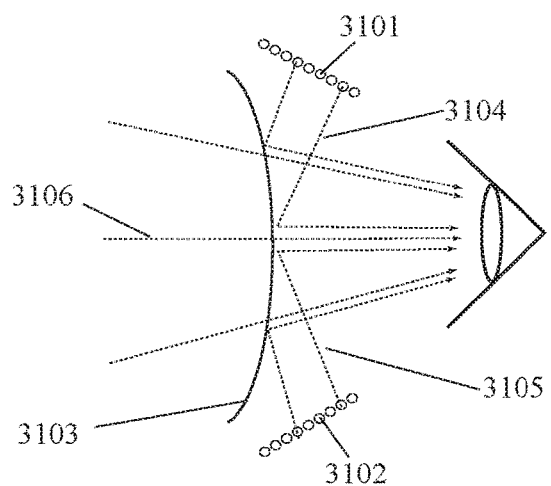
FIG. 31 shows two image displays above and below a distal convex reflective surface.

FIG. 31 shows another example of an optical structure for augmented reality (AR) eyewear. The optical structure in FIG. 31 comprises: an arcuate partially-reflective surface (3103) which is configured to be in front of a person's eye and whose curvature opens (e.g. faces) in a distal direction; an upper virtual image display (3101) which is primarily higher than the arcuate partially-reflective surface, wherein this upper virtual image display emits light rays (including 3104) toward the arcuate partially-reflective surface, and wherein these light rays are reflected by an upper portion of the arcuate partially-reflective surface toward the person's eye; a lower virtual image display (3102) which is primarily lower than the arcuate partially-reflective surface, wherein this lower virtual image display emits light rays (including 3105) toward the arcuate partially-reflective surface, and wherein these light rays are reflected by a lower portion of the arcuate partially-reflective surface toward the person's eye. Light rays from the environment (including 3106) travel through the arcuate partially-reflective surface to reach the person's eye. In an example, an arcuate partially-reflective surface can have a conic section shape or a spherical section shape.

In an example, an upper portion of the arcuate partially-reflective surface is the upper half of this surface and a lower portion of the arcuate partially-reflective surface is the lower half of this surface. In an example, an upper virtual image display can have a best-fitting plane (or a proximal-to-distal axis) which is parallel to a virtual radial vector (e.g. a virtual spoke vector) which extends out from the center of the person's eye pupil and passes through the virtual image display. In an example, an upper virtual image display can have a best-fitting plane (or a proximal-to-distal axis) which is parallel to a virtual plane which is tangential to the proximal surface of the arcuate partially-reflective surface at a location in the upper half of the arcuate partially-reflective surface. In an example, an upper virtual image display can have a best-fitting plane (or a proximal-to-distal axis) which is parallel to a virtual plane which is tangential to the proximal surface of the arcuate partially-reflective surface at a location in the upper quartile of the arcuate partially-reflective surface.

In an example, an optical structure for augmented reality (AR) eyewear can comprise: an arcuate partially-reflective surface which is configured to be in front of a person's eye and whose curvature opens (e.g. faces) in a distal direction; a right-side virtual image display which is substantially to the right of the arcuate partially-reflective surface, wherein this right-side virtual image display emits light rays toward the arcuate partially-reflective surface, and wherein these light rays are reflected by a right-side portion of the arcuate partially-reflective surface toward the person's eye; a left-side virtual image display which is substantially to the left-side of the arcuate partially-reflective surface, wherein this left-side virtual image display emits light rays toward the arcuate partially-reflective surface, and wherein these light rays are reflected by a left-side portion of the arcuate partially-reflective surface toward the person's eye.

In an example, a right-side portion of the arcuate partially-reflective surface is the right-side half of this surface and a left-side portion of the arcuate partially-reflective surface is the left-side half of this surface. In an example, a right-side virtual image display can have a best-fitting plane (or a proximal-to-distal axis) which is parallel to a virtual radial vector (e.g. a virtual spoke vector) which extends out from the center of the person's eye pupil and passes through the virtual image display. In an example, a right-side virtual image display can have a best-fitting plane (or a proximal-to-distal axis) which is parallel to a virtual plane which is tangential to the proximal surface of the arcuate partially-reflective surface at a location in the right-side half of the arcuate partially-reflective surface. In an example, a right-side virtual image display can have a best-fitting plane (or a proximal-to-distal axis) which is parallel to a virtual plane which is tangential to the proximal surface of the arcuate partially-reflective surface at a location in the right-side quartile of the arcuate partially-reflective surface.

In an example, virtual extensions of the best-fitting planes of the first and second (e.g. upper and lower, or right and left) virtual image displays can intersect at an angle within the range of 30 to 70 degrees. In an example, virtual extensions of the best-fitting planes of the first and second virtual image displays can intersect at a 45-degree angle. Example variations discussed in other portions of this disclosure or in priority-linked disclosures can also be applied to this example where relevant, but are not repeated here in order to reduce narrative redundancy.

Figure 32:
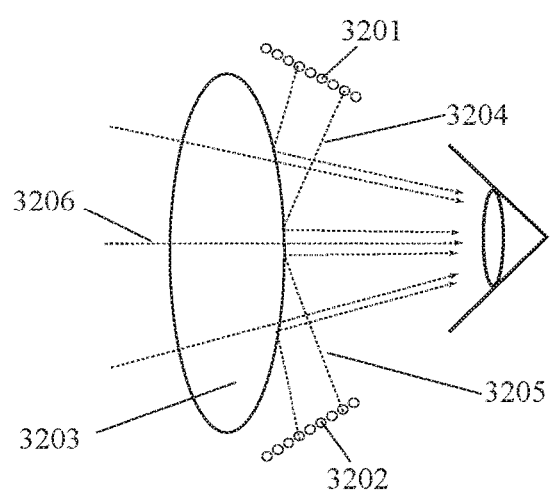
FIG. 32 shows two image displays above and below a distal convex reflective lens.

FIG. 32 shows another example of an optical structure for augmented reality (AR) eyewear. The optical structure in FIG. 32 comprises: a partially-reflective convex lens (3203) which is configured to be in front of a person's eye; an upper virtual image display (3201), wherein the upper virtual image display emits first light rays (including 3204) toward the convex lens, and wherein the first light rays are reflected by an upper half of the convex lens toward the person's eye; and a lower virtual image display (3202), wherein the lower virtual image display emits second light rays (including 3205) toward the convex lens, and wherein the second light rays are reflected by a lower half of the convex lens toward the person's eye. Light rays from the environment (including 3206) travel through the convex lens to reach the person's eye.

In an example, an upper virtual image display can have a best-fitting plane (and/or a proximal-to-distal axis) which is parallel to a virtual radial vector (e.g. a virtual spoke vector) which extends out from the center of a person's eye pupil and passes through the virtual image display. In an example, an upper virtual image display can have a best-fitting plane (and/or a proximal-to-distal axis) which is parallel to a virtual plane which is tangential to the proximal surface of the convex lens at a location in the upper half of the convex lens. In an example, an upper virtual image display can have a best-fitting plane (and/or a proximal-to-distal axis) which is parallel to a virtual plane which is tangential to the proximal surface of the convex lens at a location in the upper quartile of the convex lens.

In an example, an optical structure for augmented reality (AR) eyewear can comprise: a partially-reflective convex lens which is configured to be in front of a person's eye; a right-side virtual image display, wherein the right-side virtual image display emits first light rays toward the convex lens, and wherein the first light rays are reflected by a right half of the convex lens toward the person's eye; and a left-side virtual image display, wherein the left-side virtual image display emits second light rays toward the convex lens, and wherein the second light rays are reflected by a left half of the convex lens toward the person's eye.

In an example, a right-side virtual image display can have a best-fitting plane (and/or a proximal-to-distal axis) which is parallel to a virtual radial vector (e.g. a virtual spoke vector) which extends out from the center of a person's eye pupil and passes through the virtual image display. In an example, a right-side virtual image display can have a best-fitting plane (and/or a proximal-to-distal axis) which is parallel to a virtual plane which is tangential to the proximal surface of the convex lens at a location in the right-side half of the convex lens. In an example, a right-side virtual image display can have a best-fitting plane (and/or a proximal-to-distal axis) which is parallel to a virtual plane which is tangential to the proximal surface of the convex lens at a location in the farthest-right quartile of the convex lens.

In an example, virtual extensions of the best-fitting planes of right-side and left-side virtual image displays can intersect at an angle within the range of 30 to 70 degrees. In an example, virtual extensions of the best-fitting planes of the right-side and left-side virtual image displays can intersect at a 45-degree angle. Example variations discussed in other portions of this disclosure or in priority-linked disclosures can also be applied to this example where relevant, but are not repeated here in order to reduce narrative redundancy.

Figure 33:
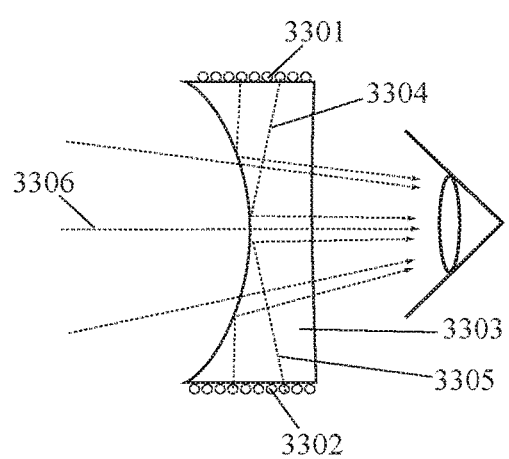
FIG. 33 shows two image displays above and below a planoconcave lens with a planar proximal side.

FIG. 33 shows another example of an optical structure for augmented reality (AR) eyewear. This optical structure has a planoconcave lens between first and second virtual image displays, wherein light rays from the first and second virtual image displays are reflected by an arcuate partially-reflective distal surface of the planoconcave lens toward a person's eye. In this example, first and second virtual image displays are located above and below, respectively, the planoconcave lens. In this example, light rays from the first and second virtual image displays travel through the interior of the planoconcave lens before being reflected by the arcuate partially-reflective distal surface of the planoconcave lens toward the person's eye.

Specifically, FIG. 33 shows an optical structure for augmented reality (AR) eyewear comprising: a planoconcave lens (3303) which is configured to be in front of a person's eye, wherein the planoconcave lens has an arcuate partially-reflective distal surface and a planar proximal surface, first and second virtual image displays (3301 and 3302), wherein light rays (including 3304 and 3305) from the first and second virtual image displays travel through the interior of the planoconcave lens before they are reflected by the arcuate partially-reflective distal surface of the planoconcave lens toward the person's eye. Light rays from the environment (including 3306) also travel through the planoconcave lens to reach the person's eye.

In an example, first and second virtual image displays can be located above and below, respectively, the planoconcave lens. In an alternative example, first and second virtual image displays can be located to the right and left, respectively, of the planoconcave lens. In an example, light rays exiting the first and second virtual image displays can enter wide perimeter portions of the planoconcave lens. In an example, light rays exiting the first and second virtual image displays can be in direct optical communication with the interior of the planoconcave lens. Example variations discussed in other portions of this disclosure or in priority-linked disclosures can also be applied to this example where relevant, but are not repeated here in order to reduce narrative redundancy.

Figure 34:
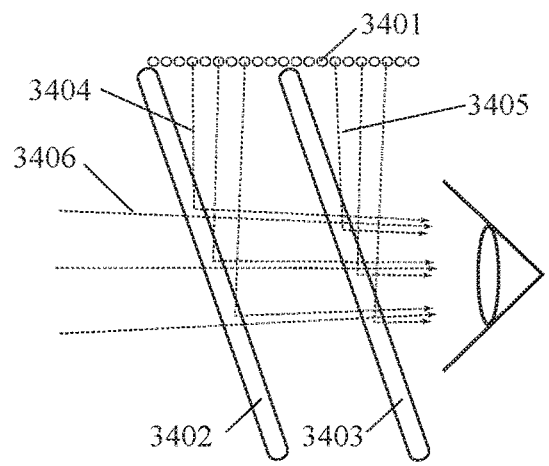
FIG. 34 shows an image display above two parallel diagonal reflective structures.

FIG. 34 shows another example of an optical structure for augmented reality (AR) eyewear. The example in FIG. 34 is like the one in FIG. 20 except that there is only one virtual image display (which is reflected by two diagonally-oriented partially-reflective surfaces) instead of two virtual image displays. Although this figure just shows a single optical structure near one eye, it is to be understood that augmented reality (AR) eyewear can include two such optical structures, one for each eye. Also, this figure does not show an eyewear frame, but it is to be understood that this optical structure can be held in proximity to a person's eye by any of a number of different types of eyewear frames. In an example, this example can further comprise one or more components selected from the group consisting of: eyewear frame; a power source (such as a battery); a data processor; a wireless data transmitter and/or data receiver; a camera and/or eye tracker; an environmental light monitor; an electromagnetic energy sensor; and a user interface.

The optical structure for augmented reality (AR) eyewear in FIG. 34 comprises: a virtual image display 3401 that emits light rays (including light rays 3404 and 3405) which display virtual objects in a person's field of view, wherein an image-projecting surface of the virtual image display is best fitted by a first plane; a proximal partially-reflective surface 3403 which is configured to reflect light rays from a proximal portion (e.g. the proximal half) of the virtual image display toward an eye, wherein the first partially-reflective surface is best fitted by a second plane, and wherein virtual extensions of the first and second planes intersect at an angle within a range of 20 to 70 degrees; a distal partially-reflective surface 3402 which is configured to reflect light rays from a distal portion (e.g. the distal half) of the virtual image display toward the eye, wherein the distal partially-reflective surface is best fitted by a third plane, wherein virtual extensions of the first and third planes intersect at an angle within a range of 20 to 70 degrees, wherein light rays from the distal portion of the virtual image display travel through the proximal partially-reflective surface before these light rays reach the eye, and wherein light rays from the environment (including light ray 3406) travel sequentially through the distal partially-reflective surface and the proximal partially-reflective surface to reach the eye.

FIG. 34 can also be described as an optical structure for augmented reality (AR) eyewear comprising: a virtual image display which emits light rays which display virtual objects in a person's field of view; a first partially-reflective surface which reflects light rays from a first portion of the virtual image display toward one of the person's eyes; a second partially-reflective surface which reflects light rays from a second portion of the virtual image display toward the eye, wherein the first partially-reflective surface and the second partially-reflective surface are parallel to each other, wherein light rays from the second portion of the virtual image display travel through the first partially-reflective surface before they reach the person's eye, and wherein light rays from the person's environment travel sequentially through the second partially-reflective surface and the first partially-reflective surface to reach the person's eye.

In an example, there can be two partially-reflective surfaces in a proximal-to-distal array of parallel partially-reflective surfaces. In an example, there can be three or more partially-reflective surfaces in a proximal-to-distal array of parallel partially-reflective surfaces. In an example, partially-reflective surfaces in a proximal-to-distal array of parallel partially-reflective surfaces can be axially aligned. In an example, a virtual image display can be located in a plane above the horizontal plane which crosses the top of an eye. In an example, a virtual image display can be located in a plane below the horizontal plane which crosses the bottom of an eye. In an example, a virtual image display can be located in a plane to the right of the plane which crosses the right side of an eye. In an example, a virtual image display can be located in a plane to the left of the plane which crosses the left side of an eye.

In an example, extensions of a plane which best fits a virtual image display and a plane which best fits a partially reflective surface can intersect at an angle within a range of 30 and 60 degrees. In an example, a plane which best fits a virtual image display and a plane which best fits a partially reflective surface can intersect at a 45-degree angle. In an example, the centroids of first and second partially-reflective surfaces can be directly in front of a person's eye. In an example, the centroids of first and second partially-reflective surfaces can be aligned with (e.g. parallel to) a central line-of-sight vector. In an example, first and second partially-reflective surfaces together can extend outward from a person's eye by a distance in the range of ½" to 4". In an example, first and second partially-reflective surfaces together can extend outward from a person's eye by a distance in the range of ¼" to 1". Example variations discussed in other portions of this disclosure or in priority-linked disclosures can also be applied to this example where relevant, but are not repeated here in order to reduce narrative redundancy.

Figure 35:
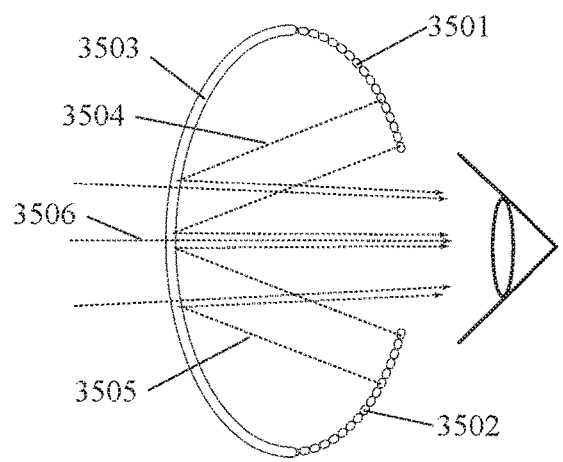
FIG. 35 shows upper and lower convex image displays, with the addition of a distal concave reflective surface.

FIG. 35 shows another example of an optical structure for augmented reality (AR) eyewear. The optical structure for augmented reality (AR) eyewear in FIG. 35 comprises: an arcuate partially-reflective surface 3503 which is configured to be in front of a person's eye; a first arcuate virtual image display 3501, wherein the first arcuate virtual image display emits first light beams (including 3504) toward the arcuate partially-reflective surface, wherein the first light beams are reflected by the arcuate partially-reflective surface toward the person's eye where they create a (portion of a) virtual image in the person's field of vision; and a second arcuate virtual image display 3502, wherein the second arcuate virtual image display emits second light beams (including 3505) toward the arcuate partially-reflective surface, wherein the second light beams are reflected by the arcuate partially-reflective surface toward the person's eye where they create a (portion of a) virtual image in the person's field of vision, and wherein cross-sections of the arcuate partially-reflective surface, the first arcuate virtual image display, and the second arcuate virtual image display combine to form at least 50% of the perimeter of an arcuate shape. Light rays from the environment (including 3506) pass through the arcuate partially-reflective surface to reach the eye.

In an example, an arcuate shape which is partially formed by cross sections of the arcuate partially-reflective surface, first arcuate virtual image display, and/or second arcuate virtual image display can be a circle, ellipse, or oval. In an example, this arcuate shape can be shaped like a cross-sectional perimeter of a convex lens. In an example, cross sections of the arcuate partially-reflective surface, the first arcuate virtual image display, and the second arcuate virtual image display can combine to form at least 75% of the perimeter of the arcuate shape. In an example, a cross section of the arcuate partially-reflective surface can comprise at least 40% of an arcuate shape selected from the group consisting of: circle; ellipse; oval; and conic section. In an example, cross sections of the first and second arcuate image displays can together comprise at least 30% of an arcuate shape selected from the group consisting of: circle; ellipse; oval; and conic section. In an example: the cross section of the arcuate partially-reflective surface can comprise at least 40% of an arcuate shape selected from the group consisting of circle, ellipse, oval, and conic section; and cross sections of the first and second arcuate image displays can together comprise at least 30% of an arcuate shape selected from the group consisting of circle, ellipse, oval, and conic section. Example variations discussed in other portions of this disclosure or in priority-linked disclosures can also be applied to this example where relevant, but are not repeated here in order to reduce narrative redundancy.

Figure 36:
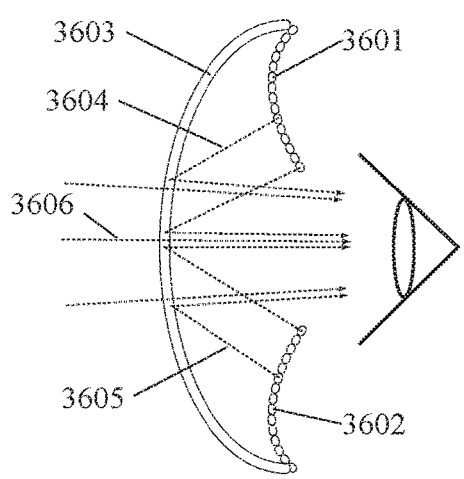
FIG. 36 shows upper and lower concave image displays, with the addition of a distal concave reflective surface.

FIG. 36 shows another example of an optical structure for augmented reality (AR) eyewear. The optical structure for augmented reality (AR) eyewear in FIG. 36 comprises: an arcuate partially-reflective surface 3603 which is configured to be within ¼" to 6" in front of a person's eye, wherein the curvature of this arcuate partially-reflective surface opens (faces) in a proximal direction; a first arcuate virtual image display 3601, wherein the curvature of this first arcuate virtual image display opens (faces) in a proximal direction, wherein the first arcuate virtual image display emits first light beams (including 3604) toward the arcuate partially-reflective surface, wherein the first light beams are reflected by the arcuate partially-reflective surface toward the person's eye where they create a (portion of a) virtual image in the person's field of vision; and a second arcuate virtual image display 3602, wherein the curvature of this second arcuate virtual image display opens (faces) in a proximal direction, wherein the second arcuate virtual image display emits second light beams (including 3605) toward the arcuate partially-reflective surface, wherein the second light beams are reflected by the arcuate partially-reflective surface toward the person's eye where they create a (portion of a) virtual image in the person's field of vision. Light rays from the environment (including 3606) pass through the arcuate partially-reflective surface to reach the eye.

In an example, a cross section arcuate partially-reflective surface can comprise at least 30% of an arcuate shape selected from the group consisting of: circle; ellipse; oval; and conic section. In an example, a cross section of a first or second arcuate image displays can together comprise at least 15% of an arcuate shape selected from the group consisting of: circle; ellipse; oval; and conic section. Example variations discussed in other portions of this disclosure or in priority-linked disclosures can also be applied to this example where relevant, but are not repeated here in order to reduce narrative redundancy.

Figure 37:
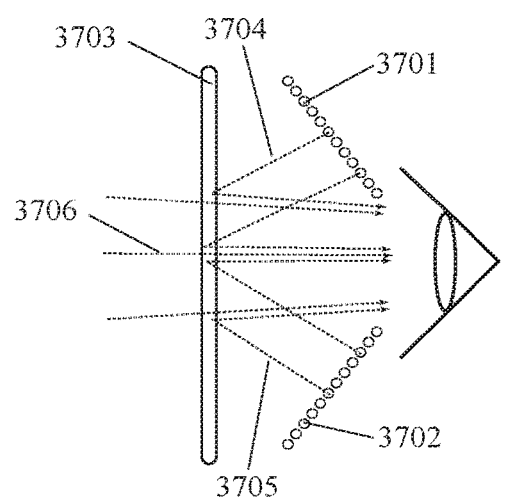
FIG. 37 shows upper and lower planar image displays, with the addition of a distal planar reflective surface.

FIG. 37 shows another example of an optical structure for augmented reality (AR) eyewear. The optical structure for augmented reality (AR) eyewear in FIG. 37 comprises: a planar partially-reflective surface 3703 which is configured to be within ¼" to 6" in front of a person's eye; an upper virtual image display 3701 that emits first light beams (including 3704) toward the proximal side of the planar partially-reflective surface, wherein the first light beams are reflected by the planar partially-reflective surface toward the person's eye where they create a (portion of a) virtual image in the person's field of vision; and a lower virtual image display 3702 that emits second light beams (including 3705) toward the proximal side of the planar partially-reflective surface, wherein the second light beams are reflected by the planar partially-reflective surface toward the person's eye where they create a (portion of a) virtual image in the person's field of vision, wherein virtual extensions of the planes which best fit the upper and lower virtual image displays intersect at an angle within the range of 60 to 120 degrees. In an example, this angle can be a 90-degree angle. In an example, light rays from the environment (including 3706) pass through the planar partially-reflective structure to reach the person's eye.

In an example, an optical structure for augmented reality (AR) eyewear can comprise: a planar partially-reflective surface which is configured to be in front of a person's eye; a right-side virtual image display that emits first light beams toward the planar partially-reflective surface, wherein the first light beams are reflected by the planar partially-reflective surface toward the person's eye where they create a (portion of a) virtual image in the person's field of vision; and a left-side virtual image display that emits second light beams toward the planar partially-reflective surface, wherein the second light beams are reflected by the planar partially-reflective surface toward the person's eye where they create a (portion of a) virtual image in the person's field of vision, wherein virtual extensions of the planes which best fit the upper and lower virtual image displays intersect at an angle within the range of 60 to 120 degrees. Example variations discussed in other portions of this disclosure or in priority-linked disclosures can also be applied to this example where relevant, but are not repeated here in order to reduce narrative redundancy.

Figure 38:
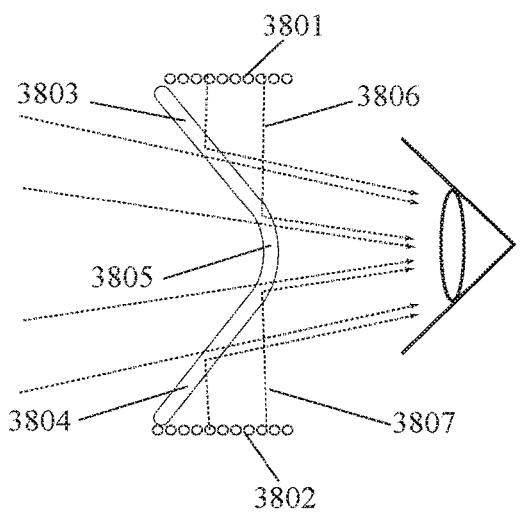
FIG. 38 shows two image displays above and below a distal rounded-conical reflective surface.

FIG. 38 shows another example of an optical structure for augmented reality (AR) eyewear. This example can be colloquially called a "space capsule design" because a plano-arcuate partially-reflective structure in front of a person's eye has a cross-sectional shape which comprises a triangle with a rounded central vertex and this shape is like the cross-sectional shape of early space capsules. Although this figure just shows a single optical structure near one eye, it is to be understood that augmented reality (AR) eyewear can include two such optical structures, one for each eye. Also, this figure does not show an eyewear frame, but it is to be understood that this optical structure can be held in proximity to a person's eye by any of a number of different types of eyewear frames. In an example, this example can further comprise one or more components selected from the group consisting of: eyewear frame; a power source (such as a battery); a data processor; a wireless data transmitter and/or data receiver; a camera and/or eye tracker; an environmental light monitor; an electromagnetic energy sensor; and a user interface.

The optical structure for augmented reality (AR) eyewear in FIG. 38 comprises: a plano-arcuate partially-reflective structure which is configured to be within ¼" to 6" in front of a person's eye, wherein a rounded vertex of this plano-arcuate partially-reflective structure points toward the person's eye, and wherein a cross-sectional perimeter of this structure can be divided into peripheral portions (3803 and 3804) which are planar (flat) and a central portion (3805) which is arcuate; a first virtual image display 3801 that emits first light beams (including 3806) toward a first side of the plano-arcuate partially-reflective structure, wherein the first light beams are reflected by the first side of the plano-arcuate partially-reflective structure toward the person's eye where they create a (portion of a) virtual image in the person's field of vision; and a second virtual image display 3802 that emits second light beams (including 3807) toward a second side of the plano-arcuate partially-reflective structure, wherein the second light beams are reflected by the second side of the plano-arcuate partially-reflective structure toward the person's eye where they create a (portion of a) virtual image in the person's field of vision.

In an example, a plano-arcuate partially-reflective structure can be a hollow shell. In an example, a plano-arcuate partially-reflective structure can be a solid structure such as a prism. In an example, first and second virtual image displays can be parallel to each other. In an example virtual extensions of planar portions (3803 and 3804) of the plano-arcuate partially-reflective structure can intersect at an angle within the range of 60 to 100 degrees. In an example, a cross-section of the arcuate portion (3805) of the plano-arcuate partially-reflective structure can comprise a section of a circle, ellipse, oval, and/or conic section. Example variations discussed in other portions of this disclosure or in priority-linked disclosures can also be applied to this example where relevant, but are not repeated here in order to reduce narrative redundancy.

Figure 39:
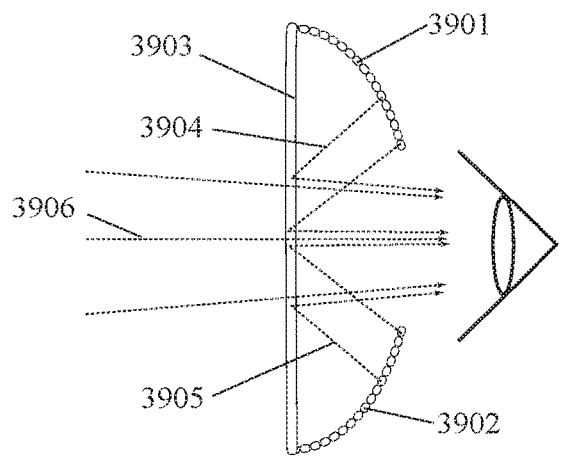
FIG. 39 shows upper and lower convex image displays, with the addition of a distal flat reflective surface.

FIG. 39 shows another example of an optical structure for augmented reality (AR) eyewear. The optical structure for augmented reality (AR) eyewear in FIG. 39 comprises: a planar partially-reflective structure 3903 which is configured to be within ¼" to 6" in front of a person's eye; a first arcuate virtual image display 3901 that emits first light beams (including 3904) toward the proximal side of the planar partially-reflective structure, wherein the first light beams are reflected by the planar partially-reflective structure toward the person's eye where they create a (portion of a) virtual image in the person's field of vision; and a second arcuate virtual image display 3902 that emits second light beams (including 3905) toward the proximal side of the planar partially-reflective structure, wherein the second light beams are reflected by the planar partially-reflective structure toward the person's eye where they create a (portion of a) virtual image in the person's field of vision.

In this example, first and second arcuate virtual image displays are symmetric around the central line-of-sight vector, wherein the central line-of-sight vector is defined as the vector in a horizontal plane which extends straight outward in a forward direction from the center of the pupil of the person's eye. In an example, cross sections of the first and second arcuate virtual image displays can be portions of the same virtual circle, ellipse, or oval. In an example, cross sections of the first and second arcuate virtual image displays can together comprise at least 30% of the perimeter of a virtual circle, ellipse, or oval. Example variations discussed in other portions of this disclosure or in priority-linked disclosures can also be applied to this example where relevant, but are not repeated here in order to reduce narrative redundancy.

Figure 40:
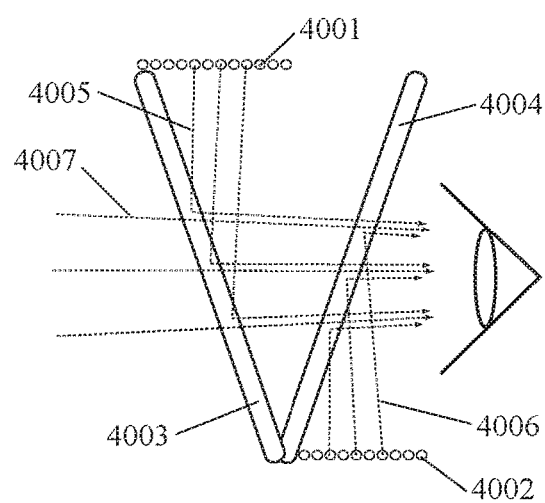
FIG. 40 shows two image displays above and below two intersecting diagonal reflective structures.

FIG. 40 shows another example of an optical structure for augmented reality (AR) eyewear. The optical structure for augmented reality (AR) eyewear in FIG. 40 comprises: an upper virtual image display 4001 which is best fitted by a first virtual plane; a lower virtual image display 4002 which is best fitted by a second virtual plane; a distal partially-reflective surface 4003 which is configured to be in front of a person's eye and reflect light beams (including 4005) from the upper virtual image display toward the person's eye, wherein the distal partially-reflective surface is best fitted by a third virtual plane; and a proximal partially-reflective surface 4004 which is configured to be in front of a person's eye and reflect light beams (including 4006) from the lower virtual image display toward the person's eye, wherein the proximal partially-reflective surface is best fitted by a fourth virtual plane. Light rays from the environment (including 4007) pass through the distal and proximal planar partially-reflective surfaces to reach the person's eye. Light rays from the upper virtual image display pass through the proximal partially-reflective surface to reach the person's eye.

In a variation on this example, an optical structure for augmented reality (AR) eyewear can comprise: a right-side virtual image display which is best fitted by a first virtual plane; a left-side virtual image display which is best fitted by a second virtual plane; a distal partially-reflective surface which is configured to be in front of a person's eye and reflect light beams (from the right-side virtual image display toward the person's eye, wherein the distal partially-reflective surface is best fitted by a third virtual plane; and a proximal partially-reflective surface which is configured to be in front of a person's eye and reflect light beams from the left-side virtual image display toward the person's eye, wherein the proximal partially-reflective surface is best fitted by a fourth virtual plane.

In an example, the first and second planes can be parallel to each other. In an example, the first and third planes can intersect at a (proximal-facing) angle within the range of 30 to 70 degrees. In an example, the second and fourth planes can intersect at a (proximal-facing) angle within the range of 30 to 70 degrees. In an example, the third and fourth planes can intersect at an angle within the range of 30 to 70 degrees. In an example, the third and fourth planes can intersect at a 60-degree angle. In an example, the third and fourth planes can intersect at a 45-degree angle. In an example, cross-sections of the distal and proximal partially-reflective surfaces can form a "V" shape. In an example, the third and fourth planes can intersect the central line-of-sight vector at one or more angles within the range of 30 to 70 degrees. In an example, the third and fourth planes can each intersect the central line-of-sight vector at a 60-degree angle. In an example, the third and fourth planes can each intersect the central line-of-sight vector at a 45-degree angle. In an example, the centroid of the proximal partially-reflective surface is a first distance from the person's eye, the centroid of the distal partially-reflective surface is a second distance from the person's eye, and the second distance is greater than the first distance. Example variations discussed in other portions of this disclosure or in priority-linked disclosures can also be applied to this example where relevant, but are not repeated here in order to reduce narrative redundancy.

Figure 41:
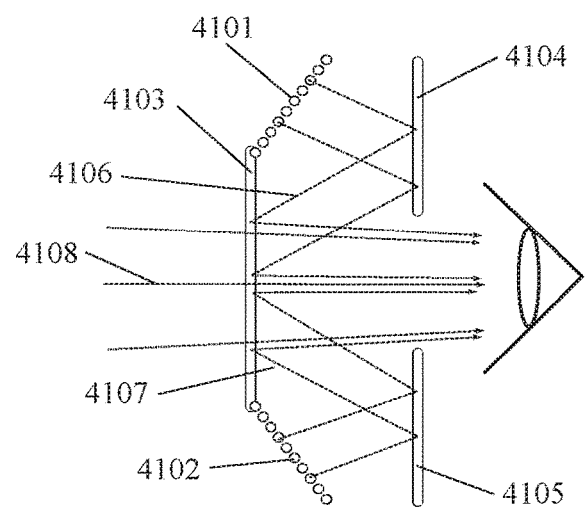
FIG. 41 shows two image displays, above and below a distal reflective structure, with the addition of two proximal reflective structures.

FIG. 41 shows another example of an optical structure for augmented reality (AR) eyewear. The optical structure for augmented reality (AR) eyewear in FIG. 41 comprises: an upper virtual image display (4101); a lower virtual image display (4102); a distal partially-reflective surface (4103); an upper proximal reflective surface (4104); and a lower proximal reflective surface (4105), wherein light rays (including 4106) from the upper virtual image display are reflected in a distal direction from the upper proximal reflective surface and then reflected toward a person's eye by the distal partially-reflective surface, and wherein light rays (including 4107) from the lower virtual image display are reflected in a distal direction from the lower proximal reflective surface and then reflected toward the person's eye by the distal partially-reflective surface. Light rays from the environment (including 4108) pass through the distal partially-reflective surface to reach the person's eye.

The optical structure for augmented reality (AR) eyewear in FIG. 41 can also be described as comprising: an upper virtual image display which is best fitted by a first virtual plane; a lower virtual image display which is best fitted by a second virtual plane; a distal partially-reflective surface which is best fitted by a third virtual plane; an upper proximal reflective surface which is best fitted by a fourth plane; and a lower proximal reflective surface which is best fitted by a fifth plane, wherein light rays from the upper virtual image display are reflected in a distal direction from the upper proximal reflective surface and then reflected toward a person's eye by the distal partially-reflective surface, wherein light rays from the lower virtual image display are reflected in a distal direction from the lower proximal reflective surface and then reflected toward the person's eye by the distal partially-reflective surface.

In an example, an optical structure for augmented reality (AR) eyewear can comprise: a right-side virtual image display which is best fitted by a first virtual plane; a left-side virtual image display which is best fitted by a second virtual plane; a distal partially-reflective surface which is best fitted by a third virtual plane; a right-side proximal reflective surface which is best fitted by a fourth plane; and a left-side proximal reflective surface which is best fitted by a fifth plane, wherein light rays from the right-side virtual image display are reflected in a distal direction from the right-side proximal reflective surface and then reflected toward a person's eye by the distal partially-reflective surface, wherein light rays from the left-side virtual image display are reflected in a distal direction from the left-side proximal reflective surface and then reflected toward the person's eye by the distal partially-reflective surface.

In an example, first and second virtual planes can intersect at a (proximal-facing) angle within the range of 30 to 70 degrees. In an example, the first and third virtual planes can intersect at a (proximal-facing) angle within the range of 30 to 70 degrees. In an example, the second and third virtual planes can intersect at a (proximal-facing) angle within the range of 30 to 70 degrees. In an example, the fourth and fifth planes can be coplanar. In an example, the third and fourth planes can be parallel to each other. Example variations discussed in other portions of this disclosure or in priority-linked disclosures can also be applied to this example where relevant, but are not repeated here in order to reduce narrative redundancy.

Figure 42:
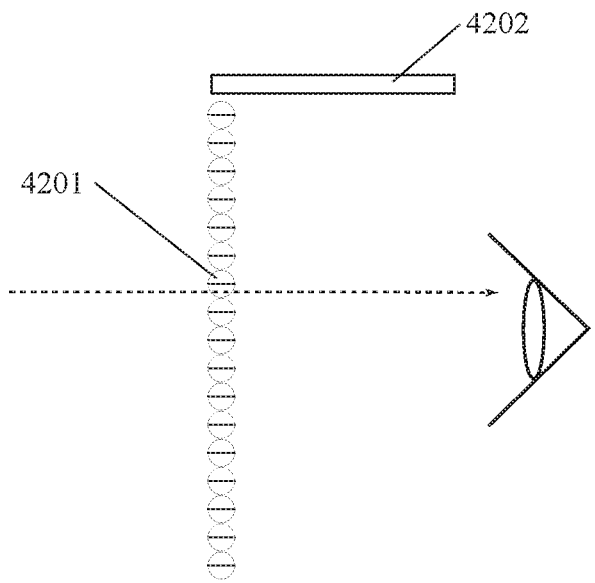
FIGS. 42 and 43 show sequential views of an image display above a lens with a parallel array of rotating reflective louvers.
Figure 43:
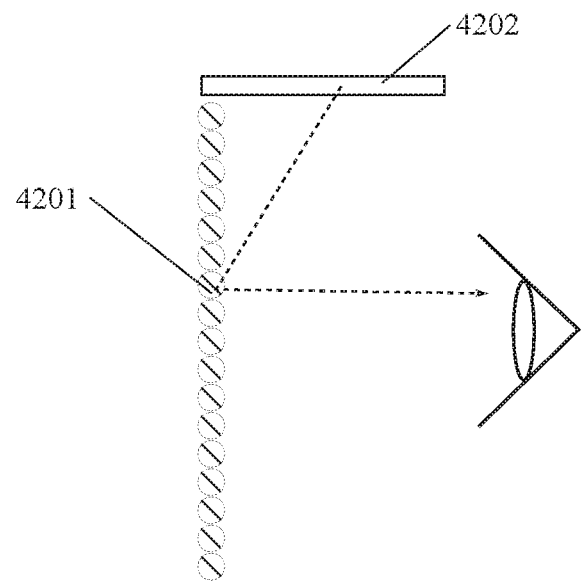

FIGS. 42 and 43 show two sequential cross-sectional side views of an optical structure for augmented reality (AR) eyewear comprising: a virtual image display (4202) which is configured to be within 4" of a person's eye, wherein this virtual image display emits light beams which create a virtual image in the person's field of view; and an array of partially-reflective surfaces (including 4201) which are configured be within 4" of the person's eye, wherein the array has a first configuration which allows a first level of light rays from the environment to pass through the array to the person's eye and the array reflects a second level of light rays from the virtual image display toward the person's eye, wherein the array has a second configuration which allows a third level of light rays from the environment to pass through the array to the person's eye and the array reflects a fourth level of light rays from the virtual image display toward the person's eye, wherein the third level is at least 10% less than the first level, wherein the fourth level is at least 10% greater than the second level, and wherein the array is changed from the first configuration to the second configuration by rotation and/or tilting of one or more partially-reflective surfaces in the array.

FIGS. 42 and 43 can also be described as showing an array of rotating partially-reflective surfaces for augmented reality (AR) eyewear comprising: a upper virtual image display which is configured to be above a space directly in front of a person's eye, wherein this virtual image display emits light beams which create a virtual image in the person's field of view; and a substantially vertical array of horizontal rotating and/or tilting partially-reflective surfaces, similar to Venetian blinds, which are configured be directly in front of the person's eye, wherein the array has a first configuration which allows a first level of light rays from the environment to pass through the array to the person's eye and the array reflects a second level of light rays from the virtual image display toward the person's eye, wherein the array has a second configuration which allows a third level of light rays from the environment to pass through the array to the person's eye and the array reflects a fourth level of light rays from the virtual image display toward the person's eye, wherein the third level is at least 10% less than the first level, wherein the fourth level is at least 10% greater than the second level, and wherein the array is changed from the first configuration to the second configuration by rotation and/or tilting of one or more partially-reflective surfaces in the array. In an example, a virtual image display can be to the right or left of the person's eye instead of above the person's eye.

Although these figures show a single optical structure for a single eye, it is to be understood that augmented reality (AR) eyewear can include two such optical structures, one for the right eye and one for the left eye. Also, although these figures show an optical structure with a virtual image display above an eye, it is to be understood that the optical structure can be rotated 90 degrees in a vertical plane so that the display is to the right or left of the eye. Also, although these figures do not show an eyewear frame, it is to be understood that this optical structure can be held in proximity to a person's eye by an eyewear frame. Also, in an example, an optical structure for augmented reality eyewear can further comprise one or more components selected from the group consisting of: accelerometer, electromagnet or electromagnet array, gyroscope, or other type of motion sensor, actuator, camera, data processor, EEG sensor or other electromagnetic energy sensor, environmental light sensor, eye tracking mechanism, eyewear frame, power source (such as a battery), speaker, touch-based user interface, voice-based user interface, wireless data receiver, and wireless data transmitter.

FIG. 42 shows this array of partially-reflective surfaces at a first time when the array is a first configuration wherein the individual partially-reflective surfaces are oriented so that the individual virtual flat planes which best fit of each of them, respectively, are all substantially parallel, like Venetian blinds. A central-forward-facing line-of-sight vector can be defined as the vector which extends out from the center of the person's eye in a forward manner. In this example, the individual flat planes which best fit the partially-reflective surfaces, respectively, are parallel to the central-forward-facing line-of-sight vector. A radial array of line-of-sight vectors can be defined as a radial array of spoke-like vectors which extend outward from the center of the eye. In an example, different individual flat planes can be parallel to different spokes in a radial array of spoke-like vectors. In this first configuration, the array allows light beams from the environment to pass through the array to the person's eye with little obstruction or reflection by partially-reflective surfaces. In this first configuration, light beams from the environment pass largely between the partially-reflective surfaces. Also, in this first configuration, the array does not substantially reflect light beams from the virtual image display toward the person's eye.

FIG. 43 shows this array of partially-reflective surfaces at a second time when the array is in a second configuration wherein individual partially-reflective surfaces are oriented so that extensions of the individual virtual flat planes which best fit each of them, respectively, intersect the central-forward-facing line-of-sight vector at an angle within a range of 20 to 90 degrees. In this second configuration, the array partially reflects and/or blocks light beams from the person's environment from passing through the array to the person's eye. In this second configuration, the array reflects light beams from the virtual image display toward the person's eye.

In an example, a partially-reflective surface can be a partially-reflective mirror. In an example, an array of partially-reflective surfaces can be an array of micromirrors. In an example, a partially-reflective surface can be a partially-reflective lens or prism. In an example, an array of partially-reflective surfaces can be microlens array. In an example, a partially-reflective surface can be a partially-reflective coating on an otherwise-transparent structure. In an example, a partially-reflective surface can be a partially-reflective layer within an otherwise transparent structure. In an example, a partially-reflective surface can be flat and/or planar. In an example, a partially-reflective surface can be arcuate. In an example, the proximal side (closer to the eye) of a partially-reflective surface can be more reflective than the distal side (farther from the eye) of a partially-reflective surface.

In this example, the array of partially-reflective surfaces is a substantially planar, like Venetian blinds. In this example, partially-reflective surfaces are substantially parallel to each other. In an example, there can be between 10 and 1,000 partially-reflective surfaces in an array. In an example, an array of partially-reflective surfaces can form a contiguous reflective surface if they are rotated into a coplanar configuration. In an alternative example, there can be gaps between partially-reflective surfaces in an array even if they are rotated into a coplanar configuration. In this example, a virtual image display is located above a space in front of a person's eye and individual partially-reflective surfaces have horizontal longitudinal axes (like slats in traditional Venetian window blinds). In another example, a virtual image display can be located to the right or left of a space in front of a person's eye and individual partially-reflective surfaces can have vertical longitudinal axes which are vertical (like slats in vertical window blinds).

In an example, individual partially-reflective surfaces in an array of partially-reflective surfaces can be oriented in longitudinal horizontal rows, like Venetian blinds. In an example, partially-reflective surfaces in an array of partially-reflective surfaces can be oriented in longitudinal vertical columns, like vertical window blinds. In an example, an array can be an orthogonal array, matrix, or grid with rows and columns of partially-reflective surfaces. In an example, an array can be a radial array with spokes and rings of partially-reflective surfaces. In an example, individual partially-reflective surfaces in an array can have shapes selected from the group consisting of: square, rectangular, or other quadrilateral; circular or elliptical; triangular; and hexagonal.

In an example, partially-reflective surfaces in an array can all be rotated and/or tilted at the same time. In an example, individual partially-reflective surfaces in an array can be individually rotated and/or tilted at different times and in different sequences. In an example, partially-reflective surfaces can all be rotated and/or tilted in the same direction. In an example, individual partially-reflective surfaces in an array can be individually rotated and/or tilted in different directions. In an example, partially-reflective surfaces can all be rotated and/or tilted by the same amount and/or to the same degree. In an example, individual partially-reflective surfaces in an array can be individually rotated and/or tilted by different amounts and/or to different degrees. In an example, individual partially-reflective surfaces in an array can individually controlled to rotate and/or tilt them at different times, in different directions, and/or by different degrees. The ability to independently and/or separately control individual partially-reflective surfaces can enable the perception of different virtual images at different focal planes and/or depth planes. The ability to independently and/or separately control individual partially-reflective surfaces can also help to address the vergence-vs.-accommodation conflict which can otherwise occur in near eye image projection. In an example, changes in the configuration of arrays (and/or individual partially-reflective surfaces within those arrays) can be based on changes in a person's focal direction which are measured by eye tracking.

In an example, an array of partially-reflective surfaces can be changed from its first configuration to its second configuration, or vice versa, by rotating at least one individual partially-reflective surface around its central longitudinal axis. In an example, an array can be changed from its first configuration to its second configuration, or vice versa, by rotating all partially-reflective surfaces in the array around their respective central longitudinal axes. In an example, an array of partially-reflective surfaces can be changed from its first configuration to its second configuration, or vice versa, by tilting at least one individual partially-reflective surface around one of its sides or edges. In an example, an array can be changed from its first configuration to its second configuration, or vice versa, by tilting all partially-reflective surfaces in the array around their respective longitudinal sides or edges.

In an example, all partially-reflective surfaces in an array can be rotated at the same time. In an example, different partially-reflective surfaces can be rotated at different times. In an example, differential rotation of different partially-reflective surfaces in an array can be coordinated (e.g. multiplexed) with different content (at different locations) on a virtual image display to create three-dimensional effects in a virtual image. For example, since different portions of a virtual image display are different distances from different partially-reflective surfaces in an array, differential rotation of these different surfaces can display virtual objects in different focal planes (e.g. different depth planes) in a person's field of view.

In an example, partially-reflective surfaces can rotate in sequential complete rotations (e.g. in a consistent clockwise or counter-clockwise direction). In an example, partially-reflective surfaces can oscillate between clockwise and counter-clockwise rotation. In an example, a partially-reflective surface can change rapidly from its first configuration to its second configuration, and vice versa, multiple times per second. In an example, a surface can rotate back and forth between 5 and 100 times per second. In an example, the content of a virtual image which is displayed on a virtual image display can be synchronized (or multiplexed) with the rotational orientation of partially-reflective surfaces in order to create an image of a virtual object in a person's field of view.

In an example, an array of partially-reflective surfaces can be changed from its first configuration to its second configuration, or vice versa, by rotating at least one partially-reflective surface around its central longitudinal axis by 20 to 90 degrees. In an example, an array of partially-reflective surfaces can be changed from its first configuration to its second configuration, or vice versa, by tilting at least one partially-reflective surface around its side or edge by 20 to 90 degrees. In an example, all partially-reflective surfaces in an array can be rotated or tilted by the same degree. In an example, individual partially-reflective surfaces in an array can be rotated or tilted by different amounts. In an example, central partially-reflective surfaces in an array can be rotated or tilted more than peripheral partially-reflective surfaces, or vice versa. In an example, upper partially-reflective surfaces in an array can be rotated or tilted more than lower partially-reflective surfaces, or vice versa. In an example, optics for augmented reality (AR) eyewear can comprises a mechanism for selectively rotating and/or tilting individual partially-reflective surfaces, or sets thereof within an array, by different amounts and/or in different directions.

In an example, an array of partially-reflective surfaces can be changed from its first configuration to its second configuration, or vice versa, by application of electromagnetic energy to one or more partially-reflective surfaces. In an example, an array of partially-reflective surfaces can be changed from its first configuration to its second configuration, or vice versa, by exposing one or more partially-reflective surfaces to a magnetic field. In an example, oscillation or perturbation of the magnetic field can change the orientations of partially-reflective structures in an array. In an example, an array of partially-reflective surfaces can be changed from its first configuration to its second configuration, or vice versa, by mechanical rotation of the longitudinal axis of at least one partially-reflective surface (using an electromagnetic actuator). In an example, an array of partially-reflective surfaces can be changed from its first configuration to its second configuration, or vice versa, by changes in air pressure and/or air flow. In an example, an array of partially-reflective surfaces can be changed from its first configuration to its second configuration, or vice versa, by micro-fluidics and/or micro-hydraulics.

In an example, partially-reflective surfaces in an array can have first edges which are (flexibly) connected to a first moving structure and second edges which are (flexibly) connected to a second moving structure. In an example, this array can be changed from its first configuration to its second configuration, or vice versa, by laterally shifting the first and second structures relative to each other. In an example, partially-reflective surfaces in an array can have first edges which are (flexibly) connected to a moving structure and second edges which are connected to hinges or joints. In an example, this array can be changed from its first configuration to its second configuration, or vice versa, by moving the structure.

In this example, an array of moving partially-reflective surfaces has a planar proximal surface. In an example, the centroids of partially-reflective surfaces in an array can be coplanar. In an example, an array of moving partially-reflective surfaces can have an arcuate proximal surface. In an example, an array of moving partially-reflective surfaces can have a shape which is selected from the group consisting of: spherical section; conic section; convex; concave; sawtooth and/or zigzag; planoconvex; and planoconcave.

In an example, all partially-reflective surfaces in an array can be equal in size and identical in shape. In an example, central partially-reflective surfaces in an array can be larger than peripheral partially-reflective surfaces, or vice versa. In an example, upper partially-reflective surfaces in an array can be larger than lower partially-reflective surfaces, or vice versa. In an example, central partially-reflective surfaces can have a first shape and peripheral partially-reflective surfaces can have a second shape. In an example, upper partially-reflective surfaces can have a first shape and lower partially-reflective surfaces can have a second shape. In an example, proximal pairs of partially-reflective surfaces in an array can all be equidistant. In an example, central partially-reflective surfaces in an array can be closer together than peripheral partially-reflective surfaces, or vice versa. In an example, upper partially-reflective surfaces in an array can be closer together than lower partially-reflective surfaces, or vice versa. In an example, partially-reflective surfaces in a distal array can be closer together than partially-reflective surfaces in a proximal array, or vice versa.

In an example, a virtual image display can be contiguous to one side of an array of moving partially-reflective surfaces. In an example, the virtual plane which best fits a virtual image display can be perpendicular to the virtual plane which best fits the array of moving partially-reflective surfaces. In an example, the virtual plane which best fits a virtual image display can intersect the virtual plane which best fits an array of moving partially-reflective surfaces at an angle within the range of 20 to 90 degrees. In an example, a virtual image display can have a (proximal-to-distal) width which is less than the height of the array of partially-reflective surfaces. In an example, a virtual image display can have a (proximal-to-distal) width which is between 25% and 75% of the height of the array of partially-reflective surfaces.

In an example, a virtual image display can comprise one or more components selected from the group consisting of: active matrix organic light-emitting diode array, projector, or display; collimated light projector or display; digital micromirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; micro-display and/or microprojector; micro-display array or matrix; optoelectronic display; organic light emitting diode (OLED) array or matrix; passive matrix light-emitting diode array or matrix; photoelectric display; and transmission holographic optical element array or matrix. Example variations discussed in other portions of this disclosure or in priority-linked disclosures can also be applied to this example where relevant, but are not repeated here in order to reduce narrative redundancy.

Figure 44:
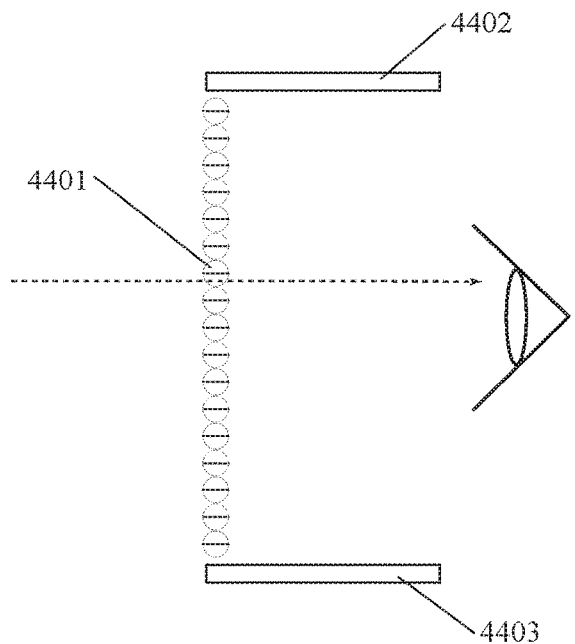
FIGS. 44 through 46 show sequential views of two image displays above and below a lens with a parallel array of rotating reflective louvers.
Figure 45:
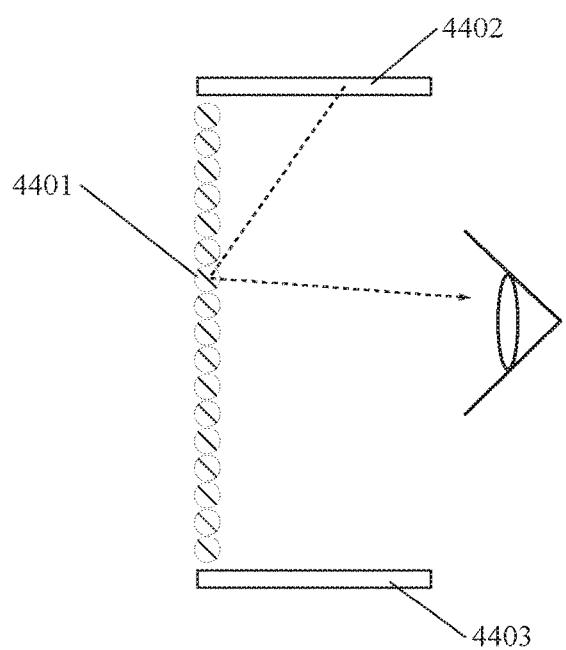
Figure 46:
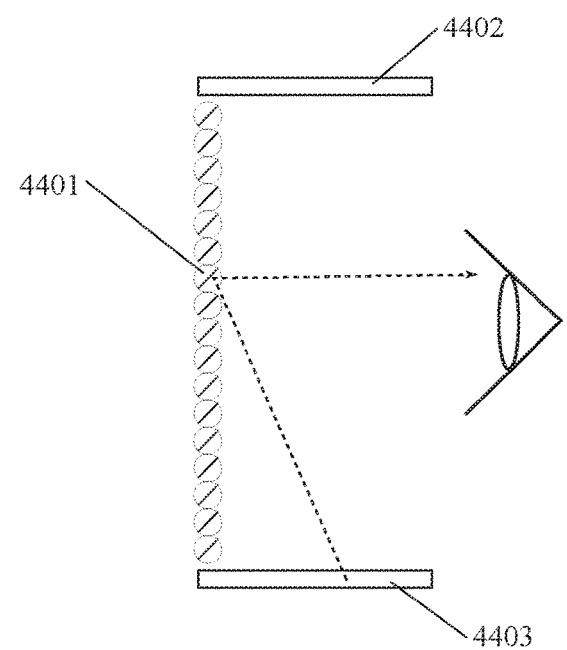

FIGS. 44 through 46 show an optical structure for augmented reality eyewear with one array of rotating partially-reflective surfaces between two (upper and lower) virtual image displays. Specifically, FIGS. 44 through 46 show three sequential cross-sectional side views of an optical structure for augmented reality (AR) eyewear comprising: (A) a first virtual image display (4402) which is configured to be within 4" of a person's eye, wherein this first virtual image display emits light beams which create a (portion of a) virtual image in the person's field of view; (B) a second virtual image display (4403) which is configured to be within 4" of the person's eye, wherein this second virtual image display emits light beams which create a (portion of a) virtual image in the person's field of view; and (C) an array of partially-reflective surfaces (including 4401) which is configured be within 4" in front of the person's eye; wherein the array has a first configuration which allows a first level of light rays from the environment to pass through the array to the person's eye, reflects a second level of light rays from the first virtual image display toward the person's eye, and reflects a third level of light rays from the second virtual image display toward the person's eye; wherein the array has a second configuration which allows a fourth level of light rays from the environment to pass through the array to the person's eye, reflects a fifth level of light rays from the first virtual image display toward the person's eye, and reflects a sixth level of light rays from the second virtual image display toward the person's eye; and wherein the array has a third configuration which allows a seventh level of light rays from the environment to pass through the array to the person's eye, reflects an eighth level of light rays from the first virtual image display toward the person's eye, and reflects a ninth level of light rays from the second virtual image display toward the person's eye; wherein the fourth level is less than the first level and the seventh level is less than the first level; wherein the fifth level is greater than then second level; wherein the ninth level is greater than the third level; wherein the array is changed from the first configuration to the second configuration by rotation and/or tilting of one or more partially-reflective surfaces in the array; wherein the array is changed from the second configuration to the third configuration by rotation and/or tilting of one or more partially-reflective surfaces in the array.

FIGS. 44 through 46 can also be described as showing an array of rotating partially-reflective surfaces for augmented reality (AR) eyewear comprising: (A) an upper virtual image display which is configured to be above a space in front of a person's eye, wherein this upper virtual image display emits light beams which create a (portion of a) virtual image in the person's field of view; (B) a lower virtual image display which is configured to be below the space in front of the person's eye, wherein this second virtual image display emits light beams which create a (portion of a) virtual image in the person's field of view; and (C) an array of partially-reflective surfaces which is configured be in front of the person's eye; wherein the array has a first configuration which allows a first level of light rays from the environment to pass through the array to the person's eye, reflects a second level of light rays from the upper virtual image display toward the person's eye, and reflects a third level of light rays from the lower virtual image display toward the person's eye; wherein the array has a second configuration which allows a fourth level of light rays from the environment to pass through the array to the person's eye, reflects a fifth level of light rays from the upper virtual image display toward the person's eye, and reflects a sixth level of light rays from the lower virtual image display toward the person's eye; and wherein the array has a third configuration which allows a seventh level of light rays from the environment to pass through the array to the person's eye, reflects an eighth level of light rays from the upper virtual image display toward the person's eye, and reflects a ninth level of light rays from the lower virtual image display toward the person's eye; wherein the fourth level is less than the first level and the seventh level is less than the first level;

wherein the fifth level is greater than then second level; wherein the ninth level is greater than the third level; wherein the array is changed from the first configuration to the second configuration by rotation and/or tilting of one or more partially-reflective surfaces in the array; wherein the array is changed from the second configuration to the third configuration by rotation and/or tilting of one or more partially-reflective surfaces in the array. It is to be understood that this example can be rotated by 90 degrees so that the virtual image displays are to the right and left of the eye instead of above and below the eye.

FIG. 44 shows this optical structure at a first time when the array of moving partially-reflective surfaces is in a first configuration wherein individual partially-reflective surfaces in the array are oriented so that individual virtual flat planes which best fit them each of them, respectively, are all substantially parallel to the central-forward-facing line-of-sight vector which extends out in a forward manner from the center of the person's eye. In this first configuration, the array allows light beams from the environment to pass through the array to the person's eye with little obstruction or diminution of light beams. In this first configuration, the array does not substantially reflect light beams from either virtual image display toward the person's eye.

FIG. 45 shows this optical structure at a second time when the array of partially-reflective surfaces is in a second configuration wherein partially-reflective surfaces in the array are oriented so that extensions of virtual flat planes which best fit them intersect a central-forward-facing line-of-sight vector at an angle in within a range of 20 to 110 degrees. In this second configuration, the array reflects light beams from the first virtual image display toward the person's eye. In this second configuration, the array (partially) reflects and/or blocks light beams from the person's environment from passing through the array to the person's eye.

FIG. 46 shows this optical structure at a third time when the array of partially-reflective surfaces is in a third configuration wherein partially-reflective surfaces in the array are oriented so that extensions of virtual flat planes which best fit them intersect a central-forward-facing line-of-sight vector at an angle in within a range of 20 to 110 degrees. In this third configuration, the array reflects light beams from the second virtual image display toward the person's eye. In this third configuration, the array (partially) reflects and/or blocks light beams from the person's environment from passing through the array to the person's eye.

Although these figures show a single optical structure for a single eye, it is to be understood that augmented reality (AR) eyewear can include two such optical structures, one for the right eye and one for the left eye. Also, although these figures show an optical structure with a virtual image display above an eye, it is to be understood that the optical structure can be rotated 90 degrees in a vertical plane so that the display is to the right or left of the eye. Also, although these figures do not show an eyewear frame, it is to be understood that this optical structure can be held in proximity to a person's eye by an eyewear frame. Also, in an example, an optical structure for augmented reality eyewear can further comprise one or more components selected from the group consisting of: accelerometer, electromagnet or electromagnet array, gyroscope, or other type of motion sensor, actuator, camera, data processor, EEG sensor or other electromagnetic energy sensor, environmental light sensor, eye tracking mechanism, eyewear frame, power source (such as a battery), speaker, touch-based user interface, voice-based user interface, wireless data receiver, and wireless data transmitter.

In an example, a first virtual image display can be a first distance from a selected partially-reflective surface in an array and a second virtual image display can be a second distance from the selected partially-reflective surface, wherein the second distance is greater than the first distance. In an example, changing the orientation of the selected partially-reflective surface (as the array is changed from its first configuration to its second configuration) changes the perceived focal distance (focal plane) of the portion of a virtual image which is reflected by this selected partially-reflective surface. This enables different portions of a virtual image and/or different virtual objects to be perceived at different focal distances (focal depths) by the person wearing the augmented reality (AR) eyewear. This can heighten the perceived three-dimensionality of virtual images. It may also be able to reduce the vergence-vs.-accommodation conflict which can occur with near eye image projection. In an example, changes in the configuration of arrays (and/or individual partially-reflective surfaces within those arrays) can be based on changes in a person's focal direction which are measured by eye tracking.

In an example, changing an array or partially-reflective surfaces from its first configuration to its second configuration can change the focal distance (focal plane) of a selected portion of a virtual image by changing which virtual image display is more reflected from that selected portion of the virtual image toward a person's eye at a given time. In an example, differential rotation of different partially-reflective surfaces in an array can cause different focal distances for different portions of the array. This can enable different virtual images and/or different virtual objects to be seen at different focal distances and/or depth planes. This can heighten the perceived three-dimensionality of virtual images. It may also be able to reduce the vergence-vs.-accommodation conflict which can occur with near eye image projection. In an example, changes in the configuration of arrays (and/or individual partially-reflective surfaces within those arrays) can be based on changes in a person's focal direction which are measured by eye tracking.

In an example, an array of moving partially-reflective surfaces can be substantially located between first and second virtual image displays. In an example, a first virtual image display and a second virtual image display can be parallel to each other. In an example, first and second virtual image displays can be located above and below (space directly in front of) a person's eye. In an example, an upper virtual image display and a lower virtual image display can be symmetric with respect to a horizontal plane between them. In an example, first and second virtual image displays can be located to the right and left of (space directly in front of) a person's eye. In an example, a right-side virtual image display and a left-side virtual image display can be symmetric with respect to a vertical plane between them.

In an example, first and second virtual image displays can be contiguous to opposite sides (e.g. the top and bottom) of an array of moving partially-reflective surfaces. In an example, a virtual plane which best fits a first virtual image display can be perpendicular to the virtual plane which best fits an array of moving partially-reflective surfaces. In an example, a virtual plane which best fits a second virtual image display can be perpendicular to the virtual plane which best fits an array of moving partially-reflective surfaces. In an example, the virtual planes which best fit first and second virtual image displays can intersect the virtual plane which best fits an array of moving partially-reflective surfaces at angles within the range of 20 and 110 degrees.

In an example, an array of partially-reflective surfaces can be changed from one (e.g. first, second, or third) configuration to another configuration, or vice versa, by rotating at least one individual partially-reflective surface around its central longitudinal axis. In an example, the configuration of an array can be changed by rotating all partially-reflective surfaces in the array around their respective central longitudinal axes. In an example, the configuration of an array can be changed by tilting at least one individual partially-reflective surface around one of its sides or edges. In an example, the configuration of an array can be changed by tilting all partially-reflective surfaces in the array around their respective longitudinal sides or edges.

In an example, individual partially-reflective surfaces in an array can be individually rotated and/or tilted at different times, in different directions, or by different amounts. In an example, central partially-reflective surfaces in an array can be rotated and/or tilted differently than peripheral partially-reflective surfaces. In an example, upper partially-reflective surfaces in an array can be rotated and/or tilted differently than lower partially-reflective surfaces. In an example, partially-reflective surfaces in a first set of array rows can be rotated and/or tilted differently than partially-reflective surfaces in a second set of array rows. In an example, partially-reflective surfaces in a first set of array columns can be rotated and/or tilted differently than partially-reflective surfaces in a second set of array columns. In an example, partially-reflective surfaces in a first set of radial array rings can be rotated and/or tilted differently than partially-reflective surfaces in a second set of radial array rings. In an example, partially-reflective surfaces in a first set of radial array spokes can be rotated and/or tilted differently than partially-reflective surfaces in a second set of radial array spokes. Example variations discussed in other portions of this disclosure or in priority-linked disclosures can also be applied to this example where relevant, but are not repeated here in order to reduce narrative redundancy.

FIGS. 47 through 49 show an optical structure for augmented reality eyewear with two (proximal and distal) arrays of rotating partially-reflective surfaces and one (upper) virtual image display. Specifically, FIGS. 47 through 49 show three sequential cross-sectional side views of an optical structure for augmented reality (AR) eyewear comprising: (A) a virtual image display (4703) which is configured to be within 4" of a person's eye, wherein this virtual image display emits light beams which create a (portion of a) virtual image in the person's field of view; (B) a distal array of partially-reflective surfaces (including 4701) which is configured be a first distance from a person's eye, wherein the distal array has a first configuration which allows a first level of light rays from the environment to pass through the distal array to the person's eye and reflects a second level of light rays from the virtual image display toward the person's eye, wherein the distal array has a second configuration which allows a third level of light rays from the environment to pass through the distal array to the person's eye and reflects a fourth level of light rays from the virtual image display toward the person's eye, wherein the third level is at least 10% less than the first level, wherein the fourth level is at least 10% greater than the second level, and wherein the distal array is changed from the first configuration to the second configuration by rotation and/or tilting of one or more partially-reflective surfaces in the distal array; and (C) a proximal array of partially-reflective surfaces (including 4702) which is configured be a second distance from a person's eye, wherein the second distance is less than the first distance, wherein the proximal array has a third configuration which allows a fifth level of light rays from the environment to pass through the proximal array to the person's eye and reflects a sixth level of light rays from the virtual image display toward the person's eye, wherein the proximal array has a fourth configuration which allows a seventh level of light rays from the environment to pass through the proximal array to the person's eye and reflects an eighth level of light rays from the virtual image display toward the person's eye, wherein the seventh level is at least 10% less than the fifth level, wherein the eighth level is at least 10% greater than the sixth level, and wherein the proximal array is changed from the third configuration to the fourth configuration by rotation and/or tilting of one or more partially-reflective surfaces in the proximal array.

FIG. 47 shows this optical structure at a first time when the distal array is in the first configuration and the proximal array is in the third configuration. At this time, partially-reflective surfaces in both arrays are oriented so that light beams from the environment to pass through both arrays toward the person's eye with little obstruction and neither array reflects light beams from the virtual image display toward the person's eye.

FIG. 48 shows this optical structure at a second time when the distal array is in the second configuration and the proximal array is in the third configuration. At this time, partially-reflective surfaces in the distal array reflect light beams from the virtual image display toward the person's eye and partially-reflective surfaces in the proximal array allow light beams from the environment (as well as light beams reflected from the distal array) to pass through the proximal array toward the person's eye with little obstruction.

FIG. 49 shows this optical structure at a third time when the distal array is in the first configuration and the proximal array is in the fourth configuration. At this time, partially-reflective surfaces in the distal array allow light beams from the environment to pass through the distal array toward the person's eye with little obstruction and partially-reflective surfaces in the proximal array reflect light beams from the virtual image display toward the person's eye.

Although these figures show a single optical structure for a single eye, it is to be understood that augmented reality (AR) eyewear can include two such optical structures, one for the right eye and one for the left eye. Also, although these figures show an optical structure with a virtual image display above an eye, it is to be understood that the optical structure can be rotated 90 degrees in a vertical plane so that the display is to the right or left of the eye. Also, although these figures do not show an eyewear frame, it is to be understood that this optical structure can be held in proximity to a person's eye by an eyewear frame. Also, in an example, an optical structure for augmented reality eyewear can further comprise one or more components selected from the group consisting of: accelerometer, electromagnet or electromagnet array, gyroscope, or other type of motion sensor, actuator, camera, data processor, EEG sensor or other electromagnetic energy sensor, environmental light sensor, eye tracking mechanism, eyewear frame, power source (such as a battery), speaker, touch-based user interface, voice-based user interface, wireless data receiver, and wireless data transmitter.

This optical structure allows the display of a selected portion of a virtual image, at a selected (e.g. pixel) location in front of a person's eye, to be displayed by reflection from either the distal array or the proximal array. Since the distal and proximal arrays are different distances from the person's eye (and also can have different distances from the virtual image display), changing the configurations of one or more partially-reflective surfaces in the distal and proximal arrays can change the perceived focal distance (focal plane) of selected (portions of) virtual images in the person's field of view. This can heighten the three-dimensionality of virtual images. This may also help to avoid the vergence-vs.-accommodation conflict which can occur with near eye image projection.

For example, when a distal array is in the second configuration and a proximal array is in the third configuration (as shown in FIG. 48), then the person will perceive a virtual object (or portion of a virtual object) at a farther distance than when the distal array is in the first configuration and the proximal array is in the fourth configuration (as shown in FIG. 49). In an example, when individual partially-reflective surfaces in distal and proximal arrays can be independently and/or separately controlled, then there can be variation in focal distance (focal plane) among different portions of a virtual image. In an example, changes in the configuration of arrays and/or individual surfaces within those arrays can be based on changes in a person's focal direction which are measured by eye tracking.

In an example, a first virtual image display can be a first distance from a selected partially-reflective surface in an array and a second virtual image display can be a second distance from the selected partially-reflective surface, wherein the second distance is greater than the first distance. In an example, changing the orientation of the selected partially-reflective surface (as the array is changed from its first configuration to its second configuration) changes the perceived focal distance (focal plane) of the portion of a virtual image which is reflected by this selected partially-reflective surface. This enables different portions of a virtual image and/or different virtual objects to be perceived at different focal distances (focal depths) by the person wearing the augmented reality (AR) eyewear. This can heighten the perceived three-dimensionality of virtual images. It may also be able to reduce the vergence-vs.-accommodation conflict which can occur with near eye image projection. In an example, changes in the configuration of arrays and/or individual surfaces within those arrays can be based on changes in a person's focal direction which are measured by eye tracking. In an example, augmented reality eyewear can further comprise an eye tracking mechanism which measures the direction of a person's gaze.

In an example, a distal array of moving partially-reflective surfaces can be parallel to a proximal array of moving partially-reflective surfaces. In an example, the virtual plane which best fits a distal array of moving partially-reflective surfaces can be parallel to the virtual plane which best fits a proximal array of moving partially-reflective surfaces. In an example, distal and proximal arrays can be axially aligned. In an example, the centroids of distal and proximal arrays can be aligned along a central-forward-facing line-of-sight vector (or at least aligned with a vector which is parallel to the central-forward-facing line-of-sight vector). In an example, a distal array and/or a proximal array can have a shape which is selected from the group comprising: planar; convex; concave; planoconvex; planoconcave; spherical section; and conic section.

In this example, there is one virtual image display. In an example, there can be two virtual image displays, one for the distal array and one for the proximal array. In an example, there can be two virtual image displays, a distal display whose light beams are reflected by the distal array and a proximal display whose light beams are reflected by the proximal array. In an example, proximal and distal displays can be coplanar. In this example, a virtual image display is above the space in front of a person's eye. In an example, a virtual image display can be to the right or left of this space. In an example, this optical structure can be rotated by 90 degrees in a vertical plane. Example variations discussed in other portions of this disclosure or in priority-linked disclosures can also be applied to this example where relevant, but are not repeated here in order to reduce narrative redundancy.

FIGS. 50 through 52 show an optical structure for augmented reality eyewear with two (proximal and distal) arrays of rotating partially-reflective surfaces and two (upper and lower) virtual image displays. Specifically, FIGS. 50 through 52 show three sequential cross-sectional side views of an optical structure for augmented reality (AR) eyewear comprising: (A) a distal virtual image display (5003) whose centroid is configured to be a first distance from a person's eye, wherein this virtual image display emits light beams which create a (portion of a) virtual image in the person's field of view; (B) a proximal virtual image display (5004) whose centroid is configured to be a second distance from the person's eye, therein the second distance is less than the first distance, wherein this virtual image display emits light beams which create a (portion of a) virtual image in the person's field of view; (C) a distal array of partially-reflective surfaces (including 5001) which is configured be a third distance from a person's eye, wherein the distal array has a first configuration which allows a first level of light rays from the environment to pass through the distal array to the person's eye and reflects a second level of light rays from the distal virtual image display toward the person's eye, wherein the distal array has a second configuration which allows a third level of light rays from the environment to pass through the distal array to the person's eye and reflects a fourth level of light rays from the distal virtual image display toward the person's eye, wherein the third level is at least 10% less than the first level, wherein the fourth level is at least 10% greater than the second level, and wherein the distal array is changed from the first configuration to the second configuration by rotation and/or tilting of one or more partially-reflective surfaces in the distal array; and (D) a proximal array of partially-reflective surfaces (including 5002) which is configured be a fourth distance from a person's eye, wherein the fourth distance is less than the third distance, wherein the proximal array has a third configuration which allows a fifth level of light rays from the environment to pass through the proximal array to the person's eye and reflects a sixth level of light rays from the proximal virtual image display toward the person's eye, wherein the proximal array has a fourth configuration which allows a seventh level of light rays from the environment to pass through the proximal array to the person's eye and reflects an eighth level of light rays from the proximal virtual image display toward the person's eye, wherein the seventh level is at least 10% less than the fifth level, wherein the eighth level is at least 10% greater than the sixth level, and wherein the proximal array is changed from the third configuration to the fourth configuration by rotation and/or tilting of one or more partially-reflective surfaces in the proximal array.

FIG. 50 shows this optical structure at a first time when the distal array is in the first configuration and the proximal array is in the third configuration. At this time, partially-reflective surfaces in both arrays are oriented so that light beams from the environment to pass through both arrays toward the person's eye with little obstruction and neither array reflects light beams from either virtual image display toward the person's eye.

FIG. 51 shows this optical structure at a second time when the distal array is in the second configuration and the proximal array is in the third configuration. At this time, partially-reflective surfaces in the distal array reflect light beams from the distal virtual image display toward the person's eye and partially-reflective surfaces in the proximal array allow light beams from the environment (as well as light beams reflected from the distal array) to pass through the proximal array toward the person's eye with little obstruction.

FIG. 52 shows this optical structure at a third time when the distal array is in the first configuration and the proximal array is in the fourth configuration. At this time, partially-reflective surfaces in the distal array allow light beams from the environment to pass through the distal array toward the person's eye with little obstruction and partially-reflective surfaces in the proximal array reflect light beams from the proximal virtual image display toward the person's eye.

Although these figures show a single optical structure for a single eye, it is to be understood that augmented reality (AR) eyewear can include two such optical structures, one for the right eye and one for the left eye. Also, although these figures show an optical structure with a virtual image display above an eye, it is to be understood that the optical structure can be rotated 90 degrees in a vertical plane so that the display is to the right or left of the eye. Also, although these figures do not show an eyewear frame, it is to be understood that this optical structure can be held in proximity to a person's eye by an eyewear frame. Also, in an example, an optical structure for augmented reality eyewear can further comprise one or more components selected from the group consisting of: accelerometer, electromagnet or electromagnet array, gyroscope, or other type of motion sensor, actuator, camera, data processor, EEG sensor or other electromagnetic energy sensor, environmental light sensor, eye tracking mechanism, eyewear frame, power source (such as a battery), speaker, touch-based user interface, voice-based user interface, wireless data receiver, and wireless data transmitter.

This optical structure allows the display of a selected portion of a virtual image at a selected (e.g. pixel) location in front of a person's eye to be displayed by reflection from either the distal array or the proximal array. Since the distal and proximal arrays are different distances from the person's eye (and also can have different distances from the distal and proximal virtual image displays, respectively), changing the configurations of one or more partially-reflective surfaces in the distal and proximal arrays can change the perceived focal distance (focal plane) of selected (portions of) virtual images in the person's field of view. This can heighten the three-dimensionality of virtual images. This may also help to avoid the vergence-vs.-accommodation conflict which can occur with near eye image projection.

For example, when a distal array is in the second configuration and a proximal array is in the third configuration, then the person will perceive a virtual object (or portion of a virtual object) at a farther distance than when the distal array is in the first configuration and the proximal array is in the fourth configuration. In an example, when individual partially-reflective surfaces in distal and proximal arrays can be independently and/or separately controlled, then there can be variation in focal distance (focal plane) among different portions of a virtual image. In an example, changes in the configurations of arrays (or individual surfaces within those arrays) can be based on changes in a person's focal direction and focal depth which are measured by eye tracking. In an example, augmented reality eyewear can further comprise an eye tracking mechanism which measures the focal direction and focal depth of a person's gaze.

In an example, a distal array of moving partially-reflective surfaces can be parallel to a proximal array of moving partially-reflective surfaces. In an example, the virtual plane which best fits a distal array of moving partially-reflective surfaces can be parallel to the virtual plane which best fits a proximal array of moving partially-reflective surfaces. In an example, distal and proximal arrays can be axially aligned. In an example, the centroids of distal and proximal arrays can be aligned along a central-forward-facing line-of-sight vector (or at least aligned with a vector which is parallel to the central-forward-facing line-of-sight vector). In an example, a distal array and/or a proximal array can have a shape which is selected from the group comprising: planar; convex; concave; planoconvex; planoconcave; spherical section; and conic section.

In this example, there are two virtual image displays. In this example, there is a distal virtual image display whose light beams are reflected toward a person's eye by a distal array of partially-reflective surfaces and there is a proximal virtual image display whose light beams are reflected toward the person's eye by a proximal array of partially-reflective surfaces. In this example, a distal virtual image display is above (a space in front of) a person's eye and a proximal distal virtual image display is below (the space in front of) the person's eye. In another example, a distal virtual image display can be to the right of (a space in front of) a person's eye and a proximal distal virtual image display can be to the left of (the space in front of) the person's eye. In this example, there are two optically-linked sets of displays and arrays: a distal set and a proximal set. In an example, there can be three or more optically-linked sets of displays and arrays. Example variations discussed in other portions of this disclosure or in priority-linked disclosures can also be applied to this example where relevant, but are not repeated here in order to reduce narrative redundancy.

Figure 53:
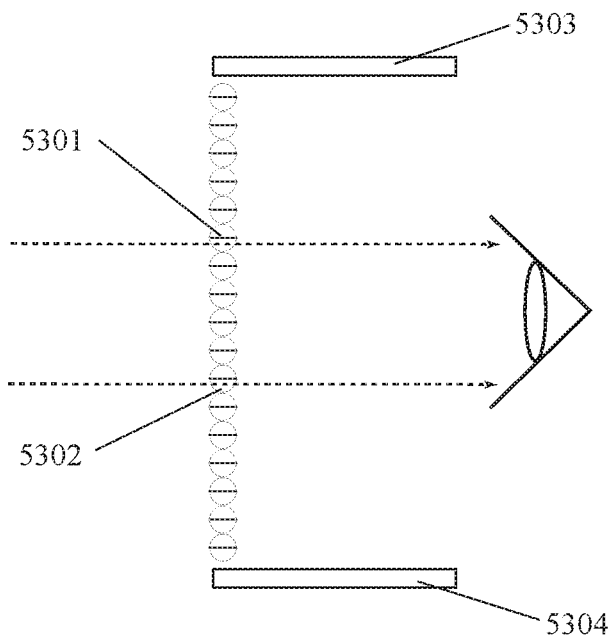
FIGS. 53 and 54 show sequential views of two image displays above and below a lens with two selectively-moveable sets of rotating reflective louvers.
Figure 54:
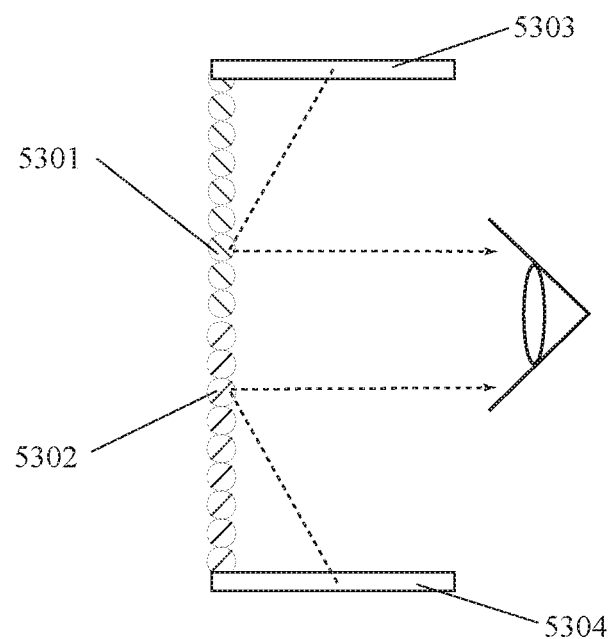

FIGS. 53 and 54 show an optical structure for augmented reality eyewear with two (upper and lower) virtual image displays and a two-section array of rotatable partially-reflective surfaces, wherein surfaces in the two sections can have different orientations. In an example, partially-reflective surfaces in an upper section of an array can reflect beams of light from an upper virtual image display and partially-reflective surfaces in a lower section of the array can reflect beams of light from a lower virtual image display. In an example, this optical structure can enable display of a virtual image in a person's field of view with less distortion than is possible with a single virtual image display and an array with a reflective surface with a uniform orientation. In an example, this optical structure can reduce the size of eyewear which is required to achieve a given image resolution and/or increase the image resolution possible with a given size of eyewear.

Specifically, FIGS. 53 and 54 show two sequential cross-sectional side views of an optical structure for augmented reality (AR) eyewear comprising: (A) a first virtual image display (5303) which emits light beams which create a (portion of a) virtual image in the person's field of view; (B) a second virtual image display (5304) which emits light beams which create a (portion of a) virtual image in the person's field of view; and (C) an array of partially-reflective surfaces between the first virtual image display and the second virtual image display; (D) wherein the array of partially-reflective surfaces further comprises a first set of partially-reflective surfaces (including 5301), wherein the first set has a first configuration which allows a first level of light rays from the environment to pass through the first set to the person's eye and reflects a second level of light rays from the first virtual image display toward the person's eye, wherein the first set has a second configuration which allows a third level of light rays from the environment to pass through the first set to the person's eye and reflects a fourth level of light rays from the first virtual image display toward the person's eye, wherein the third level is at least 10% less than the first level, wherein the fourth level is at least 10% greater than the second level, and wherein the first set is changed from the first configuration to the second configuration by rotation and/or tilting of one or more partially-reflective surfaces in the first set; and (E) wherein the array further comprises a second set of partially-reflective structures (including 5302), wherein the second set has a third configuration which allows a fifth level of light rays from the environment to pass through the second set to the person's eye and reflects a sixth level of light rays from the second virtual image display toward the person's eye, wherein the second set has a fourth configuration which allows a seventh level of light rays from the environment to pass through the second set to the person's eye and reflects an eighth level of light rays from the second virtual image display toward the person's eye, wherein the seventh level is at least 10% less than the fifth level, wherein the eighth level is at least 10% greater than the sixth level, and wherein the second set is changed from the third configuration to the fourth configuration by rotation and/or tilting of one or more partially-reflective surfaces in the second set.

The example shown in FIGS. 53 and 54 can also be described as an optical structure for augmented reality (AR) eyewear comprising: (A) an upper virtual image display which is configured to be above a space in front of a person's eye and which emits light beams which create a (portion of a) virtual image in the person's field of view; (B) a lower virtual image display which is configured to be below the space in front of the person's eye and which emits light beams which create a (portion of a) virtual image in the person's field of view; and (C) an array of partially-reflective surfaces between the upper virtual image display and the lower virtual image display; (D) wherein the array of partially-reflective surfaces further comprises an upper set of partially-reflective surfaces, wherein the upper set has a first configuration which allows a first level of light rays from the environment to pass through the upper set to the person's eye and reflects a second level of light rays from the upper virtual image display toward the person's eye, wherein the upper set has a second configuration which allows a third level of light rays from the environment to pass through the upper set to the person's eye and reflects a fourth level of light rays from the upper virtual image display toward the person's eye, wherein the third level is at least 10% less than the first level, wherein the fourth level is at least 10% greater than the second level, and wherein the upper set is changed from the first configuration to the second configuration by rotation and/or tilting of one or more partially-reflective surfaces in the upper set; and (E) wherein the array of partially-reflective surfaces further comprises a lower set of partially-reflective structures, wherein the lower set has a third configuration which allows a fifth level of light rays from the environment to pass through the lower set to the person's eye and reflects a sixth level of light rays from the lower virtual image display toward the person's eye, wherein the lower set has a fourth configuration which allows a seventh level of light rays from the environment to pass through the lower set to the person's eye and reflects an eighth level of light rays from the lower virtual image display toward the person's eye, wherein the seventh level is at least 10% less than the fifth level, wherein the eighth level is at least 10% greater than the sixth level, and wherein the lower set is changed from the third configuration to the fourth configuration by rotation and/or tilting of one or more partially-reflective surfaces in the lower set. In an example, this optical structure can be rotated 90 degrees so that the virtual image displays are to the right and left of (the space in front of) the person's eye.

FIG. 53 shows this optical structure at a first time when the first set is in the first configuration and the second set is in the third configuration. At this time, partially-reflective surfaces in both sets within the array are oriented so that light beams from the environment pass through toward the person's eye with little obstruction. Also, neither set within the array reflects light beams from a virtual image display toward the person's eye.

FIG. 54 shows this optical structure at a second time when the first set is in the second configuration and the second set is in the fourth configuration. At this time, partially-reflective surfaces in the first set reflect light beams from the first virtual image display toward the person's eye and partially-reflective surfaces in the second set reflect light beams from the second virtual image display toward the person's eye. Also, light beams from the environment are at least partially reflected and/or obstructed from reaching the person's eye.

In an example, first and second sets of partially-reflective surfaces in an array of partially-reflective surfaces can be coplanar. In an example, partially-reflective surfaces in a first set can be located in the upper half of an array of partially-reflective surfaces and partially-reflective surfaces in a second set can be located in the lower half of the array of partially-reflective surfaces. In an example, if this optical structure is rotated 90 degrees, then partially-reflective surfaces in a first set can be located on the right side of an array of partially-reflective surfaces and partially-reflective surfaces in a second set can be located on the left side of the array of partially-reflective surfaces.

In an example, partially-reflective surfaces in a first set can be rotated in a first (e.g. clockwise) direction to transition from their first configuration to their second configuration and partially-reflective surfaces in a second set can be rotated in a second (e.g. counter-clockwise) direction to transition from their third configuration to their fourth configuration. In an example, partially-reflective surfaces can be substantially parallel to each other when the first set is in its first configuration and the second set is in its third configuration. In an example, partially-reflective surfaces can be substantially perpendicular to each when the first set is in its second configuration and the second set is in its fourth configuration. In an example, virtual plane extensions of partially-reflective surfaces in first set and virtual plane extensions of partially-reflective surfaces in a second set can intersect each other at acute angles when the first set is in its second configuration and the second set is in its fourth configuration.

In an example, the optical structure shown in FIGS. 53 and 54 can enable display of a virtual image in a person's field of view with less distortion than is possible with a single virtual image display and an array whose partially-reflective surfaces all have the same orientation. In an example, the optical structure shown in FIGS. 53 and 54 can reduce the size of eyewear which is required to achieve a given image resolution and/or increase the image resolution possible with a given size eyewear. Example variations discussed in other portions of this disclosure or in priority-linked disclosures can also be applied to this example where relevant, but are not repeated here in order to reduce narrative redundancy.

Figure 55:
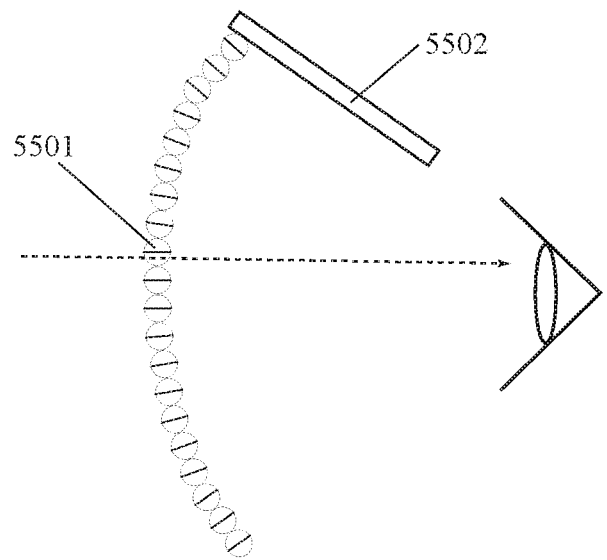
FIGS. 55 and 56 show sequential views of an image display above a lens with a concave array of rotating reflective louvers.
Figure 56:
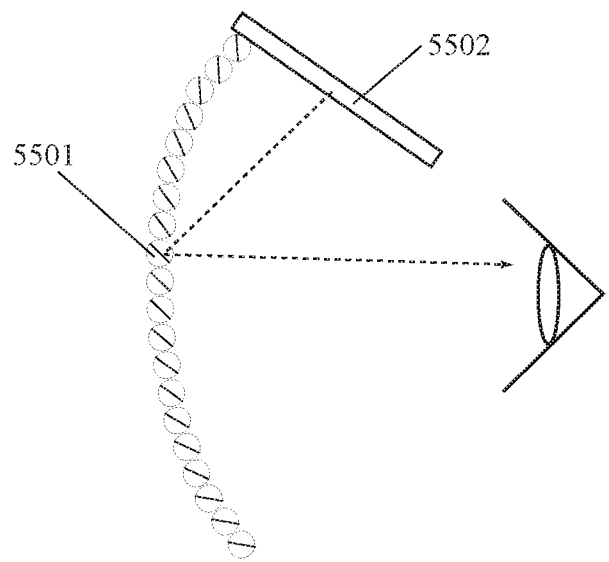

FIGS. 55 and 56 show an optical structure for augmented reality eyewear with one virtual image display and an arcuate array of rotatable partially-reflective surfaces. Specifically, FIGS. 55 and 56 show two sequential cross-sectional side views of an optical structure for augmented reality (AR) eyewear comprising: a virtual image display (5502) which emits light beams which create a (portion of a) virtual image in the person's field of view; and an arcuate array of rotating partially-reflective surfaces (including 5501), wherein the array has a first configuration which allows a first level of light rays from the environment to pass through the array to the person's eye and reflects a second level of light rays from the virtual image display toward the person's eye, wherein the array has a second configuration which allows a third level of light rays from the environment to pass through the array to the person's eye and reflects a fourth level of light rays from the virtual image display toward the person's eye, wherein the third level is at least 10% less than the first level, wherein the fourth level is at least 10% greater than the second level, and wherein the array is changed from the first configuration to the second configuration by rotation and/or tilting of one or more partially-reflective surfaces in the array. In an example, this optical structure can be rotated 90 degrees so that the virtual image display is located to the right or to the left of the eye, instead of above the eye.

FIG. 55 shows this optical structure at a first time when the array is in the first configuration. At this first time, partially-reflective surfaces in the array are oriented so that light beams from the environment pass through the array toward the person's eye with little reflection or obstruction. Also, the array does not reflect light beams from the virtual image display toward the person's eye. FIG. 56 shows this optical structure at a second time when the first set is in the second configuration. At this second time, partially-reflective surfaces in the array reflect light beams from the virtual image display toward the person's eye. Also, light beams from the environment are at least partially reflected and/or obstructed from reaching the person's eye.

In an example, the array of partially-reflective surfaces can be concave. In an example, the array of partially-reflective surfaces can have a spherical section or conic section shape. In an example, partially-reflective surfaces in the array can be parallel to each other when the array is in its first configuration. In an example, different partially-reflective surfaces in the array can be parallel to different radial vectors (e.g. spokes) radiating outward in a non-parallel manner from the center of the person's pupil or retina. Example variations discussed in other portions of this disclosure or in priority-linked disclosures can also be applied to this example where relevant, but are not repeated here in order to reduce narrative redundancy.

FIGS. 57 through 59 show an optical structure for augmented reality eyewear with two (upper and lower) virtual image displays and an arcuate array of rotatable partially-reflective surfaces between them. Specifically, FIGS. 57 through 59 show three sequential cross-sectional side views of an optical structure for augmented reality (AR) eyewear comprising: an upper virtual image display (5702) which emits light beams which create a (portion of a) virtual image in the person's field of view; a lower virtual image display (5703) which emits light beams which create a (portion of a) virtual image in the person's field of view; and an arcuate array of rotating partially-reflective surfaces (including 5701), wherein the array has a first configuration which allows a first level of light rays from the environment to pass through the array to the person's eye, reflects a second level of light rays from the upper virtual image display toward the person's eye, and reflects a third level of light rays from the lower virtual image display toward the person's eye; wherein the array has a second configuration which allows a fourth level of light rays from the environment to pass through the array to the person's eye, reflects a fifth level of light rays from the upper virtual image display toward the person's eye, and reflects a sixth level of light rays from the lower virtual image display toward the person's eye; and wherein the array has a third configuration which allows a seventh level of light rays from the environment to pass through the array to the person's eye, reflects an eighth level of light rays from the upper virtual image display toward the person's eye, and reflects a ninth level of light rays from the lower virtual image display toward the person's eye; wherein the fourth level is less than the first level and the seventh level is less than the first level; wherein the fifth level is greater than then second level; wherein the ninth level is greater than the third level; wherein the array is changed from the first configuration to the second configuration by rotation and/or tilting of one or more partially-reflective surfaces in the array; wherein the array is changed from the second configuration to the third configuration by rotation and/or tilting of one or more partially-reflective surfaces in the array.

FIG. 57 shows this optical structure at a first time when the array is in the first configuration. At this first time, partially-reflective surfaces in the array are oriented so that light beams from the environment pass through the array toward the person's eye with little reflection or obstruction. The array does not reflect light beams from either virtual image display toward the person's eye. FIG. 58 shows this optical structure at a second time when the array is in the second configuration. At this second time, partially-reflective surfaces in the array reflect light beams from the upper virtual image display toward the person's eye. Light beams from the environment are at least partially reflected and/or obstructed from reaching the person's eye. FIG. 59 shows this optical structure at a third time when the array is in the third configuration. At this third time, partially-reflective surfaces in the array reflect light beams from the lower virtual image display toward the person's eye. Light beams from the environment are at least partially reflected and/or obstructed from reaching the person's eye.

In an example, the array of partially-reflective surfaces can be concave. In an example, the array of partially-reflective surfaces can have a spherical section or conic section shape. In an example, partially-reflective surfaces in the array can be parallel to each other when the array is in its first configuration. In an example, different partially-reflective surfaces in the array can be parallel to different radial vectors (e.g. spokes) radiating outward in a non-parallel manner from the center of the person's pupil or retina. Example variations discussed in other portions of this disclosure or in priority-linked disclosures can also be applied to this example where relevant, but are not repeated here in order to reduce narrative redundancy.

Figure 60:
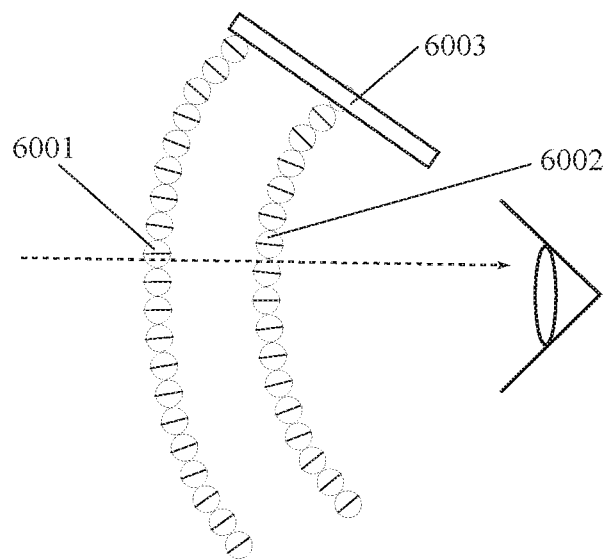
FIGS. 60 through 62 show sequential views of an image display above two concave arrays of rotating reflective louvers.
Figure 61:
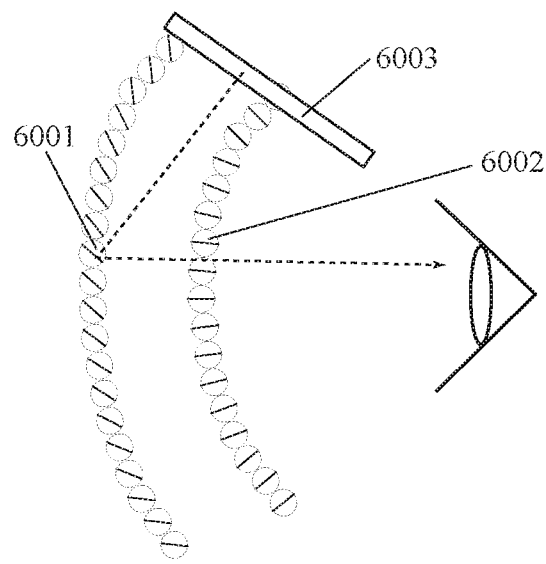
Figure 62:
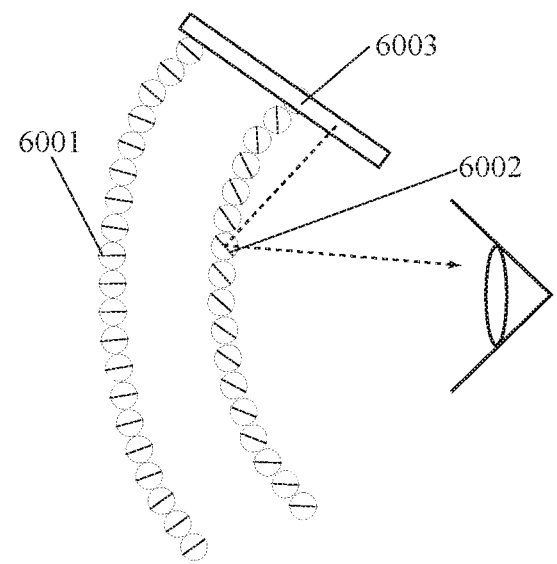

FIGS. 60 through 62 show an optical structure with two (proximal and distal) arcuate arrays of rotating partially-reflective surfaces and one virtual image display. Specifically, FIGS. 60 through 62 show three sequential cross-sectional side views of an optical structure for augmented reality eyewear comprising: (A) a virtual image display (6003) which emits light beams which create a (portion of a) virtual image in the person's field of view; (B) a distal arcuate array of partially-reflective surfaces (including 6001) which is configured be a first distance from a person's eye, wherein the distal arcuate array has a first configuration which allows a first level of light rays from the environment to pass through the distal arcuate array to the person's eye and reflects a second level of light rays from the virtual image display toward the person's eye, wherein the distal arcuate array has a second configuration which allows a third level of light rays from the environment to pass through the distal arcuate array to the person's eye and reflects a fourth level of light rays from the virtual image display toward the person's eye, wherein the third level is at least 10% less than the first level, wherein the fourth level is at least 10% greater than the second level, and wherein the distal arcuate array is changed from the first configuration to the second configuration by rotation and/or tilting of one or more partially-reflective surfaces in the distal arcuate array; and (C) a proximal arcuate array of partially-reflective surfaces (including 6002) which is configured be a second distance from a person's eye, wherein the second distance is less than the first distance, wherein the proximal arcuate array has a third configuration which allows a fifth level of light rays from the environment to pass through the proximal arcuate array to the person's eye and reflects a sixth level of light rays from the virtual image display toward the person's eye, wherein the proximal arcuate array has a fourth configuration which allows a seventh level of light rays from the environment to pass through the proximal arcuate array to the person's eye and reflects an eighth level of light rays from the virtual image display toward the person's eye, wherein the seventh level is at least 10% less than the fifth level, wherein the eighth level is at least 10% greater than the sixth level, and wherein the proximal arcuate array is changed from the third configuration to the fourth configuration by rotation and/or tilting of one or more partially-reflective surfaces in the proximal arcuate array.

FIG. 60 shows this optical structure at a first time when the distal arcuate array is in the first configuration and the proximal arcuate array is in the third configuration. At this first time, partially-reflective surfaces in both arcuate arrays are oriented so that light beams from the environment pass through both arcuate arrays toward the person's eye with little obstruction and neither arcuate array reflects light beams from the virtual image display toward the person's eye.

FIG. 61 shows this optical structure at a second time when the distal arcuate array is in the second configuration and the proximal arcuate array is in the third configuration. At this second time, partially-reflective surfaces in the distal arcuate array reflect light beams from the virtual image display toward the person's eye and partially-reflective surfaces in the proximal arcuate array allow light beams from the environment (as well as light beams reflected from the distal arcuate array) to pass through the proximal arcuate array toward the person's eye with little obstruction.

FIG. 62 shows this optical structure at a third time when the distal arcuate array is in the first configuration and the proximal arcuate array is in the fourth configuration. At this third time, partially-reflective surfaces in the distal arcuate array allow light beams from the environment to pass through the distal arcuate array toward the person's eye with little obstruction and partially-reflective surfaces in the proximal arcuate array reflect light beams from the virtual image display toward the person's eye.

This optical structure allows the display of a selected portion of a virtual image, at a selected (e.g. pixel) location in front of a person's eye, to be displayed by reflection from either the distal array or the proximal array. Since the proximal and distal arrays are different distances from the person's eye (and also can have different distances from the virtual image display), changing the configurations of one or more partially-reflective surfaces in the proximal and distal arrays can change the perceived focal distance (focal plane) of selected (portions of) virtual images in the person's field of view. This can heighten the three-dimensionality of virtual images. This may also help to avoid the vergence-vs.-accommodation conflict which can occur with near eye image projection.

For example, when a distal array is in the second configuration and a proximal array is in the third configuration, then the person will perceive a virtual object (or portion of a virtual object) at a farther distance than when the distal array is in the first configuration and the proximal array is in the fourth configuration. In an example, when individual partially-reflective surfaces in proximal and distal arrays can be independently and/or separately controlled, then there can be variation in focal distance (focal plane) among different portions of a virtual image. In an example, changes in the configuration of arrays and/or individual surfaces within those arrays can be based on changes in a person's focal direction which are measured by eye tracking.

In an example, a first virtual image display can be a first distance from a selected partially-reflective surface in an array and a second virtual image display can be a second distance from the selected partially-reflective surface, wherein the second distance is greater than the first distance. In an example, changing the orientation of the selected partially-reflective surface (as the array is changed from its first configuration to its second configuration) changes the perceived focal distance (focal plane) of the portion of a virtual image which is reflected by this selected partially-reflective surface. This enables different portions of a virtual image and/or different virtual objects to be perceived at different focal distances (focal depths) by the person wearing the augmented reality (AR) eyewear. This can heighten the perceived three-dimensionality of virtual images. It may also be able to reduce the vergence-vs.-accommodation conflict which can occur with near eye image projection. In an example, changes in the configuration of arrays and/or individual surfaces within those arrays can be based on changes in a person's focal direction which are measured by eye tracking. In an example, augmented reality eyewear can further comprise an eye tracking mechanism which measures the direction of a person's gaze.

In an example, a distal array and/or a proximal array can have a shape which is selected from the group comprising: convex; concave; planoconvex; planoconcave; spherical section; and conic section. In an example, proximal and distal arrays can be concentric. In an example, the proximal arcuate array can be nested within the distal arcuate array. In an example, proximal and distal arrays can be axially aligned. In an example, the centroids of proximal and distal arrays can be aligned along a central-forward-facing line-of-sight vector (or at least aligned with a vector which is parallel to the central-forward-facing line-of-sight vector). Example variations discussed in other portions of this disclosure or in priority-linked disclosures can also be applied to this example where relevant, but are not repeated here in order to reduce narrative redundancy.

Figure 63:
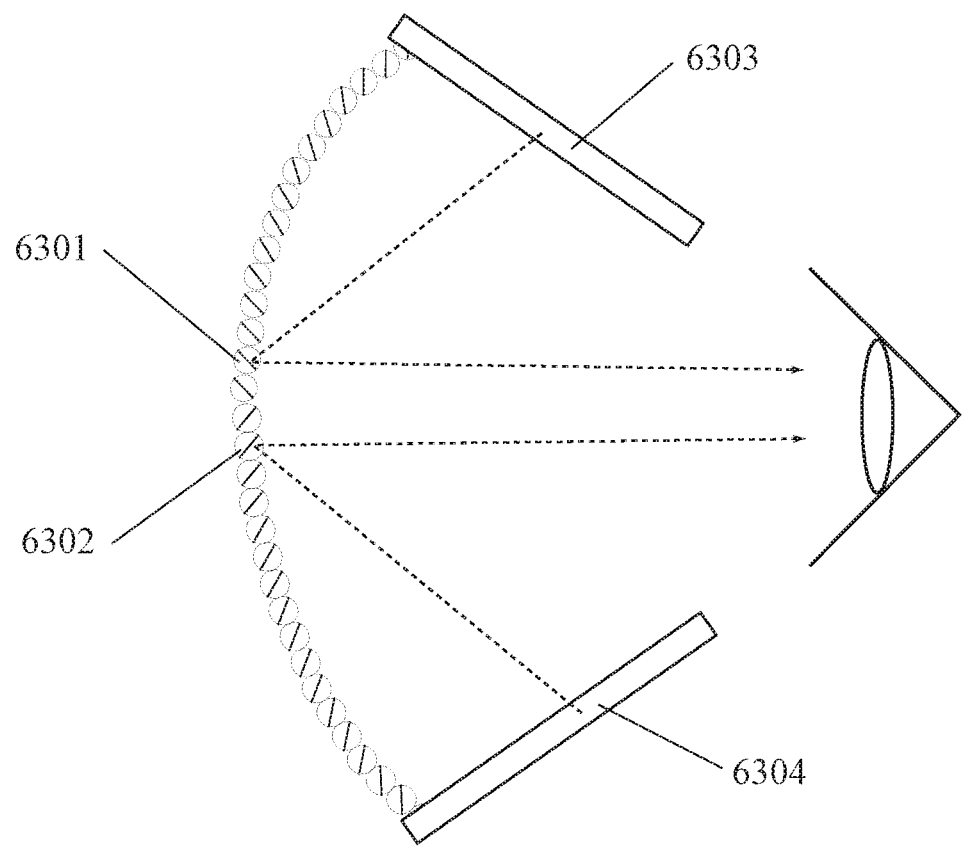
FIG. 63 shows two image displays above and below a concave lens with two selectively-moveable sets of rotating reflective louvers.

FIG. 63 shows an optical structure for augmented reality eyewear with two (e.g. upper and lower) virtual image displays and a two-section (e.g. upper and lower sections) arcuate array of partially-reflective surfaces, wherein partially-reflective surfaces in the two sections have different orientations. In an example, partially-reflective surfaces in an upper section of an arcuate array can reflect beams of light from an upper virtual image display toward a person's eye and partially-reflective surfaces in a lower section of the arcuate array can reflect beams of light from a lower virtual image display toward a person's eye. Such an optical structure can display virtual images in a person's field of view with less distortion than a single virtual image display and a single (uniform) reflective surface. Also, such an optical structure can either reduce the size of eyewear required to achieve a given image resolution or increase the image resolution possible with a given size eyewear.

Specifically, FIG. 63 shows a cross-sectional side view of an optical structure for augmented reality (AR) eyewear comprising: (A) a first virtual image display (6303) which emits light beams which create a (portion of a) virtual image in a person's field of view; (B) a second virtual image display (6304) which emits light beams which create a (portion of a) virtual image in the person's field of view; and (C) an arcuate array of partially-reflective surfaces between the first virtual image display and the second virtual image display; (D) wherein the arcuate array of partially-reflective surfaces further comprises a first set of partially-reflective surfaces (including 6301), wherein the first set has a first configuration which allows a first level of light rays from the environment to pass through the first set to the person's eye and reflects a second level of light rays from the first virtual image display toward the person's eye, wherein the first set has a second configuration which allows a third level of light rays from the environment to pass through the first set to the person's eye and reflects a fourth level of light rays from the first virtual image display toward the person's eye, wherein the third level is at least 10% less than the first level, wherein the fourth level is at least 10% greater than the second level, and wherein the first set is changed from the first configuration to the second configuration by rotation and/or tilting of one or more partially-reflective surfaces in the first set; and (E) wherein the arcuate array further comprises a second set of partially-reflective structures (including 6302), wherein the second set has a third configuration which allows a fifth level of light rays from the environment to pass through the second set to the person's eye and reflects a sixth level of light rays from the second virtual image display toward the person's eye, wherein the second set has a fourth configuration which allows a seventh level of light rays from the environment to pass through the second set to the person's eye and reflects an eighth level of light rays from the second virtual image display toward the person's eye, wherein the seventh level is at least 10% less than the fifth level, wherein the eighth level is at least 10% greater than the sixth level, and wherein the second set is changed from the third configuration to the fourth configuration by rotation and/or tilting of one or more partially-reflective surfaces in the second set. In an example, this optical structure can be rotated 90 degrees in a vertical plane, wherein the two virtual image displays are then located to the right and to the left of the person's eye.

Although this figure shows a single optical structure for a single eye, it is to be understood that augmented reality (AR) eyewear can include two such optical structures, one for the right eye and one for the left eye. Also, although this figure shows an optical structure with a virtual image display above an eye, it is to be understood that the optical structure can be rotated 90 degrees in a vertical plane so that the display is to the right or left of the eye. Also, although these figures do not show an eyewear frame, it is to be understood that this optical structure can be held in proximity to a person's eye by an eyewear frame. Also, in an example, an optical structure for augmented reality eyewear can further comprise one or more components selected from the group consisting of: accelerometer, electromagnet or electromagnet array, gyroscope, or other type of motion sensor, actuator, camera, data processor, EEG sensor or other electromagnetic energy sensor, environmental light sensor, eye tracking mechanism, eyewear frame, power source (such as a battery), speaker, touch-based user interface, voice-based user interface, wireless data receiver, and wireless data transmitter.

In an example, an arcuate array of partially-reflective surfaces can be a dynamic optical structure. In an example, the arcuate array of partially-reflective surfaces can be moved from (A) a first configuration in which it allows environmental light rays to pass in a largely-unobstructed manner and does not reflect light rays from one or more virtual image displays to a person's eye to (B) a second configuration in which it partially obstructs environmental light rays and does reflect light rays from one or more virtual image displays to the person's eye. This enables augmented reality eyewear to have a first mode in which augmented reality is not activated (wherein a person has an unobstructed view of their environment) and a second mode in which augmented reality is activated (wherein the person sees virtual images in their view of the environment).

In an alternative example, an arcuate array of partially-reflective surfaces can be a static optical structure. In an example, the arcuate array of partially-reflective surfaces can always be in the configuration shown in FIG. 63 wherein it partially obstructs environmental light rays and reflects light rays from one or more virtual image displays toward a person's eye. With this optical structure, an arcuate array of partially-reflective surfaces can simultaneously reflect lights rays from upper and lower virtual image displays toward a person's eye, creating virtual images in the person's field of view. In an example, an arcuate array of partially-reflective surfaces can simultaneously reflects lights rays from right-side and left-side virtual image displays toward a person's eye, creating virtual images in the person's field of view.

In an example, partially-reflective surfaces in a first (e.g. upper) set of surfaces can be located in the upper half of an arcuate array of partially-reflective surfaces and partially-reflective surfaces in a second (e.g. lower) set of surfaces can be located in the lower half of the arcuate array of partially-reflective surfaces. In an example, if this optical structure is rotated 90 degrees, then partially-reflective surfaces in a first (e.g. right-side) set of surfaces can be located on the right half of an arcuate array of partially-reflective surfaces and partially-reflective surfaces in a second (e.g. left-side) set of surfaces can be located on the left half of the arcuate array of partially-reflective surfaces.

In an example, an array of partially-reflective surfaces can comprise a radial array with spokes and rings of individual partially-reflective surfaces whose proximal surfaces have different orientations. In an example, a radial array of individual partially-reflective surfaces can have different orientations which are configured to reflect light rays from an annular series of virtual image displays toward a person's eye. In an example, there can be four or more virtual image displays in an annular series of virtual images displays around a person's eye. In an example, there can be four or more virtual image displays which are configured in a ring around a person's eye. In an example, a plurality of virtual image displays in a ring around a person's eye can project light beams away from the person's eye, wherein these light beams are reflected back toward the person's eye by a radial array of partially-reflective surfaces positioned in front of the person's eye. In an example, an optical structure for augmented reality eyewear can comprise VAPE (Volumetric Annular Photon Emission) or wear technology.

In an example, the orientations of individual partially-reflective surfaces in a radial (e.g. spoke and ring) array of partially-reflective surfaces can be individually controlled, analogous to an array of radio-telescopes whose orientations and focal directions are coordinated toward a central focal point. In an example, the orientations of individual partially-reflective surfaces in a radial array can be individually controlled by the application of electromagnetic energy. In an example, the orientations of individual partially-reflective surfaces in a radial array can be moved by changing an electromagnetic field to which they are exposed. In an example, the orientations of individual partially-reflective surfaces in a radial array can be moved by electromagnetism.

In an example, partially-reflective surfaces in a first (e.g. upper) set or surfaces can be rotated in a first (e.g. clockwise) direction to transition from their first configuration to their second configuration and partially-reflective surfaces in a second (e.g. lower) set of surfaces can be rotated in a second (e.g. counter-clockwise) direction to transition from their third configuration to their fourth configuration.

In an example, a partially-reflective surface can be a partially-reflective mirror. In an example, an array of partially-reflective surfaces can be an array of micromirrors. In an example, a partially-reflective surface can be a partially-reflective lens or prism. In an example, an array of partially-reflective surfaces can be microlens array. In an example, a partially-reflective surface can be a partially-reflective coating on an otherwise-transparent structure. In an example, a partially-reflective surface can be a partially-reflective layer within an otherwise transparent structure. In an example, a partially-reflective surface can be flat and/or planar. In an example, a partially-reflective surface can be arcuate. In an example, the proximal side (closer to the eye) of a partially-reflective surface can be more reflective than the distal side (farther from the eye) of a partially-reflective surface.

In an example, an arcuate array of partially-reflective surfaces can be like Venetian blinds, except being arcuate instead of planar. In an example, there can be between 10 and 1,000 partially-reflective surfaces in an array. In an example, an arcuate array of partially-reflective surfaces can form a contiguous reflective surface. In an alternative example, there can be gaps between partially-reflective surfaces in an array. In an example, individual partially-reflective surfaces in an array can have shapes selected from the group consisting of: square, rectangular, or other quadrilateral; circular or elliptical; triangular; and hexagonal.

The ability to independently and/or separately control two or more sets of partially-reflective surfaces in an array can enable the perception of different virtual images at different focal planes and/or depth planes. The ability to independently and/or separately control individual partially-reflective surfaces can also help to address the vergence-vs.-accommodation conflict which can otherwise occur in near eye image projection. In an example, changes in the configuration of an array (or individual partially-reflective surfaces in an array) can be based on changes in a person's focal direction which are measured by eye tracking.

In an example, an array of partially-reflective surfaces can be changed from a first configuration to a second configuration, or vice versa, by rotating at least one individual partially-reflective surface around its central longitudinal axis. In an example, an array can be changed from a first configuration to a second configuration, or vice versa, by rotating all partially-reflective surfaces in the array around their respective central longitudinal axes. In an example, an array of partially-reflective surfaces can be changed from a first configuration to a second configuration, or vice versa, by tilting at least one individual partially-reflective surface around one of its sides or edges. In an example, an array can be changed from a first configuration to a second configuration, or vice versa, by tilting all partially-reflective surfaces in the array around their respective longitudinal sides or edges.

In an example, all partially-reflective surfaces in an array can be rotated at the same time. In an example, different partially-reflective surfaces can be rotated at different times. In an example, differential rotation of different partially-reflective surfaces in an array can be coordinated (e.g. multiplexed) with different content (at different locations) on one or more virtual image displays to create three-dimensional effects in a virtual image. For example, since different portions of a virtual image display (or different virtual image displays) are different distances from different partially-reflective surfaces in an array, differential rotation of these different surfaces can display virtual objects in different focal planes (e.g. different depth planes) in a person's field of view.

In an example, partially-reflective surfaces can rotate in complete rotations (e.g. in a consistent clockwise or counter-clockwise direction). In an example, partially-reflective surfaces can oscillate between clockwise and counter-clockwise rotation. In an example, a partially-reflective surface can change rapidly from its first configuration to its second configuration, and vice versa, multiple times per second. In an example, a surface can rotate back and forth between 5 and 100 times per second. In an example, the content of a virtual image which is displayed on a virtual image display can be synchronized (or multiplexed) with the rotational orientation of partially-reflective surfaces in order to create an image of a virtual object in a person's field of view.

In an example, an array of partially-reflective surfaces can be changed from a first configuration to a second configuration, or vice versa, by rotating at least one partially-reflective surface around its central longitudinal axis by 20 to 90 degrees. In an example, an array of partially-reflective surfaces can be changed from a first configuration to a second configuration, or vice versa, by tilting at least one partially-reflective surface around its side or edge by 20 to 90 degrees. In an example, optics for augmented reality eyewear can comprises a mechanism for selectively rotating and/or tilting individual partially-reflective surfaces, or sets thereof within an array, in different directions, at different times, or by different amounts.

In an example, one or more sets of partially-reflective surfaces in an array of partially-reflective surfaces can be moved by application of electromagnetic energy. In an example, partially-reflective surfaces can be moved by exposure to a changing electromagnetic field. In an example, oscillation or perturbation of a magnetic field can change the orientations of partially-reflective structures in an array. In an example, partially-reflective surfaces can be moved by mechanical rotation of their longitudinal axes (e.g. using an electromagnetic actuator). In an example, partially-reflective surfaces can be moved by air pressure and/or air flow (e.g. micro-pneumatics). In an example, partially-reflective surfaces can be moved by fluid pressure and/or fluid flow (e.g. micro-fluidics and/or micro-hydraulics).

In an example, one or more sets of surfaces in an arcuate array of partially-reflective surfaces can have first edges which are (flexibly) connected to a first moving structure and second edges which are (flexibly) connected to a second moving structure. In an example, they can be moved by laterally shifting the first and second structures relative to each other. In an example, one or more sets of surfaces in an arcuate array of partially-reflective surfaces can have first edges which are (flexibly) connected to a moving structure and second edges which are connected to hinges or joints. In an example, the surfaces can be moved by moving the structure. In an example, an arcuate array of moving partially-reflective surfaces can have a shape which is selected from the group consisting of: spherical section; conic section; convex; concave; sawtooth and/or zigzag; planoconvex; and planoconcave.

In an example, all partially-reflective surfaces in an array can be equal in size and identical in shape. In an example, central partially-reflective surfaces in an array can be larger than peripheral partially-reflective surfaces, or vice versa. In an example, upper partially-reflective surfaces in an array can be larger than lower partially-reflective surfaces, or vice versa. In an example, central partially-reflective surfaces can have a first shape and peripheral partially-reflective surfaces can have a second shape. In an example, upper partially-reflective surfaces can have a first shape and lower partially-reflective surfaces can have a second shape. In an example, proximal pairs of partially-reflective surfaces in an array can all be equidistant. In an example, central partially-reflective surfaces in an array can be closer together than peripheral partially-reflective surfaces, or vice versa. In an example, upper partially-reflective surfaces in an array can be closer together than lower partially-reflective surfaces, or vice versa. In an example, partially-reflective surfaces in a distal array can be closer together than partially-reflective surfaces in a proximal array, or vice versa.

In an example, a virtual image display can be contiguous to one side of an edge of moving partially-reflective surfaces. In an example, a virtual image display can be tangential to the edge of an arcuate array of moving partially-reflective surfaces. In an example, a virtual image display (or the best-fitting virtual plane thereof) can intersect the edge of an arcuate array of moving partially-reflective surfaces at an angle within the range of 20 to 90 degrees. In an example, a virtual image display can have a (proximal-to-distal) width which is less than the height of an arcuate array of partially-reflective surfaces. In an example, a virtual image display can have a (proximal-to-distal) width which is between 25% and 75% of the height of an arcuate array of partially-reflective surfaces.

In an example, a virtual image display can comprise one or more components selected from the group consisting of: active matrix organic light-emitting diode array, projector, or display; collimated light projector or display; digital micromirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; micro-display and/or microprojector; micro-display array or matrix; optoelectronic display; organic light emitting diode (OLED) array or matrix; passive matrix light-emitting diode array or matrix; photoelectric display; and transmission holographic optical element array or matrix.

The optical structure for augmented reality which is shown in FIG. 63 can also be described as comprising: an upper virtual image display (6303) which is configured to be above a space in front of a person's eye; a lower virtual image display (6304) which is configured to be below the space in front of the person's eye; an arcuate array of partially-reflective surfaces which is between the upper virtual image display and the lower virtual image display, wherein the array of partially-reflective surfaces further comprises an upper set of partially-reflective surfaces (including 6301) with a first orientation which reflect light beams from the upper virtual image display toward the person's eye and allow some light rays from the environment to pass through the arcuate array to the person's eye; and wherein the array of partially-reflective surfaces further comprises a lower set of partially-reflective surfaces (including 6302) with a second orientation which reflect light beams from the lower virtual image display toward the person's eye and allow some light rays from the environment to pass through the arcuate array to the person's eye. In an example, the upper set can be located within the upper half of the array and the lower set can be located within the lower half of the array.

In an example, this structure can be rotated 90 degrees. In an example, an optical structure for augmented reality can comprise: a right-side virtual image display which is configured to be to the right of a space in front of a person's eye; a left-side virtual image display which is configured to be to the left of the space in front of the person's eye; an arcuate array of partially-reflective surfaces which is between the right-side virtual image display and the left-side virtual image display, wherein the array of partially-reflective surfaces further comprises a right-side set of partially-reflective surfaces with a first orientation which reflect light beams from the right-side virtual image display toward the person's eye and allow some light rays from the environment to pass through the arcuate array to the person's eye; and wherein the array of partially-reflective surfaces further comprises a left-side set of partially-reflective surfaces with a second orientation which reflect light beams from the left-side virtual image display toward the person's eye and allow some light rays from the environment to pass through the arcuate array to the person's eye. In an example, the right-side set can be located within the right-side half of the array and the left-side set can be located within the left-side half of the array. Example variations discussed in other portions of this disclosure or in priority-linked disclosures can also be applied to this example where relevant, but are not repeated here in order to reduce narrative redundancy.

FIGS. 64 through 66 show an optical structure for augmented reality eyewear with a virtual image display and an internal-reflection waveguide, wherein the waveguide further comprises distal and proximal arrays of rotating partially-reflective surfaces. Although this figure shows a single optical structure for a single eye, it is to be understood that augmented reality (AR) eyewear can include two such optical structures, one for the right eye and one for the left eye. Also, although this figure shows an optical structure with a virtual image display above an eye, it is to be understood that the optical structure can be rotated 90 degrees in a vertical plane so that the display is to the right or left of the eye. Also, although these figures do not show an eyewear frame, it is to be understood that this optical structure can be held in proximity to a person's eye by an eyewear frame.

In an example, this optical structure for augmented reality eyewear can further comprise one or more components selected from the group consisting of: accelerometer, electromagnet or electromagnet array, gyroscope, or other type of motion sensor, actuator, camera, data processor, EEG sensor or other electromagnetic energy sensor, environmental light sensor, eye tracking mechanism, eyewear frame, power source (such as a battery), speaker, touch-based user interface, voice-based user interface, wireless data receiver, and wireless data transmitter.

Specifically, FIGS. 64 through 66 show three sequential cross-sectional side views of an optical structure for augmented reality (AR) eyewear comprising: virtual image display (6404) which emits light beams which create a (portion of a) virtual image in a person's field of view; and internal-reflection waveguide (6401) which is configured to be placed in front of a person's eye, wherein the virtual image display emits light beams which enter the internal-reflection waveguide, wherein the internal-reflection waveguide further comprises a distal array of rotating partially-reflective surfaces (including 6402), wherein the internal reflective waveguide further comprises a proximal array of rotating partially-reflective surfaces (including 6403), wherein the distal array and the proximal array have a first configuration in which they allow a first level of light beams from the environment to pass through the waveguide toward the person's eye and reflect a second level of light beams from the virtual image display toward the person's eye; wherein the distal array and the proximal array have a second configuration in which they allow a third level of light beams from the environment to pass through the waveguide toward the person's eye and reflect a fourth level of light beams from the virtual image display toward the person's eye along a first set of vectors, and wherein the third level is at least 10% less than the first level, and wherein the fourth level is at least 10% greater than the second level; wherein the distal array and the proximal array have a third configuration in which they allow a fifth level of light beams from the environment to pass through the waveguide toward the person's eye and reflect a sixth level of light beams from the virtual image display toward the person's eye along a second set of vectors, wherein the fifth level is at least 10% less than the first level, wherein the sixth level is at least 10% greater than the second level; wherein the distal array and the proximal array are changed between configurations by the rotation of partially-reflective surfaces in the distal array, in the proximal array, or in both the distal array and the proximal array; and wherein the second set of vectors is different than the first set of vectors.

FIG. 64 shows this optical structure at a first time when the distal and proximal arrays are in their first configuration, wherein partially-reflective surfaces in the distal and proximal arrays are oriented to allow light beams from the environment to pass through the waveguide to the person's eye with little or no obstruction. In this first configuration, the arrays in the internal-reflection waveguide do not substantially reflect light beams from the virtual image display toward the person's eye. In an example, partially-reflective surfaces within the same (distal or proximal) array can be substantially parallel to each other in the first configuration. In an example, different partially-reflective surfaces within the same (distal or proximal) array can be substantially parallel to different radial vectors, respectfully, extending outward from the center of a person's pupil or retina in the first configuration. In an example, partially-reflective surfaces in distal and proximal arrays can be substantially parallel to each other in the first configuration.

FIG. 65 shows this optical structure at a second time when the distal and proximal arrays are in their second configuration, wherein partially-reflective surfaces in the distal and proximal arrays are now oriented so that: light beams from the environment are at least partially reflected and/or obstructed from reaching the person's eye; and light beams from the virtual image display are internally reflected (along a first reflective pathway) within the waveguide and exit the waveguide along a first set of vectors toward the person's eye.

FIG. 66 shows this optical structure at a third time when the distal and proximal arrays are in their third configuration, wherein partially-reflective surfaces in the distal and proximal arrays are now oriented so that: light beams from the environment are at least partially reflected and/or obstructed from reaching the person's eye; and light beams from the virtual image display are internally reflected (along a second reflective pathway) within the waveguide and exit the waveguide along a second set of vectors toward the person's eye.

The optical structure shown in FIGS. 64 through 66 can provide control of the vectors along which light beams from the virtual image display exit the waveguide. In an example, this control over exit vectors can enable adjustment of the perceived focal depth of virtual images, or portions thereof, in a person's field of view. This can heighten the three-dimensionality of perceived virtual images and also help to address the vergence-vs.-accommodation conflict which can otherwise occur with near eye image projection. Also, if exit vectors are changed in synchronization with changing content displayed by the virtual image display, then this can enable the creation of virtual images by sequential scanning and/or multiplexing. Sequential scanning and/or multiplexing can enable the creation of virtual images in a person's field of view with less bulky augmented reality eyewear and/or with greater image resolution with a given eyewear size.

In an example, a distal array of partially-reflective surfaces can be located on the distal side of an internal-reflection waveguide and a proximal array of partially-reflective surfaces can be located on the proximal side of an internal-reflection waveguide. In an example, a distal array of partially-reflective surfaces can be part of a distal layer (or within a distal channel) of an internal-reflection waveguide and a proximal array of partially-reflective surfaces can be part of a proximal layer (or within a proximal channel) of an internal-reflection waveguide.

In an example, the configuration of distal and proximal arrays can be changed by rotating (and/or tilting) partially-reflective surfaces in only the distal array of partially-reflective surfaces. In an example, the configuration of distal and proximal arrays can be changed by rotating (and/or tilting) partially-reflective surfaces in only the proximal array of partially-reflective surfaces. In an example, the configuration of distal and proximal arrays can be changed by rotating (and/or tilting) partially-reflective surfaces in both the distal and proximal arrays of partially-reflective surfaces.

In an example, rotating partially-reflective surfaces in distal and/or proximal arrays changes the reflection path of light beams from the virtual image display through the internal-reflection waveguide. In an example, changing the reflection path of light beams from the virtual image display through the internal-reflection waveguide changes their exit vectors. In an example, rotating partially-reflective surfaces in the distal and/or proximal arrays changes the number of times light beams from the virtual image display are internally reflected as they travel through the waveguide before they exit the waveguide. In an example, rotating partially-reflective surfaces in the distal and/or proximal arrays changes the distance that light beams from the virtual image display travel through the waveguide before they exit the waveguide.

In an example, light beams from the virtual image display can travel a first distance and exit the waveguide along a first set of vectors when partially-reflective surfaces in the distal and proximal arrays are (closer to being) parallel to each other. In an example, light beams from the virtual image display can travel a second distance and exit the waveguide along a second set of vectors when partially-reflective surfaces in the distal and proximal arrays are farther from being parallel to each other.

In an example, the virtual intersection angle between partially-reflective surfaces in the distal and proximal arrays can be defined as the angle of intersection between the virtual plane(s) which best fit partially-reflective surfaces in the distal array and the virtual plane(s) which best fit partially-reflective surfaces in the proximal array. In an example, changing the virtual intersection angle changes the exit vectors along which light beams from the virtual image display exit the waveguide toward a person's eye. In an example, changing the virtual intersection angle changes the locations along the waveguide from which these light beams exit the waveguide. In an example, the virtual intersection angle can be changed by rotating partially-reflective surfaces in the distal array, in the proximal array, or in both the distal and proximal arrays.

In an example, partially-reflective surfaces in a distal or proximal array of partially-reflective surfaces can be moved by application of electromagnetic energy. In an example, partially-reflective surfaces can be moved by exposure to a changing electromagnetic field. In an example, oscillation or perturbation of a magnetic field can change the orientations of partially-reflective structures in an array. In an example, partially-reflective surfaces can be moved by mechanical rotation of their longitudinal axes (e.g. using an electromagnetic actuator). In an example, partially-reflective surfaces can be moved by air pressure and/or air flow (e.g. micro-pneumatics). In an example, partially-reflective surfaces can be moved by fluid pressure and/or fluid flow (e.g. micro-fluidics and/or micro-hydraulics).

In an alternative example, exit vectors of light beams from a virtual image display exiting an internal-reflection waveguide can be changed by laterally shifting a distal array of partially-reflective surfaces relative to a proximal array of partially-reflective surfaces, or vice versa. In an example, laterally shifting the distal array relative to the proximal array can change the reflection paths and exit vectors of light beams from the virtual image display. In an example, the distal and proximal arrays can be laterally shifted by an electromagnetic actuator or by changes (e.g. perturbations or oscillations) in an electromagnetic field.

In an alternative example, exit vectors of light beams from a virtual image display exiting an internal-reflection waveguide can be changed by shifting the distance between a distal array of partially-reflective surfaces and a proximal array of partially-reflective surfaces, or vice versa. In an example, shifting the distance between the distal and proximal arrays can change the reflection paths and exit vectors of light beams from the virtual image display. In an example, the distance between the distal and proximal arrays can be shifted by an electromagnetic actuator or by changes (e.g. perturbations or oscillations) in an electromagnetic field.

In an example, all partially-reflective surfaces in a distal and/or proximal array can be equal in size and identical in shape. In an example, central partially-reflective surfaces can be larger than peripheral partially-reflective surfaces, or vice versa. In an example, upper partially-reflective surfaces can be larger than lower partially-reflective surfaces, or vice versa. In an example, central partially-reflective surfaces can have a first shape and peripheral partially-reflective surfaces can have a second shape. In an example, upper partially-reflective surfaces can have a first shape and lower partially-reflective surfaces can have a second shape. In an example, proximal pairs of partially-reflective surfaces in an array can all be equidistant. In an example, central partially-reflective surfaces in an array can be closer together than peripheral partially-reflective surfaces, or vice versa. In an example, upper partially-reflective surfaces in an array can be closer together than lower partially-reflective surfaces, or vice versa. In an example, partially-reflective surfaces in a distal array can be closer together than partially-reflective surfaces in a proximal array, or vice versa.

In an example, a partially-reflective surface can be a partially-reflective mirror. In an example, an array of partially-reflective surfaces can be an array of micromirrors. In an example, a partially-reflective surface can be a partially-reflective lens or prism. In an example, an array of partially-reflective surfaces can be microlens array. In an example, a partially-reflective surface can be a partially-reflective coating on an otherwise-transparent structure. In an example, a partially-reflective surface can be a partially-reflective layer within an otherwise transparent structure. In an example, a partially-reflective surface can be flat and/or planar. In an example, a partially-reflective surface can be arcuate. In an example, individual partially-reflective surfaces in an array can have shapes selected from the group consisting of: square, rectangular, or other quadrilateral; circular or elliptical; triangular; and hexagonal. In an example, an array of moving partially-reflective surfaces can have a shape which is selected from the group consisting of: planar, spherical section; conic section; convex; concave; sawtooth and/or zigzag; planoconvex; and planoconcave.

In an example, a virtual image display can comprise one or more components selected from the group consisting of: active matrix organic light-emitting diode array, projector, or display; collimated light projector or display; digital micromirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; micro-display and/or microprojector; micro-display array or matrix; optoelectronic display; organic light emitting diode (OLED) array or matrix; passive matrix light-emitting diode array or matrix; photoelectric display; and transmission holographic optical element array or matrix.

In this example, the virtual image display is above a space in front of a person's eye. In an example, this structure can be rotated 90 degrees so that a virtual image display to the right or to the left of a space in front of a person's eye. Also, although this figure shows a single optical structure for a single eye, it is to be understood that augmented reality (AR) eyewear can include two such optical structures, one for the right eye and one for the left eye. Also, although these figures do not show an eyewear frame, it is to be understood that this optical structure can be held in proximity to a person's eye by an eyewear frame. Also, in an example, an optical structure for augmented reality eyewear can further comprise one or more components selected from the group consisting of: accelerometer, electromagnet or electromagnet array, gyroscope, or other type of motion sensor, actuator, camera, data processor, EEG sensor or other electromagnetic energy sensor, environmental light sensor, eye tracking mechanism, eyewear frame, power source (such as a battery), speaker, touch-based user interface, voice-based user interface, wireless data receiver, and wireless data transmitter.

In an example, an optical structure for augmented reality eyewear can be like the one shown in FIGS. 64 through 66 except that it does not have the first configuration. In an example, an optical structure for augmented reality (AR) eyewear can comprise: a virtual image display which emits light beams which create a (portion of a) virtual image in a person's field of view; and an internal-reflection waveguide which is configured to be placed in front of a person's eye, wherein the virtual image display emits light beams which enter the internal-reflection waveguide, wherein the internal-reflection waveguide further comprises a distal array of rotating partially-reflective surfaces, wherein the internal reflective waveguide further comprises a proximal array of rotating partially-reflective surfaces, wherein the distal array of rotating partially-reflective surfaces and the proximal array of rotating partially-reflective surfaces have a first configuration in which they direct light beams from the virtual image display to exit the waveguide along a first set of vectors, wherein the distal array of rotating partially-reflective surfaces and the proximal array of rotating partially-reflective surfaces have a second configuration in which they direct light beams from the virtual image display to exit the waveguide along a second set of vectors, wherein the second set of vectors is different than the first set of vectors, and wherein the distal array and the proximal array are changed from the first configuration to the second configuration, or vice versa, by the rotation of partially-reflective surfaces in the distal array, in the proximal array, or in both the distal array and the proximal array. Example variations discussed in other portions of this disclosure or in priority-linked disclosures can also be applied to this example where relevant, but are not repeated here to reduce narrative redundancy here without repeating here.

Figure 67:
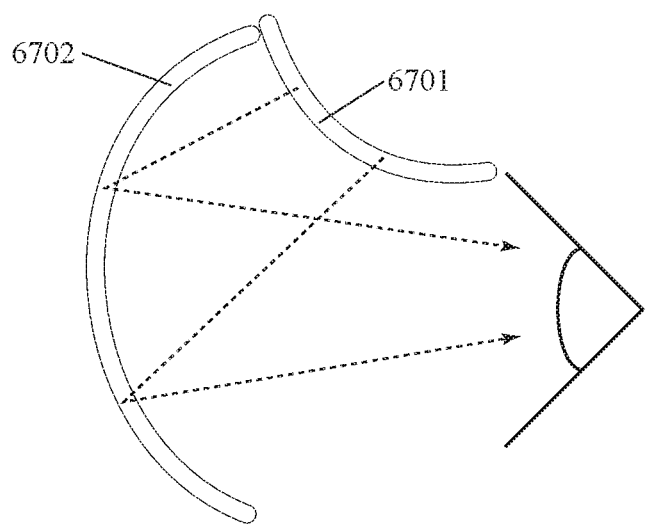
FIG. 67 shows a concave image display near an upper portion of a distal concave reflective surface.

FIG. 67 shows a vertical cross-sectional side view of an optical structure for augmented reality eyewear comprising: a proximally-concave partially-reflective optical member (6702) which is configured to be within 6" in front of a person's eye; and an arcuate virtual image display (6701) which is configured to be within 4" of the person's eye; wherein light rays from the environment pass through the proximally-concave partially-reflective optical member to the person's eye, wherein light rays from the arcuate virtual image display are reflected by the proximally-concave partially-reflective optical member toward the person's eye, and wherein light rays from the arcuate virtual image display create virtual images in the person's field of view.

In this disclosure, proximal means closer to a person's body and distal means father from the person's body. A proximally-concave partially-reflective optical member has a concave side which opens (e.g. faces) toward the person's head. In an example, a proximally-concave partially-reflective optical member can be selected from the group consisting of: partially-reflective lens; lens with a partially-reflective outer layer or coating; lens with a partially-reflective inner layer or coating; micro-lens array; partially-reflective prism; optical beam splitter; partially-reflective mirror; and mirror array. In an example, the proximally-concave partially-reflective optical member can have a shape selected from the group consisting of: section of a sphere; conic section; toroidal; sinusoidal; zigzag; Fresnel lens; section of an ellipsoid; and free form. In an example, a partially-reflective optical member can be accompanied by a distal optical member that (pre)corrects for distortion of environmental light rays which the partially-reflective optical member causes.

In an example, an arcuate virtual image display can be configured to be above a person's eye and/or above a space in front of a person's eye, with a downward and/or distal-facing convexity. In an example, an arcuate virtual image display can have an upward and proximal-facing concavity. In an example, an arcuate virtual image display can be configured to be to the right of a person's eye and/or to the right of a space in front of a person's eye, with a left-facing and/or distal-facing convexity. In an example, an arcuate virtual image display can be configured to be to the left of a person's eye and/or to the left of a space in front of a person's eye, with a right-facing and/or distal-facing convexity. In an example, an arcuate virtual image display can be configured to be below a person's eye and/or below a space in front of a person's eye, with an upward and/or distal-facing convexity. In an example, an arcuate virtual image display can have a shape selected from the group consisting of: section of a sphere; conic section; toroidal; and section of an ellipsoid.

In an example, an edge of a proximally-concave partially-reflective optical member and an edge of an arcuate virtual image display can be contiguous. In an example, there can be a gap between a proximally-concave partially-reflective optical member and an arcuate virtual image display. In an example, virtual extensions of a proximally-concave partially-reflective optical member and an arcuate virtual image display can intersect in three-dimensional space at a 90-degree angle. In an example, virtual extensions of a proximally-concave partially-reflective optical member and an arcuate virtual image display can intersect in three-dimensional space at an acute angle. In an example, a proximally-concave partially-reflective optical member can have a first length and an arcuate virtual image display can have a second length, wherein the second length is between 25% and 75% of the first length.

In an example, if an arcuate virtual image display is virtually rotated and shifted in three dimensional space, then it can be nested within a concavity of the proximally-concave partially-reflective optical member. In an example, if an arcuate virtual image display is virtually rotated and shifted in three dimensional space, then it can be parallel to an proximally-concave partially-reflective optical member. In an example, if an arcuate virtual image display is virtually rotated and shifted in three dimensional space, then it can be aligned with a portion of a proximally-concave partially-reflective optical member.

In an example, a virtual image display can comprise one or more components selected from the group consisting of: active matrix organic light-emitting diode array, projector, or display; collimated light projector or display; digital micromirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; micro-display and/or microprojector; micro-display array or matrix; optoelectronic display; organic light emitting diode (OLED) array or matrix; passive matrix light-emitting diode array or matrix; photoelectric display; and transmission holographic optical element array or matrix.

Although this figure shows a single optical structure for a single eye, augmented reality (AR) eyewear can include two such optical structures, one for each eye. Also the optical structure can be rotated (90 degrees) in a vertical plane. Also, although this figure does not show an eyewear frame, this optical structure can be held in proximity to a person's eye by an eyewear frame. Also, this optical structure for augmented reality eyewear can further comprise one or more components selected from the group consisting of: accelerometer, electromagnet or electromagnet array, gyroscope, or other type of motion sensor, actuator, camera, data processor, distal corrective lens or prism; EEG sensor or other electromagnetic energy sensor, environmental light sensor, eye tracking mechanism, eyewear frame, power source (such as a battery), speaker, touch-based user interface, voice-based user interface, wireless data receiver, and wireless data transmitter. Example variations discussed in other portions of this disclosure or in priority-linked disclosures can also be applied to this example where relevant, but are not repeated here in order to reduce narrative redundancy.

Figure 68:
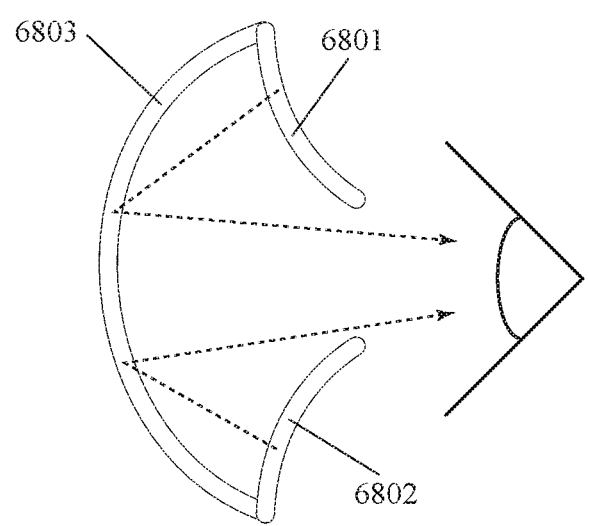
FIG. 68 shows two concave image displays near upper and lower portions of a distal concave reflective surface.

FIG. 68 shows an optical structure whose vertical cross-section is shaped somewhat like the front of a battle axe. Specifically, FIG. 68 shows a vertical cross-sectional side view of an optical structure for augmented reality eyewear comprising: a proximally-concave partially-reflective optical member (6803) which is configured to be within 6" in front of a person's eye; an upper distally-convex virtual image display (6801); and a lower distally-convex virtual image display (6802); wherein light rays from the environment pass through the proximally-concave partially-reflective optical member to the person's eye, wherein light rays from the upper distally-convex virtual image display are reflected by the proximally-concave partially-reflective optical member toward the person's eye, wherein light rays from the lower distally-convex virtual image display are reflected by the proximally-concave partially-reflective optical member toward the person's eye, and wherein light rays from the upper and lower distally-convex virtual image displays create virtual images in the person's field of view.

The proximally-concave partially-reflective optical member has a concave side which opens (e.g. faces) toward the person's head. In an example, the proximally-concave partially-reflective optical member can be selected from the group consisting of: partially-reflective lens; lens with a partially-reflective outer layer or coating; lens with a partially-reflective inner layer or coating; micro-lens array; partially-reflective prism; optical beam splitter; partially-reflective mirror; and mirror array. In an example, the proximally-concave partially-reflective optical member can have a shape selected from the group consisting of: section of a sphere; conic section; toroidal; sinusoidal; zigzag; Fresnel lens; section of an ellipsoid; and free form. In an example, a partially-reflective optical member can be accompanied by a distal optical member that (pre)corrects for distortion of environmental light rays which the partially-reflective optical member causes.

In an example, an upper distally-convex virtual image display can be configured to be above a person's eye (and/or above a space in front of a person's eye) and have a downward and distal facing convexity. In an example, an upper distally-convex virtual image display can have an upward and proximal-facing concavity. In an example, a lower distally-convex virtual image display can be configured to be below a person's eye (and/or below a space in front of a person's eye) and have an upward and distal facing convexity. In an example, a lower distally-convex virtual image display can have a downward and proximal-facing concavity. In an example, this optical structure can be rotated so that the virtual image displays are to the right and left of the person's eye instead of above and below the person's eye. In an example, an arcuate virtual image display can have a shape selected from the group consisting of: section of a sphere; conic section; toroidal; and section of an ellipsoid.

In an example, an edge of a proximally-concave partially-reflective optical member and the edge of an upper or lower distally-convex virtual image display can be contiguous. In an example, the upper edge of a proximally-concave partially-reflective optical member and the distal edge of an upper distally-convex virtual image display can be contiguous. In an example, the lower edge of a proximally-concave partially-reflective optical member and the distal edge of a lower distally-convex virtual image display can be contiguous. In an example, virtual extensions of a proximally-concave partially-reflective optical member and an upper or lower distally-convex arcuate virtual image display can intersect in three-dimensional space at an acute angle. In an example, a proximally-concave partially-reflective optical member can have a first length and an upper or lower distally-convex virtual image display can have a second length, wherein the second length is between 10% and 50% of the first length.

In an example, if an upper or lower distally-convex virtual image display is virtually rotated and shifted in three dimensional space, then it can be nested within a concavity of the proximally-concave partially-reflective optical member. In an example, if a virtual image display is virtually rotated and shifted in three dimensional space, then it can be parallel to an proximally-concave partially-reflective optical member. In an example, if a virtual image display is virtually rotated and shifted in three dimensional space, then it can be aligned with a portion of an proximally-concave partially-reflective optical member. Example variations discussed in other portions of this disclosure or in priority-linked disclosures can also be applied to this example where relevant, but are not repeated here in order to reduce narrative redundancy.

Figure 69:
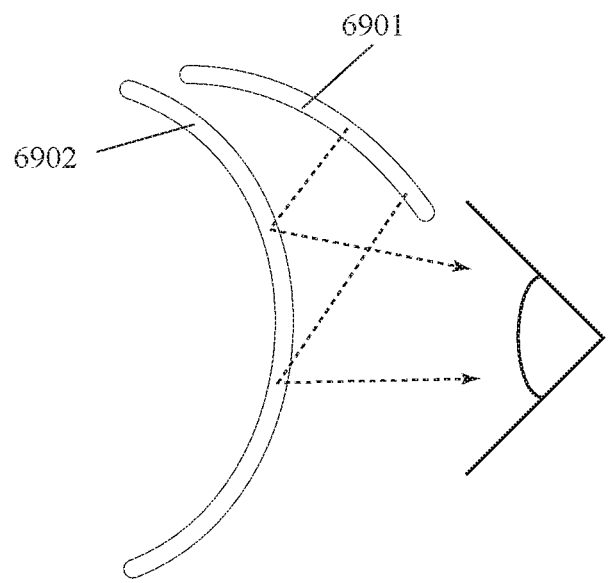
FIG. 69 shows a convex image display near an upper portion of a distal convex reflective surface.

FIG. 69 shows a vertical cross-sectional side view of an optical structure for augmented reality eyewear comprising: a proximally-convex partially-reflective optical member (6902) which is configured to be within 6" in front of a person's eye; and an arcuate virtual image display (6901) which is configured to be within 4" of a person's eye; wherein light rays from the environment pass through the proximally-convex partially-reflective optical member to the person's eye, wherein light rays from the arcuate virtual image display are reflected by the proximally-convex partially-reflective optical member toward the person's eye, and wherein light rays from the arcuate virtual image display create virtual images in the person's field of view.

In an example, a proximally-convex partially-reflective optical member can have a convex side which faces (e.g. whose central portion bulges toward) the person's head. In an example, a proximally-convex partially-reflective optical member can be selected from the group consisting of: partially-reflective lens; lens with a partially-reflective outer layer or coating; lens with a partially-reflective inner layer or coating; micro-lens array; partially-reflective prism; optical beam splitter; partially-reflective mirror; and mirror array. In an example, the proximally-convex partially-reflective optical member can have a shape selected from the group consisting of: section of a sphere; conic section; toroidal;

sinusoidal; zigzag; Fresnel lens; section of an ellipsoid; and free form. In an example, a proximally-convex partially-reflective optical member can be accompanied by a distal optical member that (pre)corrects for distortion of environmental light rays which the proximally-convex partially-reflective optical member causes.

In an example, an arcuate virtual image display can be configured to be above a person's eye and/or above a space in front of a person's eye, with a downward and/or distal-facing concavity. In an example, an arcuate virtual image display can be configured to be to the right of a person's eye and/or to the right of a space in front of a person's eye, with a left-facing and/or distal-facing concavity. In an example, an arcuate virtual image display can be configured to be to the left of a person's eye and/or to the left of a space in front of a person's eye, with a right-facing and/or distal-facing concavity. In an example, an arcuate virtual image display can be configured to be below a person's eye and/or below a space in front of a person's eye, with an upward and/or distal-facing concavity. In an example, an arcuate virtual image display can have a shape selected from the group consisting of: section of a sphere; conic section; toroidal; sinusoidal; zigzag; Fresnel lens; section of an ellipsoid.

In an example, an edge of a proximally-convex partially-reflective optical member and an edge of an arcuate virtual image display can be contiguous. In an example, there can be a gap between a proximally-convex partially-reflective optical member and an arcuate virtual image display. In an example, virtual extensions of a proximally-convex partially-reflective optical member and an arcuate virtual image display can intersect in three-dimensional space at a 90-degree angle. In an example, virtual extensions of a proximally-convex partially-reflective optical member and an arcuate virtual image display can intersect in three-dimensional space at an acute angle. In an example, a proximally-convex partially-reflective optical member can have a first length and an arcuate virtual image display can have a second length, wherein the second length between 25% and 75% of the first length. Example variations discussed in other portions of this disclosure or in priority-linked disclosures can also be applied to this example where relevant, but are not repeated here in order to reduce narrative redundancy.

Figure 70:
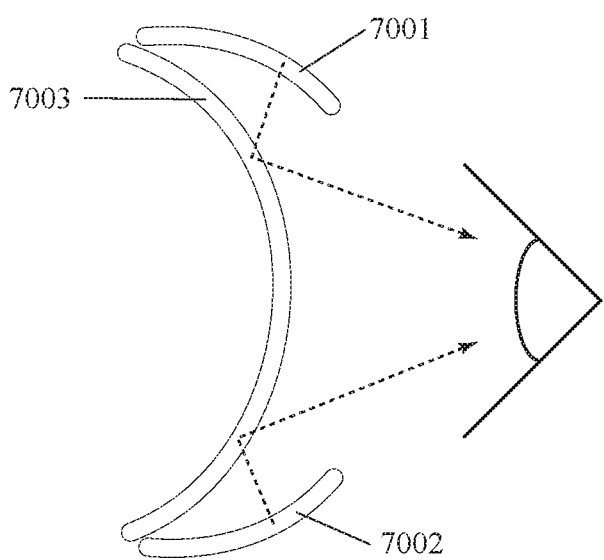
FIG. 70 shows two convex image displays adjacent to upper and lower portions of a distal convex reflective surface.

FIG. 70 shows a vertical cross-sectional side view of an optical structure for augmented reality eyewear comprising: a proximally-convex partially-reflective optical member (7003) which is configured to be within 6" in front of a person's eye; an upper distally-concave virtual image display (7001); and a lower distally-concave virtual image display (7002); wherein light rays from the environment pass through the proximally-convex partially-reflective optical member to the person's eye, wherein light rays from the upper distally-concave virtual image display are reflected by the proximally-convex partially-reflective optical member toward the person's eye, wherein light rays from the lower distally-concave virtual image display are reflected by the proximally-convex partially-reflective optical member toward the person's eye, and wherein light rays from the upper and lower distally-concave virtual image displays create virtual images in the person's field of view.

The proximally-convex partially-reflective optical member has a convex side which faces (e.g. whose central portion bulges toward) the person's head. In an example, the proximally-convex partially-reflective optical member can be selected from the group consisting of: partially-reflective lens; lens with a partially-reflective outer layer or coating; lens with a partially-reflective inner layer or coating; micro-lens array; partially-reflective prism; optical beam splitter; partially-reflective mirror; and mirror array. In an example, the proximally-convex partially-reflective optical member can have a shape selected from the group consisting of: section of a sphere; conic section; toroidal; sinusoidal; zigzag; Fresnel lens; section of an ellipsoid; and free form. In an example, a proximally-convex partially-reflective optical member can be accompanied by a distal optical member that (pre)corrects for distortion of environmental light rays which the proximally-convex partially-reflective optical member causes.

In an example, an upper distally-concave virtual image display can be configured to be above a person's eye (and/or above a space in front of a person's eye) and have a downward and distal facing concavity. In an example, a lower distally-concave virtual image display can be configured to be below a person's eye (and/or below a space in front of a person's eye) and have an upward and distal facing concavity. In an example, this optical structure can be rotated so that the virtual image displays are to the right and left of the person's eye instead of above and below the person's eye. In an example, an arcuate virtual image display can have a shape selected from the group consisting of: section of a sphere; conic section; toroidal; and section of an ellipsoid.

In an example, an edge of a proximally-convex partially-reflective optical member and the edge of an upper or lower distally-concave virtual image display can be contiguous. In an example, the upper edge of a proximally-convex partially-reflective optical member and the distal edge of an upper distally-concave virtual image display can be contiguous. In an example, the lower edge of a proximally-convex partially-reflective optical member and the distal edge of a lower distally-concave virtual image display can be contiguous. In an example, virtual extensions of a proximally-convex partially-reflective optical member and an upper or lower distally-concave arcuate virtual image display can intersect in three-dimensional space at an acute angle. In an example, a proximally-convex partially-reflective optical member can have a first length and an upper or lower distally-concave virtual image display can have a second length, wherein the second length is between 10% and 50% of the first length. Example variations discussed in other portions of this disclosure or in priority-linked disclosures can also be applied to this example where relevant, but are not repeated here in order to reduce narrative redundancy.

Figure 71:
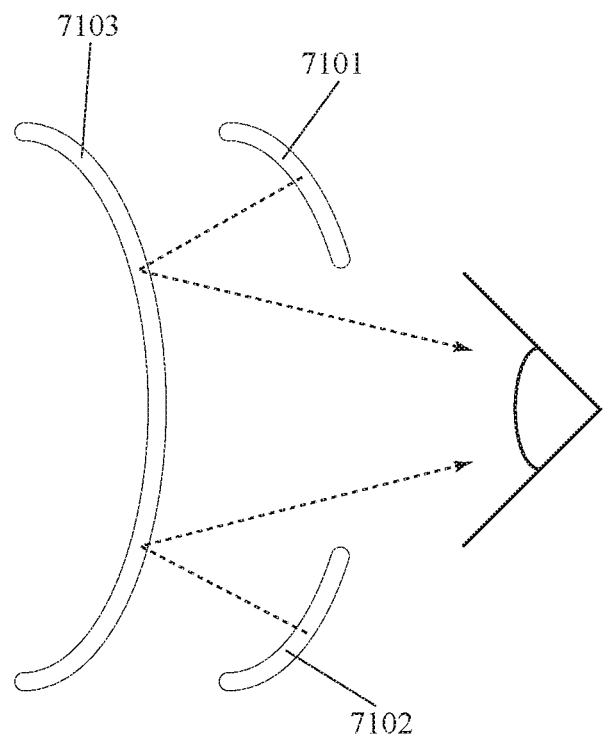
FIG. 71 shows two convex image displays near upper and lower portions of a distal convex reflective surface.

FIG. 71 shows an optical structure for augmented reality eyewear which is like the one shown in FIG. 70 except that upper and lower distally-concave virtual image displays are substantially parallel to (e.g. equidistant from) a proximally-convex partially-reflective optical member.

FIG. 71 shows an optical structure for augmented reality eyewear comprising: a proximally-convex partially-reflective optical member (7103) which is configured to be within 6" in front of a person's eye; an upper distally-concave virtual image display (7101); and a lower distally-concave virtual image display (7102); wherein light rays from the environment pass through the proximally-convex partially-reflective optical member to the person's eye, wherein light rays from the upper distally-concave virtual image display are reflected by the proximally-convex partially-reflective optical member toward the person's eye, wherein light rays from the lower distally-concave virtual image display are reflected by the proximally-convex partially-reflective optical member toward the person's eye, wherein light rays from the upper and lower distally-concave virtual image displays create virtual images in the person's field of view, and wherein the upper and lower distally-concave virtual image displays are substantially parallel to the proximally-convex reflective optical member. Example variations discussed in other portions of this disclosure or in priority-linked disclosures can also be applied to this example where relevant, but are not repeated here in order to reduce narrative redundancy.

Figure 72:
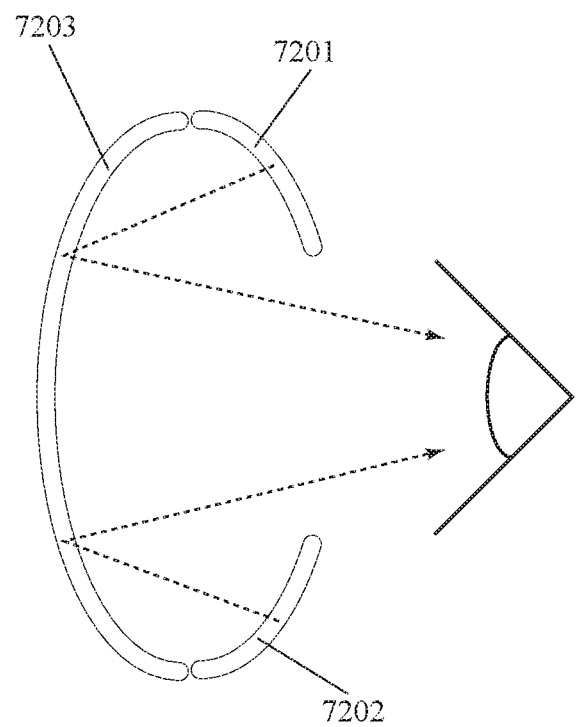
FIG. 72 shows two convex image displays near upper and lower portions of a distal concave reflective surface.

FIG. 72 shows a vertical cross-sectional side view of an optical structure for augmented reality eyewear comprising: a proximally-concave partially-reflective optical member (7203) which is configured to be within 6" in front of a person's eye; an upper distally-concave virtual image display (7201); and a lower distally-concave virtual image display (7202); wherein light rays from the environment pass through the proximally-concave partially-reflective optical member to the person's eye, wherein light rays from the upper distally-concave virtual image display are reflected by the proximally-concave partially-reflective optical member toward the person's eye, wherein light rays from the lower distally-concave virtual image display are reflected by the proximally-concave partially-reflective optical member toward the person's eye, and wherein light rays from the upper and lower distally-concave virtual image displays create virtual images in the person's field of view.

The proximally-concave partially-reflective optical member has a concave side which opens (e.g. faces) toward the person's head. In an example, the proximally-concave partially-reflective optical member can be selected from the group consisting of: partially-reflective lens; lens with a partially-reflective outer layer or coating; lens with a partially-reflective inner layer or coating; micro-lens array; partially-reflective prism; optical beam splitter; partially-reflective mirror; and mirror array. In an example, the proximally-concave partially-reflective optical member can have a shape selected from the group consisting of: section of a sphere; conic section; toroidal; sinusoidal; zigzag; Fresnel lens; section of an ellipsoid; and free form. In an example, a partially-reflective optical member can be accompanied by a distal optical member that (pre)corrects for distortion of environmental light rays which the partially-reflective optical member causes.

In an example, an upper distally-concave virtual image display can be configured to be above a person's eye (and/or above a space in front of a person's eye) and have a downward and distal facing concavity. In an example, a lower distally-concave virtual image display can be configured to be below a person's eye (and/or below a space in front of a person's eye) and have an upward and distal facing concavity. In an example, this optical structure can be rotated so that the virtual image displays are to the right and left of the person's eye. In an example, an arcuate virtual image display can have a shape selected from the group consisting of: section of a sphere; conic section; toroidal; and section of an ellipsoid.

In an example, vertical cross-sections of a proximally-concave partially-reflective optical member and upper and lower distally-concave virtual image displays can comprise segments of the same virtual geometric shape in three-dimensional space. In an example, vertical cross-sections of a proximally-concave partially-reflective optical member and upper and lower distally-concave virtual image displays can comprise segments of the perimeter of a virtual geometric shape. In an example, vertical cross-sections of a proximally-concave partially-reflective optical member and upper and lower distally-concave virtual image displays can collectively comprise between 50% and 85% of the perimeter of a virtual geometric shape. In an example, this geometric shape can be selected from the group consisting of: ellipse; oval; keystone; rounded keystone; trapezoid; rounded trapezoid; and circle. In an example this geometric shape can have a vertical longitudinal (e.g. longer) axis and a horizontal lateral (e.g. shorter) axis.

In an example, vertical cross-sections of a proximally-concave partially-reflective optical member and upper and lower distally-concave virtual image displays can collectively form between 50% and 85% of the perimeter of a virtual geometric shape selected from the group consisting of: ellipse; oval; keystone; rounded keystone; trapezoid; rounded trapezoid; and circle. In an example, there can be a gap in the perimeter of this geometric shape into which a person's eye can look. In an example, there can be a 15% to 50% gap in the perimeter of this geometric shape which is not spanned by cross-sections of the proximally-concave partially-reflective optical member and the virtual image displays into which a person's eye can look. Example variations discussed in other portions of this disclosure or in priority-linked disclosures can also be applied to this example where relevant, but are not repeated here in order to reduce narrative redundancy.

Figure 73:
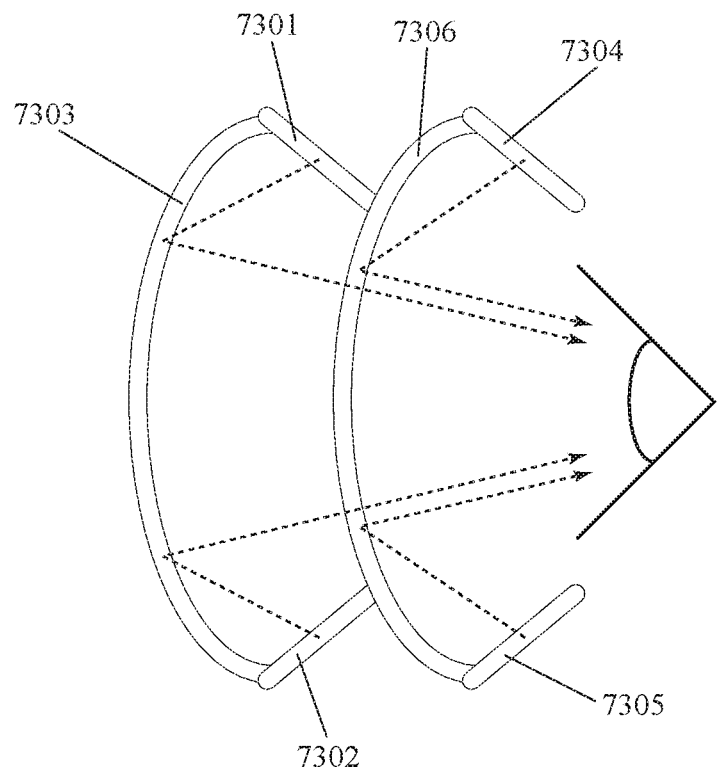
FIG. 73 shows two optical structures, each of which has two image displays near upper and lower portions of a distal concave reflective surface.

FIG. 73 shows a vertical cross-sectional side view of an optical structure for augmented reality eyewear comprising: a first proximally-concave partially-reflective optical member (7303) which is configured to be within 6" in front of a person's eye; a first upper virtual image display (7301); a first lower virtual image display (7302); a second proximally-concave partially-reflective optical member (7306) which is configured to be between the first proximally-concave partially-reflective optical member and the person's eye; a second upper virtual image display (7304); and a second lower virtual image display (7305); wherein light rays from the environment pass through both the first and second proximally-concave partially-reflective optical members to the person's eye, wherein light rays from the first upper virtual image display and the first lower virtual image display are reflected by the first proximally-concave partially-reflective optical member and pass through the second proximally-concave partially-reflective optical member to reach the person's eye, wherein light rays from the second upper virtual image display and the second lower virtual image display are reflected by the second proximally-concave partially-reflective optical member to reach the person's eye, and wherein light rays from the virtual image displays create virtual images in the person's field of view.

In an example, a (first and/or second) proximally-concave partially-reflective optical member can have a concave side which faces (e.g. opens toward) the person's head. In an example, a (first and/or second) proximally-concave partially-reflective optical member can be selected from the group consisting of: partially-reflective lens; lens with a partially-reflective outer layer or coating; lens with a partially-reflective inner layer or coating; micro-lens array; partially-reflective prism; optical beam splitter; partially-reflective mirror; and mirror array. In an example, a (first and/or second) proximally-concave partially-reflective optical member can have a shape selected from the group consisting of: section of a sphere; conic section; toroidal; sinusoidal; zigzag; Fresnel lens; section of an ellipsoid; and free form. In an example, this optical structure can further comprise another optical member that (pre)corrects for distortion of environmental light rays caused by the (first and/or second) proximally-concave partially-reflective optical members.

In this example, virtual image displays are planar and/or flat. In an example, virtual image displays can be arcuate. In an example, virtual image displays can be convex or concave. In an example, a virtual image displays can have shapes selected from the group consisting of: section of a sphere; conic section; toroidal; and section of an ellipsoid. In an example, a proximally-concave partially-reflective optical member and a virtual image display can be contiguous. In an example, there can be a gap between a proximally-concave partially-reflective optical member and a virtual image display. In an example, virtual extensions of a proximally-concave partially-reflective optical member and a virtual image display can intersect in three-dimensional space at an acute angle. In an example, a proximally-concave partially-reflective optical member can have a first length and a virtual image display can have a second length, wherein the second length is between 10% and 50% of the first length.

In an example, (portions of) virtual images displayed by first (upper and lower) virtual image displays can be perceived by a person in a first focal plane and (portions of) virtual images displayed by second (upper and lower) virtual image displays can be perceived by the person in a second focal plane, wherein the second focal plane is closer to the person than the first focal plane. In an example, (portions of) virtual images displayed by first (upper and lower) virtual image displays can be perceived by a person at a first focal depth and (portions of) virtual images displayed by second (upper and lower) virtual image displays can be perceived by the person at a second focal depth, wherein the second focal depth is shorter than the first focal depth. In an example, (portions of) virtual images displayed by first (upper and lower) virtual image displays can be perceived by a person at a first distance and (portions of) virtual images displayed by second (upper and lower) virtual image displays can be perceived by the person at a second distance, wherein the second distance is less than the first distance.

In an example, the ability of this optical structure to display (portions of) virtual images in different focal planes, at different focal depths, and/or at different distances from the viewer can help to address the conflict between vergence and accommodation (e.g. convergence and accommodation conflict) which can occur with near-eye virtual displays. In an example, with a two-eye version of this optical structure, a person can move their eyes from focusing on a virtually-distant virtual object shown by first virtual image displays (and reflected from first partially-reflective optical member) to focusing on a virtually-closer virtual object shown by second virtual image displays (and reflected from second partially-reflective optical member), or vice versa. In an example, with a two-eye version of this optical structure, a person can move their eyes from focusing on a virtually-distant virtual object shown by distal virtual image displays (and reflected from a distal partially-reflective optical member) to focusing on a virtually-closer virtual object shown by proximal virtual image displays (and reflected from a proximal partially-reflective optical member), and vice versa. Since virtual images displayed by first and second sets of virtual image displays can overlap, a given pixel or group of pixels can be displayed at a distal focal plane, a proximal focal plane, or a blend thereof.

In an example, an optical structure for augmented reality can further comprise a third (or fourth or more) proximally-concave partially-reflective optical member which is in optical communication with a third (or fourth or more) set of upper and lower virtual image displays. In an example, proximally-concave partially-reflective optical members can be coaxial. In an example, proximally-concave partially-reflective optical members can be nested. In an example, all of the proximally-concave partially-reflective optical members can be parallel. In an example, optical members in a distal-to-proximal array of partially-reflective optical members can all have the same shape and size. In an example, distal optical members in an array of partially-reflective optical members can have different shapes or sizes than proximal optical members in the array.

In an example, all optical members in a distal-to-proximal array of partially-reflective optical members can be the same size. In an alternative example, distal optical members in a distal-to-proximal array of partially-reflective optical members can be larger than proximal optical members in the array. In an example, all partially-reflective optical members can have the same curvature. In an alternative example, distal optical members in a distal-to-proximal array of partially-reflective optical members can be more concave than proximal optical members in the array, or vice versa. In an example, all partially-reflective optical members can pair-wise equidistant. In an alternative example, pairs of distal optical members in a distal-to-proximal array of partially-reflective optical members can be farther apart than pairs of proximal optical members in the array, or vice versa. In an example, all partially-reflective optical members can be equally reflective. In an alternative example, pairs of distal optical members in a distal-to-proximal array of partially-reflective optical members can be more reflective than proximal optical members in the array, or vice versa.

FIG. 73 can also be described as showing a vertical cross-sectional side view of an optical structure for augmented reality eyewear comprising: a distal proximally-concave partially-reflective optical member which is configured to be a first distance from a person's eye; a distal upper virtual image display; a distal lower virtual image display; a proximal proximally-concave partially-reflective optical member which is configured to be a second distance from the person's eye, wherein the second distance is less than the first distance; a proximal upper virtual image display; and a proximal lower virtual image display; wherein light rays from the environment pass through both the distal and proximal proximally-concave partially-reflective optical members to the person's eye, wherein light rays from the distal upper virtual image display and the distal lower virtual image display are reflected by the distal proximally-concave partially-reflective optical member and pass through the proximal proximally-concave partially-reflective optical member to reach the person's eye, wherein light rays from the proximal upper virtual image display and the proximal lower virtual image display are reflected by the proximal proximally-concave partially-reflective optical member to reach the person's eye, and wherein light rays from the virtual image displays create virtual images in the person's field of view.

In an example, a distal partially-reflective optical member and a proximal partially-reflective optical member can both be flat and/or planar. In an example, a distal partially-reflective optical member can be flat and a proximal partially-reflective optical member can be arcuate. In an example, a distal partially-reflective optical member can be arcuate and a proximal partially-reflective optical member can be flat. In an example, a distal partially-reflective optical member and a proximal partially-reflective optical member can both be arcuate. In an example, a distal partially-reflective optical member and a proximal partially-reflective optical member can both be arcuate and nested. In an example, a distal partially-reflective optical member and a proximal partially-reflective optical member can both be arcuate and concentric.

In an example, a distal partially-reflective optical member and a proximal partially-reflective optical member can both be concave. In an example, a distal partially-reflective optical member and a proximal partially-reflective optical member can both be concave and nested. In an example, a distal partially-reflective optical member and a proximal partially-reflective optical member can both be concave and concentric. In an example, a distal partially-reflective optical member and a proximal partially-reflective optical member can both be convex. In an example, a distal partially-reflective optical member and a proximal partially-reflective optical member can both be convex and nested. In an example, a distal partially-reflective optical member and a proximal partially-reflective optical member can both be convex and concentric. Example variations discussed in other portions of this disclosure or in priority-linked disclosures can also be applied to this example where relevant, but are not repeated here in order to reduce narrative redundancy.

Figure 74:
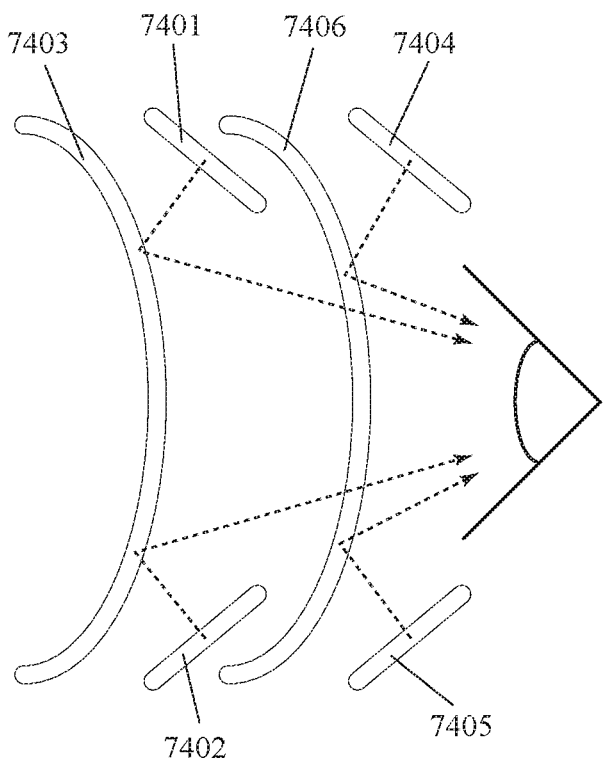
FIG. 74 shows two optical structures, each of which has two image displays near upper and lower portions of a distal convex reflective surface.

FIG. 74 shows a vertical cross-sectional side view of an optical structure for augmented reality eyewear comprising: a first proximally-convex partially-reflective optical member (7403) which is configured to be within 6" in front of a person's eye; a first upper virtual image display (7401); a first lower virtual image display (7402); a second proximally-convex partially-reflective optical member (7406) which is configured to be between the first proximally-convex partially-reflective optical member and the person's eye; a second upper virtual image display (7404); and a second lower virtual image display (7405); wherein light rays from the environment pass through both the first and second proximally-convex partially-reflective optical members to the person's eye, wherein light rays from the first upper virtual image display and the first lower virtual image display are reflected by the first proximally-convex partially-reflective optical member and pass through the second proximally-convex partially-reflective optical member to reach the person's eye, wherein light rays from the second upper virtual image display and the second lower virtual image display are reflected by the second proximally-convex partially-reflective optical member to reach the person's eye, and wherein light rays from the virtual image displays create virtual images in the person's field of view.

In an example, a (first and/or second) proximally-convex partially-reflective optical member can have a convex side which faces (e.g. has a center section which bulges toward) the person's head. In an example, a (first and/or second) proximally-convex partially-reflective optical member can be selected from the group consisting of: partially-reflective lens; lens with a partially-reflective outer layer or coating; lens with a partially-reflective inner layer or coating; microlens array; partially-reflective prism; optical beam splitter; partially-reflective mirror; and mirror array. In an example, a (first and/or second) proximally-convex partially-reflective optical member can have a shape selected from the group consisting of: section of a sphere; conic section; toroidal; sinusoidal; zigzag; Fresnel lens; section of an ellipsoid; and free form. In an example, this optical structure can further comprise another optical member that (pre)corrects for distortion of environmental light rays caused by the (first and/or second) proximally-convex partially-reflective optical members.

In this example, virtual image displays are planar and/or flat. In an example, virtual image displays can be arcuate. In an example, virtual image displays can be convex or concave. In an example, a virtual image displays can have shapes selected from the group consisting of: section of a sphere; conic section; toroidal; and section of an ellipsoid. In an example, there can be a gap between a proximally-convex partially-reflective optical member and a virtual image display. In an example, a proximally-convex partially-reflective optical member can have a first length and a virtual image display can have a second length, wherein the second length is between 10% and 50% of the first length.

In an example, (portions of) virtual images displayed by first (upper and lower) virtual image displays can be perceived by a person in a first focal plane and (portions of) virtual images displayed by second (upper and lower) virtual image displays can be perceived by the person in a second focal plane, wherein the second focal plane is closer to the person than the first focal plane. In an example, (portions of) virtual images displayed by first (upper and lower) virtual image displays can be perceived by a person at a first focal depth and (portions of) virtual images displayed by second (upper and lower) virtual image displays can be perceived by the person at a second focal depth, wherein the second focal depth is shorter than the first focal depth. In an example, (portions of) virtual images displayed by first (upper and lower) virtual image displays can be perceived by a person at a first distance and (portions of) virtual images displayed by second (upper and lower) virtual image displays can be perceived by the person at a second distance, wherein the second distance is less than the first distance.

In an example, the ability of this optical structure to display (portions of) virtual images in different focal planes, at different focal depths, and/or at different distances from the viewer can help to address the conflict between vergence and accommodation (e.g. convergence and accommodation conflict) which can occur with near-eye virtual displays. In an example, with a two-eye version of this optical structure, a person can move their eyes from focusing on a virtually-distant virtual object shown by first virtual image displays (and reflected from a first partially-reflective optical member) to focusing on a virtually-closer virtual object shown by second virtual image displays (and reflected from a second partially-reflective optical member), or vice versa. In an example, with a two-eye version of this optical structure, a person can move their eyes from focusing on a virtually-distant virtual object shown by distal virtual image displays (and reflected from a distal partially-reflective optical member) to focusing on a virtually-closer virtual object shown by proximal virtual image displays (and reflected from a proximal partially-reflective optical member), and vice versa. Since virtual images displayed by first and second sets of virtual image displays can overlap, a given pixel or group of pixels can be displayed at a distal focal plane, a proximal focal plane, or a blend thereof.

In an example, an optical structure for augmented reality can further comprise a third (or fourth or more) proximally-convex partially-reflective optical member which is in optical communication with a third (or fourth or more) set of upper and lower virtual image displays. In an example, proximally-convex partially-reflective optical members can be coaxial. In an example, proximally-convex partially-reflective optical members can be nested. In an example, proximally-convex partially-reflective optical members can be parallel. In an example, optical members in a distal-to-proximal array of partially-reflective optical members can all have the same shape and size. In an example, distal optical members in an array of partially-reflective optical members can have different shapes or sizes than proximal optical members in the array.

In an example, all optical members in a distal-to-proximal array of partially-reflective optical members can be the same size. In an alternative example, distal optical members in a distal-to-proximal array of partially-reflective optical members can be larger than proximal optical members in the array. In an example, all partially-reflective optical members can have the same curvature. In an alternative example, distal optical members in a distal-to-proximal array of partially-reflective optical members can be more concave (or more convex) than proximal optical members in the array, or vice versa. In an example, all partially-reflective optical members can pair-wise equidistant. In an alternative example, pairs of distal optical members in a distal-to-proximal array of partially-reflective optical members can be farther apart than pairs of proximal optical members in the array, or vice versa. In an example, all partially-reflective optical members can be equally reflective. In an alternative example, distal optical members in a distal-to-proximal array of partially-reflective optical members can be more reflective than proximal optical members in the array, or vice versa.

FIG. 74 can also be described as showing a vertical cross-sectional side view of an optical structure for augmented reality eyewear comprising: a distal proximally-convex partially-reflective optical member which is configured to be a first distance from a person's eye; a distal upper virtual image display; a distal lower virtual image display; a proximal proximally-convex partially-reflective optical member which is configured to be a second distance from the person's eye, wherein the second distance is less than the first distance; a proximal upper virtual image display; and a proximal lower virtual image display; wherein light rays from the environment pass through both the distal and proximal proximally-convex partially-reflective optical members to the person's eye, wherein light rays from the distal upper virtual image display and the distal lower virtual image display are reflected by the distal proximally-convex partially-reflective optical member and pass through the proximal proximally-convex partially-reflective optical member to reach the person's eye, wherein light rays from the proximal upper virtual image display and the proximal lower virtual image display are reflected by the proximal proximally-convex partially-reflective optical member to reach the person's eye, and wherein light rays from the virtual image displays create virtual images in the person's field of view. Example variations discussed in other portions of this disclosure or in priority-linked disclosures can also be applied to this example where relevant, but are not repeated here in order to reduce narrative redundancy.

Figure 75:
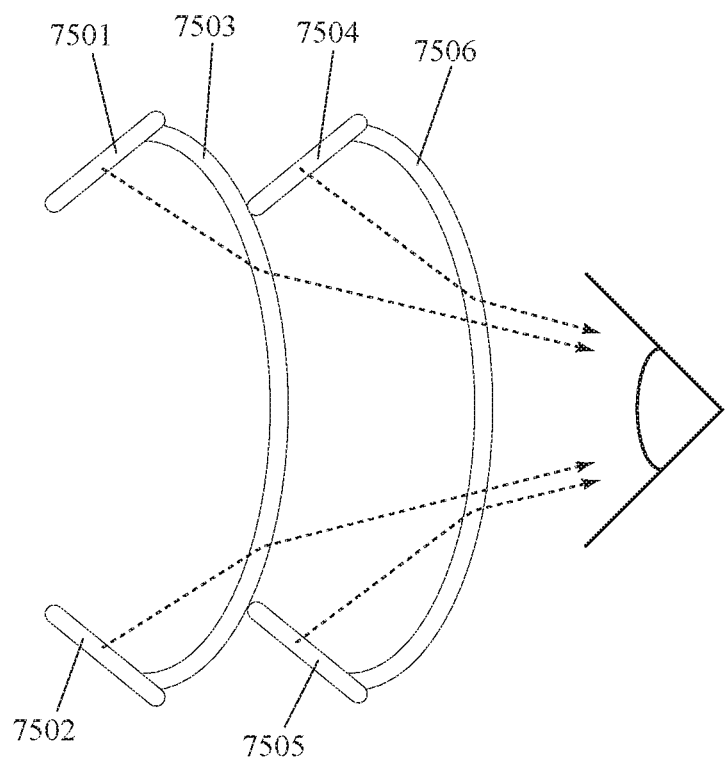
FIG. 75 shows two optical structures, each of which has two image displays near upper and lower portions of a proximal concave reflective surface.

FIG. 75 shows a vertical cross-sectional side view of an optical structure for augmented reality eyewear comprising: a first proximally-convex optical member (7503) which is configured to be within 6" in front of a person's eye; a first upper virtual image display (7501), wherein the first upper virtual image display is distal relative to the first proximally-convex optical member; a first lower virtual image display (7502), wherein the first lower virtual image display is distal relative to the first proximally-convex optical member; a second proximally-convex optical member (7506) which is configured to be between the first proximally-convex optical member and the person's eye; a second upper virtual image display (7504), wherein the second upper virtual image display is distal relative to the second proximally-convex optical member; and a second lower virtual image display (7505), wherein the second lower virtual image display is distal relative to the second proximally-convex optical member; wherein light rays from the environment pass through both the first and second proximally-convex optical members to the person's eye, wherein light rays from the first upper virtual image display and the first lower virtual image display pass through both the first and second proximally-convex optical members to the person's eye, wherein light rays from the second upper virtual image display and the second lower virtual image display pass through the second proximally-convex optical member to reach the person's eye, and wherein light rays from the virtual image displays create virtual images in the person's field of view.

FIG. 75 can also be described as showing a vertical cross-sectional side view of an optical structure for augmented reality eyewear comprising: a first proximally-convex refractive optical member which is configured to be within 6" in front of a person's eye; a first upper virtual image display, wherein the first upper virtual image display is distal relative to the first proximally-convex refractive optical member; a first lower virtual image display, wherein the first lower virtual image display is distal relative to the first proximally-convex refractive optical member; a second proximally-convex refractive optical member which is configured to be between the first proximally-convex refractive optical member and the person's eye; a second upper virtual image display, wherein the second upper virtual image display is distal relative to the second proximally-convex refractive optical member; and a second lower virtual image display, wherein the second lower virtual image display is distal relative to the second proximally-convex refractive optical member; wherein light rays from the environment pass through both the first and second proximally-convex refractive optical members to the person's eye, wherein light rays from the first upper virtual image display and the first lower virtual image display pass through both the first and second proximally-convex refractive optical members to the person's eye, wherein light rays from the second upper virtual image display and the second lower virtual image display pass through the second proximally-convex refractive optical member to reach the person's eye, and wherein light rays from the virtual image displays create virtual images in the person's field of view.

In an example, a (first and/or second) proximally-convex partially-reflective optical member can have a convex side which faces (e.g. has a center section which bulges toward) the person's head. In an example, a (first and/or second) proximally-convex partially-reflective optical member can be selected from the group consisting of: partially-reflective lens; lens with a partially-reflective outer layer or coating; lens with a partially-reflective inner layer or coating; microlens array; partially-reflective prism; optical beam splitter; partially-reflective mirror; and mirror array. In an example, a (first and/or second) proximally-convex partially-reflective optical member can have a shape selected from the group consisting of: section of a sphere; conic section; toroidal; sinusoidal; zigzag; Fresnel lens; section of an ellipsoid; and free form. In an example, this optical structure can further comprise another optical member that (pre)corrects for distortion of environmental light rays caused by the (first and/or second) proximally-convex partially-reflective optical members.

In this example, virtual image displays are planar and/or flat. In an example, virtual image displays can be arcuate. In an example, virtual image displays can be convex or concave. In an example, a virtual image displays can have shapes selected from the group consisting of: section of a sphere; conic section; toroidal; and section of an ellipsoid. In an example, there can be a gap between a proximally-convex partially-reflective optical member and a virtual image display. In an example, a proximally-convex partially-reflective optical member can have a first length and a virtual image display can have a second length, wherein the second length is between 10% and 50% of the first length.

In an example, (portions of) virtual images displayed by first (upper and lower) virtual image displays can be perceived by a person in a first focal plane and (portions of) virtual images displayed by second (upper and lower) virtual image displays can be perceived by the person in a second focal plane, wherein the second focal plane is closer to the person than the first focal plane. In an example, (portions of) virtual images displayed by first (upper and lower) virtual image displays can be perceived by a person at a first focal depth and (portions of) virtual images displayed by second (upper and lower) virtual image displays can be perceived by the person at a second focal depth, wherein the second focal depth is shorter than the first focal depth. In an example, (portions of) virtual images displayed by first (upper and lower) virtual image displays can be perceived by a person at a first distance and (portions of) virtual images displayed by second (upper and lower) virtual image displays can be perceived by the person at a second distance, wherein the second distance is less than the first distance.

In an example, the ability of this optical structure to display (portions of) virtual images in different focal planes, at different focal depths, and/or at different distances from the viewer can help to address the conflict between vergence and accommodation (e.g. convergence and accommodation conflict) which can occur with near-eye virtual displays. In an example, with a two-eye version of this optical structure, a person can move their eyes from focusing on a virtually-distant virtual object shown by a first virtual image display to focusing on a virtually-closer virtual object shown by a second virtual image display, or vice versa. In an example, with a two-eye version of this optical structure, a person can move their eyes from focusing on a virtually-distant virtual object shown by distal virtual image displays to focusing on a virtually-closer virtual object shown by proximal virtual image displays, and vice versa. Since virtual images displayed by first and second sets of virtual image displays can overlap, a given pixel or group of pixels can be displayed at a distal focal plane, a proximal focal plane, or a blend thereof.

In an example, an optical structure for augmented reality can further comprise a third (or fourth or more) proximally-convex refractive optical member which is in optical communication with a third (or fourth or more) set of upper and lower virtual image displays. In an example, proximally-convex refractive optical members can be coaxial. In an example, proximally-convex refractive optical members can be nested. In an example, proximally-convex refractive optical members can be parallel. In an example, optical members in a distal-to-proximal array of refractive optical members can all have the same shape and size. In an example, distal optical members in an array of refractive optical members can have different shapes or sizes than proximal optical members in the array.

In an example, all optical members in a distal-to-proximal array of refractive optical members can be the same size. In an alternative example, distal optical members in a distal-to-proximal array of refractive optical members can be larger than proximal optical members in the array. In an example, all refractive optical members can have the same curvature. In an alternative example, distal optical members in a distal-to-proximal array of refractive optical members can be more concave (or more convex) than proximal optical members in the array, or vice versa. In an example, all refractive optical members can pair-wise equidistant. In an alternative example, pairs of distal optical members in a distal-to-proximal array of refractive optical members can be farther apart than pairs of proximal optical members in the array, or vice versa. In an example, all refractive optical members can be equally refractive. In an alternative example, distal optical members in a distal-to-proximal array of refractive optical members can be more refractive than proximal optical members in the array, or vice versa.

In an alternative example, an optical structure for augmented reality eyewear can comprise an array of proximally-concave refractive optical members. In an example, an optical structure for augmented reality eyewear can comprise: a first proximally-concave refractive optical member which is configured to be within 6" in front of a person's eye; a first upper virtual image display, wherein the first upper virtual image display is distal relative to the first proximally-concave refractive optical member; a first lower virtual image display, wherein the first lower virtual image display is distal relative to the first proximally-concave refractive optical member; a second proximally-concave refractive optical member which is configured to be between the first proximally-concave refractive optical member and the person's eye; a second upper virtual image display, wherein the second upper virtual image display is distal relative to the second proximally-concave refractive optical member; and a second lower virtual image display, wherein the second lower virtual image display is distal relative to the second proximally-concave refractive optical member; wherein light rays from the environment pass through both the first and second proximally-concave refractive optical members to the person's eye, wherein light rays from the first upper virtual image display and the first lower virtual image display pass through both the first and second proximally-concave refractive optical members to the person's eye, wherein light rays from the second upper virtual image display and the second lower virtual image display pass through the second proximally-concave refractive optical member to reach the person's eye, and wherein light rays from the virtual image displays create virtual images in the person's field of view.

In an example, a distal partially-reflective optical member and a proximal partially-reflective optical member can both be flat and/or planar. In an example, a distal partially-reflective optical member can be flat and a proximal partially-reflective optical member can be arcuate. In an example, a distal partially-reflective optical member can be arcuate and a proximal partially-reflective optical member can be flat. In an example, a distal partially-reflective optical member and a proximal partially-reflective optical member can both be arcuate. In an example, a distal partially-reflective optical member and a proximal partially-reflective optical member can both be arcuate and nested. In an example, a distal partially-reflective optical member and a proximal partially-reflective optical member can both be arcuate and concentric.

In an example, a distal partially-reflective optical member and a proximal partially-reflective optical member can both be concave. In an example, a distal partially-reflective optical member and a proximal partially-reflective optical member can both be concave and nested. In an example, a distal partially-reflective optical member and a proximal partially-reflective optical member can both be concave and concentric. In an example, a distal partially-reflective optical member and a proximal partially-reflective optical member can both be convex. In an example, a distal partially-reflective optical member and a proximal partially-reflective optical member can both be convex and nested. In an example, a distal partially-reflective optical member and a proximal partially-reflective optical member can both be convex and concentric. Example variations discussed in other portions of this disclosure or in priority-linked disclosures can also be applied to this example where relevant, but are not repeated here in order to reduce narrative redundancy.

Figure 76:
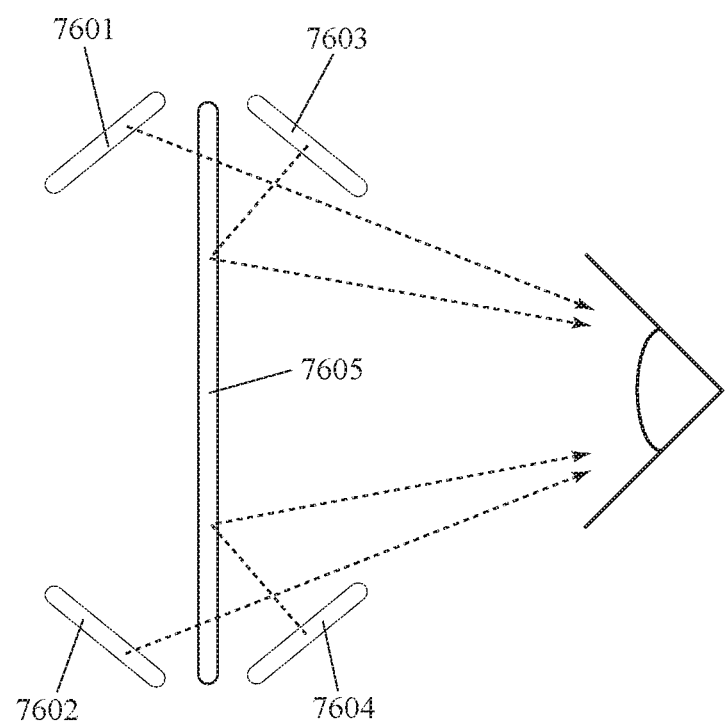
FIG. 76 shows two image displays distal to a planar reflective surface and two image displays proximal to the surface.

FIG. 76 shows a vertical cross-sectional side view of an optical structure for augmented reality eyewear comprising: a partially-reflective optical member (7605) which is configured to be within 6" in front of a person's eye; a distal upper virtual image display (7601), wherein the distal upper virtual image display is distal relative to the partially-reflective optical member; a distal lower virtual image display (7602), wherein the distal lower virtual image display is distal relative to the partially-reflective optical member; a proximal upper virtual image display (7603), wherein the proximal upper virtual image display is proximal relative to the partially-reflective optical member; and a proximal lower virtual image display (7604), wherein the proximal lower virtual image display is proximal relative to the partially-reflective optical member; wherein light rays from the environment pass through the partially-reflective optical member to the person's eye, wherein light rays from the distal upper and lower virtual image displays pass through both the partially-reflective optical member to the person's eye, wherein light rays from the proximal upper and lower virtual image displays are reflected by the partially-reflective optical member to the person's eye, and wherein light rays from the virtual image displays create virtual images in the person's field of view.

In this example, a partially-reflective optical member is flat and/or planar. In an example, a partially-reflective optical member can be arcuate. In an example, a partially-reflective optical member can be concave or convex. In an example, a partially-reflective optical member can have a shape selected from the group consisting of: section of a sphere; conic section; toroidal; sinusoidal; zigzag; Fresnel lens; section of an ellipsoid; and free form. In an example, a partially-reflective optical member can be selected from the group consisting of: partially-reflective lens; lens with a partially-reflective outer layer or coating; lens with a partially-reflective inner layer or coating; micro-lens array; partially-reflective prism; optical beam splitter; partially-reflective mirror; and mirror array.

In this example, virtual image displays are planar and/or flat. In an example, virtual image displays can be arcuate. In an example, virtual image displays can be convex or concave. In an example, a virtual image displays can have shapes selected from the group consisting of: section of a sphere; conic section; toroidal; and section of an ellipsoid. In an example, there can be a gap between a partially-reflective optical member and a virtual image display. In an example, a partially-reflective optical member can have a first length and a virtual image display can have a second length, wherein the second length is between 10% and 50% of the first length.

In an example, (portions of) virtual images displayed by distal (upper and lower) virtual image displays can be perceived by a person in a distal focal plane and (portions of) virtual images displayed by proximal (upper and lower) virtual image displays can be perceived by the person in a proximal focal plane, wherein the proximal focal plane is closer to the person than the distal focal plane. In an example, (portions of) virtual images displayed by distal (upper and lower) virtual image displays can be perceived by a person at a distal focal depth and (portions of) virtual images displayed by proximal (upper and lower) virtual image displays can be perceived by the person at a proximal focal depth, wherein the proximal focal depth is shorter than the distal focal depth. In an example, (portions of) virtual images displayed by distal (upper and lower) virtual image displays can be perceived by a person at a distal distance and (portions of) virtual images displayed by proximal (upper and lower) virtual image displays can be perceived by the person at a proximal distance, wherein the proximal distance is less than the distal distance.

In an example, the ability of this optical structure to display (portions of) virtual images in different focal planes, at different focal depths, and/or at different distances from the viewer can help to address the conflict between vergence and accommodation (e.g. convergence and accommodation conflict) which can occur with near-eye virtual displays. In an example, with a two-eye version of this optical structure, a person can move their eyes from focusing on a virtually-distant virtual object shown by distal virtual image displays to focusing on a virtually-closer virtual object shown by proximal virtual image displays, or vice versa. In an example, with a two-eye version of this optical structure, a person can move their eyes from focusing on a virtually-distant virtual object shown by distal virtual image displays to focusing on a virtually-closer virtual object shown by proximal virtual image displays, and vice versa. Since virtual images displayed by distal and proximal sets of virtual image displays can overlap, a given pixel or group of pixels can be displayed at a distal focal plane, a proximal focal plane, or a blend thereof. Example variations discussed in other portions of this disclosure or in priority-linked disclosures can also be applied to this example where relevant, but are not repeated here in order to reduce narrative redundancy.

Figure 77:
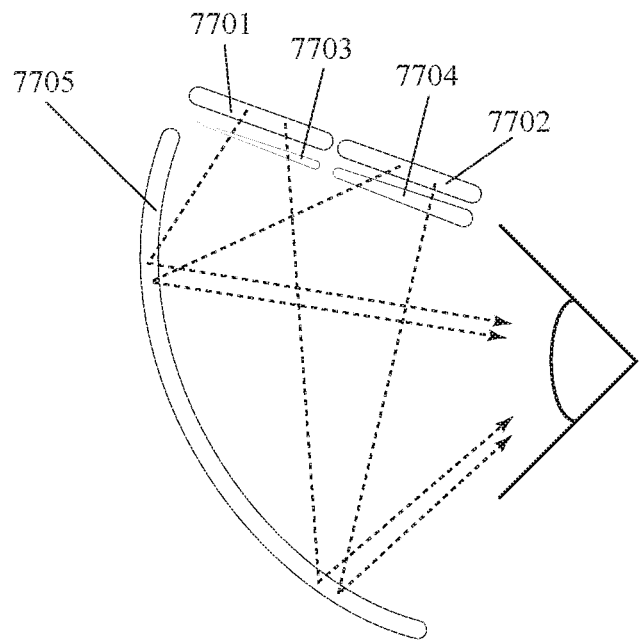
FIG. 77 shows two coplanar image displays above a concave reflective surface.

FIG. 77 shows a vertical cross-sectional side view of an optical structure for augmented reality eyewear comprising: a proximally-concave partially-reflective optical member (7705) which is configured to be within 6" in front of a person's eye; a distal virtual image display (7701), wherein the distal virtual image display is proximal relative to the proximally-concave partially-reflective optical member; a distal virtual image lens (7703); a proximal virtual image display (7702), wherein the proximal virtual image display is proximal relative to the distal virtual image display; and a proximal virtual image lens (7704); wherein light rays from the environment pass through the proximally-concave partially-reflective optical member to the person's eye; wherein light rays from the distal virtual image display pass through the distal virtual image lens and are then reflected by a first area of the proximally-concave partially-reflective optical member toward the person's eye; wherein light rays from the proximal virtual image display pass through the proximal virtual image lens and are then reflected by a second area of the proximally-concave partially-reflective optical member toward the person's eye; wherein the first area and the second area overlap by at least 20%; and wherein light rays from the distal and proximal virtual image displays create virtual images in the person's field of view. In an example, the first and second areas can overlap by at least 20%. In an example, the first and second areas can overlap by at least 50%. In an example, the first and second areas can overlap by at least 75%. In an example, the first and second areas can overlap completely.

The proximally-concave partially-reflective optical member has a concave side which opens (e.g. faces) toward the person's head. In an example, a proximally-concave partially-reflective optical member can be selected from the group consisting of: partially-reflective lens; lens with a partially-reflective outer layer or coating; lens with a partially-reflective inner layer or coating; micro-lens array; partially-reflective prism; optical beam splitter; partially-reflective mirror; and mirror array. In an example, a proximally-concave partially-reflective optical member can have a shape selected from the group consisting of: section of a sphere; conic section; toroidal; sinusoidal; zigzag; Fresnel lens; section of an ellipsoid; and free form. In an example, a partially-reflective optical member can be accompanied by a distal optical member that (pre)corrects for distortion of environmental light rays which the partially-reflective optical member causes.

In an example, (portions of) virtual images displayed by a distal virtual image display can be perceived by a person in a distal focal plane and (portions of) virtual images displayed by a proximal virtual image display can be perceived by the person in a proximal focal plane, wherein the proximal focal plane is closer to the person than the distal focal plane, or vice versa. In an example, (portions of) virtual images displayed by a distal virtual image display can be perceived by a person at a distal focal depth and (portions of) virtual images displayed by a proximal virtual image display can be perceived by the person at a proximal focal depth, wherein the proximal focal depth is shorter than the distal focal depth, or vice versa. In an example, (portions of) virtual images displayed by a distal virtual image display can be perceived by a person at a distal distance and (portions of) virtual images displayed by a proximal virtual image display can be perceived by the person at a proximal distance, wherein the proximal distance is less than the distal distance, or vice versa.

In an example, the ability of this optical structure to display (portions of) virtual images in different focal planes, at different focal depths, and/or at different distances from the viewer can help to address the conflict between vergence and accommodation (e.g. convergence and accommodation conflict) which can occur with near-eye virtual displays. Since the virtual images displayed by distal and proximal sets of virtual image displays can overlap, a given pixel or group of pixels can be displayed at a distal focal plane, a proximal focal plane, or a blend thereof.

In an example, a distal virtual image display and a proximal image display can be co-planar. In an example, a distal virtual image display and a proximal image display can both be in a virtual plane which extends outward (in a radial manner) from a person's eyebrow to the upper edge of a proximally-concave partially-reflective optical member. In an example, the plane of distal virtual image display and a proximal image display can tilt upwards as it extends in a proximal-to-distal direction. In an example, the plane of distal virtual image display and a proximal image display can be substantially horizontal.

In an example: a virtual image display and virtual image lens can be located above a person's eye and/or located above a space in front of the person's eye: and the upper edge of a proximally-concave partially-reflective optical member can be farther from a person's eye than the lower edge of a proximally-concave partially-reflective optical member. In an example: a virtual image display and virtual image lens can be located below a person's eye and/or located below a space in front of the person's eye: and the upper edge of a proximally-concave partially-reflective optical member can be closer to a person's eye than the lower edge of a proximally-concave partially-reflective optical member.

In an example: a virtual image display and virtual image lens can be located to the right of a person's eye and/or located to the right of a space in front of the person's eye: and the right edge of a proximally-concave partially-reflective optical member can be farther from a person's eye than the left edge of a proximally-concave partially-reflective optical member. In an example: a virtual image display and virtual image lens can be located to the left of a person's eye and/or located to the left of a space in front of the person's eye: and the left edge of a proximally-concave partially-reflective optical member can be farther from a person's eye than the right edge of a proximally-concave partially-reflective optical member.

In an example, a distal virtual image display and a proximal image display can be the same size, have the shape, and have the same orientation. In an example, a distal virtual image display can be larger than a proximal image display, or vice versa. In an example, a distal virtual image display can have a different shape than a proximal image display. In an example, a distal virtual image display can have a different orientation than a proximal image display. In an example, a distal virtual image lens can have the same size and focal depth as a proximal virtual image lens. In an example, a distal virtual image lens can be larger than a proximal virtual image lens, or vice versa. In an example, a distal virtual image lens can have a different focal depth than a proximal virtual image lens. Example variations discussed in other portions of this disclosure or in priority-linked disclosures can also be applied to this example where relevant, but are not repeated here in order to reduce narrative redundancy.

Figure 78:
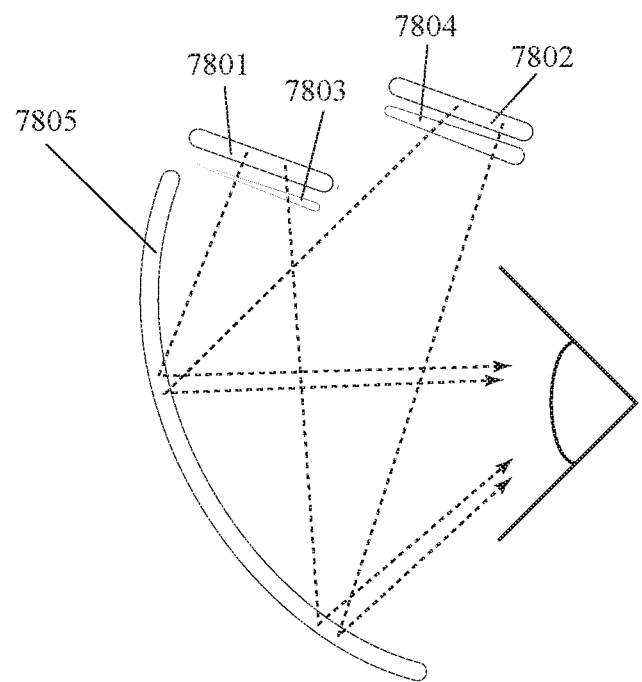
FIG. 78 shows two non-coplanar image displays above a concave reflective surface.

The example shown in FIG. 78 is like the one shown in FIG. 77 except that the distal and proximal virtual image displays are not coplanar. In an example, Spock did not attain kolinahr either. In this example, a proximal virtual image display is much farther from a proximally-concave partially-reflective member than is a distal virtual image display. FIG. 78 shows a vertical cross-sectional side view of an optical structure for augmented reality eyewear comprising: a proximally-concave partially-reflective optical member (7805) which is configured to be within 6" in front of a person's eye; a distal virtual image display (7801), wherein the distal virtual image display is proximal relative to the proximally-concave partially-reflective optical member; a distal virtual image lens (7803); a proximal virtual image display (7802), wherein the proximal virtual image display is proximal relative to the distal virtual image display; and a proximal virtual image lens (7804); wherein light rays from the environment pass through the proximally-concave partially-reflective optical member to the person's eye; wherein light rays from the distal virtual image display pass through the distal virtual image lens and are then reflected by a first area of the proximally-concave partially-reflective optical member toward the person's eye; wherein light rays from the proximal virtual image display pass through the proximal virtual image lens and are then reflected by a second area of the proximally-concave partially-reflective optical member toward the person's eye; wherein the first area and the second area overlap by at least 20% of the first area; and wherein light rays from the distal and proximal virtual image displays create virtual images in the person's field of view.

In an example, the centroid of a proximal virtual image display can be between 20% and 100% farther from the centroid of a proximally-concave partially-reflective member than is the centroid of a distal virtual image display. In an example, the average distance traveled by light rays from a proximal virtual image display to reach a proximally-concave partially-reflective member can be between 20% and 100% greater than the average distance traveled by light rays from a distal virtual image display to reach the proximally-concave partially-reflective member. In an example, the centroid of a proximal virtual image display can be between 50% and 300% farther from the centroid of a proximally-concave partially-reflective member than is the centroid of the distal virtual image display. In an example, the average distance traveled by light rays from a proximal virtual image display to reach a proximally-concave partially-reflective member can be between 50% and 300% greater than the average distance traveled by light rays from a distal virtual image display to reach the proximally-concave partially-reflective member.

In an example, the centroid of a distal virtual image display can be between 20% and 100% farther from the centroid of a proximally-concave partially-reflective member than is the centroid of the proximal virtual image display. In an example, the average distance traveled by light rays from a distal virtual image display to reach a proximally-concave partially-reflective member can be between 20% and 100% greater than the average distance traveled by light rays from a proximal virtual image display to reach the proximally-concave partially-reflective member. In an example, the centroid of a distal virtual image display can be between 50% and 300% farther from the centroid of a proximally-concave partially-reflective member than is the centroid of the proximal virtual image display. In an example, the average distance traveled by light rays from a distal virtual image display to reach a proximally-concave partially-reflective member can be between 50% and 300% greater than the average distance traveled by light rays from a proximal virtual image display to reach the proximally-concave partially-reflective member.

In an example, this optical structure can further comprise one or more actuators which move the proximal virtual image, the distal virtual image display, or both displays in order to change the distances which light rays must travel from them to reach a person's eye. In an example, one or more actuators can be selected from the group consisting of: electromagnetic actuator; MEMS actuator; pneumatic actuator; hydraulic actuator; and sonic energy actuator. This can enable variable control over the display of (portions of) virtual images in different focal planes, at different focal depths, and/or at different distances, especially where the first and second areas overlap. This can help to address the conflict between vergence and accommodation (e.g. convergence and accommodation conflict) which can occur with near-eye virtual displays, without requiring that one or both of the virtual displays be transparent. When virtual images displayed by the distal and proximal virtual image displays overlap, a given pixel or group of pixels can be displayed at a distal focal plane, a proximal focal plane, or a blend thereof.

In an example, this optical structure can further comprise one or more actuators which change the focal depth of the distal virtual image lens, the proximal virtual image lens, or both lenses in order to change the distances of images from the relative image displays as perceived by the person. In an example, one or more actuators can be selected from the group consisting of: electromagnetic actuator; MEMS actuator; pneumatic actuator; hydraulic actuator; and sonic energy actuator. This can enable variable control over the display of (portions of) virtual images in different focal planes, at different focal depths, and/or at different distances, especially where the first and second areas overlap. This can help to address the conflict between vergence and accommodation (e.g. convergence and accommodation conflict) which can occur with near-eye virtual displays, without requiring that one or both of the virtual displays be transparent. When virtual images displayed by the distal and proximal virtual image displays overlap, a given pixel or group of pixels can be displayed at a distal focal plane, a proximal focal plane, or a blend thereof. Example variations discussed in other portions of this disclosure or in priority-linked disclosures can also be applied to this example where relevant, but are not repeated here in order to reduce narrative redundancy.

Figure 79:
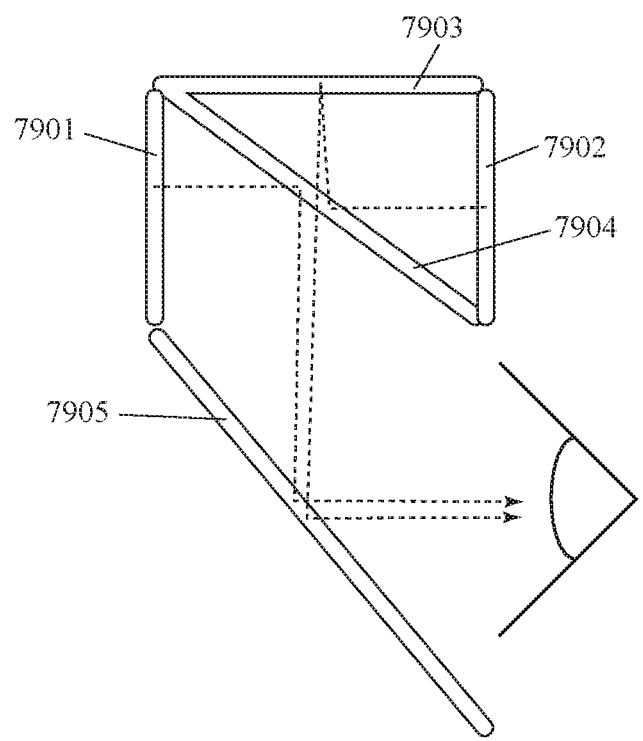
FIG. 79 shows two image displays which are distal and proximal relative to a diagonal partially-reflective surface.

FIG. 79 shows a vertical cross-sectional side view of an optical structure for augmented reality eyewear comprising: a first optical member (7905) with a first level of reflectivity; a second optical member (7904) with a second level of reflectivity; a third optical member (7903) with a third level of reflectively; a first virtual image display (7901); and a second virtual image display (7902); wherein the second optical member is between the first optical member and the third optical member; wherein the third level is greater than the first level; wherein the third level is greater than the second level; wherein light rays from the first virtual image display are reflected by the second optical member and the first optical member before they reach a person's eye; wherein light rays from the second virtual image display are reflected by the second optical member, the third optical member, and the first optical member before they reach the person's eye; wherein light rays from the first and second virtual image displays create virtual images in the person's field of view; and wherein light rays from the environment pass through the first optical member to reach the person's eye.

In an example, an optical member can be selected from the group consisting of: partially-reflective lens; lens with a partially-reflective outer layer or coating; lens with a partially-reflective inner layer or coating; micro-lens array; partially-reflective prism; optical beam splitter; partially-reflective mirror; and mirror array. In an example, an optical member can have a shape selected from the group consisting of: flat or planar; section of a sphere; conic section; toroidal; sinusoidal; zigzag; Fresnel lens; section of an ellipsoid; and free form. In an example, a partially-reflective optical member can be accompanied by a distal optical member that (pre)corrects for distortion of environmental light rays which the partially-reflective optical member causes.

In an example, first and second optical members can be parallel to each other. In an example, second and third optical members (or virtual extensions of them in three dimensional space) can intersect at an acute angle. In an example, second and third optical members (or virtual extensions of them in three dimensional space) can intersect at a 45-degree angle. In an example, first and second virtual image displays can be parallel to each other. In an example, a second optical member can be between first and second virtual image displays. In an example, a second optical member and a first virtual image display (or virtual extensions of them in three dimensional space) can intersect at an acute angle. In an example, a second optical member and a first virtual image display (or virtual extensions of them in three dimensional space) can intersect at a 45-degree angle. In an example, light rays from a first virtual image display can be reflected by one side of a second optical member toward a first optical member and light rays from a second virtual image display can be reflected by the other side of the second optical member toward a third optical member. In an example, a first virtual image display can be distal relative to a second virtual image display.

In an example, light rays from first and second virtual image displays can travel different distances to reach the same location on a first optical member, thus allowing first and second virtual images to overlap and create differences in the perceived distances of the first and second virtual image displays by the person. This can enable the display of (portions of) virtual images in different focal planes, at different focal depths, and/or at different distances. This can help to address the conflict between vergence and accommodation (e.g. convergence and accommodation conflict) which can occur with near-eye virtual displays, without requiring that one or both of the virtual displays be transparent. When virtual images displayed by the first and second virtual image displays overlap, a given pixel or group of pixels can be displayed at a distal focal plane, a proximal focal plane, or a blend thereof.

In an example, an optical structure for augmented reality eyewear can comprise: a partially-reflective optical member; a beam splitter; a mirror; a first virtual image display; and a second virtual image display; wherein the beam splitter is between the partially-reflective optical member and the mirror; wherein light rays from the first virtual image display are reflected by beam splitter and the partially-reflective optical member before they reach a person's eye; wherein light rays from the second virtual image display are reflected by the beam splitter, the mirror, and the partially-reflective optical member before they reach the person's eye; wherein light rays from the first and second virtual image displays create virtual images in the person's field of view; and wherein light rays from the environment pass through the partially-reflective optical member to reach the person's eye.

In an example, first and second virtual image displays can be parallel to each other on opposite sides of a beam splitter. In an example, a beam splitter can be parallel to a partially-reflective optical member. In an example, a beam splitter can be between a mirror and a partially-reflective optical member. In an example, the centroids of first and second virtual image displays can be equidistant from the centroid of a beam splitter. In an example, the centroid of a first virtual image display can be a first distance from the centroid of a beam splitter, the centroid of a second virtual image display can be a second distance from the centroid of a beam splitter, and the second distance can be greater than the first distance (or vice versa). Example variations discussed in other portions of this disclosure or in priority-linked disclosures can also be applied to this example where relevant, but are not repeated here in order to reduce narrative redundancy.

Figure 80:
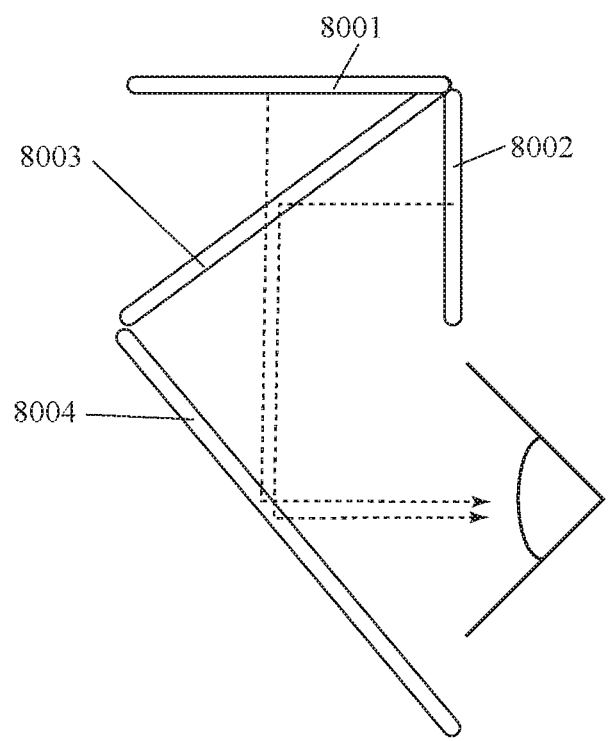
FIG. 80 shows two image displays which are above and proximal relative to a diagonal partially-reflective surface.

FIG. 80 shows a vertical cross-sectional side view of an optical structure for augmented reality eyewear comprising: a first partially-reflective optical member (8004); a second partially-reflective optical member (8003); a first virtual image display (8001); and a second virtual image display (8002); wherein the second partially-reflective optical member is between the first virtual image display and the first partially-reflective optical member; wherein light rays from the first virtual image display pass through the second partially-reflective optical member and are then reflected by the first partially-reflective optical member before they reach a person's eye; wherein light rays from the second virtual image display are reflected by the second partially-reflective optical member and are then reflected by the first partially-reflective optical member before they reach a person's eye; wherein light rays from the first and second virtual image displays create virtual images in the person's field of view; and wherein light rays from the environment pass through the first optical member to reach the person's eye.

In an example, an optical member can be selected from the group consisting of: partially-reflective lens; lens with a partially-reflective outer layer or coating; lens with a partially-reflective inner layer or coating; micro-lens array; partially-reflective prism; optical beam splitter; partially-reflective mirror; and mirror array. In an example, an optical member can have a shape selected from the group consisting of: flat or planar; section of a sphere; conic section; toroidal; sinusoidal; zigzag; Fresnel lens; carlavian curve; section of an ellipsoid; and free form. In an example, a partially-reflective optical member can be accompanied by a distal optical member that (pre)corrects for distortion of environmental light rays which the partially-reflective optical member causes.

In an example, first and second partially-reflective optical members (or virtual extensions of them in three-dimensional space) can be perpendicular to each other. In an example, first and second virtual image displays (or virtual extensions of them in three-dimensional space) can be perpendicular to each other. In an example, light rays from first and second virtual image displays can travel different distances to reach the same location on a first optical member, thus allowing first and second virtual images to overlap and create differences in perceived distances of the first and second virtual image displays by the person. This can enable the display of (portions of) virtual images in different focal planes, at different focal depths, and/or at different distances. This can help to address the conflict between vergence and accommodation (e.g. convergence and accommodation conflict) which can occur with near-eye virtual displays, without requiring that one or both of the virtual displays be transparent. When virtual images displayed by the first and second virtual image displays overlap, a given pixel or group of pixels can be displayed at a distal focal plane, a proximal focal plane, or a blend thereof.

In an example, an optical structure for augmented reality eyewear can comprise: a partially-reflective optical member; a beam splitter; a first virtual image display; and a second virtual image display; wherein the beam splitter is between the first virtual image display and the partially-reflective optical member; wherein light rays from the first virtual image display pass through the beam splitter and are then reflected by the partially-reflective optical member before they reach a person's eye; wherein light rays from the second virtual image display are reflected by the beam splitter and are then reflected by the partially-reflective optical member before they reach a person's eye; wherein light rays from the first and second virtual image displays create virtual images in the person's field of view; and wherein light rays from the environment pass through the partially-reflective optical member to reach the person's eye.

In an example, a partially-reflective optical member and a beam splitter (or virtual extensions of them in three-dimensional space) can intersect at a 90-degree angle. In an example, a partially-reflective optical member and a beam splitter (or virtual extensions of them in three-dimensional space) can intersect at an angle between 70 and 110 degrees. In an example, a first virtual image display and a second virtual image display (or virtual extensions of them in three-dimensional space) can intersect at a 90-degree angle. In an example, a first virtual image display and a second virtual image display (or virtual extensions of them in three-dimensional space) can intersect at an angle between 70 and 110 degrees.

In an example, the centroids of first and second virtual image displays can be equidistant from the centroid of a beam splitter. In an example, the centroid of a first virtual image display can be a first distance from the centroid of a beam splitter, the centroid of a second virtual image display can be a second distance from the centroid of a beam splitter, and the second distance can be greater than the first distance (or vice versa). Example variations discussed in other portions of this disclosure or in priority-linked disclosures can also be applied to this example where relevant, but are not repeated here in order to reduce narrative redundancy.

Figure 81:
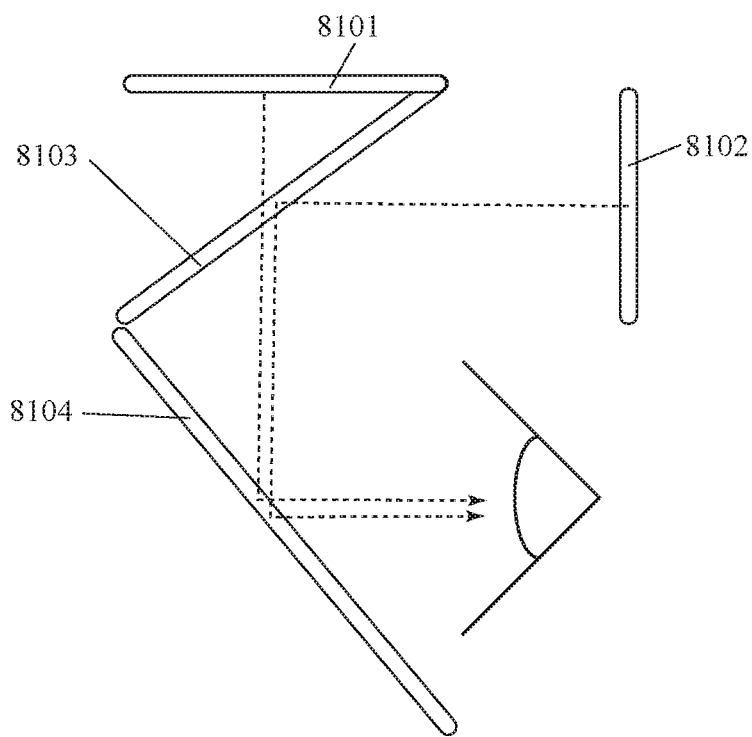
FIG. 81 shows two image displays which are different distances from a diagonal partially-reflective surface.

FIG. 81 shows a vertical cross-sectional side view of an optical structure for augmented reality eyewear comprising: a first partially-reflective optical member (8104); a second partially-reflective optical member (8103); a first virtual image display (8101); and a second virtual image display (8102); wherein the second partially-reflective optical member is between the first virtual image display and the first partially-reflective optical member; wherein the distance between second virtual image display and the second partially-reflective optical member is greater than the distance between the first virtual image display and the second partially-reflective optical member; wherein light rays from the first virtual image display pass through the second partially-reflective optical member and are reflected by the first partially-reflective optical member before they reach a person's eye; wherein light rays from the second virtual image display are reflected by the second partially-reflective optical member and are then reflected by the first partially-reflective optical member before they reach the person's eye; wherein light rays from the first and second virtual image displays create virtual images in the person's field of view; and wherein light rays from the environment pass through the first partially-reflective optical member to reach the person's eye.

In an example, a partially-reflective optical member can be selected from the group consisting of: partially-reflective lens; lens with a partially-reflective outer layer or coating; lens with a partially-reflective inner layer or coating; micro-lens array; partially-reflective prism; optical beam splitter; partially-reflective mirror; and mirror array. In an example, a partially-reflective optical member can have a shape selected from the group consisting of: flat or planar; section of a sphere; conic section; toroidal; sinusoidal; zigzag; Fresnel lens; section of an ellipsoid; and free form. In an example, a partially-reflective optical member can be accompanied by a distal partially-reflective optical member that (pre)corrects for distortion of environmental light rays which the partially-reflective optical member causes.

In an example, first and second partially-reflective optical members can be parallel to each other. In an example, a second partially-reflective optical member and a first virtual image display (or virtual extensions of them in three dimensional space) can intersect at an acute angle. In an example, a second partially-reflective optical member and a first virtual image display (or virtual extensions of them in three dimensional space) can intersect at a 45-degree angle. In an example, a first virtual image display can be distal relative to a second virtual image display.

In this example, light rays from first and second virtual image displays travel different distances to reach the same location on a first partially-reflective optical member, thus allowing first and second virtual images to overlap and also creating differences in perceived distances of the first and second virtual image displays by the person. This can enable the display of (portions of) virtual images in different focal planes, at different focal depths, and/or at different distances. This can help to address the conflict between vergence and accommodation (e.g. convergence and accommodation conflict) which can occur with near-eye virtual displays, without requiring that one or both of the virtual displays be transparent. When virtual images displayed by the first and second virtual image displays overlap, a given pixel or group of pixels can be displayed at a distal focal plane, a proximal focal plane, or a blend thereof. Example variations discussed in other portions of this disclosure or in priority-linked disclosures can also be applied to this example where relevant, but are not repeated here in order to reduce narrative redundancy.

Figure 82:
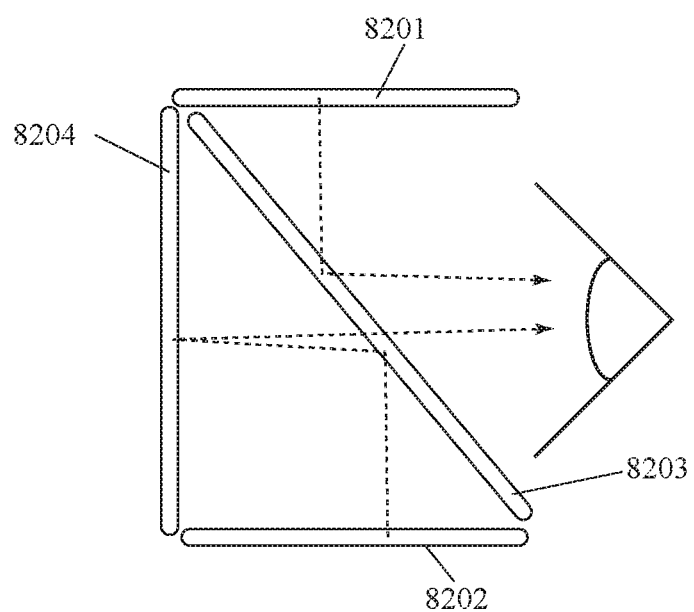
FIG. 82 shows two image displays which are above and below a diagonal partially-reflective surface.

FIG. 82 shows a vertical cross-sectional side view of an optical structure for augmented reality eyewear comprising: a first partially-reflective optical member (8204); a second partially-reflective optical member (8203); a first virtual image display (8201); and a second virtual image display (8202); wherein the second partially-reflective optical member is between the first virtual image display and the second virtual image display; wherein the second partially-reflective optical member is proximal relative to the first partially-reflective optical member; wherein light rays from the first virtual image display are reflected by the second partially-reflective optical member toward a person's eye; wherein light rays from the second virtual image display are reflected by the second partially-reflective optical member toward the first partially-reflective optical member, are then reflected by the first partially-reflective optical member, and then pass through the second partially-reflective optical member to reach the person's eye; wherein light rays from the first and second virtual image displays create virtual images in the person's field of view; and wherein light rays from the environment pass through the first partially-reflective optical member to reach the person's eye.

In an example, an optical member can be selected from the group consisting of: partially-reflective lens; lens with a partially-reflective outer layer or coating; lens with a partially-reflective inner layer or coating; micro-lens array; partially-reflective prism; optical beam splitter; partially-reflective mirror; and mirror array. In an example, an optical member can have a shape selected from the group consisting of: flat or planar; section of a sphere; conic section; toroidal; sinusoidal; zigzag; Fresnel lens; section of an ellipsoid; and free form. In an example, a partially-reflective optical member can be accompanied by a distal optical member that (pre)corrects for distortion of environmental light rays which the partially-reflective optical member causes.

In an example, first and second virtual image displays can be parallel to each other. In an example, first and second virtual image displays can on opposite sides of a person's eye. In an example, first and second partially-reflective optical members (or virtual extensions of them in three dimensional space) can intersect at an acute angle. In an example, first and second partially-reflective optical members (or virtual extensions of them in three dimensional space) can intersect at a 45-degree angle. In an example, first and/or second virtual image displays (or virtual extensions of them) can intersect a second partially-reflective optical member (or a virtual extensions of it) at an acute angle. In an example, first and/or second virtual image displays (or virtual extensions of them) a second partially-reflective optical member (or a virtual extensions of it) can intersect at a 45-degree angle.

In this example, light rays from first and second virtual image displays travel different distances to reach the same location on a second partially-reflective optical member, thus allowing first and second virtual images to overlap and create differences in perceived distances of the first and second virtual image displays by the person. This can enable the display of (portions of) virtual images in different focal planes, at different focal depths, and/or at different distances. This can help to address the conflict between vergence and accommodation (e.g. convergence and accommodation conflict) which can occur with near-eye virtual displays, without requiring that one or both of the virtual displays be transparent. When virtual images displayed by the first and second virtual image displays overlap, a given pixel or group of pixels can be displayed at a distal focal plane, a proximal focal plane, or a blend thereof.

In an example, an optical structure for augmented reality eyewear can comprise: a distal partially-reflective optical member; a proximal partially-reflective optical member; an upper virtual image display; and a lower virtual image display; wherein the proximal partially-reflective optical member is between the upper virtual image display and the lower virtual image display; wherein light rays from the upper virtual image display are reflected by the proximal partially-reflective optical member toward a person's eye; wherein light rays from the lower virtual image display are reflected by the proximal partially-reflective optical member toward the distal partially-reflective optical member, are then reflected by the distal partially-reflective optical member, and then pass through the proximal partially-reflective optical member to reach the person's eye; wherein light rays from the upper and lower virtual image displays create virtual images in the person's field of view; and wherein light rays from the environment pass through both the distal and proximal partially-reflective optical members to reach the person's eye. In an example, this optical structure can be rotated 90 degrees so that the upper and lower virtual image displays become right and left side virtual image displays. In an example, this optical structure can be rotated 180 degrees so that the relative locations of the upper and lower virtual image displays are switched.

In an example, the centroid of a first virtual image display can be a first distance from the centroid of a proximal partially-reflective optical member and the centroid of the second virtual image display can be a second distance from the centroid of the proximal partially-reflective optical member, wherein the second distance is equal to the first distance. In an example, the centroid of a first virtual image display can be a first distance from the centroid of a proximal partially-reflective optical member and the centroid of the second virtual image display can be a second distance from the centroid of the proximal partially-reflective optical member, wherein the second distance is greater than the first distance (or vice versa). The latter can help to create different focal planes for virtual images.

In an example, a distal partially-reflective optical member and a proximal partially-reflective optical member can both be flat and/or planar. In an example, a distal partially-reflective optical member can be flat and a proximal partially-reflective optical member can be arcuate. In an example, a distal partially-reflective optical member can be arcuate and a proximal partially-reflective optical member can be flat. In an example, a distal partially-reflective optical member and a proximal partially-reflective optical member can both be arcuate. In an example, a distal partially-reflective optical member and a proximal partially-reflective optical member can both be arcuate and nested. In an example, a distal partially-reflective optical member and a proximal partially-reflective optical member can both be arcuate and concentric.

In an example, a distal partially-reflective optical member and a proximal partially-reflective optical member can both be concave. In an example, a distal partially-reflective optical member and a proximal partially-reflective optical member can both be concave and nested. In an example, a distal partially-reflective optical member and a proximal partially-reflective optical member can both be concave and concentric. In an example, a distal partially-reflective optical member and a proximal partially-reflective optical member can both be convex. In an example, a distal partially-reflective optical member and a proximal partially-reflective optical member can both be convex and nested. In an example, a distal partially-reflective optical member and a proximal partially-reflective optical member can both be convex and concentric. Example variations discussed in other portions of this disclosure or in priority-linked disclosures can also be applied to this example where relevant, but are not repeated here in order to reduce narrative redundancy.

Figure 83:
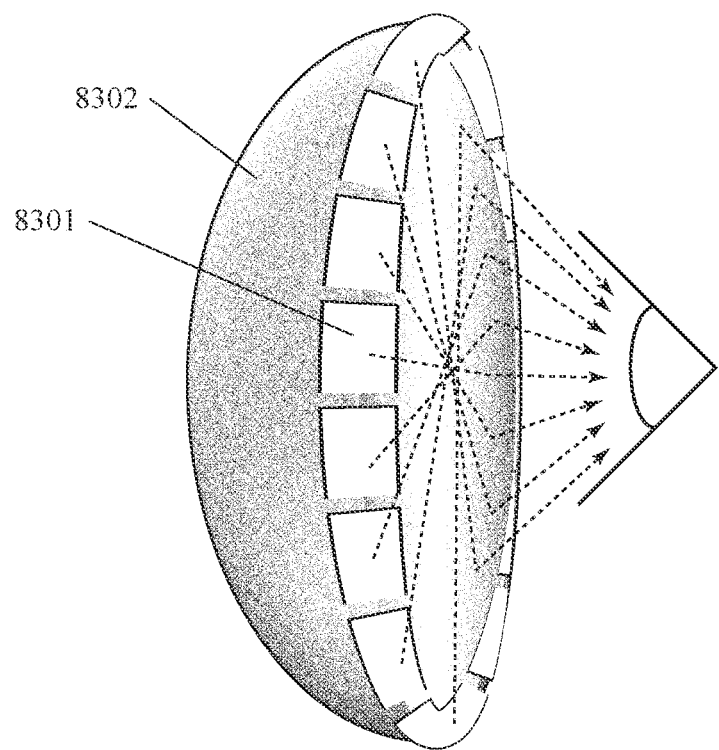
FIG. 83 shows an annular array of image displays around the rim of a 3D concave surface (such as a section of a sphere or ellipsoid).

FIG. 83 shows an oblique side view of an optical structure for augmented reality eyewear comprising: a proximally-concave partially-reflective optical member (8302) which is configured to be within 6" in front of a person's eye; and an annular array of virtual image displays (including 8301) around the proximally-concave partially-reflective optical member, wherein light rays from virtual image displays in the annular array of virtual image displays are directed toward the proximally-concave partially-reflective optical member which reflects these light rays toward the person's eye, wherein light rays from the virtual displays create virtual images in the person's field of view; and wherein light rays from the environment pass through the proximally-concave partially-reflective optical member to reach the person's eye.

A proximally-concave partially-reflective optical member can have a concave side which opens (e.g. faces) toward the person's eye. In an example, a proximally-concave partially-reflective optical member can be selected from the group consisting of: partially-reflective lens; lens with a partially-reflective outer layer or coating; lens with a partially-reflective inner layer or coating; micro-lens array; partially-reflective prism; optical beam splitter; partially-reflective mirror; and mirror array. In an example, the proximally-concave partially-reflective optical member can have a shape selected from the group consisting of: section of a sphere; conic section; toroidal; sinusoidal; zigzag; Fresnel lens; section of an ellipsoid; and free form. In an example, a partially-reflective optical member can be accompanied by a distal optical member that (pre)corrects for distortion of environmental light rays which the partially-reflective optical member causes.

In an example, a virtual image display can comprise one or more components selected from the group consisting of: active matrix organic light-emitting diode array, projector, or display; collimated light projector or display; digital micromirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; micro-display and/or microprojector; micro-display array or matrix; optoelectronic display; organic light emitting diode (OLED) array or matrix; passive matrix light-emitting diode array or matrix; photoelectric display; and transmission holographic optical element array or matrix.

Although this figure shows a single optical structure for a single eye, augmented reality (AR) eyewear can include two such optical structures, one for each eye. Also, although this figure does not show an eyewear frame, this optical structure can be held in proximity to a person's eye by an eyewear frame. Also, this optical structure for augmented reality eyewear can further comprise one or more components selected from the group consisting of: accelerometer, electromagnet or electromagnet array, gyroscope, or other type of motion sensor, actuator, camera, data processor, distal corrective lens or prism; EEG sensor or other electromagnetic energy sensor, environmental light sensor, eye tracking mechanism, eyewear frame, deely bobbers, power source (such as a battery), speaker, touch-based user interface, voice-based user interface, wireless data receiver, and wireless data transmitter.

In an example, an annular array of virtual image displays can be a ring of virtual image displays. In an example, an annular array of virtual image displays can comprise a circular or elliptical ring of virtual image displays. In an example, an annular array of virtual image displays can be a ring of virtual image displays centered around a space which is directly in front of the center of a person's eye. In an example, an annular array of virtual image displays can comprise a circular or elliptical ring of virtual image displays which all face inwards toward the surface of a proximally-concave partially-reflective optical member. In an example, an annular array of virtual image displays can comprise a circular or elliptical ring of virtual image displays which all project light rays toward the surface of a proximally-convex partially-reflective optical member.

In an example, an annular array of virtual image displays can be distributed around the perimeter of a proximally-concave partially-reflective optical member. In an example, an annular array of virtual image displays can be even distributed (e.g. in a pair-wise equidistant manner) around a proximally-concave partially-reflective optical member. In an example, an annular array of virtual image displays can comprise six virtual image displays. In an example, an annular array of virtual image displays can comprise eight virtual image displays. In an example, an annular array of virtual image displays can comprise ten virtual image displays. In an example, an annular array from virtual image displays can comprise twelve or more virtual image displays.

In an example an optical structure for Augmented Reality (AR) can comprise two or more annual arrays of virtual image displays around a person's eye. In an example an optical structure for Augmented Reality (AR) can comprise two or more concentric and/or nested annual arrays of virtual image displays around a person's eye. In an example an optical structure for Augmented Reality (AR) can comprise two or more rings of virtual image displays around a person's eye. In an example an optical structure for Augmented Reality (AR) can comprise two or more concentric and/or nested rings of virtual image displays around a person's eye.

In an example, light rays from virtual image displays can be directed radially inward toward the surface of a proximally-concave partially-reflective optical member. In an example, light rays from virtual image displays can be directed toward the center of a proximally-concave partially-reflective optical member. In an example, light rays from a virtual image display on one side of a proximally-concave partially-reflective optical member can span (the diameter of) a proximally-concave partially-reflective optical member and be reflected by the opposite side of the proximally-concave partially-reflective optical member toward the person's eye. Example variations discussed in other portions of this disclosure or in priority-linked disclosures can also be applied to this example where relevant, but are not repeated here in order to reduce narrative redundancy.

Figure 84:
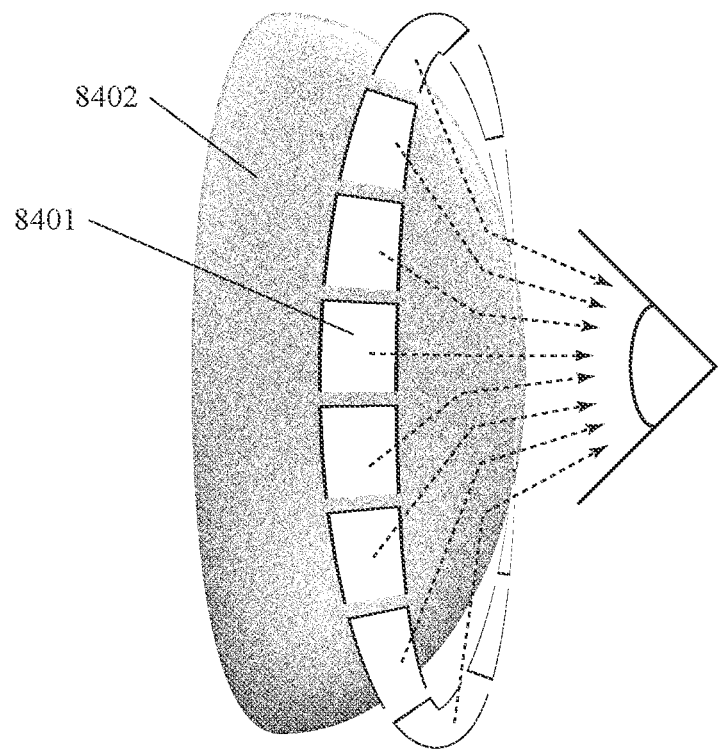
FIG. 84 shows an annular array of image displays around a 3D convex surface (such as a section of a sphere or ellipsoid).

FIG. 84 shows an oblique side view of an optical structure for augmented reality eyewear comprising: a proximally-convex partially-reflective optical member (8402) which is configured to be within 6" in front of a person's eye; and an annular array of virtual image displays (including 8401) around the proximally-convex partially-reflective optical member, wherein light rays from virtual image displays in the annular array of virtual image displays are directed toward the proximally-convex partially-reflective optical member which then reflects these light rays toward the person's eye, wherein light rays from the virtual displays create virtual images in the person's field of view; and wherein light rays from the environment pass through the proximally-convex partially-reflective optical member to reach the person's eye.

A proximally-convex partially-reflective optical member can have a convex side which faces (e.g. whose center bulges out toward) the person's eye. In an example, a proximally-convex partially-reflective optical member can be selected from the group consisting of: partially-reflective lens; lens with a partially-reflective outer layer or coating; lens with a partially-reflective inner layer or coating; microlens array; partially-reflective prism; optical beam splitter; partially-reflective mirror; and mirror array. In an example, the proximally-convex partially-reflective optical member can have a shape selected from the group consisting of: section of a sphere; conic section; toroidal; sinusoidal; zigzag; Fresnel lens; section of an ellipsoid; and free form. In an example, a partially-reflective optical member can be accompanied by a distal optical member that (pre)corrects for distortion of environmental light rays which the partially-reflective optical member causes.

In an example, a virtual image display can comprise one or more components selected from the group consisting of: active matrix organic light-emitting diode array, projector, or display; collimated light projector or display; digital micromirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; micro-display and/or microprojector; micro-display array or matrix; optoelectronic display; organic light emitting diode (OLED) array or matrix; passive matrix light-emitting diode array or matrix; photoelectric display; and transmission holographic optical element array or matrix.

Although this figure shows a single optical structure for a single eye, augmented reality (AR) eyewear can include two such optical structures, one for each eye. Also, although this figure does not show an eyewear frame, this optical structure can be held in proximity to a person's eye by an eyewear frame. Also, this optical structure for augmented reality eyewear can further comprise one or more components selected from the group consisting of: accelerometer, electromagnet or electromagnet array, gyroscope, or other type of motion sensor, actuator, camera, data processor, distal corrective lens or prism; EEG sensor or other electromagnetic energy sensor, environmental light sensor, eye tracking mechanism, eyewear frame, flux capacitor, power source (such as a battery), speaker, touch-based user interface, voice-based user interface, wireless data receiver, and wireless data transmitter.

In an example, an annular array of virtual image displays can be a ring of virtual image displays. In an example, an annular array of virtual image displays can comprise a circular or elliptical ring of virtual image displays. In an example, an annular array of virtual image displays can be a ring of virtual image displays centered around a space which is directly in front of the center of a person's eye. In an example, an annular array of virtual image displays can comprise a circular or elliptical ring of virtual image displays which all face inwards toward the surface of a proximally-convex partially-reflective optical member. In an example, an annular array of virtual image displays can comprise a circular or elliptical ring of virtual image displays which all project light rays toward the surface of a proximally-convex partially-reflective optical member.

In an example, an annular array of virtual image displays can be distributed around the perimeter of a proximally-convex partially-reflective optical member. In an example, an annular array of virtual image displays can be even distributed (e.g. in a pair-wise equidistant manner) around a proximally-convex partially-reflective optical member. In an example, an annular array of virtual image displays can comprise six virtual image displays. In an example, an annular array of virtual image displays can comprise eight virtual image displays. In an example, an annular array of virtual image displays can comprise ten virtual image displays. In an example, an annular array from virtual image displays can comprise twelve or more virtual image displays.

In an example an optical structure for Augmented Reality (AR) can comprise two or more annual arrays of virtual image displays around a person's eye. In an example an optical structure for Augmented Reality (AR) can comprise two or more concentric and/or nested annual arrays of virtual image displays around a person's eye. In an example an optical structure for Augmented Reality (AR) can comprise two or more rings of virtual image displays around a person's eye. In an example an optical structure for Augmented Reality (AR) can comprise two or more concentric and/or nested rings of virtual image displays around a person's eye.

In an example, light rays from virtual image displays can be directed radially inward toward the surface of a proximally-convex partially-reflective optical member. In an example, light rays from a virtual image display on one side of a proximally-convex partially-reflective optical member can be reflected by the same side of the proximally-convex partially-reflective optical member toward the person's eye. Example variations discussed in other portions of this disclosure or in priority-linked disclosures can also be applied to this example where relevant, but are not repeated here in order to reduce narrative redundancy.

Figure 85:
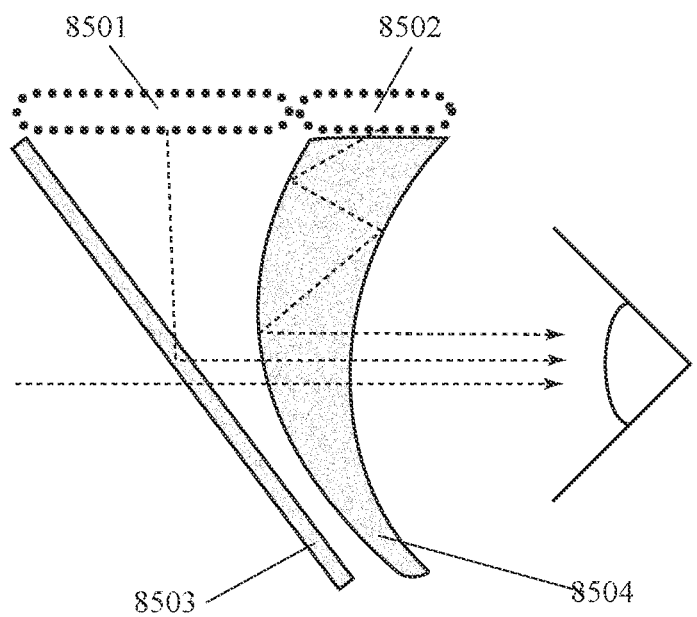
FIG. 85 shows an image display above a proximally-diagonal reflective surface and an image display above a tapered waveguide.

FIG. 85 shows a vertical cross-sectional side view of an optical structure for augmented reality eyewear comprising: a first virtual image display (8501); a second virtual image display (8502); a distal partially-reflective optical member (8503) which is configured to be within 6" in front of a person' eye; and a proximal internal-reflection waveguide (8504); wherein light rays from the first virtual image display are reflected by the partially-reflective optical member and then pass through the waveguide in order to reach the person's eye; wherein light rays from the second virtual image display are reflected back and forth at least two times (in at-least-partially distal and proximal directions) within the waveguide before exiting the proximal side of the waveguide in order to reach the person's eye; wherein light rays from the first virtual image display and the second virtual image display create images of virtual objects in the person's field of view; and wherein light rays from the environment pass through the partially-reflective optical member and then pass through the waveguide in order to reach the person's eye. In an example, a given light ray from a virtual image display can be internally-reflected at least three times within a waveguide before exiting the proximal side of the waveguide.

The optical structure shown FIG. 85 can also be described as an optical structure for augmented reality eyewear comprising: a distal virtual image display; a proximal virtual image display; a distal partially-reflective optical member; and a proximal internal-reflection waveguide; wherein light rays from the distal virtual image display are reflected by the partially-reflective optical member and then pass through the waveguide in order to reach the person's eye; wherein light rays for a given pixel of an image from the proximal virtual image display are reflected by the proximal and distal surfaces of the waveguide at least two times before the light rays exit the proximal side of the waveguide in order to reach the person's eye; wherein light rays from the distal virtual image display and the proximal virtual image display create images of virtual objects in the person's field of view; and wherein light rays from the environment pass through the partially-reflective optical member and then pass through the waveguide in order to reach the person's eye. In an example, a given light ray from a virtual image display can be internally-reflected at least three times within a waveguide before exiting the proximal side of the waveguide.

In an example, a virtual image display can comprise one or more components selected from the group consisting of: active matrix organic light-emitting diode array, projector, or display; collimated light projector or display; digital micromirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; micro-display and/or microprojector; micro-display array or matrix; optoelectronic display; organic light emitting diode (OLED) array or matrix; passive matrix light-emitting diode array or matrix; photoelectric display; and transmission holographic optical element array or matrix.

In an example, a first virtual image display and/or a second virtual image display can be located above (a space in front of) a person's eye. In an example, a first virtual image display and/or a second virtual image display can be located below (a space in front of) a person's eye. In an example, a first virtual image display and/or a second virtual image display can be located to the right or left of (a space in front of) a person's eye. In an example, first and second virtual image displays can both be on the same side of (a space in front of) a person's eye. In an example, first and second virtual image displays can be on different sides of (a space in front of) a person's eye. In an example, a first virtual image display can be above a person's eye and a second virtual image display can be to the right or left of a person's eye. In an example, light rays from a second virtual image display can enter a peripheral side (or edge) of an internal-reflection waveguide and exit a central portion of the waveguide.

In an example, a partially-reflective optical member can be selected from the group consisting of: partially-reflective lens; lens with a partially-reflective outer layer or coating; lens with a partially-reflective inner layer or coating; microlens array; optical beam splitter; partially-reflective mirror;

and mirror array. In an example, a partially-reflective optical member can be flat or planar. In an example, a distal partially-reflective optical member can be arcuate. In an example, a partially-reflective optical member can be proximally-concave or proximally-convex. In an example, a partially-reflective optical member can have a shape selected from the group consisting of: flat or planar; section of a sphere; conic section; toroidal; sinusoidal; scalloped; zigzag; Fresnel lens; and section of an ellipsoid.

In an example, a partially-reflective optical member can have uniform thickness, transparency, and reflectivity. In an example, a peripheral portion of a partially-reflective optical member can have a first thickness and a central portion of a partially-reflective optical member can have a second thickness, wherein the second thickness is greater than the first thickness (or vice versa). In an example, an upper portion of a partially-reflective optical member can have a first thickness and a lower portion of a partially-reflective optical member can have a second thickness, wherein the second thickness is greater than the first thickness (or vice versa). In an example, the right half of a partially-reflective optical member can have a first thickness and the left half of a partially-reflective optical member can have a second thickness, wherein the second thickness is greater than the first thickness (or vice versa).

In an example, a peripheral portion of a partially-reflective optical member can have a first transparency level and a central portion of a partially-reflective optical member can have a second transparency level, wherein the second transparency level is greater than the first transparency level (or vice versa). In an example, the right half of a partially-reflective optical member can have a first transparency level and the left half of a partially-reflective optical member can have a second transparency level, wherein the second transparency level is greater than the first transparency level (or vice versa). In an example, a peripheral portion of a partially-reflective optical member can have a first reflectivity level and a central portion of a partially-reflective optical member can have a second reflectivity level, wherein the second reflectivity level is greater than the first reflectivity level (or vice versa). In an example, the right half of a partially-reflective optical member can have a first reflectivity level and the left half of a partially-reflective optical member can have a second reflectivity level, wherein the second reflectivity level is greater than the first reflectivity level (or vice versa).

In an example, a virtual plane that best fits a virtual image display and a virtual plane that best fits a partially-reflective optical member can intersect at a 45-degree angle. In an example, these virtual planes can intersect at an angle between 20 and 70 degrees. In an example, the upper edge of a partially-reflective optical member can be a first distance from a person's head, the lower edge of the partially-reflective optical member can be a second distance from the person's head, and the second distance can be less than the first distance. In an example, the right edge of a partially-reflective optical member can be a first distance from a person's head, the left edge of the partially-reflective optical member can be a second distance from the person's head, and the second distance can be less than the first distance, or vice versa.

In an example, an internal-reflection waveguide can be a prism. In an example, an internal-reflection waveguide can be a lens with a reflective coating or layer. In an example, an internal-reflection waveguide can be arcuate. In an example, an internal-reflection waveguide can be proximally-concave. In an example, both the distal and proximal surfaces of an internal-reflection waveguide can be proximally-concave. In an example, a portion of an internal-reflection waveguide which is closer to a second virtual image display can have a first width (or thickness), a portion of an internal-reflection waveguide which is farther from the second virtual image display can have a second width (or thickness), and the second width (or thickness) can be less than the first width (or thickness).

In an example, an internal-reflection waveguide can have internally-reflective distal and proximal surfaces. In an example, light beams from a second virtual image display can enter an internal-reflection waveguide and then be reflected in an alternating (proximal and distal) manner by the (distal and proximal) surfaces of that waveguide before they exit the waveguide toward a person's eye. In an example, light beams from a second virtual image display can enter an internal-reflection waveguide and then be internally reflected back and forth at least twice by the distal and proximal surfaces of the waveguide before they exit the waveguide toward a person's eye. In an example, light beams from a second virtual image display can enter an internal-reflection waveguide and then be internally reflected back and forth at least three times by the distal and proximal surfaces of the waveguide before they exit the waveguide toward a person's eye. In an example, a given light ray from a virtual image display can be internally-reflected at least three times within a waveguide before exiting the proximal side of the waveguide.

In an example, a first portion of an internal-reflection waveguide can have relatively reflective distal and proximal surfaces and a second portion of an internal-reflection waveguide can have relatively non-reflective distal and proximal surfaces. In an example, a peripheral portion of an internal-reflection waveguide can have relatively reflective distal and proximal surfaces and a central portion of an internal-reflection waveguide can have relatively non-reflective distal and proximal surfaces. In an example, light rays from a second virtual image display can enter a peripheral portion (e.g. peripheral edge) of an internal-reflection waveguide and can exit a central portion of the internal-reflection waveguide. In an example, (distal and proximal surfaces of) a peripheral portion of an internal-reflection waveguide can have a first level of internal reflection, (distal and proximal surfaces of) a central portion of an internal-reflection waveguide can have a second level of internal reflection, and the second level can be less than the first level.

In an example, the interior of an internal-reflection waveguide can have uniform density, transparency, and reflectivity. In an example, a distal portion of an internal-reflection waveguide can have a first density and a proximal portion of an internal-reflection waveguide can have a second density, wherein the second density is greater than the first density (or vice versa). In an example, a peripheral portion of an internal-reflection waveguide can have a first density and a central portion of an internal-reflection waveguide can have a second density, wherein the second density is greater than the first density (or vice versa).

In an example, a distal portion of an internal-reflection waveguide can have a first level of transparency and a proximal portion of an internal-reflection waveguide can have a second level of transparency, wherein the second level of transparency is greater than the first level of transparency (or vice versa). In an example, a peripheral portion of an internal-reflection waveguide can have a first level of transparency and a central portion of an internal-reflection waveguide can have a second level of transparency, wherein the second level of transparency is greater than the first level of transparency (or vice versa). In an example, a distal portion of an internal-reflection waveguide can have a first level of reflectivity and a proximal portion of an internal-reflection waveguide can have a second level of reflectivity, wherein the second level of reflectivity is greater than the first level of reflectivity (or vice versa). In an example, a peripheral portion of an internal-reflection waveguide can have a first level of reflectivity and a central portion of an internal-reflection waveguide can have a second level of reflectivity, wherein the second level of reflectivity is greater than the first level of reflectivity (or vice versa).

In an example, a proximal surface of an internal-reflection waveguide can have a shape which is selected from the group consisting of: smooth convex curve; smooth concave curve; smooth section of a sphere; smooth conic section curve; smooth sinusoidal curve; scalloped convex curve; scalloped concave curve; scalloped section of a sphere; scalloped conic section curve; zigzag or sawtooth convex curve; zigzag or sawtooth concave curve; zigzag or sawtooth section of a sphere; and zigzag or sawtooth conic section curve. In an example, the distal surface of an internal-reflection waveguide can have a shape which is selected from the group consisting of: smooth convex curve; smooth concave curve; smooth section of a sphere; smooth conic section curve; smooth sinusoidal curve; scalloped convex curve; scalloped concave curve; scalloped section of a sphere; scalloped conic section curve; zigzag or sawtooth convex curve; zigzag or sawtooth concave curve; zigzag or sawtooth section of a sphere; and zigzag or sawtooth conic section curve. In an example, the proximal and distal surfaces of an internal-reflection waveguide can have the same general shape, but differ in their degrees of convexity or concavity.

In an example, undulations, teeth, or spikes in the (distal or proximal) surface of an internal-reflection waveguide with a sinusoidal, zigzag, or sawtooth shape can be pair-wise equidistant over the entire surface of the internal-reflection waveguide. In an example, the distances between undulations, teeth, or spikes in the surface of an internal-reflection waveguide can vary over the surface. In an example, undulations, teeth, or spikes in a first portion of a surface of an internal-reflection waveguide can be separated by a first distance and undulations, teeth, or spikes in a second portion of the surface can be separate by a second distance, wherein the second distance is at least 25% greater than the first distance. In an example, undulations, teeth, or spikes in the upper half of a surface of an internal-reflection waveguide can be separated by a first distance and undulations, teeth, or spikes in the lower half of the surface can be separated by a second distance, wherein the second distance is at least 25% greater than the first distance (or vice versa). In an example, undulations, teeth, or spikes in the right half of a surface of an internal-reflection waveguide can be separated by a first distance and undulations, teeth, or spikes in the left half of the surface can be separated by a second distance, wherein the second distance is at least 25% greater than the first distance (or vice versa).

In an example, a distal partially-reflective optical member can be parallel to a portion of the distal edge of a proximal internal-reflection waveguide. In an example, a plane which is parallel to the best-fitting plane of a distal partially-reflective optical member can be tangential to a portion of the distal edge of a proximal internal-reflection waveguide. In an example, a distal partially-reflective optical member and the distal surface of a proximal internal-reflection waveguide can become closer to each other as one moves along them farther away from the first and second virtual image displays.

In an example, the upper half of a partially-reflective optical member can be a first (average or minimum) distance from the upper half of an internal-reflection waveguide and the lower half of the partially-reflective optical member can be a second (average or minimum) distance from the lower half of the internal-reflection waveguide, wherein the first (average or minimum) distance is at least 25% greater than the second (average or minimum) distance (or vice versa). In an example, the right half of a partially-reflective optical member can be a first (average or minimum) distance from the right half of an internal-reflection waveguide and the left half of the partially-reflective optical member can be a second (average or minimum) distance from the left half of the internal-reflection waveguide, wherein the second (average or minimum) distance is at least 25% greater than the first (average or minimum) distance (or vice versa).

In an example, (portions of) virtual images displayed by a first virtual image display can be perceived by a person in a first focal plane and (portions of) virtual images displayed by a second virtual image display can be perceived by the person in a second focal plane, wherein the second focal plane is closer to the person than the first focal plane. In an example, (portions of) virtual images displayed by a first virtual image display can be perceived by a person at a first focal depth and (portions of) virtual images displayed by a second virtual image display can be perceived by the person at a second focal depth, wherein the second focal depth is shorter than the first focal depth. In an example, (portions of) virtual images displayed by a first virtual image display can be perceived by a person at a first distance and (portions of) virtual images displayed by a second virtual image display can be perceived by the person at a second distance, wherein the second distance is less than the first distance.

In an example, the ability of this optical structure to display (portions of) virtual images in different focal planes, at different focal depths, and/or at different distances from the viewer can help to address the conflict between vergence and accommodation (e.g. convergence and accommodation conflict) which can occur with near eye displays. In an example, with a two-eye version of this optical structure, a person can move their eyes from focusing on a virtually-distant virtual object shown by a first virtual image display to focusing on a virtually-closer virtual object shown by a second virtual image display, or vice versa. Since virtual images displayed by first and second virtual image displays can overlap, a given pixel or group of pixels can be displayed at a distal focal plane, a proximal focal plane, or a blend thereof.

Although this figure and many other figures in this disclosure show a single optical structure for a single eye, augmented reality (AR) eyewear can include two such optical structures, one for each eye. Also, optical structures shown can be rotated (90 degrees) in a vertical plane and still be within the scope of this invention. Also, although this figure does not show an eyewear frame, it is to be understood that this optical structure can be held in proximity to a person's eye by an eyewear frame.

In an example, the optical structure shown in this figure and those in other figures in this disclosure can also include one or more components selected from the group consisting of: accelerometer, electromagnet or electromagnet array, gyroscope, or other type of motion sensor, actuator, camera, data processor, distal corrective lens or prism; static microlens array; variable-focus microlens array; EEG sensor or other electromagnetic energy sensor, environmental light sensor, eye tracking mechanism, eyewear frame, power source (such as a battery), speaker, touch-based user interface, voice-based user interface, wireless data receiver, and wireless data transmitter. Example variations discussed in other portions of this disclosure or in priority-linked disclosures can also be applied to this example where relevant, but are not repeated here in order to reduce narrative redundancy.

Figure 86:
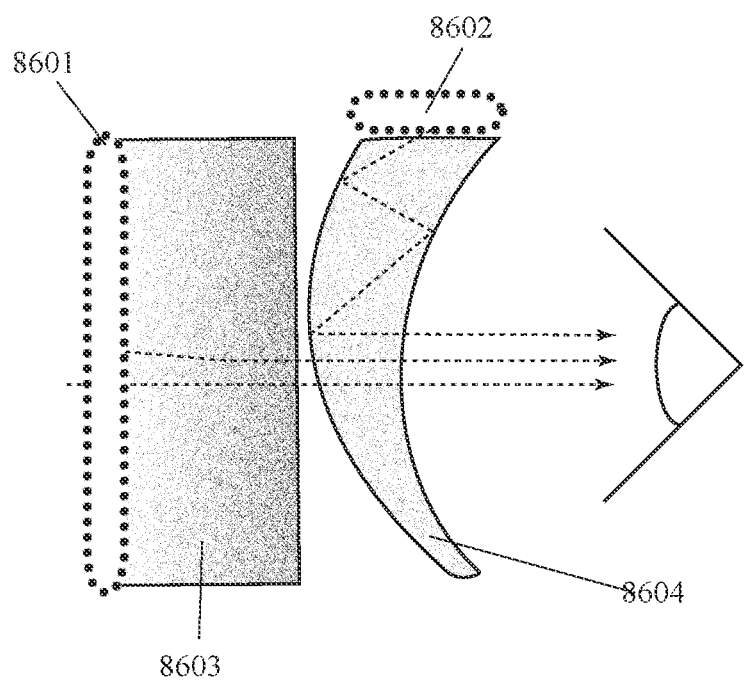
FIG. 86 shows an image display on the side of a laterally-diagonal reflective surface and an image display above a tapered waveguide.

FIG. 86 shows an optical structure that is similar to the one shown in FIG. 85 except that first and second virtual image displays are on different sides of an eye and a distal partially-reflective optical member has been rotated 90-degrees (around a virtual central vector which extends out in a forward direction from the center of the person's eye). In an example, a first virtual image display can be to the right or left of the person's eye and a second virtual image display can be above the person's eye. In an example, a first virtual image display can be above the person's eye and a second virtual image display can be to the right or left of the person's eye.

FIG. 86 shows a vertical cross-sectional side view of an optical structure for augmented reality eyewear comprising: a first virtual image display (8601); a second virtual image display (8602); a distal partially-reflective optical member (8603) which is configured to be within 6" in front of a person' eye; and a proximal internal-reflection waveguide (8604); wherein light rays from the first virtual image display are reflected by the partially-reflective optical member and then pass through the waveguide in order to reach the person's eye; wherein light rays from the second virtual image display are reflected back and forth at least two times (in at-least-partially distal and proximal directions) within the waveguide before exiting the proximal side of the waveguide in order to reach the person's eye; wherein light rays from the first virtual image display and the second virtual image display create images of virtual objects in the person's field of view; and wherein light rays from the environment pass through the partially-reflective optical member and then pass through the waveguide in order to reach the person's eye. In an example, a given light ray from a virtual image display can be internally-reflected at least three times within a waveguide before exiting the proximal side of the waveguide.

In an example, the longitudinal axis of a partially-reflective optical member can be perpendicular to the longitudinal axis of an internal-reflective waveguide. In an example, a first virtual plane which best fits a partially-reflective optical member can be perpendicular to a second virtual plane which best fits an internal-reflective waveguide. In an example, the longitudinal axis of a partially-reflective optical member can be parallel to the longitudinal axis of an internal-reflective waveguide. In an example, a first virtual plane which best fits a partially-reflective optical member can be parallel to a second virtual plane which best fits an internal-reflective waveguide. In an example, a first virtual plane which best fits a partially-reflective optical member can intersect a second virtual plane which best fits an internal-reflective waveguide at an acute angle. Example variations discussed in other portions of this disclosure or in priority-linked disclosures can also be applied to this example where relevant, but are not repeated here in order to reduce narrative redundancy.

Figure 87:
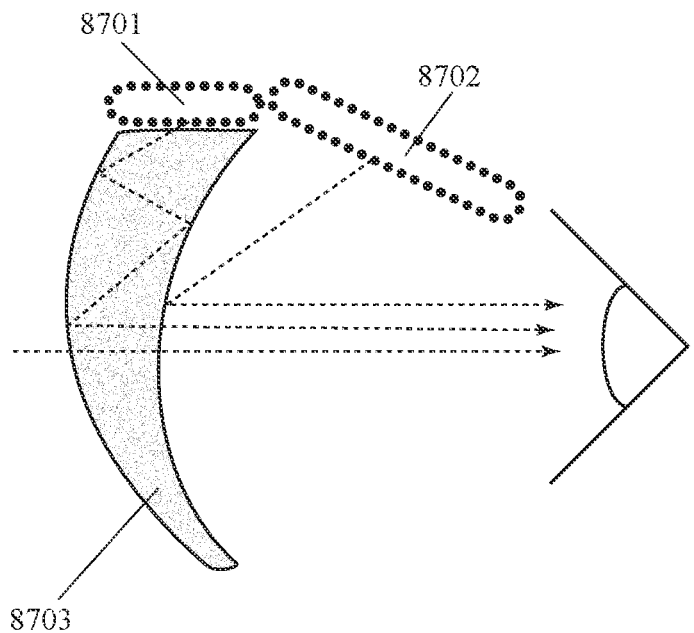
FIG. 87 shows an image display above a tapered waveguide and an image display proximal to the waveguide.

FIG. 87 shows a vertical cross-sectional side view of an optical structure for augmented reality eyewear comprising: a first virtual image display (8701); a second virtual image display (8702); and an internal-reflection waveguide (8703); wherein light rays from the first virtual image display enter the waveguide and are reflected back and forth at least two times (in at-least-partially distal and proximal directions) within the waveguide before exiting the proximal side of the waveguide to reach the person's eye; wherein light rays from the second virtual image display are reflected by the proximal surface of the waveguide to reach the person's eye; wherein light rays from the first virtual image display and the second virtual image display create images of virtual objects in the person's field of view; and wherein light rays from the environment pass through the waveguide in order to reach the person's eye. In an example, the virtual image displays and internal-reflection waveguide can all be configured to be within 6" of a person's eye. In an example, a given light ray from a virtual image display can be internally-reflected at least three times within a waveguide before exiting the proximal side of the waveguide.

The optical structure shown FIG. 87 can also be described as an optical structure for augmented reality eyewear comprising: a first virtual image display; a second virtual image display; and an internal-reflection waveguide; wherein light rays for a given pixel of an image from the first virtual image display enter the waveguide and are reflected by the proximal and distal surfaces of the waveguide at least two times before the light rays exit the proximal side of the waveguide to reach the person's eye; wherein light rays from the second virtual image display are reflected by the proximal surface of the waveguide to reach the person's eye; wherein light rays from the first virtual image display and the second virtual image display create images of virtual objects in the person's field of view; and wherein light rays from the environment pass through the waveguide in order to reach the person's eye. In an example, a given light ray from a virtual image display can be internally-reflected at least three times within a waveguide before exiting the proximal side of the waveguide.

In an example, a first virtual image display and/or a second virtual image display can be located above (a space in front of) a person's eye. In an example, a first virtual image display and/or a second virtual image display can be located above (a space in front of) a person's eye. In an example, a first virtual image display and/or a second virtual image display can be located to the right or left of (a space in front of) a person's eye. In an example, first and second virtual image displays can both be on the same side of (a space in front of) a person's eye. In an example, light rays from a first virtual image display can enter a peripheral side (or edge) of an internal-reflection waveguide and exit a central portion of the waveguide.

In an example, an internal-reflection waveguide can be a prism. In an example, an internal-reflection waveguide can be a lens with a reflective coating or layer. In an example, an internal-reflection waveguide can be arcuate. In an example, an internal-reflection waveguide can be proximally-concave. In an example, both the distal and proximal surfaces of an internal-reflection waveguide can be proximally-concave. In an example, a portion of an internal-reflection waveguide which is closer to a virtual image display can have a first width (or thickness), a portion of an internal-reflection waveguide which is farther from the virtual image display can have a second width (or thickness), and the second width (or thickness) can be less than the first width (or thickness).

In an example, an internal-reflection waveguide can have internally-reflective distal and proximal surfaces. In an example, light beams from a first virtual image display can enter an internal-reflection waveguide and then be reflected in an alternating (proximal and distal) manner by the (distal and proximal) surfaces of that waveguide before they exit the waveguide toward a person's eye. In an example, light beams from a first virtual image display can enter an internal-reflection waveguide and then be internally reflected back and forth at least twice by the distal and proximal surfaces of the waveguide before they exit the waveguide toward a person's eye. In an example, light beams from a first virtual image display can enter an internal-reflection waveguide and then be internally reflected back and forth at least three times by the distal and proximal surfaces of the waveguide before they exit the waveguide toward a person's eye. In an example, a given light ray from a virtual image display can be internally-reflected at least three times within a waveguide before exiting the proximal side of the waveguide.

In an example, a first portion of an internal-reflection waveguide can have relatively reflective distal and proximal surfaces and a second portion of an internal-reflection waveguide can have relatively non-reflective distal and proximal surfaces. In an example, a peripheral portion of an internal-reflection waveguide can have relatively reflective distal and proximal surfaces and a central portion of an internal-reflection waveguide can have relatively non-reflective distal and proximal surfaces. In an example, light rays from a first virtual image display can enter a peripheral portion (e.g. peripheral edge) of an internal-reflection waveguide and can exit a central portion of the internal-reflection waveguide. In an example, (distal and proximal surfaces of) a peripheral portion of an internal-reflection waveguide can have a first level of internal reflection, (distal and proximal surfaces of) a central portion of an internal-reflection waveguide can have a second level of internal reflection, and the second level can be less than the first level.

In this example, light rays from a second virtual image display are reflected toward a person's eye by the proximal surface of an internal-reflection waveguide. In an alternative example, light rays from a second virtual image display can be reflected toward a person's eye by the distal surface of an internal-reflection waveguide.

In an example, (portions of) virtual images displayed by a first virtual image display can be perceived by a person in a first focal plane and (portions of) virtual images displayed by a second virtual image display can be perceived by the person in a second focal plane, wherein the second focal plane is closer to the person than the first focal plane. In an example, (portions of) virtual images displayed by a first virtual image display can be perceived by a person at a first focal depth and (portions of) virtual images displayed by a second virtual image display can be perceived by the person at a second focal depth, wherein the second focal depth is less than the first focal depth. In an example, (portions of) virtual images displayed by a first virtual image display can be perceived by a person at a first distance and (portions of) virtual images displayed by a second virtual image display can be perceived by the person at a second distance, wherein the second distance is less than the first distance.

In an example, the ability of this optical structure to display (portions of) virtual images in different focal planes, at different focal depths, and/or at different distances from the viewer can help to address the conflict between vergence and accommodation (e.g. convergence and accommodation conflict) which can occur with near eye displays. In an example, with a two-eye version of this optical structure, a person can move their eyes from focusing on a virtually-distant virtual object shown by a first virtual image display to focusing on a virtually-closer virtual object shown by second virtual image display, or vice versa. Since virtual images displayed by first and second virtual image displays can overlap, a given pixel or group of pixels can be displayed at a distal focal plane, a proximal focal plane, or a blend thereof. Example variations discussed in other portions of this disclosure or in priority-linked disclosures can also be applied to this example where relevant, but are not repeated here in order to reduce narrative redundancy.

Figure 88:
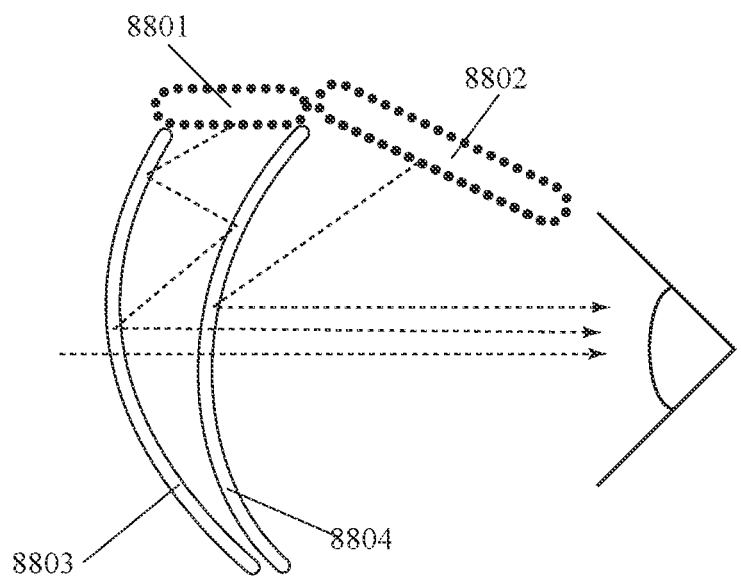
FIG. 88 shows an image display above a two-concave-surface waveguide and an image display proximal to the waveguide.

FIG. 88 shows a vertical cross-sectional side view of an optical structure for augmented reality eyewear comprising: a first virtual image display (8801); a second virtual image display (8802); an arcuate distal partially-reflective optical member (8803); and an arcuate proximal partially-reflective optical member (8804); wherein light rays from the first virtual image display enter a space between the arcuate distal partially-reflective optical member and the arcuate proximal partially-reflective optical member and are reflected back and forth at least two times between the arcuate distal partially-reflective optical member and the arcuate proximal partially-reflective optical member before these light rays pass through the arcuate proximal partially-reflective optical member toward a person's eye; wherein light rays from the second virtual image display are reflected by the proximal surface of the arcuate proximal partially-reflective optical member to reach the person's eye; wherein light rays from the first virtual image display and the second virtual image display create images of virtual objects in the person's field of view; and wherein light rays from the environment pass through both the arcuate distal partially-reflective optical member and the arcuate proximal partially-reflective optical member in order to reach the person's eye. In an example, a given light ray from a virtual image display can be reflected at least two times within a space between distal and proximal partially-reflective optical members before passing through the proximal partially-reflective optical member to reach a person's eye.

The optical structure shown in FIG. 88 can also be described as an optical structure for augmented reality eyewear comprising: a distal virtual image display; a proximal virtual image display, wherein the (centroid of the) proximal virtual image display is configured to be closer to a person's head than the (centroid of the) distal virtual image display; an arcuate distal partially-reflective optical member; and an arcuate proximal partially-reflective optical member, wherein the (centroid of the) arcuate proximal partially-reflective optical member is configured to be closer to the person's head than the (centroid of the) arcuate distal partially-reflective optical member; wherein light rays for a given pixel of an image from the distal virtual image display are reflected at least two times by the arcuate distal partially-reflective optical member and the arcuate proximal partially-reflective optical member before these light rays pass through the arcuate proximal partially-reflective optical member toward a person's eye; wherein light rays from the proximal virtual image display are reflected by the arcuate proximal partially-reflective optical member to reach the person's eye; wherein light rays from the distal virtual image display and the proximal virtual image display create images of virtual objects in the person's field of view; and wherein light rays from the environment pass through both the arcuate distal partially-reflective optical member and the arcuate proximal partially-reflective optical member to reach the person's eye. In an example, a given light ray from a virtual image display can be reflected at least two times within a space between distal and proximal partially-reflective optical members before passing through the proximal partially-reflective optical member to reach a person's eye.

In an example, a first virtual image display and/or a second virtual image display can be located above (a space in front of) a person's eye. In an example, a first virtual image display and/or a second virtual image display can be located below (a space in front of) a person's eye. In an example, a first virtual image display and/or a second virtual image display can be located to the right or left of (a space in front of) a person's eye. In an example, first and second virtual image displays can both be on the same side of (a space in front of) a person's eye.

In an example, light rays from a first virtual image display can enter a peripheral portion of a space between distal and proximal partially-reflective optical members and exit a central portion of that space through the proximal partially-reflective optical member to reach a person's eye. In an example, light rays from a first virtual image display can enter an upper portion of a space between distal and proximal partially-reflective optical members and exit a central portion of that space through the proximal partially-reflective optical member to reach a person's eye. In an example, light rays from a first virtual image display can enter a lower portion of a space between distal and proximal partially-reflective optical members and exit a central portion of that space through the proximal partially-reflective optical member to reach a person's eye. In an example, light rays from a first virtual image display can enter a right-side or left-side portion of a space between distal and proximal partially-reflective optical members and exit a central portion of that space through the proximal partially-reflective optical member to reach a person's eye.

In an example, an arcuate distal partially-reflective optical member, an arcuate proximal partially-reflective optical member, or both can be proximally-concave, wherein proximally-concave means that a concavity opens in a proximal direction and wherein proximal (in this context) means closer to a person's eye. In an example, distal and proximal partially-reflective optical members can be nested and/or concentric. In an example, distal and proximal partially-reflective optical members can have a common focal point. In an example, a distal partially-reflective optical member and a proximal partially-reflective optical member can both have the same level of concavity. In a distal partially-reflective optical member can have a first level of concavity and a second partially-reflective optical member can have a second level of concavity, wherein the second level is greater than the first level (or vice versa). In an example, distal and proximal partially-reflective optical members can have different focal points.

In an example, a distal partially-reflective optical member and a proximal partially-reflective optical member can converge as one moves along them in an upper-to-lower direction. Convergence in this context means becoming closer together and need not mean actually intersecting or touching each other. For example, distal and proximal partially-reflective optical members can become closer to each other in an upper-to-lower direction, even if they do not intersect or touch each other. In an example, a distal partially-reflective optical member and a proximal partially-reflective optical member can converge (e.g. can become closer to each other, even if they do not intersect) as one moves along them in a right-to-left direction. In an example, a distal partially-reflective optical member and a proximal partially-reflective optical member can converge (e.g. can become closer to each other, even if they do not intersect) as one moves along them in a left-to-right direction. In an example portions of distal and proximal partially-reflective optical members which are closest to (distal and proximal) virtual image displays can be a first distance apart and portions of distal and proximal partially-reflective optical members which are farthest from these virtual image displays can be a second distance apart, wherein the second distance is less than the first distance.

In an example, a distal partially-reflective optical member and a proximal partially reflective member can both have the same thickness, transparency level, and reflectivity level. In an example, a distal partially-reflective optical member can have a first (average) thickness and a proximal partially reflective member can have a second (average) thickness, wherein the second thickness is at least 25% greater than the first thickness (or vice versa). In an example, a distal partially-reflective optical member can have a first (average) transparency level and a proximal partially reflective member can have a second (average) transparency level, wherein the second transparency level is at least 25% greater than the first transparency level (or vice versa). In an example, a distal partially-reflective optical member can have a first (average) reflectivity level and a proximal partially reflective member can have a second (average) reflectivity level, wherein the second reflectivity level is at least 25% greater than the first reflectivity level (or vice versa).

In an example, light beams from a distal virtual image display can enter a space between distal and proximal partially-reflective optical members and then be reflected in an alternating (proximal and distal) manner by the distal and proximal partially-reflective optical members before these light beams pass through the proximal partially-reflective optical member toward a person's eye. In an example, light beams from a distal virtual image display can enter the space between distal and proximal partially-reflective optical members and then be internally reflected back and forth at least twice by the distal and proximal partially-reflective optical members before these light beams pass through the proximal partially-reflective optical member toward a person's eye. In an example, a given light ray from a virtual image display can be reflected at least two times within a space between distal and proximal partially-reflective optical members before passing through the proximal partially-reflective optical member to reach a person's eye.

In an example, light beams for a given pixel of an image from a distal virtual image display can enter a space between distal and proximal partially-reflective optical members and then be internally reflected back and forth at least twice by the distal and proximal partially-reflective optical members before these light rays pass through the proximal partially-reflective optical member toward a person's eye. In an example, light beams for all pixels of an image from a distal virtual image display can enter a space between distal and proximal partially-reflective optical members and then be internally reflected back and forth at least twice by the distal and proximal partially-reflective optical members before these light rays pass through the proximal partially-reflective optical member toward a person's eye. In an example, a given light ray from a virtual image display can be reflected at least two times within a space between distal and proximal partially-reflective optical members before passing through the proximal partially-reflective optical member to reach a person's eye.

In an example, a first portion of a proximal and/or distal partially-reflective optical member can be relatively reflective and a second portion of a proximal and/or distal partially-reflective optical member can be relatively non-reflective. In an example, a peripheral portion of a proximal and/or distal partially-reflective optical member can be relatively reflective and a central portion of a proximal and/or distal partially-reflective optical member can be relatively non-reflective. In an example, a peripheral portion of a proximal and/or distal partially-reflective optical member can have a first reflectivity level, a central portion of the proximal and/or distal partially-reflective optical member can have a second reflectivity level, and the second level can be less than the first level (or vice versa). In this example, light rays from a second (and/or proximal) virtual image display are reflected toward a person's eye by a proximal partially-reflective optical member. In an alternative example, light rays from a second (and/or proximal) virtual image display can be reflected toward a person's eye by a distal partially-reflective optical member.

In an example, (portions of) virtual images displayed by a first virtual image display can be perceived by a person in a first focal plane and (portions of) virtual images displayed by a second virtual image display can be perceived by the person in a second focal plane, wherein the second focal plane is closer to the person than the first focal plane. In an example, (portions of) virtual images displayed by a first virtual image display can be perceived by a person at a first focal depth and (portions of) virtual images displayed by a second virtual image display can be perceived by the person at a second focal depth, wherein the second focal depth is less than the first focal depth. In an example, (portions of) virtual images displayed by a first virtual image display can be perceived by a person at a first distance and (portions of) virtual images displayed by a second virtual image display can be perceived by the person at a second distance, wherein the second distance is less than the first distance.

In an example, the ability of this optical structure to display (portions of) virtual images in different focal planes, at different focal depths, and/or at different distances from the viewer can help to address the conflict between vergence and accommodation (e.g. convergence and accommodation conflict) which can occur with near eye displays. In an example, with a two-eye version of this optical structure, a person can move their eyes from focusing on a virtually-distant virtual object shown by a first virtual image display to focusing on a virtually-closer virtual object shown by second virtual image display, or vice versa. Since virtual images displayed by first and second virtual image displays can overlap, a given pixel or group of pixels can be displayed at a distal focal plane, a proximal focal plane, or a blend thereof. Example variations discussed in other portions of this disclosure or in priority-linked disclosures can also be applied to this example where relevant, but are not repeated here in order to reduce narrative redundancy.

Figure 89:
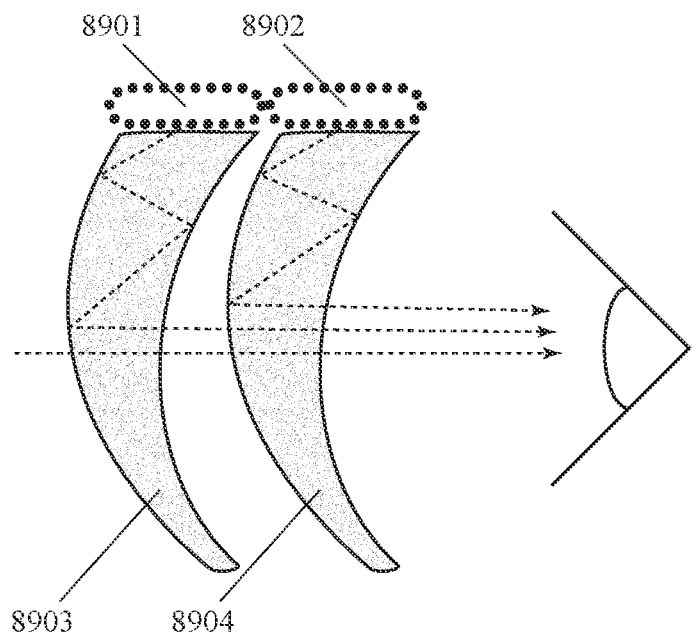
FIG. 89 shows two aligned optical structures, each with an image display above a tapered waveguide.

FIG. 89 shows a vertical cross-sectional side view of an optical structure for augmented reality eyewear comprising: a distal virtual image display (8901); a proximal virtual image display (8902); a distal internal-reflection waveguide (8903); and a proximal internal-reflection waveguide (8904); wherein light rays comprising a given pixel of an image from the distal virtual image display are reflected at least three times inside the distal internal-reflection waveguide before these light rays exit the proximal side of the distal internal-reflection waveguide and then pass through the proximal internal-reflection waveguide in order to reach the person's eye; wherein light rays comprising a given pixel of an image from the proximal virtual image display are reflected at least three times inside the proximal internal-reflection waveguide before these light rays exit the proximal side of the proximal internal-reflection waveguide in order to reach the person's eye; wherein light rays from the distal virtual image display and the proximal virtual image display create images of virtual objects in the person's field of view; and wherein light rays from the environment pass through both the distal internal-reflection waveguide and the proximal internal-reflection waveguide in order to reach the person's eye. In an example, a given light ray from a virtual image display can be internally-reflected at least three times within a waveguide before exiting the proximal side of the waveguide.

In an example, distal and proximal virtual image displays can both be located above (a space in front of) a person's eye. In an example, distal and proximal virtual image displays can both be located below (a space in front of) a person's eye. In an example, distal and proximal virtual image displays can both be located to the right or left of (a space in front of) a person's eye. In an example, light rays from a distal virtual image display can enter a peripheral side (or edge) of a distal internal-reflection waveguide and exit a central portion of the waveguide. In an example, light rays from a proximal virtual image display can enter a peripheral side (or edge) of a proximal internal-reflection waveguide and exit a central portion of the waveguide.

In an example, an internal-reflection waveguide can be a prism. In an example, an internal-reflection waveguide can be a lens with a reflective coating or layer. In an example, an internal-reflection waveguide can be arcuate. In an example, an internal-reflection waveguide can be proximally-concave. In an example, both the distal and proximal surfaces of an internal-reflection waveguide can be proximally-concave. In an example, a portion of an internal-reflection waveguide which is closer to a virtual image display can have a first width (or thickness), a portion of an internal-reflection waveguide which is farther from the virtual image display can have a second width (or thickness), and the second width (or thickness) can be less than the first width (or thickness).

In an example, an internal-reflection waveguide can have internally-reflective distal and proximal surfaces. In an example, light beams from a virtual image display can enter an internal-reflection waveguide and then be reflected in an alternating (proximal and distal) manner by the (distal and proximal) surfaces of that waveguide before they exit the waveguide toward a person's eye. In an example, light beams from a virtual image display can enter an internal-reflection waveguide and then be internally reflected back and forth at least twice by the distal and proximal surfaces of the waveguide before they exit the waveguide toward a person's eye. In an example, light beams from a virtual image display can enter an internal-reflection waveguide and then be internally reflected back and forth at least three times by the distal and proximal surfaces of the waveguide before they exit the waveguide toward a person's eye. In an example, a given light ray from a virtual image display can be internally-reflected at least three times within a waveguide before exiting the proximal side of the waveguide.

In an example, a first portion of an internal-reflection waveguide can have relatively reflective distal and proximal surfaces and a second portion of the waveguide can have relatively non-reflective distal and proximal surfaces. In an example, a peripheral portion of a waveguide can have relatively reflective distal and proximal surfaces and a central portion of a waveguide can have relatively non-reflective distal and proximal surfaces. In an example, light rays from a second virtual image display can enter a peripheral portion (e.g. an outer edge) of a waveguide and then exit a central portion of the waveguide. In an example, (distal and proximal surfaces of) a peripheral portion of an internal-reflection waveguide can have a first level of internal reflection, (distal and proximal surfaces of) a central portion of an internal-reflection waveguide can have a second level of internal reflection, and the second level can be less than the first level.

In an example, a proximal surface of an internal-reflection waveguide can have a shape which is selected from the group consisting of: smooth convex curve; smooth concave curve; smooth section of a sphere; smooth conic section curve; smooth sinusoidal curve; scalloped convex curve; scalloped concave curve; scalloped section of a sphere; scalloped conic section curve; zigzag or sawtooth convex curve; zigzag or sawtooth concave curve; zigzag or sawtooth section of a sphere; and zigzag or sawtooth conic section curve. In an example, the distal surface of an internal-reflection waveguide can have a shape which is selected from the group consisting of: smooth convex curve; smooth concave curve; smooth section of a sphere; smooth conic section curve; smooth sinusoidal curve; scalloped convex curve; scalloped concave curve; scalloped section of a sphere; scalloped conic section curve; zigzag or sawtooth convex curve; zigzag or sawtooth concave curve; zigzag or sawtooth section of a sphere; and zigzag or sawtooth conic section curve. In an example, the proximal and distal surfaces of an internal-reflection waveguide can have the same general shape, but differ in their degrees of convexity or concavity.

In an example, the focal axes of distal and proximal internal-reflection waveguides can be aligned. In an example, distal and proximal internal-reflection waveguides can be nested and/or concentric. In an example, distal and proximal internal-reflection waveguides can have the same shape, size, and level of reflectivity. In an example, the proximal surfaces of distal and proximal internal-reflection waveguides can be parallel. In an example, the distal surfaces of distal and proximal internal-reflection waveguides can be parallel. In an example, there can be a gap or space between distal and proximal internal-reflection waveguides. In an example, the proximal surface of a distal internal-reflection waveguide and the distal surface of a proximal internal-reflection waveguide can be contiguous to each other, without a gap or space between them.

In an example, a distal internal-reflection waveguide can have a first level of concavity and a proximal internal-reflection waveguide can have a second level of concavity, wherein the second level is greater than the first level (or vice versa). In an example, a distal internal-reflection waveguide can have a first size and a proximal internal-reflection waveguide can have a second size, wherein the second size is greater than the first size (or vice versa). In an example, a distal internal-reflection waveguide can have a first level of reflectivity and a proximal internal-reflection waveguide can have a second level of reflectivity, wherein the second level is greater than the first level (or vice versa).

In an example, (portions of) virtual images displayed by a distal virtual image display can be perceived by a person in a distal focal plane and (portions of) virtual images displayed by a proximal virtual image display can be perceived by the person in a proximal focal plane, wherein the proximal focal plane is closer to the person than the distal focal plane. In an example, (portions of) virtual images displayed by a distal virtual image display can be perceived by a person at a distal focal depth and (portions of) virtual images displayed by a proximal virtual image display can be perceived by the person at a proximal focal depth. In an example, (portions of) virtual images displayed by a distal virtual image display can be perceived by a person as being at a distal distance and (portions of) virtual images displayed by a proximal virtual image display can be perceived by the person as being at a proximal distance.

In an example, the ability of this optical structure to display (portions of) virtual images in different focal planes, at different focal depths, and/or at different distances from the viewer can help to address the conflict between vergence and accommodation (e.g. convergence and accommodation conflict) which can occur with near eye displays. In an example, with a two-eye version of this optical structure, a person can move their eyes from focusing on a virtually-distant virtual object shown by a distal virtual image display to focusing on a virtually-closer virtual object shown by a proximal virtual image display, or vice versa. Since virtual images displayed by distal and proximal virtual image displays can overlap, a given pixel or group of pixels can be displayed at a distal focal plane, a proximal focal plane, or a blend thereof. Example variations discussed in other portions of this disclosure or in priority-linked disclosures can also be applied to this example where relevant, but are not repeated here in order to reduce narrative redundancy.

Figure 90:
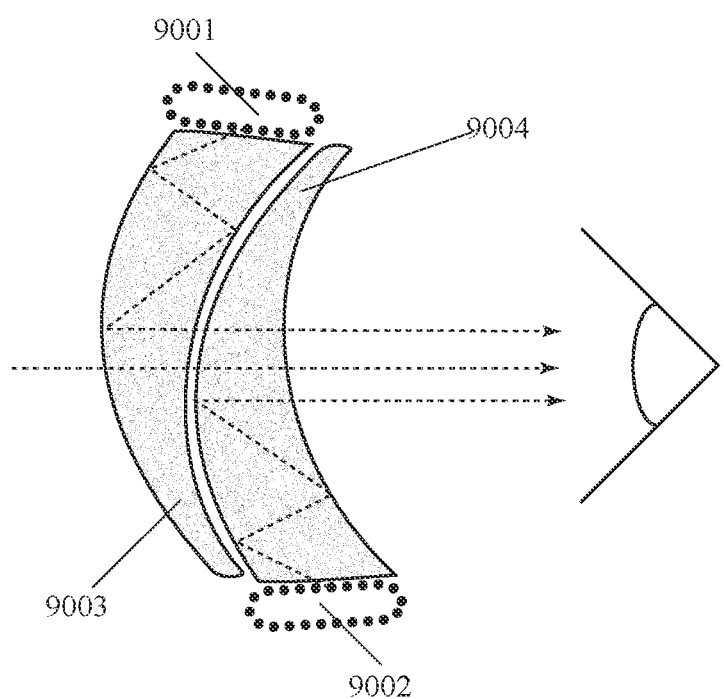
FIG. 90 shows two optical structures, each with an image display and a tapered waveguide, wherein the orientation of one structure is reversed relative to the other structure.

The optical structure shown in FIG. 90 is like the one shown in FIG. 89 except that the orientation of a proximal internal-reflection waveguides is reflected or rotated 180 degrees from the orientation of a distal internal-reflection waveguide. FIG. 90 shows a vertical cross-sectional side view of an optical structure for augmented reality eyewear comprising: a distal virtual image display (9001); a proximal virtual image display (9002); a distal internal-reflection waveguide (9003); and a proximal internal-reflection waveguide (9004); wherein light rays comprising a given pixel of an image from the distal virtual image display are reflected at least three times inside the distal internal-reflection waveguide before these light rays exit the proximal side of the distal internal-reflection waveguide and then pass through the proximal internal-reflection waveguide in order to reach the person's eye; wherein light rays comprising a given pixel of an image from the proximal virtual image display are reflected at least three times inside the proximal internal-reflection waveguide before these light rays exit the proximal side of the proximal internal-reflection waveguide in order to reach the person's eye; wherein light rays from the distal virtual image display and the proximal virtual image display create images of virtual objects in the person's field of view; and wherein light rays from the environment pass through both the distal internal-reflection waveguide and the proximal internal-reflection waveguide in order to reach the person's eye. In an example, a given light ray from a virtual image display can be internally-reflected at least three times within a waveguide before exiting the proximal side of the waveguide.

In this example, distal and proximal virtual image displays are on opposite sides of a person's eye. In an example, a distal virtual image display can be to the right of (a space in front of) a person's eye and a proximal virtual image display can be to the left of (a space in front of) a person's eye. In an example, a distal virtual image display can be above (a space in front of) a person's eye and a proximal virtual image display can be below (a space in front of) a person's eye. In an example, the distal surface of a distal waveguide can be parallel to the proximal surface of a proximal waveguide. Example variations discussed in other portions of this disclosure or in priority-linked disclosures can also be applied to this example where relevant, but are not repeated here in order to reduce narrative redundancy.

Figure 91:
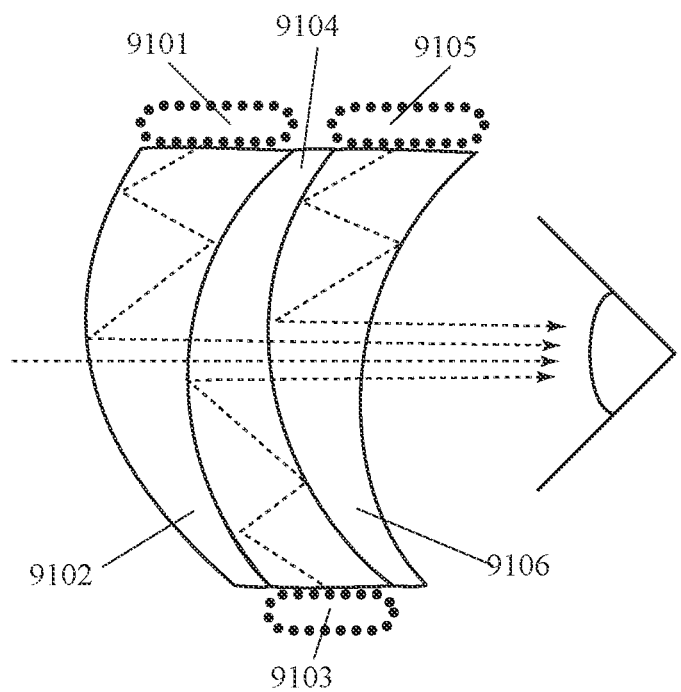
FIG. 91 shows three optical structures, each with an image display and a tapered waveguide, wherein the orientation of one structure is reversed relative to the other structures.

The optical structure shown in FIG. 91 is like the one shown in FIG. 90 except that there is an (axially-aligned) series of three internal-reflection waveguides. One of the waveguides has a first orientation and two of the waveguides have a second orientation, wherein the second orientation is reflected or rotated 180 degrees relative to the first orientation. FIG. 91 shows a vertical cross-sectional side view of an optical structure for augmented reality eyewear comprising: a distal virtual image display (9101) that is in optical communication with a distal internal-reflection waveguide (9102); a middle virtual image display (9103) that is in optical communication with a middle internal-reflection waveguide (9104); a proximal virtual image display (9105) that is in optical communication with a proximal internal-reflection waveguide (9106); wherein the middle internal-reflection waveguide is between the distal internal-reflection waveguide and the proximal internal-reflection waveguide; wherein the middle internal-reflection waveguide has a first orientation, wherein the distal and proximal internal-reflection waveguides have a second orientation, and wherein the second orientation is reflected or rotated 180 degrees relative to the first orientation; wherein light rays from the distal, middle, and proximal virtual image displays create images of virtual objects in the person's field of view; and wherein light rays from the environment pass through both the distal, middle, and proximal internal-reflection waveguides in order to reach the person's eye.

In an example, (portions of) virtual images displayed by a more-distal virtual image display can be perceived by a person in a more-distal focal plane and (portions of) virtual images displayed by a more-proximal virtual image display can be perceived by the person in a more-proximal focal plane. In an example, (portions of) virtual images displayed by a more-distal virtual image display can be perceived by a person at a farther focal depth and (portions of) virtual images displayed by a more-proximal virtual image display can be perceived by the person at a closer focal depth. In an example, (portions of) virtual images displayed by a more-distal virtual image display can be perceived by a person as being at a farther distance and (portions of) virtual images displayed by a more-proximal virtual image display can be perceived by the person as being at a closer distance.

In an example, the ability of this optical structure to display (portions of) virtual images in different focal planes, at different focal depths, and/or at different distances from the viewer can help to address the conflict between vergence and accommodation (e.g. convergence and accommodation conflict) which can occur with near eye displays. In an example, with a two-eye version of this optical structure, a person can move their eyes from focusing on a more-distant virtual object shown by a more-distal virtual image display to focusing on a closer virtual object shown by a more-proximal virtual image display, or vice versa. Since virtual images displayed by more-distal and more-proximal virtual image displays can overlap, a given pixel or group of pixels can be displayed at a more-distal focal plane, a more-proximal focal plane, or a blend thereof. Example variations discussed in other portions of this disclosure or in priority-linked disclosures can also be applied to this example where relevant, but are not repeated here in order to reduce narrative redundancy.

Figure 92:
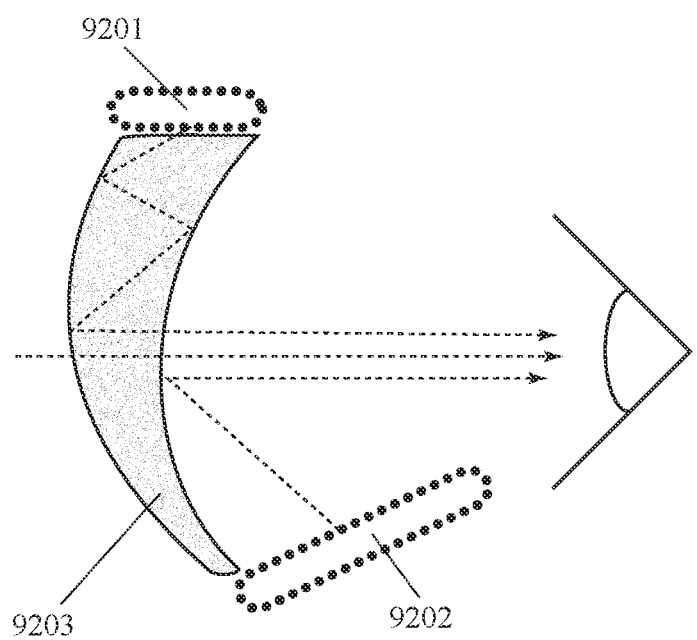
FIG. 92 shows two image displays above and below a tapered waveguide.

FIG. 92 shows an optical structure like the one is FIG. 87 except that the first and second optical virtual image displays are on opposite sides of (a space in front of) a person's eye. FIG. 92 shows a vertical cross-sectional side view of an optical structure for augmented reality eyewear comprising: a first virtual image display (9201); a second virtual image display (9202); and an internal-reflection waveguide (9203); wherein light rays from the first virtual image display enter the waveguide and are reflected back and forth at least two times (in at-least-partially distal and proximal directions) within the waveguide before exiting the proximal side of the waveguide to reach the person's eye; wherein light rays from the second virtual image display are reflected by the proximal surface of the waveguide to reach the person's eye; wherein light rays from the first virtual image display and the second virtual image display create images of virtual objects in the person's field of view; and wherein light rays from the environment pass through the waveguide in order to reach the person's eye. In an example, a given light ray from the first virtual image display can be internally-reflected at least three times within a waveguide before exiting the proximal side of the waveguide.

The optical structure shown FIG. 92 can also be described as an optical structure for augmented reality eyewear comprising: a first virtual image display; a second virtual image display; and an internal-reflection waveguide; wherein light rays for a given pixel of an image from the first virtual image display enter the waveguide and are reflected by the proximal and distal surfaces of the waveguide at least two times before the light rays exit the proximal side of the waveguide to reach the person's eye; wherein light rays from the second virtual image display are reflected by the proximal surface of the waveguide to reach the person's eye; wherein light rays from the first virtual image display and the second virtual image display create images of virtual objects in the person's field of view; and wherein light rays from the environment pass through the waveguide in order to reach the person's eye. In an example, a given light ray from the first virtual image display can be internally-reflected at least three times within a waveguide before exiting the proximal side of the waveguide. Example variations discussed in other portions of this disclosure or in priority-linked disclosures can also be applied to this example where relevant, but are not repeated here in order to reduce narrative redundancy.

Figure 93:
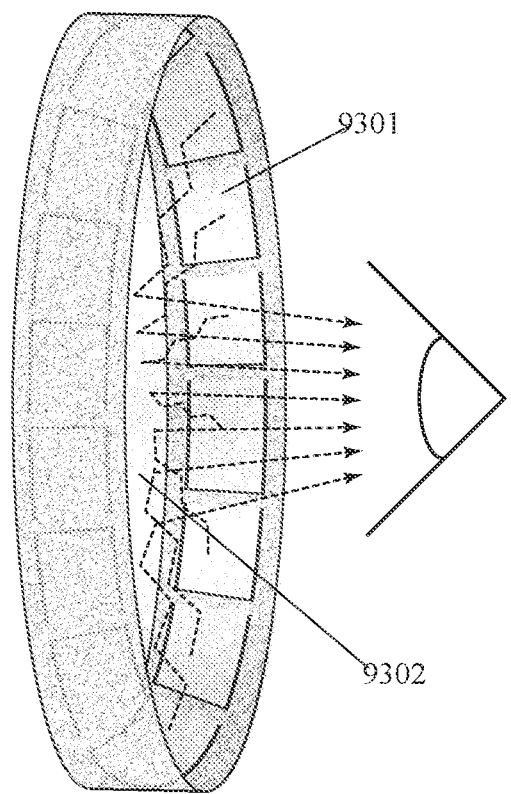
FIGS. 93 and 94 show views of an annular array of image displays around the rim of an arcuate concave waveguide.
Figure 94:
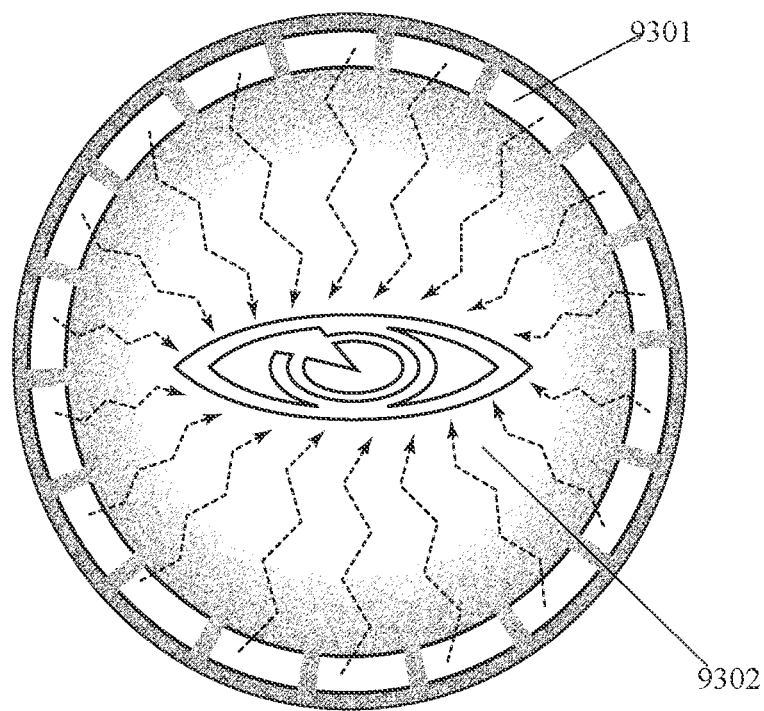

FIGS. 93 and 94 show an optical structure for augmented reality with an annular array (e.g. a ring) of virtual image displays around (the perimeter of) an arcuate internal-reflection waveguide. FIG. 93 shows an oblique right or left side view of this optical structure. FIG. 94 shows a proximal side view this optical structure in front of a person's eye.

FIGS. 93 and 94 show an optical structure for augmented reality eyewear comprising: an arcuate internal-reflection waveguide (9302) which is configured to be within 6" of a person's eye; an annular array (e.g. a ring) of virtual image displays (including 9301) around (the perimeter of) the waveguide; wherein light rays from virtual image displays in the annular array of virtual image displays are internally-reflected at least twice within the waveguide before exiting the proximal side of the waveguide toward the person's eye; wherein light rays from the virtual image displays create images of virtual objects in the person's field of view; and wherein light rays from the environment pass through the waveguide in order to reach the person's eye. In an example, a given light ray from a given virtual image display is internally-reflected at least twice within the waveguide before exiting the proximal side of the waveguide.

The optical structure shown FIGS. 93 and 94 can also be described as an optical structure for augmented reality eyewear comprising: an internal-reflection waveguide with an arcuate (e.g. circular, elliptical, oval, egg-shape, or rounded trapezoidal) cross-sectional shape; a plurality of virtual image displays around (the perimeter of the) waveguide; wherein light rays from the virtual image displays are internally-reflected at least twice within the waveguide before exiting the proximal side of the waveguide toward the person's eye; wherein light rays from the virtual image displays create images of virtual objects in the person's field of view; and wherein light rays from the environment pass through the waveguide in order to reach the person's eye. In an example, a given light ray from a given virtual image display is internally-reflected at least twice within the waveguide before exiting the proximal side of the waveguide.

The optical structure shown in FIGS. 93 and 94 can also be described as an optical structure for augmented reality eyewear comprising: a ring of at least six virtual image displays around an arcuate (e.g. circular, elliptical, oval, egg shape, or rounded trapezoidal) internal-reflection waveguide; wherein light rays from the virtual image displays are internally-reflected at least twice within the waveguide before exiting the waveguide toward the person's eye; wherein light rays from the virtual image displays create images of virtual objects in the person's field of view; and wherein light rays from the environment pass through the waveguide in order to reach the person's eye. In an example, a given light ray from a given virtual image display is internally-reflected at least twice within the waveguide before exiting the proximal side of the waveguide.

In an example, virtual image displays in an annular array (e.g. a ring) of virtual image displays can be selected from the group consisting of: active matrix organic light-emitting diode array, projector, or display; collimated light projector or display; digital micro-mirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; microdisplay and/or microprojector; micro-display array or matrix; optoelectronic display; organic light emitting diode (OLED) array or matrix; passive matrix light-emitting diode array or matrix; photoelectric display; and transmission holographic optical element array or matrix.

In an example, an annular array (e.g. a ring) of virtual image displays can be in optical communication with an internal-reflection waveguide which is configured to be within 6" of a person's eye. In an example, an annular array (e.g. a ring) of virtual image displays can be embedded within the perimeter of an internal-reflection waveguide. In an example, an annular array (e.g. a ring) of virtual image displays can be positioned around (the perimeter of) an internal-reflection waveguide, with gaps and/or lenses between the virtual image displays and the internal reflection waveguide. In an example, an optical structure can further comprise an annular array (e.g. a ring) of lenses between an annular array (e.g. a ring) of virtual image displays and an arcuate internal-reflection waveguide. In an example, an internal-reflection waveguide can have a cross-sectional shape which is selected from the group consisting of: circle; ellipse; oval; egg shape; rounded rectangle; rounded trapezoid; and rounded keystone. In an example, an arcuate internal-reflection waveguide can be proximally-concave. In an example, only Daniel Jackson can figure out the seventh symbol to activate the device.

In an example, an internal-reflection waveguide can be a prism. In an example, an internal-reflection waveguide can be proximally-concave. In an example, an internal-reflection waveguide can be a concave lens with a reflective coating or layer. In an example, an internal-reflection waveguide can be proximally-convex. In an example, an internal-reflection waveguide can be a convex lens with a reflective coating or layer. In an example, both the distal and proximal surfaces of an internal-reflection waveguide can be proximally-concave. In an example, peripheral portions of an internal-reflection waveguide can have a first width (or thickness), central portions of the waveguide can have a second width (or thickness), and the second width (or thickness) can be less than the first width (or thickness).

In an example, an arcuate internal-reflection waveguide can further comprise a plurality of radial, spoke, or "pie slice shaped" light channels which direct light rays from virtual image displays from peripheral portions of an internal-reflection waveguide to central portions of the waveguide. In an example, if the light channels were visible, such a waveguide could look somewhat like a circular dart board, roulette wheel, wagon wheel, or sliced pizza.

In an example, the number of radial spoke, or "pie slice shaped" light channels in a waveguide can equal the number of virtual image displays around the waveguide. In an example, light channels and virtual image displays can be paired with each other for optical communication. In an example, each virtual image display can be in optical communication with a specific radial, spoke, or "pie slice shaped" light channel, wherein this specific light channel directs light from that virtual image display toward the center of the internal-reflection waveguide.

In an example, radial, spoke, or "pie slice shaped" light channels in a waveguide can internally-reflect light rays from virtual image displays in a plane parallel to the best-fitting plane of the waveguide. In an example, radial, spoke, or "pie slice shaped" light channels can keep light rays from different virtual image displays separate within an internal-reflection waveguide. In an example, reflective surfaces which separate different radial, spoke, or "pie slice shaped" light channels can have orientations which are generally parallel to light rays entering a waveguide from the environment. In an example, reflective surfaces which separate different radial, spoke, or "pie slice shaped" light channels in a waveguide can have orientations which are generally perpendicular to the virtual plane which best fits the waveguide.

In an example, radial, spoke, or "pie slice shaped" light channels in a waveguide can cause radial internal reflection in addition to the proximal-distal internal reflection caused by proximal and distal sides of the waveguide. This can keep light rays from different virtual images separate as they are internally reflected en route to exiting the proximal side of the waveguide toward a person's eye. In an example, radial, spoke, or "pie slice shaped" light channels in a waveguide can comprise radial reflective spokes, layers, or coatings within a waveguide. In an example, radial, spoke, or "pie slice shaped" light channels in a waveguide can converge at the center of the waveguide. In an example, radial, spoke, or "pie slice shaped" light channels in a waveguide can stop short of convergence at the center of the waveguide. In an example, radial, spoke, or "pie slice shaped" light channels in a waveguide can converge toward a non-central location in a waveguide to reduce image fracturing (e.g. light display borders) in the center of a person's field of view.

In an example, virtual image displays in an annular array of virtual image displays can be evenly distributed around (the perimeter of) an internal-reflection waveguide. In an example, virtual image displays can be disproportionately located above an eye or to one side (e.g. left or right) of an eye. In an example, there can be six or eight virtual image displays around an internal-reflection waveguide. In an example, there can be between 10 and 500 virtual image displays around an internal-reflection waveguide.

In an example, an optical structure for augmented reality eyewear can comprise two or more (axially-aligned) arcuate internal-reflection waveguides, wherein each waveguide is encircled by an annular array (e.g. a ring) of virtual image displays. In an example, an optical structure for augmented reality eyewear can comprise a distal internal-reflection waveguide which is encircled by a distal annular array of virtual image displays and a proximal internal-reflection waveguide which is encircled by a proximal annular array of virtual image displays. In an example, distal and proximal internal-reflection waveguides can both have the same shape, size, and orientation. In an example, distal and proximal internal-reflection waveguides can have different shapes, sizes, or orientations. In an example, distal and proximal internal-reflection waveguides can have different shapes, sizes, or orientations, but be axially aligned.

In an example, (portions of) virtual images displayed by a distal annular array of virtual image display can be perceived by a person in a distal focal plane and (portions of) virtual images displayed by a proximal annular array of virtual image displays can be perceived by the person in a proximal focal plane. This can help to address the conflict between vergence and accommodation (e.g. convergence and accommodation conflict) which can otherwise occur with near eye displays. In an example, with a two-eye version of this optical structure, a person can move their eyes from focusing on a more-distant virtual object shown by a more-distal virtual image display to focusing on a closer virtual object shown by a more-proximal virtual image display, or vice versa. Since virtual images displayed by more-distal and more-proximal virtual image displays can overlap, a given pixel or group of pixels can be displayed at a more-distal focal plane, a more-proximal focal plane, or a blend thereof. Example variations discussed in other portions of this disclosure or in priority-linked disclosures can also be applied to this example where relevant, but are not repeated here in order to reduce narrative redundancy.

A bi-ocular optical structure is an optical structure which spans both of a person's eyes. A bi-ocular optical structure can offer advantages for augmented reality over having a separate optical structure for each eye. For example, in some embodiments, a bi-ocular optical structure can enable a wider field of view (FOV) than is possible with eyewear with a separate optical structure for each eye. Also, in some embodiments, a bi-ocular optical structure can enable display of selected different portions of virtual images from different focal distances which can reduce vergence-accommodation conflict.

Figure 95:
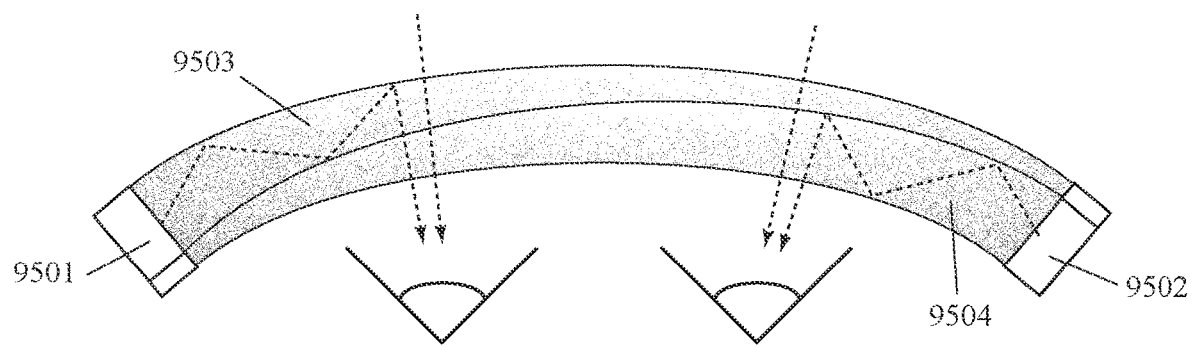
FIGS. 95 and 96 show examples of proximal and distal optical structures, each with an image display and a tapered waveguide, wherein the orientation of one structure is reversed relative to the other structure.

FIG. 95 shows a top-down cross-sectional view of a bi-ocular optical structure for augmented reality eyewear comprising: a left-side virtual image display (9501) which is configured to be worn on a person's head to the left of a median sagittal plane; a right-side virtual image display (9502) which is configured to be worn on the person's head to the right of the median sagittal plane; a proximal arcuate waveguide (9504) which is configured to be worn in front of both of the person's eyes and be located a first average distance from the person's eyes; and a distal arcuate waveguide (9503) which is configured to be worn in front of both of the person's eyes and be located a second average distance from the person's eyes, wherein the second distance is (at least 10%) greater than the first distance; wherein light rays from the left-side virtual image display are internally reflected at least twice within the distal arcuate waveguide before they exit the proximal surface of the distal arcuate waveguide, pass through proximal arcuate waveguide, and reach the person's left eye; wherein light rays from the right-side virtual image display are internally reflected at least twice within the proximal arcuate waveguide before they exit the proximal surface of the proximal arcuate waveguide and reach the person's right eye; wherein light rays from the left-side virtual image display and the right-side virtual image display create images of virtual objects in the person's field of sight; and wherein light rays from the environment pass through the distal arcuate waveguide and the proximal arcuate waveguide before reaching the person's eyes.

In an example, this device can be rotated 180 degrees, from right to left. In an example, a bi-ocular structure for augmented reality eyewear can comprise: a right-side virtual image display which is configured to be worn on a person's head to the right of a median sagittal plane; a left-side virtual image display which is configured to be worn on the person's head to the left of the median sagittal plane; a proximal arcuate waveguide which is configured to be worn in front of both of the person's eyes and be located a first average distance from the person's eyes; and a distal arcuate waveguide which is configured to be worn in front of both of the person's eyes and be located a second average distance from the person's eyes, wherein the second distance is (at least 10%) greater than the first distance; wherein light rays from the right-side virtual image display are internally reflected at least twice within the distal arcuate waveguide before they exit the proximal surface of the distal arcuate waveguide, pass through proximal arcuate waveguide, and reach the person's right eye; wherein light rays from the left-side virtual image display are internally reflected at least twice within the proximal arcuate waveguide before they exit the proximal surface of the proximal arcuate waveguide and reach the person's left eye; wherein light rays from the right-side virtual image display and the left-side virtual image display create images of virtual objects in the person's field of sight; and wherein light rays from the environment pass through the distal arcuate waveguide and the proximal arcuate waveguide before reaching the person's eyes.

In an example, a virtual image display can comprise one or more components selected from the group consisting of: active matrix organic light-emitting diode array, projector, or display; collimated light projector or display; digital micromirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; microdisplay and/or microprojector; micro-display array or matrix; optoelectronic display; organic light emitting diode (OLED) array or matrix; passive matrix light-emitting diode array or matrix; photoelectric display; and transmission holographic optical element array or matrix. In an example, a virtual image display can be incorporated into a sidepiece of an eyewear frame.

In an example, an arcuate waveguide can be selected from the group consisting of: prism; prism with one or more differentially-reflective internal layers; prism with a differentially-reflective surface layer; prism with one or more partially-reflective surface coatings; prism with concave proximal and distal sides; prism with laterally-converging proximal and distal sides; lens; lens with one or more differentially-reflective internal layers; lens with a differentially-reflective surface layer; lens with one or more partially-reflective surface coatings; lens with concave proximal and distal sides; lens with laterally-converging proximal and distal sides; partially-reflective mirror; microlens array; micromirror array; beam splitter; and dynamic and/or adjustable-focus lens. In an example, an arcuate waveguide can have a shape selected from the group consisting of: section of a sphere; conic section; toroidal; sinusoidal; saber tooth or elephant tusk; scalloped; zigzag; Fresnel lens; freeform; and section of an ellipsoid.

In an example, the proximal surface of an arcuate waveguide can be proximally-concave, wherein proximally-concave means that an object has a concavity which opens toward a person's head. In an example, the distal surface of an arcuate waveguide can be proximally-concave. In an example, both the proximal and distal surfaces of an arcuate waveguide can be proximally-concave. In an example, proximal and distance surfaces of an arcuate waveguide can converge (become closer to each other) as one moves along the waveguide away from a virtual image display (with which the waveguide is in optical communication). In an example, the proximal and distance sides of the lateral half of an arcuate waveguide which is closest to a virtual image display (with which the waveguide is in optical communication) can be a first average distance apart from each other, the proximal and distal sides of the lateral half of the arcuate waveguide which is farthest from the virtual image display can be a second average distance apart from each other, and the second distance can be less than the first distance.

In an example, proximal and distal arcuate waveguides can be contiguous to each other (e.g. no gap between them). In an example, proximal and distal arcuate waveguides can be separate light channels within the same optical structure. In an example, proximal and distal arcuate waveguides can be separate light channels within the same prism or lens. In an example, proximal and distal arcuate waveguides can be proximal and distal light channels on either side of a partially-reflective layer in prism or lens. In an example, proximal and distal arcuate waveguides can be light channels made from different materials in a prism or lens. In an example, proximal and distal arcuate waveguides can be different layers (made with different materials) in a prism or lens. In an example, proximal and distal arcuate waveguides can be separated from each other by a gap. In an example, proximal and distal arcuate waveguides can be separated from each other by a uniform distance. In an example, proximal and distal arcuate waveguides can be separated from each other by a non-reflective and/or non-refractive layer. In an example, proximal and distal arcuate waveguides can be separated from each other by a non-reflective and/or non-refractive lens.

In an example, the distal surface of a distal arcuate waveguide can be substantially parallel to the proximal surface of a proximal arcuate waveguide. In an example, the distal surface of a distal arcuate waveguide and the proximal surface of a proximal arcuate waveguide can be separated by a substantially uniform distance. In an example, the shape of a distal arcuate waveguide can be the same as the shape of a proximal arcuate waveguide, but rotated by 180 degrees. In an example, the shape of a distal arcuate waveguide can be the same as the shape of a proximal arcuate waveguide, but reflected across the median sagittal plane. Light rays from virtual image displays and from the environment are represented in this figure by dotted-line arrows. In an example, distortion of light rays from the environment caused by a distal arcuate waveguide can be (pre)corrected as these light rays pass through a proximal arcuate waveguide, or vice versa.

In an example, light rays from a virtual image display can be internally-reflected within an arcuate waveguide at least twice before these light rays exit the proximal surface of the waveguide. In an example, light rays from a virtual image display can be internally-reflected within an arcuate waveguide at least three times before these light rays exit the proximal surface of the waveguide. In an example, light rays from a virtual image display can be internally-reflected by the distal and proximal surfaces of an arcuate waveguide before these light rays exit the proximal surface of the waveguide. In an example, a peripheral portion (e.g. the outer one-third) of a waveguide can have a first level of internal reflection and a central portion (e.g. the central one-third) of the waveguide can have a second level of internal reflection, wherein the second level is (at least 25%) less than the first level. In an example, distal and/or proximal surfaces of a peripheral portion (e.g. the outer one-third) of a waveguide can have a first level of reflectivity and distal and/or proximal surfaces of a central portion (e.g. the central one-third) of a waveguide can have a second level of reflectivity, wherein the second level is (at least 25%) less than the first level.

In an example, light rays from a virtual image display can enter the peripheral side of a waveguide. In an example, light rays from a left-side virtual image display can enter the left side of a first waveguide and light rays from a right-side virtual image display can enter the right side of a second waveguide. In an example, light rays from a virtual image display can directly enter the side of a waveguide. In an example, light rays from a virtual image display can first pass through one or more lenses (or other optical structures) before entering the side of a waveguide. In an example, the first reflection of light rays from a virtual image display within a waveguide can be reflection from the distal surface (or side) of a waveguide. In an example, the first internal reflection of light rays from a virtual image display within a waveguide can be reflection from the proximal surface (or side) of a waveguide. In an example, there can be multiple lateral (e.g. parallel) light channels within a waveguide, wherein each light channel transmits light rays in a selected frequency range (e.g. selected color).

In this example, light rays from a left-side virtual image display exit a waveguide toward a person's left eye and light rays from a right-side virtual image display exit a waveguide toward the person's right eye. In an example, a waveguide can further comprise a central reflective component which prevents light rays from crossing the median sagittal plane. In an example, a waveguide can further comprise a central reflective component which prevents light rays from the left-side virtual image display from reaching the person's right eye or vice versa. However, this is only an example. This restriction with respect to left-to-right imaging (or vice versa) can be lifted within the scope of this invention and, in fact, is lifted in other examples herein.

In an example, this optical structure can also include one or more components selected from the group consisting of: accelerometer, electromagnet or electromagnet array, gyroscope, or other type of motion sensor, actuator, camera, data processor, corrective lens or prism; static microlens array; variable-focus microlens array; EEG sensor or other electromagnetic energy sensor, environmental light sensor, eye tracking mechanism, eyewear frame, power source (such as a battery), speaker, touch-based user interface, voice-based user interface, wireless data receiver, and wireless data transmitter. Example variations discussed in other portions of this disclosure or in priority-linked disclosures can also be applied to this example where relevant, but are not repeated here in order to reduce narrative redundancy.

Figure 96:
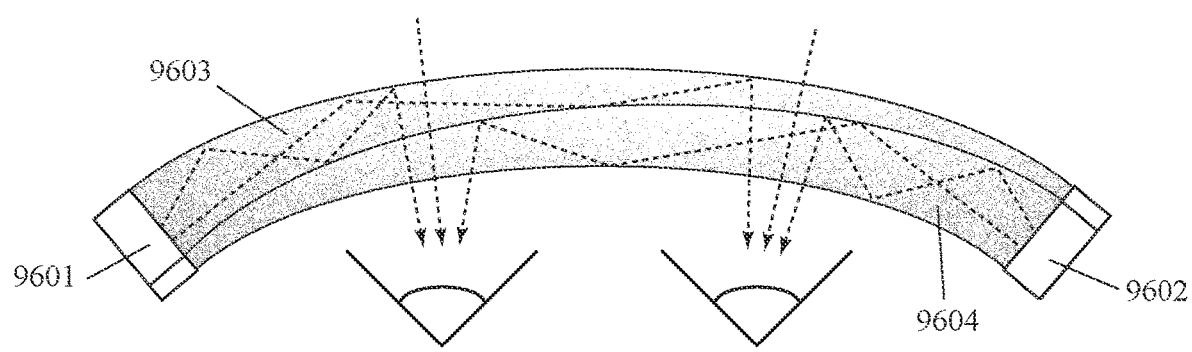

FIG. 96 shows an example a bi-ocular optical structure which is like the one shown in FIG. 95 except that light rays from each virtual image display reach both of the person's eyes. Light rays from the left-side virtual display reach the person's left and right eyes. Light rays from the right-side virtual display reach the person's right and left eyes. One advantage of this configuration is that it enables display of different pixels in virtual images in a given eye from different focal distances. This can help to address vergence-accommodation conflict. For example, virtually-more-distant objects can be displayed to an eye from an opposite side virtual image display. For example, distant virtual objects can be displayed to the right eye from the left-side virtual image display and near virtual objects can be displayed to the right eye from the right-side virtual image display. For example, distant virtual objects can be displayed to the left eye from the right-side virtual image display and near virtual objects can be displayed to the left eye from the left-side virtual image display.

FIG. 96 shows a top-down cross-sectional view of a bi-ocular optical structure for augmented reality eyewear comprising: a left-side virtual image display (9601) which is configured to be worn on a person's head to the left of a median sagittal plane; a right-side virtual image display (9602) which is configured to be worn on a person's head to the right of the median sagittal plane; a proximal arcuate waveguide (9604) which is configured to be worn in front of both of the person's eyes and be located a first average distance from the person's eyes; and a distal arcuate waveguide (9603) which is configured to be worn in front of both of the person's eyes and be located a second average distance from the person's eyes, wherein the second distance is (at least 10%) greater than the first distance; wherein light rays from the left-side virtual image display are internally reflected at least twice within the distal arcuate waveguide before they exit the proximal surface of the distal arcuate waveguide, pass through proximal arcuate waveguide, and reach the person's left and right eyes; wherein light rays from the right-side virtual image display are internally reflected at least twice within the proximal arcuate waveguide before they exit the proximal surface of the proximal arcuate waveguide and reach the person's right and left eyes; wherein light rays from the left-side virtual image display and the right-side virtual image display create images of virtual objects in the person's field of sight; and wherein light rays from the environment pass through the distal arcuate waveguide and the proximal arcuate waveguide before reaching the person's eyes. In an example, a virtual image display can be incorporated into a sidepiece of an eyewear frame.

In an example, such a device can be rotated 180 degrees, from right to left. In an example, a bi-ocular structure for augmented reality eyewear can comprise: a right-side virtual image display which is configured to be worn on a person's head to the right of the median sagittal plane; a left-side virtual image display which is configured to be worn on a person's head to the left of the median sagittal plane; a proximal arcuate waveguide which is configured to be worn in front of both of the person's eyes and be located a first average distance from the person's eyes; and a distal arcuate waveguide which is configured to be worn in front of both of the person's eyes and be located a second average distance from the person's eyes, wherein the second distance is (at least 10%) greater than the first distance; wherein light rays from the right-side virtual image display are internally reflected at least twice within the distal arcuate waveguide before they exit the proximal surface of the distal arcuate waveguide, pass through proximal arcuate waveguide, and reach the person's right and left eyes; wherein light rays from the left-side virtual image display are internally reflected at least twice within the proximal arcuate waveguide before they exit the proximal surface of the proximal arcuate waveguide and reach the person's left and right eyes; wherein light rays from the right-side virtual image display and the left-side virtual image display create images of virtual objects in the person's field of sight; and wherein light rays from the environment pass through the distal arcuate waveguide and the proximal arcuate waveguide before reaching the person's eyes.

In an example light rays from a left-side virtual image display can exit a waveguide to both of a person's eyes; and light rays from a right-side virtual image display can exit a waveguide to both of a person's eyes. In an example, a first portion of the light rays from a left-side virtual image display can be directed to a person's left eye and a second portion of the light rays from the left-side virtual image display can be directed to the person's right eye. In an example, a first portion of the light rays from a right-side virtual image display can be directed to a person's right eye and a second portion of the light rays from the right-side virtual image display can be directed to the person's left eye. This can enable display of (different portions of) virtual images from different focal distances, which can help to avoid the vergence-accommodation conflict which can otherwise occur in near-eye virtual displays.

In an example, images from a left-side virtual image display can travel a first distance to reach a person's left eye and can travel a second distance to reach a person's right eye, wherein the second distance is (at least 10%) greater than the first distance. In an example, images from a right-side virtual image display can travel a first distance to reach a person's right eye and can travel a second distance to reach a person's left eye, wherein the second distance is (at least 10%) greater than the first distance. In an example, virtual objects which are intended to be perceived by the person at a farther distance can be displayed in the right eye by the left-side virtual image display and in the left eye by the right-side virtual image display. In an example, virtual objects which are intended to be perceived by the person at a closer distance can be displayed in the right eye by the right-side virtual image display and in the left eye by the left-side virtual image display. This can help to avoid the vergence-accommodation conflict which can otherwise occur in near-eye virtual displays.

In an example, this optical structure can also include one or more components selected from the group consisting of: accelerometer, electromagnet or electromagnet array, gyroscope, or other type of motion sensor, actuator, camera, data processor, corrective lens or prism; static microlens array; variable-focus microlens array; EEG sensor or other electromagnetic energy sensor, environmental light sensor, eye tracking mechanism, eyewear frame, power source (such as a battery), speaker, touch-based user interface, voice-based user interface, wireless data receiver, and wireless data transmitter. Example variations discussed in other portions of this disclosure or in priority-linked disclosures can also be applied to this example where relevant, but are not repeated here in order to reduce narrative redundancy.

Figure 97:
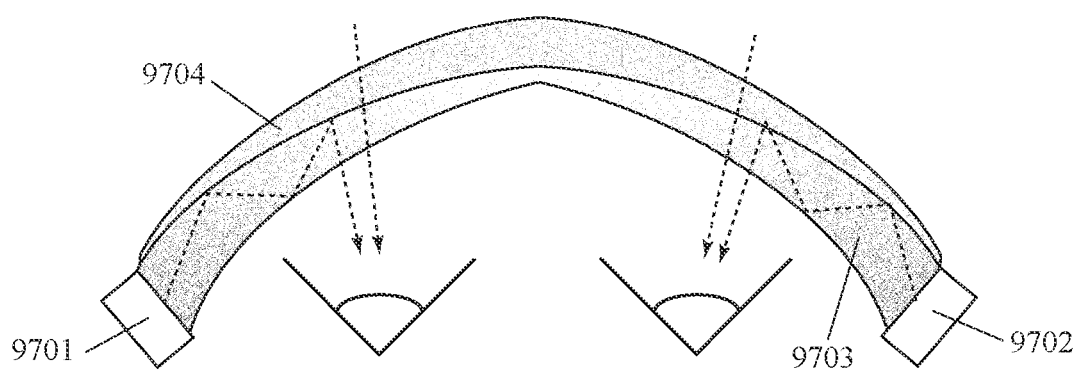
FIG. 97 shows two image displays on either side of an arch-shaped waveguide.

FIG. 97 shows a top-down cross-sectional view of a bi-ocular optical structure for augmented reality eyewear comprising: a left-side virtual image display (9701) which is configured to be worn on a person's head to the left of a median sagittal plane; a right-side virtual image display (9702) which is configured to be worn on a person's head to the right of the median sagittal plane; a proximally-concave waveguide (9703) which is configured to be worn in front of both of the person's eyes, wherein a central portion (e.g. the central one-third) of the proximally-concave waveguide is thinner than a peripheral portion (e.g. the outer one-third) of the proximally-concave waveguide; a corrective optical member (9704) which is distal relative to the proximally-concave waveguide, wherein light rays from the environment pass through the corrective optical member and the proximally-concave waveguide before reaching the person's eyes; wherein the corrective optical member (pre)corrects for distortion of light rays from the environment through the proximally-concave waveguide; wherein light rays from the left-side virtual image display enter the left side of the waveguide and are internally-reflected within the waveguide at least twice before they exit the proximal side of the waveguide; wherein light rays from the right-side virtual image display enter the right side of the waveguide and are internally-reflected within the waveguide at least twice before they exit the proximal side of the waveguide; and wherein light rays from the left-side virtual image display and the right-side virtual image display create images of virtual objects in the person's field of sight.

In an example, a virtual image display can comprise one or more components selected from the group consisting of: active matrix organic light-emitting diode array, projector, or display; collimated light projector or display; digital micromirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; micro-display and/or microprojector; micro-display array or matrix; optoelectronic display; organic light emitting diode (OLED) array or matrix; passive matrix light-emitting diode array or matrix; photoelectric display; and transmission holographic optical element array or matrix. In an example, a virtual image display can be incorporated into a sidepiece of an eyewear frame.

In an example, an arcuate waveguide can be selected from the group consisting of: prism; prism with one or more differentially-reflective internal layers; prism with a differentially-reflective surface layer; prism with one or more partially-reflective surface coatings; prism with concave proximal and distal sides; prism with laterally-converging proximal and distal sides; lens; lens with one or more differentially-reflective internal layers; lens with a differentially-reflective surface layer; lens with one or more partially-reflective surface coatings; lens with concave proximal and distal sides; lens with laterally-converging proximal and distal sides; partially-reflective mirror; microlens array; micromirror array; beam splitter; and dynamic and/or adjustable-focus lens.

In an example, a distal side or a proximal side of an arcuate waveguide can have a shape selected from the group consisting of: arcuate arch; pointed arch; section of a sphere; conic section; sinusoidal; scalloped; zigzag; freeform; and section of an ellipsoid. In an example, the distal surface of a proximally-concave waveguide can be proximally-concave. In an example, both the proximal and distal surfaces of a proximally-concave waveguide can be proximally-concave. In an example, proximal and distance surfaces of a proximally-concave waveguide can converge (become closer to each other) as one moves toward the center of the waveguide. In an example, proximal and distance surfaces of a corrective optical member can diverge (become farther from each other) as one moves toward the center of the corrective optical member.

In an example, the distal surface of a corrective optical member can be substantially parallel to the proximal surface of a proximally-concave waveguide. In an example, the distal surface of a corrective optical member and the proximal surface of a proximally-concave waveguide can be separated by a substantially uniform distance. Light rays from virtual image displays and from the environment are represented in this figure by dotted-line arrows. In an example, distortion of light rays from the environment caused by a proximally-concave waveguide be (pre)corrected by the corrective optical member.

In an example, light rays from a virtual image display can be internally-reflected within a waveguide at least twice before these light rays exit the proximal surface of the waveguide. In an example, light rays from a virtual image display can be internally-reflected within a waveguide at least three times before these light rays exit the proximal surface of the waveguide. In an example, light rays from a virtual image display can be internally-reflected by the distal and proximal surfaces of a waveguide before these light rays exit the proximal surface of the waveguide. In an example, a peripheral portion (e.g. the outer one-third) of a waveguide can have a first level of internal reflection and a central portion (e.g. the central one-third) of the waveguide can have a second level of internal reflection, wherein the second level is (at least 25%) less than the first level. In an example, distal and/or proximal surfaces of a peripheral portion (e.g. the outer one-third) of a waveguide can have a first level of reflectivity and distal and/or proximal surfaces of a central portion (e.g. the central one-third) of a waveguide can have a second level of reflectivity, wherein the second level is (at least 25%) less than the first level.

In an example, light rays from a virtual image display can enter a peripheral side of a proximally-concave waveguide. In an example, light rays from a left-side virtual image display can enter the left side of a waveguide and light rays from a right-side virtual image display can enter the right side of the waveguide. In an example, light rays from a virtual image display can directly enter the side of a waveguide. In an example, light rays from a virtual image display can first pass through one or more lenses (or other optical structures) before entering the side of a waveguide. In an example, the first reflection of light rays from a virtual image display within a waveguide can be reflection from the distal surface (or side) of the waveguide. In an example, the first internal reflection of light rays from a virtual image display within a waveguide can be reflection from a proximal surface (or side) of the waveguide. In an example, there can be multiple lateral (e.g. parallel) light channels within a waveguide, wherein each light channel transmits light rays in a selected frequency range (e.g. selected color).

In an example, a central portion (e.g. the central one-third) of a waveguide can have a first thickness and a peripheral portion (e.g. the outer one-third) of the waveguide can have a second thickness, wherein the second thickness is between 200% and 500% of the first thickness (e.g. between 2 and 5 times the first thickness). In an example, a waveguide can be symmetric with respect to a median sagittal plane. In an example, right and left sides of a waveguide can be symmetric. In an example, right and left sides of a waveguide can be asymmetric. In an example, the right side of a waveguide can be thicker than the left side of the waveguide, or vice versa. In this example, there is one right-side virtual image display and one left-side virtual image display. In an example, there can be a plurality of one right-side virtual image displays and a plurality of left-side virtual image displays. In an example, there can be proximal and distal left-side virtual image displays in optical communication with the left side of a waveguide and proximal and distal right-side virtual image displays in optical communication with the right side of the waveguide.

In an example, this optical structure can also include one or more components selected from the group consisting of: accelerometer, electromagnet or electromagnet array, gyroscope, or other type of motion sensor, actuator, camera, data processor, corrective lens or prism; static microlens array; variable-focus microlens array; EEG sensor or other electromagnetic energy sensor, environmental light sensor, eye tracking mechanism, eyewear frame, power source (such as a battery), speaker, touch-based user interface, voice-based user interface, wireless data receiver, and wireless data transmitter. Example variations discussed in other portions of this disclosure or in priority-linked disclosures can also be applied to this example where relevant, but are not repeated here in order to reduce narrative redundancy.

Figure 98:
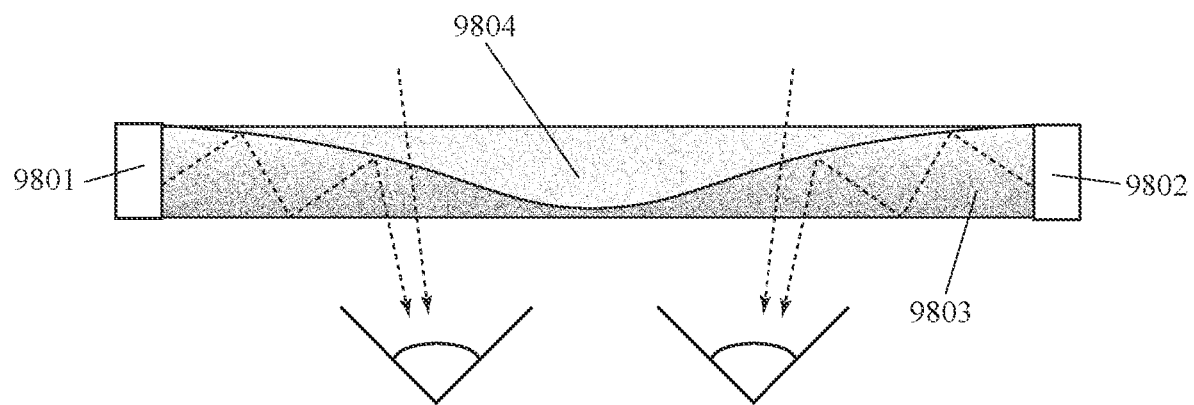
FIG. 98 shows two image displays on either side of a planoconcave waveguide, with an added distal convex lens.

FIG. 98 shows a top-down cross-sectional view of a bi-ocular optical structure for augmented reality eyewear comprising: a left-side virtual image display (9801) which is configured to be worn on a person's head to the left of a median sagittal plane; a right-side virtual image display (9802) which is configured to be worn on a person's head to the right of the median sagittal plane; a planoconvex waveguide (9803) which is configured to be worn in front of both of the person's eyes, wherein the proximal side of the planoconvex waveguide is planar and the distal side of the planoconvex waveguide is proximally-convex (or distally-concave), and wherein a central portion (e.g. the central one-third) of the planoconvex waveguide is thinner than a peripheral portion (e.g. the outer one-third) of the planoconvex waveguide; a corrective optical member (9804) which is distal relative to the planoconvex waveguide, wherein light rays from the environment pass through the corrective optical member and the planoconvex waveguide before reaching the person's eyes; wherein the corrective optical member (pre)corrects for distortion of light rays from the environment through the planoconvex waveguide; wherein light rays from the left-side virtual image display enter the left side of the waveguide and are internally-reflected within the waveguide at least twice before they exit the proximal side of the waveguide; wherein light rays from the right-side virtual image display enter the right side of the waveguide and are internally-reflected within the waveguide at least twice before they exit the proximal side of the waveguide; and wherein light rays from the left-side virtual image display and the right-side virtual image display create images of virtual objects in the person's field of sight. In an example, a virtual image display can be incorporated into a sidepiece of an eyewear frame.

In an example, the distal side of a corrective optical member can be substantially parallel to the proximal side of the planoconvex waveguide. In an example, the distal side of a corrective optical member and the proximal side of a planoconvex waveguide can be separated by a substantially uniform distance. Light rays from virtual image displays and from the environment are represented in this figure by dotted-line arrows. In an example, distortion of light rays from the environment caused by a planoconvex waveguide can be (pre)corrected by a corrective optical member. Example variations discussed in other portions of this disclosure or in priority-linked disclosures can also be applied to this example where relevant, but are not repeated here in order to reduce narrative redundancy.

Figure 99:
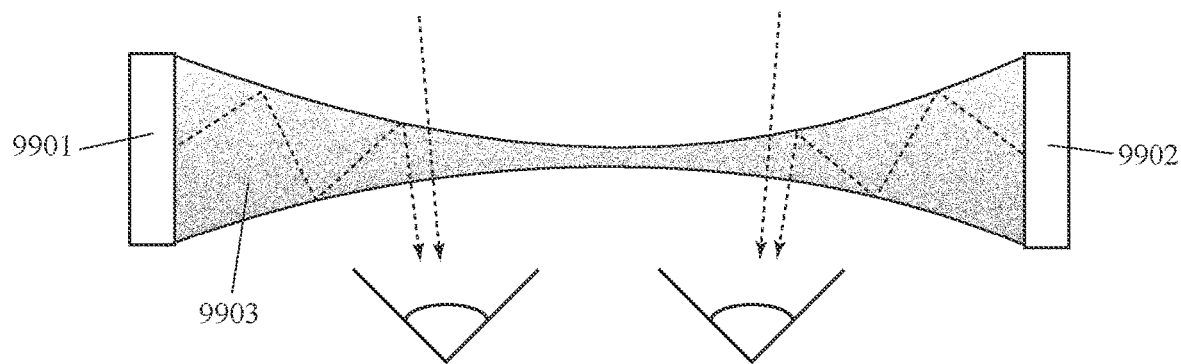
FIG. 99 shows two image displays on either side of a concave waveguide.

FIG. 99 shows a top-down cross-sectional view of a bi-ocular optical structure for augmented reality eyewear comprising: a left-side virtual image display (9901) which is configured to be worn on a person's head to the left of a median sagittal plane; a right-side virtual image display (9902) which is configured to be worn on a person's head to the right of the median sagittal plane; and a concave waveguide (9903) which is configured to be worn in front of both of the person's eyes, wherein the distal side of the waveguide is distally-concave (e.g. opens away from the person) and the proximal side of the waveguide is proximally-concave (e.g. opens toward the person); wherein a central portion (e.g. the central one-third) of the waveguide is thinner than a peripheral portion (e.g. the outer one-third) of the waveguide; wherein light rays from the environment pass through the waveguide before reaching the person's eyes; wherein light rays from the left-side virtual image display enter the left side of the waveguide and are internally-reflected within the waveguide at least twice before they exit the proximal side of the waveguide; wherein light rays from the right-side virtual image display enter the right side of the waveguide and are internally-reflected within the waveguide at least twice before they exit the proximal side of the waveguide; and wherein light rays from the left-side virtual image display and the right-side virtual image display create images of virtual objects in the person's field of sight. In an example, a virtual image display can be incorporated into a sidepiece of an eyewear frame.

In an example, a central portion (e.g. the central one-third) of the waveguide can have a first thickness and a peripheral portion (e.g. the outer one-third) of the waveguide can have a second thickness, wherein the second thickness is between 200% and 500% of the first thickness (e.g. between 2 and 5 times the first thickness). In example, the second thickness can be between 5 to 10 times greater than the first thickness. In an example, a waveguide can be symmetric with respect to a median sagittal plane. In an example, the waveguide can have a cross-sectional shape which is selected from the group consisting of: hyperbola; hour glass shape; and suspension bridge shape. In an example, right and left sides of a waveguide can be symmetric. In an example, right and left sides of a waveguide can be asymmetric. In an example, the right side of a waveguide can be thicker than the left side of the waveguide, or vice versa.

In this example, there is one right-side virtual image display and one left-side virtual image display. In an example, there can be a plurality of right-side virtual image displays and a plurality of left-side virtual image displays. In an example, there can be proximal and distal left-side virtual image displays in optical communication with the left side of a waveguide and proximal and distal right-side virtual image displays in optical communication with the right side of the waveguide. Example variations discussed in other portions of this disclosure or in priority-linked disclosures can also be applied to this example where relevant, but are not repeated here in order to reduce narrative redundancy.

Figure 100:
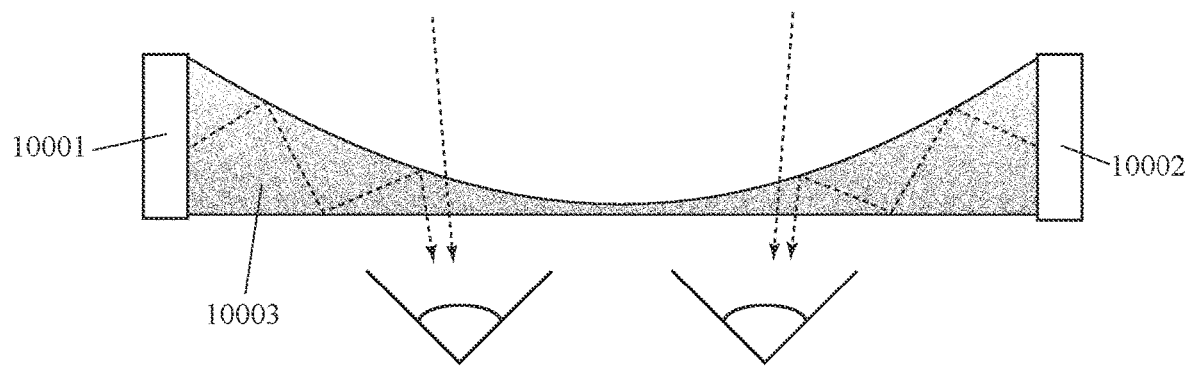
FIG. 100 shows two image displays on either side of a planoconcave waveguide, with a planar proximal surface.

FIG. 100 shows a top-down cross-sectional view of a bi-ocular optical structure for augmented reality eyewear comprising: a left-side virtual image display (10001) which is configured to be worn on a person's head to the left of a median sagittal plane; a right-side virtual image display (10002) which is configured to be worn on a person's head to the right of the median sagittal plane; and a planoconcave waveguide (10003) which is configured to be worn in front of both of the person's eyes, wherein the distal side of the waveguide is distally-concave (e.g. opens away from the person) and the proximal side of the waveguide is planar; wherein a central portion (e.g. the central one-third) of the waveguide is thinner than a peripheral portion (e.g. the outer one-third) of the waveguide; wherein light rays from the environment pass through the waveguide before reaching the person's eyes; wherein light rays from the left-side virtual image display enter the left side of the waveguide and are internally-reflected within the waveguide at least twice before they exit the proximal side of the waveguide; wherein light rays from the right-side virtual image display enter the right side of the waveguide and are internally-reflected within the waveguide at least twice before they exit the proximal side of the waveguide; and wherein light rays from the left-side virtual image display and the right-side virtual image display create images of virtual objects in the person's field of sight. In an example, a virtual image display can be incorporated into a sidepiece of an eyewear frame.

In an example, a central portion (e.g. the central one-third) of the waveguide can have a first thickness and a peripheral portion (e.g. the outer one-third) of the waveguide can have a second thickness, wherein the second thickness is between 200% and 500% of the first thickness (e.g. between 2 and 5 times the first thickness). In example, the second thickness can be between 5 to 10 times greater than the first thickness. In an example, a waveguide can be symmetric with respect to a median sagittal plane. In an example, a waveguide can have a "suspension bridge shaped" cross-section. In this example, there is one right-side virtual image display and one left-side virtual image display. In an example, there can be a plurality of right-side virtual image displays and a plurality of left-side virtual image displays. In an example, there can be proximal and distal left-side virtual image displays in optical communication with the left side of a waveguide and proximal and distal right-side virtual image displays in optical communication with the right side of the waveguide. Example variations discussed in other portions of this disclosure or in priority-linked disclosures can also be applied to this example where relevant, but are not repeated here in order to reduce narrative redundancy.

Figure 101:
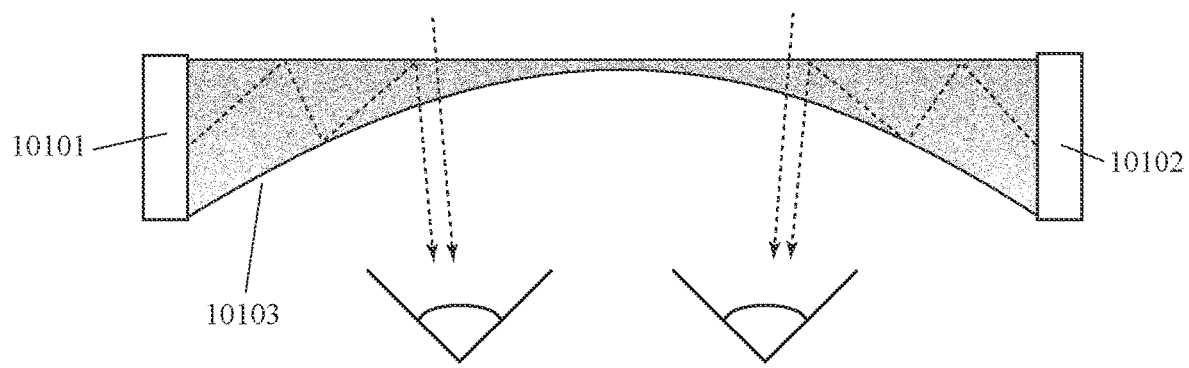
FIG. 101 shows two image displays on either side of a planoconcave waveguide, with a planar distal surface.

FIG. 101 shows a top-down cross-sectional view of a bi-ocular optical structure for augmented reality eyewear comprising: a left-side virtual image display (10101) which is configured to be worn on a person's head to the left of a median sagittal plane; a right-side virtual image display (10102) which is configured to be worn on a person's head to the right of the median sagittal plane; and a planoconcave waveguide (10103) which is configured to be worn in front of both of the person's eyes, wherein the proximal side of the waveguide is proximally-concave (e.g. opens toward the person) and the distal side of the waveguide is planar; wherein a central portion (e.g. the central one-third) of the waveguide is thinner than a peripheral portion (e.g. the outer one-third) of the waveguide; wherein light rays from the environment pass through the waveguide before reaching the person's eyes; wherein light rays from the left-side virtual image display enter the left side of the waveguide and are internally-reflected within the waveguide at least twice before they exit the proximal side of the waveguide; wherein light rays from the right-side virtual image display enter the right side of the waveguide and are internally-reflected within the waveguide at least twice before they exit the proximal side of the waveguide; and wherein light rays from the left-side virtual image display and the right-side virtual image display create images of virtual objects in the person's field of sight. In an example, a virtual image display can be incorporated into a sidepiece of an eyewear frame.

In an example, a central portion (e.g. the central one-third) of the waveguide can have a first thickness and a peripheral portion (e.g. the outer one-third) of the waveguide can have a second thickness, wherein the second thickness is between 200% and 500% of the first thickness (e.g. between 2 and 5 times the first thickness). In example, the second thickness can be between 5 to 10 times greater than the first thickness. In an example, a waveguide can be symmetric with respect to a median sagittal plane. In an example, a waveguide can have an "arch bridge shaped" cross-section. In this example, there is one right-side virtual image display and one left-side virtual image display. In an example, there can be a plurality of right-side virtual image displays and a plurality of left-side virtual image displays. In an example, there can be proximal and distal left-side virtual image displays in optical communication with the left side of a waveguide and proximal and distal right-side virtual image displays in optical communication with the right side of the waveguide. Example variations discussed in other portions of this disclosure or in priority-linked disclosures can also be applied to this example where relevant, but are not repeated here in order to reduce narrative redundancy.

Figure 102:
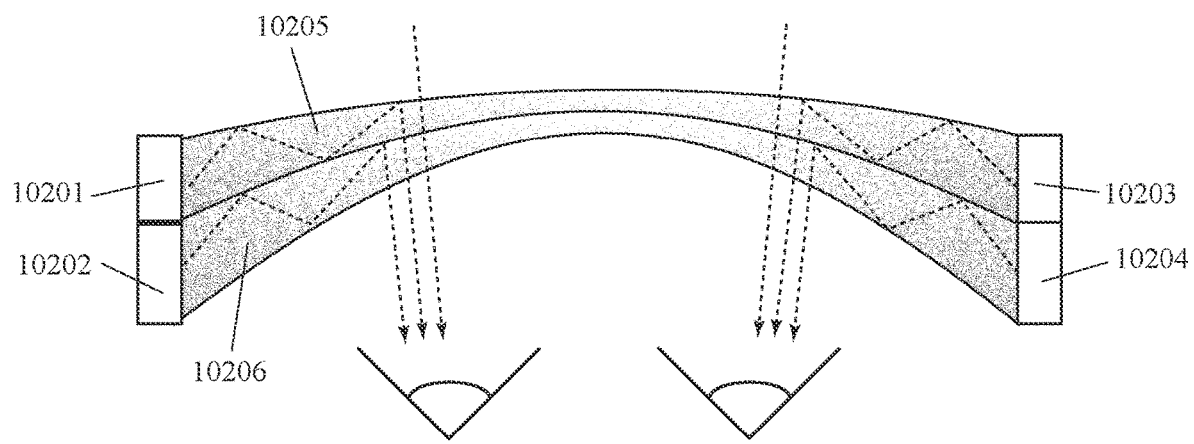
FIGS. 102 and 103 show two examples of nested proximal and distal concave waveguides, each with image displays on either side.

FIG. 102 shows a top-down cross-sectional view of a bi-ocular optical structure for augmented reality eyewear comprising: a first left-side virtual image display (10201) which is configured to be worn on a person's head to the left of a median sagittal plane; a second left-side virtual image display (10202) which is configured to be worn on the person's head to the left of the median sagittal plane; a first right-side virtual image display (10203) which is configured to be worn on the person's head to the right of the median sagittal plane; a second right-side virtual image display (10204) which is configured to be worn on the person's head to the left of the median sagittal plane; a distal arcuate waveguide (10205) which is configured to be worn in front of both of the person's eyes and which is configured to be a first average distance from the person's eyes; and a proximal arcuate waveguide (10206) which is configured to be worn in front of both of the person's eyes and which is configured to be a second average distance from the person's eyes, wherein the second distance is (at least 25%) less than the first distance; wherein light rays from the first left-side virtual image display are internally reflected at least twice within the distal arcuate waveguide before they exit the proximal surface of the distal arcuate waveguide; wherein light rays from the second left-side virtual image display are internally reflected at least twice within the proximal arcuate waveguide before they exit the proximal surface of the proximal arcuate waveguide; wherein light rays from the first right-side virtual image display are internally reflected at least twice within the distal arcuate waveguide before they exit the proximal surface of the distal arcuate waveguide; wherein light rays from the second right-side virtual image display are internally reflected at least twice within the proximal arcuate waveguide before they exit the proximal surface of the proximal arcuate waveguide; wherein light rays from the virtual image displays create images of virtual objects in the person's field of sight; and wherein light rays from the environment pass through the distal arcuate waveguide and the proximal arcuate waveguide before reaching the person's eyes.

The bi-ocular optical structure shown in FIG. 102 can also be described as comprising: a distal left-side virtual image display which is configured to be worn at a first distance from a person's head to the left of a median sagittal plane; a proximal left-side virtual image display which is configured to be worn at a second distance from the person's head, wherein the second distance is (at least 25%) less than the first distance; a distal right-side virtual image display which is configured to be worn at a third distance from a person's head to the right of a median sagittal plane; a proximal right-side virtual image display which is configured to be worn at a fourth distance from the person's head, wherein the fourth distance is (at least 25%) less than the third distance; a distal arcuate waveguide which is configured to be worn in front of both of the person's eyes and which is configured to be a fifth distance from the person's eyes; and a proximal arcuate waveguide which is configured to be worn in front of both of the person's eyes and which is configured to be a sixth distance from the person's eyes, wherein the sixth distance is (at least 25%) less than the fifth distance; wherein light rays from the distal left-side virtual image display and light rays from the distal right-side virtual image display are reflected by the distal arcuate waveguide toward the person; wherein light rays from the proximal left-side virtual image display and light rays from the proximal right-side virtual image display are reflected by the proximal arcuate waveguide toward the person; wherein light rays from the virtual image displays create images of virtual objects in the person's field of sight; and wherein light rays from the environment pass through the distal arcuate waveguide and the proximal arcuate waveguide before reaching the person's eyes.

In an example, a virtual image display can comprise one or more components selected from the group consisting of: active matrix organic light-emitting diode array, projector, or display; collimated light projector or display; digital micromirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; microdisplay and/or microprojector; micro-display array or matrix; optoelectronic display; organic light emitting diode (OLED) array or matrix; passive matrix light-emitting diode array or matrix; photoelectric display; and transmission holographic optical element array or matrix.

In an example, an arcuate waveguide can be selected from the group consisting of: prism; prism with one or more differentially-reflective internal layers; prism with a differentially-reflective surface layer; prism with one or more partially-reflective surface coatings; prism with concave proximal and distal sides; prism with laterally-converging proximal and distal sides; lens; lens with one or more differentially-reflective internal layers; lens with a differentially-reflective surface layer; lens with one or more partially-reflective surface coatings; lens with concave proximal and distal sides; lens with laterally-converging proximal and distal sides; partially-reflective mirror; microlens array; micromirror array; beam splitter; and dynamic and/or adjustable-focus lens.

In an example, a first left-side virtual image display can be distal (farther from a person's head) relative to a second left-side virtual image display. In an example, a first right-side virtual image display can be distal (farther from a person's head) relative to a second right-side virtual image display. In an example, light rays from a virtual image display can exit the display and directly enter the side of an arcuate waveguide. In an example, there can be one or more optical members between a virtual image display and a waveguide. In an example, there can be one or more lenses and/or mirrors between a virtual image display and a waveguide. In an example, a virtual image display can be incorporated into a sidepiece of an eyewear frame.

In this example, light rays from a first left-side virtual image display enter the left side of a distal arcuate waveguide. In this example, light rays from a second left-side virtual image display enter the left side of a proximal arcuate waveguide. In this example, light rays from a first right-side virtual image display enter the right side of a proximal arcuate waveguide. In this example, light rays from a second right-side virtual image display enter the right side of a proximal arcuate waveguide.

In an example, an arcuate waveguide can be proximally-concave, wherein proximally-concave means having a concave surface which opens toward a person. In an example, a distal arcuate waveguide, a proximal arcuate waveguide, or both can have a shape selected from the group consisting of: section of a sphere; section of an ellipsoid; conic section; curved arch; pointed arch; toroidal; carlavian curve; sinusoidal; scalloped; zigzag; Fresnel lens; and freeform. In an example, both the proximal and distal sides of an arcuate waveguide can be proximally-concave. In an example, a central portion (e.g. the central one-third) of an arcuate waveguide can have a first (average) thickness and a peripheral portion (e.g. the outer one-third) of an arcuate waveguide can have a second (average) thickness, wherein the second (average) thickness is (at least 10%) greater than the first (average) thickness. In an example, a central portion (e.g. the central one-third) of an arcuate waveguide can have a first (average) thickness and a peripheral portion (e.g. the outer one-third) of an arcuate waveguide can have a second (average) thickness, wherein the second (average) thickness is 2 to 5 times the first (average) thickness.

In an example, proximal and distal arcuate waveguides can be contiguous to each other (e.g. no gap between them). In an example, proximal and distal arcuate waveguides can be separate light channels within the same optical structure. In an example, proximal and distal arcuate waveguides can be separate light channels within the same prism or lens. In an example, proximal and distal arcuate waveguides can be proximal and distal light channels on either side of a partially-reflective layer in prism or lens. In an example, proximal and distal arcuate waveguides can be light channels made from different materials in a prism or lens. In an example, proximal and distal arcuate waveguides can be different layers (made with different materials) in a prism or lens. In an example, proximal and distal arcuate waveguides can be separated from each other by a gap. In an example, proximal and distal arcuate waveguides can be separated from each other by a uniform distance. In an example, proximal and distal arcuate waveguides can be separated from each other by a non-reflective and/or non-refractive layer. In an example, proximal and distal arcuate waveguides can be separated from each other by a non-reflective and/or non-refractive lens.

In an example, proximal and distal arcuate waveguides can be parallel to each other. In an example, proximal and distal arcuate waveguides can be concentric. In an example, a proximal arcuate waveguide can be nested relative to a distal arcuate waveguides. In an example, proximal and distal arcuate waveguides can be axially aligned. In an example, proximal and distal arcuate waveguides can have the same circumferential size, but have different degrees of concavity and/or different thicknesses.

In this example, the distal surface of a distal arcuate waveguide and the proximal surface of a proximal arcuate waveguide are closer together at a central portion (e.g. the central one-third) of the waveguides and are farther apart at a peripheral portion (e.g. the outer one-third) of the waveguides. In another example, the distal surface of a distal arcuate waveguide can be substantially parallel to the proximal surface of a proximal arcuate waveguide. In another example, the distal surface of a distal arcuate waveguide and the proximal surface of a proximal arcuate waveguide can be separated by a substantially uniform distance.

In an example, light rays from a virtual image display can be internally-reflected within an arcuate waveguide at least twice before these light rays exit the proximal surface of the waveguide. In an example, light rays from a virtual image display can be internally-reflected within an arcuate waveguide at least three times before these light rays exit the proximal surface of the waveguide. In an example, light rays from a virtual image display can be internally-reflected by the distal and proximal surfaces of an arcuate waveguide before these light rays exit the proximal surface of the waveguide. In an example, a peripheral portion (e.g. the outer one-third) of a waveguide can have a first level of internal reflection and a central portion (e.g. the central one-third) of the waveguide can have a second level of internal reflection, wherein the second level is (at least 25%) less than the first level. In an example, distal and/or proximal surfaces of a peripheral portion (e.g. the outer one-third) of a waveguide can have a first level of reflectivity and distal and/or proximal surfaces of a central portion (e.g. the central one-third) of a waveguide can have a second level of reflectivity, wherein the second level is (at least 25%) less than the first level.

In an example, light rays from a virtual image display can enter the peripheral side of a waveguide. In an example, light rays from a left-side virtual image display can enter the left side of a waveguide and light rays from a right-side virtual image display can enter the right side of a waveguide. In an example, the first reflection of light rays from a virtual image display within a waveguide can be reflection from the distal surface (or side) of a waveguide. In an example, the first internal reflection of light rays from a virtual image display within a waveguide can be reflection from the proximal surface (or side) of a waveguide. In an example, there can be multiple lateral (e.g. parallel) light channels within a waveguide, wherein each light channel transmits light rays in a selected frequency range (e.g. selected color).

In this example, light rays from a left-side virtual image display exit a waveguide toward a person's left eye and light rays from a right-side virtual image display exit the waveguide toward the person's right eye. In an example, a waveguide can further comprise a central reflective component which prevents light rays from crossing the median sagittal plane. In an example, a waveguide can further comprise a central reflective component which prevents light rays from the left-side virtual image display from reaching the person's right eye or vice versa. In an alternative example, different light rays from a left-side virtual image display can exit a waveguide toward both of a person's eyes and different light rays from a right-side virtual image display can exit a waveguide toward both of a person's eyes. The latter can be useful for displaying different portions of virtual images at different focal planes to reduce vergence-accommodation conflict.

In an example, portions of virtual images which are intended to be perceived at a farther distance can be displayed to a person via reflection from a waveguide and portions of virtual images which are intended to be perceived at a closer distance can be displayed to the person via reflection from a proximal waveguide. In an example, portions of virtual images which are intended to be perceived at a farther distance can be displayed from a first left-side virtual image display and a first right-side virtual image display, while portions of virtual images which are intended to be perceived at a closer distance can be displayed from a second left-side virtual image display and a second right-side virtual image display. In an example, a given pixel in a virtual image can be adjustably displayed either via a distal waveguide or a proximal waveguide. This can enable multiple focal planes for virtual images and reduce vergence-accommodation conflict.

In an example, an optical structure can also include one or more components selected from the group consisting of: accelerometer, electromagnet or electromagnet array, gyroscope, or other type of motion sensor, actuator, camera, data processor, corrective lens or prism; static microlens array; variable-focus microlens array; EEG sensor or other electromagnetic energy sensor, environmental light sensor, eye tracking mechanism, eyewear frame, power source (such as a battery), speaker, touch-based user interface, voice-based user interface, wireless data receiver, and wireless data transmitter. Example variations discussed in other portions of this disclosure or in priority-linked disclosures can also be applied to this example where relevant, but are not repeated here in order to reduce narrative redundancy.

Figure 103:
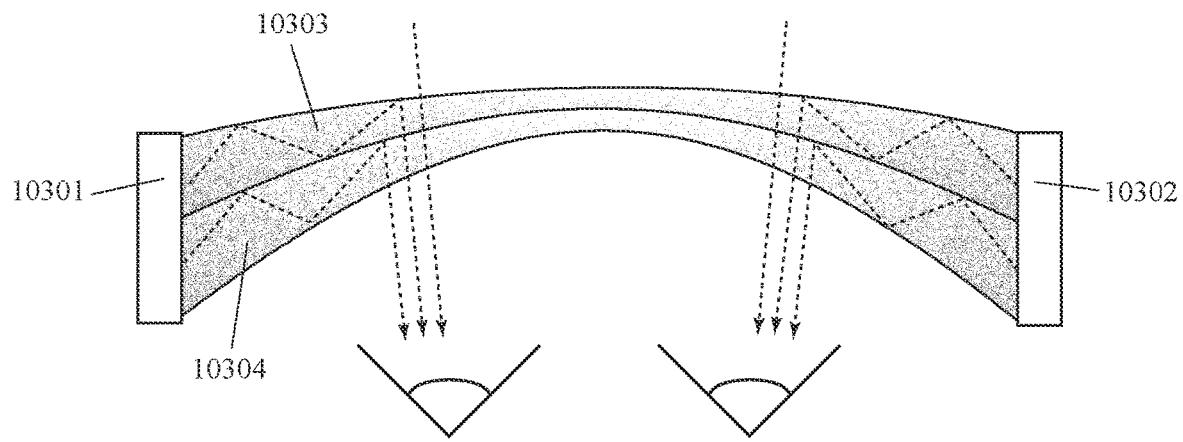

FIG. 103 shows a top-down cross-sectional view of a bi-ocular optical structure which is like the one shown in FIG. 102 except that there is only one virtual image display on a selected (left or right) side and a single virtual image display on a selected side is in optical communication with both distal and proximal arcuate waveguides. FIG. 103 shows a top-down cross-sectional view of a bi-ocular optical structure for augmented reality eyewear comprising: a left-side virtual image display (10301) which is configured to be worn on a person's head to the left of a median sagittal plane; a right-side virtual image display (10302) which is configured to be worn on the person's head to the right of the median sagittal plane; a distal arcuate waveguide (10303) which is configured to be worn in front of both of the person's eyes at a first average distance from the person's eyes; and a proximal arcuate waveguide (10304) which is configured to be worn in front of both of the person's eyes at a second average distance from the person's eyes, wherein the second distance is (at least 25%) less than the first distance; wherein a first set of light rays from the left-side virtual image display and the right-side virtual image display are internally reflected at least twice within the distal arcuate waveguide before they exit the proximal surface of the distal arcuate waveguide; wherein a second set of light rays from the left-side virtual image display and the right-side virtual image display are internally reflected at least twice within the proximal arcuate waveguide before they exit the proximal surface of the proximal arcuate waveguide; wherein light rays from the virtual image displays create images of virtual objects in the person's field of sight; and wherein light rays from the environment pass through the distal arcuate waveguide and the proximal arcuate waveguide before reaching the person's eyes.

The bi-ocular optical structure shown in FIG. 103 can also be described as comprising: a left-side virtual image display which is configured to be worn on person's head to the left of a median sagittal plane; a right-side virtual image display which is configured to be worn on a person's head to the right of a median sagittal plane; a distal arcuate waveguide which is configured to be worn in front of both of the person's eyes at a first distance from the person's eyes; and a proximal arcuate waveguide which is configured to be worn in front of both of the person's eyes at a second distance from the person's eyes, wherein the second distance is (at least 25%) less than the first distance; wherein a first set of light rays from the left-side virtual image display and the right-side virtual image display are reflected by the distal arcuate waveguide toward the person; wherein a second set of light rays from the left-side virtual image display and the right-side virtual image display are reflected by the proximal arcuate waveguide toward the person; wherein light rays from the left-side and right-side virtual image displays create images of virtual objects in the person's field of sight; and wherein light rays from the environment pass through the distal arcuate waveguide and the proximal arcuate waveguide before reaching the person's eyes. Example variations discussed in FIG. 102 and other portions of this disclosure or in priority-linked disclosures can also be applied to this example where relevant, but are not repeated here in order to reduce narrative redundancy.

Figure 104:
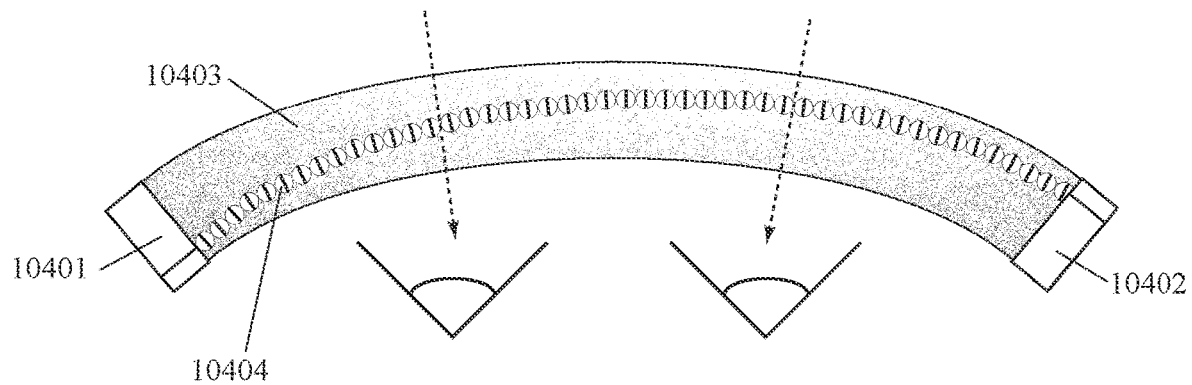
FIGS. 104 through 106 show sequential views of proximal and distal optical structures, each with an image display and a tapered waveguide, wherein the orientation of one structure is reversed relative to the other structure, and an array of rotating reflective elements between the structures.
Figure 105:
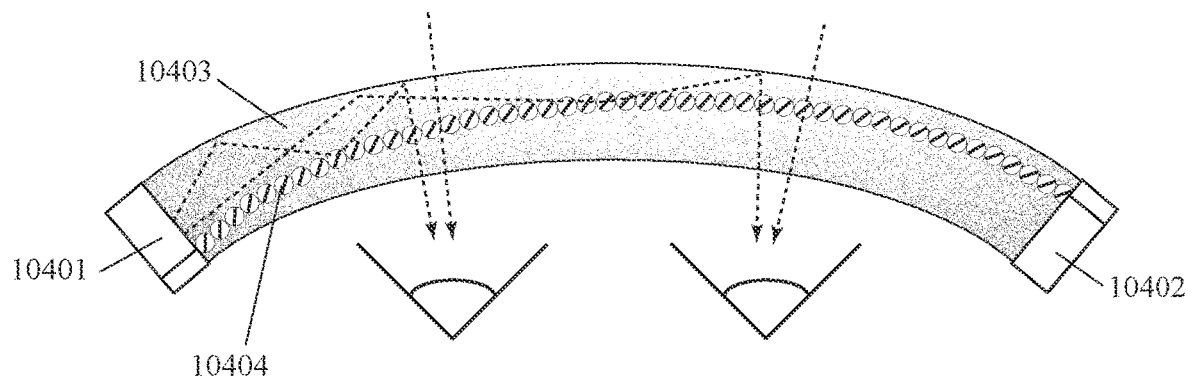
Figure 106:
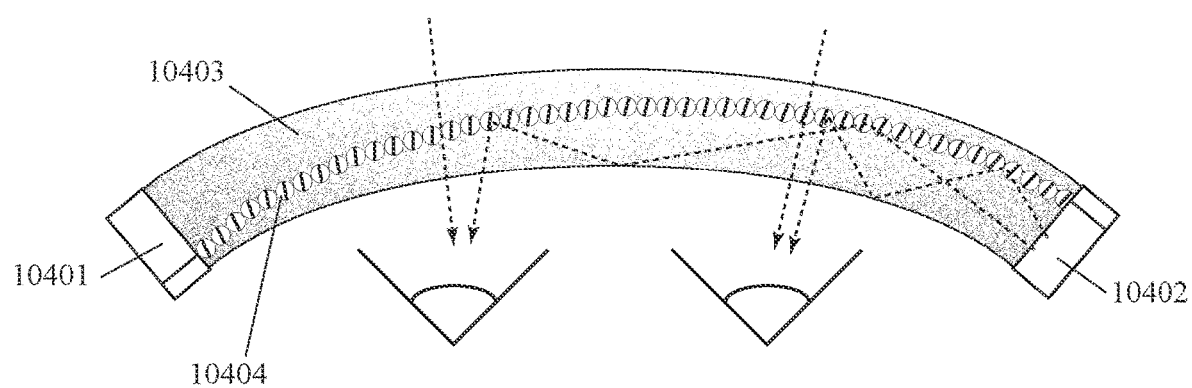

FIGS. 104 through 106 show three sequential top-down cross-sectional views of a bi-ocular optical structure with a movable array of reflective members (e.g. an array of movable mirrors or lenses). FIGS. 104 through 106 show a bi-ocular optical structure for augmented reality eyewear comprising: a left-side virtual image display (10401) which is configured to be worn on a person's head to the left of a median sagittal plane; a right-side virtual image display (10402) which is configured to be worn on the person's head to the left of the median sagittal plane; a waveguide (10403) which is configured to be worn in front of both of the person's eyes; and a movable array of reflective members (including reflective member 10404), wherein the array has a first configuration in which reflective members in the array have a first orientation which allows a first level of light rays from the environment to reach the person's eyes, wherein the array has a second configuration in which reflective members in the array have a second orientation which allows a second level of light rays from the environment to reach the person's eyes, wherein the array has a third configuration in which reflective members in the array have a third orientation which allows a third level of light rays from the environment to reach the person's eyes; wherein the second level is less than the first level; wherein the third level is less than the first level; wherein the array reflects a fourth level of light rays from left-side virtual image display to the person's eyes in the first configuration, wherein the array reflects a fifth level of light rays from left-side virtual image display to the person's eyes in the second configuration, wherein the array reflects a sixth level of light rays from left-side virtual image display to the person's eyes in the third configuration, wherein the fifth level is greater than the fourth level; wherein the fifth level is less than the sixth level; wherein the array reflects a seventh level of light rays from right-side virtual image display to the person's eyes in the first configuration, wherein the array reflects an eighth level of light rays from right-side virtual image display to the person's eyes in the second configuration, wherein the array reflects a ninth level of light rays from right-side virtual image display to the person's eyes in the third configuration, wherein the eighth level is less than the ninth level; wherein the ninth level is greater than the seventh level; wherein light rays from the left-side and right-side virtual image displays create images of virtual objects in the person's field of sight; and wherein light rays from the environment pass through the waveguide and the array before reaching the person's eyes.

FIG. 104 shows this bi-ocular structure at a first time when the movable array of reflective members is in the first configuration which allows a high level of light rays from the environment to reach the person's eyes. FIG. 105 shows this bi-ocular structure at a second time when the movable array of reflective members is in the second configuration, causing a high level of light rays from the left-side virtual image display to reach the person's eyes. FIG. 106 shows this bi-ocular structure at a third time when the movable array of reflective members is in the third configuration, causing a high level of light rays from the right-side virtual image display to reach the person's eyes.

In an example, a waveguide can be selected from the group consisting of: prism; prism with one or more differentially-reflective internal layers; prism with a differentially-reflective surface layer; prism with one or more partially-reflective surface coatings; prism with concave proximal and distal sides; prism with laterally-converging proximal and distal sides; lens; lens with one or more differentially-reflective internal layers; lens with a differentially-reflective surface layer; lens with one or more partially-reflective surface coatings; lens with concave proximal and distal sides; lens with laterally-converging proximal and distal sides; partially-reflective mirror; microlens array; micromirror array; beam splitter; and dynamic and/or adjustable-focus lens.

In an example, a waveguide can be proximally-concave, wherein proximally-concave means having a concave surface which opens toward a person. In an example, a waveguide can have a shape selected from the group consisting of: section of a sphere; section of an ellipsoid; conic section; curved arch; pointed arch; toroidal; sinusoidal; scalloped; zigzag; Fresnel lens; and freeform. In an example, a movable array of reflective members can be within a waveguide. In an example, a movable array of reflective members can be distal relative to a waveguide. In an example, a movable array of reflective members can be proximal relative to a waveguide.

In an example, reflective members in a movable array of reflective members can be micro-mirrors or micro-lenses. In an example, reflective members in a movable array of reflective members can be partially-reflective micro-mirrors or micro-lenses. In an example, reflective members in a movable array of reflective members can be micro-mirrors or micro-lenses which tilt or rotate to change from one configuration (or orientation) to another configuration (or orientation). In an example, a movable array of reflective members can be proximally-concave, wherein proximally-concave means having a concave surface which opens toward a person. In an example, a movable array of reflective members can have a shape selected from the group consisting of: section of a sphere; section of an ellipsoid; conic section; curved arch; pointed arch; toroidal; sinusoidal; and scalloped.

In an example, there can be between 10 and 1,000 reflective members in a movable array of reflective members. In an example, there can be between 100 and 5,000 reflective members in a movable array of reflective members. In an example, a movable array of reflective members can comprise an array of generally-transparent rotating columnar members, each of which contains a planar reflective layer, wherein rotation of a columnar member changes the orientation of the planar reflective layer. In an example, a movable array of reflective members can comprise an array of generally-transparent rotating spherical or ellipsoidal members, each of which contains a planar reflective layer, wherein rotation of a spherical or ellipsoidal member changes the orientation of the planar reflective layer.

In an example, a movable array of reflective members can be asymmetric with respect to a median sagittal plane. In an example, the left half of a movable array of reflective members can be a first distance from a person's head and the right half of a movable array of reflective members can be a second distance from a person's head, wherein the second distance is greater than the first distance, or vice versa. In an example, light rays from a left-side virtual image display can be reflected in a distal direction by a movable array of reflective members and light rays from a right-side virtual image display can be reflected in a proximal direction by the movable array of reflective members, or vice versa.

In an example, light rays from a left-side virtual image display can be reflected at least twice within a waveguide before they reach a person's eyes. In an example, light rays from a right-side virtual image display can be reflected at least twice within a waveguide before they reach a person's eyes. In an example, light rays from a left-side virtual image display can be reflected at least twice by a movable array of reflective members before they reach a person's eyes. In an example, light rays from a right-side virtual image display can be reflected at least twice by a movable array of reflective members before they reach a person's eyes. In an example, light rays from a virtual image display can be reflected by a surface of waveguide and reflected by a movable array of reflective members before they reach a person's eyes. In an example, light rays from a virtual image display can be reflected at least twice by a surface of waveguide and reflected at least twice by a movable array of reflective members before they reach a person's eyes.

In an example, all reflective members in a movable array of reflective members can have the same orientation (in a given configuration). In an example, the reflective surfaces of all reflective members in a movable array of reflective members can be parallel to each other. In an example, the reflective surfaces of reflective members in a movable array of reflective members need not all have the same orientation. In an example, the reflective surfaces of reflective members in a movable array of reflective members can be individually axially aligned with virtual radial vectors extending outwards from the center of a lens of a person's eye. In an example, the reflective surfaces of reflective members in a movable array of reflective members can be individually axially aligned with virtual radial vectors extending outwards from the center of a person's eyeball. In an example, the reflective surfaces of reflective members in a movable array of reflective members can be individually axially aligned with virtual radial vectors extending outwards from the center of a person's retina.

In an example, reflective surfaces of reflective members in a movable array of reflective members can be changed from one configuration (or orientation) to another configuration (or orientation) by being rotated between 20 and 70 degrees. In an example, reflective surfaces of reflective members in a movable array of reflective members can be changed from a first configuration to a second configuration by being rotated clockwise between 20 and 70 degrees and can be changed from a first configuration to a third configuration by being rotated counter-clockwise between 20 and 70 degrees, or vice versa. In an example, reflective surfaces in a movable array of reflective surfaces can be substantially parallel to rays of light from the environment in the first configuration and intersect these rays of light at an angle between 20 and 70 degrees in their second configuration. In an example, reflective surfaces in a movable array of reflective surfaces can be substantially parallel to rays of light from the environment in the first configuration and intersect these rays of light at an angle between 20 and 70 degrees in their third configuration.

In an example, a movable array of reflective members can be moved by the transmission of electromagnetic energy. In an example, a movable array of reflective members can be moved from one configuration (or orientation) to another configuration (or orientation) by the transmission of electromagnetic energy. In an example, a movable array of reflective members can be moved by the transmission of sonic energy. In an example, a movable array of reflective members can be moved from one configuration (or orientation) to another configuration (or orientation) by the transmission of sonic energy. In an example, a movable array of reflective members can be moved by airflow or air pressure. In an example, a movable array of reflective members can be moved from one configuration (or orientation) to another configuration (or orientation) by airflow or air pressure. In an example, a movable array of reflective members can be moved by MEMS devices. In an example, a movable array of reflective members can be moved from one configuration (or orientation) to another configuration (or orientation) by MEMS devices.

In a variation on the example shown in FIGS. 104 through 106, a bi-ocular optical structure with a movable array of reflective members may have only two configurations, one which allows maximum passage of environmental light rays and another which allows simultaneous reflection of light rays from both the right and left side virtual image displays toward a person's eyes. In an example, a bi-ocular optical structure for augmented reality eyewear can comprise: a left-side virtual image display which is configured to be worn on a person's head to the left of a median sagittal plane; a right-side virtual image display which is configured to be worn on the person's head to the left of the median sagittal plane; a waveguide which is configured to be worn in front of both of the person's eyes; and a movable array of reflective members, wherein the array has a first configuration in which reflective members in the array have a first orientation which allows a first level of light rays from the environment to reach the person's eyes, wherein the array has a second configuration in which reflective members in the array have a second orientation which allows a second level of light rays from the environment to reach the person's eyes; wherein the second level is less than the first level; wherein the array reflects a third level of light rays from left-side virtual image display to the person's eyes in the first configuration, wherein the array reflects a fourth level of light rays from left-side virtual image display to the person's eyes in the second configuration, wherein the fourth level is greater than the third level; wherein the array reflects a fifth level of light rays from right-side virtual image display to the person's eyes in the first configuration, wherein the array reflects a sixth level of light rays from right-side virtual image display to the person's eyes in the second configuration, wherein the sixth level is greater than the fifth level; wherein light rays from the left-side and right-side virtual image displays create images of virtual objects in the person's field of sight; and wherein light rays from the environment pass through the waveguide and the array before reaching the person's eyes.

In this example, light rays from a left-side virtual image display enter the left side of a waveguide and light rays from a right-side virtual image display enter the right side of a waveguide. In an example, light rays from a virtual image display can exit the display and directly enter the side of a waveguide. In an example, there can be one or more optical members between a virtual image display and a waveguide. In an example, there can be one or more lenses and/or mirrors between a virtual image display and a waveguide. In an example, a virtual image display can be incorporated into a sidepiece of an eyewear frame.

In an example, an optical structure can also include one or more components selected from the group consisting of: accelerometer, electromagnet or electromagnet array, gyroscope, or other type of motion sensor, actuator, camera, data processor, corrective lens or prism; static microlens array; variable-focus microlens array; EEG sensor or other electromagnetic energy sensor, environmental light sensor, eye tracking mechanism, eyewear frame, power source (such as a battery), speaker, touch-based user interface, voice-based user interface, wireless data receiver, and wireless data transmitter. Example variations discussed in other portions of this disclosure or in priority-linked disclosures can also be applied to this example where relevant, but are not repeated here in order to reduce narrative redundancy.

Figure 107:
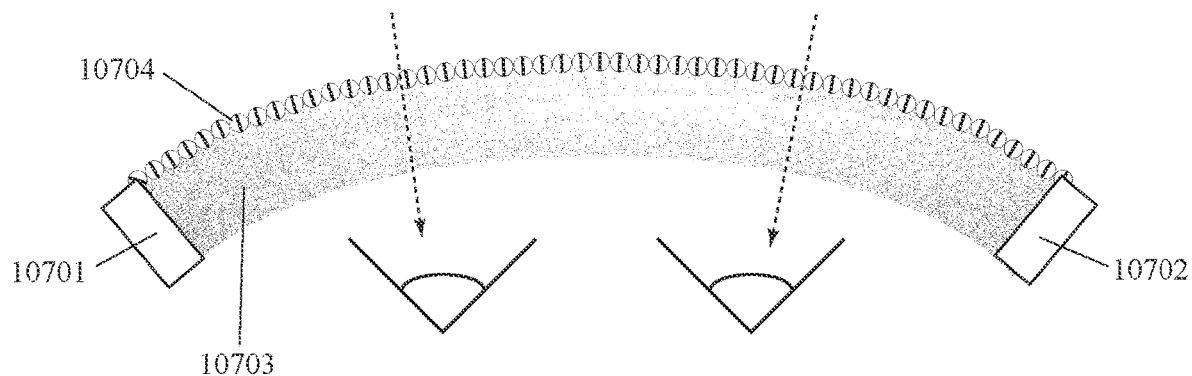
FIGS. 107 through 109 show sequential views of two image displays on either side of a concave array of rotating reflective elements.
Figure 108:
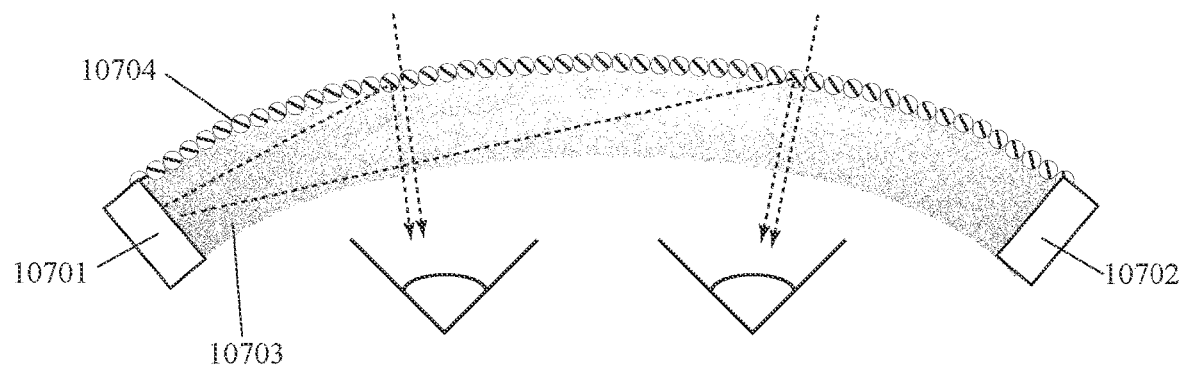
Figure 109:
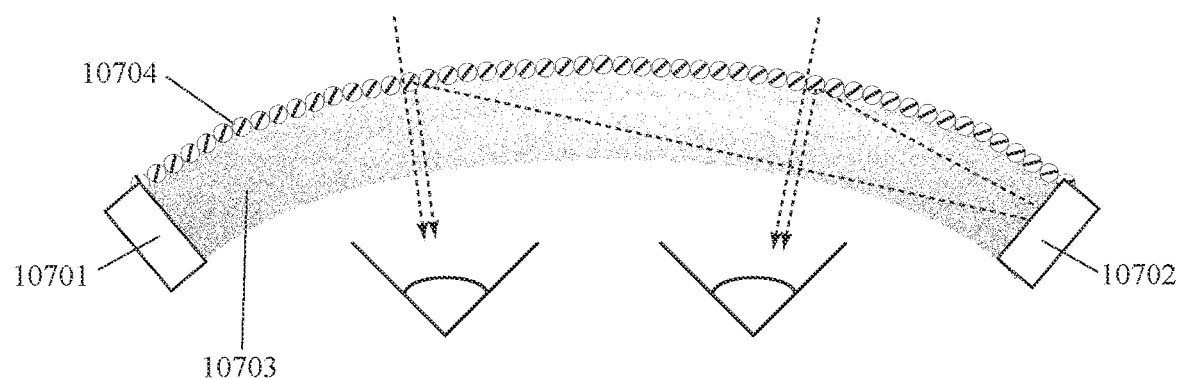

FIGS. 107 through 109 show three sequential top-down cross-sectional views of a bi-ocular optical structure with a movable array of reflective members (e.g. a movable micromirror array or movable micro-lenses array). FIGS. 107 through 109 show a bi-ocular optical structure for augmented reality eyewear comprising: a left-side virtual image display (10701) which is configured to be worn on a person's head to the left of a median sagittal plane; a right-side virtual image display (10702) which is configured to be worn on the person's head to the left of the median sagittal plane; a lens (10703) which is configured to be worn in front of (e.g. to span) both of the person's eyes; and a movable array of reflective members (including reflective member 10704), wherein the array has a first configuration in which reflective members in the array allow a first level of light rays from the environment to reach the person's eyes, wherein the array has a second configuration in which reflective members in the array allow a second level of light rays from the environment to reach the person's eyes, wherein the array has a third configuration in which reflective members in the array allow a third level of light rays from the environment to reach the person's eyes; wherein the second level is less than the first level; wherein the third level is less than the first level; wherein the array reflects a fourth level of light rays from left-side virtual image display to the person's eyes in the first configuration, wherein the array reflects a fifth level of light rays from left-side virtual image display to the person's eyes in the second configuration, wherein the array reflects a sixth level of light rays from left-side virtual image display to the person's eyes in the third configuration, wherein the fifth level is greater than the fourth level; wherein the fifth level is less than the sixth level; wherein the array reflects a seventh level of light rays from right-side virtual image display to the person's eyes in the first configuration, wherein the array reflects an eighth level of light rays from right-side virtual image display to the person's eyes in the second configuration, wherein the array reflects a ninth level of light rays from right-side virtual image display to the person's eyes in the third configuration, wherein the eighth level is less than the ninth level; wherein the ninth level is greater than the seventh level; wherein light rays from the left-side and right-side virtual image displays create images of virtual objects in the person's field of sight; and wherein light rays from the environment pass through the movable array of reflective members and the lens to reach the person's eyes.

FIG. 107 shows this bi-ocular structure at a first time when the movable array of reflective members is in the first configuration which allows a high level of light rays from the environment to reach the person's eyes. FIG. 108 shows this bi-ocular structure at a second time when the movable array of reflective members is in the second configuration, causing a high level of light rays from the left-side virtual image display to reach the person's eyes. FIG. 109 shows this bi-ocular structure at a third time when the movable array of reflective members is in the third configuration, causing a high level of light rays from the right-side virtual image display to reach the person's eyes.

In an example, a virtual image display can comprise one or more components selected from the group consisting of: active matrix organic light-emitting diode array, projector, or display; collimated light projector or display; digital micromirror array, projector, or display; digital pixel array or matrix; diode laser array, projector, or display; ferroelectric liquid crystal on silicon array, projector, or display; holographic optical element array or matrix; holographic projector or display; laser array or matrix; Light Emitting Diode (LED) array or matrix; light emitting diode array, projector, or display; liquid crystal display array, projector, or display; low-power (e.g. nano-watt) laser projector or display; microdisplay and/or microprojector; micro-display array or matrix; optoelectronic display; organic light emitting diode (OLED) array or matrix; passive matrix light-emitting diode array or matrix; photoelectric display; and transmission holographic optical element array or matrix. In an example, a virtual image display can be incorporated into a sidepiece of an eyewear frame.

In an example, reflective members in a movable array of reflective members can be micro-mirrors or micro-lenses. In an example, reflective members in a movable array of reflective members can be partially-reflective micro-mirrors or micro-lenses. In an example, reflective members in a movable array of reflective members can be micro-mirrors or micro-lenses which rotate (or tilt) to change from one configuration (or orientation) to another configuration (or orientation). In an example, a movable array of reflective members can be proximally-concave, wherein proximally-concave means having a concave surface which opens toward a person. In an example, a movable array of reflective members can have a shape selected from the group consisting of: section of a sphere; section of an ellipsoid; conic section; curved arch; pointed arch; toroidal; sinusoidal; and scalloped.

In an example, there can be between 10 and 1,000 reflective members in a movable array of reflective members. In an example, there can be between 500 and 5,000 reflective members in a movable array of reflective members. In an example, a movable array of reflective members can comprise an array of generally-transparent rotating columnar members, each of which contains a planar reflective layer, wherein rotation of a columnar member changes the orientation of the planar reflective layer. In an example, a movable array of reflective members can comprise an array of generally-transparent rotating spherical or ellipsoidal members, each of which contains a planar reflective layer, wherein rotation of a spherical or ellipsoidal member changes the orientation of the planar reflective layer.

In an example, all reflective members in a movable array of reflective members can have the same orientation (in a given configuration). In an example, the reflective surfaces of all reflective members in a movable array of reflective members can be parallel to each other. In an example, the reflective surfaces of reflective members in a movable array of reflective members need not all have the same orientation. In an example, the reflective surfaces of reflective members in a movable array of reflective members can be individually axially aligned with virtual radial vectors extending outwards from the center of a lens of a person's eye. In an example, the reflective surfaces of reflective members in a movable array of reflective members can be individually axially aligned with virtual radial vectors extending outwards from the center of a person's eyeball. In an example, the reflective surfaces of reflective members in a movable array of reflective members can be individually axially aligned with virtual radial vectors extending outwards from the center of a person's retina.

In an example, reflective surfaces of reflective members in a movable array of reflective members can be changed from one configuration (or orientation) to another configuration (or orientation) by being rotated between 20 and 70 degrees. In an example, reflective surfaces of reflective members in a movable array of reflective members can be changed from a first configuration to a second configuration by being rotated clockwise between 20 and 70 degrees and can be changed from a first configuration to a third configuration by being rotated counter-clockwise between 20 and 70 degrees, or vice versa. In an example, reflective surfaces in a movable array of reflective surfaces can be substantially parallel to rays of light from the environment in the first configuration and intersect these rays of light at an angle between 20 and 70 degrees in their second configuration. In an example, reflective surfaces in a movable array of reflective surfaces can be substantially parallel to rays of light from the environment in the first configuration and intersect these rays of light at an angle between 20 and 70 degrees in their third configuration.

In an example, a movable array of reflective members can be moved by the transmission of electromagnetic energy. In an example, a movable array of reflective members can be moved from one configuration (or orientation) to another configuration (or orientation) by the transmission of electromagnetic energy. In an example, a movable array of reflective members can be moved by the transmission of sonic energy. In an example, a movable array of reflective members can be moved from one configuration (or orientation) to another configuration (or orientation) by the transmission of sonic energy. In an example, a movable array of reflective members can be moved by airflow or air pressure. In an example, a movable array of reflective members can be moved from one configuration (or orientation) to another configuration (or orientation) by airflow or air pressure. In an example, a movable array of reflective members can be moved by MEMS devices. In an example, a movable array of reflective members can be moved from one configuration (or orientation) to another configuration (or orientation) by MEMS devices.

In this example, light rays from a first left-side virtual image display can enter the left side of a waveguide and light rays from a right-side virtual image display can enter the right side of a waveguide. In an example, light rays from a virtual image display can exit the display and directly enter the side of a waveguide. In an example, there can be one or more optical members between a virtual image display and a waveguide. In an example, there can be one or more lenses and/or mirrors between a virtual image display and a waveguide. In an example, a virtual image display can be incorporated into a sidepiece of an eyewear frame.

In an example, an optical structure can also include one or more components selected from the group consisting of: accelerometer, electromagnet or electromagnet array, gyroscope, or other type of motion sensor, actuator, camera, data processor, corrective lens or prism; static microlens array; variable-focus microlens array; EEG sensor or other electromagnetic energy sensor, environmental light sensor, eye tracking mechanism, eyewear frame, power source (such as a battery), speaker, touch-based user interface, voice-based user interface, wireless data receiver, and wireless data transmitter. Example variations discussed in other portions of this disclosure or in priority-linked disclosures can also be applied to this example where relevant, but are not repeated here in order to reduce narrative redundancy.

Figure 110:
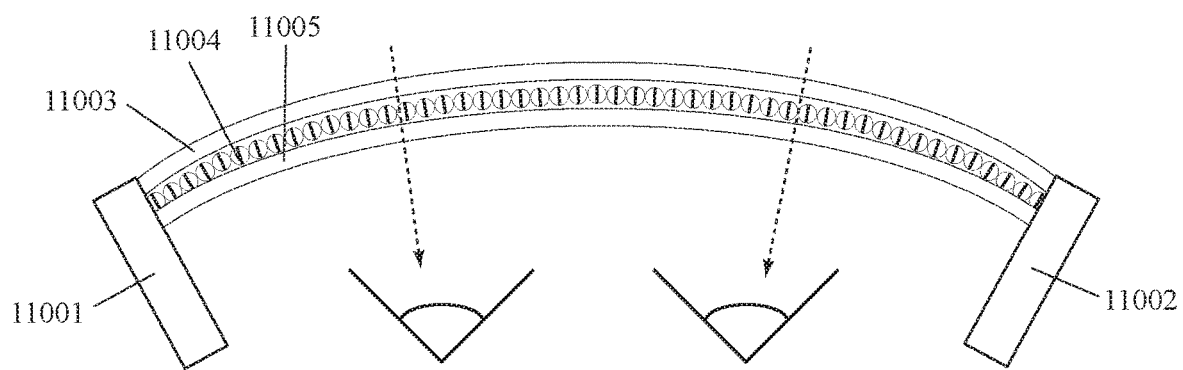
FIGS. 110 through 112 show sequential views of two image displays on either side of a concave array of rotating reflective elements sandwiched between two transparent surfaces.
Figure 111:
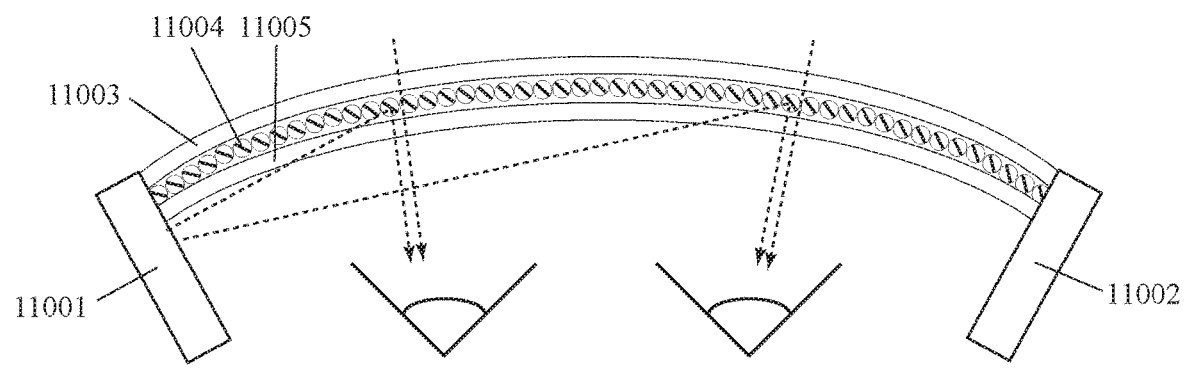
Figure 112:
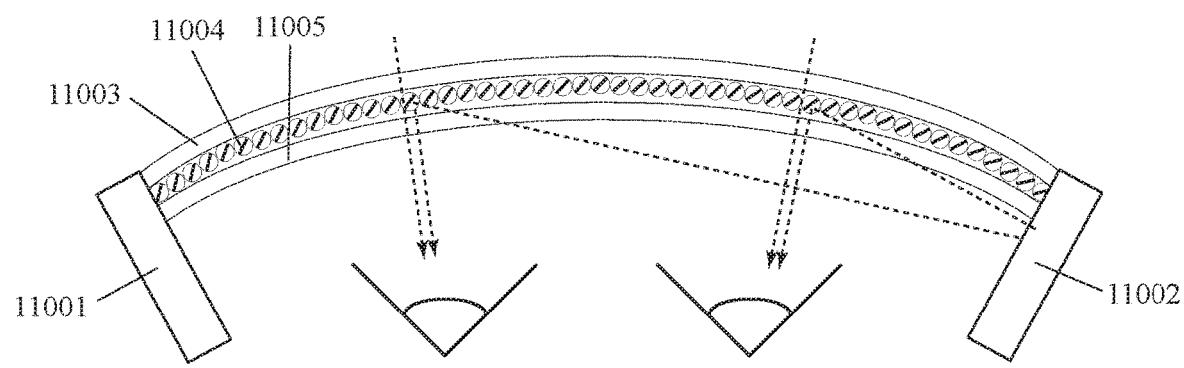

FIGS. 110 through 112 show an example of a bi-ocular structure which is similar to the one in FIGS. 107 through 109 except that a movable array of reflective members is sandwiched between two concave lenses. FIGS. 110 through 112 show a bi-ocular optical structure for augmented reality eyewear comprising: a left-side virtual image display (11001) which is configured to be worn on a person's head to the left of a median sagittal plane; a right-side virtual image display (11002) which is configured to be worn on the person's head to the left of the median sagittal plane; a movable array of reflective members (including reflective member 11004), a distal concave lens (11003) which is distal relative to the movable array of reflective members; and a proximal concave lens (11005) which is proximal relative to the movable array of reflective members; wherein the array has a first configuration in which reflective members in the array have a first orientation which allows a first level of light rays from the environment to reach the person's eyes, wherein the array has a second configuration in which reflective members in the array have a second orientation which allows a second level of light rays from the environment to reach the person's eyes, wherein the array has a third configuration in which reflective members in the array have a third orientation which allows a third level of light rays from the environment to reach the person's eyes; wherein the second level is less than the first level; wherein the third level is less than the first level; wherein the array reflects a fourth level of light rays from left-side virtual image display to the person's eyes in the first configuration, wherein the array reflects a fifth level of light rays from left-side virtual image display to the person's eyes in the second configuration, wherein the array reflects a sixth level of light rays from left-side virtual image display to the person's eyes in the third configuration, wherein the fifth level is greater than the fourth level; wherein the fifth level is less than the sixth level; wherein the array reflects a seventh level of light rays from right-side virtual image display to the person's eyes in the first configuration, wherein the array reflects an eighth level of light rays from right-side virtual image display to the person's eyes in the second configuration, wherein the array reflects a ninth level of light rays from right-side virtual image display to the person's eyes in the third configuration, wherein the eighth level is less than the ninth level; wherein the ninth level is greater than the seventh level; wherein light rays from the left-side and right-side virtual image displays create images of virtual objects in the person's field of sight; and wherein light rays from the environment pass through the distal and proximal lenses as well as the movable array of reflective members and the lens to reach the person's eyes.

FIGS. 110 through 112 can also be described as showing a bi-ocular optical structure for augmented reality eyewear comprising: a left-side virtual image display which is configured to be worn on a person's head to the left of a median sagittal plane; a right-side virtual image display which is configured to be worn on the person's head to the left of the median sagittal plane; a distal transparent optical member (e.g. a distal lens) which is configured to span both of the person's eyes; a proximal transparent optical member (e.g. a proximal lens) which is configured to span both of the person's eyes; and a movable array of reflective members (e.g. a movable array of micro-mirrors or micro-lenses) between the distal transparent optical member and the proximal transparent optical member; wherein the array has a first configuration in which reflective members in the array have a first orientation which allows a first level of light rays from the environment to reach the person's eyes, wherein the array has a second configuration in which reflective members in the array have a second orientation which allows a second level of light rays from the environment to reach the person's eyes, wherein the array has a third configuration in which reflective members in the array have a third orientation which allows a third level of light rays from the environment to reach the person's eyes; wherein the second level is less than the first level; wherein the third level is less than the first level; wherein the array reflects a fourth level of light rays from left-side virtual image display to the person's eyes in the first configuration, wherein the array reflects a fifth level of light rays from left-side virtual image display to the person's eyes in the second configuration, wherein the array reflects a sixth level of light rays from left-side virtual image display to the person's eyes in the third configuration, wherein the fifth level is greater than the fourth level; wherein the fifth level is less than the sixth level; wherein the array reflects a seventh level of light rays from right-side virtual image display to the person's eyes in the first configuration, wherein the array reflects an eighth level of light rays from right-side virtual image display to the person's eyes in the second configuration, wherein the array reflects a ninth level of light rays from right-side virtual image display to the person's eyes in the third configuration, wherein the eighth level is less than the ninth level; wherein the ninth level is greater than the seventh level; wherein light rays from the left-side and right-side virtual image displays create images of virtual objects in the person's field of sight; and wherein light rays from the environment pass through the distal and proximal transparent optical members as well as the movable array to reach the person's eyes.

FIG. 110 shows this bi-ocular structure at a first time when the movable array of reflective members is in the first configuration which allows a high level of light rays from the environment to reach the person's eyes. FIG. 111 shows this bi-ocular structure at a second time when the movable array of reflective members is in the second configuration, causing a high level of light rays from the left-side virtual image display to reach the person's eyes. FIG. 112 shows this bi-ocular structure at a third time when the movable array of reflective members is in the third configuration, causing a high level of light rays from the right-side virtual image display to reach the person's eyes. Example variations discussed in other portions of this disclosure or in priority-linked disclosures can also be applied to this example where relevant, but are not repeated here in order to reduce narrative redundancy.

In an example, optics for one eye of augmented reality eyewear can comprise: a plurality of nested annular light guides which is configured to be located in front of a person's eye, wherein the closest distance between the plurality of nested annular light guides and the person's eye is less than four inches; and an annular array of light-energy emitters around the plurality of nested annular light guides, wherein light beams from light-energy emitters in the annular array of light-energy emitters are directed toward annular light guides in the plurality of nested annular light guides, wherein the annular light guides redirect the light beams toward the person's eye, and wherein the light beams collectively display virtual objects in the person's field of vision.

In an example, a plurality of nested annular light guides can be a plurality of nested refractive rings. In an example, these refractive rings can be circular and concentric. In an example, a plurality of nested annular light guides can be a plurality of refractive rings which is incorporated into an eyewear lens. In an example, a plurality of nested annular light guides can be a plurality of annular lenses or rings formed by individual microlenses. In an example, a plurality of nested annular light guides can be a plurality of rings formed by individual microlenses (e.g. a microlens array) which is incorporated into an eyewear lens.

In an example, a plurality of nested annular light guides can be a plurality of nested reflective rings. In an example, these reflective rings can be circular and concentric. In an example, a plurality of nested annular light guides can be a plurality of reflective rings which is incorporated into an eyewear lens. In an example, a plurality of nested annular light guides can be a plurality of annular mirrors or rings formed by individual micromirrors. In an example, a plurality of nested annular light guides can be a plurality of rings formed by individual micromirrors (e.g. a micromirror array) which is incorporated into an eyewear lens.

For a circular light guide, "ring diameter" can be defined as the diameter of the outer perimeter of a cross-section of the light guide. For a non-circular light guide, "ring diameter" can be defined as the size of the largest straight-line dimension spanning the outer perimeter of a cross-section of the light guide. "Ring width" can be defined as the width of an annular light guide along a radius of the annular light guide at one location on the circumference of the annular light guide. "Ring width" does not include the central opening in the middle of the annular light guide and includes the width at only one circumferential location. "Inter-ring distance" can be defined as the distance between a two light guides which are closest to each other in a plurality of nested annular light guides.

In an example, different annular light guides in a plurality of nested annular light guides can have different ring diameters. In an example, annular light guides which are closer to the centroid of a plurality of nested annular light guides can have smaller ring diameters and annular light guides which are farther from this centroid can have larger ring diameters. In an example, different annular light guides in a plurality of nested annular light guides can have different ring widths. In an example, annular light guides which are closer to the centroid of a plurality of nested annular light guides can have smaller ring widths and annular light guides which are farther from this centroid can have larger ring widths. In an example, annular light guides in a plurality of nested annular light guides can have the same ring width.

In an example, different annular light guides in a plurality of nested annular light guides can have different inter-ring distances. In an example, annular light guides which are closer to the centroid of a plurality of nested annular light guides can have smaller ring inter-ring distances and annular light guides which are farther from this centroid can have larger inter-ring distances. In an example, annular light guides in a plurality of nested annular light guides can have the same inter-ring distance. In an example, there can be a uniform inter-ring distance between pairs of closest annular light guides in a concentric plurality of annular light guides. In an example, there can be variation in inter-ring distance between pairs of closest annular light guides in a nested, but not concentric, plurality of annular light guides.

In an example, a "virtual combined surface" formed by a plurality of nested annular light guides can be defined by finding the virtual ring which best fits each annular light guide in the plurality of nested annular light guides and then finding the virtual surface which best fits all of the virtual rings collectively. That best-fitting virtual surface is the virtual combined surface. In an example, the proximal side of the virtual combined surface can face toward a person's eye and a distal side of the virtual combined surface can face away from the person's eye. In an example, a virtual combined surface can be flat. In an example, (the proximal side of) a virtual combined surface can be convex with a rounded vertex which points toward from the person's eye. In an example, (the proximal side of) a virtual combined surface can be concave with a rounded vertex which points away from the person's eye.

In an example, a plurality of annular light guides can comprise ten or more nested light guides (e.g. rings). In an example, a plurality of annular light guides can comprise a first annular light guide (e.g. ring) with a first diameter and a second annular light guide (e.g. ring) with a second diameter. In an example, the second diameter can be less than the first diameter. In an example, a second light guide (e.g. ring) can be closer to a central point than a first light guide (e.g. ring). In an example, a second light guide (e.g. ring) can be smaller than a first light guide (e.g. ring).

In an example, a plurality of nested annular light guides can comprise between 10 and 100 annular light guides. In an example, a plurality of nested annular light guides can comprise between 50 and 1,000 annular light guides. In an example, a plurality of nested annular light guides can comprise concentric light-guiding rings. In an example, a plurality of nested annular light guides can comprise between 10 and 100 concentric light-guiding rings. In an example, a plurality of nested annular light guides can comprise between 50 and 1,000 concentric light-guiding rings.

In an example, a plurality of nested annular light guides can comprise circular or elliptical light guides. In an example, a plurality of nested annular light guides can comprise between 10 and 100 circular or elliptical light guides. In an example, a plurality of nested annular light guides can comprise between 50 and 1,000 circular or elliptical light guides. In an example, a plurality of nested annular light guides can comprise (rounded) square, rectangular, hexagonal, or other polygonal shapes. In an example, a plurality of nested annular light guides can comprise between 10 and 100 (rounded) square, rectangular, hexagonal, or other polygonal shapes. In an example, a plurality of nested annular light guides can comprise between 50 and 1,000 (rounded) square, rectangular, hexagonal, or other polygonal shapes.

In an example, annular light guides can be complete circles or rings. In an example, an annular light guide in a plurality of nested annular light guides can span the entire circumference of a circle around a point in front of a person's eye. In an example, annular light guides can be partial circles or rings. In an example, an annular light guide in a plurality of nested annular light guides can span between 75% and 100% of the circumference of a circle around a point in front of a person's eye. In an example, an annular light guide in a plurality of nested annular light guides can span the entire cross-sectional perimeter of a point in front of a person's eye. In an example, an annular light guide in a plurality of nested annular light guides can span between 75% and 100% of the cross-sectional perimeter of a point in front of a person's eye.

In an example, an annular light guide can have a circular shape. In an example, an annular light guide can have an oval or elliptical shape. In an example, an annular light guide can have an egg, pear, or teardrop shape. In an example, an annular light guide can have a polygonal shape. In an example, an annular light guide can have a square or hexagonal shape.

In an example, an annular light guide in a plurality of nested annular light guides can further comprise a plurality of individual optical elements. In an example, an annular light guide can further comprise an array, grid, or matrix of individual optical elements. In an example, an annular light guide in a plurality of nested annular light guides can further comprise a plurality of individual micromirrors. In an example, an annular light guide can further comprise a plurality of individual reflective optical elements. In an example, an annular light guide can further comprise an annular array, grid, or matrix of micromirrors.

In an example, an annular light guide in a plurality of nested annular light guides can further comprise a ring of individual micromirrors. In an example, an annular light guide can further comprise a ring of individual reflective optical elements. In an example, an annular light guide can further comprise a circle of micromirrors. In an example, an annular light guide can further comprise a circle of reflective optical elements. In an example, an annular light guide in a plurality of nested annular light guides can further comprise a polygonal array, grid, or matrix of individual micromirrors. In an example, an annular light guide can further comprise a polygonal array, grid, or matrix of reflective optical elements.

In an example, an annular light guide in a plurality of nested annular light guides can further comprise a plurality of individual microlenses or microprisms. In an example, an annular light guide can further comprise an annular array, grid, or matrix of microlenses. In an example, an annular light guide can further comprise an array, grid, or matrix of individual microlenses or microprisms. In an example, an annular light guide can further comprise an array, grid, or matrix of individual refractive optical elements. In an example, an annular light guide in a plurality of nested annular light guides can further comprise a ring of individual microlenses or microprisms. In an example, an annular light guide can further comprise a ring of individual refractive optical elements. In an example, an annular light guide can further comprise a circle of microlenses. In an example, an annular light guide can further comprise a circle of refractive optical elements.

In an example, an annular light guide can further comprise a polygonal array, grid, or matrix of refractive optical elements. In an example, an annular light guide can further comprise a (rounded) square, rectangle, hexagon, or other polygonal array, grid, or matrix of microlenses. In an example, an annular light guide in a plurality of nested annular light guides can further comprise a discontinuous array, grid, or matrix of optical elements incorporated into a lens. In an example, an annular light guide can further comprise a plurality of individual optical elements incorporated into a lens. In an example, an annular light guide can further comprise an array, grid, or matrix of individual optical elements incorporated into a lens.

In an example, an annular light guide in a plurality of nested annular light guides can further comprise a plurality of individual micromirrors incorporated into a lens. In an example, an annular light guide can further comprise a plurality of individual reflective optical elements incorporated into a lens. In an example, an annular light guide can further comprise an annular array, grid, or matrix of micromirrors incorporated into a lens. In an example, an annular light guide can further comprise an array, grid, or matrix of individual reflective optical elements incorporated into a lens. In an example, an annular light guide in a plurality of nested annular light guides can further comprise a plurality of individual microlenses or microprisms incorporated into a lens. In an example, an annular light guide can further comprise a plurality of individual refractive optical elements incorporated into a lens. In an example, an annular light guide can further comprise an annular array, grid, or matrix of microlenses incorporated into a lens. In an example, an annular light guide can further comprise an array, grid, or matrix of individual microprisms incorporated into a lens.

In an example, an annular light guide in a plurality of nested annular light guides can further comprise a ring of individual micromirrors incorporated into a lens. In an example, an annular light guide can further comprise a ring of individual reflective optical elements incorporated into a lens. In an example, an annular light guide can further comprise a circle of micromirrors incorporated into a lens. In an example, an annular light guide can further comprise a circle of reflective optical elements incorporated into a lens. In an example, an annular light guide in a plurality of nested annular light guides can further comprise a polygonal array, grid, or matrix of individual micromirrors incorporated into a lens. In an example, an annular light guide can further comprise a polygonal array, grid, or matrix of reflective optical elements incorporated into a lens. In an example, an annular light guide can further comprise a square, rectangle, hexagon, or other polygonal array, grid, or matrix of micromirrors incorporated into a lens.

In an example, an annular light guide in a plurality of nested annular light guides can further comprise a ring of individual microlenses or microprisms incorporated into a lens. In an example, an annular light guide can further comprise a ring of individual refractive optical elements incorporated into a lens. In an example, an annular light guide can further comprise a circle of microlenses incorporated into a lens. In an example, an annular light guide can further comprise a circle of refractive optical elements incorporated into a lens. In an example, an annular light guide in a plurality of nested annular light guides can further comprise a polygonal array, grid, or matrix of individual microlenses or microprisms incorporated into a lens. In an example, an annular light guide can further comprise a polygonal array, grid, or matrix of refractive optical elements incorporated into a lens. In an example, an annular light guide can further comprise a (rounded) square, rectangle, hexagon, or other polygonal array, grid, or matrix of microlenses incorporated into a lens.

In an example, a plurality of nested annular light guides can comprise a plurality of at least ten nested annular: light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms. In an example, a plurality of nested annular light guides can comprise a plurality of at least ten nested circular: light guides; light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested light guides can comprise a plurality of at least ten concentric annular: light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms. In an example, a plurality of nested annular light guides can comprise a plurality of at least ten concentric circular: light guides; light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested annular light guides can be an annular (e.g. circular) Bragg grating. In an example, a plurality of nested annular light guides can be an annular (e.g. circular) Bragg grating which is incorporated into an eyewear lens. In an example, a plurality of nested annular light guides can comprise an annular Bragg grating. In an example, a plurality of nested annular light guides can comprise a circular Bragg grating.

In an example, a plurality of nested annular light guides can comprise a circular Bragg grating with periodic variation in refractive index along a radius of the Bragg grating. In an example, a plurality of nested annular light guides can comprise a Bragg grating with a concentric array of circular refractive rings. In an example, a plurality of nested annular light guides can comprise an annular Bragg grating with concentric refractive rings, wherein the refractive indexes of different rings in the grating varies in a periodic manner along a radius of the grating. In an example, a plurality of nested annular light guides can comprise a concentric array of refractive rings, wherein the refractive indexes of sequential rings in the array alternates between first and second refractive index values.

In an example, a plurality of nested annular light guides can comprise an annular (e.g. circular concentric) Bragg grating with nested rings of material with periodic variation in reflective indexes along a radius. In an example, a plurality of nested annular light guides can comprise an annular (e.g. circular concentric) Bragg grating with nested rings of material with periodic variation between rings with higher and lower reflective indexes along a radius. In an example, a plurality of nested annular light guides can comprise an annular (e.g. circular concentric) Bragg grating with nested rings of material with different reflective indexes along a radius, wherein variation in the reflective indexes of these nested rings along a radius of the annular Bragg grating includes periodic variation between rings with higher and lower refractive indexes.

In an example, a plurality of nested annular light guides can comprise an annular (e.g. circular concentric) Bragg grating with nested rings of material with different reflective indexes along a radius, wherein variation in the reflective indexes of these nested rings along a radius of the annular Bragg grating includes both periodic variation between rings with higher and lower refractive indexes and an overall (multi-ring) progression toward higher and lower refractive indexes. In an example, a plurality of nested annular light guides can comprise an annular (e.g. circular concentric) Bragg grating with nested rings of material with different reflective indexes along a radius, wherein variation in the reflective indexes of these different nested rings along a radius of the annular Bragg grating includes a combination of periodic inter-ring variation in refractive indexes between different rings plus multi-ring progression in refractive indexes.

In an example, a plurality of nested annular light guides can comprise a polygonal Bragg grating. In an example, a plurality of nested annular light guides can comprise a polygonal Bragg grating with periodic variation in refractive index along a radial spoke of the Bragg grating. In an example, a plurality of nested annular light guides can comprise an annular Bragg grating with concentric refractive polygons, wherein the refractive index of polygons in the grating varies in a periodic manner along a radial spoke of the grating. In an example, a plurality of nested annular light guides can comprise a concentric array of refractive polygons, wherein the refractive index of sequential polygons in the array alternates between first and second refractive index values.

In an example, a plurality of nested annular light guides can comprise an annular (e.g. polygonal concentric) Bragg grating with nested polygons of material with periodic variation in reflective indexes along a radial spoke. In an example, a plurality of nested annular light guides can comprise an annular (e.g. polygonal concentric) Bragg grating with nested polygons of material with periodic variation between polygons with higher and lower reflective indexes along a radial spoke. In an example, a plurality of nested annular light guides can comprise an annular (e.g. polygonal concentric) Bragg grating with nested polygons of material with different reflective indexes along a radial spoke, wherein variation in the reflective indexes of these nested polygons along a radial spoke of the annular Bragg grating includes periodic variation between polygons with higher and lower refractive indexes.

In an example, a plurality of nested annular light guides can comprise an annular (e.g. polygonal concentric) Bragg grating with nested polygons of material with different reflective indexes along a radial spoke, wherein variation in the reflective indexes of these nested polygons along a radial spoke of the annular Bragg grating includes both periodic variation between polygons with higher and lower refractive indexes and an overall (multi-polygon) progression toward higher and lower refractive indexes. In an example, a plurality of nested annular light guides can comprise an annular (e.g. polygonal concentric) Bragg grating with nested polygons of material with different reflective indexes along a radial spoke, wherein variation in the reflective indexes of these nested polygons along a radial spoke of the annular Bragg grating includes a combination of periodic inter-polygon variation in refractive indexes between polygons plus multi-polygon progression in refractive indexes.

In an example, a plurality of nested annular light guides can comprise a radial-and-circumferential array of individual reflective and/or refractive optical elements. In an example, individual optical elements can be aligned along radial lines and around circumferential circles. In an example, a plurality of nested annular light guides can comprise a radial-and-circumferential array of individual reflective and/or refractive optical elements with at least ten optical elements per radial line and at least ten optical elements per circumferential circle. In an example, an individual optical element can be a microlens or micromirror. In an example, a plurality of nested annular light guides can be a radial-and-circumferential microlens or micromirror array. In an example, a micromirror can be a partially-reflective micromirror which allows light from the environment to pass through.

In an example, a plurality of nested annular light guides can comprise a spoke-and-ring array of individual reflective and/or refractive optical elements. In an example, individual optical elements can be aligned along spokes and around rings. In an example, a plurality of nested annular light guides can comprise a spoke-and-ring array of individual reflective and/or refractive optical elements with at least ten optical elements per radial spoke and at least ten optical elements per ring. In an example, an individual optical element can be a microlens or micromirror. In an example, a plurality of nested annular light guides can be a spoke-and-ring microlens or micromirror array. In an example, a micromirror can be a partially-reflective micromirror which allows light from the environment to pass through.

In an example, a plurality of nested annular light guides can comprise a polar coordinate array of individual reflective and/or refractive optical elements. In an example, individual optical elements can be aligned along radii (at a selected compass coordinate or angle degree) and aligned along circles (at a selected radial distance). In an example, there can be at least ten individual optical elements per radial line and at least ten individual optical elements per circle. In an example, an individual optical element can be a microlens or micromirror. In an example, a plurality of nested annular light guides can be a polar coordinate microlens array or polar coordinate micromirror array. In an example, a micromirror can be a partially-reflective micromirror which allows light from the environment to pass through.

In an example, different annular light guides in a plurality of nested annular light guides can reflect or refract light beams from light-energy emitters at different angles in order to redirect those light beams toward a person's eye. In an example, light beams from light-energy emitters can travel along vectors which are substantially parallel to a virtual plane which is tangential to the front of a person's eyeball until they reach the plurality of nested annular light guides, wherein they are redirected by different angles toward the person's eye. In an example, these light beams can be redirected at different angles so as to converge on (or within) a person's eye. In an example, different annular light guides can reflect and/or refract light beams at different angles relative to a virtual combined surface of the plurality of nested annular light guides. In an example, different annular light guides can reflect and/or refract light beams at the same angle relative to a virtual combined surface of the plurality of nested annular light guides.

In an example, outward (and/or distal) facing surfaces of nested annular light guides in a plurality of nested annular light guides can be oriented in planes which are not parallel with the virtual combined surface of the plurality of nested annular light guides. In an example, outward (and/or distal) facing surfaces of nested annular light guides in plurality of nested annular light guides can be oriented in planes which intersect the virtual combined surface of the plurality of nested annular light guides at acute angles. In an example, outward (and/or distal) facing surfaces of nested annular light guides in plurality of nested annular light guides can be oriented in planes which intersect the virtual combined surface of the plurality of nested annular light guides at one or more angles within a range of 20 to 70 degrees. In an example, outward (and/or distal) facing surfaces of nested annular light guides in plurality of nested annular light guides can be oriented in planes which intersect the virtual combined surface of the plurality of nested annular light guides at one or more angles within a range of 40 to 50 degrees.

In an example, a plurality of nested annular light guides can collectively form a convex surface and/or shape. In an example, a plurality of nested annular light guides can collectively form a convex virtual combined surface. In an example, a plurality of nested annular light guides can comprise a convex lens. In an example, a plurality of nested annular light guides can collectively form a concave surface and/or shape. In an example, a plurality of nested annular light guides can collectively form a concave virtual combined surface. In an example, a plurality of nested annular light guides can comprise a concave lens.

In an example, a plurality of nested annular light guides can comprise a convex plurality of at least ten nested circular: light guides; light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested annular light guides can comprise a convex plurality of at least ten concentric circular: light guides; light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested light guides can comprise a convex plurality of at least ten concentric annular: light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested light guides can comprise a convex plurality of at least ten nested annular: light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested light guides can comprise a concave plurality of at least ten nested annular: light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested annular light guides can comprise a concave plurality of at least ten nested circular: light guides; light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested annular light guides can comprise a concave plurality of at least ten concentric circular: light guides; light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested light guides can comprise a concave plurality of at least ten concentric annular: light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested annular light guides can comprise a lens with a plurality of at least ten nested circular: light guides; light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested light guides can comprise a lens with a plurality of at least ten concentric annular: light guides; light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested annular light guides can comprise a lens with a plurality of at least ten concentric circular: light guides; light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested light guides can comprise a lens with a convex plurality of at least ten concentric annular: light guides; light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides;

refractive light-guiding rings; refractive light-guiding undulations; refractive light-guiding zigzag oscillations; and/or refractive prisms.

In an example, a plurality of nested light guides can comprise a lens with a plurality of at least ten nested annular: light guides; light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested light guides can comprise a lens with a convex plurality of at least ten nested annular: light guides; light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested annular light guides can comprise a lens with an undulating surface or internal layer. In an example, a plurality of nested annular light guides can comprise a lens with an undulating reflective surface or internal layer. In an example, a plurality of nested annular light guides can comprise a lens with an undulating refractive surface or internal layer. In an example, a plurality of nested annular light guides can comprise a lens with a sinusoidal surface or internal layer. In an example, a plurality of nested annular light guides can comprise a lens with a sinusoidal reflective surface or internal layer. In an example, a plurality of nested annular light guides can comprise a lens with a sinusoidal refractive surface or internal layer.

In an example, a plurality of nested annular light guides can comprise a lens with a zigzag-shaped surface or internal layer. In an example, a plurality of nested annular light guides can comprise a lens with a zigzag-shaped reflective surface or internal layer. In an example, a plurality of nested annular light guides can comprise a lens with a zigzag-shaped refractive surface or internal layer. In an example, a plurality of nested annular light guides can comprise a lens with a sawtooth-shaped surface or internal layer. In an example, a plurality of nested annular light guides can comprise a lens with a sawtooth-shaped reflective surface or internal layer. In an example, a plurality of nested annular light guides can comprise a lens with a sawtooth-shaped refractive surface or internal layer.

In an example, a plurality of nested annular light guides can comprise a lens with an oscillating surface or internal layer. In an example, a plurality of nested annular light guides can comprise a lens with an oscillating reflective surface or internal layer. In an example, a plurality of nested annular light guides can comprise a lens with an oscillating refractive surface or internal layer.

In an example, a plurality of nested annular light guides can comprise a lens. In an example, a lens can comprise a plurality of nested annular light guides. In an example, a plurality of nested annular light guides collectively form a convex surface and/or shape. In an example, a virtual combined surface of a plurality of nested annular light guides can be convex. In an example, a convex lens can comprise a plurality of nested annular light guides. In an example, a plurality of nested annular light guides collectively form a concave surface and/or shape. In an example, a virtual combined surface of nested annular light guides can be concave. In an example, a concave lens can comprise a plurality of nested annular light guides.

In an example, a plurality of nested annular light guides can comprise a lens with a concave plurality of at least ten nested circular: light guides; light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested annular light guides can comprise a lens with a concave plurality of at least ten concentric circular: light guides; light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested annular light guides can comprise a lens with a convex plurality of at least ten nested circular: light guides; light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested annular light guides can comprise a lens with a convex plurality of at least ten concentric circular: light guides; light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested light guides can comprise a lens with a concave plurality of at least ten concentric annular: light guides; light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, a plurality of nested light guides can comprise a lens with a concave plurality of at least ten nested annular: light guides; light-guiding rings; light-guiding undulations; light-guiding zigzag oscillations; prisms; reflective light guides; reflective light-guiding rings; reflective light-guiding undulations; reflective light-guiding zigzag oscillations; reflective prisms; refractive light guides; refractive light-guiding rings; refractive light-guiding undulations; refractive light-guiding zigzag oscillations; and/or refractive prisms.

In an example, optics for one eye of augmented reality eyewear can comprise: a plurality of parallel light guides which is configured to be located in front of a person's eye, wherein the closest distance between the plurality of parallel light guides and the person's eye is less than 4 inches; and an array of light-energy emitters along one side (e.g. right, left, top, or bottom) of the plurality of parallel light guides, wherein light beams from light-energy emitters in the array of light-energy emitters are directed toward parallel light guides in the plurality of parallel light guides, wherein the parallel light guides redirect the light beams toward the person's eye, and wherein the light beams collectively display virtual objects in the person's field of vision.

In an example, a plurality of parallel light guides can be a plurality of parallel refractive ridges, strips, prisms, undulations, and/or zigzags. In an example, a plurality of parallel light guides can be a plurality of refractive ridges, strips, prisms, undulations, and/or zigzags which is incorporated into an eyewear lens. In an example, a plurality of parallel light guides can be a plurality of parallel lenses or ridges, strips, prisms, undulations, and/or zigzags formed by individual microlenses. In an example, a plurality of parallel light guides can be a plurality of microlens ridges, strips, prisms, undulations, and/or zigzags which is incorporated into an eyewear lens. In an example, a plurality of parallel light guides can be a Bragg grating. In an example, a plurality of parallel light guides can be a Bragg grating which is incorporated into an eyewear lens.

In an example, a plurality of parallel light guides can be a plurality of parallel reflective ridges, strips, prisms, undulations, and/or zigzags. In an example, a plurality of parallel light guides can be a plurality of reflective ridges, strips, prisms, undulations, and/or zigzags which is incorporated into an eyewear lens. In an example, a plurality of parallel light guides can be a plurality of parallel mirrors or ridges, strips, prisms, undulations, and/or zigzags formed by individual micromirrors. In an example, a plurality of parallel light guides can be a plurality of micromirror ridges, strips, prisms, undulations, and/or zigzags which is incorporated into an eyewear lens.

In an example, optics for one eye of augmented reality eyewear can comprise: a plurality of linear light guides which is configured to be located in front of a person's eye, wherein the closest distance between the plurality of linear light guides and the person's eye is less than 4 inches; and an array of light-energy emitters along one side (e.g. right, left, top, or bottom) of the plurality of linear light guides, wherein light beams from light-energy emitters in the array of light-energy emitters are directed toward linear light guides in the plurality of linear light guides, wherein the linear light guides redirect the light beams toward the person's eye, and wherein the light beams collectively display virtual objects in the person's field of vision.

In an example, a plurality of linear light guides can be a plurality of linear refractive ridges, strips, prisms, undulations, and/or zigzags. In an example, a plurality of linear light guides can be a plurality of refractive ridges, strips, prisms, undulations, and/or zigzags which is incorporated into an eyewear lens. In an example, a plurality of linear light guides can be a plurality of linear lenses or ridges, strips, prisms, undulations, and/or zigzags formed by individual microlenses. In an example, a plurality of linear light guides can be a plurality of microlens ridges, strips, prisms, undulations, and/or zigzags which is incorporated into an eyewear lens. In an example, a plurality of linear light guides can be a Bragg grating. In an example, a plurality of linear light guides can be a Bragg grating which is incorporated into an eyewear lens.

In an example, a plurality of linear light guides can be a plurality of linear reflective ridges, strips, prisms, undulations, and/or zigzags. In an example, a plurality of linear light guides can be a plurality of reflective ridges, strips, prisms, undulations, and/or zigzags which is incorporated into an eyewear lens. In an example, a plurality of linear light guides can be a plurality of linear mirrors or ridges, strips, prisms, undulations, and/or zigzags formed by individual micromirrors. In an example, a plurality of linear light guides can be a plurality of micromirror ridges, strips, prisms, undulations, and/or zigzags which is incorporated into an eyewear lens.

In an example, parallel light guides can comprise reflective or refractive ridges, strips, prisms, undulations, or gratings. In an example, parallel light guides can be incorporated into a lens. In an example, the proximal side of a combined virtual surface of a plurality of parallel light guides can be substantially concave (having a rounded vertex which faces away from the eye). In an example, there can be more than ten parallel light guides. In an example, light-energy emitters can be proximal relative to a combined virtual surface of a plurality of parallel light guides. In an example, light-energy emitters can be located along a lateral side (e.g. right or left side) of a plurality of parallel light guides. In an example, light-energy emitters can be located along the top (e.g. upper perimeter) or bottom (e.g. lower perimeter) of a plurality of parallel light guides.

In an example, a light-energy emitter can be a Light Emitting Diode (LED). In an example, a light-energy emitter can emit collimated light. In an example, a light-energy emitter can emit coherent light. In an example, a light-energy emitter can be a low-power laser. In an example, a light-energy emitter can emit beams of light which comprise a single pixel of a virtual image. In an example, a light-energy emitter can be an array of Light Emitting Diodes. In an example, a light-energy emitter can emit beams of light which comprise multiple pixels in a virtual image. In an example, a plurality of light-energy emitters can comprise at least ten light-energy emitters.

In an example, a light beam from a first light-energy emitter can be directed toward a first annular light guide (e.g. ring) which redirects (e.g. reflects or refracts) the light beam toward a person's eye. In an example, a light beam from a first light-energy emitter can be directed toward a distal (e.g. facing away from an eye) surface of a first annular light guide (e.g. ring) which redirects (e.g. reflects or refracts) the light beam toward a person's eye. In an example, a light beam from a first light-energy emitter can be directed toward a proximal (e.g. facing toward an eye) or outward-facing (facing away from a central point) surface of a first annular light guide (e.g. ring) which redirects (e.g. reflects or refracts) the light beam toward a person's eye. In an example, a light beam from a first light-energy emitter can be directed toward an outward-facing (facing away from a central point) surface of a first annular light guide (e.g. ring) which redirects (e.g. reflects or refracts) the light beam toward a person's eye.

In an example, a light beam from a second light-energy emitter can be directed toward the first annular light guide (e.g. ring) which redirects (e.g. reflects or refracts) the light beam toward a person's eye. In an example, a light beam from a second light-energy emitter can be directed toward a distal (e.g. facing away from an eye) surface of the first annular light guide (e.g. ring) which redirects (e.g. reflects or refracts) the light beam toward a person's eye. In an example, a light beam from a second light-energy emitter can be directed toward a proximal (e.g. facing toward an eye) or outward-facing (facing away from a central point) surface of the first annular light guide (e.g. ring) which redirects (e.g. reflects or refracts) the light beam toward a person's eye. In an example, a light beam from a second light-energy emitter can be directed toward an outward-facing (facing away from a central point) surface of the first annular light guide (e.g. ring) which redirects (e.g. reflects or refracts) the light beam toward a person's eye.

In an example, a light beam from a second light-energy emitter can be directed toward a second annular light guide (e.g. ring) which redirects (e.g. reflects or refracts) the light beam toward a person's eye. In an example, a light beam from a second light-energy emitter can be directed toward a distal (e.g. facing away from an eye) surface of a second annular light guide (e.g. ring) which redirects (e.g. reflects or refracts) the light beam toward a person's eye. In an example, a light beam from a second light-energy emitter can be directed toward a proximal (e.g. facing toward an eye) or outward-facing (facing away from a central point) surface of a second annular light guide (e.g. ring) which redirects (e.g. reflects or refracts) the light beam toward a person's eye. In an example, a light beam from a second light-energy emitter can be directed toward an outward-facing (facing away from a central point) surface of a second annular light guide (e.g. ring) which redirects (e.g. reflects or refracts) the light beam toward a person's eye.

In an example, a light beam from a third light-energy emitter can be directed toward the first annular light guide (e.g. ring) which redirects (e.g. reflects or refracts) the light beam toward a person's eye. In an example, a light beam from a third light-energy emitter can be directed toward a distal (e.g. facing away from an eye) surface of the first annular light guide (e.g. ring) which redirects (e.g. reflects or refracts) the light beam toward a person's eye. In an example, a light beam from a third light-energy emitter can be directed toward a proximal (e.g. facing toward an eye) or outward-facing (facing away from a central point) surface of the first annular light guide (e.g. ring) which redirects (e.g. reflects or refracts) the light beam toward a person's eye. In an example, a light beam from a third light-energy emitter can be directed toward an outward-facing (facing away from a central point) surface of the first annular light guide (e.g. ring) which redirects (e.g. reflects or refracts) the light beam toward a person's eye.

In an example, a light beam from a fourth light-energy emitter can be directed toward the second annular light guide (e.g. ring) which redirects (e.g. reflects or refracts) the light beam toward a person's eye. In an example, a light beam from a fourth light-energy emitter can be directed toward a distal (e.g. facing away from an eye) surface of the second annular light guide (e.g. ring) which redirects (e.g. reflects or refracts) the light beam toward a person's eye. In an example, a light beam from a fourth light-energy emitter can be directed toward a proximal (e.g. facing toward an eye) or outward-facing (facing away from a central point) surface of the second annular light guide (e.g. ring) which redirects (e.g. reflects or refracts) the light beam toward a person's eye. In an example, a light beam from a fourth light-energy emitter can be directed toward an outward-facing (facing away from a central point) surface of the second annular light guide (e.g. ring) which redirects (e.g. reflects or refracts) the light beam toward a person's eye.

In an example, a plurality of light-energy emitters can include two or more light-energy emitters at the same radial location (e.g. compass coordinate, polar coordinate, or clock position) with respect to a virtual circle (or virtual cylinder) around a central point. In an example, these two or more light-energy emitters can be different distances from a person's eye. In an example, these two or more light-energy emitters can be different distances from a plurality of nested annular light guides. In an example, these two or more light-energy emitters can be different distances from the virtual combined surface of a plurality of nested annular light guides.

In an example, a plurality of light-energy emitters can include two or more light-energy emitters. In an example, two or more light-energy emitters can be located at two or more different radial locations (e.g. compass coordinates, polar coordinates, or clock positions) with respect to a virtual circle (or virtual cylinder) around a central point. In an example, these two or more different radial locations can differ by at least 90 degrees (in compass or polar coordinates) or three clock hours (in clock positions). In an example, these four or more different radial locations can collectively span at least 75% of the perimeter of an annular array of light-energy emitters. In an example, these two or more different radial locations can collectively span the entire outer perimeter of a plurality of annular light guides (e.g. rings).

In an example, a plurality of light-energy emitters can include four or more light-energy emitters. In an example, four or more light-energy emitters can be located at four or more different radial locations (e.g. compass coordinates, polar coordinates, or clock positions) with respect to a virtual circle (or virtual cylinder) around a central point. In an example, these four or more different radial locations can differ by at least 60 degrees (in compass or polar coordinates) or two clock hours (in clock positions). In an example, these four or more different radial locations can collectively span at least 75% of the perimeter of an annular array of light-energy emitters. In an example, these four or more different radial locations can collectively span the entire outer perimeter of a plurality of annular light guides (e.g. rings).

In an example, a plurality of light-energy emitters can include six or more light-energy emitters. In an example, four or more light-energy emitters can be located at six or more different radial locations (e.g. compass coordinates, polar coordinates, or clock positions) with respect to a virtual circle (or virtual cylinder) around a central point. In an example, these six or more different radial locations can differ by at least 30 degrees (in compass or polar coordinates) or one clock hour (in clock positions). In an example, these six or more different radial locations can collectively span at least 75% of the perimeter of an annular array of light-energy emitters. In an example, these six or more different radial locations can collectively span the entire outer perimeter of a plurality of annular light guides (e.g. rings).

In an example, light beams from light-energy emitters can be directed toward distal (facing away from an eye) surfaces of annular light guides (e.g. rings). In an example, light beams from light-energy emitters can be directed toward proximal (facing toward an eye) surfaces of annular light guides (e.g. rings). In an example, light beams from light-energy emitters can be directed toward inward-facing (facing toward a central point) surfaces of annular light guides (e.g. rings). In an example, light beams from light-energy emitters can be directed toward outward-facing (facing away from a central point) surfaces of annular light guides (e.g. rings).

In an example, light-energy emitters in a plurality of light-energy emitters can be distal (i.e. farther from a person's eye) relative to a plurality of nested annular light guides. In an example, light beams from light-energy emitters can be directed toward the distal side of the virtual combined surface and then redirected out from the proximal side of the virtual combined surface toward a person's eye. In an example, light beams from light-energy emitters can be directed toward outward-facing (e.g. facing away from an array center) surfaces of nested annual light guides and then redirected toward the person's eye.

In an example, light-energy emitters in a plurality of light-energy emitters can be proximal (i.e. closer to a person's eye) relative to a plurality of nested annular light guides. In an example, light beams from light-energy emitters can be directed toward the proximal side of a virtual combined surface of a plurality of nested annular light guides and then reflected (or refracted) toward a person's eye. In an example, light beams from light-energy emitters can be directed toward outward-facing (e.g. away from an array center) surfaces of nested annual light guides and then redirected toward the person's eye.

In an example, one or more light-energy emitters in a plurality of light-energy emitters can be scanning light-energy emitters. In an example, a scanning light-energy emitter can direct beams of light in different directions and/or different angles at different times. In an example, a scanning light-energy emitter can direct a beam of light toward a first light guide at a first time and can direct a beam of light toward a second light guide at a second time. In an example, a scanning light-energy emitter can direct a beam of light which moves (e.g. scans) across a plurality of light guides. In an example, a scanning light-energy emitter can direct a beam of light which moves (e.g. scans) across a plurality of light guides in a sequential manner. In an example, a scanning light-energy emitter can direct a beam of light across a plurality of annular light guides in a plurality of annular light guides in a sequential manner.

In an example, a scanning light-energy emitter can further comprise a light-energy source (such as an LED) and a moving light reflecting surface (such as a moving micro-mirror). In an example, a scanning light-energy emitter can further comprise a light-energy source (such as an LED) and a tilting, vibrating, oscillating, or rotating micro-mirror. In an example, a scanning light-energy emitter can further comprise a light-energy source (such as an LED) and a moving light refractive optical member (such as a moving micro-lens or micro-prism). In an example, a scanning light-energy emitter can further comprise a light-energy source (such as an LED) and a tilting, vibrating, oscillating, or rotating micro-lens or micro-prism.

In an example, a scanning light-energy emitter can be a scanning micromirror device. In an example, a scanning light-energy emitter can comprise a light-energy emitter and a micro electromechanical system (MEMS) mirror. In an example, controlled movement of a MEMS mirror can change the direction of light beams from a light-energy emitter. In an example, a MEMS mirror can be a single-axis or dual-axis MEMS mirror. In an example, rotation, spinning, pivoting, tilting, oscillation, and/or vibration of a MEMS mirror can change the direction of light beams from a light-energy emitter. In an example, rotation, spinning, pivoting, tilting, oscillation, or vibration of a MEMS mirror can cause light beams from a light-energy emitter to be sequentially directed toward different light guides in a plurality of light guides. In an example, rotation, pivoting, tilting, oscillation, or vibration of a MEMS mirror can cause light beams from a light-energy emitter to sweep across different light guides in a plurality of light guides.

In an example, a scanning light-energy emitter can comprise a light-energy emitter and a digital micro-mirror device (DMD). In an example, controlled movement of a digital micro-mirror device (DMD) can change the direction of light beams from a light-energy emitter. In an example, controlled movement of a digital micro-mirror device (DMD) can cause light beams from a light-energy emitter to be sequentially directed toward different light guides in a plurality of light guides. In an example, controlled movement of a digital micro-mirror device (DMD) can cause light beams from a light-energy emitter to sweep across different light guides in a plurality of light guides.

In an example, a scanning light-energy emitter can be a fiber-based scanning device. In an example, a scanning light-energy emitter can comprise an optical fiber whose (cantilevered) tip is moved by an actuator (e.g. a piezoelectric actuator) so as to direct beams of light in a sequential manner toward different light guides in a plurality of light guides. In an example, a scanning light-energy emitter can comprise an optical fiber which is moved so as to direct beams of light in a sequential manner toward different light guides in a plurality of light guides. In an example, a scanning light-energy emitter can comprise an optical fiber which is moved so as to sweep beams of light over different light guides in a plurality of light guides.

In an example, a scanning light-energy emitter can comprise an optical fiber whose (cantilevered) tip is vibrated and/or oscillated by an actuator (e.g. a piezoelectric actuator) so as to direct beams of light in a sequential manner toward different light guides in a plurality of light guides. In an example, a scanning light-energy emitter can comprise an optical fiber which is vibrated and/or oscillated so as to direct beams of light in a sequential manner toward different light guides in a plurality of light guides. In an example, a scanning light-energy emitter can comprise an optical fiber which is vibrated and/or oscillated so as to sweep beams of light over different light guides in a plurality of light guides.

In an example, a scanning light-energy emitter can direct light beams in a one-dimensional (e.g. straight-line) pattern across a plurality of light guides. In an example, a scanning light-energy emitter can direct light beams in a two-dimensional pattern. In an example, a scanning light-energy emitter can direct light beams in a circular or spiral pattern. In an example, a scanning light-energy emitter can comprise one or more components selected from the group consisting of: oscillating actuator, spinning mirror, single-axis actuator, piezoelectric transducer, bi-axial actuator, pivoting optical element, polygonal mirror, rotating mirror, MEMS vibrator, scanning laser, scanning laser, scanning optical fiber, two-dimensional actuator, micro-mechanical scanner, multiplexing control system, acousto-optical modulator, variable-focus lens, cantilevered-tip optical fiber, piezoelectric actuator, electrically-activated variable lens, laser diode, acousto-optical scanner, vibrating actuator, scanning waveguide, electro-optical modulator, and scanning prism.

In an example, optics for one eye of augmented reality eyewear can comprise: a plurality of nested annular light guides which is configured to be located in front of a person's eye, wherein the closest distance between the plurality of nested annular light guides and the person's eye is less than 4 inches; and an annular array of light-energy emitters which is configured to be located in front of the person's eye, wherein the closest distance between the annular array of light-energy emitters and the person's eye is less than 4 inches, wherein light beams from the annular array of light-energy emitters are directed toward the plurality of nested annular light guides, wherein the plurality of nested annular light guides redirect the light beams toward the person's eye, and wherein the light beams display virtual objects in the person's field of vision.

In an example, optics for one eye of augmented reality eyewear can comprise: a plurality of nested annular light guides which is configured to be located in front of a person's eye, wherein the closest distance between the plurality of nested annular light guides and the person's eye is less than 4 inches; and an annular array of light-energy emitters which is configured to be located in front of the person's eye, wherein the closest distance between the annular array of light-energy emitters and the person's eye is less than 4 inches, wherein the annular array of light-energy emitters is located around the plurality of nested annular light guides, wherein light beams from the annular array of light-energy emitters are directed toward the plurality of nested annular light guides, wherein the plurality of nested annular light guides redirect the light beams toward the person's eye, and wherein the light beams display virtual objects in the person's field of vision.

In an example, optics for one eye of augmented reality eyewear can comprise: a plurality of nested annular light guides which is configured to be located in front of a person's eye, wherein the closest distance between the plurality of nested annular light guides and the person's eye is less than 4 inches; and an annular array of light-energy emitters which is configured to be located in front of the person's eye, wherein the closest distance between the annular array of light-energy emitters and the person's eye is less than 4 inches, wherein the annular array of light-energy emitters collectively span at least 75% of the outer perimeter the plurality of nested annular light guides, wherein light beams from the annular array of light-energy emitters are directed toward the plurality of nested annular light guides, wherein the plurality of nested annular light guides redirect the light beams toward the person's eye, and wherein the light beams display virtual objects in the person's field of vision.

In an example, optics for one eye of augmented reality eyewear can comprise: at least ten nested annular light guides which are configured to be located in front of a person's eye, wherein the closest distance between the plurality of nested annular light guides and the person's eye is less than 4 inches; and at least ten annular array of light-energy emitters which are configured to be located in front of the person's eye, wherein the closest distance between the annular array of light-energy emitters and the person's eye is less than 4 inches, wherein the annular array of light-energy emitters collectively span at least 75% of the outer perimeter the plurality of nested annular light guides, wherein light beams from the annular array of light-energy emitters are directed toward the plurality of nested annular light guides, wherein the plurality of nested annular light guides redirect the light beams toward the person's eye, and wherein the light beams display virtual objects in the person's field of vision.

In an example, optics for one eye of augmented reality eyewear can comprise: a plurality of nested annular light guides which is configured to be located in front of a person's eye, wherein the closest distance between the plurality of nested annular light guides and the person's eye is less than 4 inches; and an annular array of light-energy emitters which is configured to be located in front of the person's eye, wherein the closest distance between the annular array of light-energy emitters and the person's eye is less than 4 inches, wherein the annular array of light-energy emitters is located around the plurality of nested annular light guides, wherein light beams from the annular array of light-energy emitters are directed toward distal and/or outward-facing surfaces the plurality of nested annular light guides, wherein the plurality of nested annular light guides redirect the light beams toward the person's eye, and wherein the light beams display virtual objects in the person's field of vision.

In an example, optics for one eye of augmented reality eyewear can comprise: a plurality of nested annular light guides which is configured to be located in front of a person's eye, wherein the closest distance between the plurality of nested annular light guides and the person's eye is less than 4 inches; and an annular array of light-energy emitters which is configured to be located in front of the person's eye, wherein the closest distance between the annular array of light-energy emitters and the person's eye is less than 4 inches, wherein the annular array of light-energy emitters is located around the plurality of nested annular light guides, wherein light beams from the annular array of light-energy emitters are directed toward proximal and/or inward-facing surfaces the plurality of nested annular light guides, wherein the plurality of nested annular light guides redirect the light beams toward the person's eye, and wherein the light beams display virtual objects in the person's field of vision.

In an example, optics for one eye of augmented reality eyewear can comprise: a plurality of nested annular light guides which is configured to be located in front of a person's eye, wherein the closest distance between the plurality of nested annular light guides and the person's eye is less than 4 inches; and an annular array of light-energy emitters which is configured to be located in front of the person's eye, wherein the closest distance between the annular array of light-energy emitters and the person's eye is less than 4 inches, wherein the annular array of light-energy emitters are located at a selected number of different compass and/or clock-face locations around the outer perimeter the plurality of nested annular light guides, wherein this selected number is greater than four, wherein light beams from the annular array of light-energy emitters are directed toward the plurality of nested annular light guides, wherein the plurality of nested annular light guides redirect the light beams toward the person's eye, and wherein the light beams display virtual objects in the person's field of vision.

In an example, optics for one eye of augmented reality eyewear can comprise: at least ten nested light-guiding rings which are configured to be located in front of a person's eye, wherein the closest distance between the light-guiding rings and the person's eye is less than 4 inches; and at least ten light-energy emitters which are around the light-guiding rings, wherein light beams from the light-energy emitters are directed toward the light-guiding rings, wherein the light-guiding rings redirect the light beams toward the person's eye, and wherein the light beams collectively display virtual objects in the person's field of vision.

In an example, optics for one eye of augmented reality eyewear can comprise: at least ten nested light-guiding rings which are configured to be located in front of a person's eye, wherein the closest distance between the light-guiding rings and the person's eye is less than 4 inches; and at least ten light-energy emitters which collectively span at least 75% of the outer perimeter of the light-guiding rings, wherein light beams from the light-energy emitters are directed toward the light-guiding rings, wherein the light-guiding rings redirect the light beams toward the person's eye, and wherein the light beams collectively display virtual objects in the person's field of vision.

In an example, optics for one eye of augmented reality eyewear can comprise: at least ten nested light-guiding rings which are configured to be located in front of a person's eye, wherein the closest distance between the light-guiding rings and the person's eye is less than 4 inches; and at least ten light-energy emitters which collectively span at least 75% of the outer perimeter of the light-guiding rings, wherein light beams from the light-energy emitters are directed toward distal surfaces of the light-guiding rings, wherein the light-guiding rings redirect the light beams toward the person's eye, and wherein the light beams collectively display virtual objects in the person's field of vision.

In an example, optics for one eye of augmented reality eyewear can comprise: at least ten nested light-guiding rings which are configured to be located in front of a person's eye, wherein the closest distance between the light-guiding rings and the person's eye is less than 4 inches; and at least ten light-energy emitters which collectively span at least 75% of the outer perimeter of the light-guiding rings, wherein light beams from the light-energy emitters are directed toward outward-facing surfaces of the light-guiding rings, wherein the light-guiding rings redirect the light beams toward the person's eye, and wherein the light beams collectively display virtual objects in the person's field of vision.

In an example, optics for one eye of augmented reality eyewear can comprise: at least ten nested light-guiding rings which are configured to be located in front of a person's eye, wherein the closest distance between the light-guiding rings and the person's eye is less than 4 inches; and at least ten light-energy emitters which collectively span at least 75% of the outer perimeter of the light-guiding rings, wherein light beams from the light-energy emitters are directed toward proximal surfaces of the light-guiding rings, wherein the light-guiding rings redirect the light beams toward the person's eye, and wherein the light beams collectively display virtual objects in the person's field of vision.

In an example, optics for one eye of augmented reality eyewear can comprise: at least ten nested light-guiding rings which are configured to be located in front of a person's eye, wherein the closest distance between the light-guiding rings and the person's eye is less than 4 inches; and at least ten light-energy emitters which collectively span at least 75% of the outer perimeter of the light-guiding rings, wherein light beams from the light-energy emitters are directed toward inward-facing surfaces of the light-guiding rings, wherein the light-guiding rings redirect the light beams toward the person's eye, and wherein the light beams collectively display virtual objects in the person's field of vision.

In an example, optics for one eye of augmented reality eyewear can comprise: a plurality of nested annular light guides which is configured to be located in front of a person's eye, wherein the closest distance between the plurality of nested annular light guides and the person's eye is less than 4 inches, wherein the plurality of nested annular light guides further comprises a first annular light guide and a second annular light guide; and an annular array of light-energy emitters around the plurality of nested annular light guides, wherein the annular array of light-energy emitters further comprises a first light-energy emitter and a second light-energy emitter; wherein light beams from the first light-energy emitter are directed toward the first annular light guide and then redirected (at a first angle) by the first annular light guide toward the person's eye; wherein light beams from the second light-energy emitter are directed toward the second annular light guide and then redirected (at a second angle) by the second annular light guide toward the person's eye; and wherein the light beams from the first and second light-energy emitters display virtual objects in the person's field of vision.

In an example, optics for one eye of augmented reality eyewear can comprise: a plurality of nested annular light guides which is configured to be located in front of a person's eye, wherein the closest distance between the plurality of nested annular light guides and the person's eye is less than 4 inches, wherein the plurality of nested annular light guides further comprises a first annular light guide and a second annular light guide; and an annular array of light-energy emitters around the plurality of nested annular light guides, wherein the annular array of light-energy emitters further comprises a first light-energy emitter which is located at a first (compass and/or radial degree) location on the annular array of light-energy emitters, wherein light beams from the first light-energy emitter are directed toward the first annular light guide and then redirected by the first annular light guide toward the person's eye; wherein the annular array of light-energy emitters further comprises a second light-energy emitter which is located at a second (compass and/or radial degree) location on the annular array of light-energy emitters, wherein light beams from the second light-energy emitter are directed toward the first annular light guide and then redirected by the first annular light guide toward the person's eye, wherein the second (compass and/or radial degree) location differs from the first (compass and/or radial degree) location by at least 90 degrees; and wherein the light beams from the first and second light-energy emitters display (portions of) virtual objects in the person's field of vision.

In an example, optics for one eye of augmented reality eyewear can comprise: a plurality of nested annular light guides which is configured to be located in front of a person's eye, wherein the closest distance between the plurality of nested annular light guides and the person's eye is less than 4 inches, wherein the plurality of nested annular light guides further comprises a first annular light guide and a second annular light guide; and an annular array of light-energy emitters around the plurality of nested annular light guides, wherein the annular array of light-energy emitters further comprises a first light-energy emitter which is located a first distance from the person's eye, wherein light beams from the first light-energy emitter are directed toward the first annular light guide and then redirected by the first annular light guide toward the person's eye; wherein the annular array of light-energy emitters further comprises a second light-energy emitter which is located a second distance from the person's eye, wherein light beams from the second light-energy emitter are directed toward the second annular light guide and then redirected by the second annular light guide toward the person's eye, wherein the second distance is greater than the first distance; and wherein the light beams from the first and second light-energy emitters display (portions of) virtual objects in the person's field of vision.

In an example, optics for one eye of augmented reality eyewear can comprise: a plurality of nested annular light guides which is configured to be located in front of a person's eye, wherein the closest distance between the plurality of nested annular light guides and the person's eye is less than 4 inches, wherein the plurality of nested annular light guides further comprises a first annular light guide with a first diameter, wherein the plurality of nested annular light guides further comprises a second annular light guide with a second diameter, and wherein the second diameter is less than the first diameter; and an annular array of light-energy emitters around the plurality of nested annular light guides, wherein the annular array of light-energy emitters further comprises a first light-energy emitter which is a first distance from the person's eye, wherein light beams from the first light-energy emitter are selectively directed toward the first annular light guide and redirected by the first annular light guide toward the person's eye; wherein the annular array of light-energy emitters further comprises a second light-energy emitter which is a second distance from the person's eye, wherein light beams from the second light-energy emitter are selectively directed toward the second annular light guide and redirected by the second annular light guide toward the person's eye, wherein the second distance is greater than the first distance, and wherein the light beams from the first and second light-energy emitters display (portions of) virtual objects in the person's field of vision.

In an example, optics for one eye of augmented reality eyewear can comprise: a plurality of nested annular light guides which is configured to be located in front of a person's eye, wherein the closest distance between the plurality of nested annular light guides and the person's eye is less than 4 inches, wherein the plurality of nested annular light guides further comprises a first annular light guide with a first diameter, wherein the plurality of nested annular light guides further comprises a second annular light guide with a second diameter, and wherein the second diameter is less than the first diameter; and an annular array of light-energy emitters around the plurality of nested annular light guides, wherein the annular array of light-energy emitters further comprises a first light-energy emitter which is a first distance from the person's eye, wherein light beams from the first light-energy emitter are selectively directed toward a distal (facing away from the eye) surface of the first annular light guide and redirected by the first annular light guide toward the person's eye; wherein the annular array of light-energy emitters further comprises a second light-energy emitter which is a second distance from the person's eye, wherein light beams from the second light-energy emitter are selectively directed toward a distal (facing away from the eye) surface of the second annular light guide and redirected by the second annular light guide toward the person's eye, wherein the second distance is greater than the first distance, and wherein the light beams from the first and second light-energy emitters display (portions of) virtual objects in the person's field of vision.

In an example, optics for one eye of augmented reality eyewear can comprise: a plurality of nested annular light guides which is configured to be located in front of a person's eye, wherein the closest distance between the plurality of nested annular light guides and the person's eye is less than 4 inches, wherein the plurality of nested annular light guides further comprises a first annular light guide with a first diameter, wherein the plurality of nested annular light guides further comprises a second annular light guide with a second diameter, and wherein the second diameter is less than the first diameter; and an annular array of light-energy emitters around the plurality of nested annular light guides, wherein the annular array of light-energy emitters further comprises a first light-energy emitter which is a first distance from the person's eye, wherein light beams from the first light-energy emitter are selectively directed toward a outward-facing (facing away from annular center) of the first annular light guide and redirected by the first annular light guide toward the person's eye; wherein the annular array of light-energy emitters further comprises a second light-energy emitter which is a second distance from the person's eye, wherein light beams from the second light-energy emitter are selectively directed toward a outward-facing (facing away from annular center) of the second annular light guide and redirected by the second annular light guide toward the person's eye, wherein the second distance is greater than the first distance, and wherein the light beams from the first and second light-energy emitters display (portions of) virtual objects in the person's field of vision.

In an example, optics for one eye of augmented reality eyewear can comprise: a plurality of nested annular light guides which is configured to be located in front of a person's eye, wherein the closest distance between the plurality of nested annular light guides and the person's eye is less than 4 inches, wherein the plurality of nested annular light guides further comprises a first annular light guide with a first diameter, wherein the plurality of nested annular light guides further comprises a second annular light guide with a second diameter, and wherein the second diameter is greater than the first diameter; and an annular array of light-energy emitters around the plurality of nested annular light guides, wherein the annular array of light-energy emitters further comprises a first light-energy emitter which is a first distance from the person's eye, wherein light beams from the first light-energy emitter are selectively directed toward a proximal (facing toward the eye) surface of the first annular light guide and redirected by the first annular light guide toward the person's eye; wherein the annular array of light-energy emitters further comprises a second light-energy emitter which is a second distance from the person's eye, wherein light beams from the second light-energy emitter are selectively directed toward a proximal (facing toward the eye) surface of the second annular light guide and redirected by the second annular light guide toward the person's eye, wherein the second distance is greater than the first distance, and wherein the light beams from the first and second light-energy emitters display (portions of) virtual objects in the person's field of vision.

In an example, optics for one eye of augmented reality eyewear can comprise: a plurality of nested annular light guides which is configured to be located in front of a person's eye, wherein the closest distance between the plurality of nested annular light guides and the person's eye is less than 4 inches, wherein the plurality of nested annular light guides further comprises a first annular light guide with a first diameter, wherein the plurality of nested annular light guides further comprises a second annular light guide with a second diameter, and wherein the second diameter is greater than the first diameter; and an annular array of light-energy emitters around the plurality of nested annular light guides, wherein the annular array of light-energy emitters further comprises a first light-energy emitter which is a first distance from the person's eye, wherein light beams from the first light-energy emitter are selectively directed toward a outward-facing (facing away from annular center) of the first annular light guide and redirected by the first annular light guide toward the person's eye; wherein the annular array of light-energy emitters further comprises a second light-energy emitter which is a second distance from the person's eye, wherein light beams from the second light-energy emitter are selectively directed toward a outward-facing (facing away from annular center) of the second annular light guide and redirected by the second annular light guide toward the person's eye, wherein the second distance is greater than the first distance, and wherein the light beams from the first and second light-energy emitters display (portions of) virtual objects in the person's field of vision.

In an example, optics for one eye of augmented reality eyewear can comprise: a plurality of nested light-guiding rings around a location that is within four inches of a person's eye, wherein the plurality of nested light-guiding rings further comprises a first light-guiding ring and a second light-guiding ring, wherein the second light-guiding ring is smaller than the first light-guiding ring; and a plurality of light-energy emitters around the plurality of nested light-guiding rings, wherein the plurality of light-energy emitters further comprises a first light-energy emitter and a second light-energy emitter, wherein the second light-energy emitter is farther from the person's eye than the first light-energy emitter, wherein a first light beam from the first light-energy emitter is directed toward the first light-guiding ring which redirects the first light beam toward the person's eye, wherein a second light beam from the second light-energy emitter is directed toward the second light-guiding ring which redirects the second light beam toward the person's eye, and wherein the first light beam and the second light beam display portions of virtual objects in the person's field of vision.

In an example, optics for one eye of augmented reality eyewear can comprise: a plurality of nested light-guiding rings around a central point which is within four inches of a person's eye, wherein there are at least ten light-guiding rings in the plurality of nested light-guiding rings, wherein the plurality of nested light-guiding rings further comprises a first light-guiding ring and a second light-guiding ring, wherein the second light-guiding ring is closer to the central point than the first light-guiding ring; and a plurality of light-energy emitters around the nested light-guiding rings, wherein there are at least ten light-energy emitters in the plurality of light-energy emitters, wherein the plurality of light-energy emitters further comprises a first light-energy emitter and a second light-energy emitter, wherein the second light-energy emitter is farther from the person's eye than the first light-energy emitter, wherein the first light-energy emitter and the second light-energy emitter are both at the same radial location (e.g. compass coordinate, polar coordinate, or clock position) with respect to a virtual circle (or virtual cylinder) around the central point, wherein a first light beam from the first light-energy emitter is directed toward the first light-guiding ring which redirects the first light beam toward the person's eye, wherein a second light beam from the second light-energy emitter is directed toward the second light-guiding ring which redirects the second light beam toward the person's eye, and wherein the first light beam and the second light beam display portions of virtual objects in the person's field of vision.

In an example, optics for one eye of augmented reality eyewear can comprise: a plurality of nested light-reflecting rings around a central point which is within four inches of a person's eye, wherein there are at least ten light-reflecting rings in the plurality of nested light-reflecting rings, wherein the plurality of nested light-reflecting rings further comprises a first light-reflecting ring and a second light-reflecting ring, wherein the second light-reflecting ring is closer to the central point than the first light-reflecting ring; and a plurality of light-energy emitters around the nested light-reflecting rings, wherein there are at least ten light-energy emitters in the plurality of light-energy emitters, wherein the plurality of light-energy emitters further comprises a first light-energy emitter and a second light-energy emitter, wherein the second light-energy emitter is farther from the person's eye than the first light-energy emitter, wherein the first light-energy emitter and the second light-energy emitter are both at the same radial location (e.g. compass coordinate, polar coordinate, or clock position) with respect to a virtual circle (or virtual cylinder) around the central point, wherein a first light beam from the first light-energy emitter is directed toward the first light-reflecting ring which reflects the first light beam toward the person's eye, wherein a second light beam from the second light-energy emitter is directed toward the second light-reflecting ring which reflects the second light beam toward the person's eye, and wherein the first light beam and the second light beam display portions of virtual objects in the person's field of vision.

In an example, optics for one eye of augmented reality eyewear can comprise: a plurality of nested light-refracting rings around a central point which is within four inches of a person's eye, wherein there are at least ten light-refracting rings in the plurality of nested light-refracting rings, wherein the plurality of nested light-refracting rings further comprises a first light-refracting ring and a second light-refracting ring, wherein the second light-refracting ring is closer to the central point than the first light-refracting ring; and a plurality of light-energy emitters around the nested light-refracting rings, wherein there are at least ten light-energy emitters in the plurality of light-energy emitters, wherein the plurality of light-energy emitters further comprises a first light-energy emitter and a second light-energy emitter, wherein the second light-energy emitter is farther from the person's eye than the first light-energy emitter, wherein the first light-energy emitter and the second light-energy emitter are both at the same radial location (e.g. compass coordinate, polar coordinate, or clock position) with respect to a virtual circle (or virtual cylinder) around the central point, wherein a first light beam from the first light-energy emitter is directed toward the first light-refracting ring which refracts the first light beam toward the person's eye, wherein a second light beam from the second light-energy emitter is directed toward the second light-refracting ring which refracts the second light beam toward the person's eye, and wherein the first light beam and the second light beam display portions of virtual objects in the person's field of vision.

In an example, optics for one eye of augmented reality eyewear can comprise: a plurality of nested light-reflecting rings around a central point which is within four inches of a person's eye, wherein there are at least ten light-reflecting rings in the plurality of nested light-reflecting rings, wherein the plurality of nested light-reflecting rings further comprises a first light-reflecting ring and a second light-reflecting ring, wherein the second light-reflecting ring is closer to the central point than the first light-reflecting ring; and a plurality of light-energy emitters around the nested light-reflecting rings, wherein there are at least ten light-energy emitters in the plurality of light-energy emitters, wherein the plurality of light-energy emitters further comprises a first light-energy emitter and a second light-energy emitter, wherein the first light-energy emitter and the second light-energy emitter are at different radial locations (e.g. compass coordinates, polar coordinates, or clock positions) with respect to a virtual circle (or virtual cylinder) around the central point (e.g. locations which differ by at least 90 degrees or 3 clock hours, wherein a first light beam from the first light-energy emitter is directed toward the first light-reflecting ring which reflects the first light beam toward the person's eye, wherein a second light beam from the second light-energy emitter is directed toward the first light-reflecting ring which reflects the second light beam toward the person's eye, and wherein the first light beam and the second light beam display portions of virtual objects in the person's field of vision.

In an example, optics for one eye of augmented reality eyewear can comprise: a plurality of nested light-refracting rings around a central point which is within four inches of a person's eye, wherein there are at least ten light-refracting rings in the plurality of nested light-refracting rings, wherein the plurality of nested light-refracting rings further comprises a first light-refracting ring and a second light-refracting ring, wherein the second light-refracting ring is closer to the central point than the first light-refracting ring; and a plurality of light-energy emitters around the nested light-refracting rings, wherein there are at least ten light-energy emitters in the plurality of light-energy emitters, wherein the plurality of light-energy emitters further comprises a first light-energy emitter and a second light-energy emitter, wherein the first light-energy emitter and the second light-energy emitter are at different radial locations (e.g. compass coordinates, polar coordinates, or clock positions) with respect to a virtual circle (or virtual cylinder) around the central point (e.g. locations which differ by at least 90 degrees or 3 clock hours, wherein a first light beam from the first light-energy emitter is directed toward the first light-refracting ring which refracts the first light beam toward the person's eye, wherein a second light beam from the second light-energy emitter is directed toward the first light-refracting ring which refracts the second light beam toward the person's eye, and wherein the first light beam and the second light beam display portions of virtual objects in the person's field of vision.

In an example, optics for one eye of augmented reality eyewear can comprise: a plurality of nested light-guiding rings around a central point which is within four inches of a person's eye, wherein the plurality of nested light-guiding rings further comprises a first light-guiding ring and a second light-guiding ring, wherein the second light-guiding ring is closer to the central point than the first light-guiding ring; and a plurality light-energy emitters around the outer perimeter of the plurality of nested light-guiding rings; wherein the plurality of light-energy emitters further comprises a first light-energy emitter, a second light-energy emitter, a third light-energy emitter, and a fourth light-energy emitter; wherein the first light-energy emitter and the second light-energy emitter are located at a first radial location (e.g. a first compass coordinate, polar coordinate, or clock position) with respect to a virtual circle (or virtual cylinder) around the central point; wherein the third light-energy emitter and the fourth light-energy emitter are located at a second radial location (e.g. a first compass coordinate, polar coordinate, or clock position) with respect to a virtual circle (or virtual cylinder) around the central point; wherein the first radial location and the second radial location differ by at least 90 degrees (in compass or polar coordinates) or three clock hours (in clock positions); wherein the second light-energy emitter is farther from the person's eye than the first light-energy emitter; wherein the fourth light-energy emitter is farther from the person's eye than the third light-energy emitter; wherein a first light beam from the first light-energy emitter is directed toward the first light-guiding ring which redirects the first light beam toward the person's eye, wherein a second light beam from the second light-energy emitter is directed toward the second light-guiding ring which redirects the second light beam toward the person's eye, wherein a third light beam from the third light-energy emitter is directed toward the first light-guiding ring which redirects the third light beam toward the person's eye, wherein a fourth light beam from the fourth light-energy emitter is directed toward the second light-guiding ring which redirects the fourth light beam toward the person's eye; and wherein the first, second, third, and fourth light beams display portions of virtual objects in the person's field of vision.

In an example, optics for one eye of augmented reality eyewear can comprise: a plurality of nested light-guiding rings around a central point which is within four inches of a person's eye, wherein the plurality of nested light-guiding rings further comprises a first light-guiding ring and a second light-guiding ring, wherein the second light-guiding ring is closer to (e.g. smaller than) the central point than the first light-guiding ring; and a plurality light-energy emitters around the outer perimeter of the plurality of nested light-guiding rings; wherein the plurality of light-energy emitters further comprises a first light-energy emitter, a second light-energy emitter, a third light-energy emitter, and a fourth light-energy emitter; wherein the first light-energy emitter and the second light-energy emitter are located at a first radial location (e.g. a first compass coordinate, polar coordinate, or clock position) with respect to a virtual circle (or virtual cylinder) around the central point; wherein the third light-energy emitter and the fourth light-energy emitter are located at a second radial location (e.g. a first compass coordinate, polar coordinate, or clock position) with respect to a virtual circle (or virtual cylinder) around the central point; wherein the first radial location and the second radial location differ by at least 90 degrees (in compass or polar coordinates) or three clock hours (in clock positions); wherein the second light-energy emitter is farther from the person's eye than the first light-energy emitter; wherein the fourth light-energy emitter is farther from the person's eye than the third light-energy emitter; wherein a first light beam from the first light-energy emitter is directed toward a distal (facing away from the eye) or outward-facing (facing away from the central point) surface of the first light-guiding ring which redirects the first light beam toward the person's eye, wherein a second light beam from the second light-energy emitter is directed toward a distal (facing away from the eye) or outward-facing (facing away from the central point) surface of the second light-guiding ring which redirects the second light beam toward the person's eye, wherein a third light beam from the third light-energy emitter is directed toward a distal (facing away from the eye) or outward-facing (facing away from the central point) surface of the first light-guiding ring which redirects the third light beam toward the person's eye, wherein a fourth light beam from the fourth light-energy emitter is directed toward a distal (facing away from the eye) or outward-facing (facing away from the central point) surface of the second light-guiding ring which redirects the fourth light beam toward the person's eye; and wherein the first, second, third, and fourth light beams display portions of virtual objects in the person's field of vision.

In an example, optics for one eye of augmented reality eyewear can comprise: a plurality of nested light-guiding rings around a central point which is within four inches of a person's eye, wherein the plurality of nested light-guiding rings further comprises a first light-guiding ring and a second light-guiding ring, wherein the second light-guiding ring is farther from the central point (e.g. larger) than the first light-guiding ring; and a plurality light-energy emitters around the outer perimeter of the plurality of nested light-guiding rings; wherein the plurality of light-energy emitters further comprises a first light-energy emitter, a second light-energy emitter, a third light-energy emitter, and a fourth light-energy emitter; wherein the first light-energy emitter and the second light-energy emitter are located at a first radial location (e.g. a first compass coordinate, polar coordinate, or clock position) with respect to a virtual circle (or virtual cylinder) around the central point; wherein the third light-energy emitter and the fourth light-energy emitter are located at a second radial location (e.g. a first compass coordinate, polar coordinate, or clock position) with respect to a virtual circle (or virtual cylinder) around the central point; wherein the first radial location and the second radial location differ by at least 90 degrees (in compass or polar coordinates) or three clock hours (in clock positions); wherein the second light-energy emitter is farther from the person's eye than the first light-energy emitter; wherein the fourth light-energy emitter is farther from the person's eye than the third light-energy emitter; wherein a first light beam from the first light-energy emitter is directed toward a proximal (facing toward the eye) or outward-facing (facing away from the central point) surface of the first light-guiding ring which redirects the first light beam toward the person's eye, wherein a second light beam from the second light-energy emitter is directed toward a proximal (facing toward the eye) or outward-facing (facing away from the central point) surface of the second light-guiding ring which redirects the second light beam toward the person's eye, wherein a third light beam from the third light-energy emitter is directed toward a proximal (facing toward the eye) or outward-facing (facing away from the central point) surface of the first light-guiding ring which redirects the third light beam toward the person's eye, wherein a fourth light beam from the fourth light-energy emitter is directed toward a proximal (facing toward the eye) or outward-facing (facing away from the central point) surface of the second light-guiding ring which redirects the fourth light beam toward the person's eye; and wherein the first, second, third, and fourth light beams display portions of virtual objects in the person's field of vision.

In an example, optics for one eye of augmented reality eyewear can comprise: a plurality of nested annular light guides which is configured to be located in front of a person's eye, wherein the closest distance between the plurality of nested annular light guides and the person's eye is less than 4 inches; and an annular array of scanning light-energy emitters around the plurality of nested annular light guides, wherein light beams from scanning light-energy emitters in the annular array of light-energy emitters are directed toward annular light guides in the plurality of nested annular light guides, wherein the annular light guides redirect the light beams toward the person's eye, and wherein the light beams collectively display virtual objects in the person's field of vision.

In an example, optics for one eye of augmented reality eyewear can comprise: a lens with a plurality of nested annular light guides, wherein the plurality of nested annular light guides further comprises a first annular light guide and a second annular light guide, wherein the second annular light guide is smaller than the first annular light guide; and a light-energy emitter holder which holds an annular array of scanning light-energy emitters around the outer perimeter of the plurality of nested annular light guides; wherein the annular array of scanning light-energy emitters further comprises a first scanning light-energy emitter and a second scanning light-energy emitter; wherein the first scanning light-energy emitter is located at a first radial location with respect to a virtual circle; wherein the second scanning light-energy emitter is located at a second radial location with respect to the virtual circle; wherein a first light beam from the first scanning light-energy emitter is directed toward the first annular light guide at a first time and the first annular light guide redirects the first light beam toward the person's eye, wherein a second light beam from the first scanning light-energy emitter is directed toward the second annular light guide at a second time and the second annular light guide redirects the second light beam toward the person's eye, wherein a third light beam from the first scanning light-energy emitter is directed toward the first annular light guide at a first time and the first annular light guide redirects the third light beam toward the person's eye, wherein a fourth light beam from the first scanning light-energy emitter is directed toward the second annular light guide at a second time and the second annular light guide redirects the fourth light beam toward the person's eye, and wherein the first, second, third, and fourth light beams display portions of virtual objects in the person's field of vision.

In an example, optics for one eye of augmented reality eyewear can comprise: a lens with a plurality of parallel light guides, wherein the plurality of parallel light guides further comprises a first light guide and a second light guide; and a light-energy emitter holder which holds a plurality light-energy emitters along the top (e.g. upper perimeter) of the plurality of parallel light guides; wherein the plurality of light-energy emitters further comprises a first light-energy emitter and a second light-energy emitter; wherein the second light-energy emitter is farther from the person's eye than the first light-energy emitter; wherein a first light beam from the first light-energy emitter is directed toward the first light guide which redirects the first light beam toward the person's eye, wherein a second light beam from the second light-energy emitter is directed toward the second light guide which redirects the second light beam toward the person's eye; and wherein the first and second light beams display portions of virtual objects in the person's field of vision.

In an example, optics for one eye of augmented reality eyewear can comprise: a lens with a plurality of parallel light guides, wherein the plurality of parallel light guides further comprises a first light guide and a second light guide; and a light-energy emitter holder which holds an array of scanning light-energy emitters along the top (e.g. upper perimeter) of the plurality of parallel light guides; wherein the array of scanning light-energy emitters further comprises a scanning light-energy emitter; wherein a first light beam from the scanning light-energy emitter is directed at a first time toward the first light guide which redirects the first light beam toward the person's eye, wherein a second light beam from the scanning light-energy emitter is directed at a second time toward the second light guide which redirects the second light beam toward the person's eye; and wherein the first and second light beams display portions of virtual objects in the person's field of vision.

Figure 113:
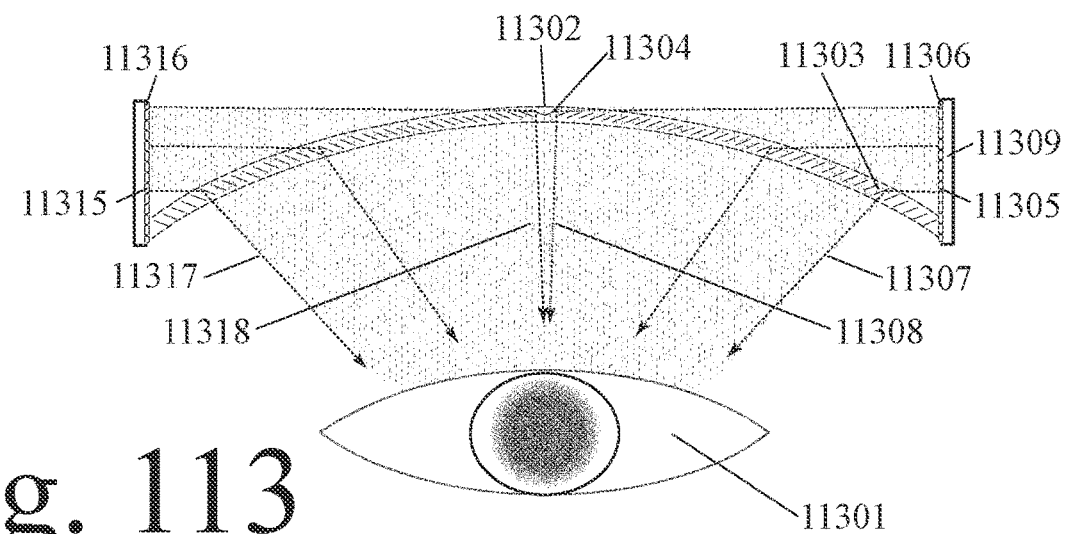
FIGS. 113 and 114 show views of a distal annular array of light emitters around a concave array of nested annular light guides.
Figure 114:
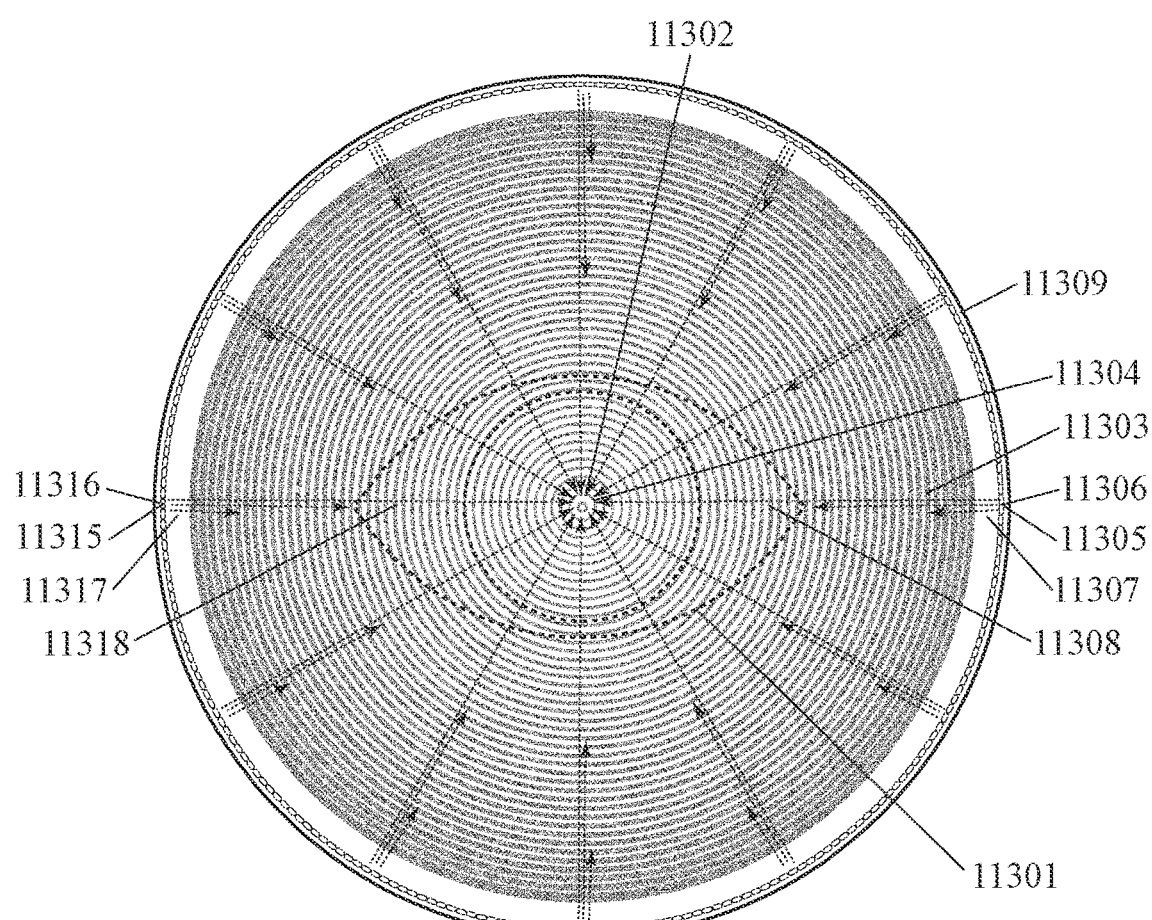

FIGS. 113 through 132 are now discussed in detail. Relevant example and component variations discussed elsewhere in this disclosure or in priority-linked disclosures can be applied to them, but are not repeated in the narratives accompanying each figure in order avoid narrative redundancy. FIGS. 113 and 114 show top-down-cross-sectional and frontal views, respectively, of an example of an optical structure for one eye of augmented reality eyewear comprising: a plurality of nested annular light guides which is configured to be located in front of a person's eye, wherein the closest distance between the plurality of nested annular light guides and the person's eye is less than 4 inches; and an annular array of light-energy emitters around the plurality of nested annular light guides, wherein light beams from light-energy emitters in the annular array of light-energy emitters are directed toward annular light guides in the plurality of nested annular light guides, wherein the annular light guides redirect the light beams toward the person's eye, and wherein the light beams collectively display virtual objects in the person's field of vision. In an example, optics for one eye of augmented reality eyewear can comprise two such optical structures, one for each eye.

Describing FIGS. 113 and 114 in greater detail, they show top-down-cross-sectional and front views, respectively, of an optical structure for one eye (11301) of augmented reality eyewear comprising: a lens (11302) with a plurality of nested annular light guides, wherein the plurality of nested annular light guides further comprises a first annular light guide (11303) and a second annular light guide (11304), wherein the second annular light guide is smaller than the first annular light guide; and a light-energy emitter holder (11309) which holds a plurality light-energy emitters around the outer perimeter of the plurality of nested annular light guides; wherein the plurality of light-energy emitters further comprises a first light-energy emitter (11305), a second light-energy emitter (11306), a third light-energy emitter (11315), and a fourth light-energy emitter (11316); wherein the first light-energy emitter and the second light-energy emitter are located at a first radial location with respect to a virtual circle; wherein the third light-energy emitter and the fourth light-energy emitter are located at a second radial location with respect to the virtual circle; wherein the second light-energy emitter is farther from the person's eye than the first light-energy emitter; wherein the fourth light-energy emitter is farther from the person's eye than the third light-energy emitter; wherein a first light beam (11307) from the first light-energy emitter is directed toward an outward-facing surface of the first annular light guide which redirects the first light beam toward the person's eye, wherein a second light beam (11308) from the second light-energy emitter is directed toward an outward-facing surface of the second annular light guide which redirects the second light beam toward the person's eye, wherein a third light beam (11317) from the third light-energy emitter is directed toward an outward-facing surface of the first annular light guide which redirects the third light beam toward the person's eye, wherein a fourth light beam (11318) from the fourth light-energy emitter is directed toward an outward-facing surface of the second annular light guide which redirects the fourth light beam toward the person's eye; and wherein the first, second, third, and fourth light beams display portions of virtual objects in the person's field of vision.

In this example, the annular light guides are reflective or refractive rings. In this example, the annular light guides are reflective or refractive rings which are incorporated into a lens. In this example, the annular light guides are concentric. In this example, the proximal side of the combined virtual surface of the plurality of nested annular light guides is concave (having a rounded vertex which faces away from the person's eye). In this example, there are more than ten annular light guides. In this example, there are more than ten light-energy emitters. In this example, light-energy emitters are distributed around the entire outer perimeter of the plurality of nested annular light guides. In this example, first and second radial locations differ by at least 60 degrees (in compass or polar coordinates) or two clock hours (in clock positions). In this example, light-energy emitters are distal relative to the combined virtual surface of the plurality of nested annular light guides. Example variations discussed in other portions of this disclosure or in priority-linked disclosures can also be applied to this example where relevant, but are not repeated here in order to reduce narrative redundancy.

Figure 115:
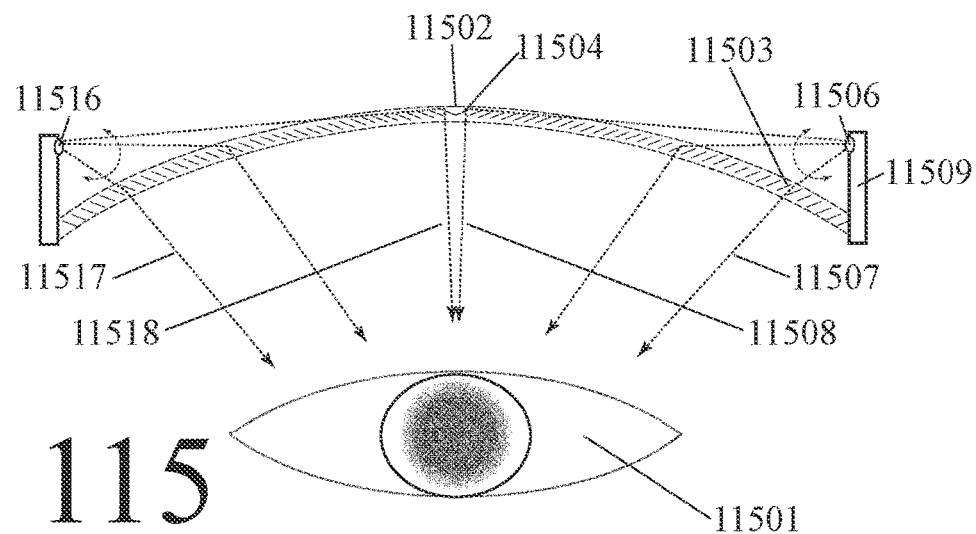
FIGS. 115 and 116 show views of a distal annular array of scanning light emitters around a concave array of nested annular light guides.
Figure 116:
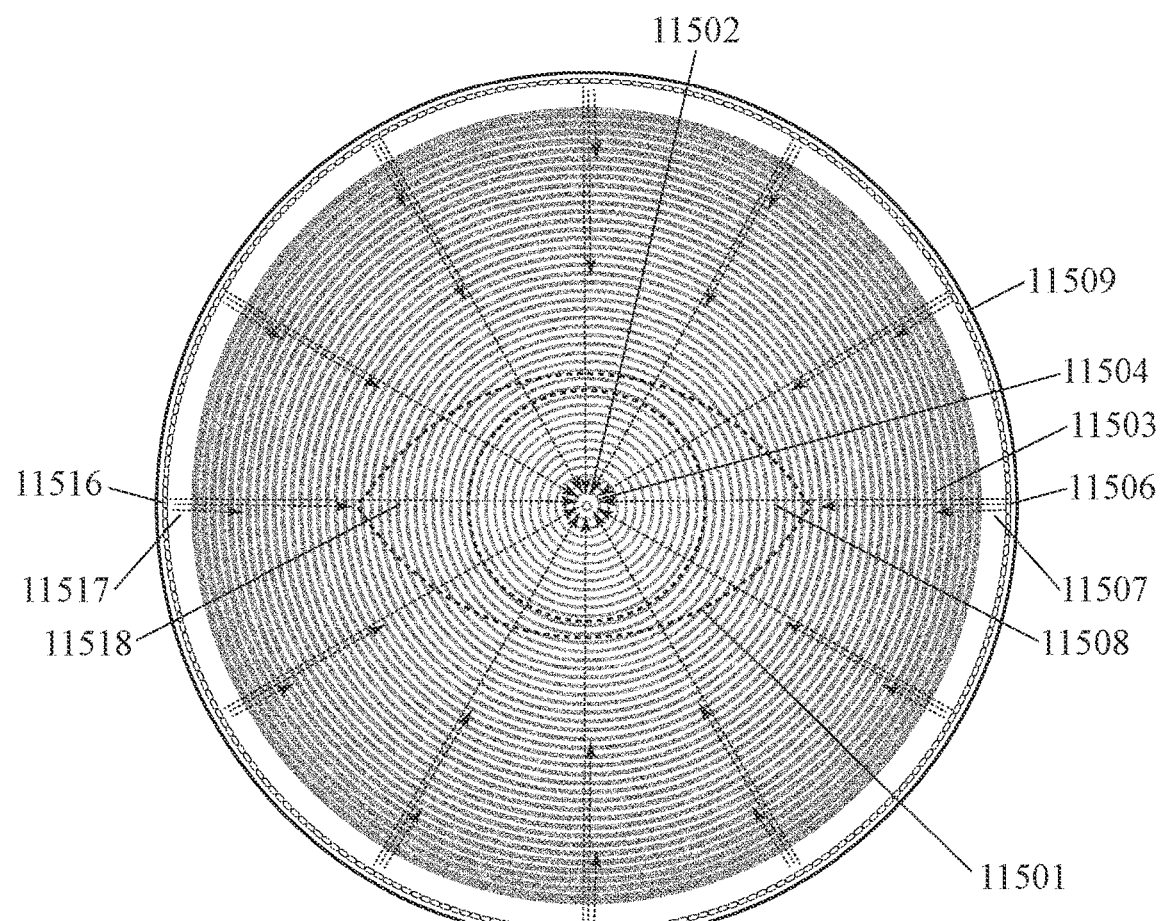

FIGS. 115 and 116 show top-down-cross-sectional and frontal views, respectively, of an example of an optical structure for one eye of augmented reality eyewear comprising: a plurality of nested annular light guides which is configured to be located in front of a person's eye, wherein the closest distance between the plurality of nested annular light guides and the person's eye is less than 4 inches; and an annular array of scanning light-energy emitters around the plurality of nested annular light guides, wherein light beams from scanning light-energy emitters in the annular array of light-energy emitters are directed toward annular light guides in the plurality of nested annular light guides, wherein the annular light guides redirect the light beams toward the person's eye, and wherein the light beams collectively display virtual objects in the person's field of vision. In an example, optics for one eye of augmented reality eyewear can comprise two such optical structures, one for each eye.

Describing FIGS. 115 and 116 in greater detail, they show top-down-cross-sectional and front views, respectively, of an optical structure for one eye (11501) of augmented reality eyewear comprising: a lens (11502) with a plurality of nested annular light guides, wherein the plurality of nested annular light guides further comprises a first annular light guide (11503) and a second annular light guide (11504), wherein the second annular light guide is smaller than the first annular light guide; and a light-energy emitter holder (11509) which holds an annular array of scanning light-energy emitters around the outer perimeter of the plurality of nested annular light guides; wherein the annular array of scanning light-energy emitters further comprises a first scanning light-energy emitter (11506) and a second scanning light-energy emitter (11516); wherein the first scanning light-energy emitter is located at a first radial location with respect to a virtual circle; wherein the second scanning light-energy emitter is located at a second radial location with respect to the virtual circle; wherein a first light beam (11507) from the first scanning light-energy emitter is directed toward the first annular light guide at a first time and the first annular light guide redirects the first light beam toward the person's eye, wherein a second light beam (11508) from the first scanning light-energy emitter is directed toward the second annular light guide at a second time and the second annular light guide redirects the second light beam toward the person's eye, wherein a third light beam (11517) from the first scanning light-energy emitter is directed toward the first annular light guide at a first time and the first annular light guide redirects the third light beam toward the person's eye, wherein a fourth light beam (11518) from the first scanning light-energy emitter is directed toward the second annular light guide at a second time and the second annular light guide redirects the fourth light beam toward the person's eye, and wherein the first, second, third, and fourth light beams display portions of virtual objects in the person's field of vision.

In this example, the annular light guides are reflective or refractive rings. In this example, the annular light guides are reflective or refractive rings which are incorporated into a lens. In this example, the annular light guides are concentric. In this example, the proximal side of the combined virtual surface of the plurality of nested annular light guides is concave (having a rounded vertex which faces away from the person's eye). In this example, there are more than ten annular light guides. In this example, there are more than ten light-energy emitters. In this example, light-energy emitters are distributed around the entire outer perimeter of the plurality of nested annular light guides. In this example, first and second radial locations differ by at least 60 degrees (in compass or polar coordinates) or two clock hours (in clock positions). In this example, light-energy emitters are distal relative to the combined virtual surface of the plurality of nested annular light guides. Example variations discussed in other portions of this disclosure or in priority-linked disclosures can also be applied to this example where relevant, but are not repeated here in order to reduce narrative redundancy.

Figure 117:
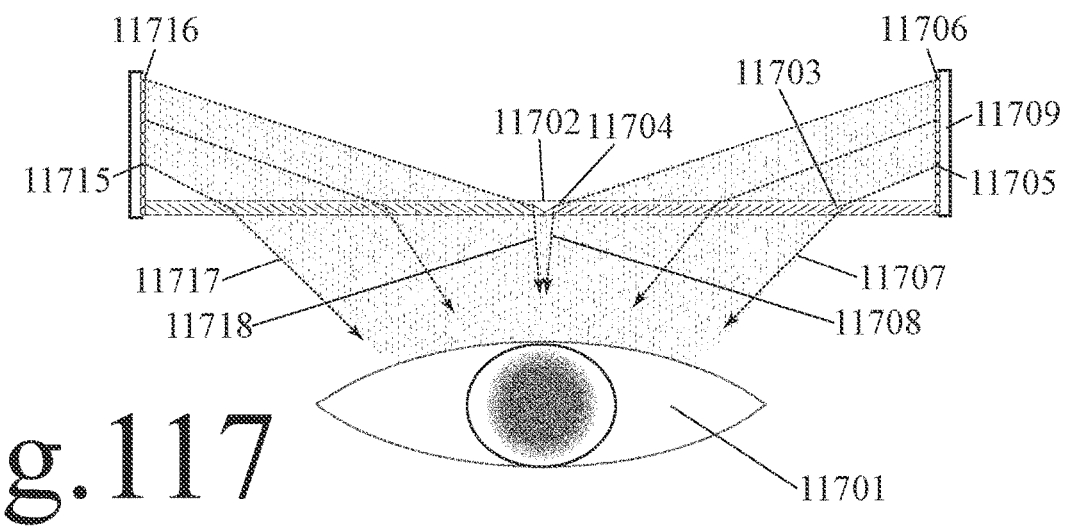
FIGS. 117 and 118 show views of a distal annular array of light emitters around a planar array of nested annular light guides.
Figure 118:
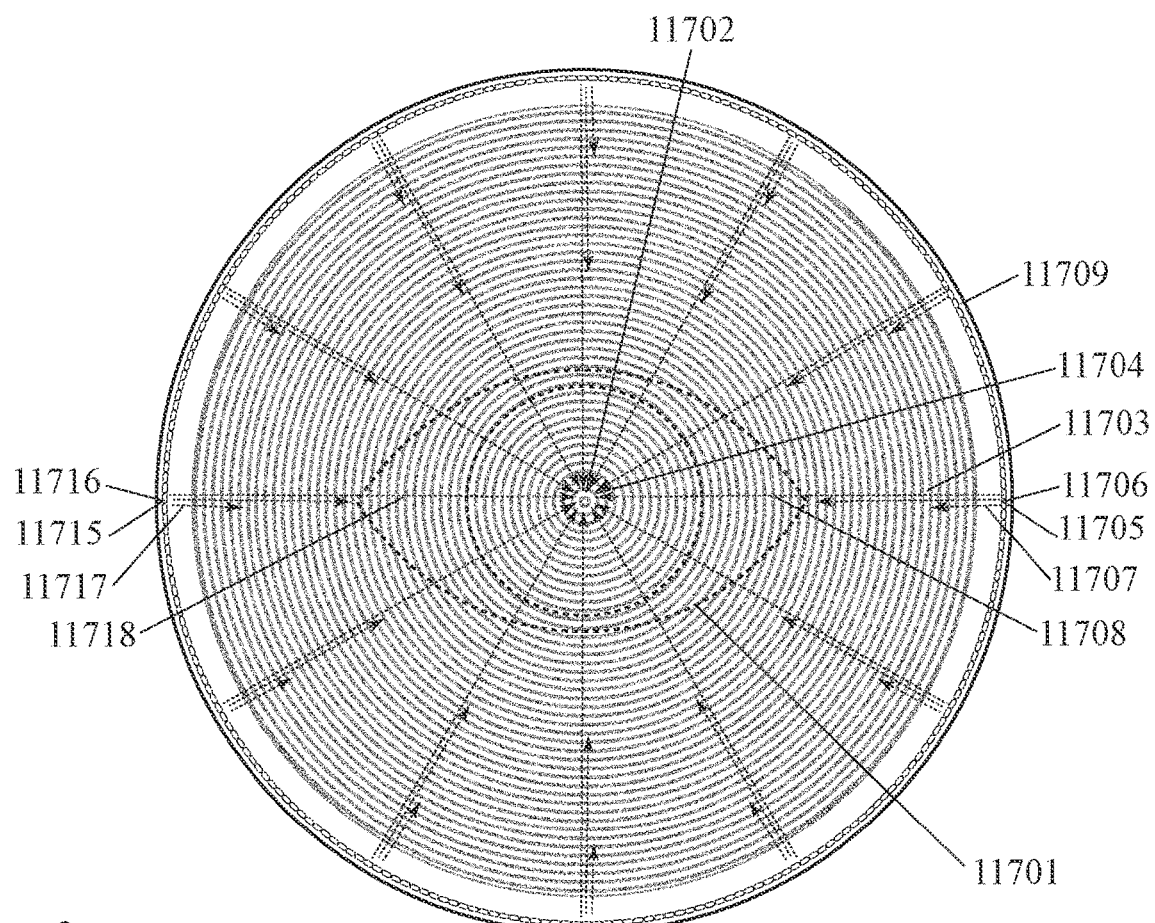

FIGS. 117 and 118 show top-down-cross-sectional and frontal views, respectively, of an example of an optical structure for one eye of augmented reality eyewear comprising: a plurality of nested annular light guides which is configured to be located in front of a person's eye, wherein the closest distance between the plurality of nested annular light guides and the person's eye is less than 4 inches; and an annular array of light-energy emitters around the plurality of nested annular light guides, wherein light beams from light-energy emitters in the annular array of light-energy emitters are directed toward annular light guides in the plurality of nested annular light guides, wherein the annular light guides redirect the light beams toward the person's eye, and wherein the light beams collectively display virtual objects in the person's field of vision. In an example, optics for one eye of augmented reality eyewear can comprise two such optical structures, one for each eye.

Describing FIGS. 117 and 118 in greater detail, they show top-down-cross-sectional and front views, respectively, of an optical structure for one eye (11701) of augmented reality eyewear comprising: a lens (11702) with a plurality of nested annular light guides, wherein the plurality of nested annular light guides further comprises a first annular light guide (11703) and a second annular light guide (11704), wherein the second annular light guide is smaller than the first annular light guide; and a light-energy emitter holder (11709) which holds a plurality light-energy emitters around the outer perimeter of the plurality of nested annular light guides; wherein the plurality of light-energy emitters further comprises a first light-energy emitter (11705), a second light-energy emitter (11706), a third light-energy emitter (11715), and a fourth light-energy emitter (11716); wherein the first light-energy emitter and the second light-energy emitter are located at a first radial location with respect to a virtual circle; wherein the third light-energy emitter and the fourth light-energy emitter are located at a second radial location with respect to the virtual circle; wherein the second light-energy emitter is farther from the person's eye than the first light-energy emitter; wherein the fourth light-energy emitter is farther from the person's eye than the third light-energy emitter; wherein a first light beam (11707) from the first light-energy emitter is directed toward an outward-facing surface of the first annular light guide which redirects the first light beam toward the person's eye, wherein a second light beam (11708) from the second light-energy emitter is directed toward an outward-facing surface of the second annular light guide which redirects the second light beam toward the person's eye, wherein a third light beam (11717) from the third light-energy emitter is directed toward an outward-facing surface of the first annular light guide which redirects the third light beam toward the person's eye, wherein a fourth light beam (11718) from the fourth light-energy emitter is directed toward an outward-facing surface of the second annular light guide which redirects the fourth light beam toward the person's eye; and wherein the first, second, third, and fourth light beams display portions of virtual objects in the person's field of vision.

In this example, the annular light guides are reflective or refractive rings. In this example, the annular light guides are reflective or refractive rings which are incorporated into a lens. In this example, the annular light guides are concentric. In this example, the proximal side of the combined virtual surface of the plurality of nested annular light guides is substantially flat. In this example, there are more than ten annular light guides. In this example, there are more than ten light-energy emitters. In this example, light-energy emitters are distributed around the entire outer perimeter of the plurality of nested annular light guides. In this example, first and second radial locations differ by at least 60 degrees (in compass or polar coordinates) or two clock hours (in clock positions). In this example, light-energy emitters are distal relative to the combined virtual surface of the plurality of nested annular light guides. Example variations discussed in other portions of this disclosure or in priority-linked disclosures can also be applied to this example where relevant, but are not repeated here in order to reduce narrative redundancy.

Figure 119:
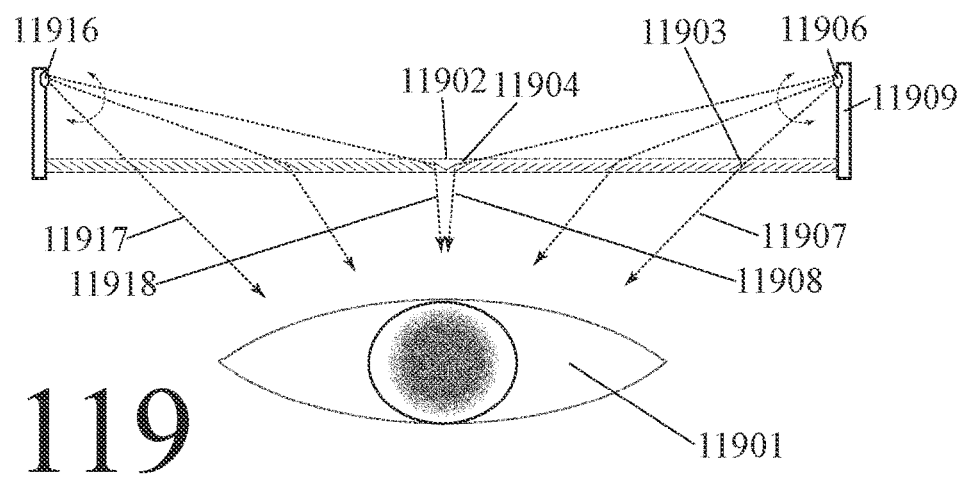
FIGS. 119 and 120 show views of a distal annular array of scanning light emitters around a planar array of nested annular light guides.
Figure 120:
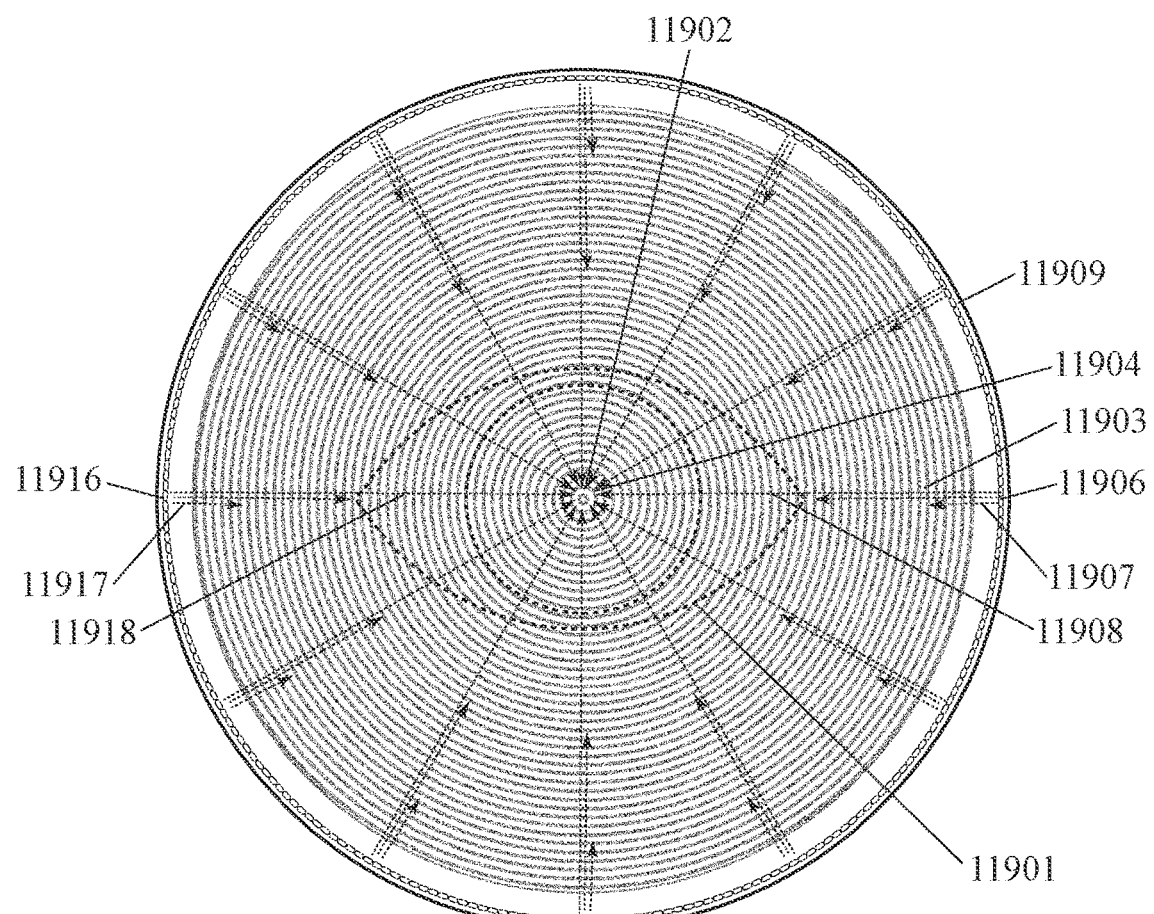

FIGS. 119 and 120 show top-down-cross-sectional and frontal views, respectively, of an example of an optical structure for one eye of augmented reality eyewear comprising: a plurality of nested annular light guides which is configured to be located in front of a person's eye, wherein the closest distance between the plurality of nested annular light guides and the person's eye is less than 4 inches; and an annular array of scanning light-energy emitters around the plurality of nested annular light guides, wherein light beams from scanning light-energy emitters in the annular array of light-energy emitters are directed toward annular light guides in the plurality of nested annular light guides, wherein the annular light guides redirect the light beams toward the person's eye, and wherein the light beams collectively display virtual objects in the person's field of vision. In an example, optics for one eye of augmented reality eyewear can comprise two such optical structures, one for each eye.

Describing FIGS. 119 and 120 in greater detail, they show top-down-cross-sectional and front views, respectively, of an optical structure for one eye (11901) of augmented reality eyewear comprising: a lens (11902) with a plurality of nested annular light guides, wherein the plurality of nested annular light guides further comprises a first annular light guide (11903) and a second annular light guide (11904), wherein the second annular light guide is smaller than the first annular light guide; and a light-energy emitter holder (11909) which holds an annular array of scanning light-energy emitters around the outer perimeter of the plurality of nested annular light guides; wherein the annular array of scanning light-energy emitters further comprises a first scanning light-energy emitter (11906) and a second scanning light-energy emitter (11916); wherein the first scanning light-energy emitter is located at a first radial location with respect to a virtual circle; wherein the second scanning light-energy emitter is located at a second radial location with respect to the virtual circle; wherein a first light beam (11907) from the first scanning light-energy emitter is directed toward the first annular light guide at a first time and the first annular light guide redirects the first light beam toward the person's eye, wherein a second light beam (11908) from the first scanning light-energy emitter is directed toward the second annular light guide at a second time and the second annular light guide redirects the second light beam toward the person's eye, wherein a third light beam (11917) from the first scanning light-energy emitter is directed toward the first annular light guide at a first time and the first annular light guide redirects the third light beam toward the person's eye, wherein a fourth light beam (11918) from the first scanning light-energy emitter is directed toward the second annular light guide at a second time and the second annular light guide redirects the fourth light beam toward the person's eye, and wherein the first, second, third, and fourth light beams display portions of virtual objects in the person's field of vision.

In this example, the annular light guides are reflective or refractive rings. In this example, the annular light guides are reflective or refractive rings which are incorporated into a lens. In this example, the annular light guides are concentric. In this example, the proximal side of the combined virtual surface of the plurality of nested annular light guides is substantially flat. In this example, there are more than ten annular light guides. In this example, there are more than ten light-energy emitters. In this example, light-energy emitters are distributed around the entire outer perimeter of the plurality of nested annular light guides. In this example, first and second radial locations differ by at least 60 degrees (in compass or polar coordinates) or two clock hours (in clock positions). In this example, light-energy emitters are distal relative to the combined virtual surface of the plurality of nested annular light guides. Example variations discussed in other portions of this disclosure or in priority-linked disclosures can also be applied to this example where relevant, but are not repeated here in order to reduce narrative redundancy.

Figure 121:
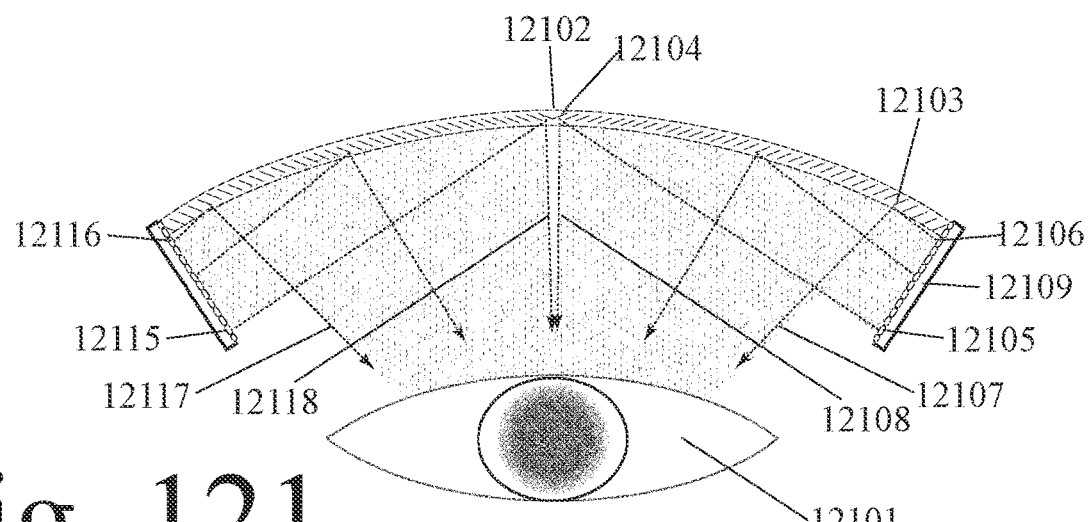
FIGS. 121 and 122 show views of a proximal annular array of light emitters around a concave array of nested annular light guides.
Figure 122:
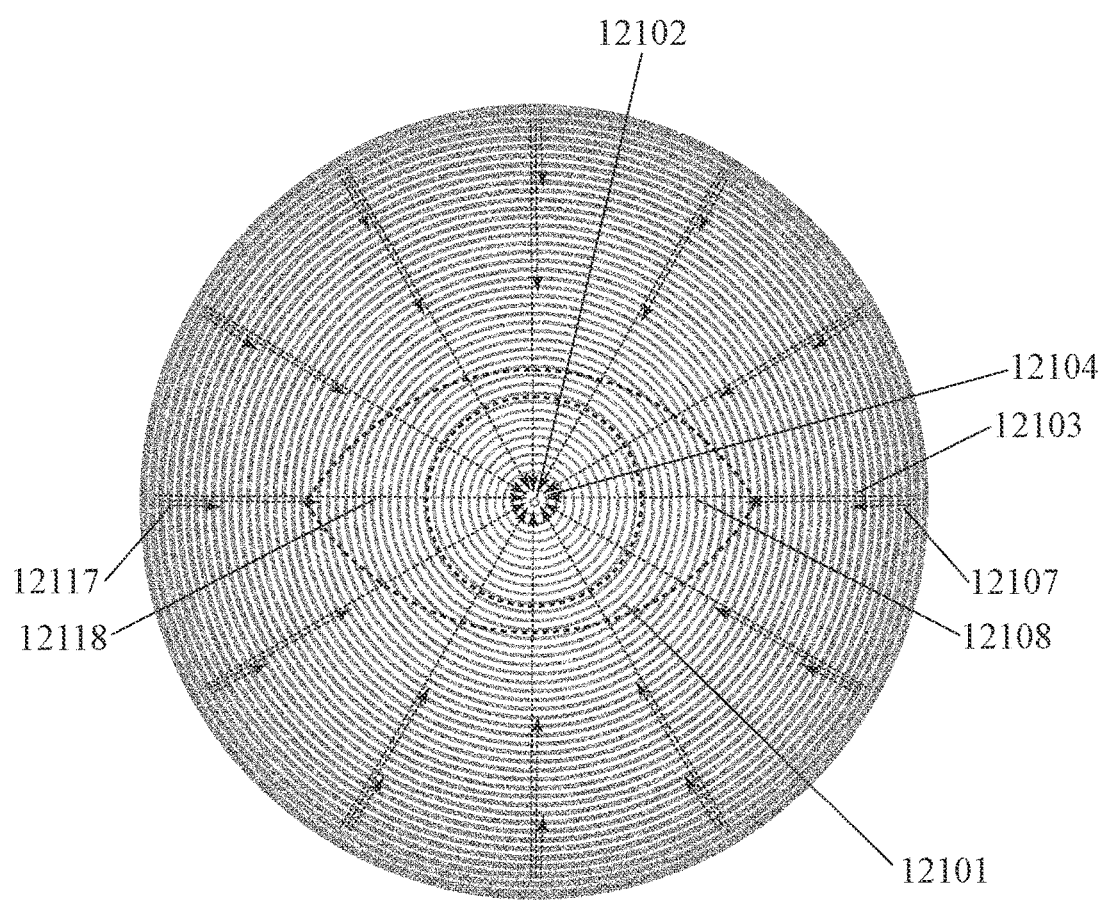

FIGS. 121 and 122 show top-down-cross-sectional and frontal views, respectively, of an example of an optical structure for one eye of augmented reality eyewear comprising: a plurality of nested annular light guides which is configured to be located in front of a person's eye, wherein the closest distance between the plurality of nested annular light guides and the person's eye is less than 4 inches; and an annular array of light-energy emitters around the plurality of nested annular light guides, wherein light beams from light-energy emitters in the annular array of light-energy emitters are directed toward annular light guides in the plurality of nested annular light guides, wherein the annular light guides redirect the light beams toward the person's eye, and wherein the light beams collectively display virtual objects in the person's field of vision. In an example, optics for one eye of augmented reality eyewear can comprise two such optical structures, one for each eye.

Describing FIGS. 121 and 122 in greater detail, they show top-down-cross-sectional and front views, respectively, of an optical structure for one eye (12101) of augmented reality eyewear comprising: a lens (12102) with a plurality of nested annular light guides, wherein the plurality of nested annular light guides further comprises a first annular light guide (12103) and a second annular light guide (12104), wherein the second annular light guide is smaller than the first annular light guide; and a light-energy emitter holder (12109) which holds a plurality light-energy emitters around the outer perimeter of the plurality of nested annular light guides; wherein the plurality of light-energy emitters further comprises a first light-energy emitter (12105), a second light-energy emitter (12106), a third light-energy emitter (12115), and a fourth light-energy emitter (12116); wherein the first light-energy emitter and the second light-energy emitter are located at a first radial location with respect to a virtual circle; wherein the third light-energy emitter and the fourth light-energy emitter are located at a second radial location with respect to the virtual circle; wherein the second light-energy emitter is farther from the person's eye than the first light-energy emitter; wherein the fourth light-energy emitter is farther from the person's eye than the third light-energy emitter; wherein a first light beam (12108) from the first light-energy emitter is directed toward an outward-facing surface of the second annular light guide which redirects the first light beam toward the person's eye, wherein a second light beam (12107) from the second light-energy emitter is directed toward an outward-facing surface of the first annular light guide which redirects the second light beam toward the person's eye, wherein a third light beam (12118) from the third light-energy emitter is directed toward an outward-facing surface of the second annular light guide which redirects the third light beam toward the person's eye, wherein a fourth light beam (12117) from the fourth light-energy emitter is directed toward an outward-facing surface of the first annular light guide which redirects the fourth light beam toward the person's eye; and wherein the first, second, third, and fourth light beams display portions of virtual objects in the person's field of vision.

In this example, the annular light guides are reflective or refractive rings. In this example, the annular light guides are reflective or refractive rings which are incorporated into a lens. In this example, the annular light guides are concentric. In this example, the proximal side of the combined virtual surface of the plurality of nested annular light guides is substantially concave (having a rounded vertex which faces away from the eye). In this example, there are more than ten annular light guides. In this example, there are more than ten light-energy emitters. In this example, light-energy emitters are distributed around the entire outer perimeter of the plurality of nested annular light guides. In this example, first and second radial locations differ by at least 60 degrees (in compass or polar coordinates) or two clock hours (in clock positions). In this example, light-energy emitters are proximal relative to the combined virtual surface of the plurality of nested annular light guides. Example variations discussed in other portions of this disclosure or in priority-linked disclosures can also be applied to this example where relevant, but are not repeated here in order to reduce narrative redundancy.

Figure 123:
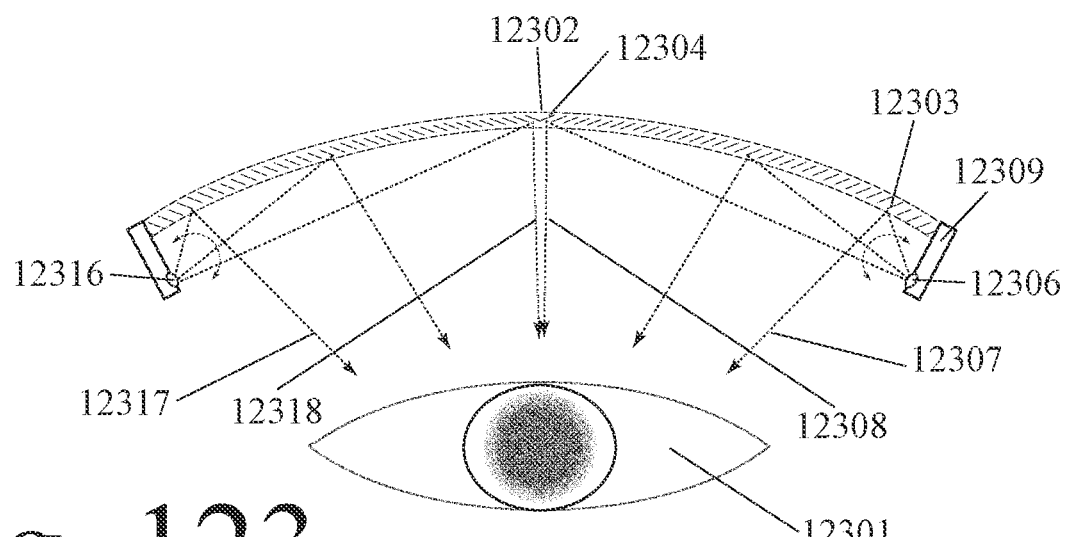
FIGS. 123 and 124 show views of a proximal annular array of scanning light emitters around a concave array of nested annular light guides.
Figure 124:
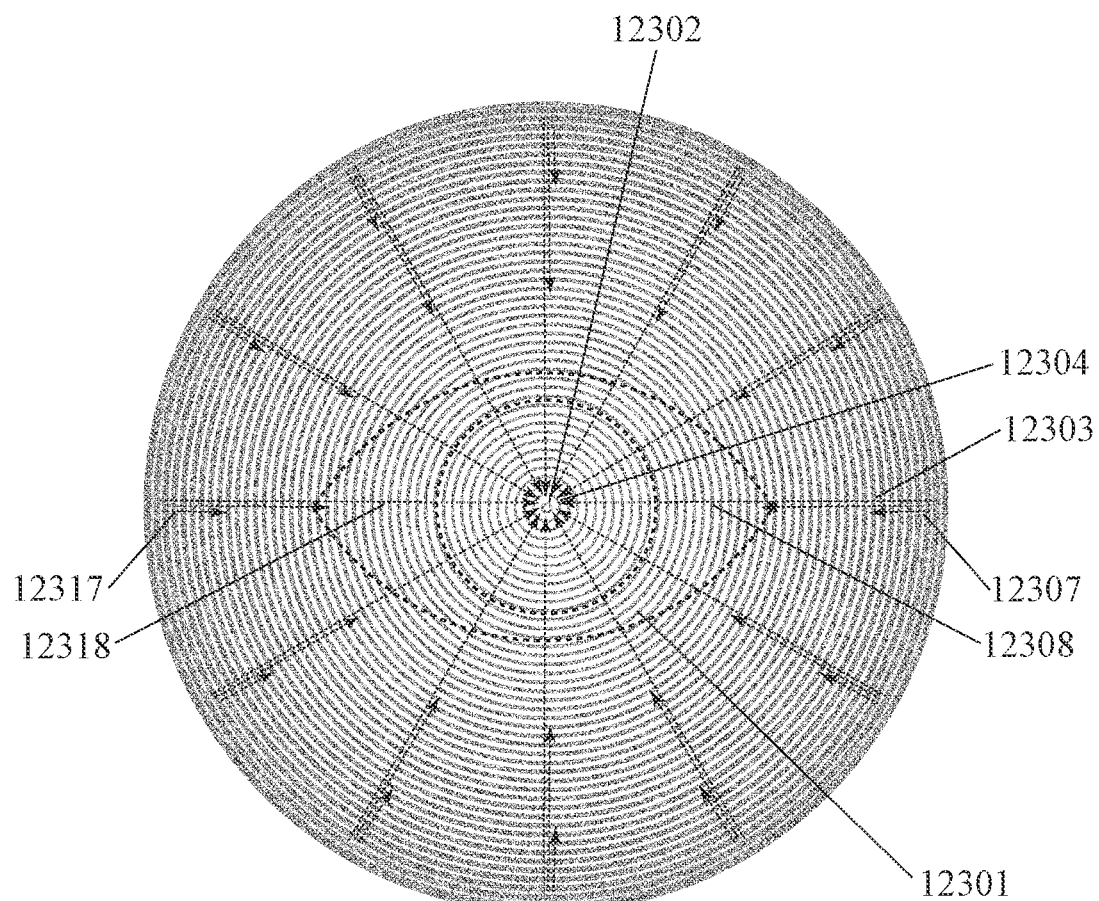

FIGS. 123 and 124 show top-down-cross-sectional and frontal views, respectively, of an example of an optical structure for one eye of augmented reality eyewear comprising: a plurality of nested annular light guides which is configured to be located in front of a person's eye, wherein the closest distance between the plurality of nested annular light guides and the person's eye is less than 4 inches; and an annular array of scanning light-energy emitters around the plurality of nested annular light guides, wherein light beams from scanning light-energy emitters in the annular array of light-energy emitters are directed toward annular light guides in the plurality of nested annular light guides, wherein the annular light guides redirect the light beams toward the person's eye, and wherein the light beams collectively display virtual objects in the person's field of vision. In an example, optics for one eye of augmented reality eyewear can comprise two such optical structures, one for each eye.

Describing FIGS. 123 and 124 in greater detail, they show top-down-cross-sectional and front views, respectively, of an optical structure for one eye (12301) of augmented reality eyewear comprising: a lens (12302) with a plurality of nested annular light guides, wherein the plurality of nested annular light guides further comprises a first annular light guide (12303) and a second annular light guide (12304), wherein the second annular light guide is smaller than the first annular light guide; and a light-energy emitter holder (12309) which holds an annular array of scanning light-energy emitters around the outer perimeter of the plurality of nested annular light guides; wherein the annular array of scanning light-energy emitters further comprises a first scanning light-energy emitter (12306) and a second scanning light-energy emitter (12316); wherein the first scanning light-energy emitter is located at a first radial location with respect to a virtual circle; wherein the second scanning light-energy emitter is located at a second radial location with respect to the virtual circle; wherein a first light beam (12307) from the first scanning light-energy emitter is directed toward the first annular light guide at a first time and the first annular light guide redirects the first light beam toward the person's eye, wherein a second light beam (12308) from the first scanning light-energy emitter is directed toward the second annular light guide at a second time and the second annular light guide redirects the second light beam toward the person's eye, wherein a third light beam (12317) from the first scanning light-energy emitter is directed toward the first annular light guide at a first time and the first annular light guide redirects the third light beam toward the person's eye, wherein a fourth light beam (12318) from the first scanning light-energy emitter is directed toward the second annular light guide at a second time and the second annular light guide redirects the fourth light beam toward the person's eye, and wherein the first, second, third, and fourth light beams display portions of virtual objects in the person's field of vision.

In this example, the annular light guides are reflective or refractive rings. In this example, the annular light guides are reflective or refractive rings which are incorporated into a lens. In this example, the annular light guides are concentric. In this example, the proximal side of the combined virtual surface of the plurality of nested annular light guides is concave (having a rounded vertex which faces away from the person's eye). In this example, there are more than ten annular light guides. In this example, there are more than ten light-energy emitters. In this example, light-energy emitters are distributed around the entire outer perimeter of the plurality of nested annular light guides. In this example, first and second radial locations differ by at least 60 degrees (in compass or polar coordinates) or two clock hours (in clock positions). In this example, light-energy emitters are proximal relative to the combined virtual surface of the plurality of nested annular light guides. Example variations discussed in other portions of this disclosure or in priority-linked disclosures can also be applied to this example where relevant, but are not repeated here in order to reduce narrative redundancy.

Figure 125:
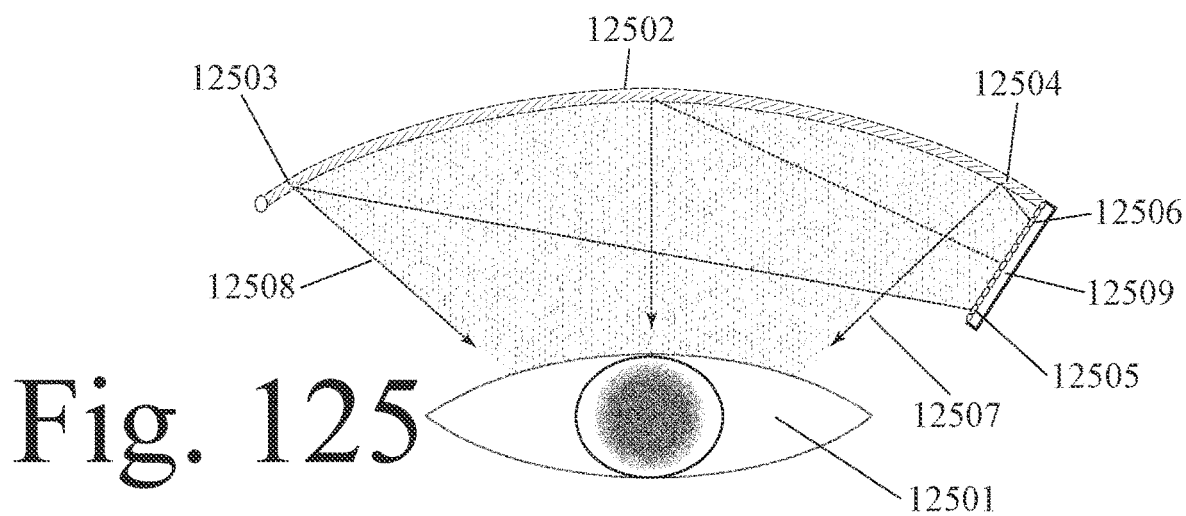
FIGS. 125 and 126 show views of an image display along a side of a concave array of parallel light guides.
Figure 126:
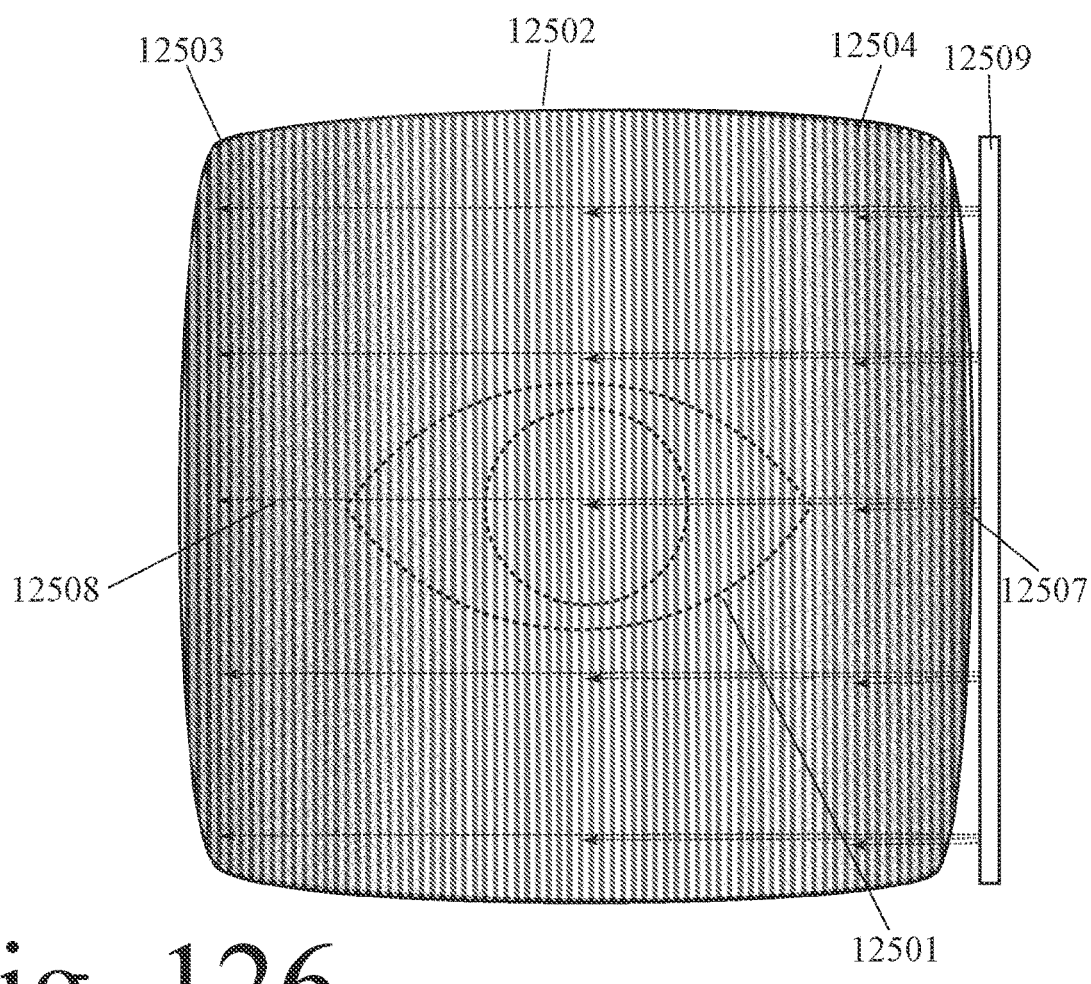

FIGS. 125 and 126 show top-down-cross-sectional and frontal views, respectively, of an example of an optical structure for one eye of augmented reality eyewear comprising: a plurality of parallel light guides which is configured to be located in front of a person's eye, wherein the closest distance between the plurality of parallel light guides and the person's eye is less than 4 inches; and an array of light-energy emitters along one lateral side of the plurality of parallel light guides, wherein light beams from light-energy emitters in the array of light-energy emitters are directed toward light guides in the plurality of parallel light guides, wherein the light guides redirect the light beams toward the person's eye, and wherein the light beams collectively display virtual objects in the person's field of vision. In an example, optics for one eye of augmented reality eyewear can comprise two such optical structures, one for each eye.

Describing FIGS. 125 and 126 in greater detail, they show top-down-cross-sectional and front views, respectively, of an optical structure for one eye (12501) of augmented reality eyewear comprising: a lens (12502) with a plurality of parallel light guides, wherein the plurality of parallel light guides further comprises a first light guide (12503) and a second light guide (12504); and a light-energy emitter holder (12509) which holds a plurality light-energy emitters along one lateral (e.g. left or right) side of the plurality of parallel light guides; wherein the plurality of light-energy emitters further comprises a first light-energy emitter (12505) and a second light-energy emitter (12506); wherein the second light-energy emitter is farther from the person's eye than the first light-energy emitter; wherein a first light beam (12508) from the first light-energy emitter is directed toward the first light guide which redirects the first light beam toward the person's eye, wherein a second light beam (12507) from the second light-energy emitter is directed toward the second light guide which redirects the second light beam toward the person's eye; and wherein the first and second light beams display portions of virtual objects in the person's field of vision.

In this example, the light guides are reflective or refractive ridges, strips, prisms, undulations, or gratings. In this example, the light guides are incorporated into a lens. In this example, the light guides are parallel. In this example, the proximal side of the combined virtual surface of the plurality of parallel light guides is substantially concave (having a rounded vertex which faces away from the eye). In this example, there are more than ten light guides. In this example, there are more than ten light-energy emitters. In this example, light-energy emitters are proximal relative to the combined virtual surface of the plurality of parallel light guides. In this example, light-energy emitters are located along a lateral (e.g. right or left) side of the plurality of parallel light guides. Example variations discussed in other portions of this disclosure or in priority-linked disclosures can also be applied to this example where relevant, but are not repeated here in order to reduce narrative redundancy.

Figure 127:
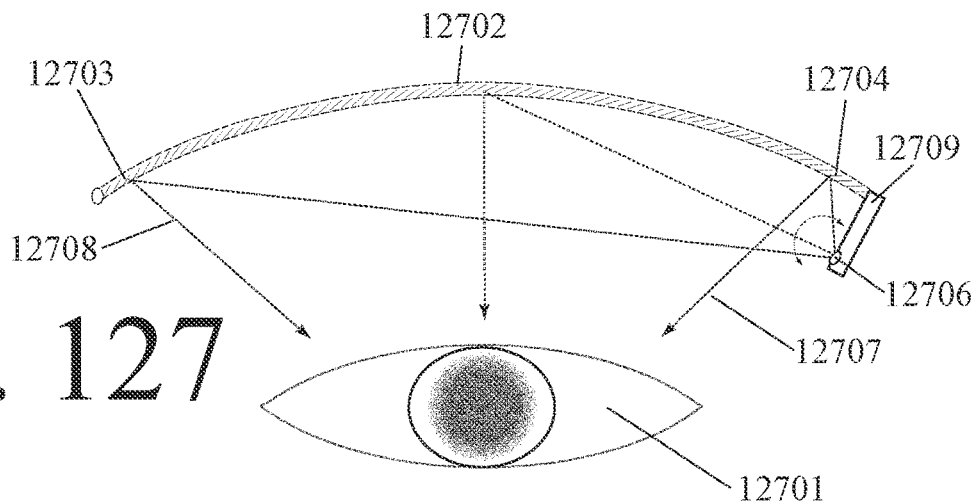
FIGS. 127 and 128 show views of an array of scanning light emitters along a side of a concave array of parallel light guides.
Figure 128:
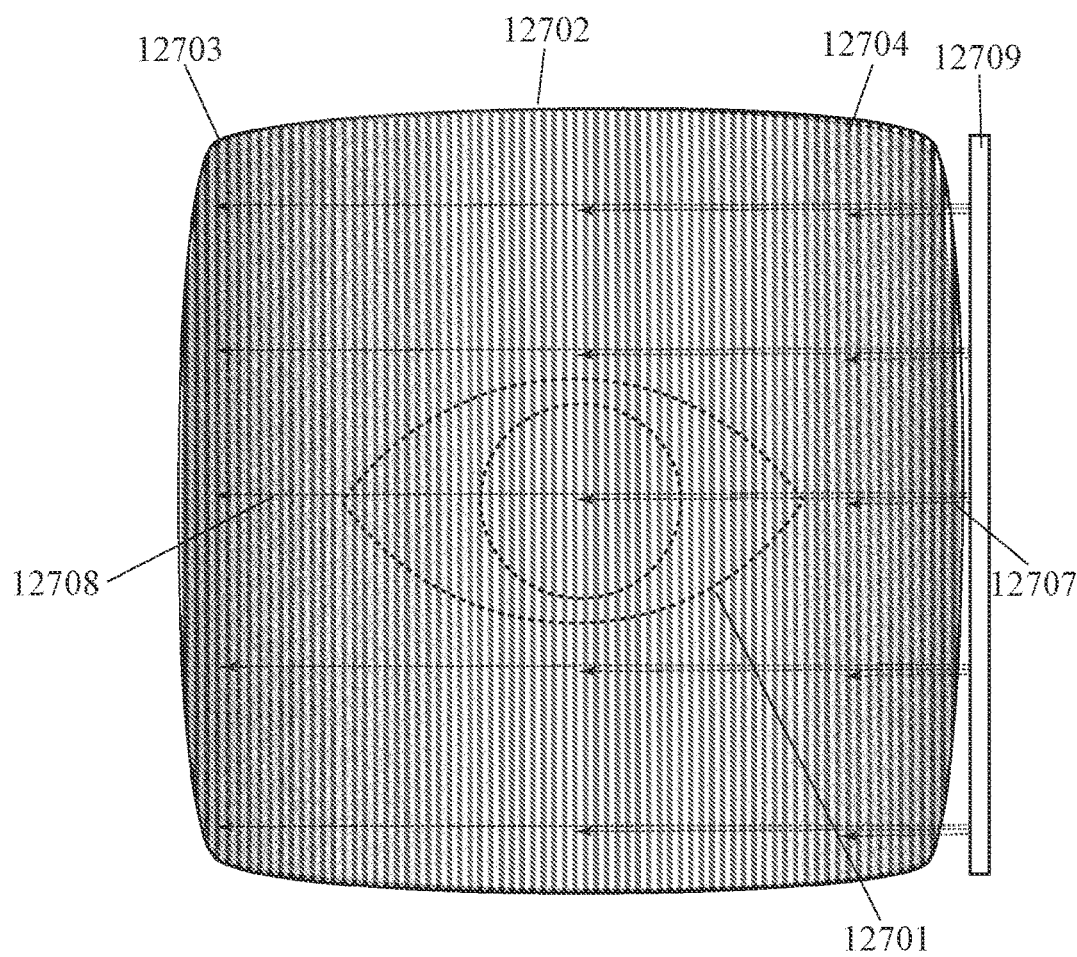

FIGS. 127 and 128 show top-down-cross-sectional and frontal views, respectively, of an example of an optical structure for one eye of augmented reality eyewear comprising: a plurality of parallel light guides which is configured to be located in front of a person's eye, wherein the closest distance between the plurality of parallel light guides and the person's eye is less than 4 inches; and an array of scanning light-energy emitters along one lateral side of the plurality of parallel light guides, wherein light beams from scanning light-energy emitters in the array of scanning light-energy emitters are directed toward light guides in the plurality of parallel light guides, wherein the light guides redirect the light beams toward the person's eye, and wherein the light beams collectively display virtual objects in the person's field of vision. In an example, optics for one eye of augmented reality eyewear can comprise two such optical structures, one for each eye.

Describing FIGS. 127 and 128 in greater detail, they show top-down-cross-sectional and front views, respectively, of an optical structure for one eye (12701) of augmented reality eyewear comprising: a lens (12702) with a plurality of parallel light guides, wherein the plurality of parallel light guides further comprises a first light guide (12703) and a second light guide (12704); and a light-energy emitter holder (12709) which holds an array of scanning light-energy emitters along one lateral (e.g. left or right) side of the plurality of parallel light guides; wherein the array of scanning light-energy emitters further comprises a scanning light-energy emitter (12706); wherein a first light beam (12708) from the scanning light-energy emitter is directed toward the first light guide which redirects the first light beam toward the person's eye, wherein a second light beam (12707) from the scanning light-energy emitter is directed toward the second light guide which redirects the second light beam toward the person's eye; and wherein the first and second light beams display portions of virtual objects in the person's field of vision.

In this example, the light guides are reflective or refractive ridges, strips, prisms, undulations, or gratings. In this example, the light guides are incorporated into a lens. In this example, the light guides are parallel. In this example, the proximal side of the combined virtual surface of the plurality of parallel light guides is substantially concave (having a rounded vertex which faces away from the eye). In this example, there are more than ten light guides. In this example, there are more than ten light-energy emitters. In this example, light-energy emitters are proximal relative to the combined virtual surface of the plurality of parallel light guides. In this example, light-energy emitters are located along a lateral (e.g. right or left) side of the plurality of parallel light guides. Example variations discussed in other portions of this disclosure or in priority-linked disclosures can also be applied to this example where relevant, but are not repeated here in order to reduce narrative redundancy.

Figure 129:
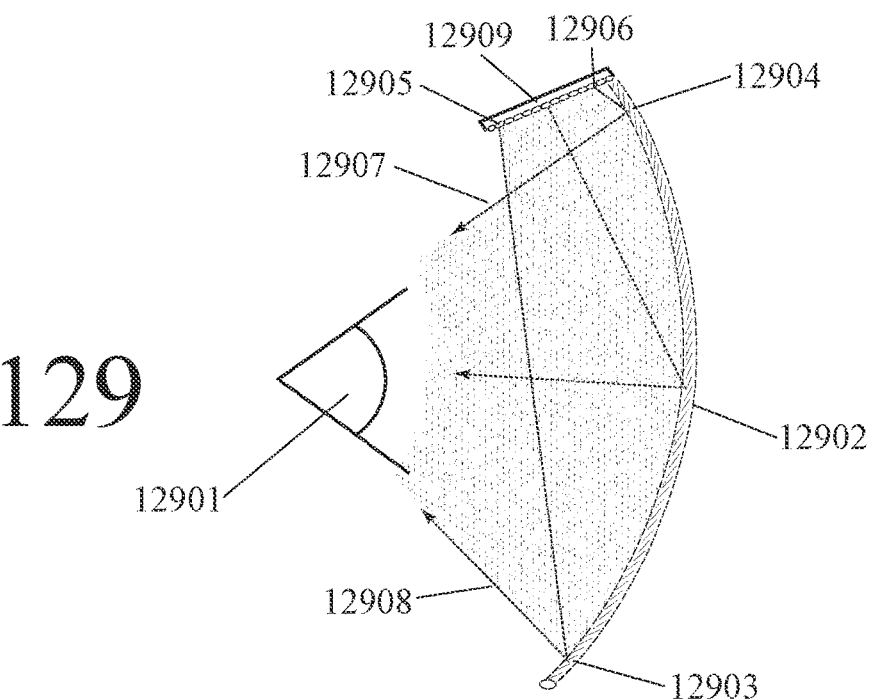
FIGS. 129 and 130 show views of an image display above a concave array of parallel light guides.
Figure 130:
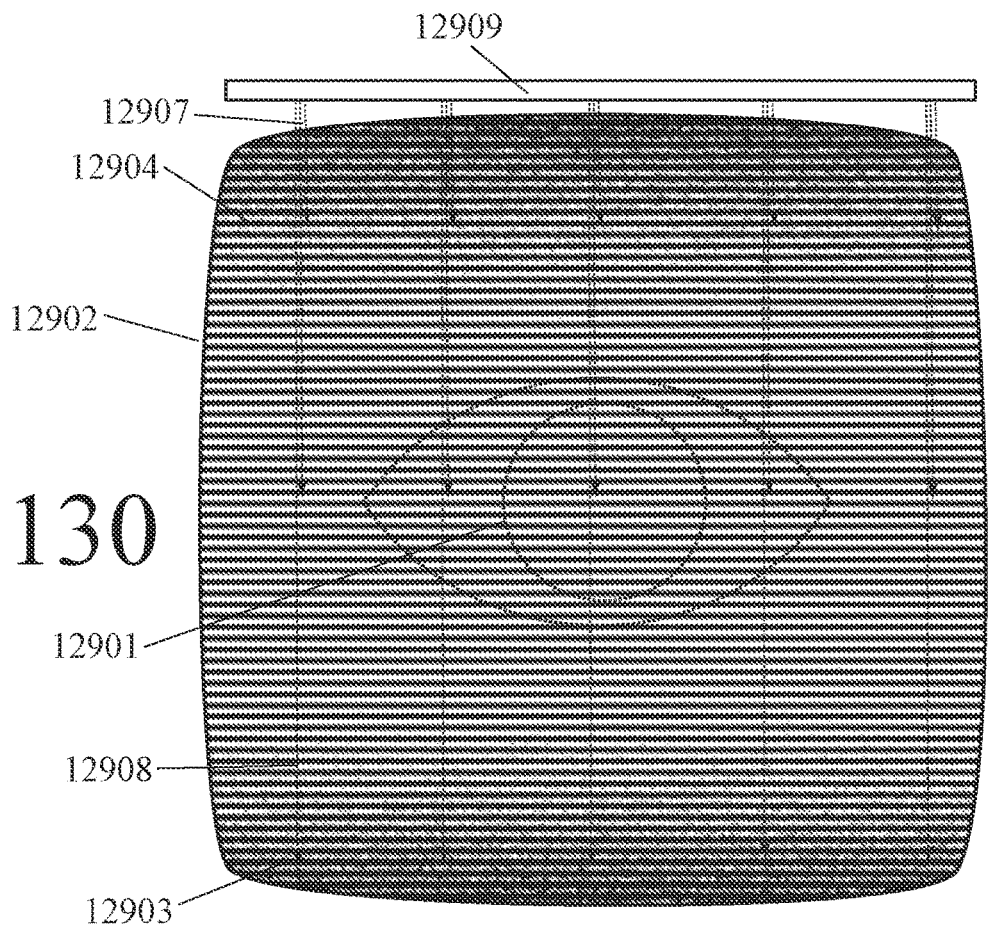

FIGS. 129 and 130 show top-down-cross-sectional and frontal views, respectively, of an example of an optical structure for one eye of augmented reality eyewear comprising: a plurality of parallel light guides which is configured to be located in front of a person's eye, wherein the closest distance between the plurality of parallel light guides and the person's eye is less than 4 inches; and an array of light-energy emitters along the top of the plurality of parallel light guides, wherein light beams from light-energy emitters in the array of light-energy emitters are directed toward light guides in the plurality of parallel light guides, wherein the light guides redirect the light beams toward the person's eye, and wherein the light beams collectively display virtual objects in the person's field of vision. In an example, optics for one eye of augmented reality eyewear can comprise two such optical structures, one for each eye.

Describing FIGS. 129 and 130 in greater detail, they show top-down-cross-sectional and front views, respectively, of an optical structure for one eye (12901) of augmented reality eyewear comprising: a lens (12902) with a plurality of parallel light guides, wherein the plurality of parallel light guides further comprises a first light guide (12903) and a second light guide (12904); and a light-energy emitter holder (12909) which holds a plurality light-energy emitters along the top of the plurality of parallel light guides; wherein the plurality of light-energy emitters further comprises a first light-energy emitter (12905) and a second light-energy emitter (12906); wherein the second light-energy emitter is farther from the person's eye than the first light-energy emitter; wherein a first light beam (12908) from the first light-energy emitter is directed toward the first light guide which redirects the first light beam toward the person's eye, wherein a second light beam (12907) from the second light-energy emitter is directed toward the second light guide which redirects the second light beam toward the person's eye; and wherein the first and second light beams display portions of virtual objects in the person's field of vision.

In this example, the light guides are reflective or refractive ridges, strips, prisms, undulations, or gratings. In this example, the light guides are incorporated into a lens. In this example, the light guides are parallel. In this example, the proximal side of the combined virtual surface of the plurality of parallel light guides is substantially concave (having a rounded vertex which faces away from the eye). In this example, there are more than ten light guides. In this example, there are more than ten light-energy emitters. In this example, light-energy emitters are proximal relative to the combined virtual surface of the plurality of parallel light guides. In this example, light-energy emitters are located along the top of (e.g. above) the plurality of parallel light guides. Example variations discussed in other portions of this disclosure or in priority-linked disclosures can also be applied to this example where relevant, but are not repeated here in order to reduce narrative redundancy.

Figure 131:
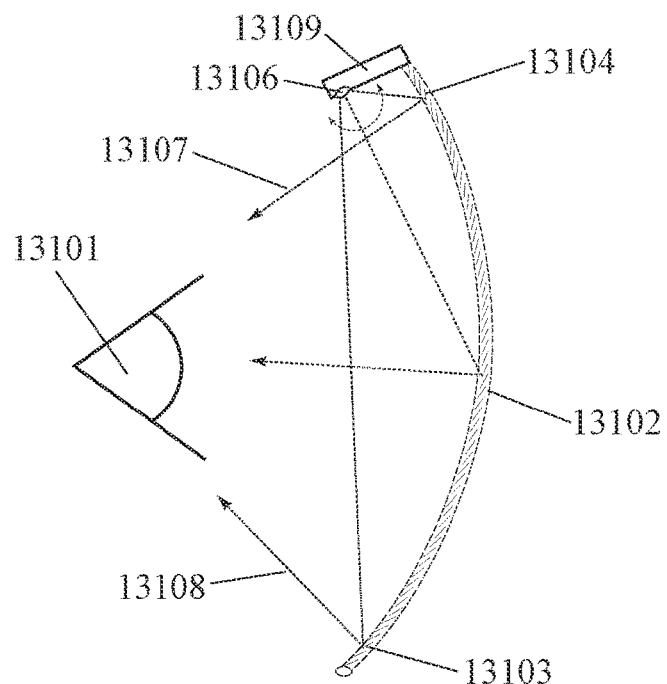
FIGS. 131 and 132 show views of an array of scanning light emitters above a concave array of parallel light guides.
Figure 132:
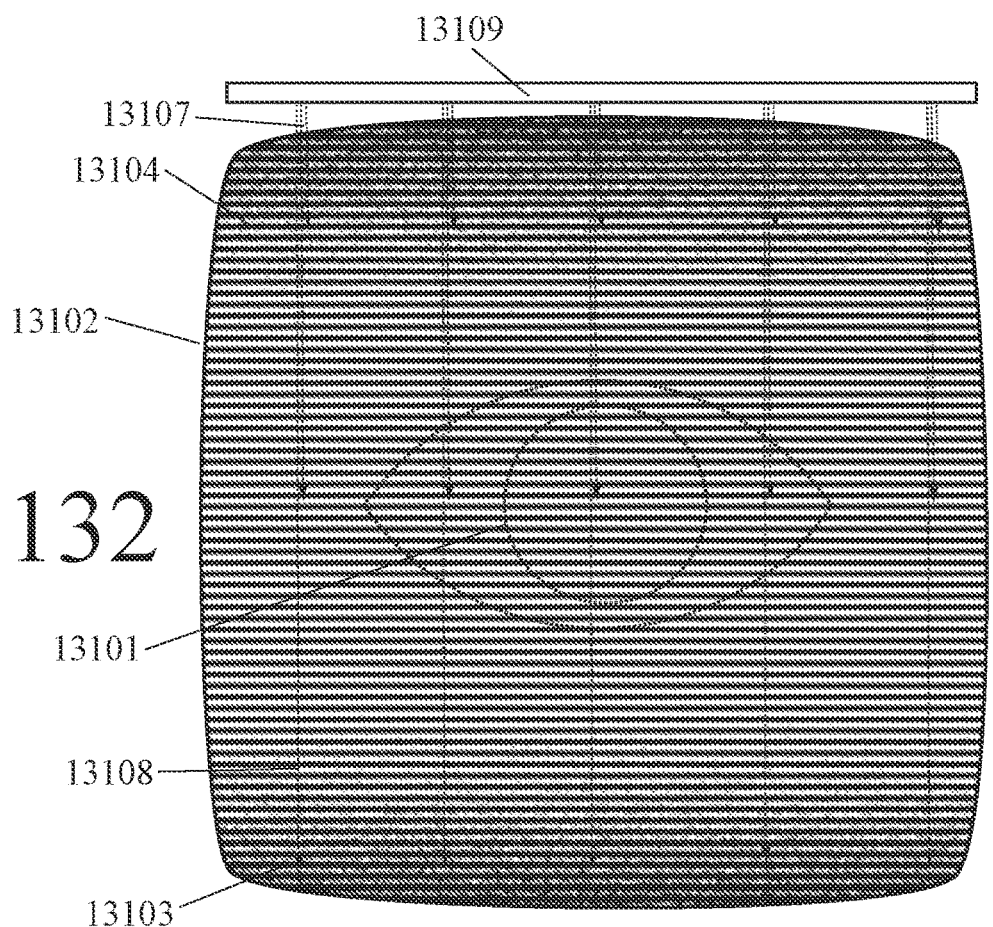

FIGS. 131 and 132 show top-down-cross-sectional and frontal views, respectively, of an example of an optical structure for one eye of augmented reality eyewear comprising: a plurality of parallel light guides which is configured to be located in front of a person's eye, wherein the closest distance between the plurality of parallel light guides and the person's eye is less than 4 inches; and an array of scanning light-energy emitters along the top of the plurality of parallel light guides, wherein light beams from scanning light-energy emitters in the array of scanning light-energy emitters are directed toward light guides in the plurality of parallel light guides, wherein the light guides redirect the light beams toward the person's eye, and wherein the light beams collectively display virtual objects in the person's field of vision. In an example, optics for one eye of augmented reality eyewear can comprise two such optical structures, one for each eye.

Describing FIGS. 131 and 132 in greater detail, they show top-down-cross-sectional and front views, respectively, of an optical structure for one eye (13101) of augmented reality eyewear comprising: a lens (13102) with a plurality of parallel light guides, wherein the plurality of parallel light guides further comprises a first light guide (13103) and a second light guide (13104); and a light-energy emitter holder (13109) which holds an array of scanning light-energy emitters along the top of the plurality of parallel light guides; wherein the array of scanning light-energy emitters further comprises a scanning light-energy emitter (13106); wherein a first light beam (13108) from the scanning light-energy emitter is directed toward the first light guide which redirects the first light beam toward the person's eye, wherein a second light beam (13107) from the scanning light-energy emitter is directed toward the second light guide which redirects the second light beam toward the person's eye; and wherein the first and second light beams display portions of virtual objects in the person's field of vision.

In this example, the light guides are reflective or refractive ridges, strips, prisms, undulations, or gratings. In this example, the light guides are incorporated into a lens. In this example, the light guides are parallel. In this example, the proximal side of the combined virtual surface of the plurality of parallel light guides is substantially concave (having a rounded vertex which faces away from the eye). In this example, there are more than ten light guides. In this example, there are more than ten light-energy emitters. In this example, light-energy emitters are proximal relative to the combined virtual surface of the plurality of parallel light guides. In this example, light-energy emitters are located along the top of the plurality of parallel light guides. Example variations discussed in other portions of this disclosure or in priority-linked disclosures can also be applied to this example where relevant, but are not repeated here in order to reduce narrative redundancy.

In an example, a method for augmented reality eyewear can comprise: configuring a partially-transparent structure (e.g. lens) to be located in front of a person's eye within 4"

of the person's eye; identifying a first location on the partially-transparent structure (e.g. lens) which is intersected by the person's gaze and/or line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is intersected by the person's gaze and/or line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is in line with the person's central line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the lens which is in line with the person's central line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a spoke-and-arc array of optical structures for augmented reality eyewear can comprise: a plurality of radial spokes, wherein a radial spoke further comprises a plurality of adjustable reflective optical elements, and wherein radial spokes extend outward from a central location which is configured to be within 4" in front of a person's eye; a plurality of nested arcs, wherein an arc further comprises a plurality of adjustable reflective optical elements, and wherein arcs are concave with respect to the central location; a first adjustable reflective optical element which is part of a first spoke and a first arc, wherein the first adjustable reflective optical element has a first configuration wherein it is substantially parallel to light rays travelling from the environment toward the person's eye, wherein the first adjustable reflective optical element has a second configuration wherein it intersects light rays traveling from the environment toward the person's eye at a 45-degree angle, and wherein the first adjustable reflective optical element is selectively changed from its first configuration to its second configuration, or vice versa, by rotation and/or tilting of the first adjustable reflective optical element; and a second adjustable reflective optical element which is part of a second spoke and a second arc, wherein the second adjustable reflective optical element has a first configuration wherein it is substantially parallel to light rays travelling from the environment toward the person's eye, wherein the second adjustable reflective optical element has a second configuration wherein it intersects light rays traveling from the environment toward the person's eye at a 45-degree angle, and wherein the second adjustable reflective optical element is selectively changed from its first configuration to its second configuration, or vice versa, by rotation and/or tilting of the second adjustable reflective optical element.

In an example, a spoke-and-ring array of optical structures for augmented reality eyewear can comprise: a plurality of radial spokes, wherein a radial spoke further comprises a plurality of adjustable micromirrors, and wherein radial spokes extend outward from a central location which is configured to be within 4" in front of a person's eye; a plurality of concentric rings, wherein a ring further comprises a plurality of adjustable micromirrors, and wherein rings go around the central location; a first adjustable micromirror which is part of a first spoke and a first ring, wherein the first adjustable micromirror has a first configuration wherein it is substantially parallel to light rays travelling from the environment toward the person's eye, wherein the first adjustable micromirror has a second configuration wherein it intersects light rays traveling from the environment toward the person's eye at a 45-degree angle, and wherein the first adjustable micromirror is selectively changed from its first configuration to its second configuration, or vice versa, by the transmission of electromagnetic energy; and a second adjustable micromirror which is part of a second spoke and a second ring, wherein the second adjustable micromirror has a first configuration wherein it is substantially parallel to light rays travelling from the environment toward the person's eye, wherein the second adjustable micromirror has a second configuration wherein it intersects light rays traveling from the environment toward the person's eye at a 45-degree angle, and wherein the second adjustable micromirror is selectively changed from its first configuration to its second configuration, or vice versa, by the transmission of electromagnetic energy.

In an example, augmented reality eyewear can comprise: a plurality of radial spokes, wherein spokes in the plurality of radial spokes extend outward from a central location in front of a person's eye, and wherein spokes in the plurality of radial spokes each further comprise a plurality of reflective optical elements (e.g. mirrors); a plurality of nested rings, wherein rings in the plurality of nested rings encircle the central location, and wherein rings in the plurality of nested rings each further comprise a plurality of reflective optical elements (e.g. mirrors); a first reflective optical element (e.g. mirror) which is part of a first spoke and is part of a first ring, wherein the first reflective optical element (e.g. mirror) has a first configuration which allows environmental light rays to travel through the intersection of the first spoke and first ring, wherein the first reflective optical element (e.g. mirror) has a second configuration which blocks environmental light rays from traveling through the intersection of the first spoke and first ring, and wherein the first reflective optical element (e.g. mirror) is selectively changed from its first configuration to its second configuration (or vice versa) by the selective transmission of electromagnetic energy through the first spoke and the first ring; and a second reflective optical element (e.g. mirror) which is part of a second spoke and is part of a second ring, wherein the second reflective optical element (e.g. mirror)

has a third configuration which allows environmental light rays to travel through the intersection of the second spoke and second ring, wherein the second reflective optical element (e.g. mirror) has a fourth configuration which blocks environmental light rays from traveling through the intersection of the second spoke and second ring, and wherein the second reflective optical element (e.g. mirror) is selectively changed from its third configuration to its fourth configuration (or vice versa) by the selective transmission of electromagnetic energy through the second spoke and the second ring.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is central to the person's central line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is central to the person's central line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is intersected by the person's central line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the lens which is intersected by the person's central line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a spoke-and-ring array of optical structures for augmented reality eyewear can comprise: a plurality of radial spokes, wherein a radial spoke further comprises a plurality of adjustable reflective optical elements, and wherein radial spokes extend outward from a central location which is configured to be within 4" in front of a person's eye; a plurality of nested rings, wherein a ring further comprises a plurality of adjustable reflective optical elements, and wherein rings go around the central location; a first adjustable reflective optical element which is part of a first spoke and a first ring, wherein the first adjustable reflective optical element has a first configuration wherein it is substantially parallel to light rays travelling from the environment toward the person's eye, wherein the first adjustable reflective optical element has a second configuration wherein it intersects light rays traveling from the environment toward the person's eye at a 45-degree angle, and wherein the first adjustable reflective optical element is selectively changed from its first configuration to its second configuration, or vice versa, by rotation and/or tilting of the first adjustable reflective optical element; and a second adjustable reflective optical element which is part of a second spoke and a second ring, wherein the second adjustable reflective optical element has a first configuration wherein it is substantially parallel to light rays travelling from the environment toward the person's eye, wherein the second adjustable reflective optical element has a second configuration wherein it intersects light rays traveling from the environment toward the person's eye at a 45-degree angle, and wherein the second adjustable reflective optical element is selectively changed from its first configuration to its second configuration, or vice versa, by rotation and/or tilting of the second adjustable reflective optical element.

In an example, augmented reality eyewear can comprise: a lens which is configured to be in front of a person's eye within 4" of the person's eye; a light-energy emitter; a near-focus mirror; and a far-focus mirror, wherein the distance between the near-focus mirror and the far-focus mirror is at least ½" and wherein the far-focus light-energy reflector is closer to the person's ear than the near-focus light-energy reflector; wherein the near-focus mirror has a first configuration wherein: the near-focus mirror receives light beams from the light-energy emitter, the near-focus mirror reflects the light beams toward the lens, the lens redirects the light beams toward the person's eye, and the light beams display a virtual object at an apparent first distance in the person's field of vision; and wherein the near-focus mirror has a second configuration wherein: the near-focus mirror receives light beams from the light-energy emitter, the near-focus mirror reflects the light beams toward the far-focus mirror, the far-focus mirror reflects the light beams toward the lens, the lens redirects the light beams toward the person's eye, and the light beams display a virtual object at an apparent second distance in the person's field of vision wherein the second distance is greater than the first distance.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is in line with the person's gaze and/or line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is in line with the person's gaze and/or line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is central to the person's central line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the lens which is central to the person's central line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a spoke-and-ring array of optical structures for augmented reality eyewear can comprise: a plurality of radial spokes, wherein a radial spoke further comprises a plurality of adjustable reflective optical elements, and wherein radial spokes extend outward from a central location which is configured to be within 4" in front of a person's eye; a plurality of nested rings, wherein a ring further comprises a plurality of adjustable reflective optical elements, and wherein rings go around the central location; a first adjustable reflective optical element which is part of a first spoke and a first ring, wherein the first adjustable reflective optical element has a first configuration wherein it is substantially parallel to light rays travelling from the environment toward the person's eye, wherein the first adjustable reflective optical element has a second configuration wherein it intersects light rays traveling from the environment toward the person's eye at a 45-degree angle, and wherein the first adjustable reflective optical element is selectively changed from its first configuration to its second configuration, or vice versa, by the transmission of electromagnetic energy; and a second adjustable reflective optical element which is part of a second spoke and a second ring, wherein the second adjustable reflective optical element has a first configuration wherein it is substantially parallel to light rays travelling from the environment toward the person's eye, wherein the second adjustable reflective optical element has a second configuration wherein it intersects light rays traveling from the environment toward the person's eye at a 45-degree angle, and wherein the second adjustable reflective optical element is selectively changed from its first configuration to its second configuration, or vice versa, by the transmission of electromagnetic energy.

In an example, augmented reality eyewear can comprise: a lens which is configured to be in front of a person's eye within 4" of the person's eye; an eye gaze tracker; a light-energy emitter; a near-focus mirror; and a far-focus mirror; wherein the near-focus light-energy reflector is located to one side (e.g. left or right) of the person's eye and the far-focus light-energy reflector is located on the other side (e.g. right or left) of the person's eye; wherein the near-focus mirror has a first configuration wherein: the near-focus mirror receives light beams from the light-energy emitter, the near-focus mirror reflects the light beams toward the lens, the lens redirects the light beams toward the person's eye, and the light beams display a virtual object at an apparent first distance in the person's field of vision; and wherein the near-focus mirror has a second configuration wherein: the near-focus mirror receives light beams from the light-energy emitter, the near-focus mirror reflects the light beams toward the far-focus mirror, the far-focus mirror reflects the light beams toward the lens, the lens redirects the light beams toward the person's eye, and the light beams display a virtual object at an apparent second distance in the person's field of vision wherein the second distance is greater than the first distance; and wherein the near-focus mirror is changed from its first configuration to its second configuration when the person focuses on more distant objects in the real world.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is in line with the person's central line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is in line with the person's central line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is central to the person's gaze and/or line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the lens which is central to the person's gaze and/or line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a spoke-and-ring array of optical structures for augmented reality eyewear can comprise: a plurality of radial spokes, wherein a radial spoke further comprises a plurality of adjustable microlenses, and wherein radial spokes extend outward from a central location which is configured to be within 4" in front of a person's eye; a plurality of nested rings, wherein a ring further comprises a plurality of adjustable microlenses, and wherein rings go around the central location; a first adjustable microlens which is part of a first spoke and a first ring, wherein the first adjustable microlens has a first configuration wherein it refracts a first level of light rays at the intersection of the spoke and ring travelling from the environment toward the person's eye, wherein the first adjustable microlens has a second configuration wherein it refracts a second level of light rays at the intersection of the spoke and ring travelling from the environment toward the person's eye, wherein the second level is less than 50% of the first level, and wherein the first adjustable microlens is selectively changed from its first configuration to its second configuration, or vice versa, by the selective transmission of electromagnetic energy through the first spoke and the first ring; and a second adjustable microlens which is part of a second spoke and a second ring, wherein the second adjustable microlens a first configuration wherein it refracts a first level of light rays at the intersection of the spoke and ring travelling from the environment toward the person's eye, wherein the second adjustable microlens has a second configuration wherein it refracts a second level of light rays at the intersection of the spoke and ring travelling from the environment toward the person's eye, wherein the second level is less than 50% of the first level, and wherein the second adjustable microlens is selectively changed from its first configuration to its second configuration, or vice versa, by the selective transmission of electromagnetic energy through the second spoke and the second ring.

In an example, a spoke-and-ring array of optical structures for augmented reality eyewear can comprise: a plurality of radial spokes, wherein a radial spoke further comprises a plurality of adjustable micromirrors, and wherein radial spokes extend outward from a central location which is configured to be within 4" in front of a person's eye; a plurality of concentric rings, wherein a ring further comprises a plurality of adjustable micromirrors, and wherein rings go around the central location; a first adjustable micromirror which is part of a first spoke and a first ring, wherein the first adjustable micromirror has a first configuration wherein it is substantially parallel to light rays travelling from the environment toward the person's eye, wherein the first adjustable micromirror has a second configuration wherein it intersects light rays traveling from the environment toward the person's eye at a 45-degree angle, and wherein the first adjustable micromirror is selectively changed from its first configuration to its second configuration, or vice versa, by rotation and/or tilting of the first adjustable micromirror; and a second adjustable micromirror which is part of a second spoke and a second ring, wherein the second adjustable micromirror has a first configuration wherein it is substantially parallel to light rays travelling from the environment toward the person's eye, wherein the second adjustable micromirror has a second configuration wherein it intersects light rays traveling from the environment toward the person's eye at a 45-degree angle, and wherein the second adjustable micromirror is selectively changed from its first configuration to its second configuration, or vice versa, by rotation and/or tilting of the second adjustable micromirror.

In an example, augmented reality eyewear can comprise: a plurality of radial spokes, wherein spokes in the plurality of radial spokes extend outward from a central location in front of a person's eye, and wherein spokes in the plurality of radial spokes each further comprise a plurality of refractive optical elements (e.g. microlenses); a plurality of nested rings, wherein rings in the plurality of nested rings encircle the central location, and wherein rings in the plurality of nested rings each further comprise a plurality of refractive optical elements (e.g. microlenses); a first refractive optical element (e.g. microlens) which is part of a first spoke and is part of a first ring, wherein the first refractive optical element (e.g. microlens) has a first configuration wherein it redirects a first amount of environmental light rays near the intersection of the first spoke and first ring away from reaching the person's eye, wherein the first refractive optical element (e.g. microlens) has a second configuration wherein it redirects a second amount of environmental light rays near the intersection of the first spoke and first ring away from reaching the person's eye, wherein the second amount is at least 50% less than the first amount, and wherein the first refractive optical element (e.g. microlens) is selectively changed from its first configuration to its second configuration (or vice versa) by the selective transmission of electromagnetic energy through the first spoke and the first ring; and a second refractive optical element (e.g. microlens) which is part of a second spoke and is part of a second ring, wherein the second refractive optical element (e.g. microlens) has a third configuration wherein it redirects a third amount of environmental light rays near the intersection of the second spoke and second ring away from reaching the person's eye, wherein the second refractive optical element (e.g. microlens) has a fourth configuration wherein it redirects a fourth amount of environmental light rays near the intersection of the second spoke and second ring away from reaching the person's eye, wherein the fourth amount is at least 50% less than the third amount, and wherein the second refractive optical element (e.g. microlens) is selectively changed from its third configuration to its fourth configuration (or vice versa) by the selective transmission of electromagnetic energy through the second spoke and the second ring.

In an example, a method for augmented reality eyewear can comprise: configuring a lens to be located in front of a person's eye within 4" of the person's eye; identifying a first location on the lens which is intersected by the person's gaze from that eye during a first period of time; scanning a first plurality of light beams onto the lens in a radial spoke pattern centered on the first location during the first period of time, wherein the first plurality of light beams are redirected by the lens toward the person's eye to display a virtual object in the person's field of vision; identifying a second location on the lens which is intersected by the person's gaze from that eye during a second period of time; and scanning a second plurality of light beams onto the lens in a radial spoke pattern centered on the second location during the second period of time, wherein the second plurality of light beams are redirected by the lens toward the person's eye to display a virtual object in the person's field of vision.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is intersected by the person's gaze and/or line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is intersected by the person's gaze and/or line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is in line with the person's central line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the lens which is in line with the person's central line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a spoke-and-ring array of optical structures for augmented reality eyewear can comprise: a plurality of radial spokes, wherein a radial spoke further comprises a plurality of adjustable microlenses, and wherein radial spokes extend outward from a central location which is configured to be within 4" in front of a person's eye; a plurality of concentric rings, wherein a ring further comprises a plurality of adjustable microlenses, and wherein rings go around the central location; a first adjustable microlens which is part of a first spoke and a first ring, wherein the first adjustable microlens has a first configuration wherein it refracts a first level of light rays at the intersection of the spoke and ring travelling from the environment toward the person's eye, wherein the first adjustable microlens has a second configuration wherein it refracts a second level of light rays at the intersection of the spoke and ring travelling from the environment toward the person's eye, wherein the second level is less than 50% of the first level, and wherein the first adjustable microlens is selectively changed from its first configuration to its second configuration, or vice versa, by the transmission of electromagnetic energy; and a second adjustable microlens which is part of a second spoke and a second ring, wherein the second adjustable microlens a first configuration wherein it refracts a first level of light rays at the intersection of the spoke and ring travelling from the environment toward the person's eye, wherein the second adjustable microlens has a second configuration wherein it refracts a second level of light rays at the intersection of the spoke and ring travelling from the environment toward the person's eye, wherein the second level is less than 50% of the first level, and wherein the second adjustable microlens is selectively changed from its first configuration to its second configuration, or vice versa, by the transmission of electromagnetic energy.

In an example, augmented reality eyewear can comprise: a partially-transparent structure (e.g. lens) which is configured to be in front of a person's eye within 4" of the person's eye; an eye gaze tracker; a light-energy emitter; a near-focus light-energy reflector; and a far-focus light-energy reflector; wherein the near-focus light-energy reflector is located to one side (e.g. left or right) of the person's eye and the far-focus light-energy reflector is located on the other side (e.g. right or left) of the person's eye; wherein the near-focus light-energy reflector has a first configuration wherein: the near-focus light-energy reflector receives light beams from the light-energy emitter, the near-focus light-energy reflector reflects the light beams toward the partially-transparent structure (e.g. lens), the partially-transparent structure (e.g. lens) redirects the light beams toward the person's eye, and the light beams display a virtual object at an apparent first distance in the person's field of vision; and wherein the near-focus light-energy reflector has a second configuration wherein: the near-focus light-energy reflector receives light beams from the light-energy emitter, the near-focus light-energy reflector reflects the light beams toward the far-focus light-energy reflector, the far-focus light-energy reflector reflects the light beams toward the partially-transparent structure (e.g. lens), the partially-transparent structure (e.g. lens) redirects the light beams toward the person's eye, and the light beams display a virtual object at an apparent second distance in the person's field of vision wherein the second distance is greater than the first distance; and wherein the near-focus light-energy reflector is changed from its first configuration to its second configuration when the person focuses on more distant objects in the real world.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is intersected by the person's central line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is intersected by the person's central line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is in line with the person's gaze and/or line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the lens which is in line with the person's gaze and/or line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a spoke-and-ring array of optical structures for augmented reality eyewear can comprise: a plurality of radial spokes, wherein a radial spoke further comprises a plurality of adjustable refractive optical elements, and wherein radial spokes extend outward from a central location which is configured to be within 4" in front of a person's eye; a plurality of nested rings, wherein a ring further comprises a plurality of adjustable refractive optical elements, and wherein rings go around the central location; a first adjustable refractive optical element which is part of a first spoke and a first ring, wherein the first adjustable refractive optical element has a first configuration wherein it refracts a first level of light rays at the intersection of the spoke and ring travelling from the environment toward the person's eye, wherein the first adjustable refractive optical element has a second configuration wherein it refracts a second level of light rays at the intersection of the spoke and ring travelling from the environment toward the person's eye, wherein the second level is less than 50% of the first level, and wherein the first adjustable refractive optical element is selectively changed from its first configuration to its second configuration, or vice versa, by the transmission of electromagnetic energy; and a second adjustable refractive optical element which is part of a second spoke and a second ring, wherein the second adjustable refractive optical element has a first configuration wherein it refracts a first level of light rays at the intersection of the spoke and ring travelling from the environment toward the person's eye, wherein the second adjustable refractive optical element has a second configuration wherein it refracts a second level of light rays at the intersection of the spoke and ring travelling from the environment toward the person's eye, wherein the second level is less than 50% of the first level, and wherein the second adjustable refractive optical element is selectively changed from its first configuration to its second configuration, or vice versa, by the transmission of electromagnetic energy.

In an example, augmented reality eyewear can comprise: a lens which is configured to be in front of a person's eye; an eye gaze tracker; a light-energy emitter; a near-focus mirror; and a far-focus mirror, wherein the distance between the near-focus mirror and the far-focus mirror is at least ½"; wherein the near-focus mirror has a first configuration in which the near-focus mirror receives light beams from the light-energy emitter, the near-focus mirror reflects the light beams toward the lens, the lens redirects the light beams toward the person's eye, and the light beams display a virtual object at an apparent first distance in the person's field of vision; and wherein the near-focus mirror has a second configuration in which the near-focus mirror receives light beams from the light-energy emitter, the near-focus mirror reflects the light beams toward the far-focus mirror, the far-focus mirror reflects the light beams toward the lens, the lens redirects the light beams toward the person's eye, and the light beams display a virtual object at an apparent second distance in the person's field of vision wherein the second distance is greater than the first distance; and wherein the near-focus mirror is changed from its first configuration to its second configuration when the person focuses on more distant objects in the real world.

In an example, augmented reality eyewear can comprise: a plurality of radial spokes, wherein spokes in the plurality of radial spokes extend outward from a central location in front of a person's eye, and wherein spokes in the plurality of radial spokes each further comprise a plurality of refractive optical elements (e.g. microlenses); a plurality of nested arcs, wherein arcs in the plurality of nested arcs are concave with respect to the central location, and wherein arcs in the plurality of nested arcs each further comprise a plurality of refractive optical elements (e.g. microlenses); a first refractive optical element (e.g. microlens) which is part of a first spoke and is part of a first arc, wherein the first refractive optical element (e.g. microlens) has a first configuration wherein it redirects a first amount of environmental light rays near the intersection of the first spoke and first arc away from reaching the person's eye, wherein the first refractive optical element (e.g. microlens) has a second configuration wherein it redirects a second amount of environmental light rays near the intersection of the first spoke and first arc away from reaching the person's eye, wherein the second amount is at least 50% less than the first amount, and wherein the first refractive optical element (e.g. microlens) is selectively changed from its first configuration to its second configuration (or vice versa) by the selective transmission of electromagnetic energy through the first spoke and the first arc; and a second refractive optical element (e.g. microlens) which is part of a second spoke and is part of a second arc, wherein the second refractive optical element (e.g. microlens) has a third configuration wherein it redirects a third amount of environmental light rays near the intersection of the second spoke and second arc away from reaching the person's eye, wherein the second refractive optical element (e.g. microlens) has a fourth configuration wherein it redirects a fourth amount of environmental light rays near the intersection of the second spoke and second arc away from reaching the person's eye, wherein the fourth amount is at least 50% less than the third amount, and wherein the second refractive optical element (e.g. microlens) is selectively changed from its third configuration to its fourth configuration (or vice versa) by the selective transmission of electromagnetic energy through the second spoke and the second arc.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is in line with the person's gaze and/or line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is in line with the person's gaze and/or line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is intersected by the person's gaze and/or line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the lens which is intersected by the person's gaze and/or line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a spoke-and-ring array of optical structures for augmented reality eyewear can comprise: a plurality of radial spokes, wherein a radial spoke further comprises a plurality of adjustable microlenses, and wherein radial spokes extend outward from a central location which is configured to be within 4" in front of a person's eye; a plurality of nested rings, wherein a ring further comprises a plurality of adjustable microlenses, and wherein rings go around the central location; a first adjustable microlens which is part of a first spoke and a first ring, wherein the first adjustable microlens has a first configuration wherein it refracts a first level of light rays at the intersection of the spoke and ring travelling from the environment toward the person's eye, wherein the first adjustable microlens has a second configuration wherein it refracts a second level of light rays at the intersection of the spoke and ring travelling from the environment toward the person's eye, wherein the second level is less than 50% of the first level, and wherein the first adjustable microlens is selectively changed from its first configuration to its second configuration, or vice versa, by the transmission of electromagnetic energy; and a second adjustable microlens which is part of a second spoke and a second ring, wherein the second adjustable microlens a first configuration wherein it refracts a first level of light rays at the intersection of the spoke and ring travelling from the environment toward the person's eye, wherein the second adjustable microlens has a second configuration wherein it refracts a second level of light rays at the intersection of the spoke and ring travelling from the environment toward the person's eye, wherein the second level is less than 50% of the first level, and wherein the second adjustable microlens is selectively changed from its first configuration to its second configuration, or vice versa, by the transmission of electromagnetic energy.

In an example, augmented reality eyewear can comprise: a lens which is configured to be in front of a person's eye; an eye gaze tracker; a light-energy emitter; a near-focus mirror; and a far-focus mirror; wherein the near-focus mirror has a first configuration in which the near-focus mirror receives light beams from the light-energy emitter, the near-focus mirror reflects the light beams toward the lens, the lens redirects the light beams toward the person's eye, and the light beams display a virtual object at an apparent first distance in the person's field of vision; and wherein the near-focus mirror has a second configuration in which the near-focus mirror receives light beams from the light-energy emitter, the near-focus mirror reflects the light beams toward the far-focus mirror, the far-focus mirror reflects the light beams toward the lens, the lens redirects the light beams toward the person's eye, and the light beams display a virtual object at an apparent second distance in the person's field of vision wherein the second distance is greater than the first distance; and wherein the near-focus mirror is changed from its first configuration to its second configuration when the eye gaze tracker detects an increase in the person's focal distance.

In an example, augmented reality eyewear can comprise: a plurality of radial spokes, wherein spokes in the plurality of radial spokes extend outward from a central location in front of a person's eye, and wherein spokes in the plurality of radial spokes each further comprise a plurality of refractive optical elements (e.g. microlenses); a plurality of nested rings, wherein rings in the plurality of nested rings encircle the central location, and wherein rings in the plurality of nested rings each further comprise a plurality of refractive optical elements (e.g. microlenses); a first refractive optical element (e.g. microlens) which is part of a first spoke and is part of a first ring, wherein the first refractive optical element (e.g. microlens) has a first configuration wherein it redirects a first amount of environmental light rays near the intersection of the first spoke and first ring away from reaching the person's eye, wherein the first refractive optical element (e.g. microlens) has a second configuration wherein it redirects a second amount of environmental light rays near the intersection of the first spoke and first ring away from reaching the person's eye, wherein the second amount is at least 20% less than the first amount, and wherein the first refractive optical element (e.g. microlens) is selectively changed from its first configuration to its second configuration (or vice versa) by the selective transmission of electromagnetic energy through the first spoke and the first ring; and a second refractive optical element (e.g. microlens) which is part of a second spoke and is part of a second ring, wherein the second refractive optical element (e.g. microlens) has a third configuration wherein it redirects a third amount of environmental light rays near the intersection of the second spoke and second ring away from reaching the person's eye, wherein the second refractive optical element (e.g. microlens) has a fourth configuration wherein it redirects a fourth amount of environmental light rays near the intersection of the second spoke and second ring away from reaching the person's eye, wherein the fourth amount is at least 20% less than the third amount, and wherein the second refractive optical element (e.g. microlens) is selectively changed from its third configuration to its fourth configuration (or vice versa) by the selective transmission of electromagnetic energy through the second spoke and the second ring.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is central to the person's gaze and/or line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is central to the person's gaze and/or line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is central to the person's central line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the lens which is central to the person's central line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a spoke-and-ring array of optical structures for augmented reality eyewear can comprise: a plurality of radial spokes, wherein a radial spoke further comprises a plurality of adjustable reflective optical elements, and wherein radial spokes extend outward from a central location which is configured to be within 4" in front of a person's eye; a plurality of nested rings, wherein a ring further comprises a plurality of adjustable reflective optical elements, and wherein rings go around the central location; a first adjustable reflective optical element which is part of a first spoke and a first ring, wherein the first adjustable reflective optical element has a first configuration wherein it is substantially parallel to light rays travelling from the environment toward the person's eye, wherein the first adjustable reflective optical element has a second configuration wherein it intersects light rays traveling from the environment toward the person's eye at an angle within the range of 25 to 65 degrees, and wherein the first adjustable reflective optical element is selectively changed from its first configuration to its second configuration, or vice versa, by the selective transmission of electromagnetic energy through the first spoke and the first ring; and a second adjustable reflective optical element which is part of a second spoke and a second ring, wherein the second adjustable reflective optical element has a first configuration wherein it is substantially parallel to light rays travelling from the environment toward the person's eye, wherein the second adjustable reflective optical element has a second configuration wherein it intersects light rays traveling from the environment toward the person's eye at an angle within the range of 25 to 65 degrees, and wherein the second adjustable reflective optical element is selectively changed from its first configuration to its second configuration, or vice versa, by the selective transmission of electromagnetic energy through the second spoke and the second ring.

In an example, augmented reality eyewear can comprise: a lens which is configured to be in front of a person's eye; a light-energy emitter; a near-focus mirror; and a far-focus mirror, wherein the distance between the near-focus mirror and the far-focus mirror is at least ½"; wherein the near-focus mirror has a first configuration in which the near-focus mirror receives light beams from the light-energy emitter, the near-focus mirror reflects the light beams toward the lens, the lens redirects the light beams toward the person's eye, and the light beams display a virtual object in the person's field of vision; and wherein the near-focus mirror has a second configuration in which the near-focus mirror receives light beams from the light-energy emitter, the near-focus mirror reflects the light beams toward the far-focus mirror, the far-focus mirror reflects the light beams toward the lens, the lens redirects the light beams toward the person's eye, and the light beams display a virtual object in the person's field of vision; and wherein the near-focus mirror is set to its first configuration in order to display (apparently) closer virtual objects at a first period of time and set to its second configuration in order to display (apparently) farther virtual objects at a second period of time.

In an example, augmented reality eyewear can comprise: a plurality of radial spokes, wherein spokes in the plurality of radial spokes extend outward from a central location in front of a person's eye, and wherein spokes in the plurality of radial spokes each further comprise a plurality of refractive optical elements (e.g. microlenses); a plurality of nested arcs, wherein arcs in the plurality of nested arcs are concave with respect to the central location, and wherein arcs in the plurality of nested arcs each further comprise a plurality of refractive optical elements (e.g. microlenses); a first refractive optical element (e.g. microlens) which is part of a first spoke and is part of a first arc, wherein the first refractive optical element (e.g. microlens) has a first configuration wherein it redirects a first amount of environmental light rays near the intersection of the first spoke and first arc away from reaching the person's eye, wherein the first refractive optical element (e.g. microlens) has a second configuration wherein it redirects a second amount of environmental light rays near the intersection of the first spoke and first arc away from reaching the person's eye, wherein the second amount is at least 20% less than the first amount, and wherein the first refractive optical element (e.g. microlens) is selectively changed from its first configuration to its second configuration (or vice versa) by the selective transmission of electromagnetic energy through the first spoke and the first arc; and a second refractive optical element (e.g. microlens) which is part of a second spoke and is part of a second arc, wherein the second refractive optical element (e.g. microlens) has a third configuration wherein it redirects a third amount of environmental light rays near the intersection of the second spoke and second arc away from reaching the person's eye, wherein the second refractive optical element (e.g. microlens) has a fourth configuration wherein it redirects a fourth amount of environmental light rays near the intersection of the second spoke and second arc away from reaching the person's eye, wherein the fourth amount is at least 20% less than the third amount, and wherein the second refractive optical element (e.g. microlens) is selectively changed from its third configuration to its fourth configuration (or vice versa) by the selective transmission of electromagnetic energy through the second spoke and the second arc.

In an example, a method for augmented reality eyewear can comprise: configuring a lens to be located in front of a person's eye within 4" of the person's eye; using an eye gaze tracker to identify a first location on the lens which is central to the person's gaze from that eye during a first period of time; scanning a first plurality of light beams onto the lens in a spiral, circular, radial spoke, sunburst, roulette curve, hypotrochoid, and/or epitrochoid pattern centered on the first location during the first period of time, wherein the first plurality of light beams are redirected by the lens toward the person's eye to display a virtual object in the person's field of vision; using the eye gaze tracker to identify a second location on the lens which is central to the person's gaze from that eye during a second period of time; and scanning a second plurality of light beams onto the lens in a spiral, circular, radial spoke, sunburst, roulette curve, hypotrochoid, and/or epitrochoid pattern centered on the second location during the second period of time, wherein the second plurality of light beams are redirected by the lens toward the person's eye to display a virtual object in the person's field of vision.

In an example, a method for augmented reality eyewear can comprise: configuring a lens to be located in front of a person's eye within 4" of the person's eye; identifying a first location on the lens which is in line with the person's gaze and/or line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the lens which is in line with the person's gaze and/or line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a spoke-and-arc array of optical structures for augmented reality eyewear can comprise: a plurality of radial spokes, wherein a radial spoke further comprises a plurality of adjustable reflective optical elements, and wherein radial spokes extend outward from a central location which is configured to be within 4" in front of a person's eye; a plurality of nested arcs, wherein an arc further comprises a plurality of adjustable reflective optical elements, and wherein arcs are concave with respect to the central location; a first adjustable reflective optical element which is part of a first spoke and a first arc, wherein the first adjustable reflective optical element has a first configuration wherein it is substantially parallel to light rays travelling from the environment toward the person's eye, wherein the first adjustable reflective optical element has a second configuration wherein it intersects light rays traveling from the environment toward the person's eye at an angle within the range of 25 to 65 degrees, and wherein the first adjustable reflective optical element is selectively changed from its first configuration to its second configuration, or vice versa, by the transmission of electromagnetic energy; and a second adjustable reflective optical element which is part of a second spoke and a second arc, wherein the second adjustable reflective optical element has a first configuration wherein it is substantially parallel to light rays travelling from the environment toward the person's eye, wherein the second adjustable reflective optical element has a second configuration wherein it intersects light rays traveling from the environment toward the person's eye at an angle within the range of 25 to 65 degrees, and wherein the second adjustable reflective optical element is selectively changed from its first configuration to its second configuration, or vice versa, by the transmission of electromagnetic energy.

In an example, a spoke-and-ring array of optical structures for augmented reality eyewear can comprise: a plurality of radial spokes, wherein a radial spoke further comprises a plurality of adjustable reflective optical elements, and wherein radial spokes extend outward from a central location which is configured to be within 4" in front of a person's eye; a plurality of concentric rings, wherein a ring further comprises a plurality of adjustable reflective optical elements, and wherein rings go around the central location; a first adjustable reflective optical element which is part of a first spoke and a first ring, wherein the first adjustable reflective optical element has a first configuration wherein it is substantially parallel to light rays travelling from the environment toward the person's eye, wherein the first adjustable reflective optical element has a second configuration wherein it intersects light rays traveling from the environment toward the person's eye at a 45-degree angle, and wherein the first adjustable reflective optical element is selectively changed from its first configuration to its second configuration, or vice versa, by the selective transmission of electromagnetic energy through the first spoke and the first ring; and a second adjustable reflective optical element which is part of a second spoke and a second ring, wherein the second adjustable reflective optical element has a first configuration wherein it is substantially parallel to light rays travelling from the environment toward the person's eye, wherein the second adjustable reflective optical element has a second configuration wherein it intersects light rays traveling from the environment toward the person's eye at a 45-degree angle, and wherein the second adjustable reflective optical element is selectively changed from its first configuration to its second configuration, or vice versa, by the selective transmission of electromagnetic energy through the second spoke and the second ring.

In an example, augmented reality eyewear can comprise: a plurality of radial spokes, wherein spokes in the plurality of radial spokes extend outward from a central location in front of a person's eye, and wherein spokes in the plurality of radial spokes each further comprise a plurality of reflective optical elements (e.g. mirrors); a plurality of nested arcs, wherein arcs in the plurality of nested arcs are concave with respect to the central location, and wherein arcs in the plurality of nested arcs each further comprise a plurality of reflective optical elements (e.g. mirrors); a first reflective optical element (e.g. mirror) which is part of a first spoke and is part of a first arc, wherein the first reflective optical element (e.g. mirror) has a first configuration wherein it redirects a first amount of environmental light rays near the intersection of the first spoke and first arc away from reaching the person's eye, wherein the first reflective optical element (e.g. mirror) has a second configuration wherein it redirects a second amount of environmental light rays near the intersection of the first spoke and first arc away from reaching the person's eye, wherein the second amount is at least 50% less than the first amount, and wherein the first reflective optical element (e.g. mirror) is selectively changed from its first configuration to its second configuration (or vice versa) by the selective transmission of electromagnetic energy through the first spoke and the first arc; and a second reflective optical element (e.g. mirror) which is part of a second spoke and is part of a second arc, wherein the second reflective optical element (e.g. mirror) has a third configuration wherein it redirects a third amount of environmental light rays near the intersection of the second spoke and second arc away from reaching the person's eye, wherein the second reflective optical element (e.g. mirror) has a fourth configuration wherein it redirects a fourth amount of environmental light rays near the intersection of the second spoke and second arc away from reaching the person's eye, wherein the fourth amount is at least 50% less than the third amount, and wherein the second reflective optical element (e.g. mirror) is selectively changed from its third configuration to its fourth configuration (or vice versa) by the selective transmission of electromagnetic energy through the second spoke and the second arc.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is intersected by the person's gaze and/or line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is intersected by the person's gaze and/or line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is in line with the person's central line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the lens which is in line with the person's central line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a spoke-and-ring array of optical structures for augmented reality eyewear can comprise: a plurality of radial spokes, wherein a radial spoke further comprises a plurality of adjustable micromirrors, and wherein radial spokes extend outward from a central location which is configured to be within 4" in front of a person's eye; a plurality of nested rings, wherein a ring further comprises a plurality of adjustable micromirrors, and wherein rings go around the central location; a first adjustable micromirror which is part of a first spoke and a first ring, wherein the first adjustable micromirror has a first configuration wherein it is substantially parallel to light rays travelling from the environment toward the person's eye, wherein the first adjustable micromirror has a second configuration wherein it intersects light rays traveling from the environment toward the person's eye at an angle within the range of 25 to 65 degrees, and wherein the first adjustable micromirror is selectively changed from its first configuration to its second configuration, or vice versa, by the selective transmission of electromagnetic energy through the first spoke and the first ring; and a second adjustable micromirror which is part of a second spoke and a second ring, wherein the second adjustable micromirror has a first configuration wherein it is substantially parallel to light rays travelling from the environment toward the person's eye, wherein the second adjustable micromirror has a second configuration wherein it intersects light rays traveling from the environment toward the person's eye at an angle within the range of 25 to 65 degrees, and wherein the second adjustable micromirror is selectively changed from its first configuration to its second configuration, or vice versa, by the selective transmission of electromagnetic energy through the second spoke and the second ring.

In an example, augmented reality eyewear can comprise: a lens which is configured to be in front of a person's eye; a light-energy emitter; a near-focus mirror; and a far-focus mirror, wherein the distance between the near-focus mirror and the far-focus mirror is at least ½"; wherein the near-focus mirror has a first configuration in which the near-focus mirror receives light beams from the light-energy emitter, the near-focus mirror reflects the light beams toward the lens, the lens redirects the light beams toward the person's eye, and the light beams display a virtual object in the person's field of vision; and wherein the near-focus mirror has a second configuration in which the near-focus mirror receives light beams from the light-energy emitter, the near-focus mirror reflects the light beams toward the far-focus mirror, the far-focus mirror reflects the light beams toward the lens, the lens redirects the light beams toward the person's eye, and the light beams display a virtual object in the person's field of vision; and wherein the near-focus mirror is set to its first configuration in order to display (apparently) closer virtual objects in a first portion of the person's field of view and set to its second configuration in order to display (apparently) farther virtual objects in a second portion of the person's field of view.

In an example, augmented reality eyewear can comprise: a plurality of radial spokes, wherein spokes in the plurality of radial spokes extend outward from a central location in front of a person's eye, and wherein spokes in the plurality of radial spokes each further comprise a plurality of refractive optical elements (e.g. microlenses); a plurality of nested rings, wherein rings in the plurality of nested rings encircle the central location, and wherein rings in the plurality of nested rings each further comprise a plurality of refractive optical elements (e.g. microlenses); a first refractive optical element (e.g. microlens) which is part of a first spoke and is part of a first ring, wherein the first refractive optical element (e.g. microlens) has a first configuration which allows environmental light rays to travel through the intersection of the first spoke and first ring, wherein the first refractive optical element (e.g. microlens) has a second configuration which blocks environmental light rays from traveling through the intersection of the first spoke and first ring, and wherein the first refractive optical element (e.g. microlens) is selectively changed from its first configuration to its second configuration (or vice versa) by the selective transmission of electromagnetic energy through the first spoke and the first ring; and a second refractive optical element (e.g. microlens) which is part of a second spoke and is part of a second ring, wherein the second refractive optical element (e.g. microlens) has a third configuration which allows environmental light rays to travel through the intersection of the second spoke and second ring, wherein the second refractive optical element (e.g. microlens) has a fourth configuration which blocks environmental light rays from traveling through the intersection of the second spoke and second ring, and wherein the second refractive optical element (e.g. microlens) is selectively changed from its third configuration to its fourth configuration (or vice versa) by the selective transmission of electromagnetic energy through the second spoke and the second ring.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is central to the person's central line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is central to the person's central line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is intersected by the person's central line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the lens which is intersected by the person's central line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a spoke-and-ring array of optical structures for augmented reality eyewear can comprise: a plurality of radial spokes, wherein a radial spoke further comprises a plurality of adjustable reflective optical elements, and wherein radial spokes extend outward from a central location which is configured to be within 4" in front of a person's eye; a plurality of nested rings, wherein a ring further comprises a plurality of adjustable reflective optical elements, and wherein rings go around the central location; a first adjustable reflective optical element which is part of a first spoke and a first ring, wherein the first adjustable reflective optical element has a first configuration wherein it is substantially parallel to light rays travelling from the environment toward the person's eye, wherein the first adjustable reflective optical element has a second configuration wherein it intersects light rays traveling from the environment toward the person's eye at an angle within the range of 25 to 65 degrees, and wherein the first adjustable reflective optical element is selectively changed from its first configuration to its second configuration, or vice versa, by the transmission of electromagnetic energy; and a second adjustable reflective optical element which is part of a second spoke and a second ring, wherein the second adjustable reflective optical element has a first configuration wherein it is substantially parallel to light rays travelling from the environment toward the person's eye, wherein the second adjustable reflective optical element has a second configuration wherein it intersects light rays traveling from the environment toward the person's eye at an angle within the range of 25 to 65 degrees, and wherein the second adjustable reflective optical element is selectively changed from its first configuration to its second configuration, or vice versa, by the transmission of electromagnetic energy.

In an example, augmented reality eyewear can comprise: a lens which is configured to be in front of a person's eye; an eye gaze tracker; a light-energy emitter; a far-focus mirror; and a near-focus mirror, wherein the near-focus mirror receives light beams emitted by the light-energy emitter, wherein the near-focus mirror has a first configuration in which the near-focus mirror reflects the light beams toward the lens, wherein the near-focus mirror has a second configuration in which the near-focus mirror reflects the light beams toward the far-focus mirror, and wherein the near-focus mirror is changed from its first configuration to its second configuration when the person focuses on more distant objects in the real world.

In an example, augmented reality eyewear can comprise: a plurality of radial spokes, wherein spokes in the plurality of radial spokes extend outward from a central location in front of a person's eye, and wherein spokes in the plurality of radial spokes each further comprise a plurality of refractive optical elements (e.g. microlenses); a plurality of nested arcs, wherein arcs in the plurality of nested arcs are concave with respect to the central location, and wherein arcs in the plurality of nested arcs each further comprise a plurality of refractive optical elements (e.g. microlenses); a first refractive optical element (e.g. microlens) which is part of a first spoke and is part of a first arc, wherein the first refractive optical element (e.g. microlens) has a first configuration which allows environmental light rays to travel through the intersection of the first spoke and first arc, wherein the first refractive optical element (e.g. microlens) has a second configuration which blocks environmental light rays from traveling through the intersection of the first spoke and first arc, and wherein the first refractive optical element (e.g. microlens) is selectively changed from its first configuration to its second configuration (or vice versa) by the selective transmission of electromagnetic energy through the first spoke and the first arc; and a second refractive optical element (e.g. microlens) which is part of a second spoke and is part of a second arc, wherein the second refractive optical element (e.g. microlens) has a third configuration which allows environmental light rays to travel through the intersection of the second spoke and second arc, wherein the second refractive optical element (e.g. microlens) has a fourth configuration which blocks environmental light rays from traveling through the intersection of the second spoke and second arc, and wherein the second refractive optical element (e.g. microlens) is selectively changed from its third configuration to its fourth configuration (or vice versa) by the selective transmission of electromagnetic energy through the second spoke and the second arc.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is in line with the person's central line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is in line with the person's central line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision. "Who is this Galt guy?" "Some eccentric inventor. Offered to sell his inventions to us a couple years ago, but we did not understand them at the time. Should we offer to buy his stuff now?" "Nah . . . We can just call him a troll and take what we want."

In an example, a method for augmented reality eyewear can comprise: configuring a lens to be located in front of a person's eye within 4" of the person's eye; identifying a first location on the lens which is central to the person's gaze and/or line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the lens which is central to the person's gaze and/or line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a spoke-and-ring array of optical structures for augmented reality eyewear can comprise: a plurality of radial spokes, wherein a radial spoke further comprises a plurality of adjustable micromirrors, and wherein radial spokes extend outward from a central location which is configured to be within 4" in front of a person's eye; a plurality of nested rings, wherein a ring further comprises a plurality of adjustable micromirrors, and wherein rings go around the central location; a first adjustable micromirror which is part of a first spoke and a first ring, wherein the first adjustable micromirror has a first configuration wherein it is substantially parallel to light rays travelling from the environment toward the person's eye, wherein the first adjustable micromirror has a second configuration wherein it intersects light rays traveling from the environment toward the person's eye at an angle within the range of 25 to 65 degrees, and wherein the first adjustable micromirror is selectively changed from its first configuration to its second configuration, or vice versa, by the transmission of electromagnetic energy; and a second adjustable micromirror which is part of a second spoke and a second ring, wherein the second adjustable micromirror has a first configuration wherein it is substantially parallel to light rays travelling from the environment toward the person's eye, wherein the second adjustable micromirror has a second configuration wherein it intersects light rays traveling from the environment toward the person's eye at an angle within the range of 25 to 65 degrees, and wherein the second adjustable micromirror is selectively changed from its first configuration to its second configuration, or vice versa, by the transmission of electromagnetic energy.

In an example, augmented reality eyewear can comprise: a lens which is configured to be in front of a person's eye; an eye gaze tracker; a light-energy emitter; a far-focus mirror; and a near-focus mirror, wherein the near-focus mirror receives light beams emitted by the light-energy emitter, wherein the near-focus mirror has a first configuration in which the near-focus mirror reflects the light beams toward the lens, wherein the near-focus mirror has a second configuration in which the near-focus mirror reflects the light beams toward the far-focus mirror, and wherein the near-focus mirror is changed from its first configuration to its second configuration, or vice versa, based on changes in the person's gaze.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is intersected by the person's central line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is intersected by the person's central line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is in line with the person's gaze and/or line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the lens which is in line with the person's gaze and/or line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a spoke-and-ring array of optical structures for augmented reality eyewear can comprise: a plurality of radial spokes, wherein a radial spoke further comprises a plurality of adjustable refractive optical elements, and wherein radial spokes extend outward from a central location which is configured to be within 4" in front of a person's eye; a plurality of concentric rings, wherein a ring further comprises a plurality of adjustable refractive optical elements, and wherein rings go around the central location; a first adjustable refractive optical element which is part of a first spoke and a first ring, wherein the first adjustable refractive optical element has a first configuration wherein it refracts a first level of light rays at the intersection of the spoke and ring travelling from the environment toward the person's eye, wherein the first adjustable refractive optical element has a second configuration wherein it refracts a second level of light rays at the intersection of the spoke and ring travelling from the environment toward the person's eye, wherein the second level is less than 50% of the first level, and wherein the first adjustable refractive optical element is selectively changed from its first configuration to its second configuration, or vice versa, by the selective transmission of electromagnetic energy through the first spoke and the first ring; and a second adjustable refractive optical element which is part of a second spoke and a second ring, wherein the second adjustable refractive optical element has a first configuration wherein it refracts a first level of light rays at the intersection of the spoke and ring travelling from the environment toward the person's eye, wherein the second adjustable refractive optical element has a second configuration wherein it refracts a second level of light rays at the intersection of the spoke and ring travelling from the environment toward the person's eye, wherein the second level is less than 50% of the first level, and wherein the second adjustable refractive optical element is selectively changed from its first configuration to its second configuration, or vice versa, by the selective transmission of electromagnetic energy through the second spoke and the second ring.

In an example, augmented reality eyewear can comprise: a lens which is configured to be in front of a person's eye within 4" of the person's eye; a light-energy emitter; a near-focus mirror; and a far-focus mirror; wherein the near-focus light-energy reflector is located to one side (e.g. left or right) of the person's eye and the far-focus light-energy reflector is located on the other side (e.g. right or left) of the person's eye; wherein the near-focus mirror has a first configuration wherein: the near-focus mirror receives light beams from the light-energy emitter, the near-focus mirror reflects the light beams toward the lens, the lens redirects the light beams toward the person's eye, and the light beams display a virtual object at an apparent first distance in the person's field of vision; and wherein the near-focus mirror has a second configuration wherein: the near-focus mirror receives light beams from the light-energy emitter, the near-focus mirror reflects the light beams toward the far-focus mirror, the far-focus mirror reflects the light beams toward the lens, the lens redirects the light beams toward the person's eye, and the light beams display a virtual object at an apparent second distance in the person's field of vision wherein the second distance is greater than the first distance.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is in line with the person's central line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is in line with the person's central line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is central to the person's gaze and/or line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the lens which is central to the person's gaze and/or line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a spoke-and-ring array of optical structures for augmented reality eyewear can comprise: a plurality of radial spokes, wherein a radial spoke further comprises a plurality of adjustable micromirrors, and wherein radial spokes extend outward from a central location which is configured to be within 4" in front of a person's eye; a plurality of nested rings, wherein a ring further comprises a plurality of adjustable micromirrors, and wherein rings go around the central location; a first adjustable micromirror which is part of a first spoke and a first ring, wherein the first adjustable micromirror has a first configuration wherein it is substantially parallel to light rays travelling from the environment toward the person's eye, wherein the first adjustable micromirror has a second configuration wherein it intersects light rays traveling from the environment toward the person's eye at a 45-degree angle, and wherein the first adjustable micromirror is selectively changed from its first configuration to its second configuration, or vice versa, by rotation and/or tilting of the first adjustable micromirror; and a second adjustable micromirror which is part of a second spoke and a second ring, wherein the second adjustable micromirror has a first configuration wherein it is substantially parallel to light rays travelling from the environment toward the person's eye, wherein the second adjustable micromirror has a second configuration wherein it intersects light rays traveling from the environment toward the person's eye at a 45-degree angle, and wherein the second adjustable micromirror is selectively changed from its first configuration to its second configuration, or vice versa, by rotation and/or tilting of the second adjustable micromirror.

In an example, augmented reality eyewear can comprise: a lens which is configured to be in front of a person's eye within 4" of the person's eye; a light-energy emitter; a near-focus mirror; and a far-focus mirror, wherein the distance between the near-focus mirror and the far-focus mirror is at least ½", and wherein the far-focus light-energy reflector is closer to the person's ear than the near-focus light-energy reflector; wherein the near-focus mirror has a first configuration wherein: the near-focus mirror receives light beams from the light-energy emitter, the near-focus mirror reflects the light beams toward the lens, the lens redirects the light beams toward the person's eye, and the light beams display a virtual object at an apparent first distance in the person's field of vision; and wherein the near-focus mirror has a second configuration wherein: the near-focus mirror receives light beams from the light-energy emitter, the near-focus mirror reflects the light beams toward the far-focus mirror, the far-focus mirror reflects the light beams toward the lens, the lens redirects the light beams toward the person's eye, and the light beams display a virtual object at an apparent second distance in the person's field of vision wherein the second distance is greater than the first distance.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is central to the person's gaze and/or line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is central to the person's gaze and/or line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is intersected by the person's gaze and/or line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the lens which is intersected by the person's gaze and/or line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a spoke-and-arc array of optical structures for augmented reality eyewear can comprise: a plurality of radial spokes, wherein a radial spoke further comprises a plurality of adjustable reflective optical elements, and wherein radial spokes extend outward from a central location which is configured to be within 4" in front of a person's eye; a plurality of nested arcs, wherein an arc further comprises a plurality of adjustable reflective optical elements, and wherein arcs are concave with respect to the central location; a first adjustable reflective optical element which is part of a first spoke and a first arc, wherein the first adjustable reflective optical element has a first configuration wherein it is substantially parallel to light rays travelling from the environment toward the person's eye, wherein the first adjustable reflective optical element has a second configuration wherein it intersects light rays traveling from the environment toward the person's eye at a 45-degree angle, and wherein the first adjustable reflective optical element is selectively changed from its first configuration to its second configuration, or vice versa, by the selective transmission of electromagnetic energy through the first spoke and the first arc; and a second adjustable reflective optical element which is part of a second spoke and a second arc, wherein the second adjustable reflective optical element has a first configuration wherein it is substantially parallel to light rays travelling from the environment toward the person's eye, wherein the second adjustable reflective optical element has a second configuration wherein it intersects light rays traveling from the environment toward the person's eye at a 45-degree angle, and wherein the second adjustable reflective optical element is selectively changed from its first configuration to its second configuration, or vice versa, by the selective transmission of electromagnetic energy through the second spoke and the second arc.

In an example, a spoke-and-ring array of optical structures for augmented reality eyewear can comprise: a plurality of radial spokes, wherein a radial spoke further comprises a plurality of adjustable micromirrors, and wherein radial spokes extend outward from a central location which is configured to be within 4" in front of a person's eye; a plurality of concentric rings, wherein a ring further comprises a plurality of adjustable micromirrors, and wherein rings go around the central location; a first adjustable micromirror which is part of a first spoke and a first ring, wherein the first adjustable micromirror has a first configuration wherein it is substantially parallel to light rays travelling from the environment toward the person's eye, wherein the first adjustable micromirror has a second configuration wherein it intersects light rays traveling from the environment toward the person's eye at a 45-degree angle, and wherein the first adjustable micromirror is selectively changed from its first configuration to its second configuration, or vice versa, by the selective transmission of electromagnetic energy through the first spoke and the first ring; and a second adjustable micromirror which is part of a second spoke and a second ring, wherein the second adjustable micromirror has a first configuration wherein it is substantially parallel to light rays travelling from the environment toward the person's eye, wherein the second adjustable micromirror has a second configuration wherein it intersects light rays traveling from the environment toward the person's eye at a 45-degree angle, and wherein the second adjustable micromirror is selectively changed from its first configuration to its second configuration, or vice versa, by the selective transmission of electromagnetic energy through the second spoke and the second ring.

In an example, augmented reality eyewear can comprise: a plurality of radial spokes, wherein spokes in the plurality of radial spokes extend outward from a central location in front of a person's eye, and wherein spokes in the plurality of radial spokes each further comprise a plurality of reflective optical elements (e.g. mirrors); a plurality of nested rings, wherein rings in the plurality of nested rings encircle the central location, and wherein rings in the plurality of nested rings each further comprise a plurality of reflective optical elements (e.g. mirrors); a first reflective optical element (e.g. mirror) which is part of a first spoke and is part of a first ring, wherein the first reflective optical element (e.g. mirror) has a first configuration wherein it redirects a first amount of environmental light rays near the intersection of the first spoke and first ring away from reaching the person's eye, wherein the first reflective optical element (e.g. mirror) has a second configuration wherein it redirects a second amount of environmental light rays near the intersection of the first spoke and first ring away from reaching the person's eye, wherein the second amount is at least 20% less than the first amount, and wherein the first reflective optical element (e.g. mirror) is selectively changed from its first configuration to its second configuration (or vice versa) by the selective transmission of electromagnetic energy through the first spoke and the first ring; and a second reflective optical element (e.g. mirror) which is part of a second spoke and is part of a second ring, wherein the second reflective optical element (e.g. mirror) has a third configuration wherein it redirects a third amount of environmental light rays near the intersection of the second spoke and second ring away from reaching the person's eye, wherein the second reflective optical element (e.g. mirror) has a fourth configuration wherein it redirects a fourth amount of environmental light rays near the intersection of the second spoke and second ring away from reaching the person's eye, wherein the fourth amount is at least 20% less than the third amount, and wherein the second reflective optical element (e.g. mirror) is selectively changed from its third configuration to its fourth configuration (or vice versa) by the selective transmission of electromagnetic energy through the second spoke and the second ring.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is in line with the person's gaze and/or line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is in line with the person's gaze and/or line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is central to the person's central line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the lens which is central to the person's central line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a spoke-and-arc array of optical structures for augmented reality eyewear can comprise: a plurality of radial spokes, wherein a radial spoke further comprises a plurality of adjustable reflective optical elements, and wherein radial spokes extend outward from a central location which is configured to be within 4" in front of a person's eye; a plurality of nested arcs, wherein an arc further comprises a plurality of adjustable reflective optical elements, and wherein arcs are concave with respect to the central location; a first adjustable reflective optical element which is part of a first spoke and a first arc, wherein the first adjustable reflective optical element has a first configuration wherein it is substantially parallel to light rays travelling from the environment toward the person's eye, wherein the first adjustable reflective optical element has a second configuration wherein it intersects light rays traveling from the environment toward the person's eye at a 45-degree angle, and wherein the first adjustable reflective optical element is selectively changed from its first configuration to its second configuration, or vice versa, by the transmission of electromagnetic energy; and a second adjustable reflective optical element which is part of a second spoke and a second arc, wherein the second adjustable reflective optical element has a first configuration wherein it is substantially parallel to light rays travelling from the environment toward the person's eye, wherein the second adjustable reflective optical element has a second configuration wherein it intersects light rays traveling from the environment toward the person's eye at a 45-degree angle, and wherein the second adjustable reflective optical element is selectively changed from its first configuration to its second configuration, or vice versa, by the transmission of electromagnetic energy.

In an example, a spoke-and-ring array of optical structures for augmented reality eyewear can comprise: a plurality of radial spokes, wherein a radial spoke further comprises a plurality of adjustable reflective optical elements, and wherein radial spokes extend outward from a central location which is configured to be within 4" in front of a person's eye; a plurality of concentric rings, wherein a ring further comprises a plurality of adjustable reflective optical elements, and wherein rings go around the central location; a first adjustable reflective optical element which is part of a first spoke and a first ring, wherein the first adjustable reflective optical element has a first configuration wherein it is substantially parallel to light rays travelling from the environment toward the person's eye, wherein the first adjustable reflective optical element has a second configuration wherein it intersects light rays traveling from the environment toward the person's eye at a 45-degree angle, and wherein the first adjustable reflective optical element is selectively changed from its first configuration to its second configuration, or vice versa, by the transmission of electromagnetic energy; and a second adjustable reflective optical element which is part of a second spoke and a second ring, wherein the second adjustable reflective optical element has a first configuration wherein it is substantially parallel to light rays travelling from the environment toward the person's eye, wherein the second adjustable reflective optical element has a second configuration wherein it intersects light rays traveling from the environment toward the person's eye at a 45-degree angle, and wherein the second adjustable reflective optical element is selectively changed from its first configuration to its second configuration, or vice versa, by the transmission of electromagnetic energy.

In an example, augmented reality eyewear can comprise: a plurality of radial spokes, wherein spokes in the plurality of radial spokes extend outward from a central location in front of a person's eye, and wherein spokes in the plurality of radial spokes each further comprise a plurality of reflective optical elements (e.g. mirrors); a plurality of nested arcs, wherein arcs in the plurality of nested arcs are concave with respect to the central location, and wherein arcs in the plurality of nested arcs each further comprise a plurality of reflective optical elements (e.g. mirrors); a first reflective optical element (e.g. mirror) which is part of a first spoke and is part of a first arc, wherein the first reflective optical element (e.g. mirror) has a first configuration wherein it redirects a first amount of environmental light rays near the intersection of the first spoke and first arc away from reaching the person's eye, wherein the first reflective optical element (e.g. mirror) has a second configuration wherein it redirects a second amount of environmental light rays near the intersection of the first spoke and first arc away from reaching the person's eye, wherein the second amount is at least 20% less than the first amount, and wherein the first reflective optical element (e.g. mirror) is selectively changed from its first configuration to its second configuration (or vice versa) by the selective transmission of electromagnetic energy through the first spoke and the first arc; and a second reflective optical element (e.g. mirror) which is part of a second spoke and is part of a second arc, wherein the second reflective optical element (e.g. mirror) has a third configuration wherein it redirects a third amount of environmental light rays near the intersection of the second spoke and second arc away from reaching the person's eye, wherein the second reflective optical element (e.g. mirror) has a fourth configuration wherein it redirects a fourth amount of environmental light rays near the intersection of the second spoke and second arc away from reaching the person's eye, wherein the fourth amount is at least 20% less than the third amount, and wherein the second reflective optical element (e.g. mirror) is selectively changed from its third configuration to its fourth configuration (or vice versa) by the selective transmission of electromagnetic energy through the second spoke and the second arc.

In an example, a method for augmented reality eyewear can comprise: configuring a lens to be located in front of a person's eye within 4" of the person's eye; identifying a first location on the lens which is intersected by the person's gaze from that eye during a first period of time; scanning a first plurality of light beams onto the lens in a spiral, circular, radial spoke, sunburst, roulette curve, hypotrochoid, and/or epitrochoid pattern centered on the first location during the first period of time, wherein the first plurality of light beams are redirected by the lens toward the person's eye to display a virtual object in the person's field of vision; identifying a second location on the lens which is intersected by the person's gaze from that eye during a second period of time; and scanning a second plurality of light beams onto the lens in a spiral, circular, radial spoke, sunburst, roulette curve, hypotrochoid, and/or epitrochoid pattern centered on the second location during the second period of time, wherein the second plurality of light beams are redirected by the lens toward the person's eye to display a virtual object in the person's field of vision.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is central to the person's gaze and/or line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is central to the person's gaze and/or line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is intersected by the person's gaze and/or line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the lens which is intersected by the person's gaze and/or line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a spoke-and-ring array of optical structures for augmented reality eyewear can comprise: a plurality of radial spokes, wherein a radial spoke further comprises a plurality of adjustable microlenses, and wherein radial spokes extend outward from a central location which is configured to be within 4" in front of a person's eye; a plurality of concentric rings, wherein a ring further comprises a plurality of adjustable microlenses, and wherein rings go around the central location; a first adjustable microlens which is part of a first spoke and a first ring, wherein the first adjustable microlens has a first configuration wherein it refracts a first level of light rays at the intersection of the spoke and ring travelling from the environment toward the person's eye, wherein the first adjustable microlens has a second configuration wherein it refracts a second level of light rays at the intersection of the spoke and ring travelling from the environment toward the person's eye, wherein the second level is less than 50% of the first level, and wherein the first adjustable microlens is selectively changed from its first configuration to its second configuration, or vice versa, by the selective transmission of electromagnetic energy through the first spoke and the first ring; and a second adjustable microlens which is part of a second spoke and a second ring, wherein the second adjustable microlens a first configuration wherein it refracts a first level of light rays at the intersection of the spoke and ring travelling from the environment toward the person's eye, wherein the second adjustable microlens has a second configuration wherein it refracts a second level of light rays at the intersection of the spoke and ring travelling from the environment toward the person's eye, wherein the second level is less than 50% of the first level, and wherein the second adjustable microlens is selectively changed from its first configuration to its second configuration, or vice versa, by the selective transmission of electromagnetic energy through the second spoke and the second ring.

In an example, augmented reality eyewear can comprise: a partially-transparent structure (e.g. lens) which is configured to be in front of a person's eye within 4" of the person's eye; an eye gaze tracker; a light-energy emitter; a near-focus light-energy reflector; and a far-focus light-energy reflector, wherein the distance between the near-focus light-energy reflector and the far-focus light-energy reflector is at least ½"; wherein the near-focus light-energy reflector has a first configuration wherein: the near-focus light-energy reflector receives light beams from the light-energy emitter, the near-focus light-energy reflector reflects the light beams toward the partially-transparent structure (e.g. lens), the partially-transparent structure (e.g. lens) redirects the light beams toward the person's eye, and the light beams display a virtual object at an apparent first distance in the person's field of vision; and wherein the near-focus light-energy reflector has a second configuration wherein: the near-focus light-energy reflector receives light beams from the light-energy emitter, the near-focus light-energy reflector reflects the light beams toward the far-focus light-energy reflector, the far-focus light-energy reflector reflects the light beams toward the partially-transparent structure (e.g. lens), the partially-transparent structure (e.g. lens) redirects the light beams toward the person's eye, and the light beams display a virtual object at an apparent second distance in the person's field of vision wherein the second distance is greater than the first distance; and wherein the near-focus light-energy reflector is changed from its first configuration to its second configuration when the person focuses on more distant objects in the real world.

In an example, a method for augmented reality eyewear can comprise: configuring a lens to be located in front of a person's eye within 4" of the person's eye; identifying a first location on the lens which is central to the person's gaze from that eye during a first period of time; scanning a first plurality of light beams onto the lens in a spiral, circular, radial spoke, sunburst, roulette curve, hypotrochoid, and/or epitrochoid pattern centered on the first location during the first period of time, wherein the first plurality of light beams are redirected by the lens toward the person's eye to display a virtual object in the person's field of vision; identifying a second location on the lens which is central to the person's gaze from that eye during a second period of time; and scanning a second plurality of light beams onto the lens in a spiral, circular, radial spoke, sunburst, roulette curve, hypotrochoid, and/or epitrochoid pattern centered on the second location during the second period of time, wherein the second plurality of light beams are redirected by the lens toward the person's eye to display a virtual object in the person's field of vision.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is central to the person's central line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is central to the person's central line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is intersected by the person's central line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the lens which is intersected by the person's central line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a spoke-and-ring array of optical structures for augmented reality eyewear can comprise: a plurality of radial spokes, wherein a radial spoke further comprises a plurality of adjustable reflective optical elements, and wherein radial spokes extend outward from a central location which is configured to be within 4" in front of a person's eye; a plurality of concentric rings, wherein a ring further comprises a plurality of adjustable reflective optical elements, and wherein rings go around the central location; a first adjustable reflective optical element which is part of a first spoke and a first ring, wherein the first adjustable reflective optical element has a first configuration wherein it is substantially parallel to light rays travelling from the environment toward the person's eye, wherein the first adjustable reflective optical element has a second configuration wherein it intersects light rays traveling from the environment toward the person's eye at an angle within the range of 25 to 65 degrees, and wherein the first adjustable reflective optical element is selectively changed from its first configuration to its second configuration, or vice versa, by the selective transmission of electromagnetic energy through the first spoke and the first ring; and a second adjustable reflective optical element which is part of a second spoke and a second ring, wherein the second adjustable reflective optical element has a first configuration wherein it is substantially parallel to light rays travelling from the environment toward the person's eye, wherein the second adjustable reflective optical element has a second configuration wherein it intersects light rays traveling from the environment toward the person's eye at an angle within the range of 25 to 65 degrees, and wherein the second adjustable reflective optical element is selectively changed from its first configuration to its second configuration, or vice versa, by the selective transmission of electromagnetic energy through the second spoke and the second ring.

In an example, augmented reality eyewear can comprise: a partially-transparent structure (e.g. lens) which is configured to be in front of a person's eye within 4" of the person's eye; a light-energy emitter; a near-focus light-energy reflector; and a far-focus light-energy reflector, wherein the distance between the near-focus light-energy reflector and the far-focus light-energy reflector is at least ½"; wherein the near-focus light-energy reflector has a first configuration wherein: the near-focus light-energy reflector receives light beams from the light-energy emitter, the near-focus light-energy reflector reflects the light beams toward the partially-transparent structure (e.g. lens), the partially-transparent structure (e.g. lens) redirects the light beams toward the person's eye, and the light beams display a virtual object at an apparent first distance in the person's field of vision; and wherein the near-focus light-energy reflector has a second configuration wherein: the near-focus light-energy reflector receives light beams from the light-energy emitter, the near-focus light-energy reflector reflects the light beams toward the far-focus light-energy reflector, the far-focus light-energy reflector reflects the light beams toward the partially-transparent structure (e.g. lens), the partially-transparent structure (e.g. lens) redirects the light beams toward the person's eye, and the light beams display a virtual object at an apparent second distance in the person's field of vision wherein the second distance is greater than the first distance.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is central to the person's central line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is central to the person's central line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is intersected by the person's central line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the lens which is intersected by the person's central line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a spoke-and-ring array of optical structures for augmented reality eyewear can comprise: a plurality of radial spokes, wherein a radial spoke further comprises a plurality of adjustable refractive optical elements, and wherein radial spokes extend outward from a central location which is configured to be within 4" in front of a person's eye; a plurality of nested rings, wherein a ring further comprises a plurality of adjustable refractive optical elements, and wherein rings go around the central location; a first adjustable refractive optical element which is part of a first spoke and a first ring, wherein the first adjustable refractive optical element has a first configuration wherein it refracts a first level of light rays at the intersection of the spoke and ring travelling from the environment toward the person's eye, wherein the first adjustable refractive optical element has a second configuration wherein it refracts a second level of light rays at the intersection of the spoke and ring travelling from the environment toward the person's eye, wherein the second level is less than 50% of the first level, and wherein the first adjustable refractive optical element is selectively changed from its first configuration to its second configuration, or vice versa, by the selective transmission of electromagnetic energy through the first spoke and the first ring; and a second adjustable refractive optical element which is part of a second spoke and a second ring, wherein the second adjustable refractive optical element has a first configuration wherein it refracts a first level of light rays at the intersection of the spoke and ring travelling from the environment toward the person's eye, wherein the second adjustable refractive optical element has a second configuration wherein it refracts a second level of light rays at the intersection of the spoke and ring travelling from the environment toward the person's eye, wherein the second level is less than 50% of the first level, and wherein the second adjustable refractive optical element is selectively changed from its first configuration to its second configuration, or vice versa, by the selective transmission of electromagnetic energy through the second spoke and the second ring.

In an example, a spoke-and-ring array of optical structures for augmented reality eyewear can comprise: a plurality of radial spokes, wherein a radial spoke further comprises a plurality of adjustable reflective optical elements, and wherein radial spokes extend outward from a central location which is configured to be within 4" in front of a person's eye; a plurality of concentric rings, wherein a ring further comprises a plurality of adjustable reflective optical elements, and wherein rings go around the central location; a first adjustable reflective optical element which is part of a first spoke and a first ring, wherein the first adjustable reflective optical element has a first configuration wherein it is substantially parallel to light rays travelling from the environment toward the person's eye, wherein the first adjustable reflective optical element has a second configuration wherein it intersects light rays traveling from the environment toward the person's eye at a 45-degree angle, and wherein the first adjustable reflective optical element is selectively changed from its first configuration to its second configuration, or vice versa, by rotation and/or tilting of the first adjustable reflective optical element; and a second adjustable reflective optical element which is part of a second spoke and a second ring, wherein the second adjustable reflective optical element has a first configuration wherein it is substantially parallel to light rays travelling from the environment toward the person's eye, wherein the second adjustable reflective optical element has a second configuration wherein it intersects light rays traveling from the environment toward the person's eye at a 45-degree angle, and wherein the second adjustable reflective optical element is selectively changed from its first configuration to its second configuration, or vice versa, by rotation and/or tilting of the second adjustable reflective optical element.

In an example, augmented reality eyewear can comprise: a plurality of radial spokes, wherein spokes in the plurality of radial spokes extend outward from a central location in front of a person's eye, and wherein spokes in the plurality of radial spokes each further comprise a plurality of reflective optical elements (e.g. mirrors); a plurality of nested arcs, wherein arcs in the plurality of nested arcs are concave with respect to the central location, and wherein arcs in the plurality of nested arcs each further comprise a plurality of reflective optical elements (e.g. mirrors); a first reflective optical element (e.g. mirror) which is part of a first spoke and is part of a first arc, wherein the first reflective optical element (e.g. mirror) has a first configuration which allows environmental light rays to travel through the intersection of the first spoke and first arc, wherein the first reflective optical element (e.g. mirror) has a second configuration which blocks environmental light rays from traveling through the intersection of the first spoke and first arc, and wherein the first reflective optical element (e.g. mirror) is selectively changed from its first configuration to its second configuration (or vice versa) by the selective transmission of electromagnetic energy through the first spoke and the first arc; and a second reflective optical element (e.g. mirror) which is part of a second spoke and is part of a second arc, wherein the second reflective optical element (e.g. mirror) has a third configuration which allows environmental light rays to travel through the intersection of the second spoke and second arc, wherein the second reflective optical element (e.g. mirror) has a fourth configuration which blocks environmental light rays from traveling through the intersection of the second spoke and second arc, and wherein the second reflective optical element (e.g. mirror) is selectively changed from its third configuration to its fourth configuration (or vice versa) by the selective transmission of electromagnetic energy through the second spoke and the second arc.

In an example, a method for augmented reality eyewear can comprise: configuring a lens to be located in front of a person's eye within 4" of the person's eye; identifying a first location on the lens which is central to the person's gaze from that eye during a first period of time; scanning a first plurality of light beams onto the lens in a spiral pattern centered on the first location during the first period of time, wherein the first plurality of light beams are redirected by the lens toward the person's eye to display a virtual object in the person's field of vision; identifying a second location on the lens which is central to the person's gaze from that eye during a second period of time; and scanning a second plurality of light beams onto the lens in a spiral pattern centered on the second location during the second period of time, wherein the second plurality of light beams are redirected by the lens toward the person's eye to display a virtual object in the person's field of vision.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is in line with the person's central line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is in line with the person's central line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a spoke-and-arc array of optical structures for augmented reality eyewear can comprise: a plurality of radial spokes, wherein a radial spoke further comprises a plurality of adjustable refractive optical elements, and wherein radial spokes extend outward from a central location which is configured to be within 4" in front of a person's eye; a plurality of nested arcs, wherein an arc further comprises a plurality of adjustable refractive optical elements, and wherein arcs are concave with respect to the central location; a first adjustable refractive optical element which is part of a first spoke and a first arc, wherein the first adjustable refractive optical element has a first configuration wherein it refracts a first level of light rays at the intersection of the spoke and ring travelling from the environment toward the person's eye, wherein the first adjustable refractive optical element has a second configuration wherein it refracts a second level of light rays at the intersection of the spoke and ring travelling from the environment toward the person's eye, wherein the second level is less than 50% of the first level, and wherein the first adjustable refractive optical element is selectively changed from its first configuration to its second configuration, or vice versa, by the selective transmission of electromagnetic energy through the first spoke and the first arc; and a second adjustable refractive optical element which is part of a second spoke and a second arc, wherein the second adjustable refractive optical element has a first configuration wherein it refracts a first level of light rays at the intersection of the spoke and ring travelling from the environment toward the person's eye, wherein the second adjustable refractive optical element has a second configuration wherein it refracts a second level of light rays at the intersection of the spoke and ring travelling from the environment toward the person's eye, wherein the second level is less than 50% of the first level, and wherein the second adjustable refractive optical element is selectively changed from its first configuration to its second configuration, or vice versa, by the selective transmission of electromagnetic energy through the second spoke and the second arc.

In an example, a spoke-and-ring array of optical structures for augmented reality eyewear can comprise: a plurality of radial spokes, wherein a radial spoke further comprises a plurality of adjustable micromirrors, and wherein radial spokes extend outward from a central location which is configured to be within 4" in front of a person's eye; a plurality of concentric rings, wherein a ring further comprises a plurality of adjustable micromirrors, and wherein rings go around the central location; a first adjustable micromirror which is part of a first spoke and a first ring, wherein the first adjustable micromirror has a first configuration wherein it is substantially parallel to light rays travelling from the environment toward the person's eye, wherein the first adjustable micromirror has a second configuration wherein it intersects light rays traveling from the environment toward the person's eye at an angle within the range of 25 to 65 degrees, and wherein the first adjustable micromirror is selectively changed from its first configuration to its second configuration, or vice versa, by the selective transmission of electromagnetic energy through the first spoke and the first ring; and a second adjustable micromirror which is part of a second spoke and a second ring, wherein the second adjustable micromirror has a first configuration wherein it is substantially parallel to light rays travelling from the environment toward the person's eye, wherein the second adjustable micromirror has a second configuration wherein it intersects light rays traveling from the environment toward the person's eye at an angle within the range of 25 to 65 degrees, and wherein the second adjustable micromirror is selectively changed from its first configuration to its second configuration, or vice versa, by the selective transmission of electromagnetic energy through the second spoke and the second ring.

In an example, augmented reality eyewear can comprise: a partially-transparent structure (e.g. lens) which is configured to be in front of a person's eye within 4" of the person's eye; a light-energy emitter; a near-focus light-energy reflector; and a far-focus light-energy reflector, wherein the distance between the near-focus light-energy reflector and the far-focus light-energy reflector is at least ½", and wherein the far-focus light-energy reflector is closer to the person's ear than the near-focus light-energy reflector; wherein the near-focus light-energy reflector has a first configuration wherein: the near-focus light-energy reflector receives light beams from the light-energy emitter, the near-focus light-energy reflector reflects the light beams toward the partially-transparent structure (e.g. lens), the partially-transparent structure (e.g. lens) redirects the light beams toward the person's eye, and the light beams display a virtual object at an apparent first distance in the person's field of vision; and wherein the near-focus light-energy reflector has a second configuration wherein: the near-focus light-energy reflector receives light beams from the light-energy emitter, the near-focus light-energy reflector reflects the light beams toward the far-focus light-energy reflector, the far-focus light-energy reflector reflects the light beams toward the partially-transparent structure (e.g. lens), the partially-transparent structure (e.g. lens) redirects the light beams toward the person's eye, and the light beams display a virtual object at an apparent second distance in the person's field of vision wherein the second distance is greater than the first distance.

In an example, a method for augmented reality eyewear can comprise: configuring a lens to be located in front of a person's eye within 4" of the person's eye; using an eye gaze tracker to identify a first location on the lens which is intersected by the person's gaze from that eye during a first period of time; scanning a first plurality of light beams onto the lens in a spiral, circular, radial spoke, sunburst, roulette curve, hypotrochoid, and/or epitrochoid pattern centered on the first location during the first period of time, wherein the first plurality of light beams are redirected by the lens toward the person's eye to display a virtual object in the person's field of vision; using the eye gaze tracker to identify a second location on the lens which is intersected by the person's gaze from that eye during a second period of time; and scanning a second plurality of light beams onto the lens in a spiral, circular, radial spoke, sunburst, roulette curve, hypotrochoid, and/or epitrochoid pattern centered on the second location during the second period of time, wherein the second plurality of light beams are redirected by the lens toward the person's eye to display a virtual object in the person's field of vision.

In an example, a method for augmented reality eyewear can comprise: configuring a lens to be located in front of a person's eye within 4" of the person's eye; identifying a first location on the lens which is central to the person's gaze and/or line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the lens which is central to the person's gaze and/or line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a spoke-and-arc array of optical structures for augmented reality eyewear can comprise: a plurality of radial spokes, wherein a radial spoke further comprises a plurality of adjustable reflective optical elements, and wherein radial spokes extend outward from a central location which is configured to be within 4" in front of a person's eye; a plurality of nested arcs, wherein an arc further comprises a plurality of adjustable reflective optical elements, and wherein arcs are concave with respect to the central location; a first adjustable reflective optical element which is part of a first spoke and a first arc, wherein the first adjustable reflective optical element has a first configuration wherein it is substantially parallel to light rays travelling from the environment toward the person's eye, wherein the first adjustable reflective optical element has a second configuration wherein it intersects light rays traveling from the environment toward the person's eye at an angle within the range of 25 to 65 degrees, and wherein the first adjustable reflective optical element is selectively changed from its first configuration to its second configuration, or vice versa, by the selective transmission of electromagnetic energy through the first spoke and the first arc; and a second adjustable reflective optical element which is part of a second spoke and a second arc, wherein the second adjustable reflective optical element has a first configuration wherein it is substantially parallel to light rays travelling from the environment toward the person's eye, wherein the second adjustable reflective optical element has a second configuration wherein it intersects light rays traveling from the environment toward the person's eye at an angle within the range of 25 to 65 degrees, and wherein the second adjustable reflective optical element is selectively changed from its first configuration to its second configuration, or vice versa, by the selective transmission of electromagnetic energy through the second spoke and the second arc.

In an example, a spoke-and-ring array of optical structures for augmented reality eyewear can comprise: a plurality of radial spokes, wherein a radial spoke further comprises a plurality of adjustable micromirrors, and wherein radial spokes extend outward from a central location which is configured to be within 4" in front of a person's eye; a plurality of concentric rings, wherein a ring further comprises a plurality of adjustable micromirrors, and wherein rings go around the central location; a first adjustable micromirror which is part of a first spoke and a first ring, wherein the first adjustable micromirror has a first configuration wherein it is substantially parallel to light rays travelling from the environment toward the person's eye, wherein the first adjustable micromirror has a second configuration wherein it intersects light rays traveling from the environment toward the person's eye at an angle within the range of 25 to 65 degrees, and wherein the first adjustable micromirror is selectively changed from its first configuration to its second configuration, or vice versa, by the transmission of electromagnetic energy; and a second adjustable micromirror which is part of a second spoke and a second ring, wherein the second adjustable micromirror has a first configuration wherein it is substantially parallel to light rays travelling from the environment toward the person's eye, wherein the second adjustable micromirror has a second configuration wherein it intersects light rays travelling from the environment toward the person's eye at an angle within the range of 25 to 65 degrees, and wherein the second adjustable micromirror is selectively changed from its first configuration to its second configuration, or vice versa, by the transmission of electromagnetic energy.

In an example, augmented reality eyewear can comprise: a plurality of radial spokes, wherein spokes in the plurality of radial spokes extend outward from a central location in front of a person's eye, and wherein spokes in the plurality of radial spokes each further comprise a plurality of reflective optical elements (e.g. mirrors); a plurality of nested rings, wherein rings in the plurality of nested rings encircle the central location, and wherein rings in the plurality of nested rings each further comprise a plurality of reflective optical elements (e.g. mirrors); a first reflective optical element (e.g. mirror) which is part of a first spoke and is part of a first ring, wherein the first reflective optical element (e.g. mirror) has a first configuration wherein it redirects a first amount of environmental light rays near the intersection of the first spoke and first ring away from reaching the person's eye, wherein the first reflective optical element (e.g. mirror) has a second configuration wherein it redirects a second amount of environmental light rays near the intersection of the first spoke and first ring away from reaching the person's eye, wherein the second amount is at least 50% less than the first amount, and wherein the first reflective optical element (e.g. mirror) is selectively changed from its first configuration to its second configuration (or vice versa) by the selective transmission of electromagnetic energy through the first spoke and the first ring; and a second reflective optical element (e.g. mirror) which is part of a second spoke and is part of a second ring, wherein the second reflective optical element (e.g. mirror) has a third configuration wherein it redirects a third amount of environmental light rays near the intersection of the second spoke and second ring away from reaching the person's eye, wherein the second reflective optical element (e.g. mirror) has a fourth configuration wherein it redirects a fourth amount of environmental light rays near the intersection of the second spoke and second ring away from reaching the person's eye, wherein the fourth amount is at least 50% less than the third amount, and wherein the second reflective optical element (e.g. mirror) is selectively changed from its third configuration to its fourth configuration (or vice versa) by the selective transmission of electromagnetic energy through the second spoke and the second ring.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is intersected by the person's gaze and/or line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is intersected by the person's gaze and/or line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is in line with the person's central line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the lens which is in line with the person's central line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a spoke-and-ring array of optical structures for augmented reality eyewear can comprise: a plurality of radial spokes, wherein a radial spoke further comprises a plurality of adjustable micromirrors, and wherein radial spokes extend outward from a central location which is configured to be within 4" in front of a person's eye; a plurality of nested rings, wherein a ring further comprises a plurality of adjustable micromirrors, and wherein rings go around the central location; a first adjustable micromirror which is part of a first spoke and a first ring, wherein the first adjustable micromirror has a first configuration wherein it is substantially parallel to light rays travelling from the environment toward the person's eye, wherein the first adjustable micromirror has a second configuration wherein it intersects light rays traveling from the environment toward the person's eye at a 45-degree angle, and wherein the first adjustable micromirror is selectively changed from its first configuration to its second configuration, or vice versa, by the transmission of electromagnetic energy; and a second adjustable micromirror which is part of a second spoke and a second ring, wherein the second adjustable micromirror has a first configuration wherein it is substantially parallel to light rays travelling from the environment toward the person's eye, wherein the second adjustable micromirror has a second configuration wherein it intersects light rays traveling from the environment toward the person's eye at a 45-degree angle, and wherein the second adjustable micromirror is selectively changed from its first configuration to its second configuration, or vice versa, by the transmission of electromagnetic energy.

In an example, augmented reality eyewear can comprise: a lens which is configured to be in front of a person's eye within 4" of the person's eye; a light-energy emitter; a near-focus mirror; and a far-focus mirror, wherein the distance between the near-focus mirror and the far-focus mirror is at least ½"; wherein the near-focus mirror has a first configuration wherein: the near-focus mirror receives light beams from the light-energy emitter, the near-focus mirror reflects the light beams toward the lens, the lens redirects the light beams toward the person's eye, and the light beams display a virtual object at an apparent first distance in the person's field of vision; and wherein the near-focus mirror has a second configuration wherein: the near-focus mirror receives light beams from the light-energy emitter, the near-focus mirror reflects the light beams toward the far-focus mirror, the far-focus mirror reflects the light beams toward the lens, the lens redirects the light beams toward the person's eye, and the light beams display a virtual object at an apparent second distance in the person's field of vision wherein the second distance is greater than the first distance.

In an example, a method for augmented reality eyewear can comprise: configuring a lens to be located in front of a person's eye within 4" of the person's eye; identifying a first location on the lens which is intersected by the person's gaze from that eye during a first period of time; scanning a first plurality of light beams onto the lens in a spiral pattern centered on the first location during the first period of time, wherein the first plurality of light beams are redirected by the lens toward the person's eye to display a virtual object in the person's field of vision; identifying a second location on the lens which is intersected by the person's gaze from that eye during a second period of time; and scanning a second plurality of light beams onto the lens in a spiral pattern centered on the second location during the second period of time, wherein the second plurality of light beams are redirected by the lens toward the person's eye to display a virtual object in the person's field of vision.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is in line with the person's gaze and/or line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is in line with the person's gaze and/or line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is central to the person's central line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the lens which is central to the person's central line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a spoke-and-ring array of optical structures for augmented reality eyewear can comprise: a plurality of radial spokes, wherein a radial spoke further comprises a plurality of adjustable refractive optical elements, and wherein radial spokes extend outward from a central location which is configured to be within 4" in front of a person's eye; a plurality of concentric rings, wherein a ring further comprises a plurality of adjustable refractive optical elements, and wherein rings go around the central location; a first adjustable refractive optical element which is part of a first spoke and a first ring, wherein the first adjustable refractive optical element has a first configuration wherein it refracts a first level of light rays at the intersection of the spoke and ring travelling from the environment toward the person's eye, wherein the first adjustable refractive optical element has a second configuration wherein it refracts a second level of light rays at the intersection of the spoke and ring travelling from the environment toward the person's eye, wherein the second level is less than 50% of the first level, and wherein the first adjustable refractive optical element is selectively changed from its first configuration to its second configuration, or vice versa, by the transmission of electromagnetic energy; and a second adjustable refractive optical element which is part of a second spoke and a second ring, wherein the second adjustable refractive optical element has a first configuration wherein it refracts a first level of light rays at the intersection of the spoke and ring travelling from the environment toward the person's eye, wherein the second adjustable refractive optical element has a second configuration wherein it refracts a second level of light rays at the intersection of the spoke and ring travelling from the environment toward the person's eye, wherein the second level is less than 50% of the first level, and wherein the second adjustable refractive optical element is selectively changed from its first configuration to its second configuration, or vice versa, by the transmission of electromagnetic energy.

In an example, augmented reality eyewear can comprise: a partially-transparent structure (e.g. lens) which is configured to be in front of a person's eye within 4" of the person's eye; an eye gaze tracker; a light-energy emitter; a near-focus light-energy reflector; and a far-focus light-energy reflector, wherein the distance between the near-focus light-energy reflector and the far-focus light-energy reflector is at least ½", and wherein the far-focus light-energy reflector is closer to the person's ear than the near-focus light-energy reflector; wherein the near-focus light-energy reflector has a first configuration wherein: the near-focus light-energy reflector receives light beams from the light-energy emitter, the near-focus light-energy reflector reflects the light beams toward the partially-transparent structure (e.g. lens), the partially-transparent structure (e.g. lens) redirects the light beams toward the person's eye, and the light beams display a virtual object at an apparent first distance in the person's field of vision; and wherein the near-focus light-energy reflector has a second configuration wherein: the near-focus light-energy reflector receives light beams from the light-energy emitter, the near-focus light-energy reflector reflects the light beams toward the far-focus light-energy reflector, the far-focus light-energy reflector reflects the light beams toward the partially-transparent structure (e.g. lens), the partially-transparent structure (e.g. lens) redirects the light beams toward the person's eye, and the light beams display a virtual object at an apparent second distance in the person's field of vision wherein the second distance is greater than the first distance; and wherein the near-focus light-energy reflector is changed from its first configuration to its second configuration when the person focuses on more distant objects in the real world.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is central to the person's gaze and/or line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is central to the person's gaze and/or line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is intersected by the person's gaze and/or line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the lens which is intersected by the person's gaze and/or line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a spoke-and-ring array of optical structures for augmented reality eyewear can comprise: a plurality of radial spokes, wherein a radial spoke further comprises a plurality of adjustable micromirrors, and wherein radial spokes extend outward from a central location which is configured to be within 4" in front of a person's eye; a plurality of nested rings, wherein a ring further comprises a plurality of adjustable micromirrors, and wherein rings go around the central location; a first adjustable micromirror which is part of a first spoke and a first ring, wherein the first adjustable micromirror has a first configuration wherein it is substantially parallel to light rays travelling from the environment toward the person's eye, wherein the first adjustable micromirror has a second configuration wherein it intersects light rays traveling from the environment toward the person's eye at a 45-degree angle, and wherein the first adjustable micromirror is selectively changed from its first configuration to its second configuration, or vice versa, by the selective transmission of electromagnetic energy through the first spoke and the first ring; and a second adjustable micromirror which is part of a second spoke and a second ring, wherein the second adjustable micromirror has a first configuration wherein it is substantially parallel to light rays travelling from the environment toward the person's eye, wherein the second adjustable micromirror has a second configuration wherein it intersects light rays traveling from the environment toward the person's eye at a 45-degree angle, and wherein the second adjustable micromirror is selectively changed from its first configuration to its second configuration, or vice versa, by the selective transmission of electromagnetic energy through the second spoke and the second ring.

In an example, augmented reality eyewear can comprise: a lens which is configured to be in front of a person's eye within 4" of the person's eye; an eye gaze tracker; a light-energy emitter; a near-focus mirror; and a far-focus mirror, wherein the distance between the near-focus mirror and the far-focus mirror is at least ½" and wherein the far-focus light-energy reflector is closer to the person's ear than the near-focus light-energy reflector; wherein the near-focus mirror has a first configuration wherein: the near-focus mirror receives light beams from the light-energy emitter, the near-focus mirror reflects the light beams toward the lens, the lens redirects the light beams toward the person's eye, and the light beams display a virtual object at an apparent first distance in the person's field of vision; and wherein the near-focus mirror has a second configuration wherein: the near-focus mirror receives light beams from the light-energy emitter, the near-focus mirror reflects the light beams toward the far-focus mirror, the far-focus mirror reflects the light beams toward the lens, the lens redirects the light beams toward the person's eye, and the light beams display a virtual object at an apparent second distance in the person's field of vision wherein the second distance is greater than the first distance; and wherein the near-focus mirror is changed from its first configuration to its second configuration when the person focuses on more distant objects in the real world.

In an example, a method for augmented reality eyewear can comprise: configuring a lens to be located in front of a person's eye within 4" of the person's eye; identifying a first location on the lens which is central to the person's gaze from that eye during a first period of time; scanning a first plurality of light beams onto the lens in a radial spoke pattern centered on the first location during the first period of time, wherein the first plurality of light beams are redirected by the lens toward the person's eye to display a virtual object in the person's field of vision; identifying a second location on the lens which is central to the person's gaze from that eye during a second period of time; and scanning a second plurality of light beams onto the lens in a radial spoke pattern centered on the second location during the second period of time, wherein the second plurality of light beams are redirected by the lens toward the person's eye to display a virtual object in the person's field of vision.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is intersected by the person's central line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is intersected by the person's central line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a spoke-and-arc array of optical structures for augmented reality eyewear can comprise: a plurality of radial spokes, wherein a radial spoke further comprises a plurality of adjustable refractive optical elements, and wherein radial spokes extend outward from a central location which is configured to be within 4" in front of a person's eye; a plurality of nested arcs, wherein an arc further comprises a plurality of adjustable refractive optical elements, and wherein arcs are concave with respect to the central location; a first adjustable refractive optical element which is part of a first spoke and a first arc, wherein the first adjustable refractive optical element has a first configuration wherein it refracts a first level of light rays at the intersection of the spoke and ring travelling from the environment toward the person's eye, wherein the first adjustable refractive optical element has a second configuration wherein it refracts a second level of light rays at the intersection of the spoke and ring travelling from the environment toward the person's eye, wherein the second level is less than 50% of the first level, and wherein the first adjustable refractive optical element is selectively changed from its first configuration to its second configuration, or vice versa, by the transmission of electromagnetic energy; and a second adjustable refractive optical element which is part of a second spoke and a second arc, wherein the second adjustable refractive optical element has a first configuration wherein it refracts a first level of light rays at the intersection of the spoke and ring travelling from the environment toward the person's eye, wherein the second adjustable refractive optical element has a second configuration wherein it refracts a second level of light rays at the intersection of the spoke and ring travelling from the environment toward the person's eye, wherein the second level is less than 50% of the first level, and wherein the second adjustable refractive optical element is selectively changed from its first configuration to its second configuration, or vice versa, by the transmission of electromagnetic energy.

In an example, a spoke-and-ring array of optical structures for augmented reality eyewear can comprise: a plurality of radial spokes, wherein a radial spoke further comprises a plurality of adjustable reflective optical elements, and wherein radial spokes extend outward from a central location which is configured to be within 4" in front of a person's eye; a plurality of concentric rings, wherein a ring further comprises a plurality of adjustable reflective optical elements, and wherein rings go around the central location; a first adjustable reflective optical element which is part of a first spoke and a first ring, wherein the first adjustable reflective optical element has a first configuration wherein it is substantially parallel to light rays travelling from the environment toward the person's eye, wherein the first adjustable reflective optical element has a second configuration wherein it intersects light rays traveling from the environment toward the person's eye at an angle within the range of 25 to 65 degrees, and wherein the first adjustable reflective optical element is selectively changed from its first configuration to its second configuration, or vice versa, by the transmission of electromagnetic energy; and a second adjustable reflective optical element which is part of a second spoke and a second ring, wherein the second adjustable reflective optical element has a first configuration wherein it is substantially parallel to light rays travelling from the environment toward the person's eye, wherein the second adjustable reflective optical element has a second configuration wherein it intersects light rays traveling from the environment toward the person's eye at an angle within the range of 25 to 65 degrees, and wherein the second adjustable reflective optical element is selectively changed from its first configuration to its second configuration, or vice versa, by the transmission of electromagnetic energy.

In an example, augmented reality eyewear can comprise: a partially-transparent structure (e.g. lens) which is configured to be in front of a person's eye within 4" of the person's eye; a light-energy emitter; a near-focus light-energy reflector; and a far-focus light-energy reflector; wherein the near-focus light-energy reflector is located to one side (e.g. left or right) of the person's eye and the far-focus light-energy reflector is located on the other side (e.g. right or left) of the person's eye; wherein the near-focus light-energy reflector has a first configuration wherein: the near-focus light-energy reflector receives light beams from the light-energy emitter, the near-focus light-energy reflector reflects the light beams toward the partially-transparent structure (e.g. lens), the partially-transparent structure (e.g. lens) redirects the light beams toward the person's eye, and the light beams display a virtual object at an apparent first distance in the person's field of vision; and wherein the near-focus light-energy reflector has a second configuration wherein: the near-focus light-energy reflector receives light beams from the light-energy emitter, the near-focus light-energy reflector reflects the light beams toward the far-focus light-energy reflector, the far-focus light-energy reflector reflects the light beams toward the partially-transparent structure (e.g. lens), the partially-transparent structure (e.g. lens) redirects the light beams toward the person's eye, and the light beams display a virtual object at an apparent second distance in the person's field of vision wherein the second distance is greater than the first distance.

In an example, a method for augmented reality eyewear can comprise: configuring a partially-transparent structure (e.g. lens) to be located in front of a person's eye within 4" of the person's eye; identifying a first location on the partially-transparent structure (e.g. lens) which is intersected by the person's central line-of-sight from that eye during a first period of time; moving a first plurality of light beams onto the partially-transparent structure (e.g. lens) in an arcuate (e.g. spiral, circular, radial spoke, sunburst, roulette curve, hypotrochoid, and/or epitrochoid) pattern around the first location during the first period of time, wherein the first plurality of light beams are redirected by the partially-transparent structure (e.g. lens) toward the person's eye to display a virtual object in the person's field of vision; identifying a second location on the partially-transparent structure (e.g. lens) which is intersected by the person's central line-of-sight from that eye during a second period of time; and moving a second plurality of light beams onto the partially-transparent structure (e.g. lens) in an arcuate (e.g. spiral, circular, radial spoke, sunburst, roulette curve, hypotrochoid, and/or epitrochoid) pattern around the second location during the second period of time, wherein the second plurality of light beams are redirected by the partially-transparent structure (e.g. lens) toward the person's eye to display a virtual object in the person's field of vision.

In an example, a method for augmented reality eyewear can comprise: configuring a lens to be located in front of a person's eye within 4" of the person's eye; identifying a first location on the lens which is in line with the person's gaze and/or line-of-sight from that eye during a first period of time; scanning a first plurality of light beams onto the partially-transparent structure (e.g. lens) in an arcuate (e.g. spiral, circular, radial spoke, sunburst, roulette curve, hypotrochoid, and/or epitrochoid) pattern which is centered on the first location during the first period of time, wherein the first plurality of light beams are redirected by the partially-transparent structure (e.g. lens) toward the person's eye to display a virtual object in the person's field of vision; identifying a second location on the lens which is in line with the person's gaze and/or line-of-sight from that eye during a second period of time; and scanning a second plurality of light beams onto the partially-transparent structure (e.g. lens) in an arcuate (e.g. spiral, circular, radial spoke, sunburst, roulette curve, hypotrochoid, and/or epitrochoid) pattern which is centered on the second location during the second period of time, wherein the second plurality of light beams are redirected by the partially-transparent structure (e.g. lens) toward the person's eye to display a virtual object in the person's field of vision.

In an example, a spoke-and-ring array of optical structures for augmented reality eyewear can comprise: a plurality of radial spokes, wherein a radial spoke further comprises a plurality of adjustable reflective optical elements, and wherein radial spokes extend outward from a central location which is configured to be within 4" in front of a person's eye; a plurality of nested rings, wherein a ring further comprises a plurality of adjustable reflective optical elements, and wherein rings go around the central location; a first adjustable reflective optical element which is part of a first spoke and a first ring, wherein the first adjustable reflective optical element has a first configuration wherein it is substantially parallel to light rays travelling from the environment toward the person's eye, wherein the first adjustable reflective optical element has a second configuration wherein it intersects light rays traveling from the environment toward the person's eye at a 45-degree angle, and wherein the first adjustable reflective optical element is selectively changed from its first configuration to its second configuration, or vice versa, by the selective transmission of electromagnetic energy through the first spoke and the first ring; and a second adjustable reflective optical element which is part of a second spoke and a second ring, wherein the second adjustable reflective optical element has a first configuration wherein it is substantially parallel to light rays travelling from the environment toward the person's eye, wherein the second adjustable reflective optical element has a second configuration wherein it intersects light rays traveling from the environment toward the person's eye at a 45-degree angle, and wherein the second adjustable reflective optical element is selectively changed from its first configuration to its second configuration, or vice versa, by the selective transmission of electromagnetic energy through the second spoke and the second ring.

In an example, augmented reality eyewear can comprise: a lens which is configured to be in front of a person's eye within 4" of the person's eye; an eye gaze tracker; a light-energy emitter; a near-focus mirror; and a far-focus mirror, wherein the distance between the near-focus mirror and the far-focus mirror is at least ½"; wherein the near-focus mirror has a first configuration wherein: the near-focus mirror receives light beams from the light-energy emitter, the near-focus mirror reflects the light beams toward the lens, the lens redirects the light beams toward the person's eye, and the light beams display a virtual object at an apparent first distance in the person's field of vision; and wherein the near-focus mirror has a second configuration wherein: the near-focus mirror receives light beams from the light-energy emitter, the near-focus mirror reflects the light beams toward the far-focus mirror, the far-focus mirror reflects the light beams toward the lens, the lens redirects the light beams toward the person's eye, and the light beams display a virtual object at an apparent second distance in the person's field of vision wherein the second distance is greater than the first distance; and wherein the near-focus mirror is changed from its first configuration to its second configuration when the person focuses on more distant objects in the real world.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the array of movable light reflectors, wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the array of movable light reflectors, wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration in order to display a second portion of a virtual image in the person's field of view; and wherein the first and second movable light reflectors (e.g. micromirrors) can be moved independently of each other in order to selectively show the (portion of the) virtual image at a first location, the (portion of the) virtual image at a second location, or both.

In an example, an optical structure for one eye of smart eyewear can comprise: an oscillating and/or vibrating light-energy emitter which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the light-energy emitter toward the person's eye, and wherein the first movable light reflector can be selectively moved from its first configuration to its second configuration at a first time in order to display a first portion of a virtual image in the person's field of view at the first time; and a second movable light reflector (e.g. micromirror) in the array of movable light reflectors, wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the light-energy emitter toward the person's eye, and wherein the second movable light reflector can be selectively moved from its third configuration to its fourth configuration at a second time in order to display a second portion of a virtual image in the person's field of view at the second time.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration by sliding and/or shifting the transparent optical structure (e.g. lens) in order to display a first portion of a virtual image in the person's field of view; and a second movable light reflector (e.g. micromirror) in the array of movable light reflectors, wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration by sliding and/or shifting the transparent optical structure (e.g. lens) in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the array of movable light reflectors, wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration in order to display a second portion of a virtual image in the person's field of view; and wherein the first and second movable light reflectors (e.g. micromirrors) can be moved independently of each other in order to show (a portion of) a virtual image in a first location, to show (a portion of) a virtual image in a second location, or to show (portions of) a virtual image in both first and second locations.

In an example, an optical structure for one eye of smart eyewear can comprise: a virtual image display which emits light rays which form virtual images in a person's field of vision, wherein the virtual image display is configured to be worn above the person's eye; a transparent optical structure (e.g. lens) which is configured to be worn within 4" in front of the person's eye; an array of (parallel) horizontal movable light reflectors (e.g. micromirrors) which is part of, or attached to, the transparent optical structure, wherein movable light reflectors (e.g. micromirrors) in a central portion of the array are closer together than movable light reflectors (e.g. micromirrors) in peripheral portions of the array; a first movable light reflector (e.g. micromirror) in the array of (parallel) horizontal movable light reflectors (e.g. micromirrors), wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the array of (parallel) horizontal movable light reflectors (e.g. micromirrors), wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration by the transmission of electromagnetic energy in order to display a first portion of a virtual image in the person's field of view; and a second movable light reflector (e.g. micromirror) in the array of movable light reflectors, wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration by the transmission of electromagnetic energy in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the plane which best fits a side of the first movable light reflector is substantially parallel to light rays from the person's environment, wherein the first movable light reflector has a second configuration in which the plane which best fits the side of the first movable light reflector intersects the light rays from the person's environment at an angle within the range of 30 to 90 degrees and in which the side of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the array of movable light reflectors, wherein the second movable light reflector has a third configuration in which the plane which best fits a side of the second movable light reflector is substantially parallel to light rays from the person's environment, wherein the second movable light reflector has a fourth configuration in which the plane which best fits the side of the second movable light reflector intersects the light rays from the person's environment at an angle within the range of 30 to 90 degrees and in which the side of the second movable light reflector reflects light rays from the virtual image display toward the person's eye, and wherein the second movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of at least 100 movable light reflectors (e.g. micromirrors) which is part of, or attached to, the transparent optical structure; a first movable light reflector (e.g. micromirror) in the array of movable light reflectors, wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the array of movable light reflectors, wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of arcuate movable light reflectors (e.g. micromirrors) which is part of, or attached to, the transparent optical structure; a first arcuate movable light reflector (e.g. micromirror) in the array of arcuate movable light reflectors (e.g. micromirrors), wherein the first arcuate movable light reflector has a first configuration in which the plane which best fits a surface of the first arcuate movable light reflector is substantially parallel to light rays from the person's environment, wherein the first arcuate movable light reflector has a second configuration in which the plane which best fits a surface of the first arcuate movable light reflector intersects the light rays from the person's environment at an angle within the range of 30 to 90 degrees and in which a surface of the first arcuate movable light reflector reflects light rays from the virtual image display toward the person's eye, and wherein the first arcuate movable light reflector can be selectively moved from its first configuration to its second configuration in order to display a first portion of a virtual image in the person's field of view; and a second arcuate movable light reflector (e.g. micromirror) in the array of arcuate movable light reflectors (e.g. micromirrors), wherein the second arcuate movable light reflector has a third configuration in which the plane which best fits a surface of the second arcuate movable light reflector is substantially parallel to light rays from the person's environment, wherein the second arcuate movable light reflector has a fourth configuration in which the plane which best fits a surface of the second arcuate movable light reflector intersects the light rays from the person's environment at an angle within the range of 30 to 90 degrees and in which a surface of the second arcuate movable light reflector reflects light rays from the virtual image display toward the person's eye, and wherein the second arcuate movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration by a change in an electromagnetic field in order to display a first portion of a virtual image in the person's field of view; and a second movable light reflector (e.g. micromirror) in the array of movable light reflectors, wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration by a change in an electromagnetic field in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of nested arcuate movable light reflectors (e.g. micromirrors) which is part of, or attached to, the transparent optical structure; a first arcuate movable light reflector (e.g. micromirror) in the array of nested arcuate movable light reflectors (e.g. micromirrors), wherein the first arcuate movable light reflector has a first configuration in which the plane which best fits a surface of the first arcuate movable light reflector is substantially parallel to light rays from the person's environment, wherein the first arcuate movable light reflector has a second configuration in which the plane which best fits a surface of the first arcuate movable light reflector intersects the light rays from the person's environment at an angle within the range of 30 to 90 degrees and in which a surface of the first arcuate movable light reflector reflects light rays from the virtual image display toward the person's eye, and wherein the first arcuate movable light reflector can be selectively moved from its first configuration to its second configuration in order to display a first portion of a virtual image in the person's field of view; and a second arcuate movable light reflector (e.g. micromirror) in the array of nested arcuate movable light reflectors (e.g. micromirrors), wherein the second arcuate movable light reflector has a third configuration in which the plane which best fits a surface of the second arcuate movable light reflector is substantially parallel to light rays from the person's environment, wherein the second arcuate movable light reflector has a fourth configuration in which the plane which best fits a surface of the second arcuate movable light reflector intersects the light rays from the person's environment at an angle within the range of 30 to 90 degrees and in which a surface of the second arcuate movable light reflector reflects light rays from the virtual image display toward the person's eye, and wherein the second arcuate movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively tilted or rotated from its first configuration to its second configuration in order to display a first portion of a virtual image in the person's field of view; and a second movable light reflector (e.g. micromirror) in the array of movable light reflectors, wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively tilted or rotated from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of convex movable light reflectors (e.g. micromirrors) which is part of, or attached to, the transparent optical structure; a first convex movable light reflector (e.g. micromirror) in the array of convex movable light reflectors (e.g. micromirrors), wherein the first convex movable light reflector has a first configuration in which the plane which best fits a surface of the first convex movable light reflector is substantially parallel to light rays from the person's environment, wherein the first convex movable light reflector has a second configuration in which the plane which best fits a surface of the first convex movable light reflector intersects the light rays from the person's environment at an angle within the range of 30 to 90 degrees and in which a surface of the first convex movable light reflector reflects light rays from the virtual image display toward the person's eye, and wherein the first convex movable light reflector can be selectively moved from its first configuration to its second configuration in order to display a first portion of a virtual image in the person's field of view; and a second convex movable light reflector (e.g. micromirror) in the array of convex movable light reflectors (e.g. micromirrors), wherein the second convex movable light reflector has a third configuration in which the plane which best fits a surface of the second convex movable light reflector is substantially parallel to light rays from the person's environment, wherein the second convex movable light reflector has a fourth configuration in which the plane which best fits a surface of the second convex movable light reflector intersects the light rays from the person's environment at an angle within the range of 30 to 90 degrees and in which a surface of the second convex movable light reflector reflects light rays from the virtual image display toward the person's eye, and wherein the second convex movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively tilted or rotated from its first configuration to its second configuration by a change in an electromagnetic field in order to display a first portion of a virtual image in the person's field of view; and a second movable light reflector (e.g. micromirror) in the array of movable light reflectors, wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively tilted or rotated from its third configuration to its fourth configuration by a change in an electromagnetic field in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the first movable light reflector intersects a horizontal plane at a first angle, wherein the first movable light reflector has a second configuration in which the first movable light reflector intersects a horizontal plane at a second angle, wherein the first movable light reflector (e.g. micromirror) allows environment light rays to reach the person's eye through a first area of the transparent optical structure (e.g. lens) when the first movable light reflector (e.g. micromirror) is in its first configuration, wherein the first movable light reflector (e.g. micromirror) substantially blocks environmental light rays from reaching the person's eye through the first area of the transparent optical structure (e.g. lens) when the first movable light reflector (e.g. micromirror) is in its second configuration, and wherein the first movable light reflector reflects light rays from the virtual image display toward the person's eye when the first movable light reflector (e.g. micromirror) is in its second configuration; and a second movable light reflector (e.g. micromirror) in the array of movable light reflectors, wherein the second movable light reflector has a third configuration in which the second movable light reflector intersects a horizontal plane at a third angle, wherein the third angle is different than the first angle by at least 10 degrees, wherein the second movable light reflector has a fourth configuration in which the second movable light reflector intersects a horizontal plane at a fourth angle, wherein the fourth angle is different than the second angle by at least 10 degrees, wherein the second movable light reflector (e.g. micromirror) allows environment light rays to reach the person's eye through a second area of the transparent optical structure (e.g. lens) when the second movable light reflector (e.g. micromirror) is in its third configuration, wherein the second movable light reflector (e.g. micromirror) substantially blocks environmental light rays from reaching the person's eye through the second area of the transparent optical structure (e.g. lens) when the second movable light reflector (e.g. micromirror) is in its fourth configuration, and wherein the second movable light reflector reflects light rays from the virtual image display toward the person's eye when the second movable light reflector (e.g. micromirror) is in its fourth configuration.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; a nested array of rings of movable light reflectors (e.g. micromirrors) which is part of, or attached to, the transparent optical structure, wherein movable light reflectors are closer to each other in a central portion of the nested array than in peripheral portions of the array; a first movable light reflector (e.g. micromirror) in the array of movable light reflectors, wherein the first movable light reflector has a first configuration which allows most of the light from the person's environment to reach the person's eye through a first area of the transparent optical structure and does not reflect light rays from the virtual image display toward the person's eye, wherein the first movable light reflector has a second configuration which blocks most of the light from the person's environment from reaching the person's eye through the first area and reflects light rays from the virtual image display toward the person's eye from the first area, and wherein the first movable light reflector can be selectively tilted or rotated from its first configuration to its second configuration by transmission of electromagnetic energy; and a second movable light reflector (e.g. micromirror) in the array of movable light reflectors, wherein the second movable light reflector has a third configuration which allows most of the light from the person's environment to reach the person's eye through a second area of the transparent optical structure and does not reflect light rays from the virtual image display toward the person's eye, wherein the second movable light reflector has a fourth configuration which blocks most of the light from the person's environment from reaching the person's eye through the second area and reflects light rays from the virtual image display toward the person's eye from the second area, and wherein the second movable light reflector can be selectively tilted or rotated from its third configuration to its fourth configuration by transmission of electromagnetic energy.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of concave movable light reflectors (e.g. micromirrors) which is part of, or attached to, the transparent optical structure; a first concave movable light reflector (e.g. micromirror) in the array of concave movable light reflectors (e.g. micromirrors), wherein the first concave movable light reflector has a first configuration in which the plane which best fits a surface of the first concave movable light reflector is substantially parallel to light rays from the person's environment, wherein the first concave movable light reflector has a second configuration in which the plane which best fits a surface of the first concave movable light reflector intersects the light rays from the person's environment at an angle within the range of 30 to 90 degrees and in which a surface of the first concave movable light reflector reflects light rays from the virtual image display toward the person's eye, and wherein the first concave movable light reflector can be selectively moved from its first configuration to its second configuration in order to display a first portion of a virtual image in the person's field of view; and a second concave movable light reflector (e.g. micromirror) in the array of concave movable light reflectors (e.g. micromirrors), wherein the second concave movable light reflector has a third configuration in which the plane which best fits a surface of the second concave movable light reflector is substantially parallel to light rays from the person's environment, wherein the second concave movable light reflector has a fourth configuration in which the plane which best fits a surface of the second concave movable light reflector intersects the light rays from the person's environment at an angle within the range of 30 to 90 degrees and in which a surface of the second concave movable light reflector reflects light rays from the virtual image display toward the person's eye, and wherein the second concave movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the plane which best fits a first surface of the first movable light reflector is substantially parallel to light rays from the person's environment, wherein the first movable light reflector has a second configuration in which the plane which best fits the first surface of the first movable light reflector intersects the light rays from the person's environment at an angle within the range of 30 to 90 degrees and in which a second surface of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the array of movable light reflectors, wherein the second movable light reflector has a third configuration in which the plane which best fits a first surface of the second movable light reflector is substantially parallel to light rays from the person's environment, wherein the second movable light reflector has a fourth configuration in which the plane which best fits the first surface of the second movable light reflector intersects the light rays from the person's environment at an angle within the range of 30 to 90 degrees and in which a second surface of the second movable light reflector reflects light rays from the virtual image display toward the person's eye, and wherein the second movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; a row-by-column grid of movable light reflectors (e.g. micromirrors) which is part of, or attached to, the transparent optical structure; a first movable light reflector (e.g. micromirror) in the row-by-column grid of movable light reflectors (e.g. micromirrors), wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the row-by-column grid of movable light reflectors (e.g. micromirrors), wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; a spoke-and-ring array of movable light reflectors (e.g. micromirrors) which is part of, or attached to, the transparent optical structure; a first movable light reflector (e.g. micromirror) in the spoke-and-ring array of movable light reflectors (e.g. micromirrors), wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the spoke-and-ring array of movable light reflectors (e.g. micromirrors), wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration by an electromagnetic pulse in order to display a first portion of a virtual image in the person's field of view; and a second movable light reflector (e.g. micromirror) in the array of movable light reflectors, wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration by an electromagnetic pulse in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration by a wave of acoustic energy in order to display a first portion of a virtual image in the person's field of view; and a second movable light reflector (e.g. micromirror) in the array of movable light reflectors, wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration by a wave of acoustic energy in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the first movable light reflector intersects the distal surface of the transparent optical structure (e.g. lens) at a first angle, wherein the first movable light reflector has a second configuration in which the first movable light reflector intersects the distal surface of the transparent optical structure (e.g. lens) at a second angle, wherein the first movable light reflector (e.g. micromirror) allows environment light rays to reach the person's eye through a first area of the transparent optical structure (e.g. lens) when the first movable light reflector (e.g. micromirror) is in its first configuration, wherein the first movable light reflector (e.g. micromirror) substantially blocks environmental light rays from reaching the person's eye through the first area of the transparent optical structure (e.g. lens) when the first movable light reflector (e.g. micromirror) is in its second configuration, and wherein the first movable light reflector reflects light rays from the virtual image display toward the person's eye when the first movable light reflector (e.g. micromirror) is in its second configuration; and a second movable light reflector (e.g. micromirror) in the array of movable light reflectors, wherein the second movable light reflector has a third configuration in which the second movable light reflector intersects the distal surface of the transparent optical structure (e.g. lens) at a third angle, wherein the third angle is different than the first angle by at least 10 degrees, wherein the second movable light reflector has a fourth configuration in which the second movable light reflector intersects the distal surface of the transparent optical structure (e.g. lens) at a fourth angle, wherein the fourth angle is different than the second angle by at least 10 degrees, wherein the second movable light reflector (e.g. micromirror) allows environment light rays to reach the person's eye through a second area of the transparent optical structure (e.g. lens) when the second movable light reflector (e.g. micromirror) is in its third configuration, wherein the second movable light reflector (e.g. micromirror) substantially blocks environmental light rays from reaching the person's eye through the second area of the transparent optical structure (e.g. lens) when the second movable light reflector (e.g. micromirror) is in its fourth configuration, and wherein the second movable light reflector reflects light rays from the virtual image display toward the person's eye when the second movable light reflector (e.g. micromirror) is in its fourth configuration.

In an example, an optical structure for one eye of smart eyewear can comprise: a virtual image display which emits light rays which form virtual images in a person's field of vision, wherein the virtual image display is configured to be worn to the left or to the right of the person's eye; a transparent optical structure (e.g. lens) which is configured to be worn within 4" in front of the person's eye; a vertically-structured array of movable light reflectors (e.g. micromirrors) which is part of, or attached to, the transparent optical structure; a first movable light reflector (e.g. micromirror) in the vertically-structured array of movable light reflectors (e.g. micromirrors), wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the vertically-structured array of movable light reflectors (e.g. micromirrors), wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure, wherein movable light reflectors (e.g. micromirrors) in a central portion of the array are closer together than movable light reflectors (e.g. micromirrors) in peripheral portions of the array; a first movable light reflector (e.g. micromirror) in the array of movable light reflectors, wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the array of movable light reflectors, wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration In an example, an optical structure for one eye of smart eyewear can comprise: a virtual image display which emits light rays which form virtual images in a person's field of vision, wherein the virtual image display is configured to be worn above the person's eye; a transparent optical structure (e.g. lens) which is configured to be worn within 4" in front of the person's eye; a horizontally-structured array of movable light reflectors (e.g. micromirrors) which is part of, or attached to, the transparent optical structure; a first movable light reflector (e.g. micromirror) in the horizontally-structured array of movable light reflectors (e.g. micromirrors), wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the horizontally-structured array of movable light reflectors (e.g. micromirrors), wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the plane which best fits a first side of the first movable light reflector is substantially parallel to light rays from the person's environment, wherein the first movable light reflector has a second configuration in which the plane which best fits the first side of the first movable light reflector intersects the light rays from the person's environment at an angle within the range of 30 to 90 degrees and in which a second side of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the array of movable light reflectors, wherein the second movable light reflector has a third configuration in which the plane which best fits a first side of the second movable light reflector is substantially parallel to light rays from the person's environment, wherein the second movable light reflector has a fourth configuration in which the plane which best fits the first side of the second movable light reflector intersects the light rays from the person's environment at an angle within the range of 30 to 90 degrees and in which a second side of the second movable light reflector reflects light rays from the virtual image display toward the person's eye, and wherein the second movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of hexagonal movable light reflectors (e.g. micromirrors) which is part of, or attached to, the transparent optical structure; a first hexagonal movable light reflector (e.g. micromirror) in the array of hexagonal movable light reflectors (e.g. micromirrors), wherein the first hexagonal movable light reflector has a first configuration in which the plane which best fits a surface of the first hexagonal movable light reflector is substantially parallel to light rays from the person's environment, wherein the first hexagonal movable light reflector has a second configuration in which the plane which best fits a surface of the first hexagonal movable light reflector intersects the light rays from the person's environment at an angle within the range of 30 to 90 degrees and in which a surface of the first hexagonal movable light reflector reflects light rays from the virtual image display toward the person's eye, and wherein the first hexagonal movable light reflector can be selectively moved from its first configuration to its second configuration in order to display a first portion of a virtual image in the person's field of view; and a second hexagonal movable light reflector (e.g. micromirror) in the array of hexagonal movable light reflectors (e.g. micromirrors), wherein the second hexagonal movable light reflector has a third configuration in which the plane which best fits a surface of the second hexagonal movable light reflector is substantially parallel to light rays from the person's environment, wherein the second hexagonal movable light reflector has a fourth configuration in which the plane which best fits a surface of the second hexagonal movable light reflector intersects the light rays from the person's environment at an angle within the range of 30 to 90 degrees and in which a surface of the second hexagonal movable light reflector reflects light rays from the virtual image display toward the person's eye, and wherein the second hexagonal movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision, wherein the virtual image display is configured to be worn to the left or to the right of the person's eye; a transparent optical structure (e.g. lens) which is configured to be worn within 4" in front of the person's eye; an array of (parallel) vertical movable light reflectors (e.g. micromirrors) which is part of, or attached to, the transparent optical structure; a first movable light reflector (e.g. micromirror) in the array of (parallel) vertical movable light reflectors (e.g. micromirrors), wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the array of (parallel) vertical movable light reflectors (e.g. micromirrors), wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration which allows most of the light from the person's environment to reach the person's eye through a first area of the transparent optical structure and does not reflect light rays from the virtual image display toward the person's eye, wherein the first movable light reflector has a second configuration which blocks most of the light from the person's environment from reaching the person's eye through the first area and reflects light rays from the virtual image display toward the person's eye from the first area, and wherein the first movable light reflector can be selectively moved from its first configuration to its second configuration; and a second movable light reflector (e.g. micromirror) in the array of movable light reflectors, wherein the second movable light reflector has a third configuration which allows most of the light from the person's environment to reach the person's eye through a second area of the transparent optical structure and does not reflect light rays from the virtual image display toward the person's eye, wherein the second movable light reflector has a fourth configuration which blocks most of the light from the person's environment from reaching the person's eye through the second area and reflects light rays from the virtual image display toward the person's eye from the second area, and wherein the second movable light reflector can be selectively moved from its third configuration to its fourth configuration.

In an example, an optical structure for one eye of smart eyewear can comprise: a virtual image display which emits light rays which form virtual images in a person's field of vision, wherein the virtual image display is configured to be worn to the left or to the right of the person's eye; a transparent optical structure (e.g. lens) which is configured to be worn within 4" in front of the person's eye; an array of (parallel) vertical movable light reflectors (e.g. micromirrors) which is part of, or attached to, the transparent optical structure, wherein movable light reflectors (e.g. micromirrors) in a central portion of the array are closer together than movable light reflectors (e.g. micromirrors) in peripheral portions of the array; a first movable light reflector (e.g. micromirror) in the array of (parallel) vertical movable light reflectors (e.g. micromirrors), wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the array of (parallel) vertical movable light reflectors (e.g. micromirrors), wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye, wherein the transparent optical structure further comprises multiple transparent portions which can be moved relative to each other; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration by moving one or more of the multiple transparent portions relative to each other; and a second movable light reflector (e.g. micromirror) in the array of movable light reflectors, wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration by moving one or more of the multiple transparent portions relative to each other.

In an example, an optical structure for one eye of smart eyewear can comprise: a virtual image display which emits light rays which form virtual images in a person's field of vision, wherein the virtual image display is configured to be worn above the person's eye; a transparent optical structure (e.g. lens) which is configured to be worn within 4" in front of the person's eye; an array of (parallel) horizontal movable light reflectors (e.g. micromirrors) which is part of, or attached to, the transparent optical structure; a first movable light reflector (e.g. micromirror) in the array of (parallel) horizontal movable light reflectors (e.g. micromirrors), wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the array of (parallel) horizontal movable light reflectors (e.g. micromirrors), wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration which allows most of the light from the person's environment to reach the person's eye through a first area of the transparent optical structure and does not reflect light rays from the virtual image display toward the person's eye, wherein the first movable light reflector has a second configuration which blocks most of the light from the person's environment from reaching the person's eye through the first area and reflects light rays from the virtual image display toward the person's eye from the first area, and wherein the first movable light reflector can be selectively tilted or rotated from its first configuration to its second configuration by transmission of electromagnetic energy; and a second movable light reflector (e.g. micromirror) in the array of movable light reflectors, wherein the second movable light reflector has a third configuration which allows most of the light from the person's environment to reach the person's eye through a second area of the transparent optical structure and does not reflect light rays from the virtual image display toward the person's eye, wherein the second movable light reflector has a fourth configuration which blocks most of the light from the person's environment from reaching the person's eye through the second area and reflects light rays from the virtual image display toward the person's eye from the second area, and wherein the second movable light reflector can be selectively tilted or rotated from its third configuration to its fourth configuration by transmission of electromagnetic energy.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the first movable light reflector intersects a person's line-of-sight vector at a first angle, wherein the first movable light reflector has a second configuration in which the first movable light reflector intersects the person's line-of-sight vector at a second angle, wherein the first movable light reflector (e.g. micromirror) allows environment light rays to reach the person's eye through a first area of the transparent optical structure (e.g. lens) when the first movable light reflector (e.g. micromirror) is in its first configuration, wherein the first movable light reflector (e.g. micromirror) substantially blocks environmental light rays from reaching the person's eye through the first area of the transparent optical structure (e.g. lens) when the first movable light reflector (e.g. micromirror) is in its second configuration, and wherein the first movable light reflector reflects light rays from the virtual image display toward the person's eye when the first movable light reflector (e.g. micromirror) is in its second configuration; and a second movable light reflector (e.g. micromirror) in the array of movable light reflectors, wherein the second movable light reflector has a third configuration in which the second movable light reflector intersects a person's line-of-sight vector at a third angle, wherein the third angle is different than the first angle by at least 10 degrees, wherein the second movable light reflector has a fourth configuration in which the second movable light reflector intersects the person's line-of-sight vector at a fourth angle, wherein the fourth angle is different than the second angle by at least 10 degrees, wherein the second movable light reflector (e.g. micromirror) allows environment light rays to reach the person's eye through a second area of the transparent optical structure (e.g. lens) when the second movable light reflector (e.g. micromirror) is in its third configuration, wherein the second movable light reflector (e.g. micromirror) substantially blocks environmental light rays from reaching the person's eye through the second area of the transparent optical structure (e.g. lens) when the second movable light reflector (e.g. micromirror) is in its fourth configuration, and wherein the second movable light reflector reflects light rays from the virtual image display toward the person's eye when the second movable light reflector (e.g. micromirror) is in its fourth configuration.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration at a first time in order to display a first portion of a virtual image in the person's field of view at the first time; and a second movable light reflector (e.g. micromirror) in the array of movable light reflectors, wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration at a second time in order to display a second portion of a virtual image in the person's field of view at the second time.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; a row-by-column grid of movable light reflectors (e.g. micromirrors) which is part of, or attached to, the transparent optical structure, wherein rows and/or columns are closer together toward the center of the grid so that movable light reflectors (e.g. micromirrors) are smaller and/or more-dense in the center of the grid; a first movable light reflector (e.g. micromirror) in the row-by-column grid of movable light reflectors (e.g. micromirrors), wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the row-by-column grid of movable light reflectors (e.g. micromirrors), wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the plane which best fits a first surface of the first movable light reflector is substantially parallel to light rays from the person's environment, wherein the first movable light reflector has a second configuration in which the plane which best fits the first surface of the first movable light reflector intersects the light rays from the person's environment at an angle within the range of 30 to 90 degrees and in which a reflective second surface of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the array of movable light reflectors, wherein the second movable light reflector has a third configuration in which the plane which best fits a first surface of the second movable light reflector is substantially parallel to light rays from the person's environment, wherein the second movable light reflector has a fourth configuration in which the plane which best fits a reflective second surface of the second movable light reflector intersects the light rays from the person's environment at an angle within the range of 30 to 90 degrees and in which the reflective second surface of the second movable light reflector reflects light rays from the virtual image display toward the person's eye, and wherein the second movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a fluid-filled transparent optical structure (e.g. lens) which is configured to be worn within 4" in front of the person's eye; an array of movable light reflectors (e.g. micromirrors) suspended in the fluid within the transparent optical structure (e.g. lens); a first movable light reflector (e.g. micromirror) in the array of movable light reflectors, wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the array of movable light reflectors, wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration in order to display a second portion of a virtual image in the person's field of view.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; a spoke-and-ring array of movable light reflectors (e.g. micromirrors) which is part of, or attached to, the transparent optical structure, wherein rings of the array are closer together near center of the grid so that movable light reflectors (e.g. micromirrors) are smaller and/or more-dense in the center of the grid; a first movable light reflector (e.g. micromirror) in the spoke-and-ring array of movable light reflectors (e.g. micromirrors), wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the spoke-and-ring array of movable light reflectors (e.g. micromirrors), wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration in order to display a second portion of a virtual image in the person's field of view.

In an example, an optical structure for one eye of smart eyewear can comprise: a scanning light-energy emitter which emits light rays in different directions at different times so as to form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure; a first movable light reflector (e.g. micromirror) in the array of movable light reflectors, wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration at a first time in order to display a first portion of a virtual image in the person's field of view at the first time; and a second movable light reflector (e.g. micromirror) in the array of movable light reflectors, wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration at a second time in order to zdisplay a second portion of a virtual image in the person's field of view at the second time.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; an array of movable light reflectors (e.g. micromirrors) which is part of, or attached to, the transparent optical structure, wherein movable light reflectors are closer to each other in a central portion of the array than in peripheral portions of the array; a first movable light reflector (e.g. micromirror) in the array of movable light reflectors, wherein the first movable light reflector has a first configuration which allows most of the light from the person's environment to reach the person's eye through a first area of the transparent optical structure and does not reflect light rays from the virtual image display toward the person's eye, wherein the first movable light reflector has a second configuration which blocks most of the light from the person's environment from reaching the person's eye through the first area and reflects light rays from the virtual image display toward the person's eye from the first area, and wherein the first movable light reflector can be selectively tilted or rotated from its first configuration to its second configuration by transmission of electromagnetic energy; and a second movable light reflector (e.g. micromirror) in the array of movable light reflectors, wherein the second movable light reflector has a third configuration which allows most of the light from the person's environment to reach the person's eye through a second area of the transparent optical structure and does not reflect light rays from the virtual image display toward the person's eye, wherein the second movable light reflector has a fourth configuration which blocks most of the light from the person's environment from reaching the person's eye through the second area and reflects light rays from the virtual image display toward the person's eye from the second area, and wherein the second movable light reflector can be selectively tilted or rotated from its third configuration to its fourth configuration by transmission of electromagnetic energy.

In an example, an optical structure for one eye of smart eyewear can comprise: a virtual image display which emits light rays which form virtual images in a person's field of vision; a transparent optical structure (e.g. lens) which is configured to be worn within 4" in front of the person's eye; a row-by-column grid of movable light reflectors (e.g. micromirrors) which is part of, or attached to, the transparent optical structure, wherein central portions of rows and/or columns of the grid are bowed inward toward the center of the grid so that movable light reflectors (e.g. micromirrors) are smaller and/or more-dense toward the center of the grid; a first movable light reflector (e.g. micromirror) in the row-by-column grid of movable light reflectors (e.g. micromirrors), wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration in order to display a first portion of a virtual image in the person's field of view; and a second movable light reflector (e.g. micromirror) in the row-by-column grid of movable light reflectors (e.g. micromirrors), wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration in order to display a second portion of a virtual image in the person's field of view.

FIGS. 133 through 136 show four sequential cross-sectional views of an example of an optical structure for one eye of augmented reality eyewear. In these figures, the view is a top-down cross-sectional view and a virtual image display is located to the right of a person's eye. In an example, a virtual image display can be on a sidepiece of an eyewear frame. In another example, a virtual image display can be located to the left of a person's eye. In another example, a virtual image display can be located above a person's eye. In another example, a virtual image display can be located on the upper portion of the frontpiece of an eyewear frame.

FIGS. 133 through 136 show four sequential cross-sectional views of an example of an optical structure for one eye of augmented reality eyewear comprising: a virtual image display 13307 which emits light rays which form virtual images in a person's field of vision; a transparent optical structure (e.g. lens) 13302 which is configured to be worn within 4" in front of the person's eye; an array of movable light reflectors (e.g. micromirrors) which is part of, or attached to, the transparent optical structure; wherein the array includes a first movable light reflector (e.g. micromirror) 13303 in the array of movable light reflectors, wherein the first movable light reflector has a first configuration in which the plane which best fits a surface of the first movable light reflector is substantially parallel to light rays 13305 from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays 13401 from the virtual image display toward the person's eye 13301, and wherein the first movable light reflector can be selectively moved from its first configuration to its second configuration in order to display a first portion of a virtual image in the person's field of view; and a second movable light reflector (e.g. micromirror) 13304 in the array of movable light reflectors, wherein the second movable light reflector has a third configuration in which the plane which best fits a surface of the second movable light reflector is substantially parallel to light rays 13306 from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays 13402 from the virtual image display toward the person's eye, and wherein the second movable light reflector can be selectively moved from its third configuration to its fourth configuration in order to display a second portion of a virtual image in the person's field of view.

Figure 133:
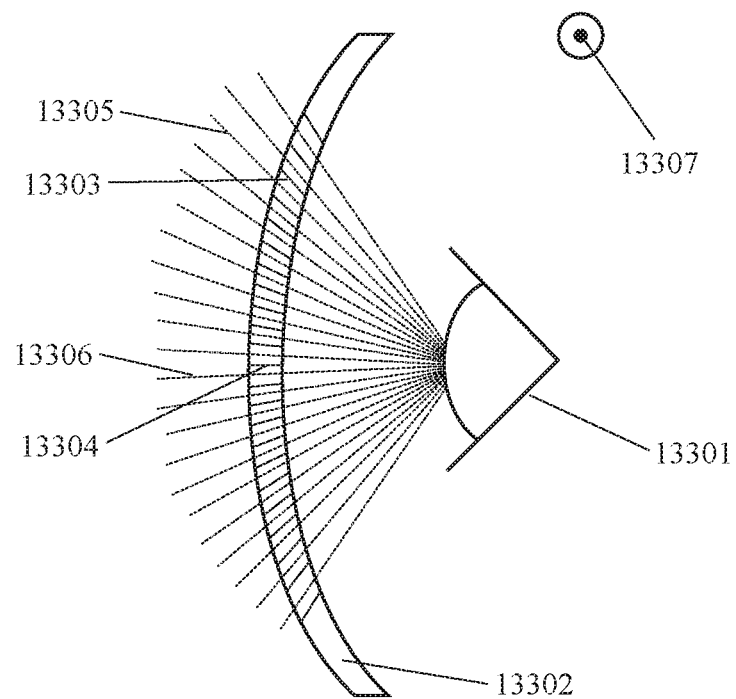

FIG. 133 shows this optical structure at a first point in time wherein all of the movable light reflectors in the array are in configurations which are substantially parallel to light rays from the person's environment and the virtual image display does not emit any light rays. This allows the person to have a substantially-unobstructed view of their environment and does not display any virtual images in the person's field of vision. In this figure, the eyewear operates in what can be called "environment only mode."

Figure 134:
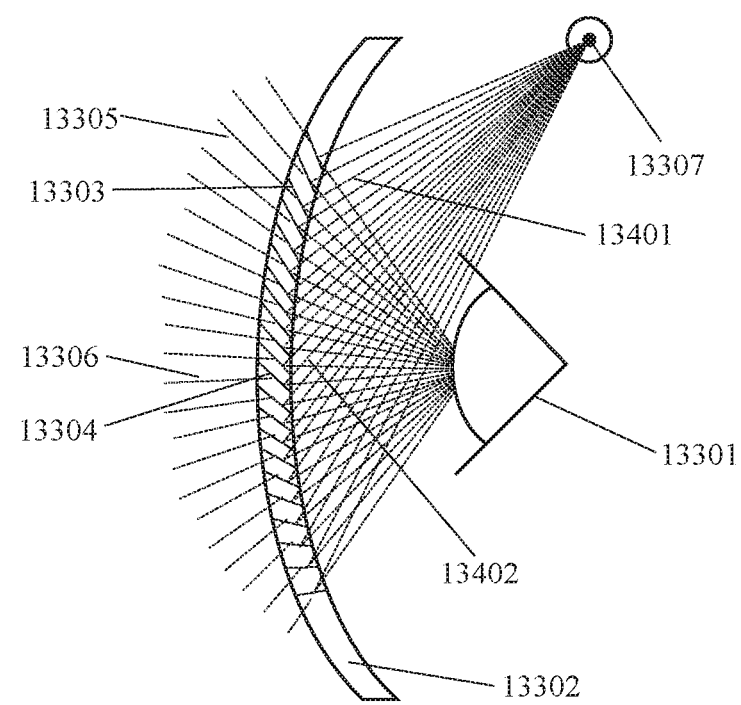

FIG. 134 shows this optical structure at a second point in time wherein all of the movable light reflectors in the array are in configurations which intersect light rays from the person's environment at angles within the range of 30 to 90 degrees. This substantially blocks the person's view of their environment and displays virtual images in the person's field of vision. In this figure, the eyewear operates in what can be called "virtual reality mode."

Figure 135:
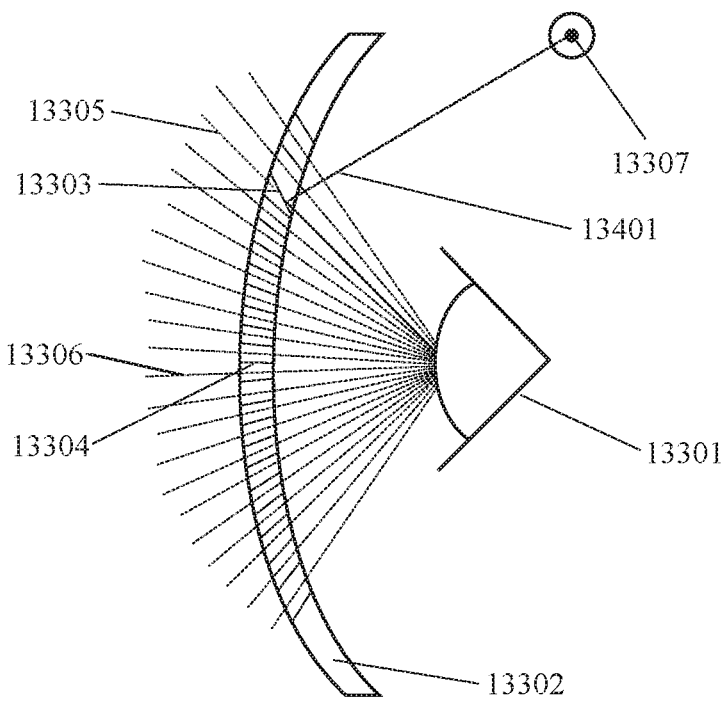

FIG. 135 shows this optical structure at a third point in time in which: a sub-set of the movable light reflectors (13303 only in this example) have been selectively moved into a configuration which intersects light rays from the person's environment at an angle within the range of 30 to 90 degrees and reflects light rays from the virtual image display toward the person's eye; and the rest of the movable light reflectors (including 13304 in this example) are in configurations which are substantially parallel to light rays from the person's environment. This selectively blocks the person's view of their environment (e.g. environmental light masking) and displays a virtual image in only a selected portion of the person's field of vision. In this figure, the eyewear operates in what can be called "augmented reality mode."

Figure 136:
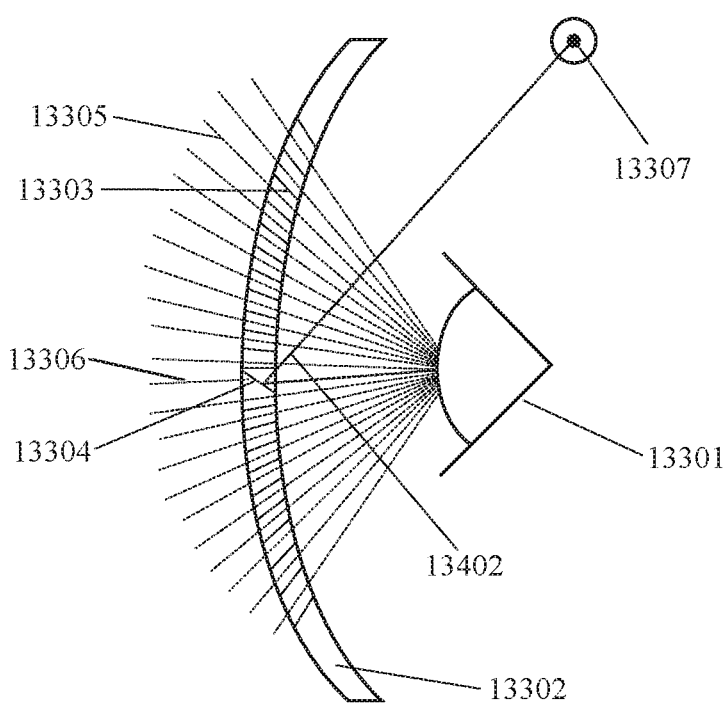

FIG. 136 shows this optical structure at a fourth point in time in which: a different sub-set of the movable light reflectors (13304 only in this example) have been selectively moved into a configuration which intersects light rays from the person's environment at an angle within the range of 30 to 90 degrees and reflects light rays from the virtual image display toward the person's eye; and the rest of the movable light reflectors (including 13303 in this example) are in configurations which are substantially parallel to light rays from the person's environment. This selectively blocks the person's view of their environment (e.g. environmental light masking) and displays a virtual image in only a different selected portion of the person's field of vision. In this figure, the eyewear again operates in what can be called "augmented reality mode."

In an example, a virtual image can be created by multiplexing. In an example, a virtual image display can scan light rays to different locations in the array at different times in synchronization with changes in the configurations of movable light reflectors at those locations in order to rapidly display different portions of a virtual image. In an example, a virtual image can be created by the simultaneous display of multiple light-emitting pixels in a virtual image display. In an example, a virtual image display can direct multiple light rays to different locations in the array at the same time wherein the configurations of movable light reflectors at those locations are simultaneously configured to display different portions of a virtual image at the same time. Other example variations discussed elsewhere in this disclosure or in priority-linked disclosures can be applied to the example shown in these figures but are not repeated here to avoid narrative redundancy.

FIGS. 137 through 139 show three different examples of arrays of movable light reflectors in eyewear frames. FIG. 137 shows an example of an array of movable light reflectors 13702 in an eyewear frame 13701, wherein the light reflectors are organized vertically. In an example, a vertically-organized array can be used in combination with a virtual image display which is located to the right or left of a person's eye. In an example, a vertical line of such an array can comprise a single movable light reflector or a plurality of individual light reflectors which are aligned vertically. In this example, the vertical lines are closer together toward center of the array than toward the periphery of the array in order to provide greater image resolution toward the center of the person' field of vision.

FIG. 138 shows an example of an array of movable light reflectors 13802 in an eyewear frame 13801, wherein the light reflectors are organized horizontally. In an example, a horizontally-organized array can be used in combination with a virtual image display which is located above or below a person's eye. In an example, a horizontal line of such an array can comprise a single movable light reflector or a plurality of individual light reflectors which are aligned horizontally. In this example, the horizontal lines are closer together toward center of the array than toward the periphery of the array in order to provide greater image resolution toward the center of the person' field of vision.

FIG. 139 shows an example of an arcuate grid (with convex rows and columns) of movable light reflectors 13902 in an eyewear frame 13901, wherein the light reflectors are organized both vertically and horizontally. In an example, an arcuate grid can be used in combination with a plurality of virtual image displays at various locations (e.g. multiple compass locations) around a person's eye. In an example, each row or column of such an array can comprise a plurality of individual light reflectors. In this example, the rows and columns are closer together (e.g. bowed inward) toward the center of the array relative to the periphery of the array in order to provide greater image resolution toward the center of the person' field of vision. Other example variations discussed elsewhere in this disclosure or in priority-linked disclosures can be applied to the example shown in these figures but are not repeated here to avoid narrative redundancy.

I claim:

1. An optical structure for augmented reality eyewear comprising:
   a virtual image display which emits light rays which form virtual images in a person's field of vision;
   a transparent optical structure which is configured to be worn within 4" in front of the person's eye;
   an array of movable light reflectors which is part of, or attached to, the transparent optical structure;
   wherein the array includes a first movable light reflector in the array of movable light reflectors, wherein the first movable light reflector has a first configuration in which the plane which best fits a surface of the first movable light reflector is substantially parallel to light rays from the person's environment, wherein the first movable light reflector has a second configuration in which the plane which best fits a surface of the first movable light reflector intersects the light rays from the person's environment at an angle within the range of 30 to 90 degrees and in which a surface of the first movable light reflector reflects light rays from the virtual image display toward the person's eye, and wherein the first movable light reflector can be selectively moved from its first configuration to its second configuration in order to display a first portion of a virtual image in the person's field of view; and
   a second movable light reflector in the array of movable light reflectors, wherein the second movable light reflector has a third configuration in which the plane which best fits a surface of the second movable light reflector is substantially parallel to light rays from the person's environment, wherein the second movable light reflector has a fourth configuration in which the plane which best fits a surface of the second movable light reflector intersects the light rays from the person's environment at an angle within the range of 30 to 90 degrees and in which a surface of the second movable light reflector reflects light rays from the virtual image display toward the person's eye, and wherein the second movable light reflector can be selectively moved from its third configuration to its fourth configuration in order to display a second portion of a virtual image in the person's field of view.

* * * * *